US005202661A

United States Patent [19]

Everett, Jr. et al.

[11] Patent Number: 5,202,661

[45] Date of Patent: Apr. 13, 1993

[54] METHOD AND SYSTEM FOR FUSING DATA FROM FIXED AND MOBILE SECURITY SENSORS

[75] Inventors: Hobart R. Everett, Jr.; Gary A. Gilbreath, both of San Diego, Calif.

[73] Assignee: The United States of America as represented by the Secretary of the Navy, Washington, D.C.

[21] Appl. No.: 697,128

[22] Filed: Apr. 18, 1991

[51] Int. Cl.[5] .............................................. G08B 19/00

[52] U.S. Cl. .................................... 340/522; 340/565; 340/531; 340/539; 901/1

[58] Field of Search .............. 340/522, 506, 511, 507, 340/539, 531, 825.06, 825.69, 565; 901/1, 49, 50, 46; 358/108, 110, 112, 113; 364/424.02; 318/568.12; 180/169

[56] References Cited

U.S. PATENT DOCUMENTS

| | | | |
|---|---|---|---|
| 4,364,030 | 12/1982 | Rossin | 340/567 |
| 4,377,808 | 3/1983 | Kao | 340/527 |
| 4,570,157 | 2/1986 | Kodaira | 340/567 |
| 4,772,875 | 9/1988 | Maddox | 340/522 |
| 4,857,912 | 8/1989 | Everett | 340/522 |
| 4,906,976 | 3/1990 | Guscott | 340/567 |
| 4,912,748 | 3/1990 | Horii | 340/567 |
| 5,083,968 | 1/1992 | Hart | 901/1 |

OTHER PUBLICATIONS

"Development of a Mobile Robot for Security Guard" by Kajiwara, et al. Nov. 1984.

*Primary Examiner*—Jin F. Ng
*Assistant Examiner*—Christine K. Oda
*Attorney, Agent, or Firm*—Harvey Fendelman; Thomas Glenn Keough; Michael A. Kagan

[57] ABSTRACT

A system for detecting intrusion into a secured environment using both fixed and mobile intrusion detectors includes a multiplicity of fixed intrusion detection sensors are each deployed at specific, fixed locations within the environment. The mobile sensors are mounted on one or more mobile platforms which selectively patrol throughout the environment and may be rapidly deployed to any region in the environment where a fixed intrusion detector detects a possible intrusion. A computer receives the outputs of the fixed and mobile sensors and is communicatively coupled to the mobile platforms. The computer directs the mobile platforms to travel through the environment along paths calculated by the computer, calculates a sum of weighting factors associated with the output of each sensor, and fuses the sensor outputs so that the sum is uninfluenced by the traveling of the mobile platforms. The sum is compared to a reference whereby an output is provided when the sum exceeds the reference. An alarm system operably coupled to the computer provides an intrusion alert when the output received exceeds the reference.

11 Claims, 31 Drawing Sheets

METHOD AND SYSTEM FOR FUSING DATA FROM FIXED AND MOBILE SECURITY SENSORS

The invention described herein may be manufactured and used by or for the Government of the United States of America for governmental purposes without the payment of any royalties thereon or therefor.

BACKGROUND OF THE INVENTION

The present invention relates to the general field of intrusion detection systems for secure environments, and more particularly to a system that integrates the outputs of both fixed and mobile intrusion detection sensors in order to provide intelligent assessments of the level of security of the environment.

Most security systems utilize fixed sensors such as motion detectors and/or video cameras positioned at specific locations throughout the environment to be secured. Such environments include buildings, military bases, warehouses, storage yards, factories, and even homes. A very great disadvantage with video camera surveillance is that it requires an alert human to monitor a bank of video displays over long periods of time. If the human becomes distracted or fatigued, he may not notice an intrusion. Another problem with such security systems is that in order to be sensitive enough to detect a potential intrusion, they are subject to nuisance trips. This causes erosion in confidence in these systems. Furthermore, such systems do not provide sufficient resolution to be able to identify the specific nature of an intrusion or its precise location. Further, fixed positioned intrusion detectors are not capable of tracking an intruder's position with any real accuracy.

If the environment to be secured is very large, it becomes economically difficult to provide adequate sensor coverage throughout the entire environment with fixed sensors. Furthermore, the fact that the sensors are positioned at fixed locations makes them vulnerable to being neutralized by a determined intruder.

There exists a tradeoff point wherein it becomes more cost effective to outfit a platform with numerous sensors, and let it travel from zone to zone, as opposed to installing, wiring, and protecting the fixed installation of these same sensors so that all areas within a space are effectively covered. This is obviously a function of the conditions to be monitored and the unit cost of the appropriate sensors, as well as the number of areas and geometric configuration of the space to be protected. Some provision must be made to preclude site vulnerability when the robot is not on station, or perhaps even down for maintenance. For these reasons, a combination of both fixed and mobile sensors is likely to evolve as the appropriate solution in most cases, but obvious problems arise with the operation of a mobile platform in an area protected by permanently installed motion detectors, in that the motion of the robots will set off the fixed alarms.

Therefore, a need exists for a security system which allows one or more mobile robots to operate in an area protected by fixed intrusion detectors. Furthermore, a need exists for an intrusion detection system that is capable of detecting the presence of a potential intrusion, then scrutinizing the potential intrusion with greater resolution to ascertain the nature of the intrusion, then determining the probability of an actual intrusion to minimize nuisance trips, and then providing an intruder alarm if the threat of intrusion exceeds a specific level of confidence that an actual intrusion has occurred.

SUMMARY OF THE INVENTION

The present invention provides a system for detecting intrusion into a secured environment using both fixed and mobile intrusion detectors. The invention employs an optimal mix of fixed sensors, positioned at specific locations throughout the environment, and sensors mounted on one or more mobile robots that patrol the secured environment. The outputs of the fixed and mobile sensors are fused by a computer-based system that emulates the assessment functions of its human counterpart. The system knows at all times where the robots are located, the zones of coverage for the mobile sensor suites, and the resultant effect of the robot's presence or motion on fixed intrusion detection sensors viewing that same area.

The concept of mobility provides an unpredictable pattern with respect to precise sensor location and orientation, making the job of casing a scenario for the purpose of identifying blind spots rather difficult indeed. The random patrols and the uncertainty in the mind of the intruder as to what the robot's response might be upon detection adds a psychological advantage to the deterrent function of the security system. An important advantage of the present invention is that if the fixed sensors detect a potential intrusion, the computer directs a mobile robot to the vicinity to investigate the situation further.

The sensor suite onboard the mobile robot contains multiple, high resolution sensors of different types that are automatically oriented towards the potential intruder. Data obtained from the mobile sensors is used to determine the probability of an actual intrusion so that nuisance trips are minimized. If an actual intrusion has occurred, the mobile robots are directed by the computer to follow the intruder and report the intruder's position. All this occurs in realtime. If the confidence level of an intrusion exceeds a threshold, an intruder alert is provided. Thus, this invention obviates the demanding and tedious vigilance of a human required by conventional security systems.

A multiplicity of fixed intrusion detection sensors are each deployed at specific, fixed locations within the environment. The mobile sensors are mounted on robots which selectively patrol throughout the environment and may be rapidly deployed to any region in the environment where a fixed intrusion detector detects a possible intrusion. A computer receives the outputs of the fixed and mobile sensors and is communicatively coupled to the mobile robots. The computer directs the mobile robots to travel through the environment along paths calculated by the computer, calculates a sum of weighing factors associated with the output of each sensor, and fuses the sensor outputs so that the sum is uninfluenced by the traveling of the mobile robots. The sum is compared to a reference whereby an output is provided when the sum exceeds the reference. An alarm system operably coupled to the computer provides an intrusion alert when the output received exceeds the reference. X-Y positional data and the activated sensor corresponding to an identified intrusion is presented on a video display.

Data fusion is accomplished such that the robot's motion does not trigger a 'fixed' sensor alarm, and data from both 'fixed' and 'mobile' sensors can be collectively assessed in calculating a composite threat score from individual sensor weightings, so as to achieve a high probability of detection with a corresponding low nuisance alarm rate.

The present invention also provides a method for operating a security system having fixed and mobile intrusion detectors in a secured environment, where the mobile intrusion detectors are mounted on one or more mobile robots, and each the fixed and mobile intrusion detectors has a coverage zone. This method includes the steps of: (1) initializing a mathematical model of a fixed intrusion detector map comprised of nodes each having an initial value; (2) determining the position of the mobile robot; (3) initializing a mathematical model of a mobile intrusion detector coverage map comprised of nodes having an initial value; (4) reading the outputs of the fixed and mobile intrusion detectors; (5) determining which the fixed intrusion detector coverage zones include the position of the mobile robot; (6) inhibiting data corresponding to the outputs of any of the fixed intrusion detectors that have the coverage zones that include the mobile robot; (7) assigning a weight to data corresponding to each mobile intrusion detector zone associated with a mobile intrusion detector detecting a potential intrusion by: (8) examining a sequence trigger history of the mobile intrusion detectors in order to ascertain the presence of purposeful motion by the potential intrusion in any of the mobile intrusion detector zones associated with a mobile intrusion detector detecting the potential intrusion; (9) increasing the weights calculated in step 7 for each mobile intrusion detector threat score by a predetermined amount for each of the mobile intrusion detector zones in which the purposeful motion is detected; (10) determining a mobile intrusion detector threat score by summing the weights determined in steps 7, 8 and 9; (11) correlating the outputs of the fixed and mobile intrusion detectors by identifying a maximum weighted sum corresponding to the outputs of the fixed intrusion detectors detecting the potential intrusion, and having an associated fixed intrusion detector zone that intersects a mobile intrusion detector zone in which the potential intrusion has been identified by; (12) rotating and translating the activated mobile intrusion detector zones associated with the mobile intrusion detectors detecting the potential intrusion into the mobile coverage map; (13) assigning a value to each of the mobile intrusion detector coverage zones associated with the mobile intrusion detectors detecting the potential intrusion to a predetermined value; (14) correlating the fixed intrusion detector coverage map with the mobile intrusion detector coverage map for each location within the mobile intrusion detector coverage zone which intersects the interior of one or more fixed intrusion detector sensor zones associated with a fixed intrusion detector detecting the potential intrusion to produce a weighted sum representing a probability of an intrusion by: (15) determining a maximum fixed intrusion detector threat score corresponding to the activated fixed intrusion detectors; (16) determining a composite global threat score by summing the mobile intrusion detector threat score and the maximum intrusion fixed sensor threat score; and (17) providing an alarm signal to an alarm output device if the composite global threat score is greater that the threshold value.

Another advantage of the invention is that it provides geographic correlation of fixed and mobile sensor alarm data. A further advantage is that it provides a high probability of detection with a low nuisance alarm rate by assigning "weights" to data representing intrusion detector outputs.

BRIEF DESCRIPTION OF THE DRAWINGS

FIG. 19 is a flowchart of the Retrace program software.

FIG. 20 is a flowchart of the Execute Path program software.

FIG. 21 is a flowchart of the Execute Segment program software.

FIG. 22 is a flowchart of the Map Sonar program Software.

DESCRIPTION OF THE PREFERRED EMBODIMENT

The present invention provides an intrusion detection system which synthesizes data provided by one or more groups of intrusion detectors mounted on mobile robots with data provided by a fixed intrusion detection system in order to compile a composite intrusion threat level of an environment which is to be secured. A composite intrusion threat level exceeding a specified threshold results in an intrusion alert.

Figure 1:
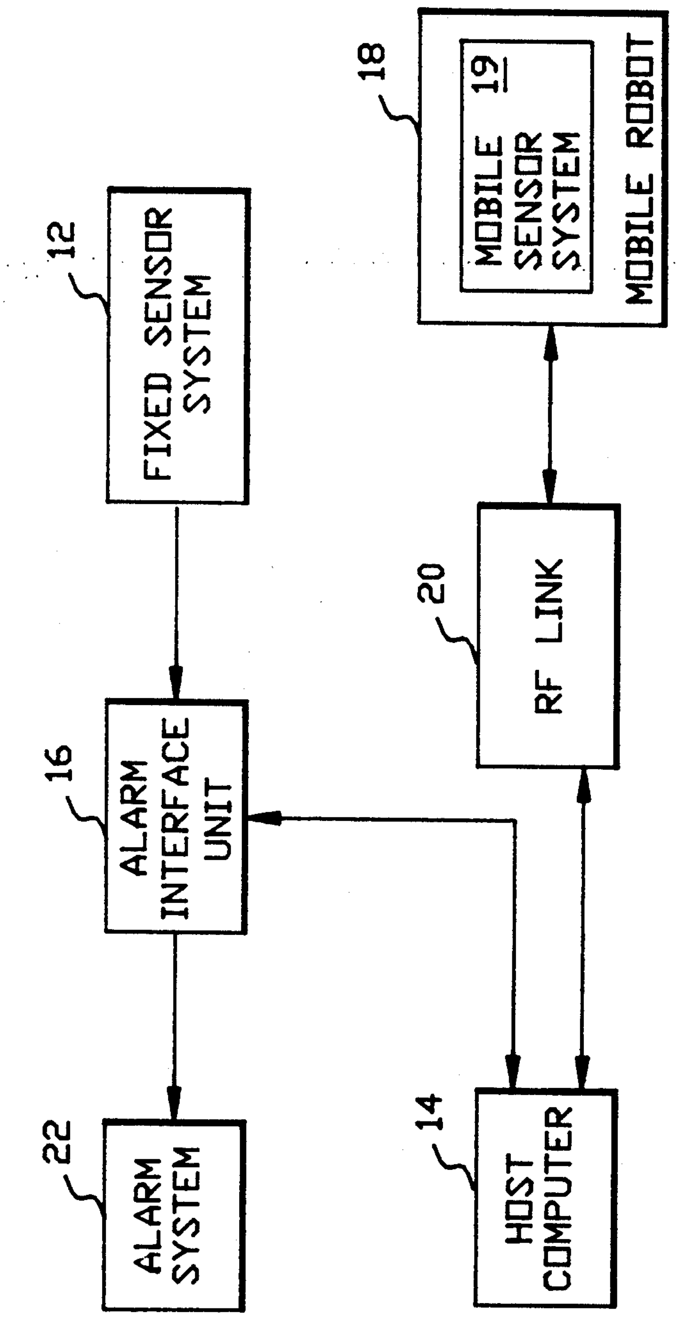
FIG. 1 is a block diagram of the present invention.

An overview of the present invention is described with reference to FIG. 1, where there is shown fixed sensor system 12 which preferably includes a multiplicity of different types of intrusion detectors that provide outputs to host computer 14 through alarm interface unit 16. The invention also includes one or more security sensor systems 19 each mounted on a mobile robot 18 which patrols throughout the environment. Security sensor systems 19 are communicatively linked to host computer 14 via radio frequency link 20 Algorithms implemented by software in host computer 14 integrate the outputs of fixed sensor system 12 and security sensor system 19 in order to determine the composite intrusion threat level. If the composite intrusion threat level exceeds a predetermined threshold value, an alert signal is output from host computer 14 through alarm interface unit 16 to enable alarm system 22. A human operator monitoring alarm system 22 then may appropriately respond.

This invention also provides navigational control for the mobile robots 18 which: 1) periodically identifies the location and orientation of the mobile robot, 2) plans a path for the robot to follow from its present location to a specified destination, and 3) provides directions to the mobile robot so that the path is executed in a manner whereby the mobile robot avoids running into anything.

Figure 2:
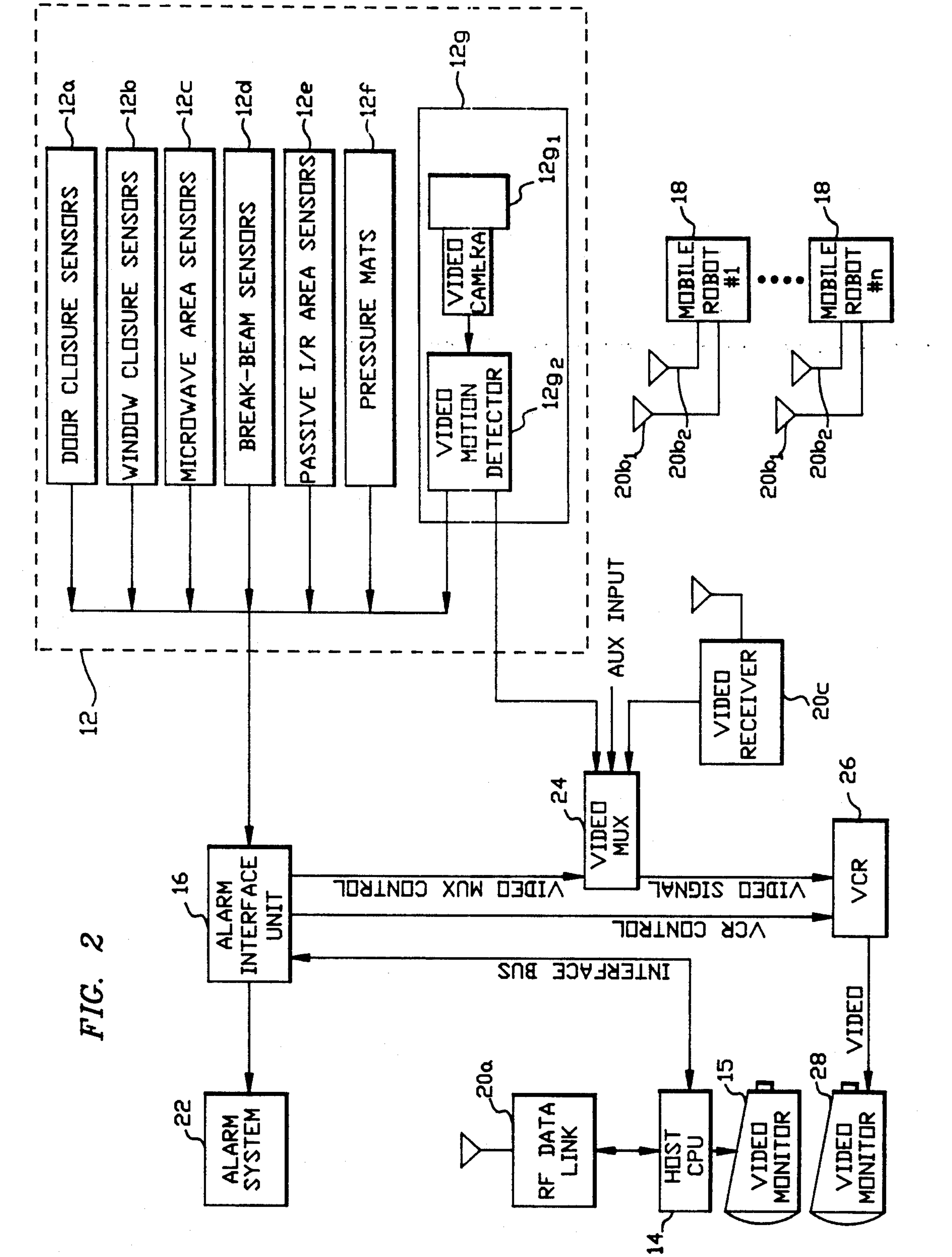
FIG. 2 is a more detailed block diagram of the present invention.

A more detailed description of the present invention is presented with reference to FIG. 2. Fixed sensor system 12 may include several different types of sensors, as for example, door closure sensor 12*a*, window closure sensor 12*b*, microwave area sensor 12*c*, break-beam sensor 12*d*, passive infrared sensor 12*e*, pressure mat 12*f*, and video motion detector system 12*g*, comprising video camera $12g_1$ and video motion detector $12g_2$. Such sensors are well known and commercially available. However, in the preferred embodiment, video motion detector $12g_2$ is of the type described in in U.S. Pat. No. 5,034,817 (application Ser. No. 07/486,465), Reconfigurable Video Line Digitizer And Method For Storing Predetermined Lines Of A Composite Video Signal, filed Feb. 28, 1990, incorporated herein by reference.

Referring still to FIG. 2, the video signal output from video motion detector system 12*g* is provided to video multiplexer (MUX) 24 and then is received by video recorder (VCR) 26 and displayed on video monitor 28. RF link 20 includes RF link 20*a* coupled to host computer 14, RF data transmitter $20b_1$ mounted onboard mobile robot 18, and RF video transmitter $20b_2$, also mounted on mobile robot 18. The video signal provided by video link $20b_2$ is received by video receiver 20*c*, directed to MUX 24, and optionally stored by VCR 26 and displayed by video monitor 28. Alarm system 22 provides an alert signal when the outputs of fixed sensor system 12 and/or sensor system 19 detect perturbations within the secured environment that have a high probability of corresponding to an intrusion. Each of these major systems are described in greater detail further herein.

Fixed Intrusion Detection System

Fixed intrusion detection system 12 includes a multiplicity of sensors capable of detecting perturbations within the area to be secured that may correspond to intrusions caused by entry of unauthorized personnel or to other conditions inimical to the security of the area, as for example, fire. The sensors are positioned at fixed locations throughout the area to be secured in order to provide a high probability of detecting any such disturbances, as would be well known by those skilled in this art.

The outputs of the sensors which comprise intrusion detection system 12 are received by alarm interface unit 16 which routes them to host computer 14. Computer 14 evaluates the data, and if an intrusion is detected, outputs an intrusion alert via alarm interface unit (AIU) 16 so as to enable alarm system 22.

Alarm System

Alarm system 22 includes an annunciation device, such as a bell or siren, and a panel of indicator lights which show the status of the individual sensors of fixed sensor system 12. Such light panels are well known and commonly employed in the security industry. Alarm system 22 responds to the various signals provided by alarm interface unit 16.

Alarm Interface Unit

Alarm interface unit (AIU) 16 is intended to make the present invention compatible with existing installation security systems consisting principally of an alarm system 22 and a plurality of fixed sensors such as are depicted in FIG. 2 as sensors $12_{a-g}$. AIU 16 provides an interface to host computer 14 which allows the host computer to ascertain the status (alarmed or clear) of the individual fixed sensors $12_{a-g}$. In addition, AIU 22 provides an output interface which allows host computer 14 to relay this status information to alarm system 22. AIU also provides an output signal via the VCR control line which allows host computer 14 to start and stop VCR 26, and an output signal via a video MUX control line which allows control of video multiplexer 24.

Figure 3A:
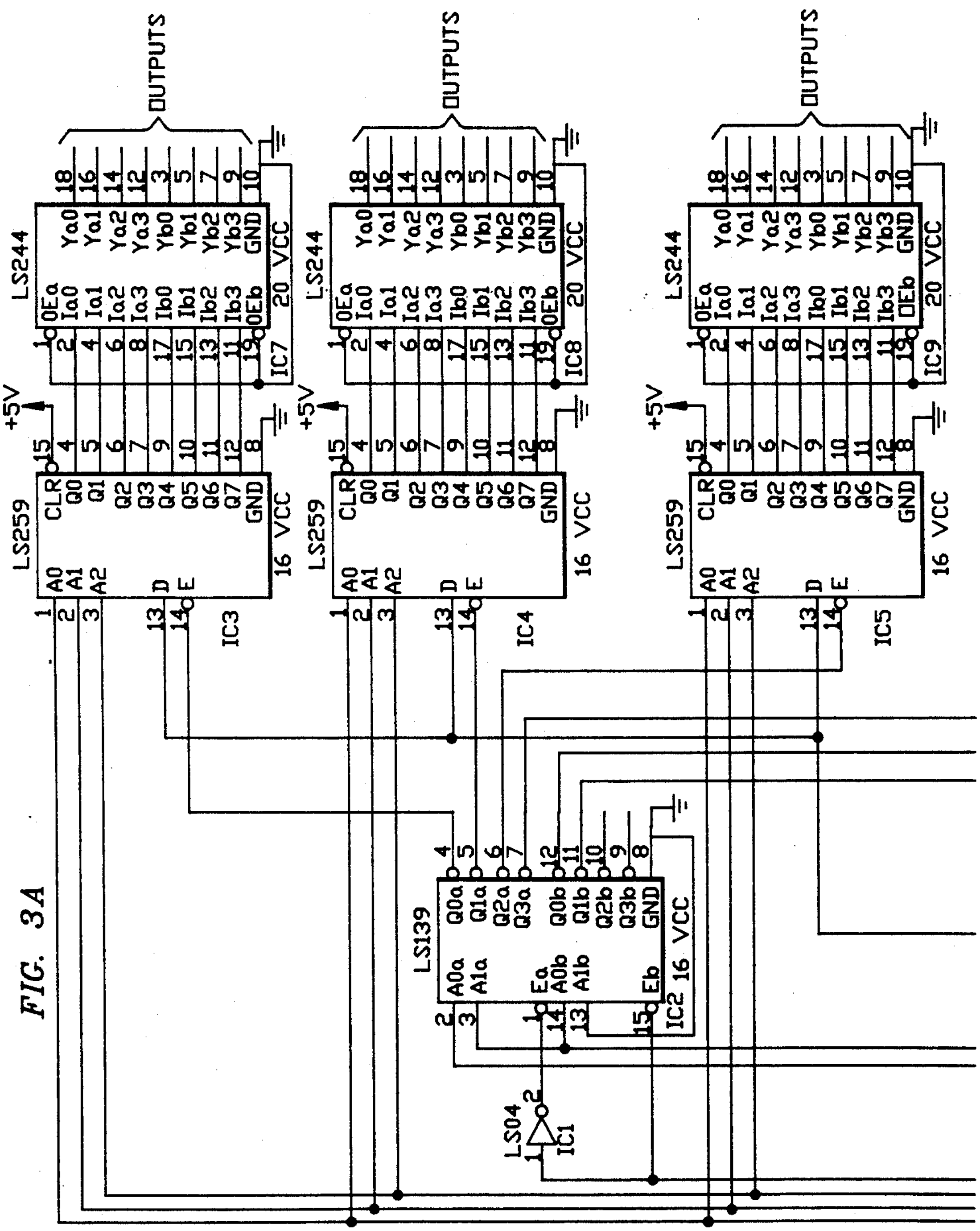
FIGS. 3A and 3B are a schematic diagram of the alarm interface unit.
Figure 3B:
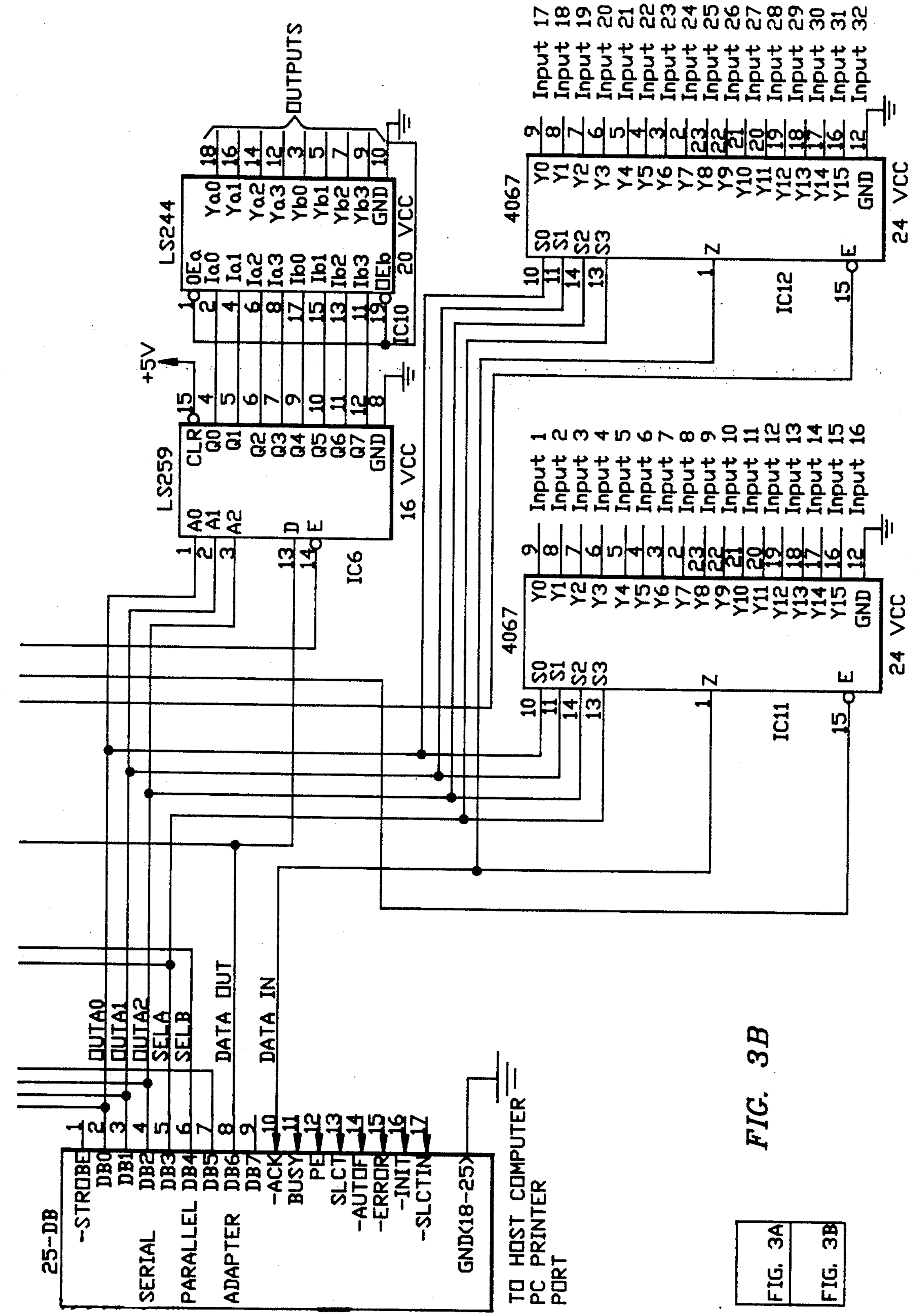

AIU 16 is described with reference to FIGS. 3A and 3B. AIU 16 has, by way of example, 16 inputs on each of two IC's 4067, 8 outputs from each of four IC's 74LS244, and is connected to the 8-bit parallel printer port of host computer 14. In order for AIU 16 to control 32 inputs and 32 outputs, it uses five bits (DB0-DB4) from the standard 8-bit parallel PC printer port as address bits. Pin number, data bit, and function of each bit are listed in TABLE 1. Bit DB5 is used to determine if AIU 16 is reading or writing (input/output). The DB6 (DATA_OUT) bit outputs data, while the ACK (DATA_IN) bit is used for receiving data.

TABLE 1

| BIT | PIN NUMBER | FUNCTION |
|---|---|---|
| DB0 | 2 | OUTA0 |
| DB1 | 3 | OUTA1 |
| DB2 | 4 | OUTA2 |
| DB3 | 5 | SELA |
| DB4 | 6 | SELB |
| DB5 | 7 | WR/RD |
| DB6 | 8 | DATA_OUT |
| -ACK | 10 | DATA_IN |

In order to send a data bit to one of 32 outputs, the WR/RD (DB5) line is set to a logic high. DB0-DB2 (OUTA0-OUTA2) provide the lower three output address lines. Since the 74LS259 addressable latch only has three input address lines and 8 outputs, a dual 2-to-4 74LS139 multiplexer is employed to allow four 74LS259 chips to be accessed, as determined by appropriate logic levels provided by DB3 (SELA) and DB4 (SELB). Each output from the 74LS139 is connected to the ENABLE input of one of the four 74LS259 multiplexer chips. The logic level of SELA and SELB thus determine which one of the four 74LS259 is enabled. OUTA0-OUTA2 then provide the necessary address to select the desired output port on the enabled 74LS259, whereupon 13DATA OUT determines the logic level of that selected port. Once an output port state is set, it will retain the same value even after another port is selected. The value of an output port can only be changed if its corresponding address is set on lines DB0-DB4, otherwise the port value remains the same.

In order to read in an input from AIU 16, the WR/RD line (DB5) is set to a logic low. OUTA0-SELA are used as the lower four address lines. The logic level of SELB, connected to 74LS139, determines which of the two 4067 analog multiplexers is enabled. If SELA is low, then ports 1-16 are available, whereas if SELB is high, then ports 17-32 are selected.

Programming required to control the operation of AIU 16 is implemented in host computer 14 and may be written in "C", as presented, by way of example, in Appendix 1.

Mobile Robot

Figure 4:
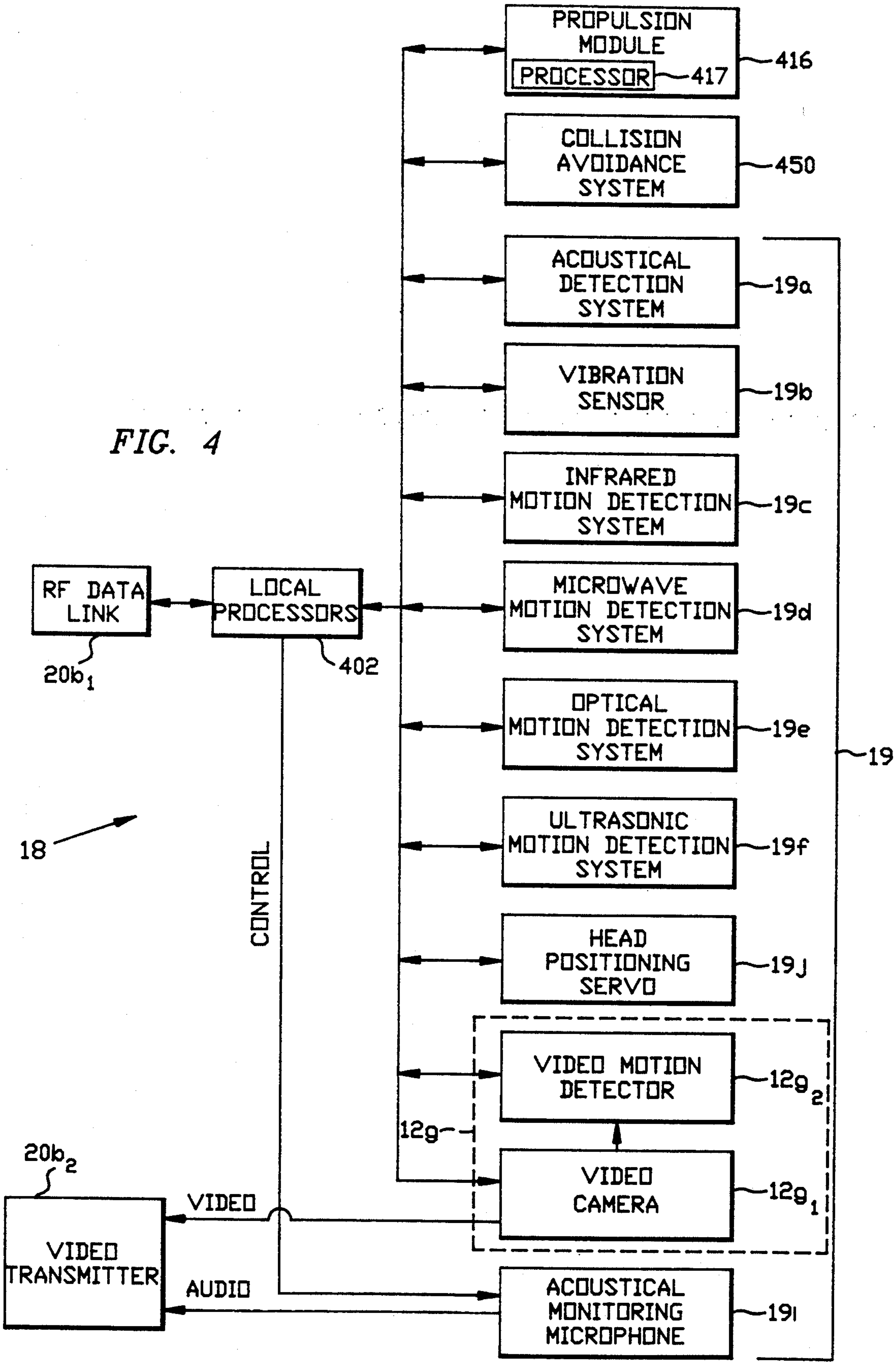
FIG. 4 is a block diagram of the mobile robot.

Referring to FIG. 4, mobile robot 18 is a mobile platform which includes local processor 402, propulsion module 416, sensor system 19, and collision avoidance system 450. Propulsion module 416 receives instructions from host computer 1 that direct it along a particular path. Collision avoidance system 450 provides data to host computer 14 via local processor 402 for indicating the presence of obstacles that may obstruct the path of mobile robot 18. More detailed descriptions of each of these systems which comprise mobile robot 18 are presented further herein. Mobile robot 18 is capable of being navigated throughout the operating environment by instructions provided by host computer 14 through local processor 402. Techniques for navigating a mobile platform in the manner employed in the preferred embodiment of the present invention are well known by those skilled in this technology, and are incorporated into a number of commercially available units. [Refer to U.S. Pat. No. 4,811,228, Method of Navigating An Automated Guided Vehicle, incorporated herein by reference].

Local Processor

Local processor 402 performs the following functions: 1) coordinates the operations of all of the systems of mobile robot 18; 2) receives high level instructions from host computer 14; 3) passes drive commands to propulsion module 416; 4) receives X-Y position and heading updates from processor 417 of propulsion module 416; 5) receives range and bearing data representing the area surrounding mobile robot 18 from processor 532 (See FIG. 5); 6) checks for potential collision conditions; 7) sends stop commands to propulsion module 416 if a collision is eminent; and 8) passes required positional and sonar information to host computer 14.

Local processor 402 may be programmed to perform the above recited functions in a high level language such as "C", or in an assembly language, such as 6502, in accordance with well known techniques, as set forth, by way of example, in Appendix 2.

Propulsion Module

Figure 6:
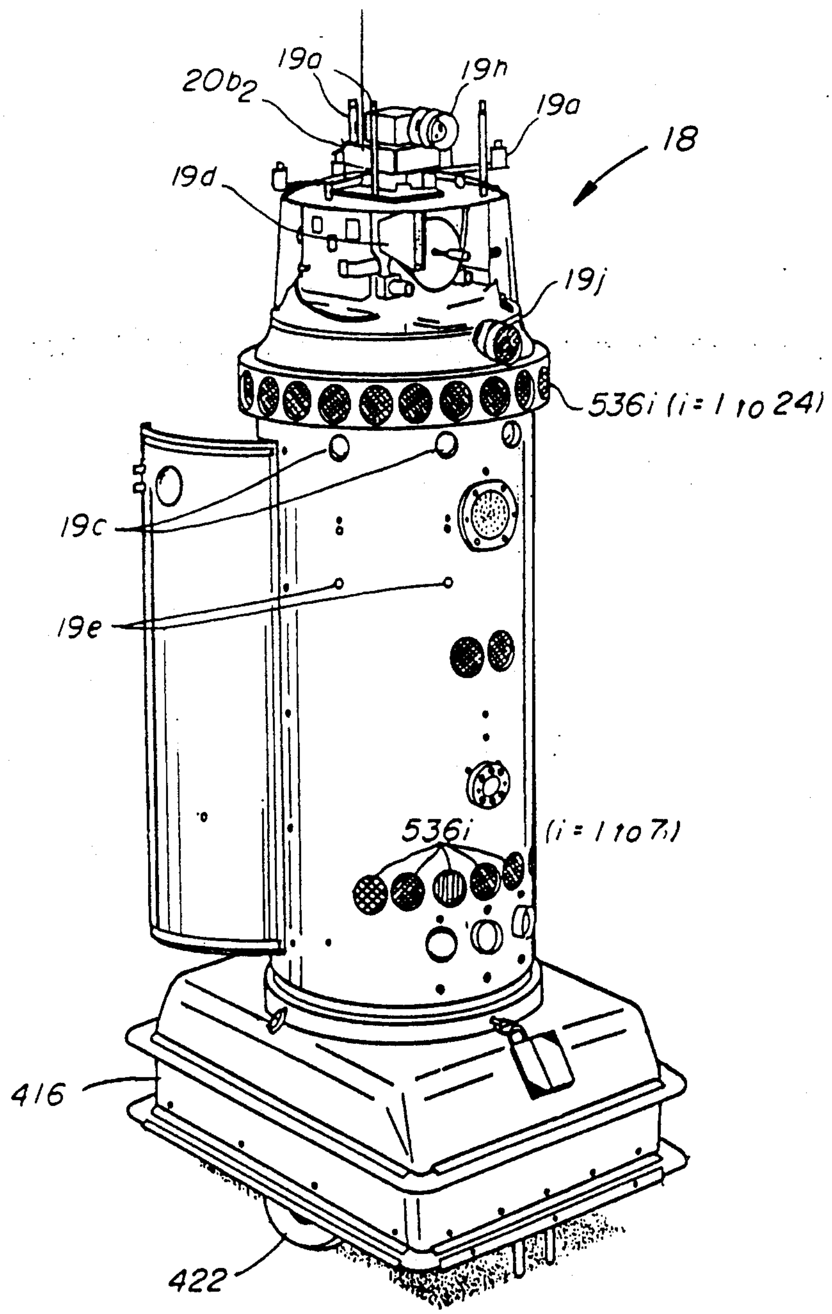
FIG. 6 is a perspective view of the autonomous vehicle used in conjunction with the present invention.
Figure 7:
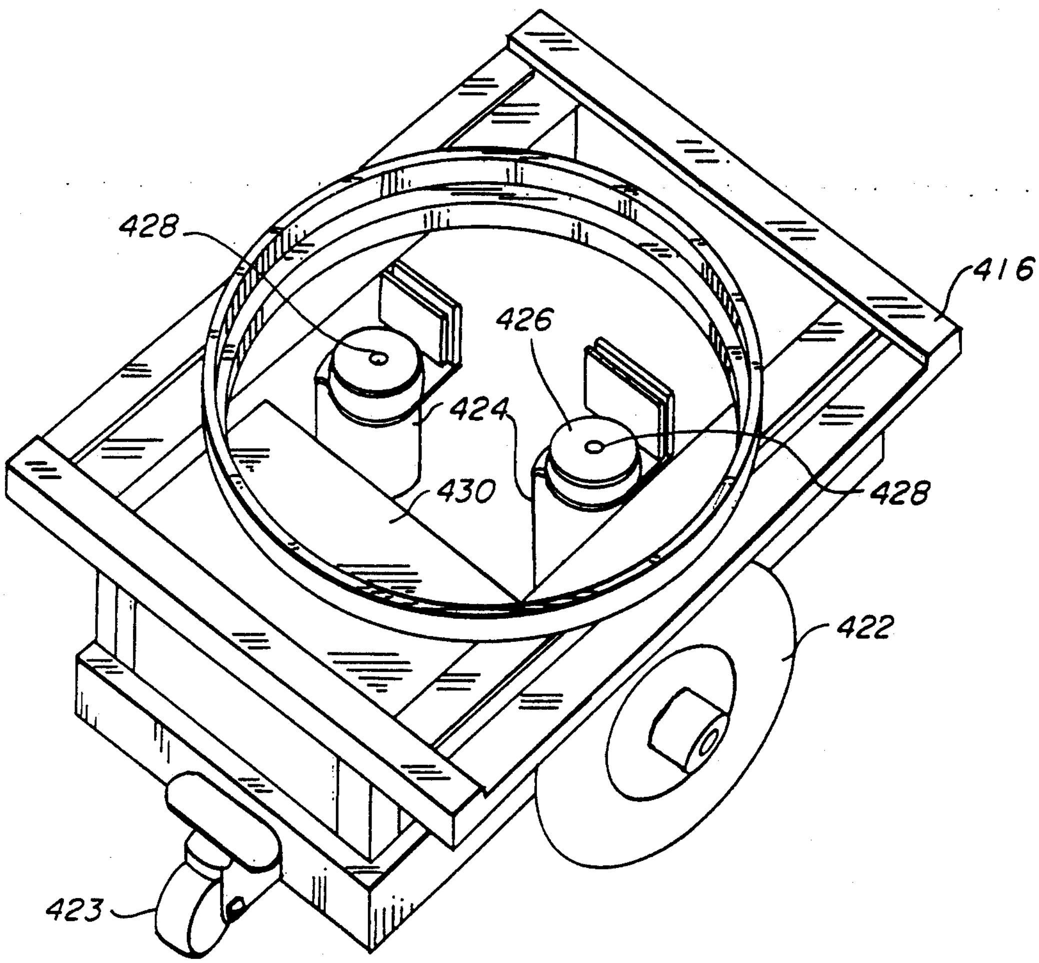
FIG. 7 is a perspective view of the propulsion module.

Referring to FIGS. 6 and 7, mobility and dead-reckoning position determination of mobile robot 18 depends on two degree-of-freedom, computer-controlled propulsion module 416 having motion directed by local processor 402 which is mounted on mobile robot 18. Local processor 402 provides output instructions to processor 417 (FIG. 2) of propulsion module 416 in response to data received from host computer 14 so that mobile robot 18 may follow a path calculated by host computer 14. Processor 417 is typically provided as a component of commercially available propulsion modules of the type employed in the preferred embodiment of the present invention.

Commands are passed by local processor 402 to processor 417 which controls propulsion module 416 over a serial or parallel bus as a series of hexadecimal bytes which specify: (1) the direction in which to move or pivot, (2) the velocity, and, (3) the duration (distance or number of degrees.) The functions of propulsion module 416 include executing movement commands received from local processor 402 and performing dead-reckoning calculations. In an example of the preferred embodiment, these commands are:

Byte 1 - Type Motion Requested (00 to 07)

00 - Move forward
01 - Move reverse
02 - Pivot left
03 - Pivot right
04 - Offset left
05 - Offset right
07 - Stop Byte 2 - Requested Velocity
Upper nibble is the port motor velocity;
Lower nibble is the starboard motor velocity.

Byte 3 - Distance to Move (Inches) or,
Duration of Pivot (Degrees) or,
Amount of Offset (Tenths of Degrees)

Velocity control and acceleration/deceleration ramping are performed by processor 417 on an interrupt basis, while the main code performs all dead reckoning calculations. Cumulative X and Y components of displacement as well as current heading, θ, are passed up the hierarchy via local processor 402 at recurring intervals so that host computer 14 knows the location of mobile robot 18 in order to integrate data from sonar system 435 into a world model which is constantly being updated with new information. The programming which enables local processor 402 to control propulsion module 416 is typically provided with commercially available propulsion modules similar to the type described above. Examples of commercial models of suitable propulsion modules are the "LABMATE," manufactured by Transitions Research Corporation, 15 Great Pasture Road, Danbury, Conn. 06810, or the "NAVMASTER" by Cybermotion, 5457 Aerospace Road, Roanoke, Virginia, 24014.

Referring to FIGS. 6 and 7, by way of example, propulsion module 416 includes a pair (only one wheel is shown) of coaxially aligned wheels 422 which are each driven by separate motors 424 which enable propulsion module 416 to be differentially steered by rotating each wheel 422 by different amounts, both in angular displacement and direction. Wheels 422, may for example, have 8-inch rubber tires, which when coupled with motors 424, provide a quiet, powerful propulsion system with minimal wheel slippage. Passive casters 423 mounted to propulsion module 416 provide it with stability. Armature shafts 428 of motors 424 are each coupled to a high-resolution optical rotary shaft encoder 426 that provides phase-quadrature, square-wave outputs, where each square-wave output corresponds to a specific increment of angular displacement of a wheel 422. By way of example only, in the preferred embodiment, encoders 426 produce 200 counts per revolution of armature shaft 428, which translates to 9725 counts per wheel revolution. Commands from local processor 402 direct the kinematics of propulsion module 416, as for example, heading, velocity, and acceleration. Processor 417 (FIG. 2) of propulsion module 416 provides host computer 14 with its instantaneously computed dead-reckoning position and heading which is calculated by counting the number and discerning the phase relationships of the square-wave outputs of each encoder associated with each wheel 422. Power to operate mobile robot 18 is provided by battery 430 in accordance with well known techniques.

Collision Avoidance System

Figure 5:
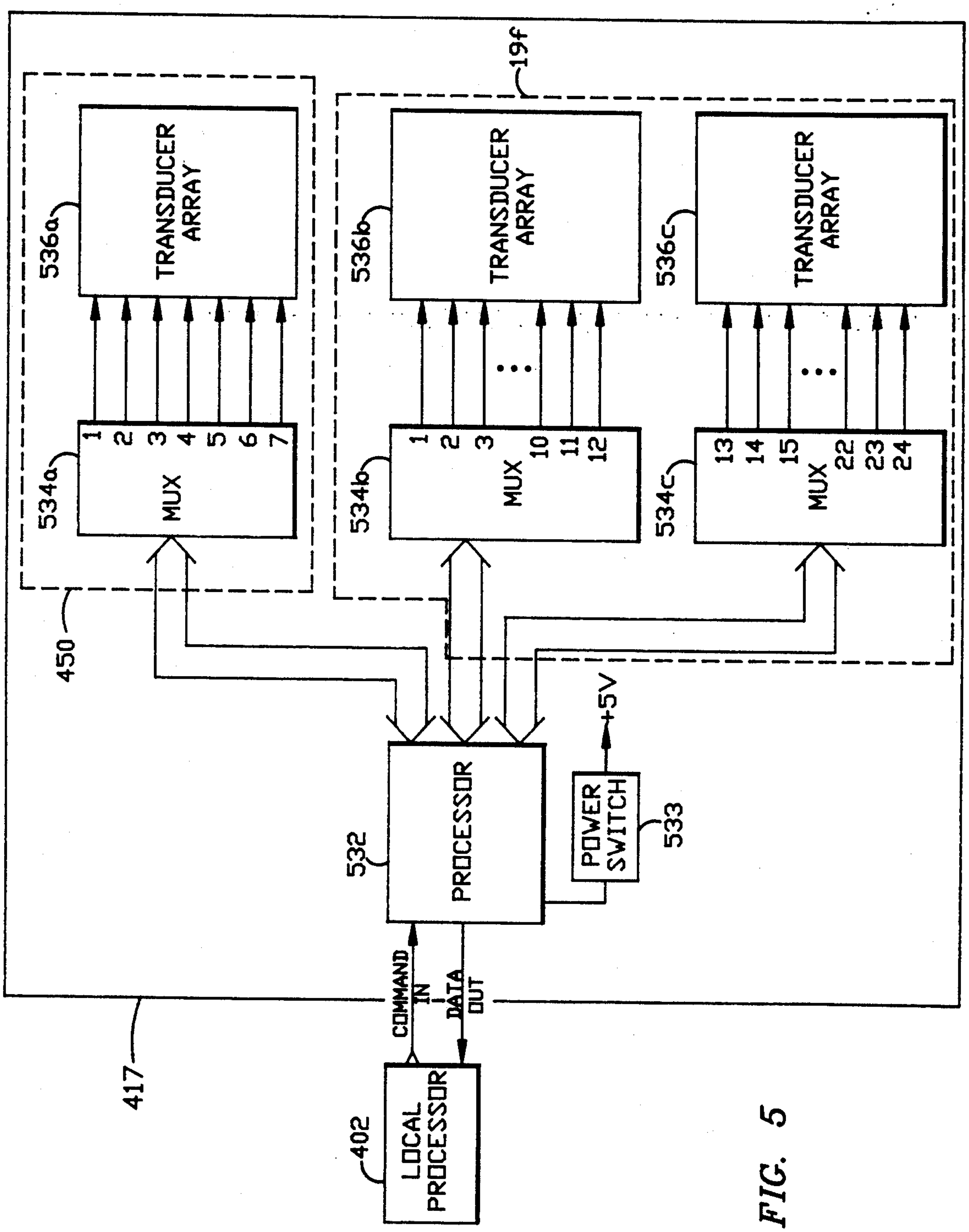
FIG. 5 is a functional block diagram of the sonar subsystem.
Figure 8:
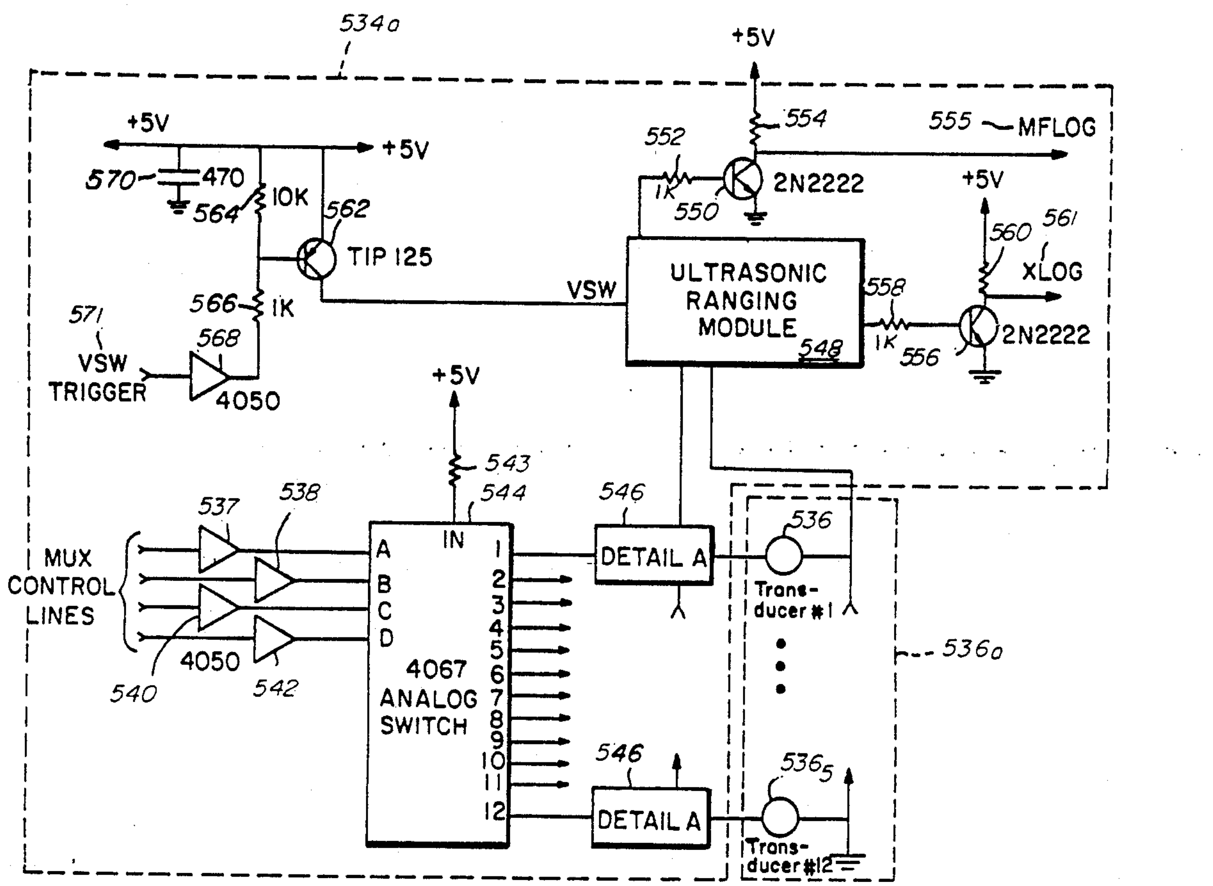
FIG. 8 is a schematic electrical diagram of the multiplexer portion depicted in FIG. 5 of the present invention.
Figure 9:
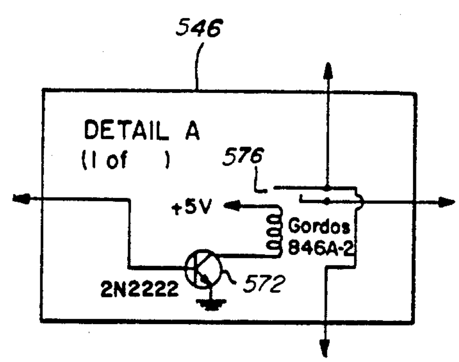
FIG. 9 is a schematic electrical diagram of the transducer switching relay (Detail A) of FIG. 8.

Collision avoidance system 450 (see FIGS. 4–5) is used to detect obstacles in the path of mobile robot 18 and provide data to host computer 14 so that the path planner program can endeavor to calculate a path which avoids any detected obstacles. Referring to FIGS. 5, 8 and 9, collision avoidance system 450 includes processor 532, multiplexer 534a and transducer array 536a. Processor 532 of collision avoidance system 450 receives commands from local processor 402 and provides ranges and bearings, detected by transducer array 536a, from mobile robot 18 to nearby detected surfaces that may present obstacles in the path of mobile robot 404. When an obstacle is detected within 5 feet of mobile robot 18, host computer 14 updates the world model, as will be described further herein, using target range information provided by processor 532 through local processor 402 to host computer 14. This range information is combined with additional information describing the heading, θ, of mobile robot 18 as well as X–Y position data. If local processor 402 determines that any range reading is less than some critical threshold distance (as for example, 18 inches in the preferred embodiment), indicative of an imminent collision between mobile robot 18 and an obstacle, then local processor 402 sends a "halt" command to processor 417 (FIG. 4) of mobile robot propulsion system 416, and informs host computer 14 of this action. The path planner, implemented in host computer 14, then calculates a new path for mobile robot 18 to follow that avoids the obstacle so that mobile robot 18 may proceed to the predetermined location. Collision avoidance system 450 employs a multitude of pre-positioned ultrasonic transducers 536: (FIG. 6) that are individually activated in any desired sequence by processor 532, thus enabling collision avoidance system 450 to obtain range information in any given direction within an arc centered at the front of mobile robot 18 that extends forward in a 120 degree conical pattern. Such ultrasonic transducers are commercially available from the Polaroid Corporation.

Still referring to FIGS. 5, 8 and 9, the preferred embodiment of collision avoidance system 450 includes transducer array 536a, which may for example, consist of 7 active ultrasonic ranging sensors $536_i$, where $i$ equals 1 to 7, with individual 30 degree beam widths, spaced 15 degrees apart in an arc around the front of mobile robot 18, as shown in FIG. 6. Processor 532 receives commands from local processor 402 and is operably coupled to multiplexer 534a having outputs that selectively and sequentially activate transducers $536_i$ in accordance with instructions provided by processor 532.

The details of multiplexer 534a are illustrated generally in FIGS. 8 and 9. The seven ultrasonic transducers $536_i$ are interfaced to ultrasonic ranging module 548 through 12-channel multiplexer 534a, in such a way that only one transducer, $536_i$, is fired at a time. The ultrasonic ranging module 548 may be a "Texas Instruments" ranging module, Model No. SN28827, as is well known. The heart of multiplexer 534a is a 4067 analog switch shown in FIG. 4. Processor 532 thus "sees" only one transducer $536_i$ at a time through ranging module 548 and multiplexer 534a, and the software of processor 532 merely executes in a loop, each time incrementing the index which thus enables a specific transducer $536_i$ of transducer array 536a.

Ultrasonic ranging module 548, if implemented with Polaroid Model No. SN28827, is an active time-of-flight device developed for automatic camera focusing, and determines the range to target by measuring elapsed time between the transmission of a "chirp" of pulses and the detected echo. The "chirp" is of one millisecond duration and consists of four discrete frequencies transmitted back-to-back: 8 cycles at 60 kHz, 8 cycles at 56 kHz, 16 cycles at 52.5 kHz, and 24 cycles at 49.41 kHz.

To simplify the circuitry involved, all timing and time-to-distance conversions are done in software on processor 532. Three control lines are involved in the interface of the ultrasonic circuit board 548 to processor 532. The first of these, referred to as VSW, initiates operation when brought high to +5 volts. A second line labelled XLOG signals the start of pulse transmission, while the line labelled MFLOG indicates detection of the first echo. Processor 532 must therefore send VSW high, monitor the state of XLOG and commence timing when transmission begins (approximately 5 milliseconds later), and then poll MFLOG until an echo is detected or sufficient time elapses to indicate there is no echo.

Four input/output (I/O) lines from processing unit 532 handle the switching function of ultrasonic transducers 5361$_i$ by activating a 4067 analog switch 544. The binary number placed on these I/O lines by the central processing unit 532 determines which channel is selected by switch 544; all other channels assume a high impedance state. Referring to FIG. 9, each of the relays 576 and its associated driver transistor 572 (illustrated in FIG. 8 as Detail A) is substantially identical. Relay driver transistor 572 is biased into conduction by current limiting resistor 543 via the active channel of analog switch 544 in such a fashion such that only one transistor 572 per switch 544 is conducting at any given time, as determined by the binary number present at the outputs of buffers 537, 538, 540, and 542. This conducting transistor 572 sinks current through its associated relay coil of relay 576, closing the contacts of relay 576. This action causes one of the transducers in array 536 to be connected to and hence driven by the ultrasonic ranging module 548, when ultrasonic ranging module 548 is activated by central processing unit 532 as described below.

Three I/O lines carry the logic inputs to processor 532 from the ranging module 548 for XLOG and MFLOG, and from processor 532 to the ranging module 548 for VSW. Non-inverting buffer 568 is used to trigger switching transistor 562 upon command from central processing unit 532 to initiate the firing sequence of ranging module 548. Resistors 558 and 560 along with transistor 556 form an inverting buffer for the XLOG signal which indicates the actual start of pulse transmission. Resistors 552 and 554 along with transistor 550 form an inverting buffer for the MFLOG signal which indicates detection of the echo. A final I/O line from processor 532 activates power switch 533, shown in FIG. 5, to power down the circuitry when not in use to save battery power.

A second parallel port on processor 532 is used to receive commands from local processor 402 which tell processor 532 to power up the ranging units, and then, which sensors to sequentially activate. Commands may be in the form of an eight-bit binary number represented in hexadecimal format, where the upper nibble represents the starting ID and the lower nibble the ending ID for the sequence. For example, the command $17 can be used to activate and take ranges using sensors #1 through #7 sequentially. Each time through the loop, upon completion of the sequence, the stored ranges are transmitted up the hierarchy to the local processor 402 over an RS-232 serial link, with appropriate handshaking. The sequence is repeated in similar fashion until such time as the local processor 402 sends a new command down, or advises central processing unit 532 to power down the ranging subsystem with the special command $FF.

Figure 10:
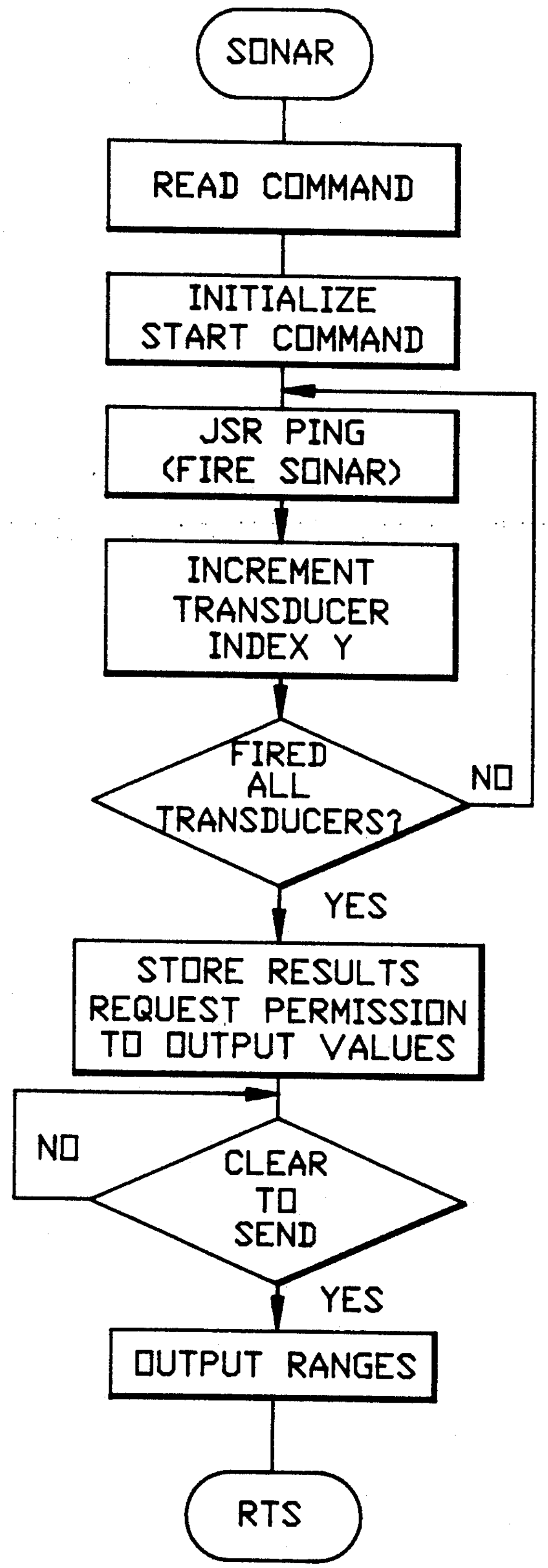
FIG. 10 are flowcharts of the function of the controlling processor associated with the sonar system of the present invention.
Figure 11:
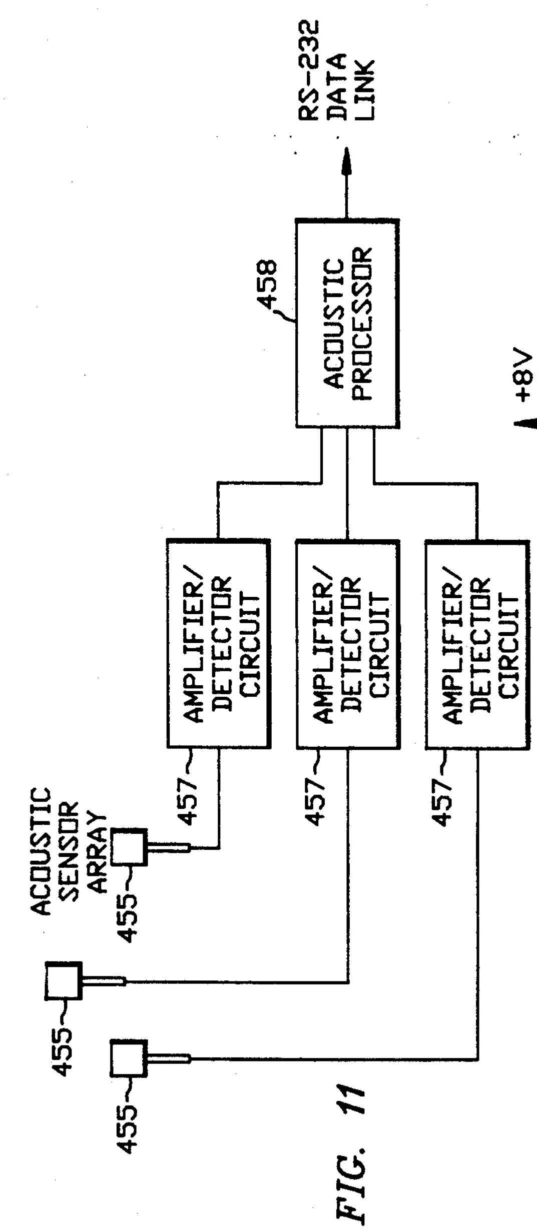
FIG. 11 is a block diagram of the acoustic detection array.
Figure 12:
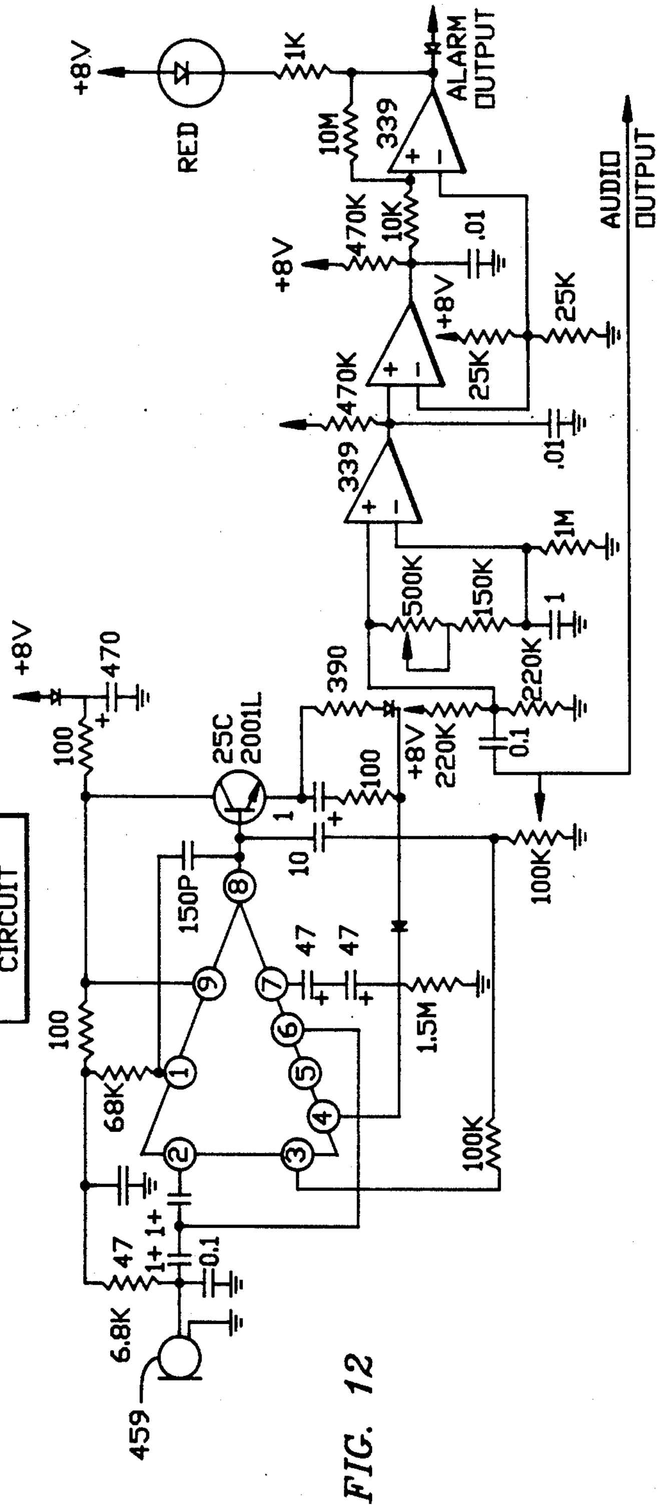
FIG. 12 is schematic diagram of the amplifier/detector circuit of the acoustic detection array.

The software of processor 532 may, by way of example, be structured as shown in FIG. 10. When energized by the local processor 402, processor 532 does a power-on reset, initializes all ports and registers, and then waits for a command. When a command is latched into the I/O port, a flag is set automatically that alerts processor 532, which then reads the command and determines the starting and ending identities of the transducers 536$_i$ to be sequentially activated. The interface circuitry and ranging units are then powered up, via switch 533 (FIG. 5) and the Y Register is set to the value of the first transducer to be fired.

Referring to FIG. 10 and continuing the example, Subroutine PING then is called, which enables the particular channel of analog switch 544 dictated by the contents of the Y Register. The VSW control line is sent high, which initiates operation of the ranging module 548 with the selected transducer. The software then watches the multiplexer output XLOG for indication of pulse transmission, before initiating the timing sequence. The contents of the timing counter, representing elapsed time, can be used to calculate range to the target. If this value ever exceeds the maximum specified range of the subsystem, the software will exit the loop, otherwise the counter runs until MFLOG is observed to go high, indicating echo detection. Upon exit from the timing loop, the range value for that particular transducer is saved in indexed storage, and Subroutine PING returns to the main program.

The Y Register is then incremented to enable the next ranging module in the sequence, and Subroutine PING is called again as before. This process is repeated until the Y Register equals the value of the ending index, signifying that all transducers in the sequence specified by the local processor 402 have been activated individually. Processor 532 then requests permission from the local processor 402 to transmit all the stored range values via the RS-232 serial link. When acknowledged, the ranges are sequentially dumped out the serial interface and placed by the local processor 402 in Page Zero indexed storage. Upon completion, processor 532 checks to see if a new command has been sent down altering the ranging sequence, and then repeats the process using the appropriate starting and ending indexes. Thus the software runs continuously in a repetitive fashion, sequentially activating the specified ranging modules, converting elapsed time to distance, storing the individual results, and then finally transmitting all range data at once to the local processor 402, which is thus freed from all associated overhead. Securitv Sensor System Referring to FIGS. 4 and 6, security sensor system 19 is mounted to propulsion module 416 and includes a multiplicity of different types of sensors capable f detecting perturbations within the secured environment of the type associated with an intrusion. In the preferred embodiment, sensor system 19 includes acoustical detection system 19*a*, vibration sensor 19*b*, infrared motion detector system 19*c*, microwave motion detector system 19*d*, optical motion detector system 19*e*, ultrasonic detector system 19*f*, video motion detector system 12*g*$_1$, and acoustical monitoring system 19*i*. The outputs of these sensor are all provided to local processor 402 and then ultimately to host computer 14 which processes the information provided by the various sensors. Video camera 12*g*$_1$ is mounted on head positioning servo 19*j* which is controlled by host computer 14 by techniques well known by those skilled in this art. Host computer 14 provides control signals to head positioning servo 19*j* in order to adjust the visual field of view of video camera 12*g*$_1$, based on the perceived threat location, as discussed further herein. The outputs of acoustical monitoring microphone 19*i* and video camera 12*g*$_1$ are provided to video transmitter 20*b*$_2$.

Ultrasonic Motion Detection System

Ultrasonic motion detection system 19*f* may be used to scan the environment in which mobile robot 18 operates in order to identify a potential intrusion through changes in measured target distances as seen by one or more sensors in the 24-element array. The system creates a reference template, which consists of the two most frequently observed range values for each of the individual sensors in the array, and then compares subsequent readings to this template. The presence of an intruder within the system field of view will result in a range value which does not agree with the two possibilities recorded earlier in the reference template. The new range reading will correspond to the distance to the intruder, and the index (position) of the affected sensor within the 360-degree array will provide a relative bearing, which is then used by the host computer to plot the position of the suspected intruder on the map display.

Referring to FIGS. 5, 8 and 9, ultrasonic motion detection system 19*f* includes processor 532, multiplexers 534*b* and 534*c*, and transducer arrays 536*b* and 536*c*. By way of example, transducer arrays 536*b* and 536*c* each may include twelve ultrasonic transducers which are mounted in a 360 degree circular pattern around the top of mobile robot 18 as shown in FIG. 6. For purposes of reference, the twelve ultrasonic transducers of array 536*b* may be referenced as ultrasonic transducers $536_i$, where i=1 to 12; and the twelve ultrasonic transducers of array 536*c* may be referenced as ultrasonic transducers $536_i$, where i=13 to 24. All ultrasonic transducers $536_i$ may be of an identical type.

Ultrasonic motion detection system 19*f* performs ranging in a manner that is virtually identical to the way in which collision avoidance system 450 operates. The only difference between the hardware implementations of the two systems is that ultrasonic detection system 19*f* includes two multiplexers and 24 ultrasonic transducers, whereas collision avoidance system 450 employs one multiplexer and seven ultrasonic transducers. Therefore, it is to be understood that the descriptions of multiplexer 534*a* and transducer array 536*a*, illustrated and described with respect to FIGS. 5, 8 and 9, also apply to multiplexers 534*b* and 534*c*, and to transducer arrays 536*b* and 536*c*. Processor 532 interacts with multiplexers 534*b* and 534*c* in the same manner as processor 532 interacted with multiplexer 534*a*. Furthermore, the data generated by ultrasonic detection system 19*f* is provided through local processor 402 to host computer 14.

Optical Motion Detection System

Optical motion detection system 19*e* may be of any suitable type of commercially available optical motion detector. An example of an optical motion detectors suitable for use in the present invention is that described in U.S. Pat. No. 4,902,887, "Optical Motion Detector Detecting Visible And Near Infrared Light", incorporated herein by reference. Another type of optical motion detector suitable for use in the present invention is manufactured by Sprague, Model No. ULN-2232A.

Infrared Motion Detector System

Infrared motion detector system 19*c* is, by way of example, similar in operation to the Sprague Model No. ULN-2232A, identified above, except that a wavelength of 10 micrometers is used. Examples of infrared motion detectors suitable for employment in the present invention include the passive infrared sensing system manufactured by Eltec Instruments, Inc., Model No.'s 822, 826B and 4192-3, as well as passive infrared detectors manufactured by Linear Corporation, Series 6000, 8000, and 9000.

Microwave Motion Detection System

Microwave motions detectors such as employed in microwave motion detector system 19*d* are well known. Such detectors rely on the Doppler shift introduced by a moving target to sense the relative motion of an intruder. The electromagnetic energy associated with such detectors can penetrate hollow walls and doorways thereby allowing the sensor to "see" into adjoining rooms in certain circumstances. This operating feature permits the sensor to check locked office spaces and warehouses without the need for actual entry into such places.

Acoustical Monitoring Microphone

Acoustical monitoring microphone 19*i* is described in U.S. Pat. No. 4,857,912, "Intelligent Security Assessment System", column 6, lines 30–41, incorporated herein by reference.

Vibration Sensor

Vibration sensor 19*b* may be implemented similarly to acoustical monitoring microphone 19*i* except that a piezoelectric transducer, mechanically coupled to the structure of the robot 18, is used instead of a microphone such that the vibrations in the floor of the secured environment such as ma be caused by a potential intruder are coupled to the detection unit.

Acoustical Detection System

Acoustical detection system 19*a* is described with reference to FIGS. 4, 6, 11 and 12. This system provides bearing information to the source of detected noise and includes three acoustic sensor elements configured as shown in passive array 455, each operably coupled to an amplifier/detector circuit 457, shown in detail in FIG. 11. The outputs of the three amplifier/detector circuits are provided to acoustic processor 458 which may be a 6502 based, single board computer. Array 455 consists of three omnidirectional microphones 459 symmetrically oriented 120 degrees apart, and separated by a distance d, not shown. This system is mounted on top of robot 18 as shown in FIGS. 4 and 6. Sound traveling across array 455 triggers all three microphones 459 in a specific sequence dependent on the relative position of the acoustical source with respect to an array 455. Because of the symmetrical orientation of microphones 459, the firing sequence of comparators 339 associated with each microphone 459 is used to determine the bearing to the acoustical source through simple triangulation. Such passive acoustical surveillance schemes are well known by those skilled in this technology.

Video Motion Detection System

Video motion detection system 19*g* includes video surveillance camera 19*h* and video motion detection system 19*g*. The orientation of video surveillance camera 19*h* is controlled by head positioning servo 19*j*. Head positioning servos suitable for use in the present invention are well known and commercially available. Video motion detection system 19*g* is preferably of the type described in application Ser. No. 07/486,465, "Reconfigurable Video Line Digitizer And Method For Storing Predetermined Lines Of A Composite Video Signal", filed Feb. 28, 1990, incorporated herein by reference. Video camera 19*h* is further positioned to bear on the intruder using refined analysis by the output of video motion detection system 19*g* if the intruder's presence is detected by video motion analysis. Video motion detection system 19g is temporarily disabled as head positioning servo 19j pans to reposition camera 19h, and is re-enabled once the camera stabilizes. Software which provides the video motion analysis used to orient camera 19h is provided in Appendix 3, written by way of example, in 6502 assembly language.

Host Computer

Host computer 14 performs the functions of building and maintaining the "world model", a mathematical representation of the operating environment; performing path planning to generate the initial route of mobile robot 18; rerouting mobile robot 18 to avoid obstacles in its path; formulating a composite intrusion threat score based on data provided by fixed sensors 12 and mobile security sensor system 19; and providing an operator interface. Host computer 14 may be, by way of example, a 16-bit Intel 80386-based personal computer. Host computer 14 is programmed in a high level language such as "C". By way of example, the more significant source code program listings of software required to operate the present invention are described below. These and other software implemented in the present invention are identified in Appendix 1, herein. Program listings for software identified in Appendix 1 are provided in Appendix 2, herein.

World Model

Providing the capability of supporting autonomous movement of a mobile robot involves the acquisition of information regarding ranges and bearings to nearby objects, and the subsequent interpretation of that data in building and maintaining the world model. The world map is a two-dimensional array of cells, where each cell in the array corresponds to a particular square having fixed dimensions in the region being mapped. Free space is indicated with a cell value of zero; a non-zero cell value indicates the presence of an object. The cell value represents the probability of a given square being occupied, which is useful when the precise location of an object is unknown.

Figure 13:
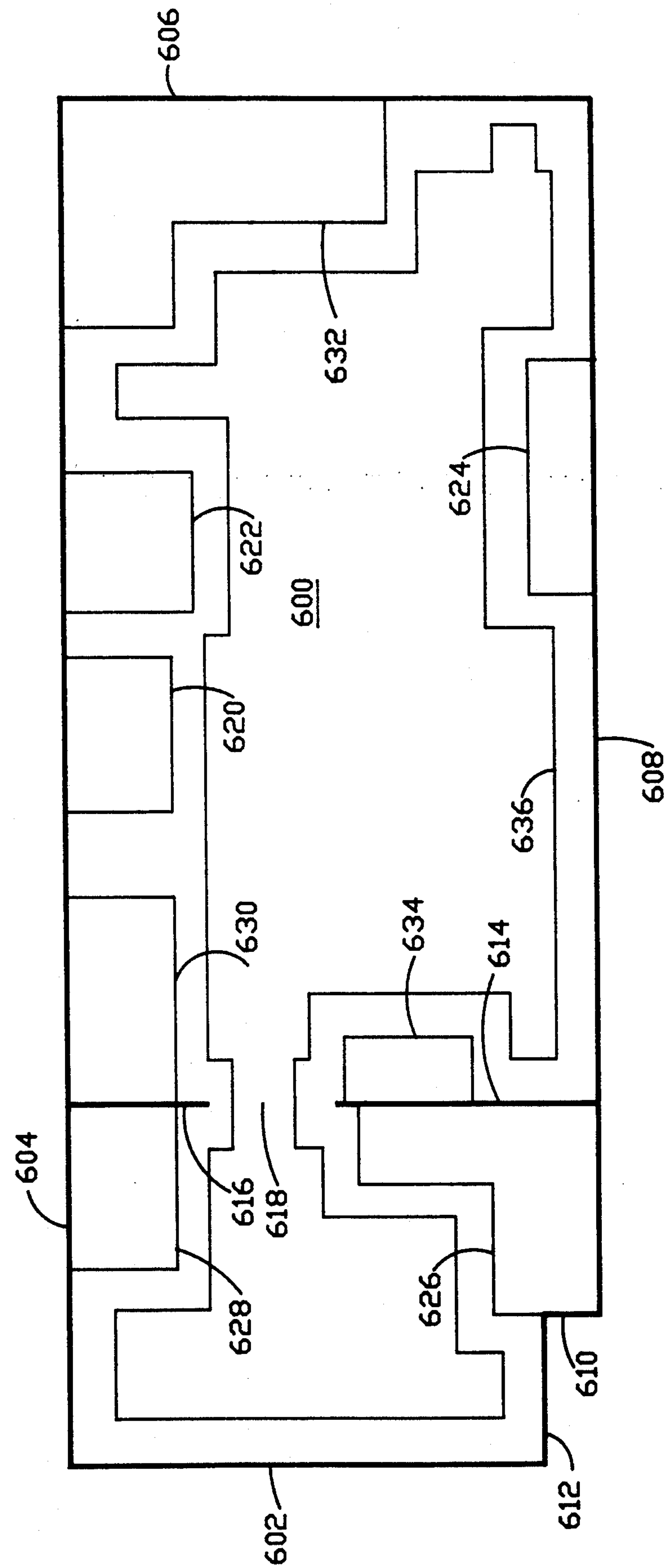
FIG. 13 is an example of an environment in which the present invention may operate.

The acquisition of range data is accomplished by use of collision avoidance system 450. Target distance information is ultimately provided to host computer 14 which assimilates the data into the world model while mobile robot 18 is moving. Effective interpretation and utilization of range data is critical to achieve a reasonably accurate representation of surrounding obstacles. By using a simplified probability scheme and range gating fixed arrays of sonar sensors, the mapping process can take place in real-time while mobile robot 18 is in motion. FIG. 13 is a plan view of an example of an operating environment 600, or "world," which for purposes of illustration, may be a two-room laboratory, where the perimeter of the environment is composed of wall segments 602, 604, 606, 608, 610, and 612. Furthermore, by way of example to illustrate how the world map is constructed, environment 600 may also include interior walls 614 and 616; doorway 618; book shelves 620 and 622; file cabinet 624; and tables 626, 628, 630, 632, and 634. The world map may be manually edited to add additional features, such as hidden lines, doorways, etc. Each object in the world model then is automatically "grown" by half the width of mobile robot 18 in order to model the mobile robot as a point during the Find-Path operation, described further within this section. This growth is represented by the outer perimeter 636 of operating environment 600.

When entering data from collision avoidance system 450, seven ultrasonic ranging transducers 536$_i$ (where i=1 to 7) in transducer array 536a are used, shown in FIGS. 5, 6 and 8. If a given transducer 536 return (echo) shows that an object is within five feet of array 536a, the cell at the indicated location of the return is incremented twice (up to a specified maximum). Also, the probability value assigned to each of the eight neighboring cells is incremented once, to partially take into account uncertainties arising from the 30-degree dispersion angle of the ultrasonic beam generated by array 536a.

In addition, each time a return is processed, all the cells within a cone, which may by way of example, be 10 degrees wide and five feet long (or less if an object appears within five feet), have their assigned values decremented by 1. This erodes objects from the world map that are no longer present and serves to refine the representation of existing objects as mobile robot 18 approaches. Objects are erased from the map at a slower rate than they are entered, so that the path of mobile robot 18 tends to err on the side of not intersecting obstructions.

Figure 14:
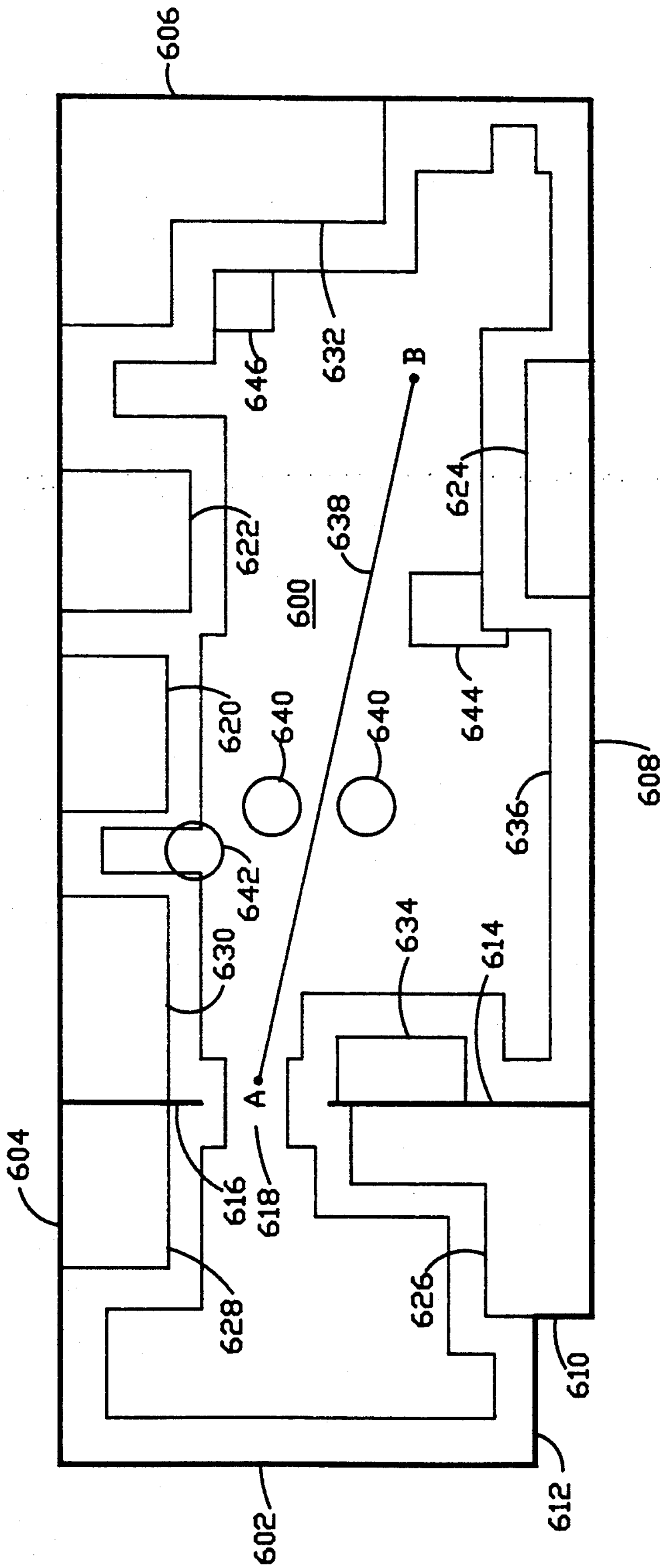
FIG. 14 illustrates a path and obstacles obstructing the path of the vehicle within the environment presented in FIG. 13.
Figure 15:
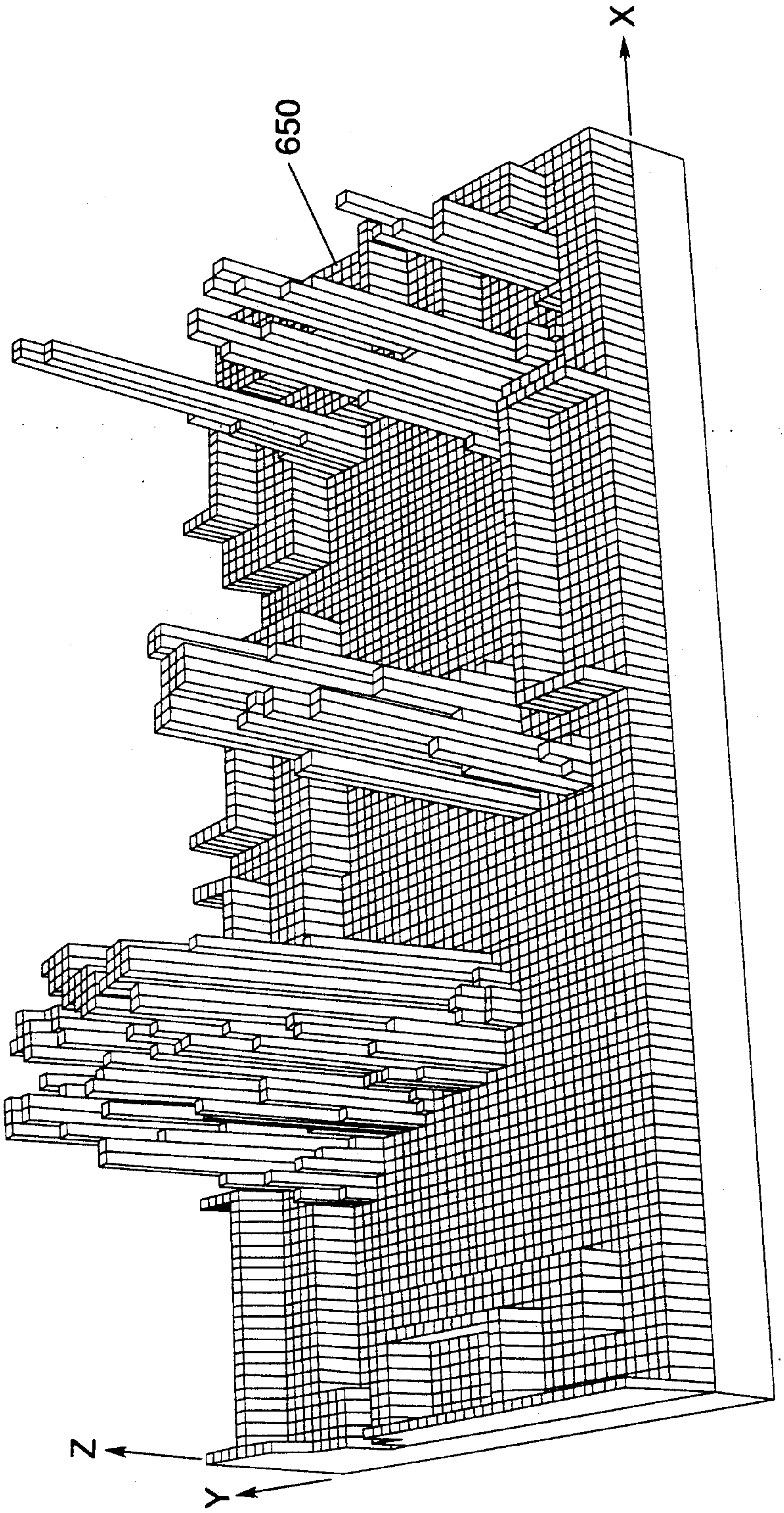
FIG. 15 is a three dimensional probability distribution plot showing the perceived location of nearby objects and obstacles within the environment illustrated in FIG. 14.

An example of how data provided by collision avoidance system 450 may be transformed into a mathematical model of one example of an operating environment, such as environment 600, is presented in FIG. 14, where a path 638 from point A to point B, along which mobile robot 18 (not shown) may be directed to follow, is obstructed by two obstacles 640. Other objects 642, 644, and 646 are also positioned within environment 600. A three dimensional probability distribution plot showing the perceived location of nearby objects in environment 600 is illustrated in FIG. 15. The floor area of environment area 600 is represented by cells ("nodes") 650. The probability that any particular cell is occupied by an object is proportional to the upward projection of any cell along the "Z" axis. Techniques for creating world maps of an operating environment or "motion area," suitable for use in the present invention are well known. The world map contains positional information about all the known objects in the environment.

One method for generating the initial world map is to download data into host computer 14, where the data represents the operating environment, and is obtained from CAD drawings such as AutoCAD, a designing program by which any drawing, such as a building floorplan can be reproduced in a microcomputer. A second method is to manually input data into the host computer where the data represents the coordinates of the features of the environment using the MAPEDIT.C subroutine (Appendix 1). A third method for generating the world map is to have mobile robot 18 travel along its anticipated routes and use its sonar system 440 to generate data regarding the features of the environment that are then provided to host computer 14. Also, a combination of all three methods may be employed to create or modify the world model.

The path planner operates on information stored in the world map to determine a route from the mobile robot's current position to its desired destination. The basic search algorithm begins by "expanding" the initial cell corresponding to the mobile robot's current position in the floor map, i.e., each unoccupied neighbor cell is added to the "expansion list." Then each cell on the expansion list is expanded. This process continues until the destination cell is placed on the expansion list, or the list becomes empty, in which case no path exists.

When a cell is placed on the expansion list, a value indicating the direction to the parent cell is stored in the map array. Once the destination cell has been reached, retracing the path consists of merely following the directional arrows back to the source. During this process, only those points representing a change in direction (an inflection point) are recorded. The entire path is completely specified by the straight line segments connecting these inflection points. Details of the path planner are presented below.

Path Planner

The path planner (See Appendix 1, PATHPLAN.C) is implemented as a set of algorithms running on host computer 14 which enables mobile robot 18 to be directed along a calculated path from the present position of mobile robot 18 to a different position, where the positions are defined by Cartesian coordinates. Implementation of the path planner is, by way of example, a modification of techniques taught in: Winston, Patrick Henry, *Artificial Intelligence,* Addison-Wesley, Reading, Mass., 1984. However, it is to be understood that the scope of the invention may include other implementations of a path planner than those specifically presented herein.

Figure 16:
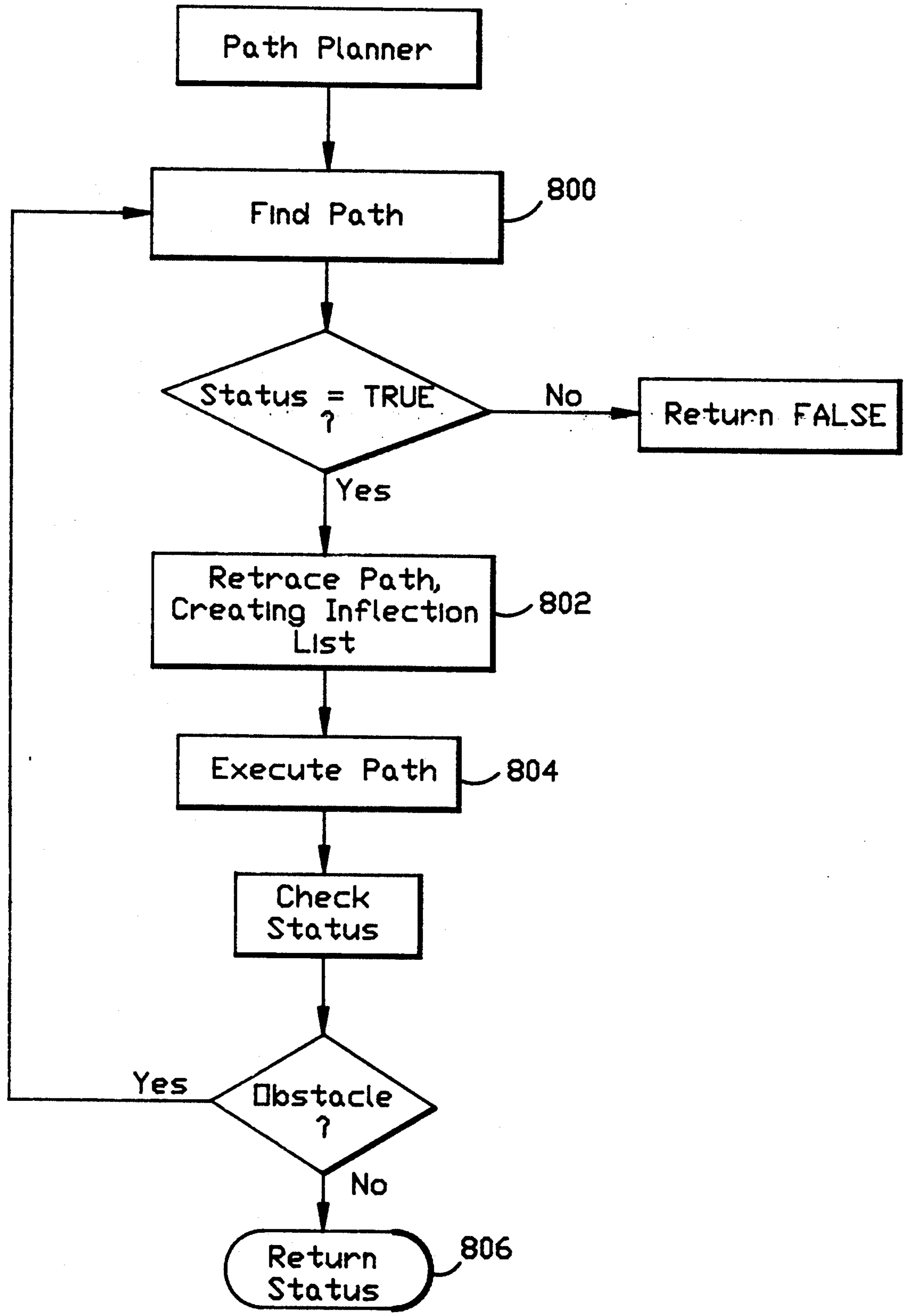
FIG. 16 is a flowchart of the Path (World) Planner program software.

There are four basic tasks the path planner must address in order to direct mobile robot 18 from point "A" to point "B". They are described immediately below with reference to FIG. 16:

1. Finding a path to the destination (point B), hereafter referred to as the "Find-Path" operation at step 800. If no path exists, then this operation returns a value of FALSE to the calling program.
2. Retracing (or backtracking) the path found by the above "Find-Path" operation (discussed more fully further herein) to create a list of straight-line segments describing the route from source to destination, where the source represents the present position (point A) of mobile robot 18. This operation is performed at step 802.
3. Creating the movement commands which are ultimately directed to propulsion module 416 via local processor 402 in order to execute the path. These operations are performed at step 804.
4. If the path is successfully executed, then the path planner program returns a "successful" status from step 806 to the calling program. Otherwise, the program returns to step 800 in order to plan a new path.

Inability of mobile robot 18 to reach its intended destination is usually attributable to obstacles or closed doorways blocking the route. In that case, the planner returns to Step 800 to try to find a different path, using the updated information now encoded in the model.

The path planner includes the following subroutines: Find-Path, Expansion, Backtracking, Path-Execution, Segment-Execution, and Sonar-Mapping. These subroutines are described below.

Find-Path Subroutine

Figure 17:
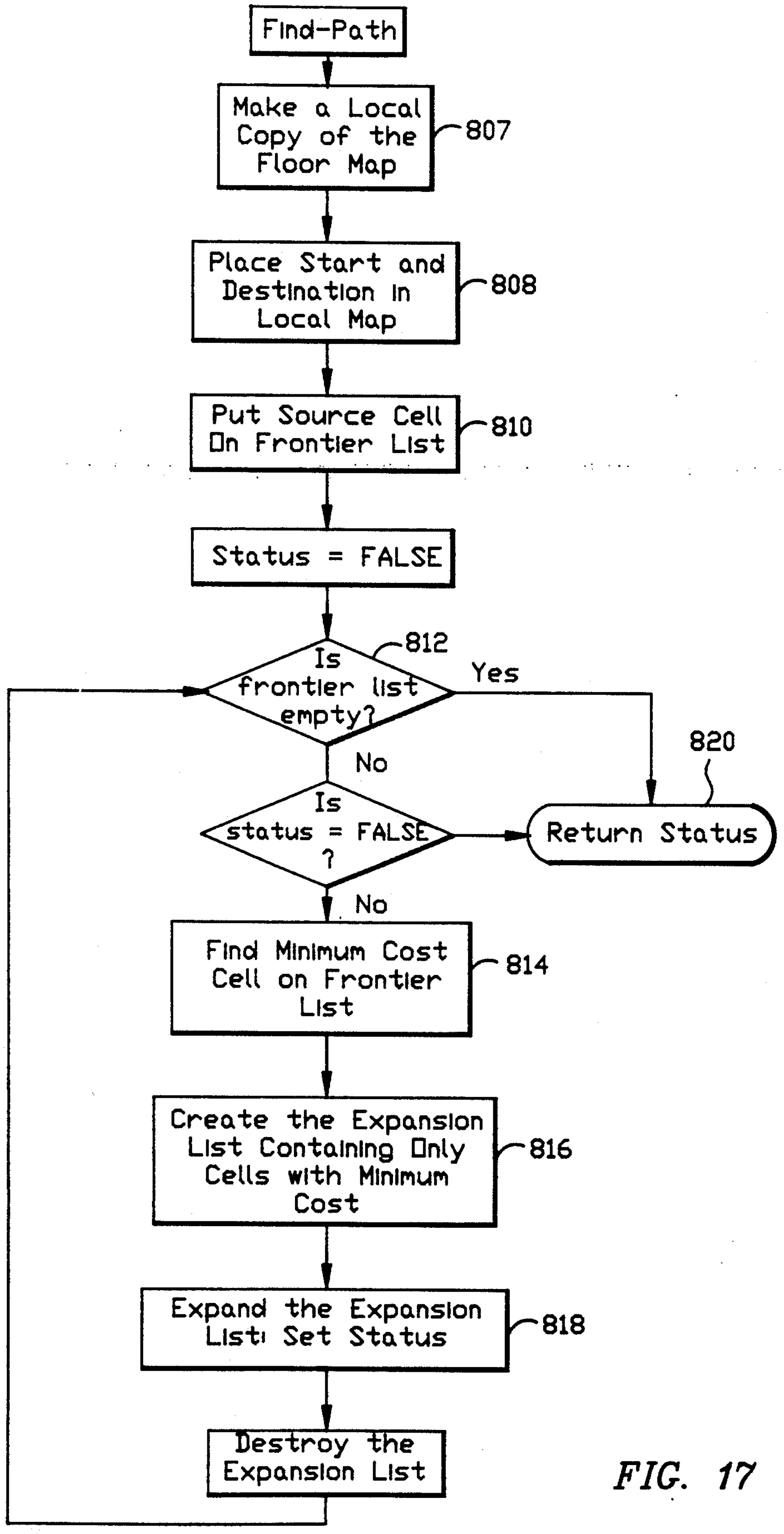
FIG. 17 is a flowchart of the Find-Path program software.

As mentioned above, the Find-Path subroutine at step 800 is a set of algorithms which implement a modification of an A* search which is described below with reference to FIG. 17. The A* search is a type of search technique which is well known by those skilled in this art and which is taught in: Winston, Patrick Henry, *Artificial Intelligence,* Addison-Welsley, Reading, Mass., 1984. In the Find-Path subroutine, a mathematical model of the operating environment, also referred to the world map, is provided to this subroutine at step 807. The environment is divided into a definite number of squares. The world map is implemented as a two dimensional array of memory locations, and contains a byte for each square in the environment, such as a room, where the size of a square can range from one square inch up to several square feet, depending on the desired map resolution and the size of the operating environment.

Next, at step 808 two special bytes are stored in this memory array which represents the world map. One byte indicates the present location ("START") of mobile robot 18; the second byte indicates the desired destination ("DEST"). During the A* search process, the host computer 14 looks for the floor cell containing the DEST byte and similarly, during the backtrack process, described below, the computer looks for the START byte.

Next, at step 810, information about the source cell (such as X-Y location, cost, distance traveled, etc.) is put onto a "frontier" list which is a list of points on the outer edge of the search envelope that are candidates for the "expansion" process, described more fully below. Putting the source cell on the frontier list "seeds" the path planner subroutine so that it has a cell to expand. A loop is then entered at step 812 that terminates only when there are no more cells on the frontier list or a path has been found. If the frontier list is empty, then no path is possible and the search fails.

The first step within the loop, at 814, is to find all the cells on the frontier list with minimum cost, and then put them on the expansion list at step 816. The "cost" of a cell is typically some computation of how "expensive" it is for mobile robot 18 to travel to the location represented by that particular cell. The actual cost function used in this implementation is described further herein.

Next, all the cells on the expansion list are expanded at step 818, as described more fully in the next section. If the destination cell is reached, a path has been found and the algorithm terminates with a solution and returns to the calling program from step 820. Otherwise, the loop continues with the new frontier list (updated by the expansion process).

Expansion Subroutine

Figure 18:
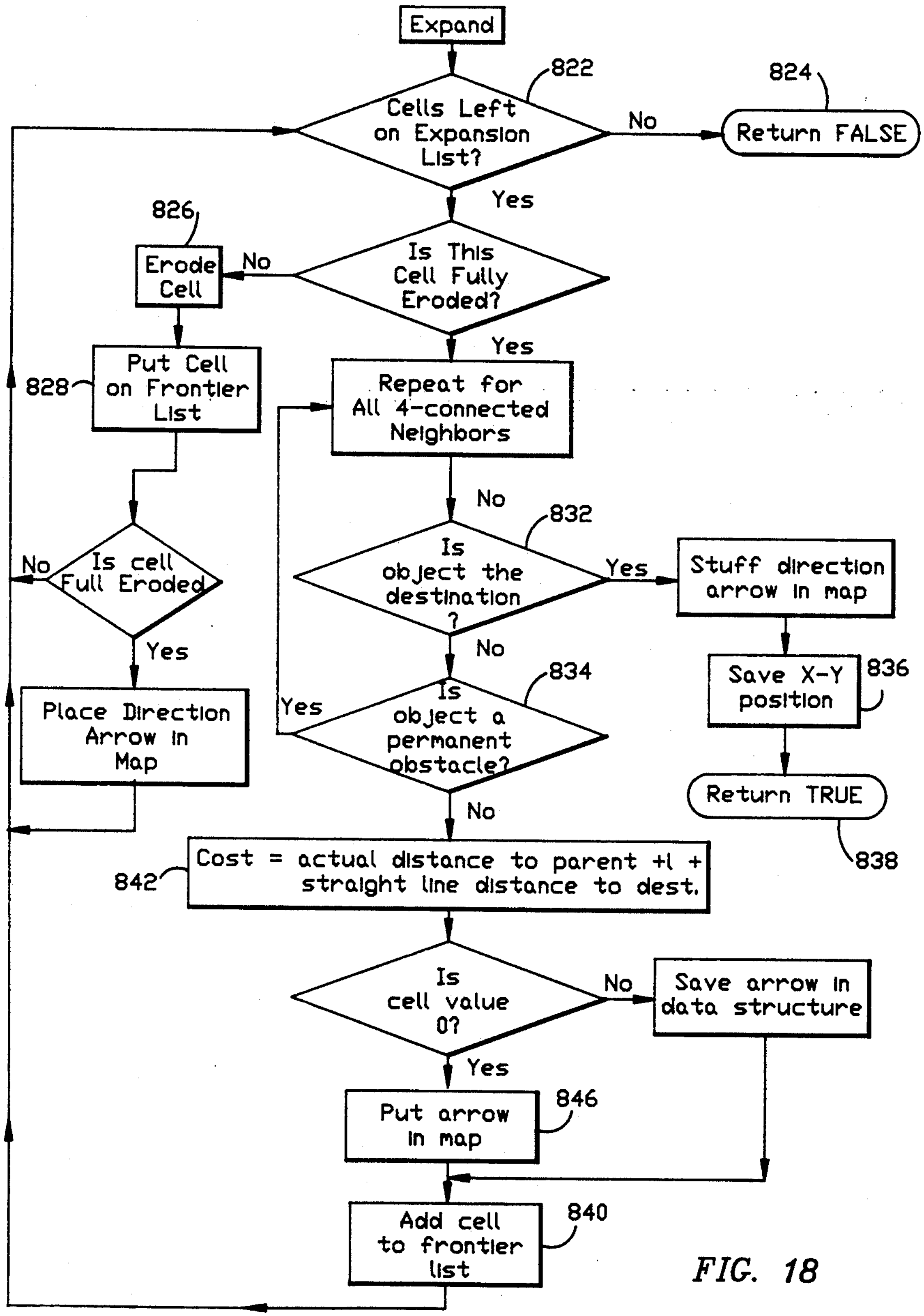
FIG. 18 is a flowchart of the Expand program software.

Referring to FIG. 18, the expansion process looks at all the neighbor cells of each cell on the expansion list. Each neighbor cell that is unoccupied and not on either the expansion or frontier list is placed on the frontier list. The details of this are provided below.

A loop is entered at step 822 that terminates when all the cells on the current expansion list have been expanded. If no cells are left on the list, then a value of FALSE is returned from step 824 to the path planner at step 818, indicating that the destination was not reached during the current expansion and that further searching of the updated frontier list is necessary.

The next cell (or first cell if this is the first time through the loop beginning at step 822) on the expansion list is selected. First, a check is made to see if this cell can be expanded. The only cells that can be expanded are those whose corresponding byte in the floor map array is equal to zero. If the value is not zero, this cell may be occupied by an obstacle which has been detected by the robot's sensors. If so, then the value is decremented at step 826 and the cell is put back onto the frontier list at step 828 to be expanded later. This technique enables mobile robot 18 to travel a clear path in preference to a cluttered path, if a clear one exists. If no uncluttered path is found, mobile robot 18 may still be able to traverse the cluttered path. The capability of the expansion subroutine to determine alternative paths enables the robot to find a path even if sonar data provided by sonar system 418 is somewhat faulty.

If the contents of the current floor map cell are zero, then the cell can be expanded. Each of the cell's neighbors may be examined at steps 832, or 834 to see if any of the neighbors are occupied or unoccupied. "Neighbor" in this case refers to the four cells immediately adjacent to the current cell, i.e., located to the north, east, south and west of the current cell. These four "neighbors" may also be referred to as the "4-connected" neighbors. If the neighbor contains the special byte "DEST," then a path has been found at step 832, the X-Y location of the cell is saved at step 836, and a "TRUE" status is returned from step 838 to step 818 of the Find-Path subroutine. Otherwise, if the neighbor cell is unoccupied it is placed on the frontier list at step 840. If it is occupied, it is ignored.

Additionally, each cell has a "cost" associated with it. As in a typical A* search, at step 842, the cost is set equal to the distance traveled from the initial position of mobile robot 18 in order to get to the cell corresponding to the present location of mobile robot 18, plus the straight line distance to the destination cell. This is guaranteed to be less than or equal to the actual total distance from the source cell (present location) to the destination. This particular cost function tends to make the search expand in a direction towards the intended destination, thereby decreasing the search time.

Finally, "arrow" information, used by the backtracking subroutine, described below, is stored in the floor map cell corresponding to the current neighbor at step 846. An "arrow" is one of four values indicating direction, i.e., north, south, east, and west. The arrow indicates the direction to the neighbor's parent, which is the cell currently being expanded.

Control is returned from step 840 to the top of the loop at step 822.

Backtracking Subroutine

Referring to FIG. 19, backtracking (also called retracing or segmentation) is a subroutine that creates a list of path segments which describe the desired path, based on the contents of the current floor map following the Find-Path operation, as described above. The procedure is very simple. Starting with the destination cell, the steps presented below are performed:

1. Follow the arrow in the current cell to the next cell. Make the new cell the current cell.
2. Return to the program that called the path planner if the new cell contains the value START, indicating that a path to the destination has been found.
3. Return to step 1, above, if the direction arrow of the current cell is the same as the direction arrow of the previous cell.
4. Add the current X-Y coordinate to the path segment list and update the segment counter.

The output of the backtracking subroutine is a list of X-Y coordinates describing the "waypoints" through which mobile robot 18 must pass in order for the mobile robot 18 to reach the ultimate destination.

Path Execution Subroutine

Referring to FIG. 20, once a path segment list has been found, mobile robot 18 must then physically traverse the calculated path to reach the destination. Each segment of the path is executed individually in a loop beginning at step 860, whereby this process consists of having mobile robot 18 turn to the required heading and then having it travel in a straight line for a predetermined distance.

Control is passed to the segment execution routine at step 870. A status condition is returned from step 871 to step 804 of the path planner, where the status condition indicates whether or not mobile robot 18 was able to successfully execute the segment. If it was successful, then the subroutine proceeds to step 860 where the next path segment (if any) is executed. Otherwise, an error condition is returned from step 871 to step 804 of the path planner.

Segment-Execution Subroutine

Referring to FIG. 21, during the execution of a subroutine referred to as "Segment-Execution," the planner performs a number of tasks. First, step 872 sends a command to propulsion module 416 to begin moving forward for a predetermined distance required by the path segment. Next, "Segment-Execution" enters a loop at step 873 which looks for status packets sent back by local processor 402. These consist of one or more of the following:

1. A "move complete" report, indicating that propulsion module 416 has finished moving the desired distance. If this occurs, an indication of successful status is returned by step 874 to step 870, illustrated in FIG. 20.
2. An "obstacle" report, indicating that propulsion module 416 has stopped because an obstacle detected by collision avoidance system 450 impedes its path is returned by step 875 to step 870, illustrated in FIG. 20.
3. A "dead-reckoning" update. The present dead-reckoned position of mobile robot 18 is updated in the world map at step 876.
4. A collision avoidance sonar packet is provided when sonar data is received by local processor 402, at which time the "sonar-mapping" subroutine, represented by the flowchart of FIG. 22, is invoked and the current representation of the world map is updated at step 878.

The loop beginning at step 873 is repeated until either of the steps 874 or 875 within the loop is executed.

Sonar-Mapping Subroutine

Referring to FIG. 22 map sonar is a subroutine that receives the range information obtained by collision avoidance system 450 which then is used to update the local map. Although in the preferred embodiment, range information is obtained by use of ultrasonic transducers **536*i***, other types of sensors could also be used to acquire such information, as for example, laser or optical range finders.

One of the primary sources of errors with ultrasonic sonars is specular reflection. In order to reduce the number of erroneous sensor readings due to these types of errors, all detected ranges greater than specified distance, which may for example, be five feet, are ignored. Whenever a range reading is five feet or less, the value of the cell at the indicated range and bearing is incremented twice (up to some maximum, as for example, 16), and each of its 8-connected neighbors (all 4-connected neighbors plus each of the diagonals) is incremented once.

During the execution of the map sonar subroutine, sonar range returns or packets provided by processor 532 through local processor 402 to host computer 14 are processed and mapped. The sonar packets are decoded at step 880. Then a loop is entered at step 881 that continues until each range has been processed. At step 882, the range is compared with five feet. If the range is greater than five feet, then processing proceeds to step 884. Otherwise, a transient obstacle will be added to the ma at step 883 by incrementing the appropriate cell (indicated by the current range and bearing) by two, and each of the eight surrounding cells by one. This is the manner in which transient obstacles are added to the map. In step 884, all of the cells in a ten degree cone emanating from the location of the transducer out to the range return or four feet, whichever is less, are decremented by one. In this way, transient obstacles that are no longer detected are gradually erased from the map.

Collision Avoidance

For a mobile robot to be truly autonomous, it must cope with the classic problem of avoiding an unexpected, unmapped obstacle. In the present invention, all collision avoidance sensor information is statistically represented in the world map, based on the number of times that an object was detected at a given cell location [See APPENDIX 1: OA.C and CA.C]. Conversely, when a previously modeled object is no longer detected at its original position, the probability of occupancy for the associated cell is decreased; if the probability is reduced to zero, the cell is again regarded as free space. Transient objects are added to the world map as they are encountered, and subsequently removed from the model later if no longer detected at the same location. Since previously encountered obstacles are recorded in the world map, the mobile robot can avoid them at the planning stage rather than during path execution.

A sample map created in this fashion is depicted in FIG. 15. Free space is represented by an array value of zero and is shown in by the plane coincident with the X-Y plane.

Data Fusion System

Figure 23:
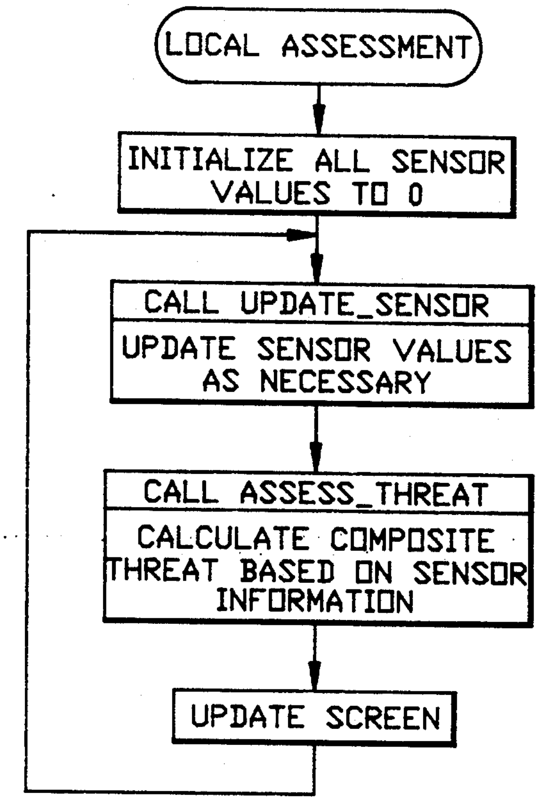
FIG. 23 is a flowchart of the Local Assessment Software.

The data fusion system, implemented in software operating in host computer 14, integrates the outputs of fixed security sensor system 12 and mobile security sensor system 19, to obtain a higher confidence solution, and to ensure that the motions of mobile robots 18 through the secured environment do not trigger a system alarm. Referring to FIG. 23, the individual security sensor values are updated as new sensor data becomes available, whereupon a composite threat score is calculated based on the updated sensor data. Data from both fixed and mobile sensors is used to calculate this global composite threat score from individual sensor weightings in order to achieve a high probability of detection with a corresponding low nuisance alarm rate.

The data fusion system "knows" at all times where each robot 18 is located, the zones of coverage for its onboard sensor system 19, and the resultant effect of its presence or motion on that portion of fixed sensor system 12 viewing the same area. This information is incorporated into the world model, representing the area under surveillance, as discussed in greater detail below.

The world model consists of a number of bit-mapped parallel arrays, or layers, each indexed to an absolute X-Y grid representing the floor plan of the secured area (See Appendix 1: OA.C, MAPEDIT.C, and MAKEMAP.C). The floor plan is typically divided up into a number of subset floor plans to achieve a realistically sized model in order to facilitate near realtime manipulation of the encoded information. For any given subset floor plan, the first layer is devoted to X-Y positional information which is used for navigation and collision avoidance, as previously described.

Two additional parallel arrays, or layers, are assigned to the world model and are used to represent the areas of coverage of: (1) the fixed installation security sensors for that portion of the floor plan in which robot 18 is positioned, and (2) the mobile security sensors mounted on robot 18. These two layers are referred to as the "fixed sensor coverage layer", and the "mobile sensor coverage layer".

Since the purpose of robot 18 is to patrol the secured environment, its position and orientation must be considered when calculating the absolute world map representations of the areas within the range of detection of mobile sensor system 19. The representations must be translated and rotated in accordance with the robot's motion. The resulting mobile layer coverage zones can then be fused with those from the fixed sensor layer for those sensors which are triggered, resulting in a "fixed-mobile" correlation factor representative of the maximum correlation between fixed and mobile sensors. This factor is used to calculate the global composite threat.

Figure 33:
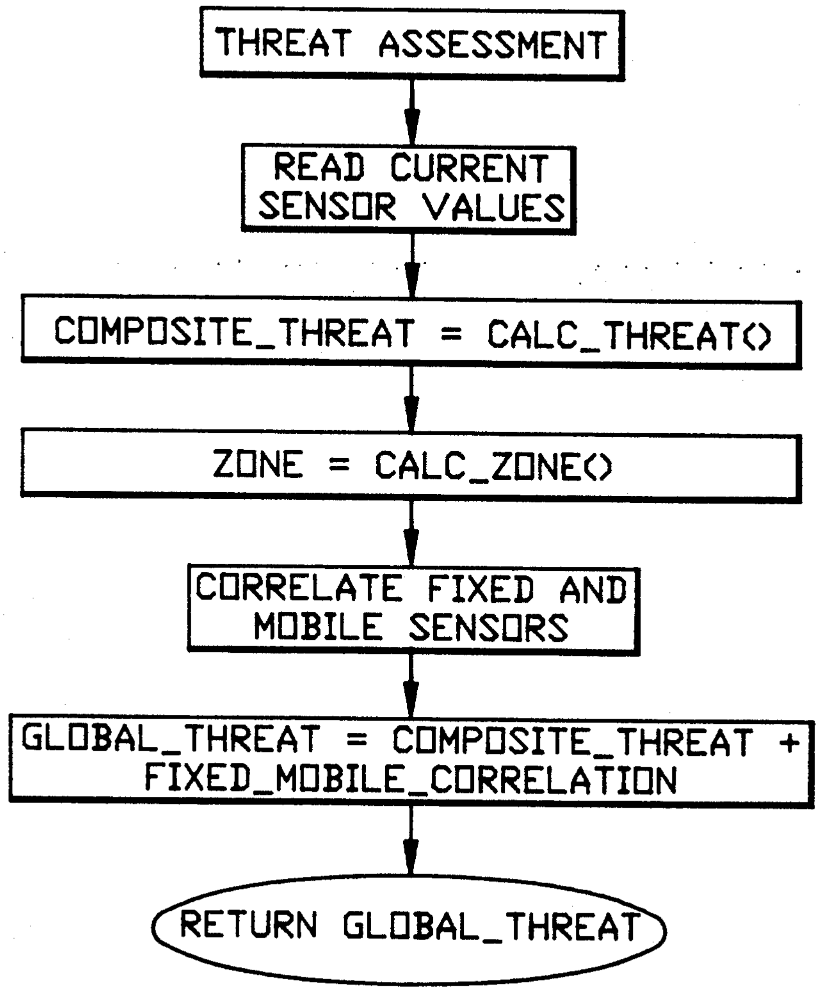
FIG. 33 is a flowchart of software for performing threat assessment.

In summary, the data fusion system (implemented in software) monitors the instantaneous state of each of the fixed and mobile security sensors to determine the presence or absence of an intruder. Local Security Assessment software implemented in local processor 402 onboard robot 18, performs some "local" cross correlation of the outputs on sensor system 19. Results are transmitted over RF link 20$b_1$ to host computer 14 for further analysis. A higher level ("global") correlation, implemented in host computer 14, then accounts for the outputs of fixed sensor system 12, as well as the outputs from however many mobile robots 18 are operating in the area. This higher level correlation is referred to as Global Security Assessment (See FIG. 33). Each of these assessment functions, local and global, are discussed in greater detail below.

Local Security Assessment

As previously stated, a number of different types of sensors are preferably used onboard each mobile robot 18 (as for example, infrared, microwave, ultrasonic, optical, video, sound, and vibration) to both increase the likelihood of detection and decrease the frequency of nuisance alarms. FIG. 23 illustrates, by way of example, a sample display 890 of video monitor 28 exhibiting the status of the various sensors. Techniques for producing such a display are well known by those skilled in this field of technology. The upper half of display 890 presents the state of each of the mobile sensors, the bearing to a possible intruder, and the current alarm state. Sensors with a darkened background are temporarily disabled or unavailable. The lower half of display 890 is used for displaying robot status information and current environmental conditions.

Figure 31:
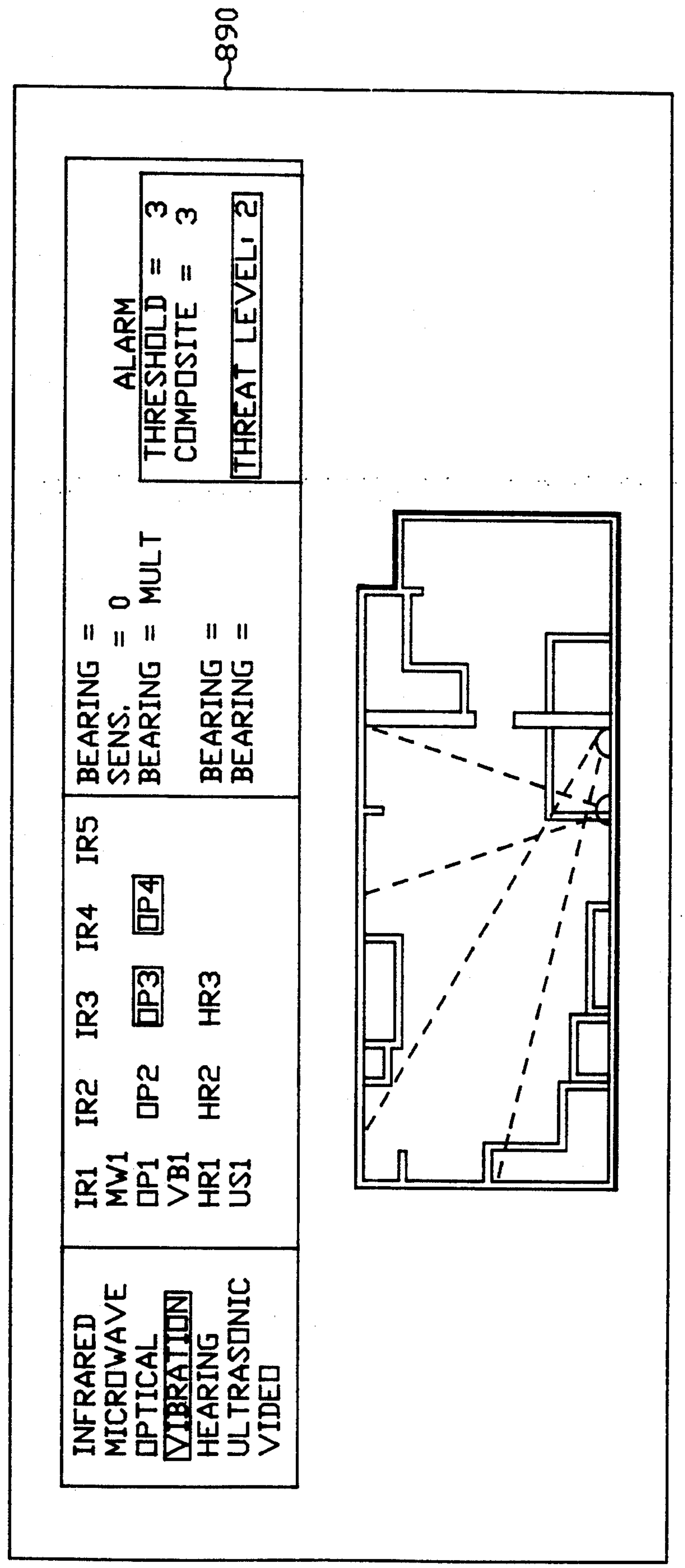
FIG. 31 illustrates a plan view of the secured environment as presented on a video display and sensor output data.

The motion detection sensors (depicted in the upper half of the display) are grouped into (24) zones. Each zone contains several different types of sensors. Local Security Assessment Software (Section 4.11 herein) performs a summation of weighted scores for all sensors within a particular zone, and calculates a composite threat score (Shown in the upper right of display 890; Refer to FIG. 31) which is proportional to the perceived threat presence. This software is implemented in host computer 14, and presented by way of example in Appendix 1.

The Local Security Assessment Software detects patterns, such as purposeful motion across adjacent sensor coverage zones, and increases the associated composite threat accordingly. The system then activates and positions secondary verification sensors on the robot as needed. At the same time, the current alarm threshold is dynamically calculated, based on the number of sensor groups which are available, and other relevant conditions, such as ambient lighting, time of day, etc. The system classifies an alarm as an actual intrusion only when a complete evaluation has been performed using all sensor groups, and the resulting composite threat score exceeds the alarm threshold.

Figure 25:
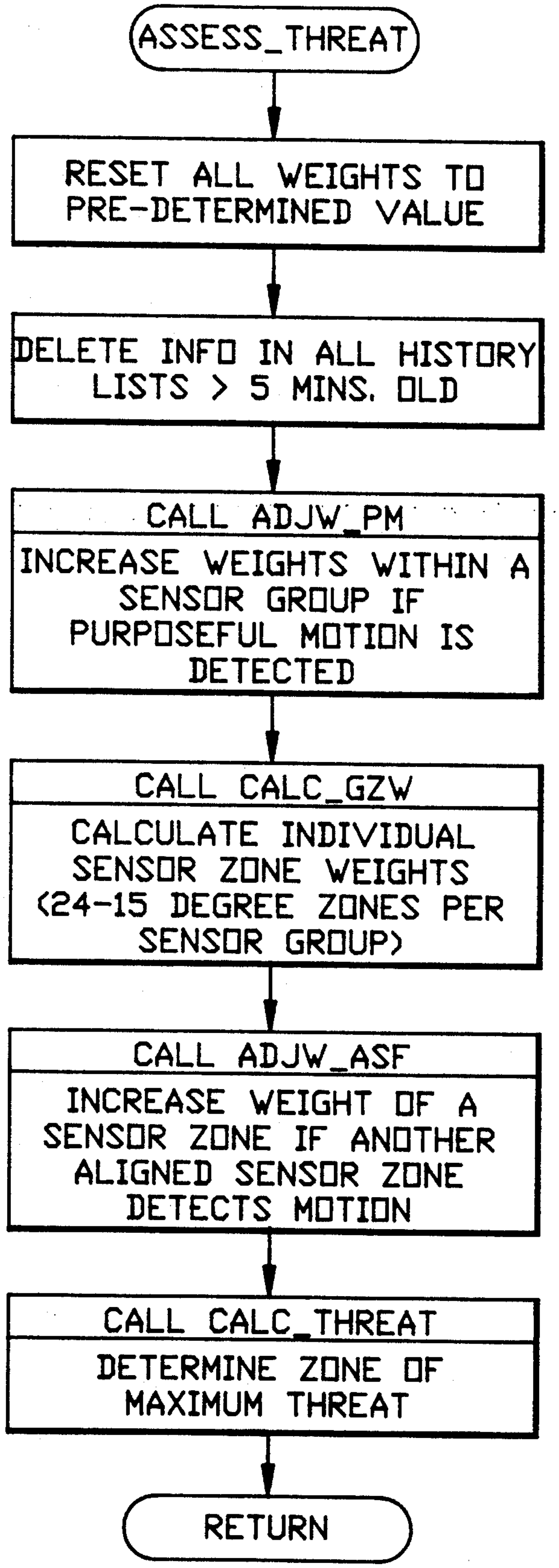
FIG. 25 is a flowchart of the Assess Threat Software which is subroutine of the software presented in FIG. 23.

The Local Security Assessment Software uses an algorithm which employs a polar representation of the sensor data to establish a composite threat score for each of 24, 15 degree, wedge-shaped zones about mobile robot 18, as shown in FIG. 25. The Local Security Assessment Software, provided by way of example in Appendix 2, is written in 6502 assembly language. The human operator is alerted to any situation where the composite threat score exceeds the specific alarm thresholds for a given zone, as discussed in more detail later. A threat assessment value in the range of 0–100 is provided as a quantitative indicator of classification confidence, and a threat vector originating from the robot's current position is graphically displayed by host computer 14 on video display 15.

Reading in the Data

Figure 24:
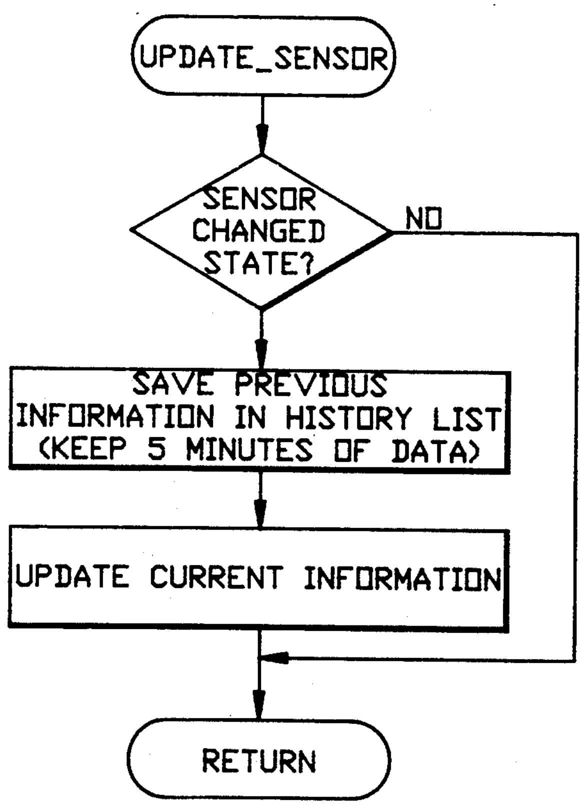
FIG. 24 is flowchart of the Update Sensor Software which is a subroutine of the software presented in FIG. 23.

On each pass through the Security Assessment Loop, (Refer to FIGS. 23–29) individual sensors which are in an alarm condition are identified by the functions 'update_range_sen' and 'update_onoff_sen', (Refer to FIG. 24; Appendix 1: ACCESS.C) which create an array of output values that are then stored in the current information fields of the data structure. The baseline weighting values for this operation are taken from a two-dimensional array called 'init_weight'. The previous values are stored in a history file and are pushed onto the top of a data structure called 'history_info' so as to provide an historical record of a finite period of time, as for example five minutes (See Appendix 1: ASSESS.C and ASSESS.H).

Detecting Purposeful Motion

Figure 26:
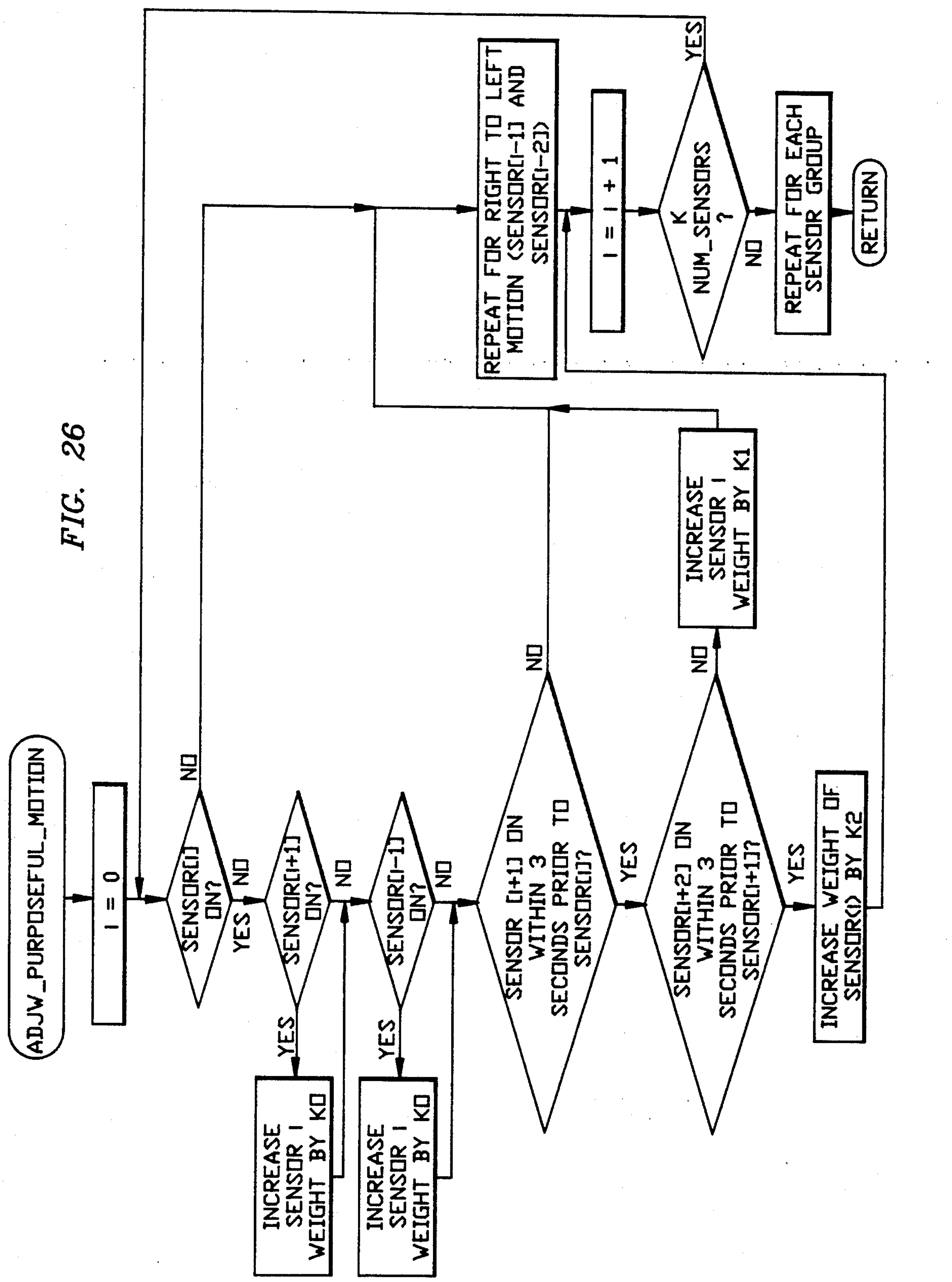
FIG. 26 is flowchart of the Adjust Weight Purposeful Motion Software which is a subroutine of the software presented in FIG. 25.
Figure 27:
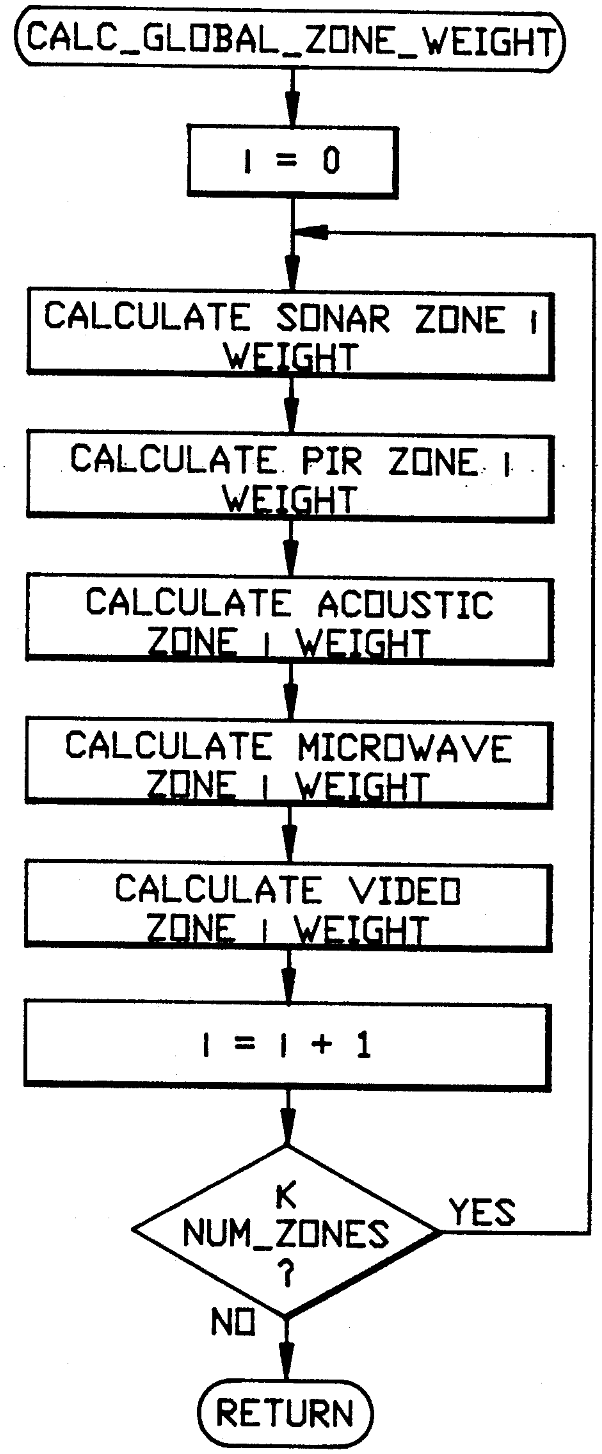
FIG. 27 is a flowchart of the Calculate Global Zone Weight Software which is a subroutine of the software presented in FIG. 25.
Figure 28:
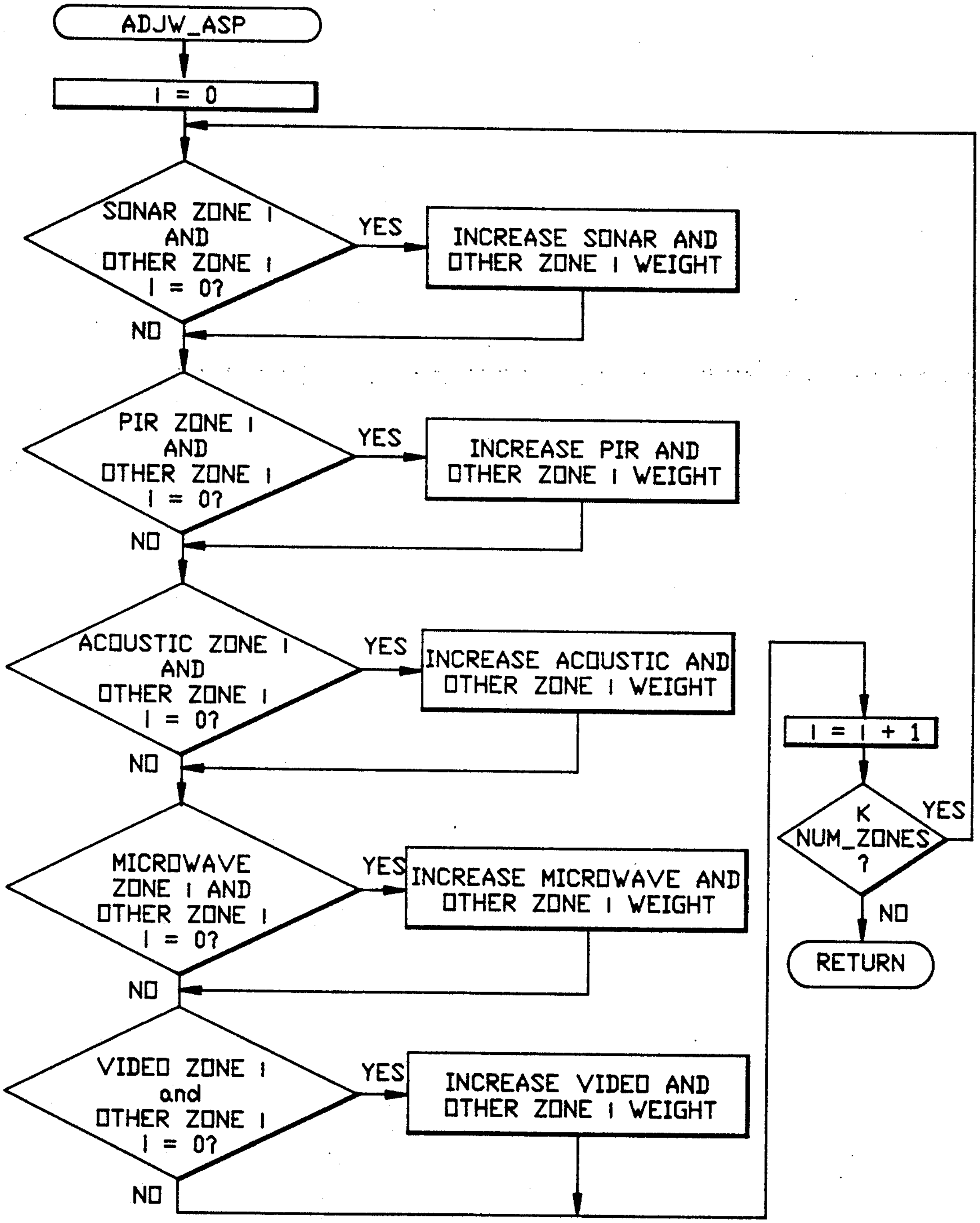
FIG. 28 is a flowchart of the Adjust Weight Angular Sensor Fusion Software which is a subroutine of the software presented in FIG. 25.
Figure 29:
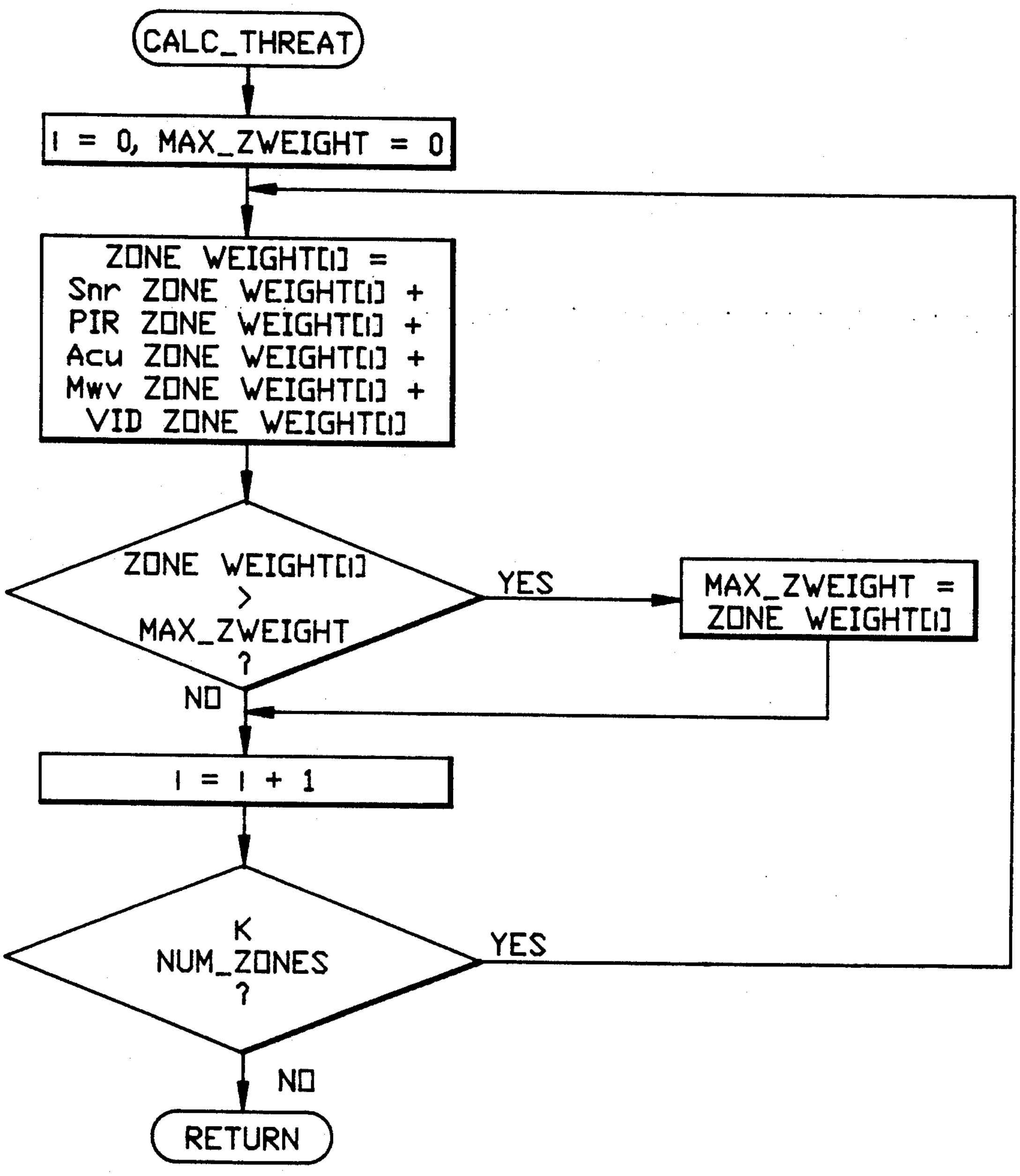
FIG. 29 is a flowchart of the Calculate Threat Software which is a subroutine of the software presented in FIG. 25.
Figure 30:
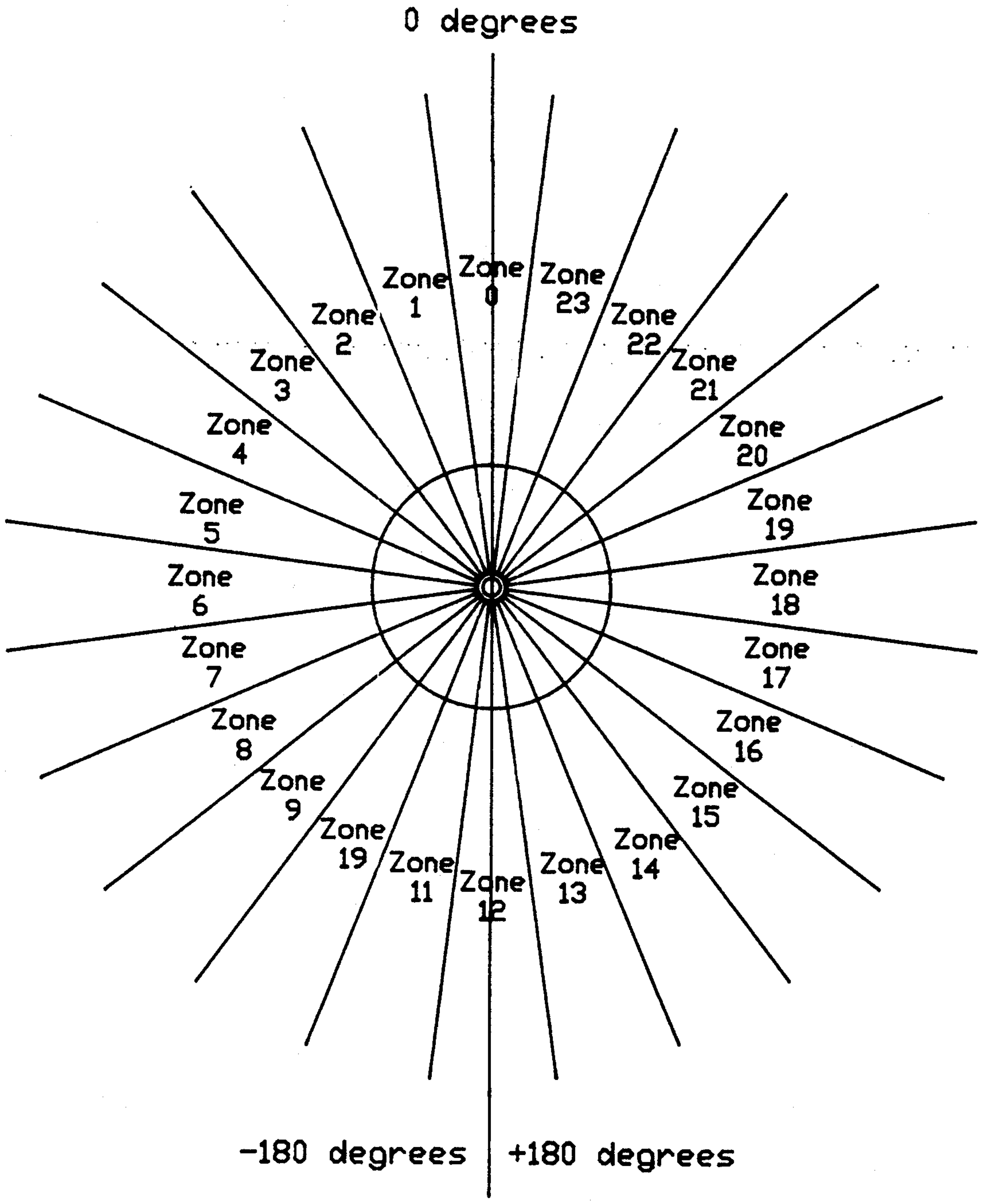
FIG. 30 illustrates the intrusion detection coverage zones of the mobile robot.

The information stored in the history file is next analyzed by the function 'adjw_purposeful motion' (Refer to FIG. 26; Appendix 1: SUPPORT.C) for signs of purposeful motion, and the weights for affected sensors adjusted accordingly and stored in an intermediate data structure called 'inter_weights'. This is accomplished as follows:

1. The algorithm identifies the first active sensor of a given group (i.e., sonar, infrared, microwave, etc.).
2. Data stored in the history file is examined to determine if adjacent sensors of the same group on either side of the active sensor had previously been active within some prespecified period of time.
3. If history of such activity is present, the weight of the active sensor is increased by an increment equal to its initial weight times some scaler S1.
4. In the event an adjacent sensor is found to have been active, the history file is again examined to see if the next sensor in the array also had previously detected motion.
5. If previous motion is again indicated, the weight of the active sensor is further increased by a second increment equal to its initial weight times some scaler S2.
6. This process is then repeated for all other active sensors of the given type, after which the remaining groups of motion detection sensors are similarly examined in kind.

In this fashion, if a temporal history of lateral motion across the field of view of the sensor array is present, such that adjacent sensors are activated in a distinct sequence, the resulting signature is classified as purposeful as opposed to random motion, and the active sensor weight is significantly increased.

Most of the motion detector arrays (microwave, passive infrared, acoustical, optical) are capable of angular resolution only, and provide no range information. An exception is the ultrasonic motion detection system **19*f* (Refer to FIG. 5) which identifies a potential intrusion through changes in measured target distances as seen by one or more sensors $536_i$ in the 24-element arrays 536*b* and 536*c***. This feature provides an additional level of analysis performed on sonar data accumulated in the history file, in that purposeful motion of an intruder should result in a somewhat continuous path target profile, with no significant discontinuities, or jumps in target position.

Cross Correlation

The next step in the local security assessment routine is referred to as "cross correlation" (See Appendix 1: SUPPORT.C). This involves checking for correlation among the different sensor groups (i.e., infrared, ultrasonic, optical, etc.) to minimize nuisance alarms. The function 'adjw_angular_sensor fusion' (Refer to FIG. 28) will increase the weight assigned to the output of a particular sensor if another type of sensor also detects motion along the same bearing, plus or minus some specified tolerance. This is accomplished as follows:

1. The first active sensor of a given group is identified.
2 The current value of the sensor weight is incremented by the scaled weight of any confirming sensors of other types which view the same or immediately adjacent areas, and stored again in 'current_weight', where:

$$\begin{matrix}\text{New}\\\text{Sensor}\\\text{Weight}\end{matrix} = \begin{matrix}\text{Old}\\\text{Sensor}\\\text{Weight}\end{matrix} + k_1\begin{pmatrix}\text{same}\\\text{zone}\\\text{factor}\end{pmatrix} + k_2\begin{pmatrix}\text{adjacent}\\\text{zone}\\\text{factor}\end{pmatrix}$$

3. The adjusted weight values (from 'inter.weight') of the confirming sensors are used for this calculation, as opposed to the initial weights (from 'init.-weight').
4. In this fashion, the increase in weighting is proportional to the confidence factor of the confirming sensor.

5. This process is then repeated for all other active sensors of the given type, after which the remaining types are similarly examined.

Composite Threat Calculation

Once the various weight contributions have been generated for the individual sensors of each type, the function 'calc_threat' is called to sum the weighted scores to generate a composite threat assessment for each of the 24 zones shown in FIG. 25. For each zone, there exists a predetermined alarm threshold value, and any zone wherein the composite threat exceeds this threshold is assumed to be in an alarmed condition. The video camera 12$g_1$ will be energized by local processor 402 when the composite threat for any given zone exceeds some scalar (typically 0.6) of the zone alarm threshold. The axis of the most active zone is used to graphically plot a threat vector on a map display of the secured environment, presented on video display 15 (FIG. 31). Head positioning servo 19*j* (FIG. 4) then is commanded to position video camera 12$g_1$ so that its optical axis is coincident with the orientation (bearing) of this threat vector. Software for directing the head positioning servo 19*j* is set forth, by way of example, in Appendix 3. Head positioning servo (panning) systems such as employed in the present invention are well known, commercially available units. Software for implementing the display feature is provided by way of example, in Appendix 1 as INTRUDER.C and INDISP.C. In the event more than one zone is active, the three zones with the highest composite threat scores will generate threat vectors colored red, yellow, and white, in decreasing order of perceived threat severity. Video camera 12$g_1$, if energized, will always be oriented towards the direction corresponding to the zone having the highest composite threat score, unless manually overridden by a human operator.

Global Security Assessment

The Global Security Assessment Software addresses two fundamental issues: (1) inhibiting those fixed installation sensors which are momentarily activated by the robot's passage through the protected area, and (2) fusing the alarm status data from the fixed installation sensors with the data from the mobile sensors mounted on robot 18 (or robots) in order to create a composite representation of the perceived threat. Flowcharts for software that would be implemented in host computer 14 for performing these functions are provided by way of example, in FIGS. 24–29 and 32–36.

When robot 18 is moving in an area protected by fixed installation sensors, the security assessment system determines when the robot is about to enter or leave the coverage area of any given sensor. The sensor in question must be inhibited for that portion of the time when robot 18 is moving through its field of view, so that the motion of robot 18 does not generate a nuisance alarm. Once the robot has departed the coverage area, that particular sensor must be re-enabled. The robot's X-Y position is used to obtain the identification of all fixed sensors from the fixed sensor coverage layer that could be affected by the robot's motion at that particular instant. These sensors are then gated out when constructing the fixed-mobile correlation factor which is used to calculate the global composite threat. Of course, the robot's mobile coverage layer is time variant while mobile robot 18 is in motion.

Figure 32:
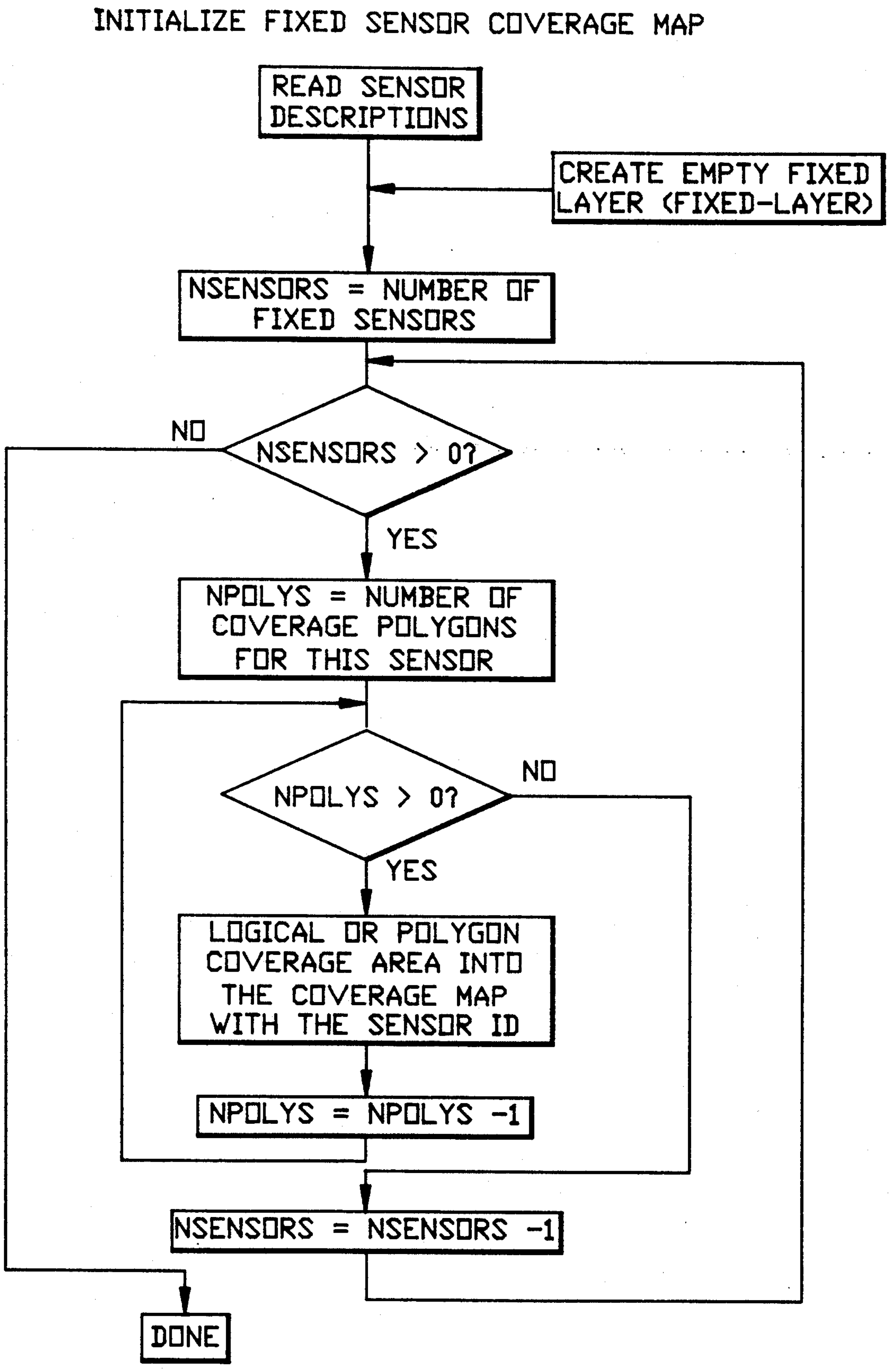
FIG. 32 is a flowchart of software for initializing the fixed sensor coverage map.
Figure 34:
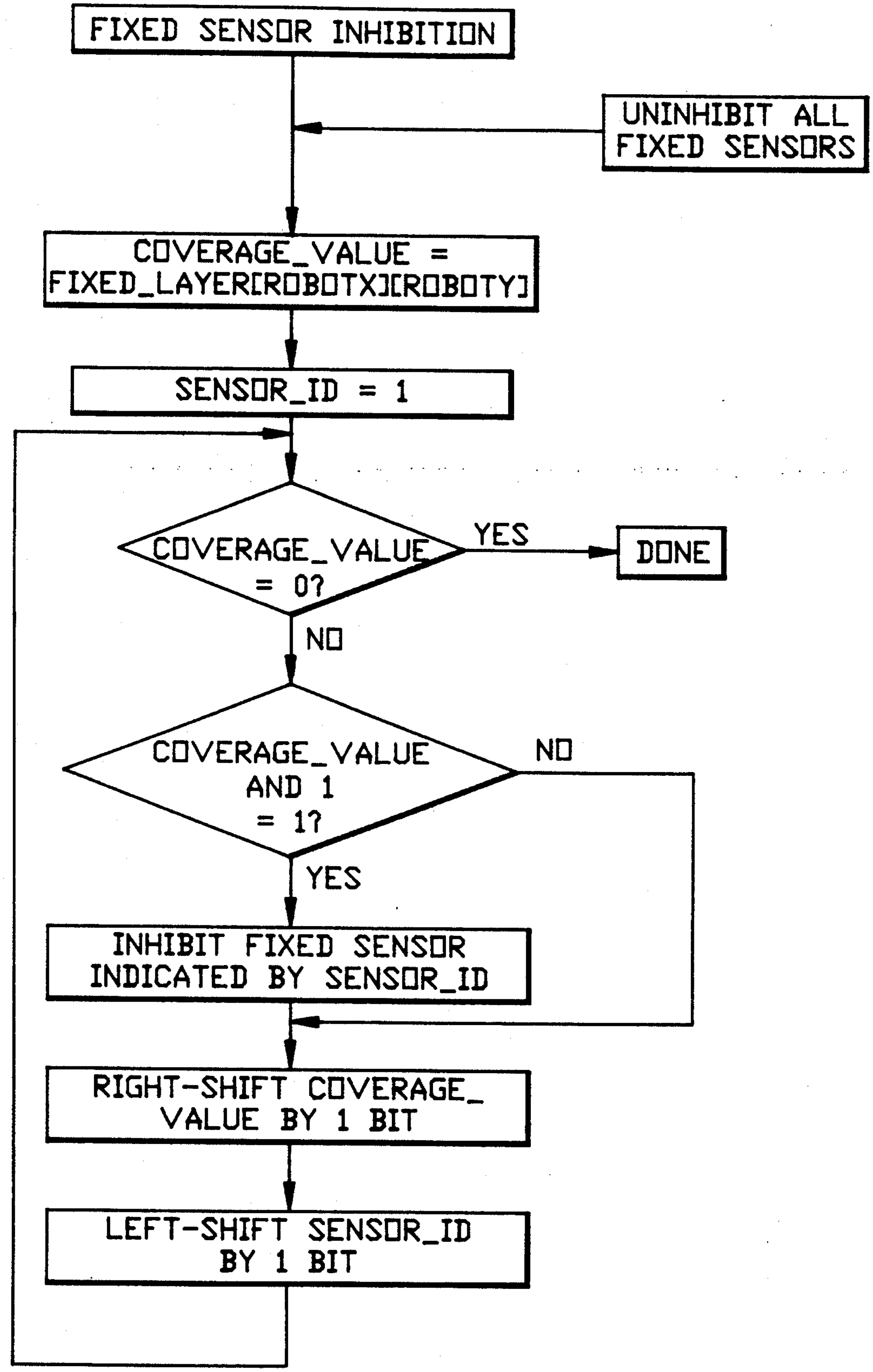
FIG. 34 is a flowchart of software for inhibiting the fixed sensors.

The preferred embodiment uses a bit-map approach which determines if any point in the fixed sensor coverage layer lying within in a small area of ambiguity around robot 18 has the appropriate bit set for that particular sensor. Referring to FIGS. 32 and 34, at the beginning of each inhibition loop, the Security Assessment Software must mark all the sensors as uninhibited, then inhibit only those affected by the robot so that when a robot leaves the coverage area, the associated sensor will be enabled once again.

An alternative to the bit-map method is to examine each sensor coverage polygon to see if the robot is within that polygon, then inhibit those sensors affected by the robot's presence. The polygons would be predefined by the operator using the MAPEDIT.C software presented in Appendix 1. The robot is modeled as a point. Consequently, representations of the fixed sensor coverage areas would be expanded by half the maximum dimension of the robot footprint. To determine if the robot is causing a fixed sensor to trip, the position of the robot would be used as an index into the coverage layer. The value of that location in the coverage layer then would determine which fixed sensors would be affected by the robot's presence.

Another alternative to the bit-map approach could be used if robot 18 is modeled as a simple convex polygon (e.g., a rectangle). The Sutherland and Hodgman polygon clipping algorithm can be used to determine whether or not robot 18 is completely outside or partially or completely inside the defined region. [See Sutherland, Ivan, E. and Hodgman, Gary W., "Reentrant Polygon Clipping," *CACM*, Vol. 17, pp. 32–42, 1974]. This particular technique clips a concave or convex polygon (sensor coverage polygon in this case) to an arbitrary convex polygon (robot). Each sensor area affected by the presence of the robot would be inhibited, and those not affected would be enabled. If both the coverage and robot polygons are convex, then the Cyrus and Beck algorithm can be used. [See Cyrus, M. and Beck, J., "Generalized Two- and Three-Dimensional Clipping," *Computers & Graphics*, Vol. 3, pp. 23–28, 1978].

In the preferred embodiment, once the fixed sensors affected by the robot have been inhibited, it is necessary to correlate data provided by all of the fixed sensors with each other, as well as with the outputs of mobile sensors on the robot. All sensors are modeled with bit-maps [Refer to FIGS. 35A and 35B}. Data corresponding to outputs of the sensors are integrated with the other maps to form the fixed-mobile correlation factor.

An alternative method of correlating the data may be employed if all the sensors are modeled solely with polygons. Then it would be necessary to determine the specific polygon that is the largest subset of all the active polygons. Another alternative for performing data correlation employs a hybrid scheme. In this scheme, a hit bit-map can be created based on how many polygons cover each cell in the map. Regardless of the method used, it is first necessary to rotate the robot's coordinate system to correspond with that of the fixed sensors.

When the robot is stationary, the data fusion software determines the degree of interaction of the outputs corresponding to sensors on the robot with those of the fixed sensors in the "hit" area in order to develop a composite threat weight. Accordingly, the system first determines the fixed sensors which are active and their associated coverage areas, as stored in the fixed coverage layer. This information then is logically combined with information provided from the calculated coverage areas, in absolute coordinates, of the active robot sensors. The result is stored as the fixed-mobile correlation factor, which is then used to calculate the global composite threat. The fixed-mobile correlation factor represents the maximum fixed intrusion detector threat score corresponding to the fixed intrusion detectors that detect a potential intrusion. The manner in which this calculation is accomplished is discussed in the following paragraphs.

To initially set the appropriate bits in the fixed sensor coverage layer, the coverage extents are defined using the Map Editor (Appendix 1: MAPEDIT.C). A standard polygon scan conversion algorithm [See Rogers, David F., *Procedural Elements For Computer Graphics,* McGraw-Hill Book Company, New York, 1985] sets the correct bit for that particular sensor upon program start-up, where an assigned bit corresponds to each fixed sensor [Refer to FIG. 32 and Appendix 1: FIXEDSEN.C].

The mobile sensor coverage layer associated with the robot is created when needed to fuse data between the sensors of fixed sensor system 12 and sensor system 19 on robot 18. The information on robot heading and X-Y position is first obtained from local processor 402, and then the mobile array values are generated according to preestablished rules described below. By way of example, the preferred embodiment employed a 8-bit representation. The position and orientation of the robot is "frozen" before calculating the array values. Again, a standard polygon scan conversion algorithm (implemented by POLYFILL.C, set forth in Appendix 1; See also Rogers, David F., *Procedural Elements For Computer Graphics,* McGraw-Hill Book Company, New York, 1985) is used to set the appropriate bits for the X-Y locations in the array up to the imposed extents, which are defined below.

For example, the range of microwave motion detector system 19*d* may be constrained by the room boundaries, as might be vibration sensor 19*b*. Ultrasonic motion detector system 19*d* may be constrained to where all bits are set within a circle of ambiguity of some pre-specified diameter, centered at the reported range value of the disturbance along the appropriate bearing. The limits on an acoustical coverage area could be defined as a wedge of some specified angle of uncertainty along the calculated bearing line, out to a distance constrained by the room or map boundary.

Figure 35A:
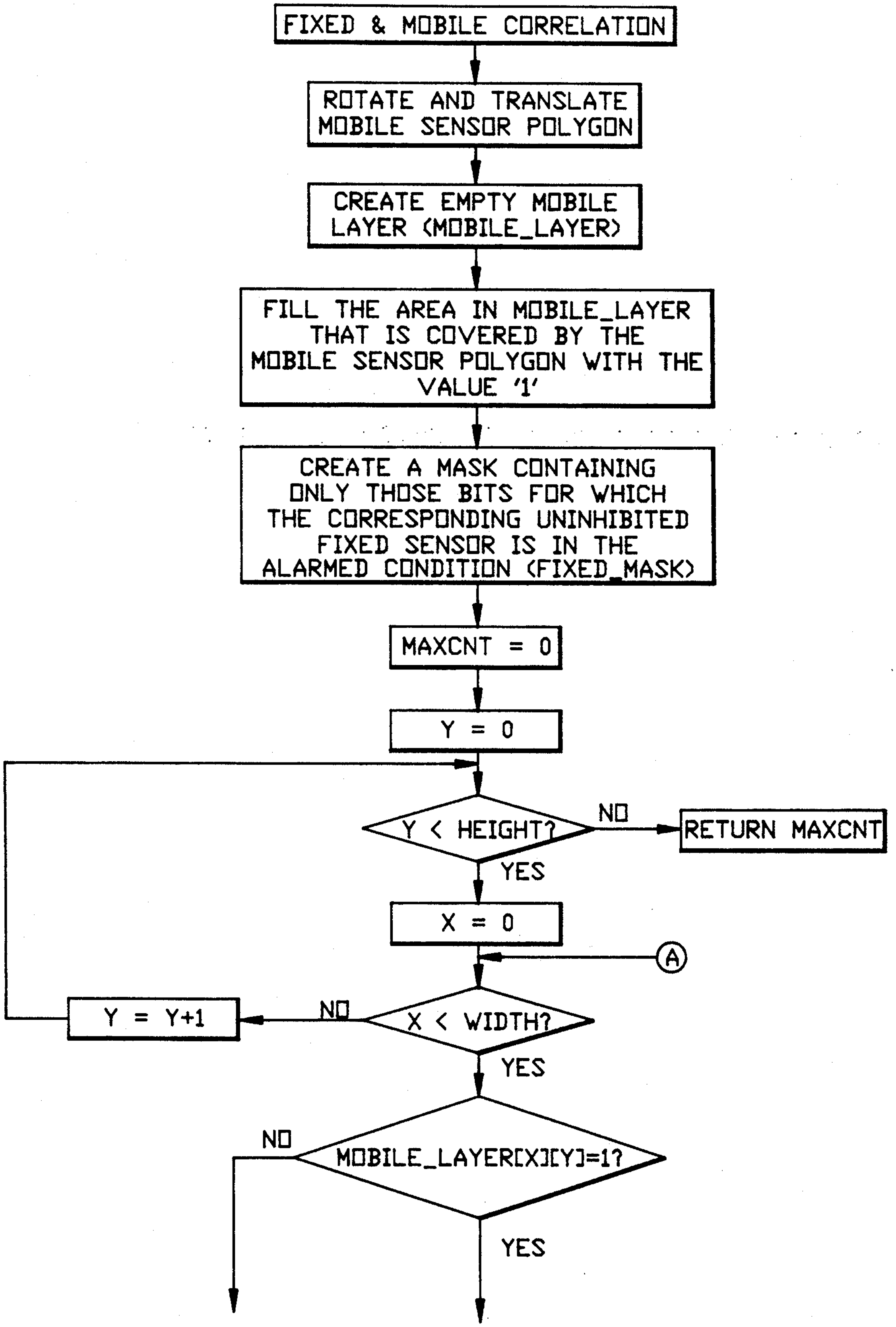
FIGS. 35A and 35B present a flowchart of software for performing fixed and mobile sensor output correlation.
Figure 35B:
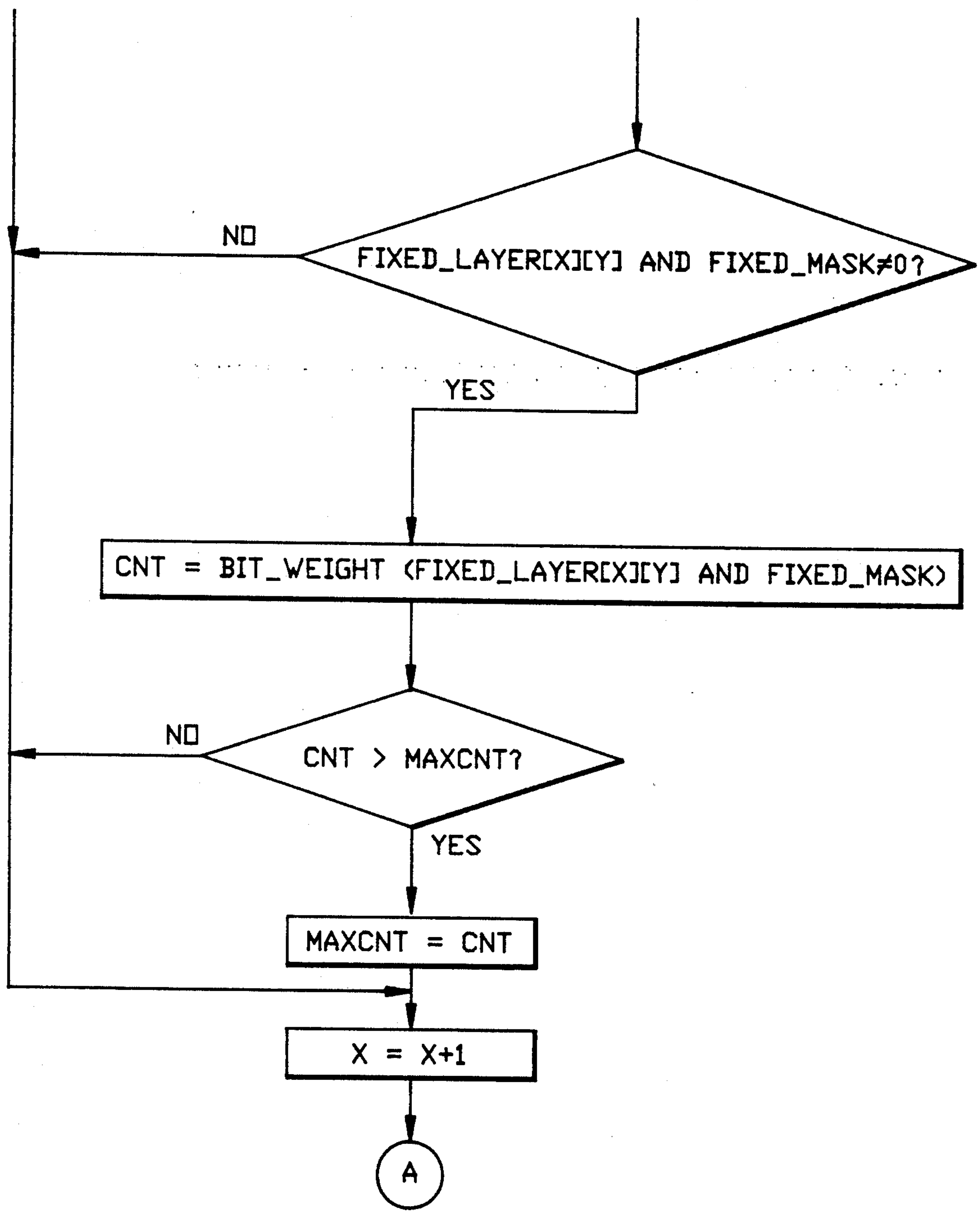
Figure 36:
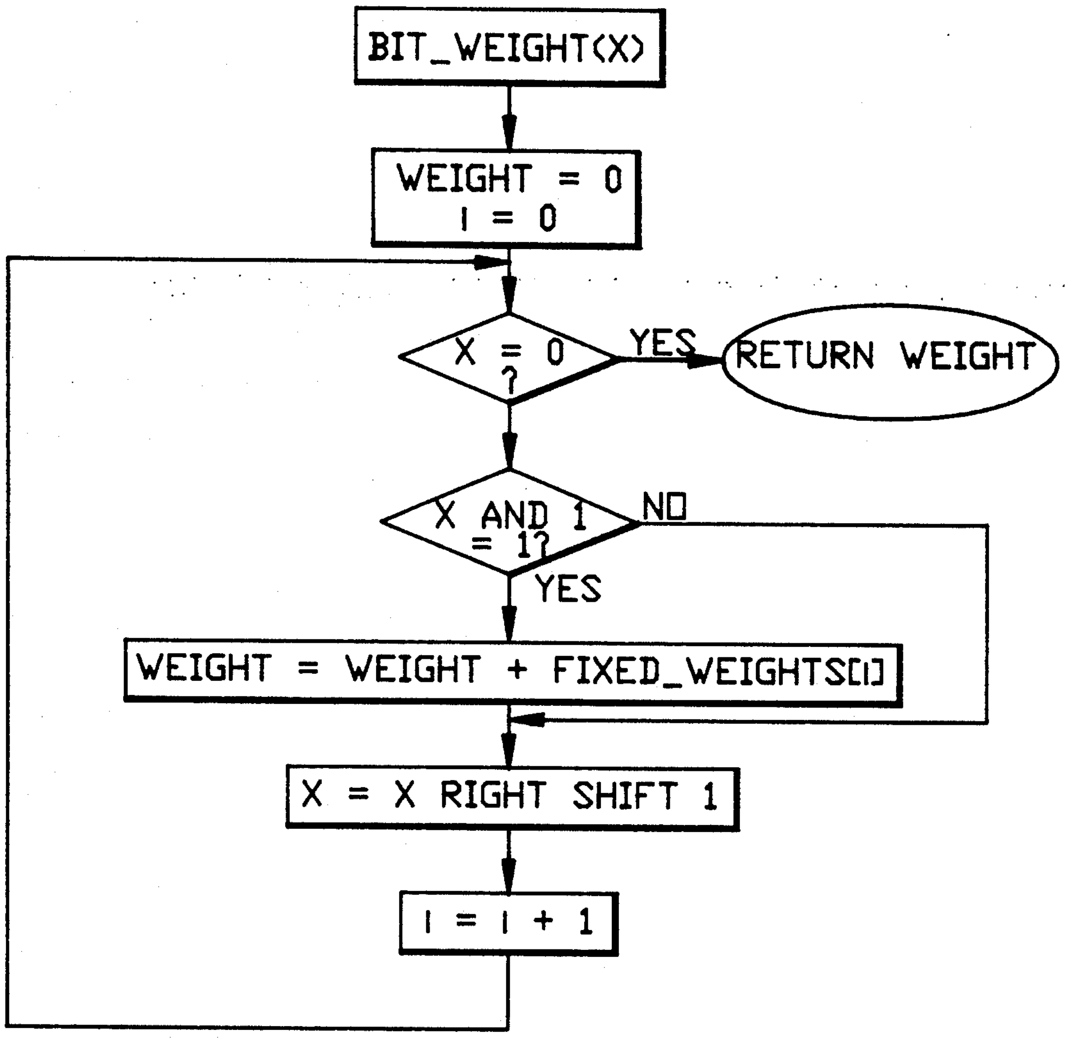
FIG. 36 is a flowchart of software for adjusting the weights of the bits corresponding to the sensor outputs.

When a global correlation (correlating the outputs of both triggered fixed and mobile sensors) is desired in a static scenario, host computer 14 sets all the appropriate bits in the mobile layer for sensor system 19 according to the robot's current position and heading. [Refer to FIG. 35A]. In essence, this effects a coordinate transform which makes the mobile sensors look like fixed sensors for that instant in time. Then, host computer 14 determines which sensors are alarmed, and begins to generate the fixed-mobile correlation factor using the sensor coverage information encoded in the fixed and mobile sensor layers. The fixed-mobile correlation factor is used as one of the components in calculating the global composite threat.

An alternative method of correlating the outputs of both triggered fixed and mobile sensors is to find the largest polygon completely contained within all the other active polygons, i.e. find the largest subset that is a subset of all other subsets. This is most easily accomplished using the following steps: Pick an initial polygon (any one will do). Pick another polygon that has not been clipped. Clip the two polygons against each other, resulting in a third representing the intersection. Using the resulting polygon as the initial polygon, repeat the process until all polygons have been clipped. The output is the maximum size polygon contained within all the other polygons. If all polygons are guaranteed to be convex, then the Cyrus and Beck clipping algorithm can be used. Otherwise, each convex polygon must first be decomposed into two or more convex polygons, then clipped. Alternatively, a more general algorithm capable of clipping a concave polygon against another concave polygon could be used. [See Weiler, Kevin, and Atherton, Peter, "Hidden Surface Removal Using Polygon Area Sorting," *Computer Graphics,* Vol, 11, pp. 214–222, (Proc. SIGGRAPH 77), 1977].

OPERATION OF THE INVENTION

As an example operational scenario, mobile robot 18 is assigned a patrol route (or a discrete location) by the operator. The path planner calculates an appropriate path, whereby mobile robot 18 assumes its first assigned surveillance position. All primary detection sensors are online (optical, acoustical, infrared, vibration, and microwave) and RF data link 20 is in standby operational status. Video camera $\mathbf{12}g_1$ and associated RF video link $\mathbf{20}b_2$ are deactivated.

If a possible disturbance is detected by one of the fixed installation motion detectors of fixed sensor system 12, an appropriate signal is provided via AIU 16 to host computer 14. The human operator is alerted by an audio beep from alarm system 22. In one type of scenario, host computer 14 may determine that the triggered sensor could not have been set off due to the motion of mobile robot 18 by noting that the current dead-reckoned position of the robot is not within the designated coverage area of the alarmed sensor. The Path Planner Software then dispatches robot 18 to a location where mobile sensor system 19 can observe the area in question. With no additional confirmation from mobile security sensor system 19, the Realtime Assessment Software, after a designated period of time, classifies the threat as a nuisance alarm. All fixed and mobile sensor reports are continuously time stamped and logged to disk in host computer 14 for later replay and analysis. The robot then continues its assigned patrols.

In another example of a typical operational scenario, a second disturbance is later detected by another sensor of fixed security sensor system 12. The robot is dispatched to the area and assesses the situation. In this example, however, the primary mobile detection sensors also react in confirmation. The threat level is sufficient for the software to activate secondary sensors, and the ultrasonic motion detection system 19*f* is enabled. Cross correlation between sensors shows a strong likelihood of an intruder at position (X,Y) on the map of the secure area, as indicated in the lower half of control screen 890 (FIG. 31) of video display 15. The software which assembles this data and presents it on control screen 890 is provided, by way of example, in Appendix 1 as MAP.C, INDISP.C and INTRUDER.C.

The Realtime Assessment Software activates video camera 19*h* onboard the robot. The camera is automatically positioned along the bearing of the disturbance by head positioning servo 19*j*. The human operator is notified by a second audible alert, while video motion detector system 12$g$ surveys the scene under surveillance. If the motion detected by video camera 12$g_1$ confirmed as an actual intrusion, alarm system 22 provides an audible output. The human operator is able to observe the intruder on video monitor 28, and may optionally see the (X,Y) position of the intruder depicted in a floor plan map, displayed on video display 15 by host computer 14.

Once the relative bearing to an intruder has been established, the bearing can be used to calculate a motion command which causes mobile robot 18 to rotate in place until the intruder is directly ahead of the robot, centered on the axis of the collision avoidance system 450. Range information gathered by collision avoidance system 450, normally used to avoid an object in the path of the robot, provides information used to direct the robot towards the intruder and to follow him. The robot's mean forward velocity is adjusted as a function of range to the intruder, and a calculated differential in left and right drive motor speeds is introduced as a function of how far off centerline the target appears. This differential causes the robot to turn towards the target being followed in a controlled fashion, until it appears centered, all the while maintaining a specified distance interval. The robot's absolute X-Y position is graphically displayed on a map of the secured area, while camera transmits live video to display 890 for evaluation by the operator.

Unless otherwise indicated all software is implemented in host computer 14. Program listings set forth in Appendix 1 are written in "C" and are provided by way of example only. Program listings set forth in Appendices 2 and 3 are written in 6502 assembly language and are provided by way of example only. The software listed in Appendix 2 is implemented in local processor 402. The software listed in Appendix 3 is implemented in the processor of video motion detector system 12$g_1$. The scope of the invention includes all modifications to such software as would be evident in light of the appended teachings. Furthermore, the scope of the invention includes software written in languages other than those set forth herein.

Obviously, many modifications and variations of the present invention are possible in light of the above teachings. For example, the scope of the invention includes the employment of one or more mobile robots 18 to patrol the secured environment. Therefore, singular references to mobile robot 18 are to be understood as referring to one or more mobile robots 18. Therefore, within the scope of the appended claims, the invention may be practiced otherwise than as specifically described.

```
************************************************
*  DATA FUSION METHOD AND SYSTEM FOR A FIXED   *
*    AND MOBILE SECURITY SENSOR SYSTEM         *
*                                              *
*              NAVY CASE NO. 72775             *
*                                              *
*       INVENTORS:  HOBART R. EVERETT          *
*                   GARY A. GILBREATH          *
*                                              *
*              A P P E N D I X  1              *
************************************************
```

APPENDIX 1
SOFTWARE LISTINGS
LANGUAGE: "C"

ANIMATE.C
ASSESS.C
ASSESS.H
ASYNCH.C
ASYNCH.H
BAUDRATE.C
BAUDRATE.H
BB-EDIT.C
BB-EDIT.H
CA.C
CELLIST.C
DEADRECK.C
DISPLIST.C
DISPLIST.H
EXECUTE.C
FILL1.C
FIXED.C
FIXEDSEN.C
FUNCKEYS.C
FUNCKEYS.H
GLOBAL.C
IBMIO.C
IBMIO.H
IBMIO.C
IBMRTCLK.C
INDISP.C
INTRUDER.C
K2A.H
LINESTUF.C
LINESTUF.H
LINKDEFS.H
LINKRBRT.C
LISTS.C
LOGGER.C
MAKEMAP.C
MAP.C
MAPCUR.C
MAPDEFS.H
MAPEDIT.C
MINTURNS.C
MISC.C
MYTYPES.H
OA.C
PACKET.H
PATHPLAN.C
PE.C
POLYFILL.C
PROTOS.H
QUEUE.H
RECAL.C
ROBART.C
ROBICONS.H
RTCLK.H
SCRIPT.C
SENSOR.C
SENSOR.H
SERIAL.H
SETUP.C
SIO.C
SONPLOT.C
SPEECH.C
SQRT.C
SUPPORT.C
SUPPORT.H
SYSCALL.H
SYSDEFS.H
TELE.C
TIMESTMP.C
TIMESTMP.H
TTY.C
VOX1.H
VOX2.H
VOX3.H
VOX4.H
ZOOM.C

```
/*********************************************************************
 *                              plot3d                               *
 *********************************************************************
 * Make a 3-D plot of the current map.                               *
 *                                                                   *
 *********************************************************************/

#include <stdio.h>
#include <string.h>
#include <malloc.h>
#include <fcntl.h>
#include <stdlib.h>
#include <ega.h>
#include <event.h>
#include <menu.h>
#include <syscolor.h>
#include <dialog.h>

#ifdef NARGS
#undef NARGS
#endif

#include <math.h>

#include "headers/ibmio.h"
#include "headers/serial.h"

#ifndef PI
#define PI    3.14159265358979323846
#endif

static int      wireframe = 0,
                quick = 0,
                good = 1,
                realtime = 0;
static int      frame_period_ms = 130;  /* frame period in milliseconds */


/*lint -e708 -e570 */
static DIALOG_ITEM animate_dialog[] = {
#include "animate.dia"
};
/*lint +e708 +e570 */

extern long     robotx, roboty, robothdg;
extern drType robart;

extern unsigned long rdtimer(void);

animate(map_ptr)
map *map_ptr;
{
        char    animate_name[80], log_name[80];
        char    *cp, str[256];
        byte    *copy;
        int     update;
        int     prevx, prevy;
        int     h, m, s, t, xco, yco, dir;
        int     n, status;
        int     nframes = 0;
        int     no3dplot;
        packet  pack;
        double  cur_time, frame_time;
        FILE    *fd;
        DIALOG *dbox;
        GBUF    *savebuf;

        if((dbox = OpenDialog(animate_dialog, 50, 30, NORMAL)) != NULL) {
                status = EditDialog(dbox);
                CloseDialog(dbox);
        }
        else
                return (ERROR);
```

```

        if (status == 0x3011)           /* cancel button */
                return (OK);
        else if (status == 0x3017)      /* replay only */
                no3dplot = YES;
        else
                no3dplot = NO;

        animate_name[0] = log_name[0] = EOS;
        if (SelectFile("*.log", log_name, " Open ") == 0)
                return (OK);
        fd = fopen(log_name, "r");
        if (fd == NULL) {
                gstatus("Can't open %s. -->",log_name);
                mgetkey();
        }

        if (!no3dplot) {
                if (SelectFile("ani/*.ani", animate_name, " Open ") == 0) {
                        fclose(fd);
                        return (OK);
                }
        }

        mouse_off();
        /* Read the first line in so we can initialize the robot's position */
        fgets(str, 255, fd);
        n = sscanf(str, "%d:%d:%d.%d:%d,%d,%d",&h,&m,&s,&t,&xco,&yco,&dir);
        robart.x = prevx = xco, robart.y = prevy = yco, robart.dir = dir;
        robotx = robart.x * map_ptr->squaresize * 10L;
        roboty = robart.y * map_ptr->squaresize * 10L;
        robothdg = robart.dir * 100L;
        cur_time = (double) t / 100.0 + s + m*60.0 + h*3600.0;
        frame_time = cur_time;
        fseek(fd, 0L, SEEK_SET);        /* reset to beginning of file */

        if (no3dplot) {
                savebuf = save_robart(map_ptr, robart.x, robart.y);
                draw_robart(map_ptr, robart.x, robart.y);
        }
        else {
                init_plot3d(map_ptr);           /* initialize 3-D plotter */
                plot3d(map_ptr, 0, wireframe);
                status = BeginAnimation(animate_name);
                if (status > 0) {
                        banimate_error(status);
                        fclose(fd);
                        mouse_on();
                        return (ERROR);
                }
                frame_time += (double) frame_period_ms/1000.0;
        }
        copy = (byte *) calloc(map_ptr->ux - map_ptr->lx + 1, map_ptr->uy - map
_ptr->ly + 1);
        if (copy == NULL) {
                gstatus("Can't allocate space for copy -->"); mgetkey();
                mouse_on();
                return (-1);
        }
        local_map_copy(copy, map_ptr);
        nframes = 1;
        init_plot_nav();
        while (fgets(str, 255, fd) != NULL) {
            str[strlen(str)-1] = EOS;   /* get rid of \n at end of string */
            n = sscanf(str, "%d:%d:%d.%d:%d,%d,%d",&h,&m,&s,&t,&xco,&yco,&dir);
            if (n != 7)
                continue;
            robart.x = xco, robart.y = yco, robart.dir = dir;
            robotx = robart.x * map_ptr->squaresize * 10L;
            roboty = robart.y * map_ptr->squaresize * 10L;
            robothdg = robart.dir * 100L;
            cur_time = (double) t / 100.0 + s + m*60.0 + h*3600.0;

```

Apr 04 1991 09:51:42 animate.c Page 3

```
		/* The frame_period_ms variable tells the program how long each
		 * frame of the animation is going to be displayed.  If the time
		 * time to display the current packet has not arrived yet, we
		 * need to accumulate dummy frames until it does.
		 */
		if (realtime) {
		    while (cur_time-frame_time > frame_period_ms/2000.0) {
			    SnapShot();      /* take previous picture */
			    frame_time += (double) frame_period_ms/1000.0;
		    }
		}
		cp = strchr(str, '!');
		if (cp == NULL) continue;

		cp++;
		strcpy(pack.data, cp);
		if (*cp == '?') {		/* if it's a sonar packet */
		    status = plot_nav_sonar(map_ptr, &pack, robart.x, robart.y);
		    if (!no3dplot) {
			/* If we're in the quick or good quality modes, then only
			 * redraw the screen if the contents of the map have
			 * changed or the robot has changed position.
			 */
			update = YES;
			if ((quick||good) && (local_map_compare(copy, map_ptr) == 0
	) &&
			    (prevx == xco && prevy == yco)) {
			    update = NO;
			}
			else {
			    plot3d(map_ptr, 0, wireframe);
			    local_map_copy(copy, map_ptr);
			}
			/* Update the animation if we're not in quick mode or if
			 * the update flag has been set.
			 */
			if (!quick || update) {
			    SnapShot();
			    frame_time += (double) frame_period_ms/1000.0;
			    nframes++;
			}
		    }
		    else {
			restore_robart(savebuf);
			savebuf = save_robart(map_ptr, robart.x, robart.y);
			draw_robart(map_ptr, robart.x, robart.y);
			waitms(frame_period_ms);
		    }
		}
		if (keyhit()) {
		    mgetkey();
		    break;
		}
		prevx = robart.x, prevy = robart.y;
	    }
	    if (!no3dplot) {
		    EndAnimation();
		    fclose(fd);
	    }
	    else
		    deinit_plot_nav(map_ptr);
	    free(copy);
	    mouse_on();
	    gstatus("Number of frames: %d", nframes);
	    return (OK);
}


/* banimate_error - print error message appropriate for BeginAnimation */
banimate_error(code)
int code;
{
	switch (code) {
```

Apr 04 1991 09:51:42 animate.c Page 4

```
	case 1:
		gstatus("BeginAnimation: Memory allocation failure -->");
		break;
	case 2:
		gstatus("BeginAnimation: Can't open output animation file -->")
;
		break;
	case 3:
		gstatus("BeginAnimation: File I/O error -->");
		break;
	default:
		gstatus("BeginAnimation: Unknown error code: %d -->", code);
		break;
	}
	mgetkey();
	return (0);
}


/* local_map_copy - copy just the currently zoomed section of the map to
 *	a generic byte array.
 */
local_map_copy(copy, map_ptr)
byte *copy;
map *map_ptr;
{
	int	x, y;

	for (y = map_ptr->ly; y < map_ptr->uy; y++) {
		for (x = map_ptr->lx; x < map_ptr->ux; x++) {
			*copy++ = floor(x, y, map_ptr);
		}
	}
	return (0);
}


/* local_map_compare - compare local copy of map with the real map.  Return
 *	0 if the are the same, 1 if they are different.
 */
local_map_compare(copy, map_ptr)
byte *copy;
map *map_ptr;
{
	int	x, y;

	for (y = map_ptr->ly; y < map_ptr->uy; y++) {
		for (x = map_ptr->lx; x < map_ptr->ux; x++) {
			if (*copy++ != floor(x, y, map_ptr))
				return (1);
		}
	}
	return (0);
}
```

Apr 04 1991 09:51:42 displist.c Page 1

```
/**********************************************************************
 *                        Display List Handler                        *
 **********************************************************************
 * The functions contained is the file are used to manipulate the    *
 * display list.  The display list contains a list of graphics objects *
 * that need to be periodically updated.  Objects are re-displayed   *
 * only when they change.                                             *
 *                                                                    *
 * Author: Gary Gilbreath, 10 Jan 90                                  *
 *                                                                    *
 **********************************************************************/

#include <stdio.h>                  /* needed for NULL definition */
#include <malloc.h>
#include <memory.h>
#include <sys/types.h>
#include <sys/timeb.h>

#include "headers/displist.h"

#define DL_MAGIC_NUMBER 0x44494c53L     /* magic number: ASCII "DILS" */
#define BLINK_PERIOD    350             /* blink period, in milliseconds */

/**********************************************************************
 *                            create_dl                               *
 **********************************************************************
 * Create a display list.                                             *
 *                                                                    *
 * Returns:                                                           *
 *      pointer to an item of type (DISPLAY_LIST)                     *
 *      NULL if unsuccessful                                          *
 *                                                                    *
 **********************************************************************/
DISPLAY_LIST *create_dl()
{
        DISPLAY_LIST    *dl;
        struct timeb    curtime;

        dl = (DISPLAY_LIST *) calloc(1, sizeof(DISPLAY_LIST));
        if (dl == NULL)
                return (NULL);
        dl->first = NULL;
        dl->dlmagic = DL_MAGIC_NUMBER;
        dl->blinkstate = 0;             /* not blinking */

        /* Grab the current time and stuff it into the blinktime variable.
         * The time is stored in the format
         *      <time in seconds><time in milliseconds>
         * where the first field is 22 bits long and the second is 10 bits
         * long. This gives us an ambiguity interval of 2**22 / 3600 secs,
         * or 48+ days.  The blinktime variable is used to toggle the
         * blinkstate variable on and off, which should occur every
         * BLINK_PERIOD ms, assuming that the update_dl routine is called
         * more often than that.
         */
        ftime(&curtime);
        dl->blinktime = ((curtime.time & 0x3fffffL) << 10) + curtime.millitm;

        return (dl);
}


/**********************************************************************
 *                           add_dl_item                              *
 **********************************************************************
 * Add an item to the given display list.  The arguments must include *
 * a pointer to the item to be put on the list, the length of the    *
 * item in bytes, the attribute byte (only DL_BLINK supported), and  *
 * pointers to six functions to operate on the item, which are used  *
 * as follows:                                                        *
 *                                                                    *
 *      init(itemptr)                                                 *
```

Apr 04 1991 09:51:42 displist.c Page 2

```
 *              This function initializes the display of the item, if  *
 *              any is required.  A pointer to the item is passed to   *
 *              the routine.  If no initialization is required, a      *
 *              NULL may be passed instead.                            *
 *      deinit(itemptr)                                                *
 *              Remove the item from the display.  This is used when   *
 *              the object is removed from the display list.  If no    *
 *              de-initialization is required, a NULL may be passed    *
 *              instead.                                               *
 *      copy(itemptr, oldptr)                                          *
 *              The copy routine should return a pointer to a copy of  *
 *              the item pointed to by itemptr.  If oldptr is not NULL *
 *              then copy should attempt to re-use that space, or      *
 *              at least release the space occupied by the old pointer. *
 *              If this argument is NULL, it is assumed that a byte-   *
 *              by-byte copy can be made of the object.                *
 *      freecopy(oldptr)                                               *
 *              Free up any space occupied by the itemptr <oldptr>.    *
 *              The pointer <oldptr> will be what was returned by a    *
 *              call to the copy() routine.  If the copy() argument    *
 *              is not NULL, then the freecopy() argument must be      *
 *              supplied as well.  Similarly, if copy() is NULL,       *
 *              freecopy() must be NULL as well.                       *
 *      update(olditemptr, newitemptr, hide)                           *
 *              Update the display of the item.  Pointers to the old   *
 *              item and the current item are passed, so that the      *
 *              routine will know the current displayed state as well  *
 *              as the desired display state. If the hide argument is  *
 *              non-zero, then the item should be hidden (this is used *
 *              for blinking the object).  Note that if the blink      *
 *              attribute is not enabled for the object during the     *
 *              add_dl_item() call, the <hide> value will always be 0. *
 *      compare(olditemptr, newitemptr)                                *
 *              Compares two items.  This routine is optional.  If it  *
 *              is NULL, then it is assumed that a straight            *
 *              byte-by-byte comparison can be made. Should return 0   *
 *              if the items are identical, non-zero otherwise.        *
 *                                                                     *
 * Call with:                                                          *
 *      dl              = (DISPLAY_LIST *) display list to add item to *
 *      itemptr         = (void *) pointer to item to add to list      *
 *      len             = (int) length of item in bytes                *
 *      attribute       = (int) attributes (only DL_BLINK supported)   *
 *      init            = (int (*)()) pointer to init function         *
 *      deinit          = (int (*)()) pointer to deinit function       *
 *      copy            = (void *(*)()) pointer to copy function       *
 *      freecopy        = (int (*)()) pointer to copy "freeer" func.   *
 *      update          = (int (*)()) pointer to update function       *
 *      compare         = (int (*)()) pointer to compare function      *
 *                                                                     *
 * Returns:                                                            *
 *      A pointet to the item added.  This should be saved so that     *
 *              the item can later be removed with delete_dl_item.     *
 *      NULL    if bad display list given or unable to allocate memory *
 *              for new item.                                          *
 *                                                                     *
 ***********************************************************************/
DL_ITEM *add_dl_item(dl, itemptr, len, attribute, init, deinit, copy, freecopy,
  update, compare)
DISPLAY_LIST *dl;
void *itemptr;
int len, attribute;
int (*init)(), (*deinit)();
void *(*copy)();
int (*freecopy)(), (*update)(), (*compare)();
{
        DL_ITEM *curitem;

        if (dl == NULL || dl->dlmagic != DL_MAGIC_NUMBER)
                return (NULL);

        /* Allocate space for the item */
        curitem = (DL_ITEM *) calloc(1, sizeof(DL_ITEM));
```

Apr 04 1991 09:51:42 displist.c Page 3

```
        if (curitem == NULL)
                return (NULL);

        /* If this is the first item, there is no next item, so point to
         * the NULL pointer.  If it's not the first item, then make the
         * next pointer point to the first item, since we insert new items
         * at the head of the list.
         */
        if (dl->first == NULL)
                curitem->next = NULL;           /* point to nothing */
        else
                curitem->next = dl->first;      /* point to current first item
*/
        dl->first = curitem;                    /* item now at head of list */

        /* Copy all the arguments to storage for this item */
        curitem->dlitemptr = itemptr;           /* ptr to current item */
        curitem->itemlength = len;              /* length of the item */
        curitem->dlattributes = attribute;      /* save the attributes */

        /* Make copy of current item.  If copy argument is not NULL, use the
         * user-supplied routine.  Otherwise, allocate space for the object
         * based on len and do a byte-by-byte copy.
         */
        if (copy != NULL) {
                curitem->dlolditem = (*copy)(itemptr, NULL);
                if (curitem->dlolditem == NULL) {
                        free(curitem);
                        return (NULL);
                }
        }
        else {
                curitem->dlolditem = (void *) malloc(len);      /* copy of old
item */
                if (curitem->dlolditem == NULL) {
                        free(curitem);
                        return (NULL);
                }
                memcpy(curitem->dlolditem, itemptr, len);       /* get a copy o
f the old item */
        }

        /* Get pointers to functions */
        curitem->dlinit = init;
        curitem->dldeinit = deinit;
        curitem->dlcopy = copy;
        curitem->dlfreecopy = freecopy;
        curitem->dlupdate = update;
        curitem->dlcompare = compare;

        /* Call the initialization routine */
        if (init != NULL)
                (void) (*init)(itemptr);
        return (dl->first);
}


/*******************************************************************
 *                         delete_dl_item                          *
 *******************************************************************
 * Delete the given item from the display list.  The item pointer must *
 * be the one that was returned by the call to add_dl_item().  The    *
 * deinit routine will be called to remove the item from the display. *
 *                                                                 *
 * Call with:                                                      *
 *              dl      = (DISPLAY_LIST *) display list to remove item *
 *                                 from                            *
 *              item    = (DL_ITEM *) item to remove from display  *
 *                                                                 *
 * Returns:                                                        *
 *      0       if item successfully deleted                       *
 *      -1      if item not found                                  *
 *      -2      if display list corrupted                          *
```

Apr 04 1991 09:51:42 displist.c Page 4

```
 *                                                                 *
 *******************************************************************/
int delete_dl_item(dl, item)
DISPLAY_LIST *dl;
DL_ITEM *item;
{
        DL_ITEM *curitem, *prev;

        if (dl == NULL || dl->dlmagic != DL_MAGIC_NUMBER)
                return (-2);            /* bad display list */
        curitem = dl->first;            /* point to first item on list */
        while (curitem != NULL) {       /* while not end of list */
                if (curitem == item)
                        break;
                prev = curitem;         /* remember previous item */
                curitem = curitem->next;        /* point to next item */
        }
        if (curitem != item)
                return (-1);            /* unable to find item */

        /* Remove (de-initialize) the item from the display */
        (void) (*curitem->dldeinit) (curitem->dlitemptr);

        /* Free up space occupied by copy of the item */
        if (curitem->dlfreecopy != NULL)
                (void) (*curitem->dlfreecopy) (curitem->dlolditem);
        else
                free(curitem->dlolditem);

        /* If this is the first item, then make the first item point to the
         * one following the current item.
         */
        if (dl->first == curitem)
                dl->first = curitem->next;      /* first is now next item */
        else
                prev->next = curitem->next;     /* point previous item at one
                                                 * following current item
                                                 */
        free(curitem);                  /* free memory for curitem */
        return (0);
}


/*******************************************************************
 *                           update_dl                             *
 *******************************************************************
 * Update the display list.  Gets the current time to determine if *
 * we need to change the blinkstate.  Then examines each object on *
 * the display list to determine if it has changed, or, it the blink *
 * state variable changed, if it has a blink attribute set.  If either *
 * of these conditions is true, then the update routine for that   *
 * object is called and the current contents of the object are copied *
 * into the local copy, dlolditem.                                 *
 *                                                                 *
 * Call with:                                                      *
 *              dl      = (DISPLAY_LIST *) display list to update  *
 *                                                                 *
 * Returns:                                                        *
 *      0       if update successfully completed                   *
 *      -1      if there was an error                              *
 *      -2      if display list corrupted                          *
 *                                                                 *
 *******************************************************************/
int update_dl(dl)
DISPLAY_LIST *dl;
{
        int             blinkchange, cmp;
        unsigned long   curtime;
        struct timeb    ttime;
        DL_ITEM         *curitem;

        if (dl == NULL || dl->dlmagic != DL_MAGIC_NUMBER)
                return (-2);
```

```
        blinkchange = 0;
        ftime(&ttime);
        curtime = ((ttime.time & 0x3fffffL) << 10) | ttime.millitm;
        /* If it has been more than BLINK_PERIOD ms since we last blinked
         * the items, time to blink them again, so toggle the blinkstate.
         */
        if (curtime - dl->blinktime > BLINK_PERIOD) {
                blinkchange++;                  /* set blink time flag */
                dl->blinkstate ^= 1;            /* toggle the blink state */
                dl->blinktime = curtime;        /* update the time */
        }

        curitem = dl->first;
        while (curitem != NULL) {
                /* If we need to blink the item now, don't even bother to
                 * do the comparison.
                 */
                if (blinkchange && (curitem->dlattributes & DL_BLINK)) {
                        (void)(*curitem->dlupdate)(curitem->dlolditem, curitem-
>dlitemptr, dl->blinkstate);
                        /* Get a copy of the latest item */
                        if (curitem->dlcopy != NULL) {
                                curitem->dlolditem = (*curitem->dlcopy)(curitem
->dlitemptr, curitem->dlolditem);
                                if (curitem->dlolditem == NULL)
                                        return (-1);
                        }
                        else
                                memcpy(curitem->dlolditem, curitem->dlitemptr,
curitem->itemlength);
                }
                else {
                        /*
                         * Compare the old value with the new value.  If there
                         * is no user-supplied function, use the memcmp()
                         * function instead.
                         */
                        if (curitem->dlcompare == NULL) /* no user function? */
                                cmp = memcmp(curitem->dlolditem, curitem->dlite
mptr, curitem->itemlength);
                        else
                                cmp = (*curitem->dlcompare)(curitem->dlolditem,
 curitem->dlitemptr);
                        if (cmp) {              /* change? */
                                /* Call the update routine.  If the blink
                                 * attribute is not set, always display the
                                 * item.  Otherwise, pass the current blink
                                 * state.
                                 */
                                (void)(*curitem->dlupdate)(curitem->dlolditem,
curitem->dlitemptr,
                                        ((curitem->dlattributes & DL_BLINK) ? d
l->blinkstate : 1));
                                /* Get a copy of the latest item */
                                if (curitem->dlcopy != NULL) {
                                        curitem->dlolditem = (*curitem->dlcopy)
(curitem->dlitemptr, curitem->dlolditem);
                                        if (curitem->dlolditem == NULL)
                                                return (-1);
                                }
                                else
                                        memcpy(curitem->dlolditem, curitem->dli
temptr, curitem->itemlength);
                        }
                }
                curitem = curitem->next;        /* point to next object */
        }
        return (0);
}

/*****************************************************************************
```

```
 *                              redraw_dl                                    *
 *****************************************************************************
 * Redraw all the items on the display list.  This procedure just           *
 * calls the init routine for all the items.                                *
 *                                                                          *
 * Call with:                                                               *
 *              dl      = (DISPLAY_LIST *) display list to redraw           *
 *                                                                          *
 * Returns:                                                                 *
 *      0       if redraw was OK                                            *
 *      -1      if an error                                                 *
 *      -2      if display list corrupted                                   *
 *                                                                          *
 *****************************************************************************/
int redraw_dl(dl)
DISPLAY_LIST *dl;
{
        DL_ITEM *curitem;

        if (dl == NULL || dl->dlmagic != DL_MAGIC_NUMBER)
                return (-2);

        curitem = dl->first;
        while (curitem != NULL) {
                (void)(*curitem->dlinit)(curitem->dlitemptr);
                curitem = curitem->next;
        }
        return (0);
}


/*****************************************************************************
 *                              destroy_dl                                   *
 *****************************************************************************
 * Destroy the given display list.  Removes all the items on the given      *
 * display list.  Calls the deinit procedure for each item.                 *
 *                                                                          *
 * Call with:                                                               *
 *              dl      = (DISPLAY_LIST *) display list to delete           *
 *                                                                          *
 * Returns:                                                                 *
 *      0       if list successfully destroyed                              *
 *      -1      if an error                                                 *
 *      -2      if display list corrupted                                   *
 *                                                                          *
 *****************************************************************************/
int destroy_dl(dl)
DISPLAY_LIST *dl;
{
        DL_ITEM *curitem, *prev;

        if (dl == NULL || dl->dlmagic != DL_MAGIC_NUMBER)
                return (-2);

        curitem = dl->first;
        while (curitem != NULL) {
                /* Call de-initialization routine if it exists. */
                if (curitem->dldeinit != NULL)
                        (void)(*curitem->dldeinit)(curitem->dlitemptr);
                if (curitem->dlfreecopy != NULL)
                        (void)(*curitem->dlfreecopy)(curitem->dlolditem);
                else
                        free(curitem->dlolditem);
                prev = curitem;
                curitem = curitem->next;
                free(prev);
        }

        /* Make sure user doesn't mistakenly re-use this now defunct
         * display list.
         */
        dl->first = NULL;
        dl->dlmagic = 0;
```

Apr 04 1991 09:51:42 displist.c Page 7

```
        free(dl);
        return (0);
}
```

Apr 04 1991 09:51:42 fill1.c Page 1

```
/* Fill and flood routines. These are necessary because the ones in the
 * ega library don't work quite right.  Also, these can
 */

#include <stdio.h>
#include <ega.h>
#include <malloc.h>

typedef struct stack_node {
        int                     x,y;
        struct stack_node       *next;
} STACK_NODE;

typedef struct stack {
        STACK_NODE      *tos;
} STACK;


static void pop_stack();
static int push_stack();

/* fill - fill the given region bounded by the color <border>.  This is
 *      what's known as a boundary-defined fill.  An interior-defined
 *      or flood fill is given in flood.
 */
fill(border)
int border;
{
        int             stat;
        int             save_upper, save_lower;
        int             error;
        int             x, y;
        int             depth, maxdepth;
        STACK           s;
        extern unsigned char gdcolor;

        error = 0;
        s.tos = NULL;
        maxdepth = 0;
        depth = 1;
        if (push_stack(&s, gdcur_x, gdcur_y) == -1)
                return (-1);

        while (s.tos != NULL) {
                /* Save x and y */
                x = s.tos->x, y = s.tos->y;

                if (depth > maxdepth) maxdepth = depth;
                depth--;
                pop_stack(&s);          /* pop current coord off stack */

                stat = gprddot(x, y);
                if ((stat == border) || (stat == gdcolor))
                        continue;

                while (x < gdmaxcol && gprddot(x+1, y) != border)
                        x++;

                /* Fill in the scan line to the left */
                save_upper = save_lower = 1;
                while (x >= 0 && gprddot(x, y) != border) {
                        gpplot(x, y);
                        stat = gprddot(x, y-1);
                        if (save_upper && stat != border && stat != gdcolor) {
                                if (push_stack(&s, x, y-1) == -1) {
                                        error++;
                                        break;
                                }
                                depth++;
                                save_upper = 0;
                        }
                        else if (stat == border)
                                save_upper = 1;
```

Apr 04 1991 09:51:42 fill1.c Page 2

```
                        stat = gprddot(x, y+1);
                        if (save_lower && stat != border && stat != gdcolor) {
                                if (push_stack(&s, x, y+1) == -1) {
                                        error++;
                                        break;
                                }
                                depth++;
                                save_lower = 0;
                        }
                        else if (stat == border)
                                save_lower = 1;
                        x--;
                }
                if (error)
                        break;
        }
        if (error) {
                while (s.tos != NULL)
                        pop_stack(&s);
                return (-1);
        }
        return (0);
}



/* flood - flood the given region defined by the color <interior> with
 *      the current color <gdcolor>.  This is an "interior-defined" fill.
 */
flood(interior)
int interior;
{
        int             stat;
        int             save_upper, save_lower;
        int             error;
        int             x, y;
        int             depth, maxdepth;
        STACK           s;
        extern unsigned char gdcolor;

        error = 0;
        s.tos = NULL;
        maxdepth = 0;
        depth = 1;
        if (push_stack(&s, gdcur_x, gdcur_y) == -1)
                return (-1);

        while (s.tos != NULL) {
                /* Save x and y */
                x = s.tos->x;
                y = s.tos->y;

                if (depth > maxdepth) maxdepth = depth;
                depth--;
                pop_stack(&s);          /* pop current coord off stack */

                if (gprddot(x, y) != interior)
                        continue;

                while (x < gdmaxcol && gprddot(x+1, y) == interior)
                        x++;

                /* Fill in the scan line to the left */
                save_upper = save_lower = 1;
                while (x >= 0 && gprddot(x, y) == interior) {
                        gpplot(x, y);
                        if (y > 0) {
                                stat = gprddot(x, y-1);
                                if (save_upper && stat == interior) {
                                        if (push_stack(&s, x, y-1) == -1) {
                                                error++;
                                                break;
                                        }
```

Apr 04 1991 09:51:42 fill1.c Page 3

```
                                        depth++;
                                        save_upper = 0;
                                }
                                else if (stat != interior)
                                        save_upper = 1;
                        }
                        if (y < gdmaxrow) {
                                stat = gprddot(x, y+1);
                                if (save_lower && stat == interior) {
                                        if (push_stack(&s, x, y+1) == -1) {
                                                error++;
                                                break;
                                        }
                                        depth++;
                                        save_lower = 0;
                                }
                                else if (stat != interior)
                                        save_lower = 1;
                        }

                        x--;
                }
                if (error)
                        break;
        }
        if (error) {
                while (s.tos != NULL)
                        pop_stack(&s);
                return (-1);
        }
        return (0);
}



static void pop_stack(s)
STACK *s;
{
        free(s->tos);
        s->tos = s->tos->next;
}


static int push_stack(s, x, y)
STACK *s;
int     x, y;
{
        STACK_NODE      *node;

        node = (STACK_NODE *) malloc(sizeof(STACK_NODE));
        if (node == NULL)
                return (-1);
        node->x = x;
        node->y = y;
        node->next = s->tos;
        s->tos = node;
        return (0);
}
```

Apr 04 1991 09:51:42 ibmio.c Page 1

```
/*************************************************************************
 * This module is a utility module to implement all interfaces to the    *
 * IBM keyboard and monitor. It includes the ability to get and put      *
 * strings, draw inverse video, draw windows, get and put numbers,       *
 * etc... It does not, however draw any graphics (see map.c for          *
 * procedures to draw floor map graphics).                               *
 *************************************************************************/
#include <fcntl.h>
#include <string.h>
#include <stdlib.h>
#include <stdio.h>
#include <ega.h>
#include <event.h>
#include <menu.h>

#include "headers/ibmio.h"

int graphics_mode = 0;
extern int gdtext_x, gdtext_y;

char *ggets(), *rawggets();
unsigned int mgetkey();

void clearline(), dispcursor(), Type_Status_Line();

/*************************************************************************
 * Init_IBM_IO initializes serial ports.                                 *
 *************************************************************************/
void Init_IBM_IO(ser_disable)
int ser_disable;
{
    int error;

    /* Open com1 for output */
    Reset_Link(&error, ser_disable);
}



/*************************************************************************
 * Finalize_IBM_IO shuts down all open I/O channels.                     *
 *************************************************************************/
void Finalize_IBM_IO()
{
    int err;

    /* Close COM1 */
    Close_Link(&err);
}


/*************************************************************************
 * Clear uses the EGA routine to clear the screen.                       *
 *************************************************************************/
void Clear()
{
    gpcolor(BLACK);
    gpclear(0,0, gdmaxcol, gdmaxrow);
}


/*************************************************************************
 * Get_String inputs a string from the keyboard using the EGA graphics   *
 * package. It echos all printable charaters and backspaces on ASCII 8   *
 * (CNTRL-H). It takes as input a pointer to string storage and returns  *
 * the string typed, null terminated when a carrige return is typed.     *
 *************************************************************************/
int  Get_String(str_ptr)
char *str_ptr;
{
    rawggets(str_ptr, "", "", gdtext_y/14, gdtext_x/8, WHITE, BLACK);
    return (strlen(str_ptr));
}
```

Apr 04 1991 09:51:42 ibmio.c Page 2

```


/*************************************************************************
 * Get_Integer gets a string representing a number from the keyboard     *
 * and converts it to a integer. It accepts a pointer to an integer on   *
 * input.  Since it uses Get_String, described above, it allows          *
 * backspacing and echoing and returns on a carrage return.              *
 *************************************************************************/
int Get_Integer(int_ptr)
int *int_ptr;
{
    char str[100];
    int  length;

    /* Get the user input number string and do an in memory conversion */
    length = Get_String(str);
    if (length)
        sscanf(str, "%d", int_ptr);
    return(length);
}


/*************************************************************************
 * PutString writes the string at the given (row,col) location. It       *
 * first clears out the field.                                           *
 *************************************************************************/
void PutString(row, col, str)
int  row, col;
char *str;
{
    if (row == 25 && gdmaxrow > 349)
        row = (gdmaxrow-13)/14;
    text_move((col-1)*8, (row-1)*14+10);
    text_out(str);
}


/* normal_draw - draw a string using normal attributes (IWHITE and BLUE) */
void normal_draw(row, col, str)
int row, col;
char *str;
{
        text_foreground(IWHITE);
#if 1
        text_background(BLUE);
#else
        text_background(BLACK);
#endif
        PutString(row, col, str);
}


/* alarm_draw - draw a string using Alarm attributes (YELLOW and RED) */
void alarm_draw(row, col, str)
int row, col;
char *str;
{
        text_foreground(YELLOW);
        text_background(RED);
        PutString(row, col, str);
}


/*************************************************************************
 * PutInteger writes the string equivalent of an integer (or byte for    *
 * that matter) at the given (row,col) location. It first clears out     *
 * the field.                                                            *
 *************************************************************************/
void PutInteger(row, col, i)
int  row,col,i;
{
    char str[20];

```

```
    sprintf(str, "%d", i);
    PutString(row, col, str);
}


/*********************************************************************
 * Get_Value will print the string pointed to by str_ptr at row, col.  *
 * It then inputs astring and converts it to integer format. If the    *
 * integer is outside of the inputed limits, it starts over. It returns *
 * the integer when it is in between the limits.                      *
 *********************************************************************/
int Get_Value(row, col, lLimit, hLimit, defalt, str_ptr)
int  row, col, lLimit, hLimit, defalt;
char *str_ptr;
{
    int  length, i, j;

    text_foreground(IWHITE);
    text_background(BLACK);
    /* Draw the string */
    PutString(row, col, str_ptr);

    /* Get an integer inputed from the keyboard */
    length = Get_Integer(&i);
    if (length == 0)
        i = defalt;

    /* While the integer is not within the specified limits do */
    while ((i > hLimit) || (i < lLimit)) {

        /* Beep and redraw the string */
        putch(7);
        PutString(row, col, str_ptr);

        /* Clear away the inputed integer and get a new one. */
        for(j=0;j<length;j++) text_out(" ");
        PutString(row, col, str_ptr);
        length = Get_Integer(&i);
    }

    return (i);
}


/*********************************************************************
 * Box_Text is a high resolution graphics routine, used primarily by   *
 * DrawWindow, to  draw a box around the specified text at row,col.    *
 * This will only work if the text is drawn first, since drawing the   *
 * text will erase the box.                                            *
 *********************************************************************/
void Box_Text(row, col, text)
int  row, col;
char *text;
{
    int  x1, y1, x2, y2;

    /* Box the text */
    x1 = col * 8 - 9;
    y1 = row * 14 - 14;
    x2 = x1 + strlen(text) * 8;
    y2 = y1 + 14;
    gpmove(x1, y1);
    gpcolor(WHITE);
    gprect(x2, y2);
}


/*********************************************************************
 * Inv_Erase erases the specified inverse text at row,col. Drawing a   *
 * string of blanks will not completely erase the field.               *
 *********************************************************************/
void Inv_Erase(row, col, text)
int  row, col;
```

```
char *text;
{
    int len;

    /* Change the graphics color back to normal */
    gpcolor(WHITE);

    len = strlen(text) * 8;
    gpmove((col-1)*8, (row-1)*14);
    gpbox((col-1)*8 + len-1, (row-1)*14 + 13);
}


/*********************************************************************
 * Inv_Draw draws the specified inverse text at row,col.               *
 *********************************************************************/
void Inv_Draw(row, col, text)
int row, col;
char *text;
{
    text_background(WHITE);
    text_foreground(BLACK);

    PutString(row, col, text);

    text_background(BLACK);
    text_foreground(WHITE);
}


/*********************************************************************
 * Get_Inv_String inputs a string from the keyboard using the EGA      *
 * graphics package. It echos all printable charaters and backspaces   *
 * on ASCII 8 (CNTRL-H). It takes as input a pointer to string storage *
 * and returns the string typed, null terminated when a carrige return *
 * is typed.                                                           *
 *********************************************************************/
int  Get_Inv_String(str_ptr)
char *str_ptr;
{
    rawgets(str_ptr, "", "", gdtext_y/14, gdtext_x/8, BLACK, WHITE);
    return (strlen(str_ptr));
}


/*********************************************************************
 * Get_Inv_Integer gets a string representing a number from the        *
 * keyboard and converts it to a integer. It accepts a pointer to an   *
 * integer on input. Since it uses Get_String, described above, it     *
 * allows backspacing and echoing and returns on a carrage return.     *
 *********************************************************************/
int GetInvInteger(int_ptr)
int *int_ptr;
{
    char str[100];
    int  length;

    /* Get the user input number string and do a in memory conversion */
    length = Get_Inv_String(str);
    sscanf(str, "%d", int_ptr);
    return(length);
}


/*********************************************************************
 * DrawWindow clears out the area of the screen specified by row,col   *
 * and width and height, and draws a window box with the "title"       *
 * centered at the top.                                                *
 *********************************************************************/
void DrawWindow(row, col, width, height, title)
int  row, col, width, height;
char *title;
{
```

```
    char str[80];
    int tx, x1, y1, x2, y2;

#if 0
    /* Clear out window area */
    for(i=0;i<=height;i++) {
        gotoxy(col-1, row+i-1);
        for(j=0;j<=width;j++) gprintf(" ");
    }
#endif

    /* Draw the window box */
    x1 = col * 8 - 5;
    y1 = row * 14 -1;
    x2 = x1 + width * 8;
    y2 = y1 + height * 14 + 1;

    /* Draw the title in box text */
    if (title != NULL) {
        sprintf(str, " %s ", title);            /* add space on either side */
        tx = col + (width - strlen(str))/2 + 1;
        normal_draw(row, tx, str);
/*      Box_Text(row, tx, str);*/
    }
    gpmove(x1, y1);
    gprect(x2, y2);

}

/*********************************************************************
 * Draw_Status_Line clears out line 24 of the display (at the bottom    *
 * of the screen) and draws the inputed string there in inverse display *
 * with space fill at the end of the line.                              *
 *********************************************************************/
void Draw_Status_Line(str)
char *str;
{
    char str1[100];
    int  l, i;

    /* Copy the inputed string into an 81 char array */
    strcpy(str1, str);

    /* Space fill from the end of the string to the end of the array */
    l = strlen(str);
    str1[l] = ' ';
    for(i=l+1;i<80;i++) str1[i] = ' ';

    /* Place a null (end of string marker) at the end of the array */
    str1[80] = '\0';

    /* Draw the string on the status line */
    Inv_Draw(25, 1, str1);
}


/*********************************************************************
 * GetSLValue will print the string pointed to by str_ptr in the status *
 * line It then inputs astring and converts it to integer format. If    *
 * the integer is outside of the inputed limits, it starts over. It     *
 * returns the integer when it is in between the limits.                *
 *********************************************************************/
int GetSLValue(lLimit, hLimit, prompt)
int  lLimit, hLimit;
char *prompt;
{
    char        str[100];
    int         i;

    do {
        if (ggets(str, prompt, "") == NULL)
                return (lLimit);
```

```
        if (str[0] == EOS)
                return (lLimit);
        i = atoi(str);
    } while ((i > hLimit) || (i < lLimit));
    return (i);
}


/*********************************************************************
 * Draw_Date accepts a pointer to a structure of time_type and draws a  *
 * date string at row,col from the time fields. The string pointer      *
 * "str" allows the calling procedure to get the date string back for   *
 * later use.                                                           *
 *********************************************************************/
void Draw_Date(timePtr, row, col, str)
time_type *timePtr;
int       row, col;
char      *str;
{
    char      str2[20];

    if (str == 0L) str = str2;
    sprintf(str, "%d/%d/%d", timePtr->month, timePtr->day_of_month, timePtr->ye
ar);
    normal_draw(row, col, str);
}


/*********************************************************************
 * Draw_Time accepts a pointer to a structure of time_type and draws a  *
 * time string at row,col from the time fields. The string pointer      *
 * "str" allows the calling procedure to get the time string back for   *
 * later use. The parameter tFlag lets Draw_Time know it should update  *
 * the time_type structure first.                                       *
 *********************************************************************/
void Draw_Time(timePtr, row, col, str, tFlag)
time_type *timePtr;
int       row, col;
char      *str;
int       tFlag;
{
    char str2[80];

    if (str == NULL)
        str = &str2[0];
    if (tFlag)
        clk_gettime(timePtr);
    sprintf(str, "%02d:%02d:%02d.%d%d", timePtr->hours, timePtr->minutes,
                 timePtr->seconds, timePtr->tenths, timePtr->hundredths);
    normal_draw(row, col, str);
}


/* ggets - get a string from the keyboard.  This is a more glorious version
 *      of the usual gets() function in that it requires:
 *              1. A prompt string.
 *              2. An initial value string (may be "")
 *      **** It assumes that the screen I/O takes place on line 24. ****
 *
 * Call with:   str     = name of string to put characters into
 *              prompt  = string to prompt user with
 *              initial = initial value of str. may be backspace over.
 *
 * Returns:     str     if a string gotten
 *              NULL    if user bombed out
 */
char *ggets(str, prompt, initial)
char *str, *prompt, *initial;
{
        return (rawggets(str, prompt, initial, 24, 0, WHITE, BLACK));
}
```

```
/* rawggets - get a string from the keyboard.  This is a more glorious version
 *      of the usual gets() function in that it requires:
 *              1. A prompt string.
 *              2. An initial value string (may be "")
 *
 * Call with:   str     = name of string to put characters into
 *              prompt  = string to prompt user with
 *              initial = initial value of str. may be backspace over.
 *              row     = row to put prompt at
 *              col     = col to put prompt at
 *              fore    = foreground color
 *              back    = background color
 *
 * Returns:     str     if a string gotten
 *              NULL    if user bombed out
 */
char *rawggets(str, prompt, initial, row, col, fore, back)
char *str, *prompt, *initial;
int row, col, fore, back;
{
        char chstr[5];
        int orgcol;
        int key;
        int ix, quit;
        static char prev[100] = {EOS};

        if (row == 24 && gdmaxrow > 349)
                row = (gdmaxrow-13)/14;
        orgcol = col;
        strcpy(str, initial);           /* copy initial value to str */
        gpmerge(MRPL);

        gpmove(col*8, row*14);
        gpcolor(back);
        gpbox(639, row*14+13);

        text_foreground(fore);
        text_background(back);
        text_move(0, row*14+10);
        text_out(prompt);
        ix = 0;
        if (strlen(initial)) {          /* if initial value, display it */
                text_move((strlen(prompt)+orgcol)*8, row*14+10);
                text_out(initial);
                ix = strlen(initial);           /* character index */
        }
        col = strlen(prompt) + strlen(initial) + orgcol;

        text_move(col*8, row*14+10);
        text_out("_");
        text_move(col*8, row*14+10);

        quit = NO;
        while (!quit) {
                key = mgetkey();                /* get next key typed */
                if ((key & 0x7f) != 0)          /* if not a function key */
                        key &= 0x7f;            /* strip off scan code */

                switch (key) {
                case 0x1b:                      /* bomb out? */
                case '\r':                      /* finished? */
                case F10:
                    quit = YES;                 /* set flag */
                    break;

                case F3:                        /* repeat previous line? */
                case 0x12:                      /* ^R */
                        text_move((strlen(prompt)+orgcol)*8, row*14+10);
                        text_out(prev);
                        ix = strlen(prev);              /* character index */
                        strcpy(str, prev);
                        col = strlen(prompt) + strlen(prev) + orgcol;
                        text_move(col*8, row*14+10);
```

```
                        text_out("_");
                        text_move(col*8, row*14+10);
                        break;

                /* Check for backspace */
                case 0x08:                      /* ^H? */
                case 0x4b00:                    /* left arrow? */
                case 0x5300:                    /* Del? */
                    if (ix > 0) {               /* any characters typed? */
                        --col;
                        text_out(" ");          /* erase cursor */
                        text_move(col*8, row*14+10);    /* erase prev char */
                        text_out(" ");
                        text_move(col*8, row*14+10);
                        text_out("_");
                        text_move(col*8, row*14+10);
                        ix--;                   /* back up char index */
                    }
                    break;

                /* Check for line cancel */
                case 0x15:                      /* ^U? */
                case 0x18:                      /* ^X? */
                case 0x19:                      /* ^Y? */
                    col = orgcol+strlen(prompt);        /* go back to end of pr
ompt */
                    gpmove(col*8, row*14);
                    gpcolor(back);
                    gpbox(639, row*14+13);              /* clear to background
*/
                    text_move(col*8, row*14+10);
                    text_out("_");              /* draw cursor */
                    text_move(col*8, row*14+10);        /* move back to cursor
pos */
                    ix = 0;                     /* back at first char */
                    break;

                /* Catch the rest of the characters */
                default:
                    if (key >= ' ') {   /* ignore control chars */
                        col++;
                        chstr[0] = (char) key;
                        chstr[1] = EOS;
                        text_out(chstr);
                        text_out("_");  /* draw cursor */
                        text_move(col*8, row*14+10);
                        str[ix++] = (char) key;
                    }
                    break;
                }
        }

        if (key == 0x1b || key == F10) { /* if wants to just quit */
                str[0] = EOS;           /* terminate the string */
                return (NULL);
        }
        str[ix] = EOS;
        strncpy(prev, str, 99);
        return (str);
}

/*************************************************************************
 * Clear_Line uses EGA graphics to clear the specified line. Lines are  *
 * numbered 1 through 25 with starting with the top of the screen.      *
 ************************************************************************/
void Clear_Line(row)
int row;
{
        if (row == 25 && gdmaxrow > 349)
                clearline((gdmaxrow-13)/14, WHITE, BLACK);
        else
                clearline(row-1, WHITE, BLACK);
```

```
}


/* clearline - clear a display line to the given forebround and
 *        background colors
 *
 * Call with:    line = row to be cleared (0 - 24)
 *               fore = foreground color to use
 *               back = background color to use
 */
void clearline(line, fore, back)
int line, fore, back;
{
        gpmove(0, line*14);
        gpcolor(back);
        gpbox(639, line*14+13);
}
```

Apr 04 1991 09:51:42 ibmrtclk.c Page 1

```
/****************************************************************************
 * ibmrtclk.c contains routines that read the IBM's real time clock and return
 * information in various formats. It also encapsulates the time_type data
 * structure. Also included is a routine to wait a given number of seconds.
 ****************************************************************************/
#include <dos.h>
#include "headers/rtclk.h"


#define TOD_INT         0x1a    /* BIOS time-of-day interrupt */
#define TPS             18      /* number of ticks per second */

waitms();


char *str_time(void);


/****************************************************************************/
/* clk_gettime gets the time of day and date from the IBM's internal clock  */
/* and fills out the time_type data structure pointed to by "time".         */
/****************************************************************************/
void clk_gettime(time)
time_type *time;
{
    union REGS in, out;

    /* Get the time field. */
    in.h.ah = 0x2c;
    intdos(&in, &out);
    time->hours = (unsigned char) out.h.ch;
    time->minutes = (unsigned char) out.h.cl;
    time->seconds = (unsigned char) out.h.dh;
    time->tenths = (unsigned char) out.h.dl / 10;
    time->hundredths = (unsigned char) out.h.dl % 10;

    /* Get the date field */
    in.h.ah = 0x2a;
    intdos(&in, &out);
    time->day_of_month = (unsigned char) out.h.dl;
    time->month = (unsigned char) out.h.dh;
    time->year = (unsigned int) out.x.cx;
}


/*********************************************************************
 *                             str_time                              *
 *********************************************************************
 * Return a pointer to a string containing the current time.         *
 *********************************************************************/
char *str_time()
{
        static char timestr[20];
        time_type ts;

        clk_gettime(&ts);
        sprintf(timestr, "%02d:%02d:%02d.%d%d", ts.hours, ts.minutes,
                              ts.seconds, ts.tenths, ts.hundredths);
        return (timestr);
}


/*********************************************************************
 *                           strtime_to_100s                         *
 *********************************************************************
 * Convert the given string in the format HH:MM:SS.dd to hundredths of *
 * seconds.  The input format must be conformed to quite rigidly      *
 * (including leading/trailing zeros).                                *
 *********************************************************************/
long strtime_to_100s(stime)
register char *stime;
{
        long    value;
```

Apr 04 1991 09:51:42 ibmrtclk.c Page 2

```

        value =  (*stime++ - '0') * 3600000L;   /* get hours */
        value += (*stime++ - '0') * 360000L;
        stime++;                        /* skip the colon */
        value += (*stime++ - '0') * 60000L;     /* get the minutes */
        value += (*stime++ - '0') * 6000L;
        stime++;                        /* skip the colon */
        value += (*stime++ - '0') * 1000;       /* get the seconds */
        value += (*stime++ - '0') * 100;
        stime++;                        /* skip the decimal point */
        value += (*stime++ - '0') * 10;
        value += (*stime- '0');
        return (value);
}


/*********************************************************************
 *                            clktime_to_100s                        *
 *********************************************************************
 * Convert the given time_type structure to hundredths of seconds.   *
 *********************************************************************/
long clktime_to_100s(time)
register time_type *time;
{
        long    value;

        value = (long)  time->hours * 360000L +
                        time->minutes * 6000L +
                        time->seconds * 100L +
                        time->tenths*10 +
                        time->hundredths;
        return (value);
}

/****************************************************************************/
/* get_long_time calculates a single long time value that represents the   */
/* number of seconds in the current year. Useful for eliminating roll over  */
/* problems when comparing time values.                                     */
/****************************************************************************/
unsigned long get_long_time()
{
    unsigned long acc;
    time_type time;

    clk_gettime(&time);
    acc = (unsigned long) time.month * 31L;
    acc = (acc + (unsigned long) time.day_of_month) * 24L;
    acc = (acc + (unsigned long) time.hours) * 60L;
    acc = (acc + (unsigned long) time.minutes) * 60L;
    return (acc+ (unsigned long)time.seconds);
}


/****************************************************************************/
/* WaitSeconds will wait "x" seconds before returning. Actually it waits    */
/* somewhere between x-1 and x seconds due to second rollover.              */
/****************************************************************************/
void WaitSeconds(x)
int x;
{
    while (x--)
        waitms(1000);
}


/*********************************************************************
 *                              mstime                               *
 *********************************************************************
 * Get the current time in milliseconds.    Relies on the rdtimer()  *
 * assembly language routine, which has a period of (1/1.193182E6)   *
 *********************************************************************/
unsigned long mstime()
{
```

Apr 04 1991 09:51:42 ibmrtclk.c Page 3

```
        extern unsigned long rdtimer();
        return (rdtimer() / 1193L);
}


/*************************************************************************
 *                               waitms                                  *
 *************************************************************************
 * Wait the given number of milliseconds before returning.  Relies on   *
 * the rdtimer() assembly language routine, which has a period of       *
 * (1/1.193182E6)                                                        *
 *************************************************************************/
waitms(nms)
unsigned int nms;
{
        unsigned long start_time, delta_time;
        extern unsigned long rdtimer();

        start_time = rdtimer();
        delta_time = (nms * 11932L + 5) / 10L;
        while ((rdtimer() - start_time) < delta_time)
                ;
        return (0);
}
```

```c
/*********************************************************************
 *                          indisp.c                                 *
 *********************************************************************
 * This file contains all the display manipulation routines used by  *
 * the intrusion detection screen.                                   *
 *                                                                   *
 * Created:     6 April 89                                           *
 *                                                                   *
 * Bugs:                                                             *
 *      Too many globals.                                            *
 *********************************************************************/

#include <stdio.h>
#include <string.h>
#include <math.h>
#include <ega.h>

#define  DOS 1
#include "headers/ibmio.h"


/* Define positions of objects on the screen */
#define MBASE           3               /* Motion detection display base */
#define IR_DISP         (MBASE+1)       /* IR display */
#define MW_DISP         (MBASE+2)       /* microwave */
#define OP_DISP         (MBASE+3)       /* optical */
#define VB_DISP         (MBASE+4)       /* vibration */
#define HR_DISP         (MBASE+5)       /* hearing */
#define US_DISP         (MBASE+6)       /* ultrasonic */
#define VD_DISP         (MBASE+7)       /* video */
#define THRESH_DISP     (MBASE+3)       /* threshold value */
#define COMP_DISP       (MBASE+4)       /* composite threat */
#define THREAT_DISP     (MBASE+6)       /* current threat level */

#define EBASE           12              /* environmental conditions base */
#define TEMP_DISP       (EBASE+1)       /* temperature */
#define PRESS_DISP      (EBASE+4)       /* barometric pressure */
#define HUMID_DISP      (EBASE+7)       /* relative humidity */
#define TOXIC_DISP      (EBASE+1)       /* toxic gas */
#define SMOKE_DISP      (EBASE+4)       /* smoke detector */
#define FLOOD_DISP      (EBASE+7)       /* flooding */

#define RBASE           12              /* robart conditions base */
#define XCOORD_DISP     (RBASE+2)       /* robot x coordinate */
#define YCOORD_DISP     (RBASE+3)       /* robot y coordinate */
#define RHDG_DISP       (RBASE+4)       /* robot heading */
#define RBRG_DISP       (RBASE+5)       /* robot bearing */
#define BATT_DISP       (RBASE+2)       /* battery voltage */
#define ITEMP_DISP      (RBASE+5)       /* internal temperature */
#define PR_DISP         (RBASE+7)       /* packet rate */
#define ERROR_DISP      (RBASE+8)       /* error line */

/* Constant arrays for optical and infrared sensor positions */
int irPos[5] = {
    60, 17, -17,  -60, 0};

int omPos[4] = {
    135, 45, -45, -135};

/****************************** External globals *****************************/
/* String for time read in from log file (used during replay) */
extern char     timeStr[20];
extern char     map_overlay_enabled;

extern time_type            cur_time;

/* Threshold value for alarm status. */
extern int      threshold;
extern int      composite;
extern int      log_threshold;

extern int      local_alarm,    /* local alarm enable/disable flag */
                remote_alarm;   /* remote alarm enable/disable flag */
```

```c

extern int          IR_bearing,     /* last IR bearing */
                    OP_bearing,     /* last optical bearing */
                    US_bearing,     /* last ultrasonic bearing */
                    HR_bearing;     /* last hearing bearing */

extern char         map_displayed;
extern int          sonar_mode;     /* sonar map is overlaying bottom of screen */
extern int          sonar_confirm;
extern unsigned long        mastTimeLong, macurTimeLong;

extern int          pack_rate;
extern long         pack_count;
extern word         crc_errors;
extern drType       robart;         /* robot's postion,heading */
extern int          intruder_bearing, intruder_range;

extern int          logMode;        /* data logger mode */

extern int          debug_mode;


/****************** Functions that don't return ints ******************/
unsigned long matime();
unsigned long get_long_time();

void    local_toggle(void),
        remote_toggle(void),
        threshup(void),
        threshdown(void),
        stop_replay(cond_packets *pcur_cond, stat_packets *pcur_stat);


/************************************************************************/
/* Dump_Robot_Status_Data takes two pointers to robot status data structures */
/* as input. The newest data structure (*newPtr) represents the latest      */
/* decoded robot status sensor report. oldPtr points to a structure         */
/* representing the next to last. This routine compares the two and updates */
/* any field on the screen that has changed.                                 */
/************************************************************************/
void Dump_Robot_Status_Data(newPtr, oldPtr)
rStatus *newPtr, *oldPtr;
{
    if (logMode == REPLAY)
        normal_draw(MBASE-1, 70, timeStr);
    else Draw_Date(&cur_time, MBASE-1, 1, 0L);

    /* If the map is displayed on the lower half of the screen, don't plot
     * the status packet on top of it.
     */
    if (sonar_mode)
        return;

    /* If the toxic gas sensor value has changed then update it. */
    if (newPtr->toxic_gas != oldPtr->toxic_gas) {
        if (newPtr->toxic_gas) alarm_draw(TOXIC_DISP+1, 69, "ALARM");
        else {
            normal_draw(TOXIC_DISP+1, 69, " OFF ");
        }
    }

    /* If the smoke sensor value has changed then update it. */
    if (newPtr->smoke != oldPtr->smoke) {
        if (newPtr->smoke) alarm_draw(SMOKE_DISP+1, 69, "ALARM");
        else {
            normal_draw(SMOKE_DISP+1, 69, " OFF ");
        }
    }

    /* If the flooding sensor value has changed then update it. */
    if (newPtr->flooding != oldPtr->flooding) {
        if (newPtr->flooding) alarm_draw(FLOOD_DISP+1, 69, "ALARM");
        else {
```

Apr 04 1991 09:51:42 indisp.c Page 3

```
            normal_draw(FLOOD_DISP+1, 69, " OFF ");
        }
    }

    /* If the internal temperature has changed then update it. */
    if (strcmp(newPtr->int_temp, oldPtr->int_temp))
        normal_draw(ITEMP_DISP+1, 28, newPtr->int_temp);

    /* If the external temperature has changed then update it. */
    if (strcmp(newPtr->ext_temp, oldPtr->ext_temp))
        normal_draw(TEMP_DISP+1, 50, newPtr->ext_temp);

    /* If the battery voltage has changed then update it. */
    if (strcmp(newPtr->voltage, oldPtr->voltage))
        normal_draw(BATT_DISP+1, 28, newPtr->voltage);

    /* If the relative humidity has changed then update it. */
    if (strcmp(newPtr->humidity, oldPtr->humidity))
        normal_draw(HUMID_DISP+1, 51, newPtr->humidity);

#if 0
    /* If the barometeric pressure has changed then update it. */
    if (strcmp(newPtr->pressure, oldPtr->pressure))
        normal_draw(PRESS_DISP+1, 49, newPtr->pressure);

    /* If the error code has changed then draw it in the error line */
    if (newPtr->error != oldPtr->error) {
        if (newPtr->error != FALSE) {
            sprintf(str, "Error code = %d", newPtr->error);
            Draw_Error_Line(str);
        }
        else Draw_Error_Line("");
    }
#endif
}


/****************************************************************************/
/* Dump_Intruder_Data takes two pointers to intruder sensor data structures */
/* as input. The newest data structure (*newPtr) represents the latest      */
/* decoded intrusion sensor report. oldPtr points to a structure            */
/* representing the next to last. This routine compares the two and updates */
/* any field on the screen that has changed.                                */
/****************************************************************************/
void Dump_Intruder_Data(newPtr, oldPtr)
cond *newPtr, *oldPtr;
{
    char str[40];

    if (logMode == REPLAY)
        normal_draw(MBASE-1, 70, timeStr);
    else {
        update_time_display();
        update_packet_display();
    }

    if (newPtr->sen_status != oldPtr->sen_status) {

        update_IR_active(newPtr->sen_status, oldPtr->sen_status);
        update_MW_active(newPtr->sen_status, oldPtr->sen_status);
        update_OP_active(newPtr->sen_status, oldPtr->sen_status);
        update_VB_active(newPtr->sen_status, oldPtr->sen_status);
        update_HR_active(newPtr->sen_status, oldPtr->sen_status);
        update_US_active(newPtr->sen_status, oldPtr->sen_status);
        update_VD_active(newPtr->sen_status, oldPtr->sen_status);
    }

    IR_disp_update(newPtr->sen_status, newPtr->ir, oldPtr->ir,
                   newPtr->irAngle, oldPtr->irAngle);
    MW_disp_update(newPtr->sen_status, newPtr->mw.stat, oldPtr->mw.stat,
                   (byte) newPtr->mw.sens, (byte) oldPtr->mw.sens);
    OP_disp_update(newPtr->sen_status, newPtr->om, oldPtr->om,
                   newPtr->omAngle, oldPtr->omAngle);
```

Apr 04 1991 09:51:42 indisp.c Page 4

```
    VB_disp_update(newPtr->sen_status, newPtr->vb, oldPtr->vb);
    HR_disp_update(newPtr->sen_status, newPtr->hr.stat, oldPtr->hr.stat,
                   newPtr->hr.angle, oldPtr->hr.angle);
    if (sonar_mode) {
        if (sonar_confirm)
            Inv_Draw(US_DISP, 15, "US1");
        else
            normal_draw(US_DISP, 15, "US1");
    }

    /* If local alarms are enabled and the threshold is exceeded, sound
     * a bell.
     */
    /* If the alarm assessment value has changed then display it */
    if (newPtr->alarm != oldPtr->alarm) {
        composite = newPtr->alarm + sonar_confirm;
        sprintf(str, "COMPOSITE = %3d", composite);
        if (composite > threshold) {
            alarm_draw(COMP_DISP, 62, str);
        }
        else {
            normal_draw(COMP_DISP, 62, str);
        }
    }
}


/*********************************************************************
 * threshup - bump the alarm threshold by 1.                         *
 *********************************************************************/
void threshup()
{
    char str[80];

    threshold++;
    sprintf(str, "THRESHOLD = %3d", threshold);
    normal_draw(THRESH_DISP, 62, str);
}

/*********************************************************************
 * threshdown - decrment the alarm threshold by 1.                   *
 *********************************************************************/
void threshdown()
{
    char str[80];

    if (--threshold < 1)
        threshold = 1;
    sprintf(str, "THRESHOLD = %3d", threshold);
    normal_draw(THRESH_DISP, 62, str);
}

/*************************************************************************/
/* Draw_Error_Line writes the string pointed to by "str" in inverse video, */
/* used for the intruder display only.                                    */
/*************************************************************************/
void Draw_Error_Line(str)
char *str;
{
    char            str1[40];
    int             i;
    unsigned int    l;

    if (sonar_mode)
        return;
    strcpy(str1, str);
    l = strlen(str);
    str1[l] = ' ';
    for(i=l+1;i<38;i++) str1[i] = ' ';
    str1[38] = '\0';
    Inv_Draw(ERROR_DISP, 2, str1);
}
```

Apr 04 1991 09:51:42 indisp.c Page 5

```c

/*****************************************************************************/
/* Clear_Robot_Status_Structure sets the internal data structure for the    */
/* robot status packet to a nominal state.                                   */
/*****************************************************************************/
void Clear_Robot_Status_Structure(rsPtr)
rStatus *rsPtr;
{
    rsPtr->toxic_gas = 255;
    rsPtr->smoke = 255;
    rsPtr->flooding = 255;
    rsPtr->int_temp[0] = '\0';
    rsPtr->ext_temp[0] = '\0';
    rsPtr->voltage[0] = '\0';
    rsPtr->humidity[0] = '\0';
    rsPtr->pressure[0] = '\0';
    rsPtr->error = 255;
}


/*****************************************************************************/
/* Clear_Condition_Structure sets the internal data structure for intruder  */
/* sensor packet to a nominal state.                                         */
/*****************************************************************************/
void Clear_Condition_Structure(cPtr)
cond *cPtr;
{
    int i;

    cPtr->sen_status = 255;
    for(i=0;i<5;i++) cPtr->ir[i] = 255;
    cPtr->irAngle = NO_ANGLE;
    cPtr->mw.stat = 255;
    cPtr->mw.sens = 255;
    cPtr->sn.stat = 255;
    cPtr->sn.range = -1.0;
    cPtr->sn.angle = NO_ANGLE;
    for(i=0;i<4;i++) cPtr->om[i] = 255;
    cPtr->omAngle = NO_ANGLE;
    cPtr->hr.angle = NO_ANGLE;
    for (i = 0; i < 3; i++)
        cPtr->hr.stat[i] = 255;
    cPtr->vb = 255;
    cPtr->alarm = 0;
}


/*****************************************************************************/
/* Setup_Intruder_Display will install all of the static fields of the      */
/* standard intruder display.                                                */
/*****************************************************************************/
void Setup_Intruder_Display()
{
    char        str[80];

#if 1
    gpcolor(BLUE);
#else
    gpcolor(BLACK);
#endif
    gpclear(0,0, gdmaxcol, gdmaxrow);
    gpcolor(WHITE);

    /* Draw the title string */
    normal_draw(MBASE-1, 23, "ROBART-II REALTIME SECURITY DISPLAY");

    /* Draw the current date and time */
    clk_gettime(&cur_time);
    Draw_Date(&cur_time, MBASE-1, 1, 0L);

    /* Motion Detection window labels */
    normal_draw(IR_DISP, 2,  "INFRARED");
    normal_draw(MW_DISP, 2,  "MICROWAVE");
```

Apr 04 1991 09:51:42 indisp.c Page 6

```c
    normal_draw(OP_DISP, 2,  "OPTICAL");
    normal_draw(VB_DISP, 2,  "VIBRATION");
    normal_draw(HR_DISP, 2,  "HEARING");
    normal_draw(US_DISP, 2,  "ULTRASONIC");
    normal_draw(VD_DISP, 2,  "VIDEO");
    normal_draw(IR_DISP, 15, "IR1");
    normal_draw(IR_DISP, 20, "IR2");
    normal_draw(IR_DISP, 25, "IR3");
    normal_draw(IR_DISP, 30, "IR4");
    normal_draw(IR_DISP, 35, "IR5");
    normal_draw(MW_DISP, 15, "MW1");
    normal_draw(OP_DISP, 15, "OP1");
    normal_draw(OP_DISP, 20, "OP2");
    normal_draw(OP_DISP, 25, "OP3");
    normal_draw(OP_DISP, 30, "OP4");
    normal_draw(VB_DISP, 15, "VB1");
    normal_draw(HR_DISP, 15, "HR1");
    normal_draw(HR_DISP, 20, "HR2");
    normal_draw(HR_DISP, 25, "HR3");
    normal_draw(US_DISP, 15, "US1");
    normal_draw(IR_DISP, 41, "BEARING =");
    normal_draw(MW_DISP, 41, "SENS.   =");
    normal_draw(OP_DISP, 41, "BEARING =");
    normal_draw(HR_DISP, 41, "BEARING =");
    normal_draw(US_DISP, 41, "BEARING =");
    sprintf(str, "THRESHOLD = %3d", threshold);
    normal_draw(THRESH_DISP, 62, str);
    normal_draw(COMP_DISP, 62, "COMPOSITE =");
    normal_draw(THREAT_DISP, 62, "THREAT LEVEL: 0");

    /* Environmental conditions window labels */
    normal_draw(TEMP_DISP, 46, "TEMPERATURE");
    normal_draw(PRESS_DISP, 42, "BAROMETRIC PRESSURE");
    normal_draw(HUMID_DISP, 43, "RELATIVE HUMIDITY");
    normal_draw(TOXIC_DISP, 67, "TOXIC GAS");
    normal_draw(SMOKE_DISP, 69, "SMOKE");
    normal_draw(FLOOD_DISP, 68, "FLOODING");

    /* Robot status window labels */
    sprintf(str, "XCOORD  = %3d", robart.x);
    normal_draw(XCOORD_DISP, 3,  str);
    sprintf(str, "YCOORD  = %3d", robart.y);
    normal_draw(YCOORD_DISP, 3,  str);
    sprintf(str, "HEADING = %3d", robart.dir);
    normal_draw(RHDG_DISP, 3,  str);
    sprintf(str, "BEARING = %3d", robart.headDir);
    normal_draw(RBRG_DISP, 3,  str);
    normal_draw(BATT_DISP, 21, "BATTERY VOLTAGE");
    normal_draw(ITEMP_DISP, 19, "INTERNAL TEMPERATURE");
    normal_draw(PR_DISP, 2,  "PACK RATE =");

/*
    normal_draw(ERROR_DISP, 2,  "ERROR");
*/
    /* Draw the error and status lines in inverse */
    Draw_Error_Line("");

    /* Draw all of the window outlines */
    DrawWindow(MBASE,  1, 79, 7, NULL);
    DrawWindow(MBASE+2, 61, 18, 5, "ALARM");
    DrawWindow(RBASE, 1, 39, 9, "ROBOT STATUS");
    DrawWindow(EBASE,41, 39, 9, "ENVIRONMENTAL CONDITIONS");
    DrawWindow(RBASE+1, 2, 15, 4, "POSITION");

    /* Draw field separation lines inside Motion Detection box */
    gpmove(100, 42);
    gpline(100, 140);
    gpmove(308, 42);
    gpline(308, 140);

    /* Draw field separation line inside the Alarm box */
    gpmove(483, 98);
    gpline(627, 98);
```

```
    /* Initialize the packet rate */
    pack_rate = 0;
}


/*********************************************************************
 *                          IR_disp_update                           *
 *********************************************************************
 * Update the display status of the infrared sensors.                *
 *********************************************************************/
void IR_disp_update(active, newir, oldir, newangle, oldangle)
byte active;
byte *newir, *oldir;
int newangle, oldangle;
{
        char    str[40];
        int     ii;

        if (active & INFRARED_MASK) {
                for (ii = 0; ii < 5; ii++) {
                        /* If the value has changed then display it */
                        if (newir[ii] != oldir[ii]) {
                                sprintf(str, "IR%d", ii+1);
                                if (newir[ii])
                                    alarm_draw(IR_DISP, 15 + ii * 5, str);
                                else
                                    normal_draw(IR_DISP, 15 + ii * 5, str);
                        }
                }

                /* If the group angle has changed then update the screen */
                if (newangle != oldangle) {
                    IR_bearing = newangle;
                    switch (newangle) {
                    case NO_ANGLE:
                        normal_draw(IR_DISP, 51, "    ");
                        break;
                    case MULT_ANGLE:
                        normal_draw(IR_DISP, 51, "MULT");
                        break;
                    default:
                        sprintf(str, "%4d", newangle);
                        normal_draw(IR_DISP, 51, str);
                    }
                }
        }
}


/*********************************************************************
 *                          MW_disp_update                           *
 *********************************************************************
 * Update the display status of the microwave sensor.                *
 *********************************************************************/
void MW_disp_update(active, newmw, oldmw, newsens, oldsens)
byte active;
byte newmw, oldmw;
byte newsens, oldsens;
{
        char    str[40];

        if (active & MICROWAVE_MASK) {
                if (newmw != oldmw) {
                        if (newmw)
                                alarm_draw(MW_DISP, 15, "MW1");
                        else
                                normal_draw(MW_DISP, 15, "MW1");
                }

                if (newsens != oldsens) {
                    sprintf(str, "%2d", newsens);
```

```
                    normal_draw(MW_DISP, 51, str);
                }
        }
}


/*********************************************************************
 *                          OP_disp_update                           *
 *********************************************************************
 * Update the display status of the optical sensors.                 *
 *********************************************************************/
void OP_disp_update(active, newop, oldop, newangle, oldangle)
byte active;
byte *newop, *oldop;
int newangle, oldangle;
{
        char    str[40];
        int     ii;

        if (active & OPTICAL_MASK) {
                for (ii = 0; ii < 4; ii++) {
                        /* If the value has changed then display it */
                        if (newop[ii] != oldop[ii]) {
                                sprintf(str, "OP%d", ii+1);
                                if (newop[ii])
                                    alarm_draw(OP_DISP, 15 + ii * 5, str);
                                else
                                    normal_draw(OP_DISP, 15 + ii * 5, str);
                        }
                }

                /* If the group angle has changed then update the screen */
                if (newangle != oldangle) {
                    OP_bearing = newangle;
                    switch (newangle) {
                    case NO_ANGLE:
                        normal_draw(OP_DISP, 51, "    ");
                        break;
                    case MULT_ANGLE:
                        normal_draw(OP_DISP, 51, "MULT");
                        break;
                    default:
                        sprintf(str, "%4d", newangle);
                        normal_draw(OP_DISP, 51, str);
                    }
                }
        }
}


/*********************************************************************
 *                          VB_disp_update                           *
 *********************************************************************
 * Update the display status of the vibration sensor.                *
 *********************************************************************/
void VB_disp_update(active, newvb, oldvb)
byte active;
byte newvb, oldvb;
{
        if (active & VIBRATION_MASK) {
                if (newvb != oldvb) {
                        if (newvb)
                                alarm_draw(VB_DISP, 15, "VB1");
                        else
                                normal_draw(VB_DISP, 15, "VB1");
                }
        }
}


/*********************************************************************
 *                          HR_disp_update                           *
 *********************************************************************
```

```
 * Update the display status of the hearing sensors.                      *
 ************************************************************************/
void HR_disp_update(active, newhr, oldhr, newangle, oldangle)
byte active;
byte *newhr, *oldhr;
int newangle, oldangle;
{
        char    str[40];
        int     ii;

        if (active & HEARING_MASK) {
                for (ii = 0; ii < 3; ii++) {
                        /* If the value has changed then display it */
                        if (newhr[ii] != oldhr[ii]) {
                                sprintf(str, "HR%d", ii+1);
                                if (newhr[ii])
                                        alarm_draw(HR_DISP, 15 + ii * 5, str);
                                else
                                        normal_draw(HR_DISP, 15 + ii * 5, str);
                        }
                }

                /* If the group angle has changed then update the screen */
                if (newangle != oldangle) {
                    HR_bearing = newangle;
                    switch (newangle) {
                    case NO_ANGLE:
                        normal_draw(HR_DISP, 51, "    ");
                        break;
                    case MULT_ANGLE:
                        normal_draw(HR_DISP, 51, "MULT");
                        break;
                    default:
                        sprintf(str, "%4d", force360(robart.headDir + newangle)
);
                        normal_draw(HR_DISP, 51, str);
                    }
                }
        }
}

/************************************************************************
 *                      update_time_display                              *
 ************************************************************************
 * Update the time display.  Uses global <cur_time>.                     *
 ************************************************************************/
void update_time_display()
{
#if 0
        int     secs;
#endif

        clk_gettime(&cur_time);
#if 1
        Draw_Time(&cur_time, MBASE-1, 70, timeStr, FALSE);
#else
        /* If the time field has changed then update it */
        secs = cur_time.seconds;
        if (secs != cur_time.seconds) {
            Draw_Time(&cur_time, MBASE-1, 70, timeStr, FALSE);
        }
#endif
}

/************************************************************************
 *                      update_packet_display                            *
 ************************************************************************
 * Update the packet rate display.  Uses globals <cur_time>,             *
 * <mscurTimeLong>, <mstTimeLong>, <sonar_mode>, and <pack_rate>.        *
 ************************************************************************/
void update_packet_display()
```

```
{
        char    str[80];
        int     new_pr;

        if (!map_displayed) {
            /* Calculate the elapsed time for the packet rate calculation */
            mscurTimeLong = mstime();
            if (mscurTimeLong - msstTimeLong > 5000L) {
                /*lint -e573 */
                new_pr = (int) ((pack_count*10000L)/(mscurTimeLong - msstTimeLo
ng));
                /*lint +e573 */

                if (new_pr > 99)                /* outside reasonable limits? *
/
                    new_pr = pack_rate; /* fix it */
                /* If the packet rate has changed then update it */
                if (!sonar_mode && new_pr != pack_rate) {
                    sprintf(str, "%2d.%d", new_pr/10, new_pr % 10);
                    normal_draw(PR_DISP, 14, str);
                    pack_rate = new_pr;
                }
                pack_count = 0;
                msstTimeLong = mscurTimeLong;
            }
        }
}

/************************************************************************
 *                      update_IR_active                                 *
 ************************************************************************
 * Update the IR active state.  If sensor is inactive, display it in     *
 * reverse video.                                                        *
 ************************************************************************/
void update_IR_active(new, old)
byte new, old;
{
        new &= INFRARED_MASK, old &= INFRARED_MASK;
        if (new == old)
                return;
        if (new)
                normal_draw(IR_DISP, 2, "INFRARED");
        else
                Inv_Draw(IR_DISP, 2, "INFRARED");
}

/************************************************************************
 *                      update_MW_active                                 *
 ************************************************************************
 * Update the microwave active state.  If sensor is inactive, display    *
 * it in reverse video.                                                  *
 ************************************************************************/
void update_MW_active(new, old)
byte new, old;
{
        new &= MICROWAVE_MASK, old &= MICROWAVE_MASK;
        if (new == old)
                return;
        if (new)
                normal_draw(MW_DISP, 2, "MICROWAVE");
        else
                Inv_Draw(MW_DISP, 2, "MICROWAVE");
}

/************************************************************************
 *                      update_OP_active                                 *
 ************************************************************************
 * Update the optical active state.  If sensor is inactive, display      *
 * it in reverse video.                                                  *
 ************************************************************************/
```

```
void update_OP_active(new, old)
byte new, old;
{
        new &= OPTICAL_MASK, old &= OPTICAL_MASK;
        if (new == old)
                return;
        if (new)
                normal_draw(OP_DISP, 2, "OPTICAL");
        else
                Inv_Draw(OP_DISP, 2, "OPTICAL");
}


/*********************************************************************
 *                        update_VB_active                           *
 *********************************************************************
 * Update the vibration active state.  If sensor is inactive, display *
 * it in reverse video.                                              *
 *********************************************************************/
void update_VB_active(new, old)
byte new, old;
{
        new &= VIBRATION_MASK, old &= VIBRATION_MASK;
        if (new == old)
                return;
        if (new)
                normal_draw(VB_DISP, 2, "VIBRATION");
        else
                Inv_Draw(VB_DISP, 2, "VIBRATION");
}


/*********************************************************************
 *                        update_HR_active                           *
 *********************************************************************
 * Update the hearing active state.  If sensor is inactive, display  *
 * it in reverse video.                                              *
 *********************************************************************/
void update_HR_active(new, old)
byte new, old;
{
        new &= HEARING_MASK, old &= HEARING_MASK;
        if (new == old)
                return;
        if (new)
                normal_draw(HR_DISP, 2, "HEARING");
        else
                Inv_Draw(HR_DISP, 2, "HEARING");
}


/*********************************************************************
 *                        update_US_active                           *
 *********************************************************************
 * Update the ultrasonics active state.  If sensor is inactive, display *
 * it in reverse video.                                              *
 *********************************************************************/
void update_US_active(new, old)
byte new, old;
{
        new &= ULTRASONIC_MASK, old &= ULTRASONIC_MASK;
        if (new == old)
                return;
        if (new)
                normal_draw(US_DISP, 2, "ULTRASONIC");
        else
                Inv_Draw(US_DISP, 2, "ULTRASONIC");
}


/*********************************************************************
 *                        update_VD_active                           *
 *********************************************************************
```

```
 * Update the video active state.  If sensor is inactive, display    *
 * it in reverse video.                                              *
 *********************************************************************/
void update_VD_active(new, old)
byte new, old;
{
        new &= VIDEO_MASK, old &= VIDEO_MASK;
        if (new == old)
                return;
        if (new)
                normal_draw(VD_DISP, 2, "VIDEO");
        else
                Inv_Draw(VD_DISP, 2, "VIDEO");
}


/*********************************************************************
 *                      update_sonar_display                         *
 *********************************************************************
 * Update the range and bearing display for the sonar sensors.       *
 *********************************************************************/
void update_sonar_display(bearing, range)
int bearing, range;
{
        char    str[80];

        if (bearing > 360)
                bearing %= 360;
        US_bearing = bearing;           /* update the global */
        if (range/12 > 35)
                range = 35*12;
        sprintf(str, "%4d ", bearing);
        normal_draw(US_DISP, 51, str);
}


/*********************************************************************
 *                         update_threat                             *
 *********************************************************************
 * Update the threat level display.                                  *
 *********************************************************************/
void update_threat(level)
int level;
{
        char    str[80];

        sprintf(str, "THREAT LEVEL: %d", level);
        if (level == 0)
                normal_draw(THREAT_DISP, 62, str);
        else if (level == 1) {
                text_foreground(BLACK);
                text_background(WHITE);
                PutString(THREAT_DISP, 62, str);
        }
        else {
                text_foreground(YELLOW);
                text_background(RED);
                PutString(THREAT_DISP, 62, str);
        }
}




static SONAR    sonar1, sonar2;
static SONAR    *old_sonar, *new_sonar;


/*********************************************************************
 *                    init_intrusion_sonar_plot                      *
 *********************************************************************
 * Initialize the plotting of the intrusion sensor plotting routine. *
```

```
 *************************************************************************/
init_intrusion_sonar_plot()
{
        int     ii;

        for (ii = 0; ii < PE_SONAR_NUM; ii++)
                sonar1.sonar_data[ii] = sonar2.sonar_data[ii] = 0;

        old_sonar = &sonar1;
        new_sonar = &sonar2;
        return (OK);
}



/*************************************************************************
 *                      deinit_intrusion_sonar_plot                      *
 *************************************************************************
 * Clear the old sonar data off the map.                                 *
 *************************************************************************/
deinit_intrusion_sonar_plot(map_ptr)
map *map_ptr;
{
        int     ii;

        erase_intrusion_sonars(map_ptr, old_sonar);
        for (ii = 0; ii < PE_SONAR_NUM; ii++)
                sonar1.sonar_data[ii] = sonar2.sonar_data[ii] = 0;

        old_sonar = &sonar1;
        new_sonar = &sonar2;
        return (OK);
}



/*************************************************************************
 *                      plot_intrusion_sonars                            *
 *************************************************************************
 * Plot the intrusion sonars.                                            *
 *                                                                       *
 * Call with:                                                            *
 *      map_ptr = (map *) pointer to current map structure               *
 *      pack    = (packet *) intrusion sensor packet with sonar data     *
 *                      appended to it                                   *
 *                                                                       *
 *************************************************************************/
plot_intrusion_sonars(map_ptr, pack)
map *map_ptr;
packet *pack;
{
        char    *cp;
        byte    bb;
        int     ii;
        SONAR   *save;

        /* Erase the old sonar data if any */
        erase_intrusion_sonars(map_ptr, old_sonar);

        /* See if we have a valid sonar packet */
        if (pack->data[21] == '\r' || pack->data[21] == '\0')
                return (0);

        /* Decode the first 6 bytes of the sonar packet (at angles 270
         * to 345) into indexes 18 through 23 of the new_sonar data
         * array.  Data is also scaled.
         */
        for (ii = 18, cp = (char *) &pack->data[21]; ii < 24 && *cp > ' '; ii++
, cp += 2) {
            DecodeByte((byte *)cp, &bb);                /* get the current byte
 */
            if (bb != 0)
                new_sonar->sonar_data[ii] = ((short) bb * 160 + PESON_OFFSET +
```

```
50) / 100;
            else
                new_sonar->sonar_data[ii] = 0;
        }

        /* Decode the next 7 bytes of the sonar packet (at angles 0 to 90)
         * into indexes 0 to 6 of the new_sonar data array.  Data is also
         * scaled.
         */
        for (ii = 0; ii < 7 && *cp > ' '; ii++, cp += 2) {
            DecodeByte((byte *) cp, &bb);               /* get the current byte
 */
            if (bb != 0)
                new_sonar->sonar_data[ii] = ((short) bb * 160 + PESON_OFFSET +
50) / 100;
            else
                new_sonar->sonar_data[ii] = 0;
        }

        draw_intrusion_sonars(map_ptr, new_sonar);

        /* Swap pointers */
        save = old_sonar;
        old_sonar = new_sonar;
        new_sonar = save;

        return (0);
}


/*************************************************************************
 *                      erase_intrusion_sonars                           *
 *************************************************************************
 * Erase the old intrusion sonar data.  Done with the XOR funtcion.      *
 *                                                                       *
 * Call with:                                                            *
 *      map_ptr = (map *) pointer to current map structure.              *
 *      sonar   = (SONAR *) sonar range and X-Y data to erase.           *
 *                                                                       *
 *************************************************************************/
erase_intrusion_sonars(map_ptr, sonar)
map *map_ptr;
SONAR *sonar;
{
        int     ii;

        gpmerge(MXOR);
        for (ii = 0; ii < PE_SONAR_NUM; ii++) {
                /* If the data wasn't plotted before, don't erase it */
                if (sonar->sonar_data[ii] == 0)
                        continue;
                ScalePoint(map_ptr, sonar->x[ii], sonar->y[ii], MAGENTA);
        }
        gpmerge(MRPL);
        return (0);
}


/*************************************************************************
 *                      draw_intrusion_sonars                            *
 *************************************************************************
 * Draw the new intrusion sonar data.  Done with the XOR funtcion.       *
 *                                                                       *
 * Call with:                                                            *
 *      map_ptr = (map *) pointer to current map structure.              *
 *      sonar   = (SONAR *) sonar range and X-Y data to draw.            *
 *                                                                       *
 *************************************************************************/
draw_intrusion_sonars(map_ptr, sonar)
map *map_ptr;
SONAR *sonar;
{
        int     ii;
```

Apr 04 1991 09:51:42 lndisp.c Page 15

```
        int     x, y;

        gpmerge(MXOR);
        for (ii = 0; ii < PE_SONAR_NUM; ii++) {
                /* If the data wasn't plotted before, don't draw it */
                if (sonar->sonar_data[ii] == 0)
                        continue;

                /* Calculate where the point lies in the X-Y plane in
                 * map coordinates.
                 */
                Calc_Dest_Grid_Unit(ii * PE_SON_SPACING,
                        (double) sonar->sonar_data[ii], &x, &y, map_ptr->square
size);

                /* If the point is in the map... */
                if (Clip_To_Map(x, y, map_ptr)) {
                        sonar->x[ii] = x;
                        sonar->y[ii] = y;
                        ScalePoint(map_ptr, x, y, MAGENTA);
                }
                else    /* point not in the map, so zero out the sonar data */
                        sonar->sonar_data[ii] = 0;

        }
        gpmerge(MRPL);
        return (0);
}
```

Apr 04 1991 09:51:42 linestuf.c Page 1

```
/*********************************************************************
 *                              linestuf                             *
 *********************************************************************
 * Routines for calculating points along a line and points on a      *
 * circle.                                                           *
 *                                                                   *
 * To start a line, call init_line().  This returns a structure      *
 * containing the initial X-Y coordinate and other intermediate      *
 * variables.  To calculate succeeding points, call get_line_point().*
 *                                                                   *
 * Function calls:                                                   *
 *      init_line(pline, x1, y1, x2, y2)                             *
 *      LINE_TYPE *pline;                                            *
 *      int x1, y1, x2, y2;                                          *
 *              Initialize the intermediate variables and calculate  *
 *              the first point on the line.  Stores the variables   *
 *              in the LINE_TYPE structure pointed to by <pline>.    *
 *                                                                   *
 *      int get_line_point(pline)                                    *
 *      LINE_TYPE *pline;                                            *
 *              Calculate the next point on the line.  Returns 0 if  *
 *              there are more points left on the line, 1 if this was*
 *              the last point.                                      *
 *                                                                   *
 *      int circle_points(center_x, center_y, radius, pt_plotter)    *
 *      int center_x, center_y, radius;                              *
 *      int (*pt_plotter)();                                         *
 *              Calculate all the points on the circle of the given  *
 *              radius whose center is at (center_x,center_y).  For  *
 *              each point that needs to be plotted, call the user-  *
 *              supplied function pointed to by pt_plotter, whose    *
 *              arguments will be the X and Y location of the point  *
 *              to plot.                                             *
 *                                                                   *
 * Routines based on Bresenham's line drawing algorithm and Michener's*
 * circle drawing algorithm.                                         *
 *                                                                   *
 * Author: Gary Gilbreath  2 Aug 88                                  *
 *                                                                   *
 *********************************************************************/

#include <stdio.h>
#include "headers/linestuf.h"


init_line(pline, x1, y1, x2, y2)
LINE_TYPE *pline;
int x1, y1, x2, y2;
{
        /* Calculate initial values */
        pline->dx = x2 - x1;
        pline->dy = y2 - y1;
        pline->x = x1;
        pline->y = y1;

        if (pline->dx < 0) {
                pline->xinc = -1;
                pline->dx = -pline->dx;
        }
        else
                pline->xinc = 1;

        if (pline->dy < 0) {
                pline->yinc = -1;
                pline->dy = -pline->dy;
        }
        else
                pline->yinc = 1;

        /* If dx >= dy, then increment along X-axis */
        if (pline->dx >= pline->dy) {
                pline->inc_x = 1;
                /*lint -e702 */
```

Apr 04 1991 09:51:42 linestuf.c Page 2

```
                pline->error = pline->dx >> 1;
                /*lint +e702 */
                pline->npoints = pline->dx;
        }
        else {
                pline->inc_x = 0;
                /*lint -e702 */
                pline->error = pline->dy >> 1;
                /*lint +e702 */
                pline->npoints = pline->dy;
        }
        return (0);
}


int get_line_point(pline)
LINE_TYPE *pline;
{
        /* If line is already done, don't keep calculating points */
        if (pline->npoints <= 0)
                return (1);

        if (pline->inc_x) {     /* if doing X-axis incrementing */
                pline->error += pline->dy;
                if (pline->error >= pline->dx) {
                        pline->error -= pline->dx;
                        pline->y += pline->yinc;
                }
                pline->x += pline->xinc;
        }
        /* Incrmenting along Y-axis */
        else {
                pline->error += pline->dx;
                if (pline->error >= pline->dy) {
                        pline->error -= pline->dy;
                        pline->x += pline->xinc;
                }
                pline->y += pline->yinc;
        }
        --(pline->npoints);
        return (0);
}


/*********************************************************************
 *                            circle_points                          *
 *********************************************************************
 * Draw all the points on a circle, given the center point and radius.*
 * Calls a function with the coordinates of each point to plot.      *
 *                                                                   *
 * Call:                                                             *
 *      circle_points(center_x, center_y, radius, pt_plotter)        *
 *                                                                   *
 * Where:                                                            *
 *      center_x        = center of circle, x-coordinate             *
 *      center_y        = center of circle, y-coordinate             *
 *      radius          = radius of circle                           *
 *      pt_plotter      = pointer to function to call for plotting pts*
 *                                                                   *
 * Note: pt_plotter is called with two integer arguments, e.g.       *
 *              pt_plotter(x,y);                                     *
 *                                                                   *
 * Based on J. Michener's algorithm as shown in _Fundamentals of     *
 * Interactive Computer Graphics_ by J. D. Foley and A. Van Dam.     *
 *                                                                   *
 *********************************************************************/
circle_points(center_x, center_y, radius, pt_plotter)
int center_x, center_y, radius;
int (*pt_plotter)();
{
        int     x, y, d;

        x = 0;
```

Apr 04 1991 09:51:42 linestuf.c Page 3

```
        y = radius;
        /*lint -e701 */
        d = 3 - (radius << 1);
        /*lint +e701 */
        while (x < y) {

                /* Using circle symmetry, plot all eight points */
                (void)(*pt_plotter) (center_x + x, center_y + y);
                (void)(*pt_plotter) (center_x + y, center_y + x);
                (void)(*pt_plotter) (center_x + y, center_y - x);
                (void)(*pt_plotter) (center_x + x, center_y - y);
                (void)(*pt_plotter) (center_x - x, center_y - y);
                (void)(*pt_plotter) (center_x - y, center_y - x);
                (void)(*pt_plotter) (center_x - y, center_y + x);
                (void)(*pt_plotter) (center_x - x, center_y + y);

                if (d < 0)
                        /*lint -e701 */
                        d += (x << 2) + 6;
                        /*lint +e701 */
                else {
                        /*lint -e701 */
                        d += ((x - y) << 2) + 10;
                        /*lint +e701 */
                        y--;
                }
                x++;
        }
        if (x == y) {
                (void)(*pt_plotter) (center_x + x, center_y + y);
                (void)(*pt_plotter) (center_x + x, center_y - y);
                (void)(*pt_plotter) (center_x - x, center_y - y);
                (void)(*pt_plotter) (center_x - x, center_y + y);
        }
        return (0);
}
```

```
/*******************************************************************
 *                          Link Interface                         *
 *******************************************************************
 * This package contains the link interface routines.  It does all *
 * packet-level interfacing, like receiving a packet, sending a packet *
 * and re-synchronizing when a bad packet is received.            *
 *                                                                 *
 * Authors: Guy Bianchini (original)                               *
 *      Gary Gilbreath  3  Nov 86                                  *
 *      Guy Bianchini   26 Feb 87 - changed to work for Robart,    *
 *          added variable length packets, all in ASCII.           *
 *      Gary Gilbreath  11 Jan 89                                  *
 *          Converted to Microsoft C                               *
 *******************************************************************/
typedef unsigned char byte;
typedef unsigned int  word;

#include <stdio.h>
#include <ctype.h>
#include <memory.h>

#include "headers/ibmio.h"
#include "headers/serial.h"

int robot_port = -1, debug_port = -1;   /* serial communication port indexes */

char    inpacket_logging = NO;
FILE    *inpacket_fd = NULL;
char    outpacket_logging = NO;
FILE    *outpacket_fd = NULL;

/* Forward reference & external procedures */
static word Calc_Crc();
static void Make_Crc_Table();

/************************** Globals ******************************/
word    crc_errors = 0;

static word crc_table[256];

#ifdef CRC
static byte asc[16] = {
    '0','1','2','3','4','5','6','7','8','9',
    'A','B','C','D','E','F'};
#endif

/* Global data structure and index into it to accumulate partial packets
 * when Receive_Link is passed the NO_WAIT parameter.
 */
static byte partial_packet[MAX_PACKET_SIZE+7];
static int  pp_index = 0;

/* Initialize the structures for setting up the serial port parameters */
struct sgtty    robot_parms = {B9600, CS8 | STOP1 | NOP | NOFLOW};
struct sgtty    debug_parms = {B9600, CS8 | STOP1 | NOP | FXON};


extern drType robart;

/*******************************************************************
 *                          Reset_Link                             *
 *******************************************************************
 * This functions flushes any packets currently in either queue and *
 * re-initializes the packet system.  It is used to initialize com- *
 * munications as well as reset the com link.                      *
 *                                                                 *
 * Call:    Reset_Link(pstatus)                                    *
 *                                                                 *
 * Where:                                                          *
 *      status = (int *) pointer to the returned status,           *
 *              either OK or RESET_FAILED                          *
 *                                                                 *
 * Author:  Guy Bianchini                                          *
```

```
 *      Gary Gilbreath  3 Nov 86                                   *
 *                                                                 *
 *******************************************************************/
void Reset_Link(status, ser_disable)
int *status, ser_disable;
{

    *status = OK;
    robot_port = debug_port = -1;
    /* Calculate the CRC byte-wise lookup table values. */
#ifdef CRC
    Make_Crc_Table();
#endif

    if (ser_disable) {
        robot_port = debug_port = -1;
        return;
    }

    /* Open the port.  Parameters are port (COM1 or COM2), input buffer,
     * input buffer size, and "baud factor" (in baudrate.h file).
     */
    robot_port = sp_open("com1");
    if (robot_port == -1) {
        printf("Can't open com1 -->");  mgetkey();
        *status = ERROR;
    }
#if 0
    debug_port = sp_open("com2");
#else
    debug_port = -1;
#endif

    /* Set the serial port parameters (baud, data/stop bits, parity, flow) */
    sp_ioctl(robot_port, TIOCSETP, &robot_parms);
    if (debug_port >= 0)
        sp_ioctl(debug_port, TIOCSETP, &debug_parms);

    return;
}


/*******************************************************************
 *                          Close_Link                             *
 *******************************************************************
 * This function is called to close an opened communications link. *
 * Typically this would only be called right before then end of a  *
 * communications session.                                         *
 *                                                                 *
 * Call:                                                           *
 *  Close_Link(pstatus)                                            *
 *                                                                 *
 * Where:                                                          *
 *  pstatus = (int *) pointer to the returned status               *
 *                                                                 *
 * Author:  Guy Bianchini                                          *
 *      Gary Gilbreath  3 Nov 86                                   *
 *                                                                 *
 *******************************************************************/
void Close_Link(pstatus)
int *pstatus;
{
        *pstatus = OK;
        if (robot_port != -1)
                sp_close(robot_port);
        if (debug_port != -1)
                sp_close(debug_port);
        robot_port = debug_port = -1;
}


/*******************************************************************
 *                          Send_Link                              *
```

Apr 04 1991 09:51:42 linkrbrt.c Page 3

```
/*****************************************************************
 * Send_link sends the indicated packet over the communications link.  *
 * It does the CRC calculation, inserts a '!'into the first byte of the *
 * packet, the ASCII Hex of the crc for the next 4 bytes, encodes the  *
 * rest of the data into ASCII Hex, inserts a CR,LF terminator at the  *
 * end of the packet and places the packet into the output queue.      *
 *                                                                     *
 * Call:                                                               *
 *  Send_Link(packet_ptr, length, pstatus);                            *
 *                                                                     *
 * Where:                                                              *
 *  packet_ptr  = (byte *) pointer to the packet to be sent            *
 *  length      = (unsigned int)  length of the packet to be sent
 *
 *  pstatus     = (int *) status of the operation                      *
 *                                                                     *
 * Author:  Guy Bianchini                                              *
 *      Gary Gilbreath  3 Nov 86                                       *
 *      Guy Bianchini   1 Mar 87 - changed to work with variable       *
 *                  length ASCII packets.                              *
 *      Gary Gilbreath  8 Dec 89 - Removed CRC calcuation, the comms   *
 *                      box now takes care of this.                    *
 *****************************************************************/
void Send_Link(pack_ptr, length, status)
packet *pack_ptr;
unsigned int    length;
int *status;
{
    int                 bytes_left;
    unsigned int        ii;
    time_type           cur_time;

    /* Place the packet identifier into the packet */
    pack_ptr->head = '!';

    for (ii = 0; ii < length; ii++) {
        if (islower(pack_ptr->data[ii]))
            pack_ptr->data[ii] = toupper(pack_ptr->data[ii]);
    }

#ifdef CRC
    /* Calculate a CRC for the packet. */
    crc = Calc_Crc(&pack_ptr->data[0], length);

    /* Place the CRC at the beginning of the packet, high-order byte first. */
    pack_ptr->crc[0] = asc[(byte)(crc >> 12)];
    pack_ptr->crc[1] = asc[(byte)((crc >> 8) & 0x000F)];
    pack_ptr->crc[2] = asc[(byte)((crc >> 4) & 0x000F)];
    pack_ptr->crc[3] = asc[(byte)(crc & 0x000F)];
#endif

    /* Place the CR, LF packet terminator at the end of the packet */
    pack_ptr->data[length]   = CR;
    pack_ptr->data[length+1] = LF;

    /* Write the packet to the com port. */
#ifdef CRC
    bytes_left = length + 7;            /* ! 4 CRC data CR/LF */
#else
    bytes_left = length + 3;            /* ! data CR/LF */
#endif
#if 1
    slow_sp_write(robot_port, (byte *) pack_ptr, bytes_left);
#else
    sp_write(robot_port, (char *) pack_ptr, bytes_left);
#endif

    if (outpacket_logging) {
        clk_gettime(&cur_time);
        fprintf(outpacket_fd, "%02d:%02d:%02d.%d%d:%d,%d,%d:", cur_time.hours,
cur_time.minutes,
                cur_time.seconds, cur_time.tenths, cur_time.hundredths,
                robart.x,robart.y,robart.dir);
```

Apr 04 1991 09:51:42 linkrbrt.c Page 4

```
        fwrite((char *) pack_ptr, 1, bytes_left-2, outpacket_fd);
        putc('\n', outpacket_fd);
    }
    *status = OK;
    return;
}


/*****************************************************************
 *                      Decode_packet                                  *
 *****************************************************************
 * Decode_Packet will decode the packet CRC and compare it to the calc- *
 * ulated CRC, it will increment the global crc_errors if they do not  *
 * match and return CRC_ERROR in status. If they do match it will copy *
 * the packet data out of the global partial packet data structure and *
 * into the user area pointed to by pack_ptr and then return OK in     *
 * status.                                                             *
 *                                                                     *
 * Call:                                                               *
 *  Decode_Packet(crc, length, packet_ptr, pstatus);                   *
 *                                                                     *
 * Where:                                                              *
 *  crc     = word the calculated crc value                            *
 *  length      = length of packet                                     *
 *  packet_ptr  = (byte *) pointer to the packet to be decoded         *
 *  pstatus     = (int *) status of the operation                      *
 *                                                                     *
 * Author:  Guy Bianchini                                              *
 *          Gary Gilbreath  8 Dec 89 - Removed CRC checking, the lower *
 *                      level link computer now does this.             *
 *****************************************************************/
static void Decode_Packet(crc, length, pack_ptr, pstatus)
word    crc;
int     length;
packet *pack_ptr;
int     *pstatus;
{
#ifdef CRC
    char high;
    word new_crc;
    int  i;
    char old_crc[4];
#endif

#ifdef CRC
    /* Decode the packet's crc */
    high = 'A' - 10;
    for(i=1;i < 5;i++) {
        if (partial_packet[i] >= 'A') old_crc[i-1] = partial_packet[i] - high;
        else old_crc[i-1] = partial_packet[i] - '0';
    }
    new_crc =  ((word)old_crc[0] << 12);
    new_crc |= ((word)old_crc[1] << 8);
    new_crc |= ((word)old_crc[2] << 4);
    new_crc |= ((word)old_crc[3]);

    /* If the packet crc does not equal the calculated crc then we have
     * received a bad packet.
     */
    if (new_crc != crc) {
        crc_errors++;
        *pstatus = CRC_ERROR;
        return;
    }

    /* Copy the data out of the partial packet and into the user's packet
     * data structure.
     */
    memcpy(&pack_ptr->crc[0], &partial_packet[1], 4);
    memcpy(&pack_ptr->data[0], &partial_packet[5], length);
#else
    memcpy(&pack_ptr->data[0], &partial_packet[1], length);
#endif
```

```
    pack_ptr->data[length] = '\0';

    *pstatus = OK;
    return;
}


/*********************************************************************
 *                          Receive_Link                              *
 *********************************************************************
 * This function grabs the next available packet from the communi-   *
 * cations link.  If <wait_flg> is not set, it only returns a packet *
 * if one is immediately available, i.e. it won't wait for one if there *
 * isn't one already there.                                          *
 *                                                                   *
 * Call:                                                             *
 *  Receive_Link(packet_ptr, waitms, pstatus);                       *
 *                                                                   *
 * Where:                                                            *
 *  packet_ptr  = (packet_type) place to put received packet         *
 *  wait        = (int) NO_WAIT => don't wait,                       *
 *                WAIT_FOREVER => wait forever.                      *
 *  pstatus     = (int *) status of operation                        *
 *                                                                   *
 *-------------------------------------------------------------------*
 * Packet Format: All packet bytes are ASCII, with the CRC and the data *
 *        in ASCII Hex. The hex is stored in most significant        *
 *        to least significant order.                                *
 *                                                                   *
 *           Byte#       Value                                       *
 *       Header:   0         '!'                                     *
 *           1      crc- high byte, high nibble                      *
 *           2      crc- high byte, low  nibble                      *
 *           3      crc- low  byte, high nibble                      *
 *           4      crc- low  byte, low  nibble                      *
 *       Data:     5      data byte 1                                *
 *           6      data byte 2                                      *
 *           . .                                                     *
 *           . .                                                     *
 *           . .                                                     *
 *       Trailer:length+5       <CR>                                 *
 *           length+6       <LF>                                     *
 *-------------------------------------------------------------------*
 *                                                                   *
 * Author:  Guy Bianchini                                            *
 *      Gary Gilbreath  3 Nov 86                                     *
 *                                                                   *
 * Revisions:                                                        *
 * 18 Nov 86     Gary Gilbreath                                      *
 *      Added ability to wait a given number of milliseconds         *
 *      in addition to NO_WAIT and WAIT_FOREVER.                     *
 *                                                                   *
 * 09 Mar 87    Guy Bianchini                                        *
 *      Removed the wait a number of milliseconds capability.        *
 *      Also added the ability to work on variable length            *
 *      packets (of a completely different format from the last      *
 *      version, see above for details).                             *
 *********************************************************************/
int Receive_Link(pack_ptr, wait, pstatus)
packet *pack_ptr;
int    wait, *pstatus;
{
    int         length;
#ifdef CRC
    word        crc;
#endif
    int         chr;
    time_type   cur_time;

    /* Get the size of the input queue. */
TOP:
    /* If requested to wait until a packet becomes available then */
```

```
    if (wait == WAIT_FOREVER) {
        /* If there is no partial packet from previous call then look for
         * packet header '!'
         */
        if (pp_index == 0) {
            chr = 0;
            while (chr != '!') {
                chr = getc_sp(robot_port);
                if (keyhit()) {
                    if (getkey() == ESC) {
                        *pstatus = ABORT;
                        return (0);
                    }
                }
            }
            partial_packet[pp_index++] = '!';
        }

        /* Now get packet chars until it equals one of the packet terminators *
/
        do {
            chr = getc_sp(robot_port);
            if (chr != -1) {
                if (chr == '!') {
                    pp_index = 1;
                    partial_packet[0] = '!';
                }
                else partial_packet[pp_index++] = (byte) chr;
            }
        } while ((chr != CR) && (chr != LF) && (pp_index < sizeof(packet)));

        /* If we never received an end of packet character then restart. */
        if ((chr != CR) && (chr != LF)) {
            pp_index = 0;
            goto TOP;
        }
    }

    /* Else we can't wait for a packet, so get as much as we can. */
    else {
        /* If there is no partial packet from previous call then look for
         * packet header '!'
         */
        if (pp_index == 0) {
            chr = 0;
            while (chr != '!') {
                chr = getc_sp(robot_port);
                if (chr == -1) {
                    *pstatus = PACKET_NOT_AVAILABLE;
                    return (0);
                }
            }
            partial_packet[pp_index++] = '!';
        }

        /* Now get packet chars until it equals one of the packet terminators *
/
        do {
            chr = getc_sp(robot_port);
            if (chr == -1) {
                *pstatus = PACKET_NOT_AVAILABLE;
                return (0);
            }
            if (chr == '!') {
                pp_index = 1;
                partial_packet[0] = '!';
            }
            else partial_packet[pp_index++] = (byte) chr;
        } while ((chr != CR) && (chr != LF) && (pp_index < sizeof(packet)));

        /* If we never received an end of packet character then return with
         * error
         */
```

Apr 04 1991 09:51:42 linkrbrt.c Page 7

```
        if ((chr != CR) && (chr != LF)) {
            pp_index = 0;
            *pstatus = COMMUNICATION_ERROR;
            return (0);
        }
    }

#ifdef CRC
    /* If we have made it this far then we have a packet with the correct
     * start and finish bytes. Decode the packet from ACSII and check the crc
     */
    crc = Calc_Crc(&partial_packet[5], pp_index-6);

    /* Calculate the length of the data section of the packet. */
    length = pp_index - 6;
#else
    length = pp_index - 2;
#endif

    partial_packet[pp_index] = EOS;

    /* Let Decode_Packet decode the packet crc and check it with the calculated
     * crc. If the crcs match, then it copies the packet data into the user's
     * packet area.
     */
#ifdef CRC
    Decode_Packet(crc, length, pack_ptr, pstatus);
#else
    Decode_Packet(0, length, pack_ptr, pstatus);
#endif

    /* Reset for next packet */
    pp_index = 0;
    if (inpacket_logging) {
        clk_gettime(&cur_time);
        fprintf(inpacket_fd, "%02d:%02d:%02d.%d%d:%d,%d,%d:!%s\n", cur_time.hou
rs, cur_time.minutes,
                cur_time.seconds, cur_time.tenths, cur_time.hundredths,
                robart.x,robart.y,robart.dir,
                (char *) &pack_ptr->data[0]);
    }
    return (length);
}


#ifdef CRC
/***************************************************************************
 *                              Calc_Crc                                   *
 ***************************************************************************
 * Calc_crc will encode a packet of data producing a word checksum        *
 * using the CRC-16 algorithm outlined in "Byte-wise CRC Calculations"    *
 * by Aram Perez in IEEE Micro, June 1983.                                *
 *                                                                         *
 * Call:                                                                   *
 *   crc = Calc_Crc(packet_ptr, length);                                  *
 *                                                                         *
 * Where:                                                                  *
 *   crc       = (word) calculated crc                                    *
 *   data_ptr  = (byte *) data to calculate CRC for                       *
 *   length    = (int) length of the data to be encoded.                  *
 *                                                                         *
 * Author:  Guy Bianchini                                                 *
 *                                                                         *
 ***************************************************************************/
static word Calc_Crc(data_ptr, length)
byte *data_ptr;
int  length;
{
    word x, crc = 0;
    int  i;

    /* Encode the packet and place the CRC at the beginning. */
    for (i = 0; i < length; i++){
```

Apr 04 1991 09:51:42 linkrbrt.c Page 8

```

        /* Exclusive-OR input byte with the low-order byte of the crc register
 */
        x = crc & 0xFF;
        x ^= (word)(*(data_ptr++));

        /* Shift the CRC register eight bits to the right. */
        crc >>= 8;

        /* Exclusive-OR the CRC register with the contents of the
             table, using x as an index. */
        crc ^= crc_table[x];

    }
    return(crc);
}


/***************************************************************************/
/* Make_Crc_Table will calculate all of the values for a 256 byte lookup   */
/* table to be used by the Calc_Crc procedure. This routine should be called */
/* only from Reset_Link (for efficiency).                                  */
/***************************************************************************/
static void Make_Crc_Table()
{
    word d[16];
    word i,x1,x2,x3,x4,x5,x6,x7,x8;

    i = 0;
    for(x8=0; x8 < 2; x8++)
        for(x7=0; x7 < 2; x7++)
            for(x6=0; x6 < 2; x6++)
                for(x5=0; x5 < 2; x5++)
                    for(x4=0; x4 < 2; x4++)
                        for(x3=0; x3 < 2; x3++)
                            for(x2=0; x2 < 2; x2++)
                                for(x1=0; x1 < 2; x1++){
                                    d[15] = (x8^x7^x6^x5^x4^x3^x2^x1) << 15;
                                    d[14] = (x7^x6^x5^x4^x3^x2^x1) << 14;
                                    d[13] = (x8^x7) << 13;
                                    d[12] = (x7^x6) << 12;
                                    d[11] = (x6^x5) << 11;
                                    d[10] = (x5^x4) << 10;
                                    d[9]  = (x4^x3) << 9;
                                    d[8]  = (x3^x2) << 8;
                                    d[7]  = (x2^x1) << 7;
                                    d[6]  = x1 << 6;
                                    d[0]  = x8^x7^x6^x5^x4^x3^x2^x1;
                                    crc_table[i++] = d[15] | d[14] | d[13] | d[
12] |
                                        d[11] | d[10] | d[9] | d[8] | d[7] | d[
6] | d[0];
                                }
    return;
}
#endif

/* x_command - send an X (Execute) command to Robart.  These commands
 *      are defined as "X_xxxxxx" in IBMIO.H, e.g. "X_SONAR".  A typical
 *      call would be
 *
 *              x_command(X_CAMERA, 1);
 *
 *      to turn the camera power on.
 */
x_command(cmd, state)
int cmd, state;
{
        char    str[40];

        sprintf(str, "0X%02x%d", cmd & 0xff, state);
        put_packet(str);
```

```
        return (OK);
}


/* dump_packets - dump any packets in the input queue */
void dump_packets()
{
        packet  pack;

        while (wait_packet(&pack, NO_WAIT) == OK)
                ;
}


/* start_inpacket_logging - start logging input packets */
start_inpacket_logging(name)
char *name;
{
        if ((inpacket_fd = fopen(name, "w")) == NULL) {
                return (-1);
        }
        inpacket_logging = YES;
        return (OK);
}


/* stop_inpacket_logging - stop logging input packets */
stop_inpacket_logging()
{
        if (inpacket_logging) {
                inpacket_logging = NO;
                fclose(inpacket_fd);
                inpacket_fd = NULL;
        }
        return (OK);
}


/* start_outpacket_logging - start logging output packets */
start_outpacket_logging(name)
char *name;
{
        if ((outpacket_fd = fopen(name, "w")) == NULL) {
                return (-1);
        }
        outpacket_logging = YES;
        return (OK);
}


/* stop_outpacket_logging - stop logging output packets */
stop_outpacket_logging()
{
        if (outpacket_logging) {
                outpacket_logging = NO;
                fclose(outpacket_fd);
                outpacket_fd = NULL;
        }
        return (OK);
}
```

Apr 04 1991 09:55:17 logger.c Page 1

```
/***************************************************************************
 * Logger.c contains routines which manipulate log files. It is an attempt at
 * data encapsulation of log files. It includes routines that allow manipulation
 * of file pointers, reading and writing of log entries, searching for log
 * entries and of course opening and closing of log files.
 **************************************************************************/
#include <stdio.h>
#include <dos.h>
#include <fcntl.h>
#include <sys/types.h>
#include <sys/stat.h>
#include <io.h>

#define  DOS 1
#include "headers/ibmio.h"

/*************************************************************************/
/* OpenLogFile opens a Lattice level 1 file to use for data logging. The   */
/* reason for using level 1 is that there are no restrictions on file size */
/* as there are for level 2 (64K). fileName is a pointer to the file name  */
/* string, newFile is a boolean stating if the file to be opened needs to be */
/* created or already exists and OpenLogFile returns the file size in the  */
/* parameter fileSize.                  */
/*************************************************************************/
int OpenLogFile(fileName, newFile, fileSize)
char *fileName;
int  newFile;
long *fileSize;
{
    int  fD;
    long lseek();

    /* If a new file is requested then create it, else open the existing one *
/
    if (newFile) {
        fD = open(fileName, O_CREAT | O_TRUNC | O_WRONLY | O_BINARY, S_IREAD |
S_IWRITE);
    }
    else {
        fD = open(fileName, O_RDONLY | O_BINARY);
    }

    /* Check for file error */
    if (fD == -1) return (-1);

    /* If we opened an existing file then get it's size */
    if (!newFile) {
        *fileSize = lseek(fD, 0L, SEEK_END);
        lseek(fD, 0L, SEEK_SET);
    }
    else *fileSize = 0;
    return (fD);
}


/*************************************************************************/
/* CloseLogFile cloes a Lattice level 1 file (used for data logging). It   */
/* returns the status of the close operation.                  */
/*************************************************************************/
int CloseLogFile(fD)
int fD;
{
    close(fD);
    return (TRUE);
}


/*************************************************************************/
/* MoveFP will move the file pointer "n" packets forward or backward in the */
/* log file pointed to by "fD" depending on the sign of "n" (+ moves forward */
/* and - moves backward). The number of packets actually moved is returned. */
/*************************************************************************/
int MoveFP(fD, n)
```

Apr 04 1991 09:55:17 logger.c Page 2

```
int fD, n;
{
    int  count, pc = 0;
    long apos;
    byte b;

    /* Until we have moved the file pointer enough packets do */
    while (pc != n) {

        /* If we are requested to move towards the end of the file then */
        if (n > 0) {

            /* Move one packet forward */
            do {
                count = read(fD, (char *) &b, 1);
                if (count != 1) return (pc);
            }
            while (b != LF);
            pc++;
        }

        /* Else move towards the beginning of the file */
        else {

            /* Move one packet back */
            do {
                apos = lseek(fD, -2L, SEEK_CUR);

                /* If we are into the time field of the first packet then simpl
y
                 * move to the begining of the file and return. This little bit
                 * of lunacy is because the file pointer gets messed up if you
                 * read past the top of the file.
                 */
                if (apos < 11) {
                    apos = lseek(fD, 0L, SEEK_SET);
                    return (pc-1);
                }
                read(fD, (char *) &b, 1);
            }
            while (b != LF);
            pc--;
        }
    }
    return (pc);
}


/*************************************************************************/
/* WriteLogEntry writes the packet pointed to by "pack_ptr" into the file   */
/* pointed to by "fD". It first writes a time stamp followed by the complete */
/* packet sent over the radio-link. IM-t assumeM-s thaM-t thM-e filM-e pointe
M-r pointM-s */
/* tM-o M-a locatioM-n betweeM-n packets or at the beginning or end of the file
.   */
/*************************************************************************/
void WriteLogEntry(fD, pack_ptr, timePtr, pack_length)
int     fD;
packet *pack_ptr;
char    *timePtr;
unsigned int    pack_length;
{
    char str[3];

    /* If timePtr is NULL, then we just have an ASCII string to write
     * to the file.
     */
    if (timePtr == NULL) {
        /*lint -e15 */
        write(fD, (char *) pack_ptr, strlen((char *) pack_ptr));
        /*lint +e15 */
    }
    else {
```

```
        /* Write the time stamp first, then the packet exactly as if it were
         * received through the radio link from Robart.
         */
        write(fD, timePtr, 11);
        write(fD, "|", 1);
#ifdef CRC
        write(fD, pack_ptr->crc, 4);
#endif
        write(fD, (char *) pack_ptr->data, pack_length);
        str[0] = CR;
        str[1] = LF;
        str[2] = '\0';
        write(fD, str, 2);
    }
}

/****************************************************************************/
/* ReadLogEntry reads a log entry (packet and time stamp) from the file     */
/* pointed to by "fD". It places the packet into the buffer area pointed to */
/* by "buf_ptr" and if requested the time stamp into the area pointed to by */
/* "timePtr". It assumes that the file pointer points to a location between */
/* packets or at the beginning or end of the file.                  */
/****************************************************************************/
int ReadLogEntry(fD, buf_ptr, timePtr)
int     fD;
packet *buf_ptr;
char    *timePtr;
{
    char        *cp;
    int         count, i = 0, ii, jj;
    byte        b;
    char        dummy[80];

    /* Get the time field, if the timePtr is NULL then skip past the time
     * field else the calling routine wants the time field.
     */
    count = read(fD, dummy, 1);
    for (ii = 0; count == 1 && dummy[ii] != '!' && ii < 12 && dummy[ii] != '\r'
; ii++) {
        count = read(fD, &dummy[ii+1], 1);
    }
    if (dummy[ii] == '\r') {
        read(fD, &dummy[ii+1], 1);      /* read the LF too */
        strncpy(buf_ptr->data, dummy, ii);      /* copy the data, minus CR/LF *
/
        buf_ptr->data[ii] = EOS;                /* terminate with '\0' */
        strcpy(timePtr, "00:00:00.00");         /* copy a dummy time */
        return (ii);
    }
    if (count != 1)                         /* if an error in reading the file */
        return (FALSE);

    /* See if we have an 8 digit time, an 11 digit time, or a directive */
    if (dummy[ii] == '!') {                 /* if we have a time */
        if (ii == 8)                        /* 8 digit time? */
                strcpy(&dummy[8], ".00");       /* force hundredths to 0 */
        dummy[11] = EOS;                    /* terminate the string */
        if (timePtr != NULL) {              /* if he wants the time */
                strcpy(timePtr, dummy);
        }
    }
    else {                                  /* no time, must be directive */
        /* Copy first ii bytes to data area of packet */
        cp = (char *) buf_ptr->data;
        for (jj = 0; jj <= ii; jj++)
            *cp++ = dummy[jj];
        count = read(fD, (char *) &b, 1);
        for (ii = 0; count == 1 && b != CR; ii++) {
            *cp++ = (char) b;
            count = read(fD, (char *) &b, 1);
        }
        lseek(fD, 1L, SEEK_CUR);        /* seek past the line feed */
```

```
        *cp = EOS;
        return (ii);
    }

#if 0
    /* Skip the packet header and CRC field */
    lseek(fD, 4L, SEEK_CUR);
#endif

    /* Read packet data until a <CR> is read, then skip past the linefeed */
    count = read(fD, (char *) &b, 1);
    while (b != CR) {
        buf_ptr->data[i++] = b;
        count = read(fD, (char *) &b, 1);
    }
    lseek(fD, 1L, SEEK_CUR);
    buf_ptr->data[i] = EOS;                 /* terminate with EOS */
printf("packet=\"%s\", i=%d\n",buf_ptr->data, i);

    /* Return the length of the data portion of the packet */
    return (i);
}


/****************************************************************************/
/* FindPType searches the log file pointed to by "fD" for a packet of type  */
/* "pType" and if found returns the packet and time stamp (if requested) in */
/* "pBuf" and "tPtr" respectively. The parameter forward specifies the      */
/* direction of the search. It returns true or false depending on the       */
/* success of the search.                                       */
/****************************************************************************/
int FindPType(fD, pBuf, pType, tPtr, forward)
int     fD;
packet *pBuf;
int     pType;
char    *tPtr;
int     forward;
{
    /* If requested to search forward then */
    if (forward) {
        while (ReadLogEntry(fD, pBuf, tPtr))
            if (pBuf->data[0] == pType) return (TRUE);
        return (FALSE);
    }

    /* Else move backwards through the file */
    while (MoveFP(fD, -2) == -2) {
        ReadLogEntry(fD, pBuf, tPtr);
        if (pBuf->data[0] == pType) return (TRUE);
    }
    return (FALSE);
}
```

Apr 04 1991 09:55:17 mapcur.c Page 1

```
/**************************************************************************
 *                              mapcur.c                                  *
 **************************************************************************
 * This file contains the routines to manipulate the map cursor and      *
 * take care of the rubber-banded lines.                                  *
 **************************************************************************/


#include <stdio.h>
#include <ega.h>
#include <event.h>
#include "headers/ibmio.h"



/**************************************************************************
 *                              mapc_init                                 *
 **************************************************************************
 * Initialize the given mapc structure.                                   *
 **************************************************************************/
void mapc_init(mapc, map_ptr, cursorcolor, linecolor)
MAPC_STRUCT *mapc;
map *map_ptr;
int cursorcolor, linecolor;
{
        mapc->map_ptr = map_ptr;        /* point at the map */
        mapc->cursor_visible = 0;       /* cursor is off */
        mapc->mapx = mapc->mapy = -1;   /* cursor not on screen */
        mapc->in_map = 0;               /* cursor not in map */
        /* Disable rubber-banding/boxing */
        mapc->rubber_box_banding = mapc->rubber_banding = 0;
        mapc->line_color = linecolor;
        mapc->cursor_color = cursorcolor;
}


/**************************************************************************
 *                              mapc_deinit                               *
 **************************************************************************
 * De-initialize the given mapc structure.  Remove the map cursor from   *
 * the screen and restore the normal cursor.                              *
 **************************************************************************/
void mapc_deinit(mapc)
MAPC_STRUCT *mapc;
{
        if (mapc->in_map) {             /* cursor currently displayed? */
            mapc_off(mapc);             /* turn it off */
            mouse_on();                 /* turn mouse back on */
        }
        mapc->map_ptr = NULL;
        mapc->cursor_visible = 0;       /* cursor is off */
        mapc->mapx = mapc->mapy = -1;   /* cursor not on screen */
        mapc->in_map = 0;               /* cursor not in map */
        /* not rubber banding */
        mapc->rubber_box_banding = mapc->rubber_banding = 0;
}


/**************************************************************************
 *                              mapc_update                               *
 **************************************************************************
 * Update the current position of the map cursor.  If the cursor is      *
 * within the map, then see if the cursor has moved.  If it has, then    *
 * erase the old one and draw the new one.                                *
 **************************************************************************/
void mapc_update(mapc)
MAPC_STRUCT *mapc;
{
        MAPC_STRUCT oldc;

        /* Save the old cursor information first */
        memcpy(&oldc, mapc, sizeof(MAPC_STRUCT));
        mapc_scale(mapc);                       /* make new info */
```

Apr 04 1991 09:55:17 mapcur.c Page 2

```

        if (oldc.in_map != mapc->in_map) {      /* did we just enter/leave the
map? */
                if (mapc->in_map) {             /* just entered */
                        mouse_off();
                        /* If rubber_banding, draw new line */
                        if (mapc->rubber_banding) {
                                mapc->rx2 = mapc->mapx;
                                mapc->ry2 = mapc->mapy;
                                xor_line(mapc->rx1, mapc->ry1,
                                        mapc->rx2, mapc->ry2, mapc->line_color
);
                        }
                        else if (mapc->rubber_box_banding) {
                                mapc->rx2 = mapc->mapx;
                                mapc->ry2 = mapc->mapy;
                                xor_box(mapc->rx1, mapc->ry1,
                                        mapc->rx2, mapc->ry2, mapc->line_color
);
                        }
                        mapc_draw(mapc);                /* draw the cursor */
                }
                else {                          /* just left */
                        mapc_off(&oldc);        /* erase the cursor */
                        /* If rubber_banding, erase old line */
                        if (mapc->rubber_banding) {
                                xor_line(mapc->rx1, mapc->ry1,
                                        mapc->rx2, mapc->ry2, mapc->line_color
);
                        }
                        else if (mapc->rubber_box_banding) {
                                xor_box(mapc->rx1, mapc->ry1,
                                        mapc->rx2, mapc->ry2, mapc->line_color
);
                        }
                        mouse_on();
                }
        }
        else {
                /* If the cursor changed position, update the screen */
                if (mapc->in_map && ((oldc.mapx != mapc->mapx) || (oldc.mapy !=
 mapc->mapy))) {
                        mapc_off(&oldc);                /* turn the cursor off
*/

                        /* If we're rubber-banding a line, draw in new pos */
                        if (mapc->rubber_banding) {
                                xor_line(mapc->rx1, mapc->ry1,
                                        mapc->rx2, mapc->ry2, mapc->line_color
);
                                mapc->rx2 = mapc->mapx;
                                mapc->ry2 = mapc->mapy;
                                xor_line(mapc->rx1, mapc->ry1,
                                        mapc->rx2, mapc->ry2, mapc->line_color
);
                        }
                        else if (mapc->rubber_box_banding) {
                                xor_box(mapc->rx1, mapc->ry1,
                                        mapc->rx2, mapc->ry2, mapc->line_color
);
                                mapc->rx2 = mapc->mapx;
                                mapc->ry2 = mapc->mapy;
                                xor_box(mapc->rx1, mapc->ry1,
                                        mapc->rx2, mapc->ry2, mapc->line_color
);
                        }
                        mapc_draw(mapc);
                }
        }
}


/**************************************************************************
```

Apr 04 1991 09:55:17 mapcur.c Page 3

```
 *                              start_banding                              *
 ***************************************************************************
 * Start rubber-banding.  Draws the initial line on the display.           *
 ***************************************************************************/
void start_banding(mapc, x, y)
MAPC_STRUCT *mapc;
int x, y;
{
        /* If not already rubber-banding */
        if (!mapc->rubber_banding) {
                mapc->rx1 = mapc->rx2 = x;
                mapc->ry1 = mapc->ry2 = y;
                /* If already in the map, then start drawing the line */
                if (mapc->in_map && !mapc->rubber_banding) {
                        mapc_off(mapc);                 /* turn cursor off */
                        /* Draw the initial line */
                        xor_line(mapc->rx1, mapc->ry1,
                                mapc->rx2, mapc->ry2, mapc->line_color);
                        mapc_draw(mapc);                        /* turn cursor
back on */
                }
                mapc->rubber_banding = 1;
        }
}


/***************************************************************************
 *                              stop_banding                               *
 ***************************************************************************
 * Stop rubber-banding.  Erases the line from the display.                 *
 ***************************************************************************/
void stop_banding(mapc)
MAPC_STRUCT *mapc;
{
        /* If currently in the map and in rubber-band mode */
        if (mapc->in_map && mapc->rubber_banding) {
                mapc_off(mapc);                 /* turn cursor off */
                /* Erase the current line */
                xor_line(mapc->rx1, mapc->ry1,
                        mapc->rx2, mapc->ry2, mapc->line_color);
                mapc_draw(mapc);                        /* turn cursor back on
*/
        }
        mapc->rubber_banding = 0;
}


/***************************************************************************
 *                              start_box_banding                          *
 ***************************************************************************
 * Start rubberbox-banding.  Draws the initial box on the display.         *
 ***************************************************************************/
void start_box_banding(mapc, x, y)
MAPC_STRUCT *mapc;
int x, y;
{
        /* If not already rubber-banding */
        if (!mapc->rubber_box_banding) {
                mapc->rx1 = mapc->rx2 = x;
                mapc->ry1 = mapc->ry2 = y;
                /* If already in the map, then start drawing the line */
                if (mapc->in_map && !mapc->rubber_box_banding) {
                        mapc_off(mapc);                 /* turn cursor off */
                        /* Draw the initial line */
                        xor_box(mapc->rx1, mapc->ry1,
                                mapc->rx2, mapc->ry2, mapc->line_color);
                        mapc_draw(mapc);                        /* turn cursor
back on */
                }
                mapc->rubber_box_banding = 1;
        }
}
```

Apr 04 1991 09:55:17 mapcur.c Page 4

```

/***************************************************************************
 *                              stop_box_banding                           *
 ***************************************************************************
 * Stop rubber-banding.  Erases the line from the display.                 *
 ***************************************************************************/
void stop_box_banding(mapc)
MAPC_STRUCT *mapc;
{
        /* If currently in the map and in rubber-band mode */
        if (mapc->in_map && mapc->rubber_box_banding) {
                mapc_off(mapc);                 /* turn cursor off */
                /* Erase the current line */
                xor_box(mapc->rx1, mapc->ry1,
                        mapc->rx2, mapc->ry2, mapc->line_color);
                mapc_draw(mapc);                        /* turn cursor back on
*/
        }
        mapc->rubber_box_banding = 0;
}


/***************************************************************************
 *                              mapc_scale                                 *
 ***************************************************************************
 * Scale the current mouse coordinates and put them into the given         *
 * map cursor structure.                                                   *
 *                                                                         *
 * Call with:                                                              *
 *      mapc = (MAPC_STRUCT *) pointer to the current map cursor struct    *
 ***************************************************************************/
void mapc_scale(mapc)
MAPC_STRUCT *mapc;
{
        int     mx, my;
        int     scale;
        int     xmin, ymin, xmax, ymax;
        int     height, width;

        get_mouse(&mx, &my);                    /* get mouse coordinates */
        scale = mapc->map_ptr->scale;           /* get scaling factor */

        width = mapc->map_ptr->ux - mapc->map_ptr->lx + 1;
        height = mapc->map_ptr->uy - mapc->map_ptr->ly + 1;

        /* Get the bounding box for the current map */
        xmin = mapc->map_ptr->xoff;
        ymin = mapc->map_ptr->yoff - height*scale;
        xmax = xmin + (width-2)*scale + (scale-1);
        ymax = mapc->map_ptr->yoff;

        /* If mouse is within the current map bounding box, then set the
         * <in_map> flag.  Otherwise, reset the flag
         */

        /* Convert x and y to map coord */
        mapc->mapx = (mx - xmin) / scale + mapc->map_ptr->lx;
        mapc->mapy = (my - ymin) / scale;

        /* (scx, scy) contains the screen coordinates of the lower left corner
         * of the current map coordinate.  This value is used by mapc_draw()
         * and mapc_off() for displaying/removing the map cursor from the
         * screen.
         */
        mapc->scx = (mapc->mapx - mapc->map_ptr->lx) * scale + xmin;    /* get
screen coords */
        mapc->scy = mapc->mapy * scale + ymin;

        /* convert y to real map coords */
        mapc->mapy = height - mapc->mapy + mapc->map_ptr->ly;

        if (mx >= xmin && mx <= xmax && my >= ymin && my <= ymax) {
                mapc->in_map = 1;
```

```
        }
        else {
                mapc->in_map = 0;
        }
}


/*******************************************************************
 *                          mapc_draw                              *
 *******************************************************************
 * Draw the map cursor.  Makes some checks to make sure that the   *
 * cursor is not already on and also makes sure that it is in the map. *
 * Note that a call to mapc_scale() must be made before calling this *
 * routine.                                                        *
 *******************************************************************/
void mapc_draw(mapc)
MAPC_STRUCT *mapc;
{
        if (mapc->in_map) {
#if 0
                /* If cursor already on, don't re-display it */
                if (mapc->cursor_visible)
                        return;
#endif
                mapc->cursor_visible = 1;
                xor_cursor(mapc->map_ptr, mapc->scx, mapc->scy, mapc->cursor_co
lor);
        }
}


/*******************************************************************
 *                          mapc_on                                *
 *******************************************************************
 * Turn the map cursor on.  Makes some checks to make sure that the *
 * cursor is not already on and also makes sure that it is in the map. *
 * Note that a call to mapc_scale() must be made before calling this *
 * routine.                                                        *
 *******************************************************************/
void mapc_on(mapc)
MAPC_STRUCT *mapc;
{
        if (mapc->in_map) {
#if 0
                /* If cursor already on, don't re-display it */
                if (mapc->cursor_visible)
                        return;
#endif
                mapc->cursor_visible = 1;
                mapc_draw(mapc);
                mapc_update(mapc);
        }
}


/*******************************************************************
 *                          mapc_off                               *
 *******************************************************************
 * Turn the map cursor off.  Makes some checks to make sure that the *
 * cursor is not already off and also makes sure that it is in the map. *
 * Note that a call to mapc_scale() must be made before calling this *
 * routine.                                                        *
 *******************************************************************/
void mapc_off(mapc)
MAPC_STRUCT *mapc;
{
        if (mapc->in_map) {
#if 0
                /* If cursor already off, don't re-display it */
                if (!mapc->cursor_visible)
                        return;
#endif
                mapc->cursor_visible = 0;
```

```
                xor_cursor(mapc->map_ptr, mapc->scx, mapc->scy, mapc->cursor_co
lor);
        }
}


/*******************************************************************
 *                          xor_cursor                             *
 *******************************************************************
 * Exclusive-OR a cursor at the given screen location.             *
 *                                                                 *
 * Call with:                                                      *
 *      map_ptr = (map *) a floor map                              *
 *      x, y    = (int) location of cursor, in screen coordinates  *
 *      color   = (int) color to exclusive or with                 *
 *******************************************************************/
void xor_cursor(map_ptr, x, y, color)
map *map_ptr;
int x, y, color;
{
        int     scale;

        scale = map_ptr->scale;
        gpmerge(MXOR);

        clip_gpmove(x,y+1);
        gpcolor(color);
        clip_gpbox(x+scale-1, y+scale*3);       /* draw bottom of crosshair */
        clip_gpmove(x-1,y);
        clip_gpbox(x-scale*3,y-scale+1);        /* left side */
        clip_gpmove(x,y-scale);
        clip_gpbox(x+scale-1,y-scale*4+1);      /* top */
        clip_gpmove(x+scale,y);
        clip_gpbox(x+scale*4-1,y-scale+1);      /* right side */

        gpmerge(MRPL);
}


/*******************************************************************
 *                          xor_box                                *
 *******************************************************************
 * Draw the outline of a box in exclusive-OR mode.                 *
 *                                                                 *
 * Call with:                                                      *
 *      x1,y1,x2,y2 = (int) endpoints of the box in map coordinates *
 *      color       = (int) color it exclusive-OR with             *
 *******************************************************************/
void xor_box(x1, y1, x2, y2, color)
int x1, y1, x2, y2, color;
{
        int     lx,ly, ux,uy;

        lx = (x1 < x2 ? x1 : x2);
        ux = (x1 > x2 ? x1 : x2);
        ly = (y1 < y2 ? y1 : y2);
        uy = (y1 > y2 ? y1 : y2);
        xor_line(lx,ly, ux,ly, color);  /* draw top of box */
        if (ly != uy) {
                xor_line(lx,uy, ux,uy, color);  /* draw bottom */
        }
        if (uy - ly > 1) {
                xor_line(lx,ly+1, lx,uy-1, color);      /* draw left side */
                if (lx != ux)
                        xor_line(ux,ly+1, ux,uy-1, color);      /* draw right s
ide */
        }
}


/*******************************************************************
 *                          xor_line                               *
 *******************************************************************
```

```
 * Draw a line in exclusive-OR mode on the screen.                    *
 *                                                                    *
 * Call with:                                                         *
 *      x1,y1,x2,y2 = (int) endpoints of the line in map coordinates  *
 *      color       = (int) color it exclusive-OR with                *
 **********************************************************************/
void xor_line(x1, y1, x2, y2, color)
int x1, y1, x2, y2, color;
{
    extern map  curmap;
    LINE_TYPE   line_struc;

    /* XOR the line into the actual floor map */
    gpmerge(MXOR);
    if (x1 == x2 && y1 == y2) {
        ScalePoint(&curmap, x1, y1, color);
        return;
    }
    init_line(&line_struc, x1, y1, x2, y2);
    do {
        ScalePoint(&curmap, line_struc.x, line_struc.y, color);
    } while (get_line_point(&line_struc) == 0);
/*    ScalePoint(&curmap, x2, y2, color);*/
    gpmerge(MRPL);
}



/**********************************************************************
 *                          map_draw_line                             *
 **********************************************************************
 * Draw a line on the screen.                                         *
 *                                                                    *
 * Call with:                                                         *
 *      x1,y1,x2,y2 = (int) endpoints of the line in map coordinates  *
 *      color       = (int) desired color of line.                    *
 **********************************************************************/
void map_draw_line(x1, y1, x2, y2, color)
int x1, y1, x2, y2, color;
{
    extern map  curmap;
    LINE_TYPE   line_struc;

    /* Erase the line into the actual floor map */
    gpmerge(MRPL);
    init_line(&line_struc, x1, y1, x2, y2);
    do {
        ScalePoint(&curmap, line_struc.x, line_struc.y, color);
    } while (get_line_point(&line_struc) == 0);
    ScalePoint(&curmap, x2, y2, color);
}



/**********************************************************************
 *                          map_get_point                             *
 **********************************************************************
 * Allow the user to move the map cursor around on the screen.  Wait  *
 * until he hits a button before returning.  If the button is hit     *
 * while the cursor is outside the map boundary or if the user hits the *
 * ESC key, then return -1.                                           *
 *                                                                    *
 * Call with:                                                         *
 *      mapc    = (MAPC_STRUCT *) current map cursor structure        *
 *      px      = (int *) pointer to place to be x coordinate         *
 *      py      = (int *) pointer to place to be y coordinate         *
 *                                                                    *
 * Returns:                                                           *
 *      0       if everything is OK                                   *
 *      -1      if user aborted                                       *
 *                                                                    *
 * Note: Assumes that mapc_init has already been called, and that     *
 * mapc_draw has also already been called.                            *
```

```
 *                                                                    *
 **********************************************************************/
int map_get_point(mapc, px, py, verbose)
MAPC_STRUCT *mapc;
int *px, *py;
int verbose;
{
    char        str[80];
    int         done = NO, aborted = NO;
    int         oldmapx, oldmapy;
    int         deltax, deltay;
    EVENT       evnt;
    extern map  curmap;

    /* Loop until the user either hits the mouse button or he hits the ESC
     * or F10 keys.
     */
    while (!done && !aborted) {
        oldmapx = mapc->mapx, oldmapy = mapc->mapy;
        mapc_update(mapc);              /* update the map cursor */
        if (mapc->in_map && ((oldmapx != mapc->mapx) || (oldmapy != mapc->mapy)
)) {
            all_coords(str, mapc->mapx, mapc->mapy, &curmap);
            text_foreground(IWHITE);
            text_background(BLACK);
            PutString(25,1, str);
            if (verbose) {
                PutString(19, 67, conv_value2str(floor(mapc->mapx, mapc->mapy,
mapc->map_ptr)));
            }
        }

        if (GetEvent(&evnt)) {
            switch(evnt.type & 0xFF00) {
            case KEYBOARD :
                if(evnt.data == 0x011B || evnt.data == F10)
                    aborted = YES;

                mouse_off();
                mapc_off(mapc);

                deltax = (mapc->map_ptr->ux - mapc->map_ptr->lx)/4;
                deltay = (mapc->map_ptr->uy - mapc->map_ptr->ly)/4;

                switch (evnt.data) {
                case LEFTARROW:                 /* pan left */
                    pan_map(mapc->map_ptr, -deltax, 0, 0,15, gdmaxcol,gdmax
row-15);
                    break;
                case RIGHTARROW:                /* pan right */
                    pan_map(mapc->map_ptr,  deltax, 0, 0,15, gdmaxcol,gdmax
row-15);
                    break;
                case UPARROW:                   /* pan up */
                    pan_map(mapc->map_ptr, 0,  deltay, 0,15, gdmaxcol,gdmax
row-15);
                    break;
                case DOWNARROW:                 /* pan down */
                    pan_map(mapc->map_ptr, 0, -deltay, 0,15, gdmaxcol,gdmax
row-15);
                    break;
                case SLEFTARROW:                /* small pan left */
                    pan_map(mapc->map_ptr, -1, 0, 0,15, gdmaxcol,gdmaxrow-1
5);
                    break;
                case SRIGHTARROW:               /* small pan right */
                    pan_map(mapc->map_ptr,  1, 0, 0,15, gdmaxcol,gdmaxrow-1
5);
                    break;
                case SUPARROW:                  /* small pan up */
                    pan_map(mapc->map_ptr, 0,  1, 0,15, gdmaxcol,gdmaxrow-1
5);
                    break;
```

```
                    case SDOWNARROW:                /* small pan down */
                            pan_map(mapc->map_ptr, 0, -1, 0,15, gdmaxcol,gdmaxrow-1
5);
                            break;
                    }
                    mapc_on(mapc);
                    mouse_on();

                    break;

                case MOUSEBUTTONDOWN :
                    if (mapc->in_map) {
                        *px = mapc->mapx;
                        *py = mapc->mapy;
                        done = YES;
                    }
                    else
                        aborted = YES;
                    break;

                }
            }
        }

        if (aborted)
            return (-1);
        return (OK);
    }



    clip_gpmove(x, y)
    int x, y;
    {
            if (x < 0) x = 0;
            if (x > gdmaxcol) x = gdmaxcol;
            if (y < 0) y = 0;
            if (y > gdmaxrow) y = gdmaxrow;
            gpmove(x, y);
    }


    clip_gpbox(x, y)
    int x, y;
    {
            if (x < 0) x = 0;
            if (x > gdmaxcol) x = gdmaxcol;
            if (y < 0) y = 0;
            if (y > gdmaxrow) y = gdmaxrow;
            gpbox(x, y);
    }
```

Apr 04 1991 09:56:23 script.c Page 1

```
/*****************************************************************
 *                          script.c                              *
 *****************************************************************
 * This file contains the routines for handling script files.  It reads *
 * a script file and executes each one of the commands in the script.  *
 * Eventually should have some form of control structure, i.e.  while, *
 * if, variables, etc.                                            *
 *                                                                *
 * Author: Gary Gilbreath,  21 Apr 88                             *
 *                                                                *
 *****************************************************************/


#include <stdio.h>
#include <ega.h>

#include "headers/ibmio.h"
#include "headers/funckeys.h"

/* Define move directions for the do_move_cmd() routine */
#define FORWARD                 0
#define BACKWARD                1
#define COUNTER_CLOCKWISE       2
#define CLOCKWISE               3

char    cmdstr[80]      = "";
int     defspeed        = 5;            /* default forward/backward speed */
int     deftspeed       = 3;            /* default turn speed */
int     stripespeed     = 5;


#define NCMDS   23

/* <cmdnames> is an array of strings giving the name of each possible
 * script command.  This is searched using the binary() search routine.
 * The index of the matching strings is then used to invoke the appropriate
 * function in the <funcs> array of function pointers.
 */
char *cmdnames[NCMDS] = {
        "backward",     "chain",        "connect",
        "disconnect",   "displaymap",   "end",
        "estimate",     "forward",      "gets",
        "loadmap",      "moveto",       "pause",
        "recalibrate",  "recharge",     "savemap",
        "security",     "setdir",       "setpos",
        "sleep",        "source",       "turn",
        "turnto",       "ultrasonic"
};

int     sbackward(),    /*schain(),*/   sconnect(),
        sdisconnect(),  sdisplaymap(),  /*send(),*/
        sestimate(),    sforward(),     sgets(),
        sloadmap(),     smoveto(),      spause(),
        srecalibrate(), srecharge(),    ssavemap(),
        ssecurity(),    ssetdir(),      ssetpos(),
        ssleep(),       /*ssource(),*/  sturn(),
        sturnto(),      sultrasonic();

int     sstub();                /* function stub */


/* funcs[] is an array of pointers to functions.  The pointer point at the
 * function to be called that corresponds to the command found in the
 * cmdnames[] array given above.
 */
int (*funcs[NCMDS]) () = {
        sbackward,      sstub,          sconnect,
        sdisconnect,    sdisplaymap,    sstub,
        sestimate,      sforward,       sgets,
        sloadmap,       smoveto,        spause,
        srecalibrate,   srecharge,      ssavemap,
        ssecurity,      ssetdir,        ssetpos,
        ssleep,         sstub,          sturn,
```

Apr 04 1991 09:56:23 script.c Page 2

```
        sturnto,        sultrasonic
};


extern drType   robart;         /* the Robart information structure */


/* Robart's current map */
extern map curmap;

/* Position estimation variables */
extern int      est_x, est_y, est_dir;

/* Path planning globals */
extern int      infl_count;
extern XY_PAIR  inflect_pts[200];

/* Current display mode */
extern int graphics_mode;

extern int      robot_type;
extern long     robotx, roboty, robothdg;

void    script_error();
int     strcmp(), strcmpl();
char    *rlf(), *skipblank(), *sgetw(), *strchr();



/*****************************************************************
 *                          doscript                              *
 *****************************************************************
 * Executes the given script file.  Note that this function may be   *
 * called recursively, i.e. a script can invoke another script.   *
 *                                                                *
 *****************************************************************/
doscript(name)
char *name;
{
        char    *cp, input[133], cmd[132], str[80];
        int     cmdix, func_status;
        FILE    *fd;

        fd = fopen(name, "r");          /* open the script file */
        if (fd == NULL)                 /* failed to open? */
                return (ERROR);

        /* Loop til EOF is found */
        while ((cp = rlf(input, 132, fd)) != NULL) {
                strip_comments(input);
                cp = skipblank(cp);
                if (*cp == EOS)         /* blank line? */
                        continue;       /* skip it */
                cp = sgetw(cmd, input); /* get the command to be executed */

                /* If it's a premature EOF, break now */
                if (strcmpl(cmd, "end") == 0)
                        break;

                /* Chain to a different script file? */
                else if (strcmpl(cmd, "chain") == 0) {
                        fclose(fd);
                        sgetw(name, cp);        /* get the name of the script f
ile */
                        fd = fopen(name, "r");
                        if (fd == NULL) {
                                sprintf(str, "Can't chain to '%s' -->", name);
                                script_error(str);
                                return (ERROR);
                        }
                        continue;               /* start reading from this file
 */
```

```
                }

                /* Search for the command in the cmdnames[] array */
                cmdix = binary(cmd, cmdnames, NCMDS, strcmpi);

                /* If command wasn't recognized, print error message, close
                 * the input file, and return error status.
                 */
                if (cmdix < 0 || cmdix >= NCMDS) {
                        sprintf(str, "Bad command in %s, '%s' -->", name, cmd);
                        script_error(str);
                        fclose(fd);
                        return (ERROR);
                }

                /* Command found.  Execute the function funcs[cmdix] with
                 * the rest of the string as an argument.  Store the returned
                 * status in <func_status>
                 */
                Clear_Line(25);
                PutString(25,1, input);
                func_status = (*funcs[cmdix]) (cp);
                if (func_status == ERROR || func_status == ABORT)
                        break;

                /* If a key has been hit, then terminate immediately, with
                 * an error message indicating that we terminated because
                 * the user hit a key.
                 */
                if (keyhit()) {
                        mgetkey();
                        script_error("Script %s terminated by user -->", name);
                        break;
                }
        }
        Clear_Line(25);
        fclose(fd);
        return (OK);
}


void strip_comments(cp)
register char *cp;
{
        register char *np;              /* next pointer */

        np = cp;                        /* point to current character */
        while (*np) {
                /* If there is a "\#" sequence, strip the '\' but copy
                 * the '#'.  This is how '#'s are entered as non-comments.
                 */
                if (*np == '\\' && np[1] == '#')
                        np++;           /* point to the # */
                else if (*np == '#')    /* comment? */
                        break;          /* time to quit */
                *cp++ = *np++;          /* copy the character */
        }
        *cp = EOS;
}



/* sbackward - move the robot backward the given number of inches
 *
 * Synopsis:    backward <inches> [speed]
 *
 * Where:
 *              inches  = number of inches to move backward
 *              speed   = optional desired speed, 1 to 15 (default: 5)
 *
 * Example:     backward 10
 *
```

```
 * Note:  Moves of greater than 250 inches are done in two or more moves
 * of no more than 250 inches each.
 */
sbackward(str)
char *str;
{
        char sinches[20], sspeed[20];
        int inches, speed;

        str = skipblank(str);
        if (*str == EOS)                /* No argument to the command? */
                return (ERROR);
        str = sgetw(sinches, str);      /* get the number of inches */
        inches = atoi(sinches);         /* convert to integer */
        str = sgetw(sspeed, str);       /* get the speed if available */
        if (sspeed[0] != EOS) {         /* speed present? */
                speed = atoi(sspeed);   /* get it */
                if (speed < 1 || speed > 15)    /* fix it between 0 and 16 */
                        speed = defspeed;
        }
        else
                speed = defspeed;
        return (do_move_cmd(BACKWARD, inches, speed));
}


/* sconnect - establish communications with Robart.
 *
 * Synopsis:    connect [diagnostics]
 *
 * If the optional "diagnostics" argument is included, then Robart's
 * hardware diagnostics are run, otherwise, just the quick connect.
 */
sconnect(str)
char *str;
{
        int diags, stat;

        diags = NO;
        str = skipblank(str);
        if (*str) {                     /* an argument given? */
                if (strcmpi(str, "diagnostics") == 0)
                        diags = YES;
                else {
                        script_error("Bad arg to 'connect' -->");
                        mgetkey();
                        return (ERROR);
                }
        }
        stat = ConnectToRobart(diags);
        Init_IBM_IO(0);
        return (stat);
}


/* sdisconnect - disconnect from Robart.  We may want to do this to power-down
 *      the electronics when Robart is recharging, or just before the
 *      end of a script.
 */
sdisconnect(str)
char *str;
{
        int stat;

        stat = DisconnectFromRobart();
        Init_IBM_IO(0);
        return (stat);
}


/* sdisplaymap - display the current map, after scaling everything */
sdisplaymap(str)
char *str;
```

```
{
        SetScale(&curmap, 0,gdmaxcol, 15, gdmaxrow-15);
        DrawSFloorMap(&curmap, WHITE, BLUE, GREEN);     /* draw map on screen *
/
        return (OK);
}


/* sstub - this is a stub function.  All routines that aren't implemented or
 *      never called point to this function.
 */
sstub()
{
        return (0);
}


/* sestimate - Estimate Robart's current position.  If the estimate has a
 *      sufficiently high correlation, update Robart's current position
 *      and direction.
 */
sestimate(str)
char *str;
{
        int correlation;
        byte sonar_returns[PE_SONAR_NUM];

        correlation = CorrectDR(&curmap, sonar_returns, 12, 5, 12);
        if (correlation == ERROR)       /* error of some kind? */
                return (ERROR);
        else if (correlation < 12)      /* no estimate? */
                /*lint -e506 */
                return (!OK);
                /*lint +e506 */
        else {                          /* estimate done, update pos/dir */
                robart.x = est_x;
                robart.y = est_y;
                robart.dir = est_dir;
                robotx = robart.x * curmap.squaresize * 10L;
                roboty = robart.y * curmap.squaresize * 10L;
                robothdg = robart.dir * 100L;
        }
        return (OK);
}


/* sforward - move the robot forward the given number of inches
 *
 * Synopsis:    forward <inches> [speed]
 *
 * Where:
 *              inches  = number of inches to move forward
 *              speed   = optional desired speed, 1 to 15 (default: 5)
 *
 * Example:     forward 10
 *
 * Note:  Moves of greater than 250 inches are done in two or more moves
 * of no more than 250 inches each.
 *
 * Returns:     OK      if successfully moved
 *              ERROR   if bad command syntax or error in moving
 */
sforward(str)
char *str;
{
        char sinches[20], sspeed[20];
        int inches, speed;

        str = skipblank(str);
        if (*str == EOS)                /* No argument to the command? */
                return (ERROR);
        str = sgetw(sinches, str);      /* get the number of inches */
        inches = atoi(sinches);         /* convert to integer */
```

```
        str = sgetw(sspeed, str);       /* get the speed if available */
        if (sspeed[0] != EOS) {         /* speed present? */
                speed = atoi(sspeed);   /* get it */
                if (speed < 1 || speed > 15)    /* fix it between 0 and 16 */
                        speed = defspeed;
        }
        else
                speed = defspeed;
        return (do_move_cmd(FORWARD, inches, speed));
}


/* sgets - get an input string from the user
 *
 * Synopsis:    gets [prompt]
 *
 * Where:
 *              prompt = optional prompt string
 *
 *              cmdstr = string user typed
 *
 * Returns:     OK      always
 *
 * Example:     gets Hit the Enter key -->
 */
sgets(str)
char *str;
{
        PutString(25, 1, str);
        Get_String(cmdstr);
        return (OK);
}


/* sloadmap - load a different map into the computer and display it
 *      on the screen.  Also loads the position estimation file if it
 *      exists and has the same base name as the map file.
 *
 * Synopsis:    loadmap <mapname>
 *
 * Where:
 *              mapname = name of the map to load
 *
 * Example:     loadmap fh36.map
 *
 * Returns:     OK      if successfully loaded the map
 *              ERROR   if unable to find map or error in loading map
 */
sloadmap(str)
char *str;
{
        char *cp, mapname[80];

        str = sgetw(mapname, str);
        if (mapname[0] == EOS) {
                script_error("No map name for loadmap -->");
                mgetkey();
                return (ERROR);
        }
        if (Load_Floor_Map(&curmap, mapname) == ERROR)
                return (ERROR);
        cp = strchr(mapname, '.');      /* is it in "name.map" format? */
        if (cp != NULL)                 /* found the dot */
                *cp = EOS;              /* truncate to just filename */
        strcat(mapname, "pea");         /* load position est. array too */
        LoadPEArray(&curmap, mapname);  /* ignore status on this one */
        SetScale(&curmap, 0,gdmaxcol, 15, gdmaxrow-15);
        DrawSFloorMap(&curmap, WHITE, BLUE, GREEN);     /* draw map on screen *
/
        return (OK);
}
```

```
/* smoveto - move Robart to a desired square using the path planner.
 *
 * Synopsis:    moveto x y
 *
 * Where:
 *              x = x-coordinate in square domain or feet'inches"
 *              y = y-coordinate in square domain or feet'inches"
 *
 * Example:     moveto 10 23
 *              moveto 10'6" 3'
 *
 * Returns:     OK      if able to move
 *              !OK     if unable to move
 *              ERROR   if bad syntax
 *
 */
smoveto(str)
char *str;
{
        char    *cp, word[40];
        int     curseg;
        int     stat, status;
        int     destx, desty;
        int     npoints, nsegs;
        map     fp_ptr;
        PATHSEG *path;

        cp = sgetw(word, str);
        if (word[0] == EOS) {
                script_error("Bad syntax: moveto x,y");
                return (ERROR);
        }

        /* Get the destination position */
        destx = sget_map_coord(word, curmap.squaresize, curmap.xmapoff);
        cp = sgetw(word, cp);           /* get y coordinate */
        desty = sget_map_coord(word, curmap.squaresize, curmap.ymapoff);

        /* If already there, don't try to move */
        if (destx == robart.x && desty == robart.y)
                return (OK);

        PutString(1,1, "Growing floor map...");

        /* Grow the map 3 times to allow a buffer zone around any objects */
        inc_map(&curmap, 1);
        grow_oa_map(&curmap);
        inc_map(&curmap, 1);
        grow_oa_map(&curmap);
        inc_map(&curmap, 1);
        grow_oa_map(&curmap);

        DrawSFloorMap(&curmap, WHITE, BLUE, GREEN);

        fp_ptr.mem_ptr = NULL;
        if (Copy_Floor_Map(&curmap, &fp_ptr, -1) == ERROR) {
            inc_map(&curmap, -3);        /* get rid of temp growth */
            /*lint -e506 */
            return (!OK);
            /*lint +e506 */
        }

        /* Stuff the current position and the destination position into
         * the map.
         */
        floor(robart.x, robart.y, &fp_ptr) = START;     /* start position */
        floor(destx, desty, &fp_ptr) = DEST;                     /* destination
 */

        /* Search for a route to the destination */
        stat = Expand_Slime(&fp_ptr, robart.x, robart.y, &destx, &desty, TRUE);

        /* If a path was found, backtrack to the beginning, cleanup the
```

```
         * inflection list, and execute the path.
         */
        if (stat) {
                /* Backtrack from destination to current position */
                stat = Find_Path(&fp_ptr, inflect_pts, &infl_count, robart.x, r
obart.y, destx, desty);
                free(fp_ptr.mem_ptr);

                if (stat == ABORT)
                        return (ABORT);
                if (stat == ERROR)
                        return (ERROR);
                npoints = infl_count + 1;
                fp_ptr.mem_ptr = NULL;

                Cut_Path_Corners(&curmap, inflect_pts, &npoints);       /* elim
inate unnecessary turns */
                minimize_turns(&curmap, inflect_pts, &npoints);
                inc_map(&curmap, -3);

                DrawSFloorMap(&curmap, WHITE, BLUE, GREEN);     /* redraw the m
ap */
                Draw_Inflection_List_Path(&curmap, inflect_pts, npoints, LBLUE)
;       /* draw the path on the screen */
                path = segment_path(&curmap, inflect_pts, npoints, &nsegs);
                if (path == (PATHSEG *) NULL) {
                        gstatus("Couldn't segment path -->"); mgetkey();
                }
                else {
                    status = execute_path(&curmap, path, nsegs, &curseg);
                    if (status == OK) {
                        robart.x = destx;
                        robart.y = desty;
                        robotx = robart.x * curmap.squaresize * 10L;
                        roboty = robart.y * curmap.squaresize * 10L;
                        robothdg = robart.dir * 100L;
                        free(path);
                    }
                    else if (status == ABORT) {
                        free(path);
                        return (ABORT);
                    }
                    else {
                        status = avoid(&curmap, 0, path, nsegs, nsegs-1);
                        free(path);
                        if (status == ABORT)
                            return (ABORT);
                        if (status != OK) {
                            script_error("Can't navigate to %d,%d", destx, dest
y);
                            /*lint -e506 */
                            return (!OK);
                            /*lint +e506 */
                        }
                    }
                }
        }
        else {
                inc_map(&curmap, -3);
                script_error("Can't find path to %d,%d", destx, desty);
                /*lint -e506 */
                return (ERROR);
                /*lint +e506 */
        }
        return (OK);
}


/* spause - wait for the userto hit a key
 */
spause(str)
char *str;
{
```

```
        int     cc;

        gstatus("PAUSE - hit any key to continue -->");
        cc = mgetkey();
        Clear_Line(25);
        if (cc == ESC)
                return (ABORT);
        return (OK);
}


/* srecalibrate - execute the recalibration procedure.
 *
 * Synopsis:    recalibrate
 *
 */
srecalibrate(str)
char *str;
{
        int     status;

        status = dorecalibrate(&curmap);
        if (status == ABORT)
                return (ABORT);
        if (status < 0) {
                script_error("Unable to complete recalibration procedure -->");
                return (ERROR);
        }
        return (OK);
}


/* srecharge - plan a path to the recharger, execute it and invoke the
 *      re-charging routine.  Needs work.
 *
 * Synopsis:    recharge
 *
 */
srecharge(str)
char *str;
{
        put_packet("OR8");
        return (OK);
}


/* ssavemap - save the current floor map to a file.
 *
 * Synopsis:    savemap <mapname>
 *
 * Where:
 *              mapname = name of the file to save the map to
 *
 * Example:     savemap new.map
 *
 * Returns:     OK      if successfully saved the map
 *              ERROR   if unable to save map
 */
ssavemap(str)
char *str;
{
        char mapname[80];

        str = sgetw(mapname, str);
        if (mapname[0] == EOS) {
                script_error("No map name for savemap -->");
                mgetkey();
                return (ERROR);
        }
        if (Save_Floor_Map(&curmap, mapname) == ERROR)
                return (ERROR);
        return (OK);
}
```

```


/* ssecurity - enter the security assessment mode for the given number of
 *      seconds.  If nothing happens during that time, return OK.  If
 *      a possible intrusion is detected, return !OK.
 *
 * Synopsis:    security <seconds>
 *
 * Where:
 *              seconds = number of seconds to be in security assessment
 *                      before returning.
 *
 * Returns:     OK      if no intruders detected
 *              !OK     if a possible.intruder
 *              ERROR   if unable to enter security assessment mode
 *
 */
ssecurity(str)
char *str;
{
        char word[40];
#ifdef TIMEOUT
        unsigned int nsecs;
#endif

        sgetw(word, str);
        if (word[0] == EOS) {
                script_error("Bad syntax: security nseconds");
                return (ERROR);
        }
#ifdef TIMEOUT
        nsecs = atoi(word);
#endif
        script_error("Security assessment not implemented yet");
        return (ERROR);
}


/* ssetdir - set Robart's current direction to the given angle.
 *
 * Synopsis:    setdir <angle>
 *
 * Where:
 *              angle = 0 - 360 degrees
 *
 * Returns:     OK      if everything alright
 *              ERROR   if bad command syntax
 */
ssetdir(str)
char *str;
{
        char word[40];

        sgetw(word, str);                       /* get the desired direction */
        if (word[0] == EOS) {
                script_error("Bad syntax: setdir angle");
                return (ERROR);
        }
        robart.dir = force360(atoi(word));      /* set the direction */
        robothdg = robart.dir * 100L;
        return (OK);
}


/* ssetpos - set Robart's current position and optionally, the direction.
 *
 * Synopsis:    setpos x y [angle]
 *
 * Where:
 *              x       = desired x-coordinate
 *              x       = desired x-coordinate
 *              angle   = optional new direction
 *
```

```
 * Returns:     OK      if everything OK
 *              ERROR   if bad command syntax
 *
 */
ssetpos(str)
char *str;
{
        char *cp, word[40];
        int xco, yco;

        cp = sgetw(word, str);          /* get the x coordinate */
        if (word[0] == EOS) {
                script_error("Bad syntax: setpos x y [angle]");
                return (ERROR);
        }
        xco = sget_map_coord(word, curmap.squaresize, curmap.xmapoff);  /* set
the x coordinate */
        cp = sgetw(word, cp);           /* get the y coordinate */
        if (word[0] == EOS) {
                script_error("Bad syntax: setpos x y [angle]");
                return (ERROR);
        }
        yco = sget_map_coord(word, curmap.squaresize, curmap.ymapoff);  /* set
the y coordinate */
        if (xco < 1)                    /* force to within map limits */
                xco = 1;
        else if (xco > curmap.width)
                xco = curmap.width;
        if (yco < 1)
                yco = 1;
        else if (yco > curmap.height)
                yco = curmap.height;
        robart.x = xco - 1;             /* set new robart coordinates */
        robart.y = yco - 1;
        robotx = robart.x * curmap.squaresize * 10L;
        roboty = robart.y * curmap.squaresize * 10L;
        robothdg = robart.dir * 100L;

        /* See if the optional direction is also there.  If so, call the
         * ssetdir() function to set the new direction as well.
         */
        cp = sgetw(word, cp);
        if (word[0] != EOS)
                ssetdir(word);
        return (OK);
}


/* ssleep - turn the robot off for the given number of seconds.  Currently
 *      just waits, doesn't really turn the robot off.
 *
 * Synopsis:    sleep <seconds>
 *
 * Where:
 *              seconds = number of seconds to sleep
 *
 * Returns:     OK      if waited successfully
 *              ERROR   if bad command syntax or user hit a key
 *
 */
ssleep(str)
char *str;
{
        char word[40];
        unsigned int nsecs;

        sgetw(word, str);               /* get the x coordinate */
        if (word[0] == EOS) {
                script_error("Bad syntax: sleep seconds");
                return (ERROR);
        }
        nsecs = atoi(word);             /* get the number of seconds */
#if 0
```

```
        put_packet("0X000");            /* power Robart down */
#endif
        while (nsecs--) {               /* while seconds left to wait */
                gstatus("Sleeping: %3d", nsecs+1);
                waitms(1000);           /* wait 1 second (approx.) */
                if (keyhit()) {         /* user hit a key? */
                        mgetkey();      /* dump the key */
#if 0
                        put_packet("0X001");    /* power on */
#endif
                        return (ERROR); /* bomb out of script */
                }
        }
#if 0
        put_packet("0X001");            /* turn Robart power back on */
#endif
        gstatus("");
        return (OK);
}


/* sturn - turn the given number of degrees.
 *
 * Synopsis:    turn <ndegrees> [speed]
 *
 * Where:
 *              ndegrees = number of degrees to turn, -180 to 180
 *              speed    = optional turn speed, default is <deftspeed>
 *
 * Returns:     OK      if everything OK
 *              ERROR   if bad command syntax
 *
 */
sturn(str)
char *str;
{
        char    *cp, word[40];
        int     speed;
        int     ndegs;
        int     status;

        speed = deftspeed;              /* set to default speed first */
        cp = sgetw(word, str);          /* get the x coordinate */
        if (word[0] == EOS) {
                script_error("Bad syntax: turn degrees");
                return (ERROR);
        }
        ndegs = atoi(word);             /* get the number of degrees */

        cp = sgetw(word, cp);           /* get the speed */
        if (word[0] != EOS)
                speed = atoi(word);     /* get new turn speed */
        if (ndegs < 0)
                status = do_move_cmd(COUNTER_CLOCKWISE, -ndegs, speed);
        else
                status = do_move_cmd(CLOCKWISE, ndegs, speed);
        if (robot_type == ROBARTII)
                robart.dir = force360(robart.dir + ndegs);

        return (status);
}


/* sturnto - turn to the given heading
 *
 * Synopsis:    turnto <heading> [speed]
 *
 * Where:
 *              heading = desired heading, 0 to 360
 *              speed   = optional turn speed, default is <deftspeed>
 *
 * Returns:     OK      if everything OK
 *              ERROR   if bad command syntax
```

```
 *
 */
sturnto(str)
char *str;
{
        char    *cp, word[40];
        int     speed, twist;
        int     hdg, ndegs;
        int     status;

        speed = deftspeed;
        cp = sgetw(word, str);          /* get the x coordinate */
        if (word[0] == EOS) {
                script_error("Bad syntax: turnto heading");
                return (ERROR);
        }
        hdg = force360(atoi(word));     /* get new heading */
        cp = sgetw(word, cp);           /* get speed if it is present */
        if (word[0] != EOS)             /* speed there? */
                speed = atoi(word);     /* change to new speed */
        ndegs = force360(robart.dir - hdg);     /* Calculate displacement from
current position */
        if (ndegs < 0) {                /* clockwise turn? */
                twist = CLOCKWISE;
                ndegs = -ndegs;         /* convert to positive */
                if (ndegs > 180) {
                        ndegs = 360 - ndegs;
                        twist = COUNTER_CLOCKWISE;
                }
        }
        else {
                twist = COUNTER_CLOCKWISE;
                if (ndegs > 180) {
                        ndegs = 360 - ndegs;
                        twist = CLOCKWISE;
                }
        }
        status = do_move_cmd(twist, ndegs, speed);
        if (robot_type == ROBARTII)
                robart.dir = hdg;               /* update robart's heading */
        return (status);
}


/* sultrasonic - enter the ultrasonic detection mode.  Not implemented yet. */
sultrasonic(str)
char *str;
{
        script_error("Ultrasonic detection mode not implemented yet");
        return (ERROR);
}



/* script_error - display an error message for a script */
void script_error(fmt, a,b,c,d,e,f,g,h)
char *fmt;
long a,b,c,d,e,f,g,h;
{
        gstatus(fmt, a,b,c,d,e,f,g,h);
        mgetkey();
        Clear_Line(25);
}


/* do_move_cmd - execute a move command.  Return only when Robart signals
 *      completion or when the user hits a key.
 */
do_move_cmd(command, parm, speed)
int command, parm, speed;
{
        char    packstr[40];
        int     divisor, maxmove, status;
```

```
        int     cc;
        packet  pack;

        if (speed < 1 || speed > 15) {
                script_error("Illegal move speed: %d", speed);
                return (ERROR);
        }
        switch (command) {
        case FORWARD:
        case BACKWARD:
                /*
                 * If the move is longer than 250 we have to split the move up
                 * into two or more segments.  It is desirable that these
                 * segments be of roughly equal length.  <maxmove> is set to
                 * the distance to be moved each time.
                 */
                if (parm > 250) {                       /* 250 is maximum move */
                    divisor = parm / 250;       /* how many times does 250 go i
nto distance? */
                    maxmove = parm / (divisor+1);       /* move equal distances
 */
                }
                while (parm > 0) {
                  int tdist;

                    if (parm > 250)             /* greater than maximum move? *
/
                        tdist = maxmove;        /* move maxmove inches */
                    else                        /* move is 0 to 250 */
                        tdist = parm;
                    parm -= tdist;              /* update distance moved */

                    /*
                     * Assemble the move packet.
                     * Format:
                     *  '0'             Robot command packet
                     *  'M'             Move command
                     *  '00'|'01'       Move forward or backward
                     *  'ss'            Velocity <speed> on both wheels
                     *  distance        Distance to move in inches
                     */
                    if (command == FORWARD)
                        sprintf(packstr, "0H00%d%d%02x", speed, speed, tdis
t);
                    else
                        sprintf(packstr, "0H01%d%d%02x", speed, speed, tdis
t);
                    status = put_packet(packstr);
                    if (status != OK)
                        script_error("do_cmd_move: Communication error %d", sta
tus);

                    /* Wait until the move is completed or the user hits a key
 */
                    for (;;) {
                        status = wait_packet(&pack, NO_WAIT);
                        if (status == ABORT)
                            return (ABORT);
                        else if (status == PACKET_NOT_AVAILABLE) {
                            if (keyhit()) {
                                if ((cc = mgetkey()) == ESC || cc == F10)
                                    return (ABORT);
                                else
                                    return (OK);
                            }
                        }
                        else if (status != OK)
                            return (ERROR);
                        if (strncmp(pack.data, "9M", 2) == 0)   /* move ack pac
ket? */
                            break;                      /* move completed */
                    }
                    if (keyhit()) {             /* user abort? */
```

```
                            mgetkey();              /* grab the key */
                            put_packet("OM070000"); /* send stop command */
                            return (ERROR);
                        }

                    }
                    break;

            case CLOCKWISE:
            case COUNTER_CLOCKWISE:
                    /*
                     * If the move is longer than 180 we have to split the move up
                     * into two or more segments.  It is desirable that these
                     * segments be of roughly equal length.  <maxmove> is set to
                     * the distance to be moved each time.
                     */
                    if (parm > 180) {               /* 180 is maximum move */
                        divisor = parm / 180;       /* how many times does 250 go i
nto distance? */
                        maxmove = parm / (divisor+1);       /* move equal distances
 */
                    }
                    while (parm > 0) {
                        int tdist;

                        if (parm > 180)             /* greater than maximum move? *
/
                            tdist = maxmove;        /* move maxmove inches */
                        else                        /* move is 0 to 250 */
                            tdist = parm;
                        parm -= tdist;              /* update distance moved */

                        /*
                         * Assemble the move packet.
                         * Format:
                         *   'O'             Robot command packet
                         *   'M'             Move command
                         *   '02'|'03'       Turn counter-clockwise or clockwise
                         *   'ss'            Velocity <speed> on both wheels
                         *   distance        Distance to move in inches
                         */
                        if (command == CLOCKWISE)
                                sprintf(packstr, "OM03%d%d%02x", speed, speed, tdis
t);
                        else
                                sprintf(packstr, "OM02%d%d%02x", speed, speed, tdis
t);
Clear_Line(25);
PutString(25,1,packstr);
                        status = put_packet(packstr);
                        if (status != OK)
                            script_error("do_cmd_move: Communication error %d", sta
tus);

                        /* Wait until the move is completed or the user hits a key
*/
                        for (;;) {
                            status = wait_packet(&pack, NO_WAIT);
                            if (status == ABORT)
                                return (ABORT);
                            else if (status == PACKET_NOT_AVAILABLE) {
                                if (keyhit()) {
                                    if ((cc = mgetkey()) == ESC || cc == F10)
                                        return (ABORT);
                                    else
                                        return (OK);
                                }
                            }
                            else if (status != OK)
                                return (ERROR);
                            if (strncmp(pack.data, "9M", 2) == 0)   /* move ack pac
ket? */
                                break;              /* move completed */
```

```
                        }
                        if (keyhit()) {                 /* user abort? */
                            mgetkey();                  /* grab the key */
                            put_packet("OM070000");     /* send stop command */
                            return (ERROR);
                        }

                    }
                    break;

            default:
                    script_error("do_move_cmd: unknown command, %d", command);
                    return (ERROR);
            }
            return (OK);
}


/* binary - find name matching <pat> in the array of char. pointers using
 *      a binary search.
 *
 * Call with:   pat     = string to search for
 *              ary     = array of strings to search
 *              n       = number of strings in <ary>
 *              compare = pointer to comparison function
 *
 * Returns:     index of string in ary[] that matched pat
 *              -1 if no match
 */
int binary(pat, ary, n, compare)
char *pat, **ary;
int n;
int (*compare)();
{
        int low, high, mid, cond;

        low = 0;
        high = n - 1;
        while (low <= high) {
            /*lint -e702 */
            mid = (low + high) >> 1;
            /*lint +e702 */
            if ((cond = (*compare) (pat, ary[mid])) < 0)
                high = mid - 1;
            else if (cond > 0)
                low = mid + 1;
            else
                return (mid);
        }
        return (-1);
}



/* sgetw - get word off of is onto os.  Return pointer to first character
 *      following the word just gotten.  End of a word is indicated by
 *      a space, tab, comma or EOS.
 */
char *sgetw(os, is)
char *os, *is;
{
        while (*is == ' ' || *is == '\t' || *is == ',')
                is++;
        is = skipblank(is);                 /* skip leading blanks in s */
        while (*is != ' ' && *is != '\t' && *is != ',' &&
               *is != '\n' && *is != '\r' && *is != EOS)
            *os++ = *is++;                  /* copy next character */
        *os = EOS;                          /* tack on end of string */
        return (is);                        /* return pointer to end of word char *
/
}
```

Apr 04 1991 09:56:23 script.c Page 17

```
/* skipblank - skip leading blanks in a string.  Return pointer to first
 *      non-blank.  Carriage return and newline are also considered blanks
 *
 * Returns:     pointer to first non-blank in the string
 */
char *skipblank(s)
char *s;
{
        while (*s == ' ' || *s == '\t' || *s == '\r' || *s == '\n')
                s++;
        return (s);
}


/* rlf - read a line from a file, gobbling up carriage returns and line
 *      feeds.
 *
 * Call with:   s  = string to write on
 *              n  = maximum number of bytes to read
 *              fd = descriptor to read from
 *
 * Returns:     NULL  at end of file
 *              pointer to the string read otherwise
 */
char *rlf(s, n, fd)
char *s;
int n;
FILE *fd;
{
        char *p;
        int c;

        p = s;                  /* save original pointer */
        n--;                    /* always read n-1 characters */
        while ((c = getc(fd)) != EOF) {
                if (c == 0x1a)          /* ^Z? */
                        break;
                c &= 0x7f;
                if (c == '\n' || n <= 0)
                        break;
                if (c != '\r') {
                        *s++ = (char) c;
                        n--;
                }
        }
        *s = EOS;               /* terminate the string */
        if (c == EOF && *p == EOS)
                return (NULL);
        return (p);
}

/* sget_map_coord - get a map coordinate.  Return the equivalent in the
 *      square domain.  The input coordinate can be in either the square
 *      domain or the feet and inches domain.  Input must be constrained
 *      as follows:
 *              [0-9]*          square domain
 *              [0-9]*'         feet only
 *              [0-9]*'[0-9]*"  feet and inches
 *
 *      Examples:       42      42 in square domain
 *                      42'     42 feet
 *                      42'3"   42 feet, 3 inches
 *      The square domain inputs are assumed to be referenced to the map's
 *      local origin (i.e. don't add in xmapoff and ymapoff).  Inputs in
 *      feet and inches are assumed to include the offsets.  Note that for
 *      feet and inches, no spaces are allowed anywhere within coordinate.
 *
 * Call with:
 *      str             = (char *) input string containing coord
 *      squaresize      = (int) size of squares (in inches)
 *      offset          = (int) amount to subtract from feet'inches"
 *                              coordinates
```

Apr 04 1991 09:56:23 script.c Page 18

```
 *
 * Returns:
 *      coodinate in square domain
 */
int sget_map_coord(str, squaresize, offset)
char *str;
int squaresize, offset;
{
        char    *cp, digits[80];
        int     coord;

        coord = 0;
        cp = digits;
        str = skipblank(str);

        while ((*str >= '0' && *str <= '9') || *str == '-' || *str == '+')
                *cp++ = *str++;
        *cp = EOS;

        /* If the coordinate did not end in either ' or ", then assume it
         * is in the square domain.
         */
        if (*str != '\'' && *str != '"')
                return (atoi(digits));
        if (*str == '\'') {
                coord = atoi(digits) * 12;      /* convert to inches */
                str++;                          /* skip beyond ' */
                /* Now try to get any inches part */
                cp = digits;
                while (*str >= '0' && *str <= '9')
                        *cp++ = *str++;
                *cp = EOS;
        }
        if (*str == '"') {
                if (coord < 0)
                        coord -= atoi(digits);
                else
                        coord += atoi(digits);
        }
        if (coord < 0)
                return ((coord - squaresize/2)/squaresize - offset);
        /* Scale down to square domain, then subtract off the offset */
        return ((coord + squaresize/2)/squaresize - offset);
}
```

```
/*
 * setup.c
 *      This file contains the routines saving and restoring the various
 *      robot parameters.
 */


#include <stdio.h>
#include <string.h>
#include <math.h>
#include <ega.h>

#include "headers/ibmio.h"
#include "headers/funckeys.h"


#define NCMDS   5

/* <cmdnames> is an array of strings giving the name of each possible
 * script command.  This is searched using the binary() search routine.
 * The index of the matching strings is then used to invoke the appropriate
 * function in the <funcs> array of function pointers.
 */
char *setupnames[NCMDS] = {
        "docked",       "heading",      "mapname",
        "mapwindow",    "position"
};

int     sdocked(),      sheading(),     smapname(),
        smapwindow(),   sposition();


/* funcs[] is an array of pointers to functions.  The pointer point at the
 * function to be called that corresponds to the command found in the
 * cmdnames[] array given above.
 */
int (*setupfuncs[NCMDS]) () = {
        sdocked,        sheading,       smapname,
        smapwindow,     sposition
};


extern drType   robart;         /* the Robart information structure */

/* Robart's current map */
extern map curmap;

extern int      robot_type;
extern int      docked;
extern long     robotx, roboty, robothdg;

int     strcmp(), strcmpi();
char    *rlf(), *skipblank(), *sgetw(), *strchr();



/***********************************************************************
 *                              setup                                  *
 ***********************************************************************
 * Reads the named setup file.                                         *
 *                                                                     *
 ***********************************************************************/
read_setup(name)
char *name;
{
        char    *cp, input[133], cmd[132], *pp, str[80];
        int     cmdix, func_status;
        FILE    *fd;

        fd = fopen(name, "r");          /* open the script file */
        if (fd == NULL)                 /* failed to open? */
{ gstatus("Couldn't open setup file %s -->", name); mgetkey();
                return (ERROR);
```

```
}


        /* Loop til EOF is found */
        while ((cp = rlf(input, 132, fd)) != NULL) {
                strip_comments(input);
                cp = skipblank(cp);
                if (*cp == EOS)         /* blank line? */
                        continue;       /* skip it */
                cp = sgetw(cmd, input); /* get the command to be executed */

                /* Get rid of any trailing colon */
                pp = strrchr(cmd, ':');
                if (pp != NULL)
                        *pp = EOS;

                /* Search for the command in the cmdnames[] array */
                cmdix = binary(cmd, setupnames, NCMDS, strcmpi);

                /* If command wasn't recognized, print error message, close
                 * the input file, and return error status.
                 */
                if (cmdix < 0 || cmdix >= NCMDS) {
                        sprintf(str, "Bad command in %s, '%s' -->", name, cmd);
                        script_error(str);
                        fclose(fd);
                        return (ERROR);
                }

                /* Command found.  Execute the function funcs[cmdix] with
                 * the rest of the string as an argument.  Store the returned
                 * status in <func_status>
                 */
                Clear_Line(25);
                PutString(25,1, input);
                func_status = (*setupfuncs[cmdix]) (cp);
                if (func_status == ERROR || func_status == ABORT)
                        break;
        }
        Clear_Line(25);
        fclose(fd);
        if (curmap.squaresize != 0) {
                robart.x = ((robotx + 5L)/10L) / curmap.squaresize;
                robart.y = ((roboty + 5L)/10L) / curmap.squaresize;
                robart.dir = (robothdg + 50L)/100L;
        }
        return (func_status);
}


/* write_setup - write out the setup information */
write_setup(name)
char *name;
{
        FILE    *fd;

        if ((fd = fopen(name, "w")) == NULL) {
                gstatus("Couldn't open output setup file %s -->", name);
                return (ERROR);
        }
        fprintf(fd, "position:\t%ld.%ld,%ld.%ld\n",
                robotx/10L, robotx%10L, roboty/10L, roboty%10L);
        fprintf(fd, "heading:\t%ld.%02ld\n", robothdg/100L, robothdg%100L);
        fprintf(fd, "docked:\t\t%s\n", docked ? "Yes" : "No");
        fprintf(fd, "mapname:\t%s\n", curmap.mapName);
        fprintf(fd, "mapwindow:\t%d,%d %d,%d\n",
                curmap.lx,curmap.ly,curmap.ux,curmap.uy);
        fclose(fd);
        return (OK);
}


/* sdocked - get the status of the docked flag
 *
```

```
 * Synopsis:    docked: Yes|No
 *
 * Example:     docked: y
 *
 */
sdocked(str)
char *str;
{
        char word[80];

        str = skipblank(str);
        if (*str == EOS) {              /* No argument to the command? */
tight:
                gstatus("Syntax: docked: Yes|No  -->"); mgetkey();
                return (ERROR);
        }
        str = sgetw(word, str);         /* get the status */
        if (tolower(word[0]) == 'y')
                docked = YES;
        else if (tolower(word[0]) == 'n')
                docked = NO;
        else
                goto tight;
        return (OK);
}


/* sheading - get the heading
 *
 * Synopsis:    heading: heading_in_degrees
 *
 * Example:     heading: 123.45
 *
 */
sheading(str)
char *str;
{
        char    word[80];
        double  heading;

        str = skipblank(str);
        if (*str == EOS) {              /* No argument to the command? */
                gstatus("Syntax: heading: heading_in_degrees  -->"); mgetkey();
                return (ERROR);
        }
        str = sgetw(word, str);         /* get the status */
        robothdg = (long) (atof(word) * 100.0 + 0.5);
        return (OK);
}


/* smapname - get and load the last map
 *
 * Synopsis:    mapname: name_of_map
 *
 * Example:     mapname: f36.map
 *
 */
smapname(str)
char *str;
{
        char    word[80];
        int     status;

        str = skipblank(str);
        if (*str == EOS) {              /* No argument to the command? */
                gstatus("Syntax: mapname: name_of_map  -->"); mgetkey();
                return (ERROR);
        }
        str = sgetw(word, str);         /* get the status */
        status = Load_Floor_Map(&curmap, word);
        return (status);
}
```

```


/* smapwindow - get the coordinates for the zoom window on the current map
 *
 * Synopsis:    mapwindow: x1,y1 x2,y2
 *
 * Example:     mapwindow: 0,0 120,34
 *
 */
smapwindow(str)
char *str;
{
        char    word[80];
        int     lx,ly, ux,uy;

        str = skipblank(str);
        if (*str == EOS) {              /* No argument to the command? */
                gstatus("Syntax: mapwindow: x1,y1 x2,y2  -->"); mgetkey();
                return (ERROR);
        }
        sscanf(str, "%d,%d %d,%d", &lx,&ly, &ux,&uy);
        curmap.lx = lx;
        curmap.ly = ly;
        curmap.ux = ux;
        curmap.uy = uy;
        return (OK);
}


/* sposition - get the coordinates of the robot in inches
 *
 * Synopsis:    position: x,y
 *
 * Example:     position: 143.1,85.5
 *
 */
sposition(str)
char *str;
{
        char    word[80];
        double  x, y;

        str = skipblank(str);
        if (*str == EOS) {              /* No argument to the command? */
                gstatus("Syntax: position: x,y  -->"); mgetkey();
                return (ERROR);
        }
        sscanf(str, "%lf,%lf", &x, &y);
        robotx = (long) (x * 10.0 + 0.5);
        roboty = (long) (y * 10.0 + 0.5);
        return (OK);
}
```

Apr 04 1991 09:56:23 slo.c Page 1

```
/*********************************************************************
 *                              slo.c                                *
 *********************************************************************
 * Serial I/O routines for interfacing with the NOSC serial I/O      *
 * routines.                                                         *
 *                                                                   *
 * Gary Gilbreath, 12 Jan 89                                         *
 *********************************************************************/


#include "headers/serial.h"


unsigned int oqsize();
unsigned int _serial_delay = 250;

/* getc_sp - get a character from the comport.  Return -1 if no char
 *      is available.
 */
getc_sp(port)
int port;
{
        unsigned int    nc;
        unsigned char   cc;

        sp_ioctl(port, FIONREAD, &nc);
        if (nc) {
                sp_read(port, (char *) &cc, 1);
                return ((int) cc);
        }
        return (-1);
}


/* putc_sp - output a character to the serial port */
void putc_sp(port, cc)
int port;
unsigned char cc;
{
        int ii;

        while (oqsize(port))            /* wait for output queue to empty */
                ;
/*      waitms(1); */
#ifdef b4800
        for (ii = 0; ii < 1500; ii++)   /* delay a little bit */
                ;
#else
        for (ii = 0; ii < _serial_delay; ii++)
                ;
#endif
        sp_write(port, (char *) &cc, 1);                /* write the character
*/
}


/* puts_sp - output a string to the serial port */
void puts_sp(port, str)
int port;
char *str;
{
        /*lint -e15 */
        slow_sp_write(port, str, (int) strlen(str));
        /*lint +e15 */
}


/* iqsize - return the size of the input queue on the given com port */
unsigned int iqsize(port)
int port;
{
        unsigned int    nc;

```

Apr 04 1991 09:56:23 slo.c Page 2

```
        sp_ioctl(port, FIONREAD, &nc);
        return (nc);
}


/* oqsize - return the size of the output queue on the given com port */
unsigned int oqsize(port)
int port;
{
        int                     outhead, outtail;
        struct buffer   *ser_info;

        sp_ioctl(port, TIOCGBUF, &ser_info);
        outhead = ser_info->outhead;
        outtail = ser_info->outtail;
        if (outtail > outhead)
                return (outhead + ser_info->size - outtail);
        return (outhead - outtail);
}


/* flush_sp - flush the input and output queues of the given serial port */
void flush_sp(port)
int port;
{
        sp_ioctl(port, TIOCFLUSH, 0);
}

/* slow_sp_write - slow version of sp_write to compensate for Robart's
 *      inability to keep up at 4800 baud.
 */
slow_sp_write(port, cp, nbytes)
int port;
register unsigned char *cp;
int nbytes;
{
        while (nbytes--)
                putc_sp(port, *cp++);
        return (0);
}
```

Apr 04 1991 09:56:23 speech.c Page 1

```
/*****************************************************************
 *                              speech.c                         *
 *****************************************************************
 * Speech compiler for Robart.  Takes a sentence as input and generates *
 * the appropriate list and word numbers to send as part of the packet *
 * to make Robart talk.                                          *
 *                                                               *
 * Call with:                                                    *
 *      outstr  = (char *) string to put list/word numbers       *
 *      str     = (char *) sentence you want Robart to say       *
 *                                                               *
 * Returns:                                                      *
 *      OK      if all words found                               *
 *      !OK     if one or more words not found                   *
 *                                                               *
 * NOTE: Even if a word is not found, a string will still be generated, *
 * with the space for the unknown word replaced with a short, 400 Hz *
 * tone.  This is to aid in fixing the sentence.                 *
 *                                                               *
 *****************************************************************/


#include <stdio.h>
#include <string.h>
#include "headers/ibmio.h"

#define isdigit(a) ((a) >= '0' && (a) <= '9')

char *vox0[] = {
        NULL
};

char *vox1[] = {
#include "headers/vox1.h"
        NULL
};

char *vox2[] = {
#include "headers/vox2.h"
        NULL
};

char *vox3[] = {
#include "headers/vox3.h"
        NULL
};

char *vox4[] = {
        NULL
};

char **vlists[] = {
        vox0, vox1, vox2, vox3, vox4, NULL
};


char *sgetwc(char *out, char *in);
int find_word(char *, char ***, int *, int *);


compile_speech(outstr, str)
char *outstr, *str;
{
        char    *cp;
        char    word[80];
        int     status;
        int     listno, wordno;

        *outstr = EOS;
        cp = sgetwc(word, str);
        status = OK;
        while (word[0]) {
                strlwr(word);           /* convert to lower case */
```

Apr 04 1991 09:56:23 speech.c Page 2

```

                /* If we find the word, just output it to the list */
                if (find_word(word, vlists, &listno, &wordno) == OK) {
                        sprintf(outstr, "%02x%02x", listno, wordno);
                        outstr = &outstr[strlen(outstr)];
                }

                /* If it ends in an 's', see if it's just a plural.  If so,
                 * output the word without the 's', then append the 's'
                 * sound ('ss')
                 */
                else if (word[strlen(word)-1] == 's') {
                        word[strlen(word)-1] = '\0';

                        /* If we find the word without the 's', stick it
                         * on the list, then append the 's' sound
                         */
                        if (find_word(word, vlists, &listno, &wordno) == OK) {
                                sprintf(outstr, "%02x%02x0181", listno, wordno)

                                outstr = &outstr[strlen(outstr)];
                        }
                        else {
                                sprintf(outstr, "0141");
                                outstr = &outstr[strlen(outstr)];
                                /*lint -e506 */
                                status = !OK;
                                /*lint +e506 */
                        }
                }

                /* No word found, see if it's a bunch of numbers.  If so,
                 * then convert the numbers to words
                 */
                else if (word[0] >= '0' && word[0] <= '9') {
                        num2str(outstr, word);
                        outstr = &outstr[strlen(outstr)];
                }

                /* No word found, so just output a tone */
                else {
                        sprintf(outstr, "0141");
                        outstr = &outstr[strlen(outstr)];
                        /*lint -e506 */
                        status = !OK;
                        /*lint +e506 */
                }
                cp = sgetwc(word, cp);
        }
        return (status);
}


/* find - do a linear search of all the word tables looking for a word
 *      that matches <word>.  This routine IS case sensitive!
 *
 * Call with:
 *      word    = (char *) word to find
 *      vlists  = (char ***) NULL-terminated list of word tables
 *      plistno = (int *) pointer to variable to store list number in
 *      pwordno = (int *) pointer to variable to store list number in
 *
 * Returns:
 *      OK      if word found
 *      !OK     if not
 */
int find_word(w, vl, plistno, pwordno)
char *w, ***vl;
int *plistno, *pwordno;
{
        char    **list;
        int     listno, wordno;
        int     found;
```

Apr 04 1991 09:42:25 Intruder.c Page 1

```
/****************************************************************************
 * Intruder.c is a module that contains routines that implement all intruder
 * assessment functionality, including real-time display, logging of packets and
 * log file replay. It is invoked from the main menu (see robart.c).
 ***************************************************************************/
#include <stdio.h>
#include <io.h>
#include <dos.h>
#include <fcntl.h>
#include <math.h>
#include <ega.h>
#include <event.h>
#include <menu.h>
#include <gif.h>

#define IR_NUM  4

#define  DOS 1
#include "headers/ibmio.h"

#define ENTERKEY        0x1c0d  /* scan code fore the Enter key */

/***************************** Global Variables *************************/

/* Replay menu string */
char replayStr[] =
" < >forward, < >back, <PgDn>, <PgUp>, <Home>beginning, <End>end, <F10>exit";

/* String for time read in from log file (used during replay) */
char timeStr[20];

/* Log file globals for current mode, log file descriptor and size */
int         logMode;
int         logFD;
long        logFileSize;

int     composite = 0;          /* composite threat */
int     threat_level = 0;

char    map_overlay_enabled = YES;      /* enable switching between environment
/map screens */
char    map_always_on = YES;    /* always display map */
char    map_displayed;          /* map is currently displayed */
int     curpage;                /* current display page being read/written */

/* Threshold value for alarm status. */
int     threshold = 3;
int     log_threshold = 3;
int     real_time_playback = 0; /* YES if in real-time log file playback mode *
/
long    log_start_time;

int     local_alarm = 0,        /* local alarm enable/disable flag */
        remote_alarm = 0;       /* remote alarm enable/disable flag */

int     IR_bearing = NO_ANGLE,  /* last IR bearing */
        OP_bearing = NO_ANGLE,  /* last optical bearing */
        US_bearing = NO_ANGLE,  /* last ultrasonic bearing */
        HR_bearing = NO_ANGLE;  /* last hearing bearing */

int     sonar_mode;             /* sonar map is overlaying bottom of screen */
int     sonar_confirm = NO;     /* sonars confirm presence of an intruder */
long    pack_count;
int     pack_rate;
time_type   start_time, cur_time;
unsigned long       mstTimeLong, mscurTimeLong;
unsigned long   popup_time = 10000;
int             ipopuptime = 10;
int packwait = 250;

static DISPLAY_LIST     *dl;
static SENSOR_TAB       *fixed_tab;
```

Apr 04 1991 09:42:25 Intruder.c Page 2

```
/****************************** External Globals **************************/
extern drType   robart;                     /* robot's postion,heading */
extern SENSOR_TAB *curtab;                  /* current fixed sensor table */
extern int      intruder_bearing, intruder_range;
extern byte     intrusion, irfusion, move_head, plot_ir_mode,
                plot_sound_mode, plot_optical_mode;
extern int debug_mode;
extern int connected;
extern long     robotx, roboty, robothdg;


/**************************** Function Declarations *********************/
unsigned long mstime();

void    local_toggle(void),
        remote_toggle(void),
        threshup(void),
        threshdown(void),
        stop_replay(cond_packets *pcur_cond, stat_packets *pcur_stat);


/****************************************************************************/
/* Intruder will place Robart into an intrusion detection mode, give the   */
/* operator a real-time display and allow the logging or replay of logged  */
/* packet information. The routine consists of an initialization section - */
/* followed by a loop for the exit condition for the entire routine (i.e.  */
/* when the user hits F10). Inside the main loop is another loop that runs */
/* constantly while there are no keyboard events, it performs all packet   */
/* handling for this routine. Then comes the code to handle operator       */
/* keyboard events.                                                         */
/****************************************************************************/
void Intruder(map_ptr)
map *map_ptr;
{
     char                   str[80], prompt[80], fixed_name[132];
     cond_packets           cur_cond;
     stat_packets           cur_stat;
     int                    scale;
     unsigned int           quit;
     packet                 pack;
     time_type              xtime;
     int                    ii, new, event_occurred;
     long                   selection;
     MENU                   *pmenu;
     EVENT                  evnt;
     static MENU_ITEM file_menu[] = {
         {"Load floor map", 0, 100, 0, NULL},
         {"Redraw", 0, 101, 0, NULL},
         {"-", 0, 0, 0, NULL},
         {"Quit", 0, 102, 0, NULL},
         {NULL, 0, 0, 0, NULL}
     };
     static MENU_ITEM log_menu[] = {
         {"Open log file", 0, 200, 0, NULL},
         {"Close log file", 0, 201, 0, NULL},
         {"-", 0, 0, 0, NULL},
         {"Replay log file", 0, 202, 0, NULL},
         {"Stop replay", 0, 203, 0, NULL},
         {"-", 0, 0, 0, NULL},
         {"Set log threshold:", 0, 204, INT_DISPLAY, (MENU_ITEM *) &log_threshol
d},
         {NULL, 0, 0, 0, NULL}
     };
     static MENU_ITEM var_menu[] = {
         {"Map always on", 0, 300, CHECK_DISPLAY, (MENU_ITEM *) &map_always_on},
         {"Sonar overlay mode", 0, 301, CHECK_DISPLAY, (MENU_ITEM *) &map_overla
y_enabled},
         {"Local alarm", 0, 302, CHECK_DISPLAY, (MENU_ITEM *) &local_alarm},
         {"Remote alarm", 0, 303, CHECK_DISPLAY, (MENU_ITEM *) &remote_alarm},
         {"-", 0, 0, 0, NULL},
         {"Inc threshold", 0, 304, 0, NULL},
         {"Dec threshold", 0, 305, 0, NULL},
         {"-", 0, 0, 0, NULL},
```

```
        {"Autoscan", 0, 306, CHECK_DISPLAY, (MENU_ITEM *) &move_head},
        {"IR fusion", 0, 307, CHECK_DISPLAY, (MENU_ITEM *) &irfusion},
        {"Intruder mode", 0, 308, CHECK_DISPLAY, (MENU_ITEM *) &intrusion},
        {"Map popup timeout (sec)", 0, 309, INT_DISPLAY, (MENU_ITEM *) &ipopupt
ime},
        {"Connected flag", 0, 310, CHECK_DISPLAY, (MENU_ITEM *) &connected},
        {NULL, 0, 0, 0, NULL}
    };
    static MENU_ITEM fixed_menu[] = {
        {"Toggle a fixed sensor", 0, 350, 0, NULL},
        {NULL, 0, 0, 0, NULL}
    };
    static MENU_ITEM other_menu[] = {
        {"Set Robart position", 0, 400, 0, NULL},
        {"Debug mode", 0, 401, CHECK_DISPLAY, (MENU_ITEM *) &debug_mode},
        {"Packet delay", 0, 402, INT_DISPLAY, (MENU_ITEM *) &packwait},
        {"Save screen", 0, 410, 0, NULL},
        {NULL, 0, 0, 0, NULL}
    };
    static MENU_ITEM pp_menu_bar[] = {
        {"File", 0, 0, 0, file_menu},
        {"Log files", 0, 1, 0, log_menu},
        {"Variables", 0, 2, 0, var_menu},
        {"Fixed", 0, 3, 0, fixed_menu},
        {"Other", 0, 4, 0, other_menu},
        {NULL, 0, 0, 0, NULL}
    };

    intrusion = YES;
    irfusion = YES;
    move_head = YES;
    plot_ir_mode = YES;
    curpage = 0;

    mouse_off();
    if (map_ptr->mapName[0] == '\0') {
        if (Load_Floor_Map(map_ptr, NULL) == ERROR) {
            mouse_on();
            return;
        }
    }
    /* Load the fixed sensor map, if any */
    make_name(fixed_name, map_ptr->mapName, ".fix");
    fixed_tab = curtab = load_fixed_sensors(fixed_name, map_ptr);

    /* Create the display list used here */

/*    x_command(X_OAARRAY, 0); */                 /* turn OA off */

    SetScale(map_ptr, 0, gdmaxcol, 148, gdmaxrow-15);
    pmenu = RegisterMenu(pp_menu_bar);

    map_overlay_enabled = YES;
    sonar_mode = NO;

    /* Setup pointers to the two sensor condition structures and two
     * robot status structures.
     */
    cur_cond.cPtr1 = &cur_cond.c1;
    cur_cond.cPtr2 = &cur_cond.c2;
    cur_stat.rsPtr1 = &cur_stat.rs1;
    cur_stat.rsPtr2 = &cur_stat.rs2;

    /* Initialize the condition, robot status structures and thresholds */
    Clear_Condition_Structure(cur_cond.cPtr2);
    Clear_Robot_Status_Structure(cur_stat.rsPtr2);

    clk_gettime(&start_time);

    /* Set the robot status time back 10 seconds to trigger an immediate reques
t
     * for a robot status packet.
     */
```

```
    sprintf(timeStr, "%02d:%02d:%02d.%d%d", start_time.hours, start_time.minute
s,
    start_time.seconds, start_time.tenths, start_time.hundredths);

    mastTimeLong = mstime();

    /* Setup the display based on the first packet */
    Setup_Intruder_Display();
    draw_menu(pmenu);

    gstatus("Drawing second page...");

    /* Set up the second display page */
    draw_page(1);
    Setup_Intruder_Display();
    draw_menu(pmenu);
    gpcolor(BLACK);
    gpclear(0, 148, gdmaxcol, gdmaxrow);         /* clear lower part of the scre
en */
    DrawSFloorMap(map_ptr, WHITE, BLUE, GREEN);
    draw_all_fixed_sensors(map_ptr, fixed_tab);
    scale = map_ptr->scale;
    ScalePoint(map_ptr, robart.x, robart.y, IWHITE);
    draw_page(0);
    gstatus("");

    /* Main Loop to handle keyboard events, if any, and request robot status
     * packets every 10 seconds and when not doing those two things request
     * intrusion sensor report packets.
     */

#if 1
connected=1;
    if (connected) {
        put_packet("OS");        /* enter Security mode */
#if 0
        Get_Packet(&cur_stat.receive, ISR_PTYPE, NULL, TRUE);
        cond_update(&cur_cond, &cur_stat);
        req_packet(ISR_PTYPE, NULL);
#endif
    }
#endif

    quit = NO;
    logMode = CLOSED;
    real_time_playback = NO;
    threat_level = 0;
    update_threat(threat_level);
    mouse_on();

    clear_packets();

    /* If the map is always supposed to be displayed, then display it now */
    if (map_always_on) {
        pullup_map(map_ptr);
        draw_page(1);
        show_page(1);
        curpage = 1;
    }
    else
        map_displayed = NO;

    while (!quit) {
        read_fixed(fixed_tab);
        if (map_displayed)
            update_dl(dl); /* update display of fixed sensors */

        if (logMode != REPLAY) {
            if (wait_packet(&pack, NO_WAIT) == OK) {
                /* Remember what time we got the packet (for replay purposes) *
/
                clk_gettime(&xtime);
                sprintf(timeStr, "%02d:%02d:%02d.%d%d", xtime.hours, xtime.minu
```

```
tes,
                        xtime.seconds, xtime.tenths, xtime.hundredths);

                if (handle_packet(map_ptr, &pack, &cur_cond, &cur_stat) == -1)
                        break;
            }
        }

        /* Else logMode = REPLAY */
        else if (logMode == REPLAY) {

            if (replay(map_ptr, &cur_cond, &cur_stat) == -1) {
                draw_menu(pmenu);
                continue;
            }
            memcpy((char *) &pack, (char *) &cur_stat.receive, sizeof(packet));
        }

        /* Handle selections from the mouse */
        selection = NO_SELECTION;
        event_occurred = NO;
        while (GetEvent(&evnt)) {
            switch(evnt.type & 0xFF00) {
            case KEYBOARD :
                if(evnt.data == 0x011B || evnt.data == F10) {
                        quit = YES;
                        mouse_off();
                        gstatus("Keyboard quit");
                        mouse_on();
                }
                else if (evnt.data == ENTERKEY) {
                        selection = pull_select_menu(pmenu, 0, 1);
                        event_occurred = YES;
                        gpmerge(MRPL);

                        if((new = CheckTrap()) != -1)
                                ii = new;
                }
                else
                        head_pos(evnt.data);
                break;

            case MOUSEINTRAP :
                ii = evnt.type & 0x00FF;
                break;

            case MOUSEOUTTRAP :
                ii = 0;
                break;

            case MOUSEBUTTONDOWN :
                if (ii && (ii & 0x00FF) != 0x00FE && (ii & 0x00F0) == 0x00F0) {
                        selection = pull_select_menu(pmenu, (ii & 0x000F), 1);
                        gpmerge(MRPL);
                        event_occurred = YES;

                        if((new = CheckTrap()) != -1)
                                ii = new;
                }
                break;
            }
        }
        if (event_occurred) {                   /* if something selected */
                close_menu(pmenu);              /* shutdown the pulldown */
                gpviewport(0,0, gdmaxcol, gdmaxrow);
        }
        if (selection == 100) {                 /* Load different floor map */
            Load_Floor_Map(map_ptr, NULL);
            SetScale(map_ptr, 0,gdmaxcol, 148,gdmaxrow-15);
        }
        else if (selection == 101) {            /* redraw the displays */
            mouse_off();
            Clear_Condition_Structure(cur_cond.cPtr2);
```

```
            Clear_Robot_Status_Structure(cur_stat.rsPtr2);
            draw_page(0);
            /* Setup the display based on the first packet */
            Setup_Intruder_Display();
            draw_menu(pmenu);

            gstatus("Drawing second page...");
            /* Set up the second display page */
            draw_page(1);
            Setup_Intruder_Display();
            draw_menu(pmenu);
            gpcolor(BLACK);
            gpclear(0, 148, gdmaxcol, gdmaxrow);        /* clear lower part of
 the screen */
            DrawSFloorMap(map_ptr, WHITE, BLUE, GREEN);
            draw_all_fixed_sensors(map_ptr, fixed_tab);
            scale = map_ptr->scale;
            ScalePoint(map_ptr, robart.x, robart.y, IWHITE);

            init_sonar_plotting();                      /* init sonar plotter */
            plot_hearing(map_ptr, NO_ANGLE, 1); /* init hearing plotter */

            draw_page(0);
            gstatus("");
            if (map_displayed)                  /* map being displayed? */
                draw_page(1);
            mouse_on();
        }
        else if (selection == 102) {            /* Quit */
            quit = YES;
            mouse_off();
            gstatus("Quit selection");
            mouse_on();
        }
        else if (selection == 200) {            /* Open a log file */
            log_open();
        }
        else if (selection == 201) {            /* close the log file */
            log_close();
        }
        else if (selection == 202) {            /* Start log replay */
            start_replay(&cur_cond, &cur_stat);
        }
        else if (selection == 203) {            /* stop replay */
            stop_replay(&cur_cond, &cur_stat);
        }
        else if (selection == 204) {            /* set log threshold */
            if (ggets(str, "Enter new logging threshold -> ", "") != NULL)
 {
                if (str[0])
                    log_threshold = atoi(str);
            }
            Clear_Line(25);
        }
        else if (selection == 300) {            /* toggle map always on flag */
            map_always_on ^= 1;
            if (map_always_on) {                /* just turned it on */
                map_overlay_enabled = YES;
                pullup_map(map_ptr);
            }
            else {
                pushdown_map(map_ptr, &cur_cond, &cur_stat);
            }
        }
        else if (selection == 301) {            /* toggle sonar plotting */
            if (!map_always_on)
                map_overlay_enabled ^= 1;
        }
        else if (selection == 302) {            /* toggle local alarm */
            local_toggle();
        }
        else if (selection == 303) {            /* toggle remote alarm */
            remote_toggle();
```

```
                if (!remote_alarm)
                    x_command(X_SIREN, 0);      /* turn alarm off */
        }
        else if (selection == 304) {            /* bump threshold value */
                threshup();
        }
        else if (selection == 305) {            /* dec threshold value */
                threshdown();
        }
        else if (selection == 306) {            /* toggle autoscan mode */
                move_head ^= 1;
        }
        else if (selection == 307) {            /* toggle IR fusion mode */
                irfusion ^= 1;
        }
        else if (selection == 308) {            /* toggle sonar intrusion mode */
                intrusion ^= 1;
        }
        else if (selection == 309) {
                if (ggets(str, "Enter new map popup timeout value -> ", "") != NULL) {
                    if (str[0]) {
                        ipopuptime = atoi(str);
                        popup_time = ipopuptime * 1000L;
                    }
                }
                Clear_Line(25);
        }
        else if (selection == 310) {
                connected ^= 1;
        }
        else if (selection == 350) {            /* toggle a fixed sensor */
                if (fixed_tab == NULL || fixed_tab->nsensors == 0) {
                    gstatus("No fixed sensors in this map -->");
                    mgetkey();
                    Clear_Line(25);
                }
                else {
                    sprintf(prompt, "Number of fixed sensor to toggle [1-%d] -->", fixed_tab->nsensors);
                    if (ggets(str, prompt, "") != NULL) {
                        ii = atoi(str) - 1;
                        /*lint -e574 */
                        if (ii >= 0 && ii < fixed_tab->nsensors) {
                            fixed_tab->sensors[ii].sensor_status ^= 1;
                        }
                        /*lint +e574 */
                    }
                    Clear_Line(25);
                }
        }
        else if (selection == 400) {            /* run Fix_Point */
                mouse_off();
                draw_page(1);
                show_page(1);
                ScalePoint(map_ptr, robart.x, robart.y, BLACK);
                Fix_Point(map_ptr, &robart.x, &robart.y, IWHITE);
                ScalePoint(map_ptr, robart.x, robart.y, IWHITE);
                sprintf(prompt, "Enter Robart's heading [%d] --> ", robart.dir);
                Clear_Line(25);
                if (ggets(str, prompt, "") != NULL) {
                        if (str[0])
                                robart.dir = force360(atoi(str));
                }
                Clear_Line(25);
                robotx = robart.x * map_ptr->squaresize * 10L;
                roboty = robart.y * map_ptr->squaresize * 10L;
                robothdg = robart.dir * 100L;
                draw_menu(pmenu);
                show_page(curpage);
                draw_page(curpage);
```

```
                mouse_on();
        }
        else if (selection == 401) {            /* debug mode */
                debug_mode ^= 1;
        }
        else if (selection == 402) {            /* set log threshold */
                if (ggets(str, "Enter packet delay -> ", "") != NULL) {
                    if (str[0])
                        packwait = atoi(str);
                }
                Clear_Line(25);
        }
        else if (selection == 410) {            /* save screen */
                mouse_off();
                sprintf(prompt, "Name of file to save image to: ");
                if (ggets(str, prompt, "") != NULL) {
                        if (str[0] != EOS) {
                                Clear_Line(25);
                                SaveGIF(str);
                        }
                }
                Clear_Line(25);
                mouse_on();
        }

        if (event_occurred) {           /* if an event occured, clean up screen */
                mouse_off();
                gpviewport(0,0, gdmaxcol, gdmaxrow);
                pmenu = RegisterMenu(pp_menu_bar);
                draw_menu(pmenu);
                mouse_on();
        }
    }

    /* Time to convince the robot to get out of security assessment
     * mode.  This is done by blitzing the robot with "OQ" packets, i.e.
     * see if the robot is awake.  Any packet that gets through to the
     * robot will make him exit security mode.
     */
    if (blitz_packets("OQ", 30, 250) == ERROR) {
        gstatus("Unable to exit security mode -->"); mgetkey();
    }
    else {
        dump_packets();
        waitms(500);
        dump_packets();
    }
#if 0
    waitms(100);
    x_command(X_CAMERA, 0);      /* turn camera off */
    x_command(X_INTRUSION, 0);   /* turn intrusion detection sensors off */
#endif
    close_menu(pmenu);
    draw_page(0);
    show_page(0);
    free_fixed_sensors(fixed_tab);
    gpviewport(0,0, gdmaxcol, gdmaxrow);
}



/*********************************************************************
 *                          handle_packet                             *
 **********************************************************************
 * We have just received a packet from the robot.  Determine what is  *
 * to be done with it.                                                *
 *                                                                    *
 *********************************************************************/
handle_packet(map_ptr, pack, pcur_cond, pcur_stat)
map *map_ptr;
packet *pack;
cond_packets    *pcur_cond;
```

```
stat_packets    *pcur_stat;
{
        byte ir;

        /* Intrusion sensor report? */
        if (pack->data[0] == ISR_PTYPE) {
            memcpy((char *) &pcur_cond->receive, (char *) pack, sizeof(packet))
;
            if (cond_update(pcur_cond, pcur_stat) == -1)
                return (-1);

            /* Make sure tha the map is correctly displayed (or not displayed)
*/
            check_sonar_state(map_ptr, pack, pcur_cond, pcur_stat);

            /* If the map is displayed, plot the sonar returns and hearing
             * vector.
             */
            if (map_displayed) {
                /* Is there sonar data available? */
                if (pack->data[21] != '\r' && pack->data[21] != '\0') {
                    plot_intrusion_sonars(map_ptr, pack);
                }

                plot_hearing(map_ptr, pcur_cond->cPtr1->hr.angle, 0);

                /* Have to decode the IR byte again here because it's not
                 * stored in a usable form in the cur_cond->cPtrx structure.
                 */
                DecodeByte(&pack->data[3], &ir);
                plot_irs(map_ptr, ir, 0);

                /* Plop robart square down again to get rid of yucky line
                 * erasures.
                 */
                ScalePoint(map_ptr, robart.x, robart.y, IWHITE);
            }

            /* If the video camera is turned on, then go to threat level 2.
             * It should also turn on the siren, but for now that would
             * interfere with the data coming back from the robot, so
             * we don't do it.
             */
            if ((pcur_cond->cPtr2->sen_status & VIDEO_MASK) && threat_level ==
1) {
                threat_level = 2;
                mouse_off();

                /* Update other display page */
                draw_page(curpage ^ 1);
                gstatus("%s  SONAR CONFIRMATION. UPGRADING TO THREAT LEVEL 2",
str_time());
                update_threat(threat_level);

                /* Update current display page */
                draw_page(curpage);
                update_threat(threat_level);
                gstatus("%s  SONAR CONFIRMATION. UPGRADING TO THREAT LEVEL 2",
str_time());

                if (local_alarm) putch('\007');
/******         if (remote_alarm) x_command(X_SIREN, 1); */
                mouse_on();
            }
            /* If the video camera is off and we are in threat level two,
             * downgrade to threat level 1.
             */
            else if (!(pcur_cond->cPtr2->sen_status & VIDEO_MASK) && threat_lev
el == 2) {
                threat_level = 1;
                mouse_off();

                /* Update other display page */
```

```
                draw_page(curpage ^ 1);
                gstatus("%s  LOST SONAR CONFIRMATION. DOWNGRADING TO THREAT LEV
EL 1", str_time());
                update_threat(threat_level);

                /* Update current display page */
                draw_page(curpage);
                update_threat(threat_level);
                gstatus("%s  LOST SONAR CONFIRMATION. DOWNGRADING TO THREAT LEV
EL 1", str_time());

                if (local_alarm) putch('\007');
/******         if (remote_alarm) x_command(X_SIREN, 0); */
                mouse_on();
            }
        }

        /* Robot status report? */
        else if (pack->data[0] == RSR_PTYPE) {
            memcpy((char *) &pcur_stat->receive, (char *) pack, sizeof(pack
et));
            if (stat_update(pcur_stat, pcur_cond) == -1)
                return (-1);
        }
        return (0);
}



/**********************************************************************
 *                          check_sonar_state                         *
 **********************************************************************
 * See if we're in the correct sonar state.  If we just entered sonar *
 * mode, then pull up the sonar screen.  If we just left sonar mode,  *
 * then push down the sonar screen.                                   *
 *                                                                    *
 * Call with:                                                         *
 *      map_ptr = (map *) pointer to current map structure            *
 *      pack    = (packet *) pointer to the packet just received      *
 *      pcur_cond = (cond_packets *) current intrusion condition      *
 *                  packets                                           *
 *      pcur_stat = (stat_packets *) current robot status packets     *
 *                                                                    *
 **********************************************************************/
check_sonar_state(map_ptr, pack, pcur_cond, pcur_stat)
map *map_ptr;
packet *pack;
cond_packets    *pcur_cond;
stat_packets    *pcur_stat;
{
        int             ii;
        extern int irage[IR_NUM];

        /* If the sonar is active and we weren't in sonar mode before
         * and map overlay is enabled, then bring up the map and
         * upgrade the threat level.
         */
        if ((pcur_cond->cPtr2->sen_status & ULTRASONIC_MASK) &&
            !sonar_mode && map_overlay_enabled) {
                sonar_mode++;
                threat_level = 1;
                mouse_off();
                gstatus("%s  THREAT LEVEL 1: BRINGING UP SONARS FOR CONFIRMATIO
N.", str_time());
                update_threat(threat_level);
                pullup_map(map_ptr);
                gstatus("%s  THREAT LEVEL 1: BRINGING UP SONARS FOR CONFIRMATIO
N.", str_time());

                /* Start the sonar plot */
                init_intrusion_sonar_plot();
                /* Init hearing */
                plot_hearing(map_ptr, 0, 1);
```

```
                /* Init IR stuff */
                for (ii = 0; ii < IR_NUM; ii++)
                    irage[ii] = 0;

                update_threat(threat_level);
                if (local_alarm) putch('\007');
                mouse_on();
            }

            /* If the sonar is inactive and we were in sonar mode before,
             * then pushdown the sonars and downgrade the threat level.
             */
            else if (!(pcur_cond->cPtr2->sen_status & ULTRASONIC_MASK) &&
                    sonar_mode) {

                threat_level = 0;
                gstatus("%s  DOWNGRADING TO THREAT LEVEL 0", str_time());
                update_threat(threat_level);

                pushdown_map(map_ptr, pcur_cond, pcur_stat);

                gstatus("%s  DOWNGRADING TO THREAT LEVEL 0", str_time());
                update_threat(threat_level);

                sonar_confirm = NO;

            }
            return (0);
}


/***********************************************************************
 *                          local_toggle                               *
 ***********************************************************************
 * Toggle the local alarm status on/off.  Update the alarm display.    *
 * When alarm is disabled, LOCAL is in reverse video.  When the        *
 * local alarm is enabled, it is in normal video.                      *
 ***********************************************************************/
void local_toggle()
{
    local_alarm ^= 1;   /* toggle enable */
}


/***********************************************************************
 *                          remote_toggle                              *
 ***********************************************************************
 * Toggle the remote alarm status on/off.  Update the alarm display.   *
 * When alarm is disabled, REMOTE is in reverse video.  When the       *
 * remote alarm is enabled, it is in normal video.                     *
 ***********************************************************************/
void remote_toggle()
{
    remote_alarm ^= 1;  /* toggle alarm on/off */
    if (remote_alarm)
    if (!remote_alarm) {        /* was the alarm enabled? */
        x_command(X_SIREN, 0);
    }
}


/**************************************************************************/
/* LogDelay is a specialized routine to wait 10 seconds after the operator  */
/* has choosen to log data. It counts down the 10 seconds in the status line */
/* of the intruder display screen.                                           */
/**************************************************************************/
void LogDelay()
{
    char str1[40], str[40];
    unsigned long t1, newTime;

    newTime = get_long_time() + 10L;
    do {
```

```
        t1 = newTime - get_long_time();
        sprintf(str, " Data logging to start in %ld seconds", t1);
        if (strcmp(str, str1)) {
            Draw_Status_Line(str);
            strcpy(str1, str);
        }
    } while (newTime > get_long_time());
    clk_gettime(&cur_time);
}


/*************************************************************************/
/* Read_Packet is a routine at is used to access a packet from the opened  */
/* data log. It first gives the operator a -MORE- indication (where the    */
/* error line was in the real time intruder display) of the position of the */
/* file pointer in the log file. It then gets a command to move through the */
/* log file from the keyboard, moves the file pointer appropriately and    */
/* reads the next packet from the file. The resulting packet is placed in  */
/* memory pointed to by buf_ptr. Read_Packet returns FALSE if no packet    */
/* exists at the file pointer location (i.e. end of file) or if a search   */
/* operation has failed, otherwise it returns TRUE.                        */
/*************************************************************************/
int Read_Packet(buf_ptr)
packet *buf_ptr;
{
    long                apos;
    double              percent;
    char                str[30];
    unsigned int        c;
    byte                temp;
    long                ltime;
    time_type           curtime;
    static char         snext_time[80];
    static int          eof_reached = 0;
    static long         next_time;
    static long         offset_time;
    static packet       next_packet;

    if (!real_time_playback) {
        /* Display the current position through the log file in the now unused
         * packet rate screen variable.
         */
        apos = lseek(logFD, 0L, SEEK_CUR);
        percent = ((double)apos/(double)logFileSize) * 100.0;
        sprintf(str, "MORE --(%.1lf)--", percent);
        normal_draw(24, 2, str);

        /* Wait for a command to move through the replay log file */
        c = mgetkey();
        if (c > 255) {
            Draw_Error_Line("");
            switch (c) {

                /* Back up two packets and read the next one */
                case UPARROW:

                    /* Backup two packets and report at top of file if true */
                    if (MoveFP(logFD, -2) != -2)
                        Draw_Error_Line(" At beginning of the log file.");

                    /* Read the next log entry */
                    if (!ReadLogEntry(logFD, buf_ptr, timeStr))
                        Draw_Error_Line(" Log file format incorrect.");
                    break;

                /* Read the next packet */
                case DOWNARROW:
                    if (!ReadLogEntry(logFD, buf_ptr, timeStr))
                        Draw_Error_Line(" At end of log file");
                    break;

                /* Backup 10 packets and read the next one. */
                case PGUP:
```

```
                if (MoveFP(logFD, -10) != -10)
                    Draw_Error_Line(" At beginning of the log file.");

                /* Read the next log entry */
                if (!ReadLogEntry(logFD, buf_ptr, timeStr))
                    Draw_Error_Line(" Log file format incorrect.");
                break;

            /* Go to the beginning of the file and read the next packet */
            case HOME:
                apos = lseek(logFD, 0L, SEEK_SET);
                if (!ReadLogEntry(logFD, buf_ptr, timeStr))
                    Draw_Error_Line(" Log file format incorrect.");
                break;

            case PGDN:
                if (MoveFP(logFD, 10) == 10) {
                    if (apos != logFileSize) {

                        /* Read the next log entry */
                        if (!ReadLogEntry(logFD, buf_ptr, timeStr))
                            Draw_Error_Line(" Log file format incorrect.");
                        break;
                    }
                }
                Draw_Error_Line(" At end of log file");
                /* Fall through... */

            /* Go to the end of the log file, back up one packet and read i
t */
            case END:
                apos = lseek(logFD, 0L, SEEK_END);
                MoveFP(logFD, -1);
                if (!ReadLogEntry(logFD, buf_ptr, timeStr))
                    Draw_Error_Line(" Log file format incorrect.");
                break;

            /* Set the log replay threshold */
            case F9:
                if (ggets(str, "Type a new threshold --> ", "") == NULL)
                    break;
                sscanf(str, "%d", &threshold);
                PutInteger(4, 76, threshold);
                Draw_Status_Line(replayStr);
                break;

            /* Break out of replay mode */
            case F10:
                logMode = CLOSED;
                real_time_playback = NO;
                return (FALSE);
            }
            return (TRUE);
        }

        /* Else we've received a search command */
        Draw_Error_Line("");
        switch (c) {

                /* Search forward for a intruder packet log entry. */
        case 'i':

            /* Keep searching until a log entry is found with a threshold
             * greater than the user specified threshold.
             */
            do {
                if (!FindPType(logFD, buf_ptr, ISR_PTYPE, timeStr, TRUE)) {
                    Draw_Error_Line(" At end of log file.");
                    break;
                }
                DecodeByte(&buf_ptr->data[19], &temp);
            } while (temp < threshold);
            break;
```

```

                /* Search backward for a intruder packet log entry. */
        case 'I':

                /* Keep searching until a log entry is found with a threshold
                 * greater than the user specified threshold.
                 */
                do {
                    if (!FindPType(logFD, buf_ptr, ISR_PTYPE, timeStr, FALSE))
{
                        Draw_Error_Line(" At beginning of log file.");
                        break;
                    }
                    DecodeByte(&buf_ptr->data[19], &temp);
                } while (temp < threshold);
                break;

#if 0
                /* Search forward for a robot status packet log entry. */
        case 'r':
                if (!FindPType(logFD, buf_ptr, RSR_PTYPE, timeStr, TRUE))
                    Draw_Error_Line(" At end of log file.");
                break;

                /* Search backward for a robot status packet log entry. */
        case 'R':
                if (!FindPType(logFD, buf_ptr, RSR_PTYPE, timeStr, FALSE))
                    Draw_Error_Line(" At beginning of log file.");
                break;
#else
        case 'r':       /* start real-time playback */
        case 'R':
                if (!ReadLogEntry(logFD, buf_ptr, timeStr)) {
                        Draw_Error_Line(" At end of log file");
                        break;
                }

                /* Remember the time that the replay was started from
                 * the log file.  Convert to
                 */
                log_start_time = strtime_to_100s(timeStr);

                /* Read the next packet, so we know when to update the
                 * screen.
                 */
                if (!ReadLogEntry(logFD, &next_packet, &next_time)) {
                        Draw_Error_Line(" At end of log file");
                        break;
                }
                /* Convert the time to hundredths to ease the time
                 * comparison.
                 */
                next_time = strtime_to_100s(&next_time);

                /* Get the current time.  This is used to offset the
                 * actual time so that we can do real-time playback.
                 */
                clk_gettime(&curtime);
                offset_time = clktime_to_100s(&curtime);

                real_time_playback = YES;
                break;
#endif
        }
    }
    else {
        if (eof_reached) {
                eof_reached = NO;
                Draw_Error_Line(" At end of log file");
                real_time_playback = NO;
                return (FALSE);
        }
```

```
        if (keyhit()) {                 /* user hit a key? */
                getkey();               /* grab the key */
                real_time_playback = NO;        /* stop real-time replay */
                return (TRUE);
        }

        clk_gettime(&curtime);
        ltime = clktime_to_100s(&curtime);

        *buf_ptr->data = EOS;           /* clear the packet data */

        /* See if it's time to update the screen.  This is done by getting
         * the current time, subtracting off the actual time we started
         * doing the playback, plus the time stored in the log file that
         * we started doing the playback.  If the result is greater than
         * or equal to the time of the next packet, we need to update
         * the screen.
         */
        if (ltime - offset_time + log_start_time >= next_time) {
                *buf_ptr = next_packet;         /* copy the packet data */
                strcpy(timeStr, &next_time);    /* ...and the time */

                /* Read the next packet */
                if (!ReadLogEntry(logFD, &next_packet, &next_time)) {
                        eof_reached++;
                        return (TRUE);
                }
                next_time = strtime_to_100s(&next_time);
        }
        else {  /* try to interpolate the log file time */
                int h, m, s, hd;

                ltime = ltime - offset_time + log_start_time;
                h = (int) (ltime / 360000L);
                ltime -= h * 360000L;
                m = (int) (ltime / 6000L);
                ltime -= m * 6000L;
                s = (int) (ltime / 100L);
                hd = ltime % 100L;
                sprintf(timeStr, "%02d:%02d:%02d.%02d",h,m,s,hd);
        }
    }
    return (TRUE);
}

/*******************************************************************
 *                              pullup_map                         *
 *******************************************************************
 * Pull up the map overlay screen.                                 *
 *******************************************************************/
pullup_map(map_ptr)
map *map_ptr;
{
        char            str[80];
        int             ii;
        extern int      irage[IR_NUM];

        mouse_off();

        /* Start the sonar plot */
        init_intrusion_sonar_plot();
        /* Init hearing */
        plot_hearing(map_ptr, NO_ANGLE, 1);
        /* Init IR stuff */
        for (ii = 0; ii < IR_NUM; ii++)
            irage[ii] = 0;

        if (logMode == OPEN) {
                sprintf(str, "load %s %d %d %d\r\n",
                        map_ptr->mapName, robart.x, robart.y, robart.dir);
                /*lint -e15 */
                WriteLogEntry(logFD, (packet *) str, NULL, strlen(str));
```

```
                /*lint +e15 */
        }
        draw_page(1);
        show_page(1);
        curpage = 1;
        map_displayed = YES;
        dl = create_dl();
        init_fixed_dl(dl, map_ptr, fixed_tab);
        mouse_on();
        return (OK);
}


/*******************************************************************
 *                              pushdown_map                       *
 *******************************************************************
 * Remove the map display from the screen.                         *
 *******************************************************************/
void pushdown_map(map_ptr, pcur_cond, pcur_stat)
map *map_ptr;
cond_packets *pcur_cond;
stat_packets *pcur_stat;
{
        sonar_mode = NO;
        threat_level = 0;
        if (local_alarm) putch('\007');
        update_threat(threat_level);
        deinit_intrusion_sonar_plot(map_ptr);
        if (map_always_on)      /* don't get rid of map if it's always displaye
d */
                return;

        if (logMode == OPEN)
                WriteLogEntry(logFD, (packet *) "unload\r\n", NULL, 8);
        mouse_off();

/*      deinit_intrusion_sonar_plot(map_ptr);*/
        plot_hearing(map_ptr, NO_ANGLE, 0);     /* erase old hearing vector */
        plot_irs(map_ptr, 0, YES);              /* erase old IRs */

        /* Re-plot Robart's position */
        ScalePoint(map_ptr, robart.x, robart.y, IWHITE);

        destroy_dl(dl);
        draw_page(0);
        show_page(0);
        curpage = 0;
        map_displayed = NO;

        Clear_Condition_Structure(pcur_cond->cPtr2);
        Clear_Robot_Status_Structure(pcur_stat->rsPtr2);
        update_threat(threat_level);
        mouse_on();
}


/* clear_packets - clear out any waiting packets */
clear_packets()
{
        long    packet_timeout;
        packet  pack;

        /* Wait for the last requested packet to come in, or timeout after
         * 0.5 seconds.  Necessary because Robart has no UART.
         */
        packet_timeout = mstime();
        while ((wait_packet(&pack, NO_WAIT) != OK) &&
            (mstime() - packet_timeout < 500))
                ;
        return (OK);
}
```

```
/*************************************************************************
 *                              stat_update                              *
 *************************************************************************
 * Update the robot's status.                                            *
 *                                                                       *
 * Call with:                                                            *
 *      pcur_stat       = pointer to robot status packets and info.      *
 *      pcur_cond       = pointer to robot condition packets.            *
 *                                                                       *
 *************************************************************************/
stat_update(pcur_stat, pcur_cond)
stat_packets *pcur_stat;
cond_packets *pcur_cond;
{
    packet      pack;
    rStatus     *tPtr;

    mouse_off();

        memcpy((char *) &pack, (char *) &pcur_stat->receive, sizeof(packet));

        pack_count++;

        /* Decode the packet into an internal memory structure */
        Decode_Robot_Status_Packet(&pack, pcur_stat->rsPtr1);

        /* Update the screen with the info that's changed */
        draw_page(0);
        Dump_Robot_Status_Data(pcur_stat->rsPtr1, pcur_stat->rsPtr2);
        draw_page(curpage);

        /* If we are also logging data then, log the data if the log alarm
         * threshold has been exceeded or if we are in threat level 1 or
         * higher.
         */
        if ((logMode == OPEN) &&
            (pcur_cond->cPtr1->alarm > log_threshold || threat_level)) {

                /* Place a NULL at the end of the packet so that string
                 * compare will work.
                 */
                pack.data[RSR_PLENGTH] = '\0';

                /* If the latest robot status packet is different from the
                 * one before it then write it to the log file.
                 */
                if (strcmp(pack.data, pcur_stat->rsrBuffer))
                    WriteLogEntry(logFD, &pack, timeStr, RSR_PLENGTH);

                /* Save the latest packet in the buffer */
                strcpy(pcur_stat->rsrBuffer, pack.data);
        }

        /* Swap pointers so that we efficiently save the latest packet*/
        tPtr = pcur_stat->rsPtr1;
        pcur_stat->rsPtr1 = pcur_stat->rsPtr2;
        pcur_stat->rsPtr2 = tPtr;

    mouse_on();
    return (0);
}

/*************************************************************************
 *                              cond_update                              *
 *************************************************************************
 * Update the robot's condition                                          *
 *                                                                       *
 * Call with:                                                            *
 *      pcur_cond       = pointer to robot condition packets.            *
 *      pcur_stat       = pointer to robot status packets and info.      *
 *                                                                       *
 *************************************************************************/
```

```
cond_update(pcur_cond, pcur_stat)
cond_packets *pcur_cond;
stat_packets *pcur_stat;
{
    cond        *tempPtr;

    mouse_off();

    /* Update the packet received stats */
    pack_count++;

if (debug_mode)
  gstatus("cPtr1=%08lx, cPtr2=%08lx", pcur_cond->cPtr1, pcur_cond->cPtr2);
    /* Decode the packet into an internal memory structure */
if (debug_mode)
  gstatus("%s = receive.data", pcur_cond->receive.data);

    Decode_Intruder_Packet(&pcur_cond->receive, pcur_cond->cPtr1);
    if (keyhit()) {
        mouse_on();
        return (-1);
    }

    /* Update the screen */
    Dump_Intruder_Data(pcur_cond->cPtr1, pcur_cond->cPtr2);
    /* Update the page not being displayed */
    draw_page(curpage ^ 1);
    Dump_Intruder_Data(pcur_cond->cPtr1, pcur_cond->cPtr2);
    draw_page(curpage);

    /* If we are logging data then compare it with the last packet
     * received and write it to the log file if anything has changed.  If
     * we are in any threat level higher than 0, log the data regardless
     * of any changes.
     */
    if ((logMode == OPEN) &&
        (pcur_cond->cPtr1->alarm > log_threshold || threat_level)) {

        /* Place a NULL at the end of the packet so that string
         * compare will work.
         */
        pcur_cond->receive.data[ISR_PLENGTH] = '\0';

        /* If the latest intrusion sensor packet is different from
         * the one before it then write it to the log file.
         */
        if (strcmp(pcur_cond->receive.data, pcur_cond->isrBuffer))
                WriteLogEntry(logFD, &pcur_cond->receive, timeStr, ISR_PLENGTH)
;

        /* Save the latest packet in the buffer */
        strcpy(pcur_cond->isrBuffer, pcur_cond->receive.data);
    }

    /* Swap the sensor condition structure pointers */
    tempPtr             = pcur_cond->cPtr1;
    pcur_cond->cPtr1    = pcur_cond->cPtr2;
    pcur_cond->cPtr2    = tempPtr;
    mouse_on();
    return (0);
}


/*************************************************************************
 *                                replay                                 *
 *************************************************************************
 * Replay the next change from the log file.                             *
 *                                                                       *
 * Call with:                                                            *
 *      map_ptr         = current map                                    *
 *      pcur_cond       = pointer to robot condition packets.            *
 *      pcur_stat       = pointer to robot status packets and info.      *
```

```
 *                                                                     *
 **********************************************************************/
replay(map_ptr, pcur_cond, pcur_stat)
map *map_ptr;
cond_packets *pcur_cond;
stat_packets *pcur_stat;
{
    char        str[132];
    char        *cp;
    cond        *tempPtr;
    rStatus     *tPtr;

    mouse_off();
    /* Grab the next user specified packet from the log file, if
     * Read_Packet returns false then user closed log file, set up a
     * return to the real-time display.
     */
kludge:
    if (!Read_Packet(&pcur_stat->receive)) {

        stop_replay(pcur_cond, pcur_stat);
        mouse_on();
        return (-1);
    }

    /* Else a new log entry has been read */
    else {
        cp = (char *) pcur_stat->receive.data;
        if (debug_mode) {
                sprintf(str, "%-50.50s", cp);  normal_draw(1,1, cp);
        }
        if (*cp == EOS) {
                /* Do nothing, packet is empty (probably in real-time
                 * playback mode).
                 */
                normal_draw(2, 70, timeStr);
        }
        else if (*cp < '0' || *cp > '9') {      /* a directive, not a packet */
                do_log_command(map_ptr, pcur_cond, pcur_stat, cp);
                goto kludge;
        }
        /* If the new log packet is an intrusion sensor packet then */
        else if (pcur_stat->receive.data[0] == ISR_PTYPE) {

                /* Decode the packet and update the screen. */
                Decode_Intruder_Packet(&pcur_stat->receive, pcur_cond->cPtr1);
                Dump_Intruder_Data(pcur_cond->cPtr1, pcur_cond->cPtr2);
                /* Update the other display page too */
                draw_page(curpage ^ 1);
                Dump_Intruder_Data(pcur_cond->cPtr1, pcur_cond->cPtr2);
                draw_page(curpage);

                /* Swap the sensor condition structure pointers */
                tempPtr                 = pcur_cond->cPtr1;
                pcur_cond->cPtr1        = pcur_cond->cPtr2;
                pcur_cond->cPtr2        = tempPtr;
        }

        /* Else if the new log packet is a robot status packet then */
        else if (pcur_stat->receive.data[0] == RSR_PTYPE) {

                /* Decode the packet and update the screen. */
                Decode_Robot_Status_Packet(&pcur_stat->receive, pcur_stat->rsPt
r1);
                Dump_Robot_Status_Data(pcur_stat->rsPtr1, pcur_stat->rsPtr2);

                /* Swap the robot status structure pointers */
                tPtr                    = pcur_stat->rsPtr1;
                pcur_stat->rsPtr1       = pcur_stat->rsPtr2;
                pcur_stat->rsPtr2       = tPtr;
        }
    }
    mouse_on();
```

```
    return (0);
}


/**********************************************************************
 *                          do_log_command                             *
 ***********************************************************************
 * Figure out what the given log file command is and execute it.      *
 **********************************************************************/
void do_log_command(map_ptr, pcur_cond, pcur_stat, cmd_str)
map *map_ptr;
cond_packets *pcur_cond;
stat_packets *pcur_stat;
char *cmd_str;
{
        char    *cp, word[80], mapname[80];
        int     fh;

        cp = sgetw(word, cmd_str);
        if (strcmp(word, "load") == 0) {        /* load map file and enter sone
r mode */
                map_overlay_enabled = YES;
                cp = sgetw(mapname, cp);        /* get name of map file */
                cp = sgetw(word, cp);           /* get Robart x coordinate */
                robart.x = atoi(word);
                cp = sgetw(word, cp);           /* get Robart y coordinate */
                robart.y = atoi(word);
                cp = sgetw(word, cp);           /* get Robart heading */
                robart.dir = atoi(word);
                robotx = robart.x * map_ptr->squaresize * 10L;
                roboty = robart.y * map_ptr->squaresize * 10L;
                robothdg = robart.dir * 100L;
                strcpy(map_ptr->mapName, mapname);
                fh = open(mapname, O_RDONLY | O_BINARY);
                if (fh == -1) {
                        sprintf(word, "Can't open map %s", mapname);
                        Draw_Error_Line(word);
                        mgetKey();
                }
                load_map(fh, map_ptr);
                close(fh);
        }
        else if (strcmp(word, "unload") == 0) { /* must be unload time */
                pushdown_map(map_ptr, pcur_cond, pcur_stat);
        }
}


void stop_replay(pcur_cond, pcur_stat)
cond_packets *pcur_cond;
stat_packets *pcur_stat;
{
        Draw_Status_Line(" Any key to resume");
        mgetKey();
        Clear_Line(25);
        logMode = CLOSED;
        real_time_playback = NO;

        /* Clear the data structures and reset the robot status timer
         * to go off immediately.
         */
        Clear_Condition_Structure(pcur_cond->cPtr2);
        Clear_Robot_Status_Structure(pcur_stat->rsPtr2);
        pack_rate = -1;

        /* Redraw the real-time display and tell operator he can quit */
        Setup_Intruder_Display();
}


/**********************************************************************
 *                             log_open                                *
 ***********************************************************************
```

```
 * Open the log file.                                              *
 *                                                                 *
 * Returns:                                                        *
 *      -1 if error                                                *
 *       0 if OK                                                   *
 *                                                                 *
 *******************************************************************/
log_open()
{
    char fileName[80];

    /* logMode is a tri-stated variable: OPEN, CLOSED and REPLAY.
     * if it is not CLOSED then opening a log file is illegal.
     */
    if (logMode != CLOSED) {
        Draw_Error_Line("Log file already open.");
        return (-1);
    }
    else {    /* Else open the log file. */

        /* Clear the error line */
        Draw_Error_Line("");

        /* Get the desired new log file name and open it. */
        if (ggets(fileName, "Enter file name --> ", "") == NULL) {
                Clear_Line(25);
                return (-1);
        }
        Clear_Line(25);
        logFD = OpenLogFile(fileName, TRUE, &logFileSize);

        /* If open operation worked then */
        if (logFD != -1) {

            /* Switch the logMode to open and give the user 10
             * seconds to setup the environment.
             */
            logMode = OPEN;
            real_time_playback = NO;
            LogDelay();

            /* Draw an indication that data is currently being
             * logged.
             */
            gstatus("Logging data to %s", fileName);
        }

        /* Else error in opening log file */
        else {

            /* Let the user know there was an error... */
            Draw_Error_Line("Error attempting to open log file.");
            putch(7);
            return (-1);
        }
    }
    return (0);
}


/*******************************************************************
 *                           log_close                             *
 *******************************************************************
 * Close the log file.                                             *
 *                                                                 *
 * Returns:                                                        *
 *      -1 if error                                                *
 *       0 if OK                                                   *
 *                                                                 *
 *******************************************************************/
log_close()
{
    /* Can't close a log file that's not open. */
```

```
    if (logMode != OPEN) {
        Draw_Error_Line("Log file not open.");
        return (-1);
    }

    /* Else close the log file. */
    else {

        /* If the close operation went OK then */
        if (CloseLogFile(logFD)) {
            logMode = CLOSED;
            real_time_playback = NO;
            Clear_Line(25);
        }

        /* Else there was an error attempting to close the file */
        else {
            Draw_Error_Line("Error attemping to close log file.");
            putch(7);
            return (-1);
        }
    }
    return (0);
}


/*******************************************************************
 *                          start_replay                           *
 *******************************************************************
 * Replay a log file.  Prompts the user to enter the log file name *
 * then sets up all the variables and such.                        *
 *                                                                 *
 * Call with:                                                      *
 *      pcur_cond       = pointer to current condition packets     *
 *      pcur_stat       = pointer to current status packets        *
 *                                                                 *
 * Returns:                                                        *
 *      -1 if error                                                *
 *       0 if OK                                                   *
 *                                                                 *
 *******************************************************************/
start_replay(pcur_cond, pcur_stat)
cond_packets *pcur_cond;
stat_packets *pcur_stat;
{
    char fileName[80];

    /* Can't replay if we already are or currently logging data. */
    if (logMode != CLOSED) {
        Draw_Error_Line("Can't replay log file.");
        return (-1);
    }

    /* Else setup REPLAY mode. */
    else {

        /* Clear the error line. */
        Draw_Error_Line("");

        /* Get the existing log file name and open it. */
        if (ggets(fileName, "Enter file name --> ", "") == NULL) {
                Clear_Line(25);
                return (-1);
        }
        Clear_Line(25);
        logFD = OpenLogFile(fileName, FALSE, &logFileSize);

        /* If the open operation went OK then */
        if (logFD != -1) {

            /* Change the log mode, clear the internal structures and
             * setup the replay display screen.
             */
```

Apr 04 1991 09:42:25 Intruder.c Page 23

```
            logMode = REPLAY;
            real_time_playback = NO;
            Clear_Condition_Structure(pcur_cond->cPtr2);
            Clear_Robot_Status_Structure(pcur_stat->rsPtr2);
            Setup_Intruder_Display();
            Inv_Draw(25, 13, "REPLAY");

            /* Place up and down arrow characters into the status
             * line string
             */
            replayStr[2] = 25;
            replayStr[14] = 24;
            Draw_Status_Line(replayStr);
        }

        /* Else let operator know that there was an openfile error */
        else {
            Draw_Error_Line("File doesn't exist.");
            putch(7);
            return (-1);
        }
    }
    return (0);
}


#if 0
set_mouse_page(page)
int page;
{
        union REGS regs;

        if (MouseActive) {
              regs.x.ax = 29;                 /* set page call */
              regs.x.bx = page;               /* page number */
              int86(0x33, &regs, &regs);      /* make mouse driver call */
        }
}
#endif
```

Apr 04 1991 09:42:25 makemap.c Page 1

```
/***********************************************************************
 * makemap.c contains procedures to generate a sonar map.             *
 *                                                                     *
 ***********************************************************************/
#include <stdio.h>
#include <math.h>
#include <ega.h>
#include <event.h>
#include <menu.h>
#include <syscolor.h>
#include <dialog.h>

/* Define the modes we can be in */
#define DRIVING         1
#define MAPPING         2
#define WANDERING       3

#include "headers/ibmio.h"

#ifndef PI
#define PI    3.14159265358979323846
#endif

#define NUM_MASK        0x20            /* Num Lock mask */
#define KB_FLAG_SEG     0x40            /* KB_FLAG segment */
#define KB_FLAG_OFF     0x17            /* KB_FLAG offset */

#define MAX_SPEED       15              /* maximum robot speed */

/* Define the various states the robot can be in */
#define HALTED          0
#define FORWARD         1
#define FOR_ARC_LEFT    2
#define FOR_ARC_RIGHT   3
#define PIVOT_LEFT      4
#define PIVOT_RIGHT     5
#define BACKWARD        6
#define BACK_ARC_LEFT   7
#define BACK_ARC_RIGHT  8

#define NUM0    0x5230
#define NUM1    0x4f31
#define NUM2    0x5032
#define NUM3    0x5133
#define NUM4    0x4b34
#define NUM5    0x4c35
#define NUM6    0x4d36
#define NUM7    0x4737
#define NUM8    0x4838
#define NUM9    0x4939

#define ENTERKEY        0x1c0d  /* scan code fore the Enter key */


unsigned char           turn_preference = 0;    /* not in wander mode, so no tu
rn preference */
unsigned char           follow_mode = 0;
int                     left_speed, right_speed;
int                     left_velocity, right_velocity;
int                     drive_status;


static char             mode = DRIVING;
static char             debug = NO;
static int              prev_left, prev_right;
static unsigned char    kbflag, save_kbflag;

static packet           rec;
static byte             param[3], pESonars[PE_SONAR_NUM];
static int              scale;
static int              maxrange;

```

Apr 04 1991 09:42:25 makemap.c Page 2

```
static int              epoch_x, epoch_y;       /* position at start of mapping
 */
static unsigned long    epoch;                  /* time at start of mapping */
static double           ips = 1.0588235;        /* speed in inches/sec */
static double           sinval, cosval;

char                    packstr[40];


static char *states[] = {
        "Stopped", "Forward", "Forward Arc Left", "Forward Arc Right",
        "Pivot Left", "Pivot Right", "Backward",
        "Backward Arc Left", "Backward Arc Right"
};

void    backward(),
        deinit_drive(),
        do_drive(),
        forward(),
        getdparms(),
        getpos(),
        getspeed(),
        init_drive(),
        left_turn(),
        right_turn(),
        stop();


extern int      robot_type;
extern drType   robart;
extern int      map_direction;
extern char     speed_govern_disable;
extern long     robotx, roboty, robothdg;


extern byte             DecodePEArray();
extern void             Confirm();
extern char             *malloc();
extern unsigned long    mstime();
extern GBUF             *readsq();


/***********************************************************************
 *                              makemap                                *
 * This function serves to purposes: to manually drive the robot using *
 * the IBM keyboard, and to make maps using the navigation sonar ring. *
 *                                                                     *
 * Author: Gary Gilbreath,  1 Feb 88                                   *
 ***********************************************************************/
int makemap(map_ptr)
map  *map_ptr;
{
    char        str[80];
    int         quit;
    int         px, py, phdg, pmax;
    int         ii, new, event_occurred;
    long        selection;
    MENU        *pmenu;
    EVENT       evnt;
    static MENU_ITEM file_menu[] = {
        {"Load floor map", 0, 100, 0, NULL},
        {"Save floor map", 0, 101, 0, NULL},
        {"-", 0, 0, 0, NULL},
        {"Quit", 0, 102, 0, NULL},
        {NULL, 0, 0, 0, NULL}
    };
    static MENU_ITEM wander_menu[] = {
        {"Left turns", 0, 210, 0, 0},
        {"Right turns", 0, 220, 0, 0},
        {"Random turns", 0, 230, GRAYED, 0},
        {"Halt on turn ambiguity", 0, 240, GRAYED, 0},
        {NULL, 0, 0, 0, NULL}
```

```
    };
    static MENU_ITEM map_menu[] = {
        {"Start mapping", 0, 200, 0, 0},
        {"Wander turn direction", 0, 300, 0, wander_menu},
        {"Help", 0, 400, 0, 0},
        {NULL, 0, 0, 0, NULL}
    };
    static MENU_ITEM other_menu[] = {
        {"Set Robart position", 0, 501, 0, NULL},
        {"Set mapping speed", 0, 502, 0, NULL},
        {"Camera ON", 0, 503, 0, NULL},
        {"Camera OFF", 0, 504, 0, NULL},
        {"-", 0, 0, 0, NULL},
        {"Redraw", 0, 510, 0, NULL},
        {"Debug mode", 0, 511, CHECK_DISPLAY, (MENU_ITEM *) &debug},
        {NULL, 0, 0, 0, NULL}
    };
    static MENU_ITEM more_sayings[] = {
        {"Get a move on", 0, 635, 0, NULL},
        {"Help me", 0, 640, 0, NULL},
        {"Intruder, intruder", 0, 645, 0, NULL},
        {"Move", 0, 650, 0, NULL},
        {"Move it", 0, 655, 0, NULL},
        {"Please deposit...", 0, 660, 0, NULL},
        {"Stop it", 0, 665, 0, NULL},
        {"Up yours", 0, 670, 0, NULL},
        {NULL, 0, 0, 0, NULL}
    };
    static MENU_ITEM old_voice_menu[] = {
        {"Hello/Hi", 0, 600, 0, NULL},
        {"Go away", 0, 605, 0, NULL},
        {"Caution", 0, 610, 0, NULL},
        {"Thank you", 0, 615, 0, NULL},
        {"Alert, alert", 0, 620, 0, NULL},
        {"Stop", 0, 625, 0, NULL},
        {"Moving forward", 0, 630, 0, NULL},
        {"-", 0, 0, 0, NULL},
        {"Keyboard", 0, 631, 0, NULL},
        {"More...", 0, 634, 0, more_sayings},
        {NULL, 0, 0, 0, NULL}
    };
    static MENU_ITEM voice_menu[] = {
        {"Greet", 0, 700, 0, NULL},
        {"Assistance", 0, 705, 0, NULL},
        {"Time", 0, 710, 0, NULL},
        {"Bong", 0, 715, 0, NULL},
        {"Code Red...", 0, 720, 0, NULL},
        {"Thank you", 0, 725, 0, NULL},
        {"Stop", 0, 730, 0, NULL},
        {"-", 0, 0, 0, NULL},
        {"Voice power off", 0, 731, 0, NULL},
        {"More...", 0, 0, 0, old_voice_menu},
        {NULL, 0, 0, 0, NULL},
    };

    static MENU_ITEM pp_menu_bar[] = {
        {"File", 0, 0, 0, file_menu},
        {"Functions", 0, 1, 0, map_menu},
        {"Other", 0, 2, 0, other_menu},
        {"Voice", 0, 3, 0, voice_menu},
        {NULL, 0, 0, 0, NULL}
    };

    mouse_off();
    gpmerge(MRPL);
    gpcolor(BLACK);
    gpclear(0,0, gdmaxcol, gdmaxrow);

    pmenu = RegisterMenu(pp_menu_bar);

    Load_Floor_Map(map_ptr, map_ptr->mapName);
    SetScale(map_ptr, 0, gdmaxcol, 15, gdmaxrow-15);
```

```
    /* Draw the given floor map with only object visible. */
    DrawSFloorMap(map_ptr, WHITE, BLUE, GREEN);

    scale = map_ptr->scale;

    maxrange = (5*12);                    /* initial max range to 5 feet */
    quit = 0;
    gstatus("Hdg:%3d Pos:%2d,%2d maxrange:%5.2f'", robart.dir,
            robart.x, robart.y, maxrange / 12.0);

    init_drive();

    phdg = px = py = pmax = -1;

    mode = DRIVING;              /* start off in drive mode */
    turn_preference = 0;         /* not in wander mode, so no turn preference */
    Inv_Draw(25,70, " DRIVING ");
    PutString(25, 40, "Preference:    Left");
    save_blob(map_ptr, robart.x, robart.y, 3);
    set_blob(3, WHITE);
    px = robart.x;
    py = robart.y;
    draw_menu(pmenu);
    mouse_on();
    while (!quit) {
        /* Handle selections from the mouse */
        selection = NO_SELECTION;
        event_occurred = NO;
        while (GetEvent(&evnt)) {
            switch(evnt.type & 0xFF00) {
            case KEYBOARD :
                if(evnt.data == 0x011B || evnt.data == F10) {
                        quit = YES;
                }
                else if (evnt.data == ENTERKEY) {
                        selection = pull_select_menu(pmenu, 0, 1);
                        event_occurred = YES;
                        gpmerge(MRPL);

                        if((new = CheckTrap()) != -1)
                                li = new;
                }
                else {
                        switch (evnt.data & 0xff) {
                        case '+':
                            maxrange++;
                            break;

                        case '-':
                            maxrange = (maxrange > 1 ? maxrange-1 : 0);
                            break;
                        default:
                            mouse_off();
                            do_drive(evnt.data);        /* drive robot around *
/
                            update_drive_screen();
                            mouse_on();
                            break;
                        }
                }
                break;

            case MOUSEBUTTONDOWN :
                li = 0;
                if((new = CheckTrap()) != -1)
                        li = new;
                if (li && (li & 0x00FF) != 0x00FE && (li & 0x00F0) == 0x00F0) {
                        selection = pull_select_menu(pmenu, (li & 0x000F), 1);
                        gpmerge(MRPL);
                        event_occurred = YES;

                        if((new = CheckTrap()) != -1)
                                li = new;
```

```
                    }
                    break;
                }
            }

            if (event_occurred) {                       /* if something selected */
                    mouse_off();
                    close_menu(pmenu);                  /* shutdown the pulldown */
                    gpviewport(0,0, gdmaxcol, gdmaxrow);    /* FIX MENU BUG */
            }
            text_foreground(WHITE);
            text_background(BLACK);
            if (selection == 100) {                     /* Load different floor map */
                Load_Floor_Map(map_ptr, NULL);
                SetScale(map_ptr, 0,gdmaxcol, 15, gdmaxrow-15);
                DrawSFloorMap(map_ptr, WHITE, BLUE, GREEN);
            }
            else if (selection == 101) {                /* save floor map */
                Save_Floor_Map(map_ptr, NULL);
            }
            else if (selection == 102) {                /* quit */
                quit = YES;
            }
            else if (selection == 200) {                /* start mapping */
                    if (mode != DRIVING) {              /* if want to get out of map mo
de */
                            mode = DRIVING;             /* set drive mode */
                            turn_preference = 0;
                    }
                    else {                              /* enable drive mode */
                        mode = MAPPING;
                        Inv_Draw(25,70, " MAPPING ");
                        if (start_mapping(map_ptr) == ERROR) {
                            mode = DRIVING;
                            turn_preference = 0;
                        }
                    }
                    if (mode != MAPPING) {
                        stop();
                        Inv_Draw(25,70, " DRIVING ");
                    }
            }
            else if (selection == 210) {    /* left turn preference */
                    turn_preference = 1;
                    sprintf(str, "OW%02d", turn_preference);
                    put_packet(str);
                    mode = WANDERING;
                    update_drive_screen();
            }
            else if (selection == 220) {    /* right turn preference */
                    turn_preference = 2;
                    sprintf(str, "OW%02d", turn_preference);
                    put_packet(str);
                    mode = WANDERING;
                    update_drive_screen();
            }
            else if (selection == 230) {    /* random turn preference */
                    turn_preference = 3;
                    sprintf(str, "OW%02d", turn_preference);
                    put_packet(str);
                    mode = WANDERING;
                    update_drive_screen();
            }
            else if (selection == 240) {    /* halt when turn direction is ambiguou
s */
                    turn_preference = 4;
                    sprintf(str, "OW%02d", turn_preference);
                    put_packet(str);
                    mode = WANDERING;
                    update_drive_screen();
            }
            else if (selection == 400) {    /* Help! */
                    drive_help();
```

```
            }
            else if (selection == 501) {
                getpos(map_ptr);
            }
            else if (selection == 502) {
                getspeed();
            }
            else if (selection == 503) {
                x_command(X_CAMERA, 1);                 /* turn camera on */
            }
            else if (selection == 504) {
                x_command(X_CAMERA, 0);                 /* turn camera off */
            }
            else if (selection == 510) {                /* redraw the screen */
                gpmerge(MRPL);
                gpcolor(BLACK);
                gpclear(0,0, gdmaxcol, gdmaxrow);
                DrawSFloorMap(map_ptr, WHITE, BLUE, GREEN);
            }
            else if (selection == 511) {
                debug ^= 1;
            }
            else if (selection == 600) {
                    if (rand() & 1)
                            say("hello");
                    else
                            say("high");
            }
            else if (selection == 605) {
                    say("go away");
            }
            else if (selection == 610) {
                    say("caution");
            }
            else if (selection == 615) {
                    say("thankyou");
            }
            else if (selection == 620) {
                    say("alert,, alert");
            }
            else if (selection == 625) {
                    say("stop");
            }
            else if (selection == 630) {
                    say("move ing forward");
            }
            else if (selection == 631) {
                mouse_off();
                if (ggets(str, "Speak:", "") != NULL) {
                    say(str);
                }
                update_drive_screen();      /* update status displays */
                mouse_on();
            }
            else if (selection == 635) {
                    say("get a move on");
            }
            else if (selection == 640) {
                    say("help me");
            }
            else if (selection == 645) {
                    say("intruder, intruder");
            }
            else if (selection == 650) {
                    say("move");
            }
            else if (selection == 655) {
                    say("move it");
            }
            else if (selection == 660) {
                    say("please, deposit, 1 quarter");
            }
            else if (selection == 665) {
```

```
                say("stop it");
            }
            else if (selection == 670) {
                say("up yours");
            }
            else if (selection == 700) {
                put_packet("0v042a");    /* say "hello" or "hi" randomly */
            }
            else if (selection == 705) {
                put_packet("0v0401");    /* say "I need assistance" */
            }
            else if (selection == 710) {
                put_packet("0v0403");    /* say the current time */
            }
            else if (selection == 715) {
                put_packet("0v0438");    /* do 3 quick beeps */
            }
            else if (selection == 720) {
                put_packet("0v0439");    /* 3 beeps, then "Code red, repeat, cod
e red" */
            }
            else if (selection == 725) {
                put_packet("0v0350");    /* Thank you */
            }
            else if (selection == 730) {
                put_packet("0v0188");    /* Stop */
            }
            else if (selection == 731) {
                put_packet("0v0412");    /* turn off voice power */
            }

            if (event_occurred) {            /* if an event occurred, clean up scree
n */
                gpviewport(0,0, gdmaxcol, gdmaxrow);
                pmenu = RegisterMenu(pp_menu_bar);
                draw_menu(pmenu);
                mouse_on();
            }

            if (phdg != robart.dir || px != robart.x || py != robart.y ||
                pmax != maxrange) {
                    mouse_off();
                    update_drive_screen();

                    rest_blob();            /* restore old blob */
                    save_blob(map_ptr, robart.x, robart.y, 3);      /* save current
 blob */
                    set_blob(3, BLUE);                          /* put new blob down */

                    phdg = robart.dir;
                    px = robart.x, py = robart.y;
                    pmax = maxrange;
                    mouse_on();
            }

            if (mode == MAPPING) {
                if (update_map(map_ptr) == ERROR) {
                    mode = DRIVING;
                    turn_preference = 0;
                    mouse_off();
                    Inv_Draw(25,70, " DRIVING ");
                    mouse_on();
                }
            }
        }

        deinit_drive();

#if 0
        x_command(X_SONAR, 0);              /* turn sonar array off */
#endif
        close_menu(pmenu);
```

```
        return (OK);
}


/* update_drive_screen - update status items on drive screen */
update_drive_screen()
{
        char str[132];

        gstatus("Hdg:%3d Pos:%2d,%2d maxrange:%5.2f'", robart.dir,
                        robart.x, robart.y, maxrange / 12.0);
        sprintf(str, "%-20s, %2d-%-2d", states[drive_status], left_speed, right_spe
ed);
        PutString(2, 50, str);
        if (mode == DRIVING)
            Inv_Draw(25, 70, " DRIVING ");
        else if (mode == WANDERING)
            Inv_Draw(25,70, "REFLEXIVE");
        else if (mode == MAPPING)
            Inv_Draw(25, 70, " MAPPING ");
        if (turn_preference == 0)
            PutString(25, 40, "                    ");
        else if (turn_preference == 1)
            PutString(25, 40, "Preference:    Left");
        else if (turn_preference == 2)
            PutString(25, 40, "Preference:   Right");
        else if (turn_preference == 3)
            PutString(25, 40, "Preference:  Random");
        else if (turn_preference == 4)
            PutString(25, 40, "Preference:    Halt");
        return (OK);
}


/*********************************************************************
 *                          drive_help                               *
 *********************************************************************
 * Display a dialog box giving help on driving commands.             *
 *********************************************************************/
drive_help()
{
            DIALOG *dbox;
            /*lint -e708 -e570 */
            static DIALOG_ITEM help_dialog[] = {
#if 0
                    {0,  15, 248, STRING, DIALOG_FORE, TRANSPARENT, "------ Driving
 Functions -----"},
                    {0,  29, 176, STRING, DIALOG_FORE, TRANSPARENT, "8:       Drive
 forward"},
                    {0,  43, 144, STRING, DIALOG_FORE, TRANSPARENT, "4:       Turn
left"},
                    {0,  57, 152, STRING, DIALOG_FORE, TRANSPARENT, "6:       Turn
right"},
                    {0,  71, 184, STRING, DIALOG_FORE, TRANSPARENT, "2:       Drive
 backward"},
                    {0,  85, 104, STRING, DIALOG_FORE, TRANSPARENT, "5:       Stop"
},
                    {0,  99, 208, STRING, DIALOG_FORE, TRANSPARENT, "7:       Wande
r left turns"},
                    {0, 113, 216, STRING, DIALOG_FORE, TRANSPARENT, "9:       Wande
r right turns"},
                    {0, 127, 184, STRING, DIALOG_FORE, TRANSPARENT, "0:       Stop
Wandering"},
                    {0, 148, 248, STRING, DIALOG_FORE, TRANSPARENT, "-- Head Positi
oning Commands --"},
                    {0, 162, 176, STRING, DIALOG_FORE, TRANSPARENT, "SHIFT-4: Jog h
ead left"},
                    {0, 176, 184, STRING, DIALOG_FORE, TRANSPARENT, "SHIFT-6: Jog h
ead right"},
                    {0, 190, 208, STRING, DIALOG_FORE, TRANSPARENT, "j:       Set j
og increment"},
                    {0, 204, 176, STRING, DIALOG_FORE, TRANSPARENT, "p:       Posit
ion head"},
```

```
                (0, 225, 248, STRING, DIALOG_FORE, TRANSPARENT, "--- Miscellane
ous  Commands ---"),
                (0, 239, 208, STRING, DIALOG_FORE, TRANSPARENT, "f:       Enter
 follow mode"),
                (90,281,  67, OK_BUTTON, DIALOG_FORE, TRANSPARENT, 0),
                (-1, -1, -1, TEXT, DIALOG_FORE, TRANSPARENT, NULL)
#else
#include "drive.dia"
#endif
        };
        /*lint +e708 +e570 */

        mouse_on();
        if((dbox = OpenDialog(help_dialog, 50, 30, NORMAL)) != NULL) {
                (void) EditDialog(dbox);
                CloseDialog(dbox);
        }
        mouse_off();
        return (OK);
}


/*****************************************************************
 *                          start_mapping                        *
 *****************************************************************
 * Initiate the mapping operation.                               *
 *****************************************************************/
int start_mapping(map_ptr)
map *map_ptr;
{
    double rads;

    epoch_x = robart.x;
    epoch_y = robart.y;

    /* sinval and cosval are the scale factors for the x and y location.
     * When multiplied by the time from the epoch, the result is the
     * displacement from the epoch in squares.  To get the absolute
     * position of the robot at time t (t in seconds, t=0 at epoch).
     *     robart.x = epoch_x + t * cosval + 0.5;
     *     robart.y = epoch_y + t * sinval + 0.5;
     *
     */
    rads = Angle_To_Rads(robart.dir);
    sinval = ips/map_ptr->squaresize * sin(rads)/1000.0;
    cosval = -ips/map_ptr->squaresize * cos(rads)/1000.0;

    /* Setup the PE sonar request packet parameter block to ask for
     * returns on all sensors.
     */
    param[0] =  2;
    param[1] = '1';
    param[2] = 'C';

    waitms(500);
    /* Get initial sonar packet.  If unable to get it, return */
    if (!Get_Packet(&rec, PES_PTYPE, param, 5)) {
        waitms(2000);
        if (!Get_Packet(&rec, PES_PTYPE, param, 5)) {
                return (ERROR);
        }
    }
    waitms(100);
    stop();
    waitms(2200);
    forward();                     /* go at speed 1-1 */
    epoch = mstime();              /* read the start time */
    return (OK);
}


/*****************************************************************
 *                           update_map                          *
```

```
 *****************************************************************
 * Update the map information from the previous sonar return.    *
 *****************************************************************/
int update_map(map_ptr)
map *map_ptr;
{
    int distances[PE_SONAR_NUM];
    int ii;
    int new_x, new_y;
    unsigned long ltimeval;

    if (!Get_Packet(&rec, PES_PTYPE, param, 5)) {
        return (ERROR);
    }


    ltimeval = mstime() - epoch;          /* get the current time */

    DecodePEArray(&rec, pESonars, NO);
    ScalePEArray(distances, pESonars);  /* convert to inches */

    /* Plot the return of each sonar on the screen and in the map. */
    for (ii = 0; ii < PE_SONAR_NUM; ii++) {
        /* Ignore sonar returns that are out of range */
        if (distances[ii] > maxrange) { /* point is out of range */
            continue;
        }

        /* Get the absolute position of the sensor return in cartesian
         * map coordinates, pass in polar coordinates.
         */
        Calc_Dest_Grid_Unit(ii * PE_SON_SPACING,(double)distances[ii],&new_x, &
new_y, map_ptr->squaresize);

        /* If the return is on the floor map then */
        if (Clip_To_Map(new_x, new_y, map_ptr)) {
            /* Plot the return on the screen and in the sonar map. */
            floor(new_x, new_y, map_ptr)++;
            mouse_off();
            ScalePoint(map_ptr, new_x, new_y, MAGENTA);
            mouse_on();

        }
    }

    /* Calculate Robart's current position */
    if (robot_type == ROBARTII) {
            robart.x = (int) (epoch_x + ltimeval * cosval + 0.5);
            robart.y = (int) (epoch_y + ltimeval * sinval + 0.5);
    }
    return (OK);
}


/*****************************************************************
 *                              Drive                            *
 *                                                               *
 * Drive the robot around using the cursor keys on the IBM.  Requires *
 * a serial link to the robot.                                   *
 *                                                               *
 * Commands:                                                     *
 *     8:      Move forward. Initial speed is 1-1.  Each additional *
 *             keypress increase the speed by one, up to a maximum of *
 *             f-f.  If the robot is in a turn, pressing 8 returns *
 *             the robot to the previous forward speed.          *
 *     4:      Turn left (port).  If the robot is moving then dec *
 *             the left motor speed and inc the right motor speed. *
 *             If the robot is stopped, pivot in place.          *
 *     2:      Move backwards.  Same as forward otherwise.       *
 *     6:      Turn right (starboard).  Same as left otherwise.  *
 *     5:      Halt.                                             *
 *                                                               *
 * Notes: The keyboard must be in the Num Lock state in order of the *
```

```
 * cursor keys to work correctly.  The program will turn Num Lock on    *
 * if it isn't already.                                                  *
 *                                                                       *
 ***********************************************************************/

void init_drive()
{
        unsigned char far *kbptr;

        kbptr = (unsigned char far *) 0x417;
        /* Grab the keyboard flags byte */
        save_kbflag = *kbptr;
        kbflag = save_kbflag | NUM_MASK;        /* turn Num Lock on */
        *kbptr = kbflag;

        stop();                         /* make sure motors are off */
}


void deinit_drive()
{
    unsigned char far *kbptr;

    kbptr = (unsigned char far *) 0x417;
    /* Restore the previous Num Lock state */
    *kbptr = save_kbflag;
}


void do_drive(cc)
int cc;
{
    char str[80];
    extern int seekmode;
    extern unsigned long seektimeout;

    switch (cc) {
    case NUM8:                      /* forward movement */
        forward();
        break;

    case NUM4:                      /* left turn */
        left_turn();
        break;

    case NUM6:                      /* right turn */
        right_turn();
        break;

    case NUM2:                      /* backward movement */
        backward();
        break;

    case NUM5:                      /* stop */
        stop();
        break;

    case NUM0:                      /* turn off wander mode */
    case INS:
        put_packet("OW00");         /* stop wandering */
        mode = DRIVING;
        seekmode = turn_preference = 0;
        robart.headDir = 0;         /* head will get re-centered */
        break;

    case NUM7:                      /* set turn preference to left turns */
        turn_preference = 1;
        sprintf(str, "OW%02d", turn_preference);
        put_packet(str);
        mode = WANDERING;
        seekmode = 0;
        break;
```

```

    case NUM9:                      /* set turn preference to right turns */
        turn_preference = 2;
        sprintf(str, "OW%02d", turn_preference);
        put_packet(str);
        mode = WANDERING;
        seekmode = 0;
        break;

    case NUM1:                      /* set turn preference left, enter seek mode */
        turn_preference = 1;
        put_packet("OW11");
        mode = WANDERING;
        seekmode = 1;
        seektimeout = mstime();
        break;

    case NUM3:                      /* set turn preference right, enter seek mode *
/
        turn_preference = 2;
        put_packet("OW22");
        mode = WANDERING;
        seekmode = 1;
        seektimeout = mstime();
        break;

    case LEFTARROW:                 /* Jog head left key? */
        head_pos(SLEFTARROW);       /* do a big jog */
        break;
    case RIGHTARROW:                /* jog head right key? */
        head_pos(SRIGHTARROW);      /* do a big jog */
        break;

    /* Miscellaneous head commands */
    case HOME:                      /* center head */
    case UPARROW:                   /* center head */
    case 'p':                       /* position head to given heading */
    case 'j':                       /* set jog increment */
    case 0x1970:                    /* p scan code */
    case 0x246a:                    /* j scan code */
        head_pos(cc);               /* perform head position command */
        break;
    case 'f':                       /* follow mode */
    case 0x2166:                    /* f scan code */
        put_packet("OF");           /* enter follow mode */
        follow_mode = 1;
        break;
    case 'e':                       /* emergency govern disable mode */
    case 0x1265:                    /* e scan code */
        speed_govern_disable = YES;
        x_command(X_SPDGOVERNING, 0);

    }
}


state_check()
{
        if (mode == WANDERING) {
                mode = DRIVING;
                turn_preference = 0;
                Inv_Draw(25, 70, " DRIVING ");
        }
        return (OK);
}


void forward()
{
        switch (drive_status) {
        case FORWARD:
                right_speed++;
                left_speed++;
```

```
                if (right_speed > MAX_SPEED)
                        right_speed = MAX_SPEED;
                if (left_speed > MAX_SPEED)
                        left_speed = MAX_SPEED;
                left_velocity = left_speed, right_velocity = right_speed;
                sprintf(packstr, "OM00%x%xff", left_speed, right_speed);
                put_packet(packstr);
                break;

        case BACKWARD:
                right_speed--;
                left_speed--;
                left_velocity++, right_velocity++;

                if (right_speed <= 0) {
                        stop();
                }
                else {
                        sprintf(packstr, "OM01%x%xff", left_speed, right_speed)
;
                        put_packet(packstr);
                }
                break;

        case HALTED:
                right_speed = left_speed = left_velocity = right_velocity = 1;
                put_packet("OM0011ff");
                drive_status = FORWARD;
                break;

        case BACK_ARC_LEFT:
                if (right_speed > left_speed)   /* if really arcing left */
                        right_speed--;          /* slow the arc down */
                else if (right_speed < left_speed)      /* if really arcing rig
ht */
                        left_speed--;                   /* slow it down */
                if (right_speed == left_speed) {        /* going straight now?
*/
                        if (right_speed == 0) {         /* stopped? */
                                drive_status = HALTED;
                                sprintf(packstr, "OM070000");
                                left_velocity = right_velocity = 0;
                        }
                        else {                  /* going forward now */
                                drive_status = FORWARD;
                                sprintf(packstr, "OM00%x%xff", left_speed, righ
t_speed);
                                left_velocity = right_velocity = left_speed;
                        }
                }
                else {
                        sprintf(packstr, "OM01%x%xff", left_speed, right_speed)
;
                        left_velocity = -left_speed, right_velocity = -right_sp
eed;
                }
                put_packet(packstr);
                break;

        case BACK_ARC_RIGHT:
                if (left_speed > right_speed)   /* if really arcing right */
                        left_speed--;           /* slow the arc down */
                else if (left_speed < right_speed)      /* if really arcing lef
t */
                        right_speed--;                  /* slow it down */
                if (right_speed == left_speed) {        /* going straight now?
*/
                        if (right_speed == 0) {         /* stopped? */
                                drive_status = HALTED;
                                sprintf(packstr, "OM070000");
                                left_velocity = right_velocity = 0;
                        }
                        else {                  /* going forward now */
```

```
                                drive_status = FORWARD;
                                sprintf(packstr, "OM00%x%xff", left_speed, righ
t_speed);
                                left_velocity = right_velocity = left_speed;
                        }
                }
                else {
                        sprintf(packstr, "OM01%x%xff", left_speed, right_speed)
;
                        left_velocity = -left_speed, right_velocity = -right_sp
eed;
                }
                put_packet(packstr);
                break;

        default:
                if (prev_left == 0 && prev_right == 0) {
                        stop();
                }
                else {
                        sprintf(packstr, "OM00%x%xff", prev_left, prev_right);
                        put_packet(packstr);
                        drive_status = FORWARD;
                        left_speed = left_velocity = prev_left;
                        right_speed = right_velocity = prev_right;
                }
                break;
        }
}


void backward()
{
        switch (drive_status) {
        case BACKWARD:
                right_speed++;
                left_speed++;
                if (right_speed > MAX_SPEED)
                        right_speed = MAX_SPEED;
                if (left_speed > MAX_SPEED)
                        left_speed = MAX_SPEED;
                sprintf(packstr, "OM01%x%xff", left_speed, right_speed);
                left_velocity = -left_speed, right_velocity = -right_speed;
                put_packet(packstr);
                break;

        case HALTED:
                right_speed = left_speed = 1;
                left_velocity = right_velocity = -1;
                put_packet("OM0111ff");
                drive_status = BACKWARD;
                break;

        case FORWARD:
                right_speed--;
                left_speed--;
                left_velocity = -left_speed, right_velocity = -right_speed;
                if (right_speed <= 0) {
                        stop();
                }
                else {
                        sprintf(packstr, "OM00%x%xff", left_speed, right_speed)
;
                        put_packet(packstr);
                        left_velocity = left_speed, right_velocity = right_spee
d;

                }
                break;

        case FOR_ARC_LEFT:
                if (right_speed > left_speed)   /* if really arcing left */
                        right_speed--;          /* slow the arc down */
```

Apr 04 1991 09:42:25 makemap.c Page 15

```
                else if (right_speed < left_speed)      /* if really arcing rig
ht */
                        left_speed--;                   /* slow it down */
                if (right_speed == left_speed) {        /* going straight now?
*/
                        if (right_speed == 0) {         /* stopped? */
                                drive_status = HALTED;
                                sprintf(packstr, "0M070000");
                                left_velocity = 0, right_velocity = 0;
                        }
                        else {                  /* going backward now */
                                drive_status = BACKWARD;
                                sprintf(packstr, "0M01%x%xff", left_speed, righ
t_speed);
                                left_velocity = -left_speed, right_velocity = -
right_speed;
                        }
                }
                else {
                        sprintf(packstr, "0M00%x%xff", left_speed, right_speed)
;
                        left_velocity = left_speed, right_velocity = right_spee
d;
                }
                put_packet(packstr);
                break;

        case PIVOT_LEFT:
                right_speed--, left_speed--;
                if (right_speed == 0) {         /* stopped? */
                        drive_status = HALTED;
                        sprintf(packstr, "0M070000");
                        left_velocity = 0, right_velocity = 0;
                }
                else {
                        sprintf(packstr, "0M02%x%xff", left_speed, right_speed)
;
                        left_velocity = -left_speed, right_velocity = right_spe
ed;
                }
                put_packet(packstr);
                break;

        case FOR_ARC_RIGHT:
                if (left_speed > right_speed)   /* if really arcing right */
                        left_speed--;           /* slow the arc down */
                else if (left_speed < right_speed)      /* if really arcing lef
t */
                        right_speed--;                  /* slow it down */
                if (right_speed == left_speed) {        /* going straight now?
*/
                        if (right_speed == 0) {         /* stopped? */
                                drive_status = HALTED;
                                sprintf(packstr, "0M070000");
                                left_velocity = 0, right_velocity = 0;
                        }
                        else {                  /* going backward now */
                                drive_status = BACKWARD;
                                sprintf(packstr, "0M00%x%xff", left_speed, righ
t_speed);
                                left_velocity = -left_speed, right_velocity = -
right_speed;
                        }
                }
                else {
                        sprintf(packstr, "0M00%x%xff", left_speed, right_speed)
;
                        left_velocity = left_speed, right_velocity = right_spee
d;
                }
                put_packet(packstr);
                break;

```

Apr 04 1991 09:42:25 makemap.c Page 16

```
        case PIVOT_RIGHT:
                right_speed--, left_speed--;
                if (right_speed == 0) {         /* stopped? */
                        drive_status = HALTED;
                        sprintf(packstr, "0M070000");
                        left_velocity = 0, right_velocity = 0;
                }
                else {
                        sprintf(packstr, "0M03%x%xff", left_speed, right_speed)
;
                        left_velocity = left_speed, right_velocity = -right_spe
ed;
                }
                put_packet(packstr);
                break;


        default:
                sprintf(packstr, "0M01%x%xff", prev_left, prev_right);
                put_packet(packstr);
                drive_status = BACKWARD;
                left_speed = prev_left;
                right_speed = prev_right;
                left_velocity = -left_speed, right_velocity = -right_speed;
                break;
        }
}


void left_turn()
{
        switch (drive_status) {
        case FORWARD:
                prev_left = left_speed;         /* save the previous speeds */
                prev_right = right_speed;
                drive_status = FOR_ARC_LEFT;
                /* Fall through... */

        case FOR_ARC_LEFT:
        case FOR_ARC_RIGHT:
                right_speed++;
                left_speed--;
                if (right_speed > MAX_SPEED)
                        right_speed = MAX_SPEED;
                if (left_speed < 0)
                        left_speed = 0;
                left_velocity = left_speed, right_velocity = right_speed;

                sprintf(packstr, "0M00%x%xff", left_speed, right_speed);
                put_packet(packstr);
                if (right_speed == left_speed)
                        drive_status = FORWARD;
                else if (right_speed < left_speed)
                        drive_status = FOR_ARC_RIGHT;
                else
                        drive_status = FOR_ARC_LEFT;
                break;

        case BACKWARD:
                prev_left = left_speed;
                prev_right = right_speed;
                /* Fall through... */

        case BACK_ARC_LEFT:
        case BACK_ARC_RIGHT:
                right_speed++;
                left_speed--;
                if (right_speed > MAX_SPEED)
                        right_speed = MAX_SPEED;
                if (left_speed < 0)
                        left_speed = 0;
                left_velocity = -left_speed, right_velocity = -right_speed;
                sprintf(packstr, "0M01%x%xff", left_speed, right_speed);
```

```
                    put_packet(packstr);
                    if (right_speed == left_speed)
                            drive_status = BACKWARD;
                    else if (right_speed < left_speed)
                            drive_status = BACK_ARC_RIGHT;
                    else
                            drive_status = BACK_ARC_LEFT;
                    break;

            case HALTED:
                    right_speed = left_speed = 1;
                    left_velocity = -1, right_velocity = 1;
                    put_packet("0M0211ff");
                    drive_status = PIVOT_LEFT;
                    break;

            case PIVOT_LEFT:
                    left_speed++;
                    right_speed++;
                    if (left_speed > MAX_SPEED)
                            left_speed = MAX_SPEED;
                    if (right_speed > MAX_SPEED)
                            right_speed = MAX_SPEED;
                    left_velocity = -left_speed, right_velocity = right_speed;
                    sprintf(packstr, "0M02%x%xff", left_speed, right_speed);
                    put_packet(packstr);
                    break;

            case PIVOT_RIGHT:
                    left_speed--;
                    right_speed--;
                    if (left_speed <= 0) {
                            stop();
                            return;
                    }
                    if (right_speed <= 0) {
                            stop();
                            return;
                    }
                    left_velocity = left_speed, right_velocity = -right_speed;
                    sprintf(packstr, "0M03%x%xff", left_speed, right_speed);
                    put_packet(packstr);
                    break;

            }
}


void right_turn()
{
            switch (drive_status) {
            case FORWARD:
                    prev_left = left_speed;          /* save the previous speeds */
                    prev_right = right_speed;
                    drive_status = FOR_ARC_RIGHT;
                    /* Fall through... */

            case FOR_ARC_LEFT:
            case FOR_ARC_RIGHT:
                    right_speed--;
                    left_speed++;
                    if (left_speed > MAX_SPEED)
                            left_speed = MAX_SPEED;
                    if (right_speed < 0)
                            right_speed = 0;

                    left_velocity = left_speed, right_velocity = right_speed;
                    sprintf(packstr, "0M00%x%xff", left_speed, right_speed);
                    put_packet(packstr);
                    if (right_speed == left_speed)
                            drive_status = FORWARD;
                    else if (right_speed < left_speed)
                            drive_status = FOR_ARC_RIGHT;
```

```
                    else
                            drive_status = FOR_ARC_LEFT;
                    break;

            case BACKWARD:
                    prev_left = left_speed;
                    prev_right = right_speed;
                    /* Fall through... */

            case BACK_ARC_LEFT:
            case BACK_ARC_RIGHT:
                    right_speed--;
                    left_speed++;
                    if (left_speed > MAX_SPEED)
                            left_speed = MAX_SPEED;
                    if (right_speed < 0)
                            right_speed = 0;
                    left_velocity = -left_speed, right_velocity = -right_speed;
                    sprintf(packstr, "0M01%x%xff", left_speed, right_speed);
                    put_packet(packstr);
                    if (right_speed == left_speed)
                            drive_status = BACKWARD;
                    else if (right_speed < left_speed)
                            drive_status = BACK_ARC_RIGHT;
                    else
                            drive_status = BACK_ARC_LEFT;
                    break;

            case HALTED:
                    right_speed = left_speed = 1;
                    left_velocity = 1, right_velocity = -1;
                    put_packet("0M0311ff");
                    drive_status = PIVOT_RIGHT;
                    break;

            case PIVOT_RIGHT:
                    left_speed++;
                    right_speed++;
                    if (left_speed > MAX_SPEED)
                            left_speed = MAX_SPEED;
                    if (right_speed > MAX_SPEED)
                            right_speed = MAX_SPEED;
                    left_velocity = left_speed, right_velocity = -right_speed;
                    sprintf(packstr, "0M03%x%xff", left_speed, right_speed);
                    put_packet(packstr);
                    break;

            case PIVOT_LEFT:
                    left_speed--;
                    right_speed--;
                    if (left_speed <= 0) {
                            stop();
                            return;
                    }
                    if (right_speed <= 0) {
                            stop();
                            return;
                    }
                    left_velocity = -left_speed, right_velocity = right_speed;
                    sprintf(packstr, "0M02%x%xff", left_speed, right_speed);
                    put_packet(packstr);
                    break;

            }
}


void stop()
{
            right_speed = left_speed = 0;
            left_velocity = right_velocity = 0;
            prev_left = prev_right = 0;
            drive_status = HALTED;
```

```
        put_packet("0M070000");
}


/**********************************************************************
 *                          getdparms                                 *
 **********************************************************************
 * Get the drive parameters.                                          *
 **********************************************************************/
void getdparms(map_ptr)
map *map_ptr;
{
    getpos(map_ptr);      /* get current position and heading */
#if 0
    getspeed();           /* get the robot's estimated speed */
#endif
}


/* getpos - get Robart's position and heading. */
void getpos(map_ptr)
map *map_ptr;
{
    char str[80];

    Fix_Point(map_ptr, &robart.x, &robart.y, WHITE);
    Clear_Line(1);
    robart.dir = force360(robart.dir);
    sprintf(str, "Enter Robart's heading [%d]: ", robart.dir);
    robart.dir = Get_Value(1, 1, 0, 360, robart.dir, str);
    robotx = robart.x * map_ptr->squaresize * 10L;
    roboty = robart.y * map_ptr->squaresize * 10L;
    robothdg = robart.dir * 100L;
    Clear_Line(1);
}



/* getspeed - get the current speed */
void getspeed()
{
    char str[80], pstr[80];

    mouse_off();
    sprintf(pstr, "Enter speed in inches/sec [%.2f] -->", ips);
    if (ggets(str, pstr, "") != NULL) {
        if (str[0] != EOS)
                ips = atof(str);
    }
    Clear_Line(25);
    mouse_on();
}


static GBUF *save_ary;
static int xx1, yy1, xx2, yy2;


save_blob(map_ptr, x, y, size)
map *map_ptr;
int x, y, size;
{
    return(OK);
#if 0
    xx1 = map_ptr->xoff + x * map_ptr->scale - size + 1;
    yy2 = map_ptr->yoff - y * map_ptr->scale + size - 1;
    xx2 = xx1 + 2 * size;
    yy1 = yy2 - 2 * size;
    save_ary = readsq(xx1, yy1, xx2, yy2);
    if (save_ary != NULL)
        return (OK);
    /*lint -e506 */
    return (!OK);
```

```
    /*lint +e506 */
#endif
}


rest_blob()
{
    return(OK);
#if 0
    writesq(xx1, yy1, save_ary);
    freesq(save_ary);
    return (OK);
#endif
}


set_blob(size, color)
int size, color;
{
#if 0
    ScalePoint(xx1, yy2, size*2, color);
#endif
    return (OK);
}
```

```c
/****************************************************************************
 * Mapedit.c contains routines that allow the operator to edit a floor map
 * structure. Map editing is one of the main menu choices (see robart.c).
 ****************************************************************************/
#include <fcntl.h>
#include <stdlib.h>
#include <stdio.h>
#include <ega.h>
#include <event.h>
#include <menu.h>
#include <syscolor.h>
#include <dialog.h>

#include "headers/ibmio.h"


static byte point_icon[] = {
#include "point.ico"
};

static byte line_icon[] = {
#include "line.ico"
};

static byte rect_icon[] = {
#include "rect.ico"
};

static    enum        {POINT, LINE, RECT} draw_mode;


/***************************** Macros ****************************************/
/* The following macros are used to set limits. BL (bottom limit) returns
   the larger of it's input x and zero. UL (upper limit) returns the smaller
   of it's two inputs, x and l (which stands for limit).          */
#define BL(x)       (((x)>0)?(x):0)
#define UL(x,l)     (((x)<l)?(x):(l))

/*************************** Globals *****************************************/

/* Boolean variables true if a floor map has been loaded into memory
   and if a floor map has been edited but not yet saved.         */
static int  file_edited;

/****************************************************************************/
/* Confirm is utility procedure that asks the user if they want to save a    */
/* floor map that may have been edited first. Used by the load, new and quit */
/* functions.                                               */
/****************************************************************************/
void Confirm(map_ptr)
map  *map_ptr;
{
    unsigned int c;

    Draw_Status_Line(" Save the current floor map (y/n)? ");
    c = mgetkey();
    if ((c != 'n') && (c != 'N')) Save_Floor_Map(map_ptr, NULL);
}


/****************************************************************************/
/* Grow_Floor_Map will grow the internal memory floor map by an integer      */
/* number of floor map grid units (from 1 to 5).                  */
/****************************************************************************/
void Grow_Floor_Map(map_ptr)
map  *map_ptr;
{
    char        str[80];
    int         gf,w,h,x,y;
    byte        val;

g_again:
    if (ggets(str, "Type in growth factor, 0-20 [1]: ", "") == NULL)
```

```c
        return;
    if (str[0] == EOS)
        gf = 1;
    else {
        gf = atoi(str);
        if (gf < 0 || gf > 20)
            goto g_again;
    }
    Draw_Status_Line(" Growing current floor map...");

    /* For every unit of the floor map do */
    for(h=0;h<map_ptr->height;h++) {
        for(w=0;w<map_ptr->width;w++) {

            val = floor(w, h, map_ptr);
            if (val == GROWTH)
                floor(w, h, map_ptr) = val = CLEAR;
            if (gf == 0)
                continue;

            /* If the unit is clear check for object units within a growth
             * factor away
             */
            if (val == CLEAR) {
                for(y=BL(h-gf);y<=UL(h+gf,(int)map_ptr->height-1);y++) {
                    for(x=BL(w-gf);x<=UL(w+gf,(int)map_ptr->width-1);x++) {

                        /* If there is an object unit then break out of the
                               inner search loops          */
                        if (floor(x, y, map_ptr) == OBJECT) {
                            floor(w, h, map_ptr) = GROWTH;
                            goto found;
                        }
                    }
                }
            }
found:  ;
        }
    }
    Clear_Line(25);
}


/****************************************************************************/
/* Draw_Sensor_Map draws that part of a floor map with grid values greater   */
/* than a given threshold. It draws all pixels in blue (therefore it doesn't */
/* distinguish between growth and object.                    */
/****************************************************************************/
static void Draw_Sensor_Map(map_ptr, threshold)
map  *map_ptr;
int  threshold;
{
    int  scrx, scry, i,j;
    byte *temp_ptr, val;

/*    Clear();*/
    scrx = map_ptr->xoff;
    scry = map_ptr->yoff;

    /* Get a copy of the master pointer. */
    temp_ptr = map_ptr->mem_ptr;

    /* Step through the floor map drawing only those pixels that represent
       object, not growth.                              */
    for (i = 0; i < map_ptr->height; i++) {
        for (j = 0; j < map_ptr->width; j++) {
            val = *temp_ptr++;
            if (val > threshold && val < CLEAR) {
                gpcolor(BLUE);
                gpplot(scrx+j, scry-i);
            }
            else {
                gpcolor(BLACK);
```

```
                gpplot(scrx+j, scry-1);
            }
        }
    }
}


/****************************************************************************/
/* Threshold will let the user work on a sensor map produced by Robart. It  */
/* also will allow the user to strip away growth from object in a given     */
/* floor map. It works by plotting all pixels in a given floor map that are */
/* above the specified threshold. The user can change the threshold value   */
/* and then ask for the map to be displayed again (by typing return). When  */
/* Threshold is exited (by typing 'q'), what was last displayed on the      */
/* screen is saved to internal memory, where it can be edited, saved, etc... */
/****************************************************************************/
static void Threshold(map_ptr)
map  *map_ptr;
{
    char str[10];
    int  thres;
    unsigned int c;

    /* Set the initial threshold setting at the lower bound and draw the map. *
/
    thres = 0;
    Draw_Sensor_Map(map_ptr, thres);

    /* Until the user types 'q' to quit do */
    do {

        /* Print instructions */
        gotoxy(1, 0);
        gprintf("Use arrow keys or (q) to quit.");
        gotoxy(3, 0);
        gprintf("Current Threshold");
        sprintf(str, "%3d", thres);
        PutString(4, 7, str);

        /* Get the next character */
        c = mgetkey();
        switch (c) {
        case UPARROW:
            if (thres < 256) thres++;
            break;
        case DOWNARROW:
            if (thres > 0) thres--;
            break;
        case SUPARROW:
            if (thres < 246) thres += 10;
            break;
        case SDOWNARROW:
            if (thres > 10) thres -= 10;
            break;
        case CR:
            Draw_Sensor_Map(map_ptr, thres);
            break;
        }
    }
    while (c != 'q');

    /* We now have a floor map in internal memory */
    file_edited = TRUE;
}


/* putcoord - output two sets of coordinates, one in squares the other in
 *      feet and inches.
 */
putcoord(row, col, x, y, sqsize)
int row, col, x, y, sqsize;
{
        char str[40];
```

```

        sprintf(str, "%3d,%-3d", x, y);
        PutString(row, col, str);
        x *= sqsize;
        y *= sqsize;
        sprintf(str, "%2d'%2d\",%2d'%2d\"", x/12, x%12, y/12, y%12);
        PutString(row+1, col-3, str);
        return (OK);
}

char *conv_value2str();


char *conv_value2str(value)
int value;
{
        static char retstring[20];

        switch (value) {
        case OBJECT:
                return ("  OBJECT  ");
        case MOVEABLE:
                return (" MOVEABLE ");
        case GROWTH:
                return ("  GROWTH  ");
        case DOOR:
                return ("   DOOR   ");
        case STRIPE:
                return ("  STRIPE  ");
        case RECHARGER:
                return ("RECHARGER ");
        case CAL1:
                return ("   CAL1   ");
        case CAL2:
                return ("   CAL2   ");
        case CLEAR:
                return ("  CLEAR   ");
        case FATMARKER:
                return ("FATMARKER ");
        case THINMARKER:
                return ("THINMARKER");
        case VIRTUALPOINT:
                return ("  VIRTUAL ");
        case DEST:
                return ("   DEST   ");
        case START:
                return ("  START   ");
        case PRIGHT:
                return ("  PRIGHT  ");
        case PDOWN:
                return ("  PDOWN   ");
        case PLEFT:
                return ("  PLEFT   ");
        case PUP:
                return ("   PUP    ");
        case PUPRIGHT:
                return (" PUPRIGHT ");
        case PDOWNRIGHT:
                return ("PDOWNRIGHT");
        case PDOWNLEFT:
                return ("PDOWNLEFT ");
        case PUPLEFT:
                return (" PUPLEFT  ");
        default:
                sprintf(retstring, "%3d (%02xH) ", value, value);
        }
        return (retstring);
}


void draw_map_edit_stats(edit_value)
int edit_value;
{
```

```
        PutString(5, 70, " Mark");
        PutString(9, 68, "Rel To Mark");
        PutString(13, 69, "Edit Mode");
        PutString(15, 67, conv_value2str(edit_value));
        PutString(17, 67, "Cursor Value");
    }


    static int trans_val = 1;
    static DIALOG_ITEM trans_dialog[] = {
    #include "trans.dia"
    };

    static char     source_name[40],
                    dest_name[40],
                    source_x[10],
                    source_y[10],
                    dest_x[10],
                    dest_y[10],
                    sdoor_x[10], sdoor_y[10],
                    sdoor_ix[10] = "-1",
                    sdoor_prob[10] = "0.5",
                    sdoor_state[10] = "Closed",
                    sdoor_id[10] = "0",
                    sdoor_mapname[40] = "";

    static DIALOG_ITEM virt_dialog[] = {
    #include "virtual.dia"
    };

    static DIALOG_ITEM door_dialog[] = {
    #include "door.dia"
    };

    /*************************************************************************
     * MapEdit is called from the main function when map editing is choosen from *
     * the main menu. It accepts a pointer to a global floor map  as input. It   *
     * handles all keyboard requests and only returns when the user types quit.  *
     *************************************************************************/
    void MapEdit(map_ptr)
    map  *map_ptr;
    {
        char                    str[80], fixed_name[80];
        int                     status;
        int                     x, y;
        int                     buttons, mx, my;
        int                     oldmapx, oldmapy;
        int                     edit_value = OBJECT;
        int                     xm=0, ym=0;
        static char             sensor_overlay_enabled = 0;
        int                     new, ii;
        int                     event_occurred;
        int                     drawing;
        int                     banding, box_banding;
        int                     doneFlg;
        long                    selection;
        MAPC_STRUCT             mapc;
        LINE_TYPE               line_struc;
        SENSOR_TAB              *fixed_tab;
        DIALOG                  *dbox;
        static MENU_ITEM file_menu[] = {
            {"Load", 0, 301, 0, NULL},
            {"Save", 0, 302, 0, NULL},
            {"New", 0, 303, 0, NULL},
            {"-", 0, 0, 0, NULL},
            {"Edit", 0, 304, 0, NULL},
            {"-", 0, 0, 0, NULL},
            {"Redraw", 0, 320, 0, NULL},
            {"Quit", 0, 9999, 0, NULL},
            {NULL, 0, 0, 0, NULL}
        };
        static MENU_ITEM map_menu[] = {
            {"Grow", 0, 401, 0, NULL},
```

```
            {NULL, 0, 0, 0, NULL}
        };
        static MENU_ITEM map_types_menu[] = {
    #if 0
         {"OBJECT", 0, OBJECT, 0, NULL},             {"MOVEABLE", 0, MOVEABLE, 0, NU
    LL},
         {"GROWTH", 0, GROWTH, 0, NULL},             {"DOOR", 0, DOOR, 0, NULL},
         {"STRIPE",0, STRIPE,0,NULL},                {"RECHARGER", 0, RECHARGER, 0,
    NULL},
         {"CAL1", 0, CAL1, 0, NULL},                 {"CAL2", 0, CAL2, 0, NULL},
         {"CLEAR", 0, CLEAR, 0, NULL},               {"DEST", 0, DEST, 0, NULL},
         {"START", 0, START, 0, NULL},               {"PRIGHT", 0, PRIGHT, 0, NULL},
         {"PDOWN", 0, PDOWN, 0, NULL},               {"PLEFT", 0, PLEFT, 0, NULL},
         {"PUP", 0, PUP, 0, NULL},                   {"PUPRIGHT", 0, PUPRIGHT, 0, NU
    LL},
         {"PDOWNRIGHT",0, PDOWNRIGHT,0,NULL},        {"PDOWNLEFT", 0, PDOWNLEFT, 0,
    NULL},
         {"PUPLEFT", 0, PUPLEFT, 0, NULL},   {NULL, 0, 0, 0, NULL}
    #else
         {"OBJECT", 0, OBJECT, 0, NULL},             {"GROWTH", 0, GROWTH, 0, NULL},
         {"CLEAR", 0, CLEAR, 0, NULL},               {"DOOR", 0, DOOR, 0, NULL},
         {"STRIPE",0, STRIPE,0,NULL},                {"RECHARGER", 0, RECHARGER, 0,
    NULL},
         {"CAL1", 0, CAL1, 0, NULL},                 {"CAL2", 0, CAL2, 0, NULL},
         {"MOVEABLE", 0, MOVEABLE, 0, NULL},
         {"FATMARKER", 0, FATMARKER, 0, NULL},       {"THINMARKER", 0, THINMARKER, 0
    , NULL},
         {"VIRTUALPOINT", 0, VIRTUALPOINT, 0, NULL},
         {"-", 0, 0, 0, NULL},
         {"Transient...", 0, 600, 0, NULL},
         {NULL, 0, 0, 0, NULL}
    #endif
        };
        static MENU_ITEM sensor_map_menu[] = {
         {"Sensor overlay enable", 0, 500, CHECK_DISPLAY, (MENU_ITEM *) &sensor_ove
    rlay_enabled},
         {"Add new sensor", 0, 510, 0, NULL},
         {"Change sensor coverage", 0, 520, GRAYED, NULL},
         {"Delete sensor", 0, 530, GRAYED, NULL},
         {"-", 0, 0, 0, NULL},
         {"Save sensor map", 0, 540, 0, NULL},
         {NULL, 0, 0, 0, NULL}
        };
        static MENU_ITEM zoom_menu[] = {
            {"Zoom In", 0, 9000, 0, NULL},
            {"Zoom out", 0, 9010, 0, NULL},
            {"Zoom all", 0, 9020, 0, NULL},
            {NULL, 0, 0, 0, NULL}
        };
        static MENU_ITEM map_edit_bar[] = {
            {"File", 0, 1, 0, file_menu},
            {"Map", 0, 2, 0, map_menu},
            {"Map Values", 0, 3, 0, map_types_menu},
            {"Sensor map", 0, 4, 0, sensor_map_menu},
            {"Zoom", 0, 5, 0, zoom_menu},
            {NULL, 0, 0, 0, NULL}
        };
        MENU        *pmenu;
        EVENT       evnt;

        mouse_off();
        gpcolor(BLACK);
        gpclear(0,0, gdmaxcol, gdmaxrow);

        pmenu = RegisterMenu(map_edit_bar);
        draw_menu(pmenu);

        draw_mode = POINT;
        draw_icons(YES);

        /* Load the current floor map */
        if (map_ptr->mapName[0] == '\0') {
            if (Load_Floor_Map(map_ptr, NULL) == ERROR) {
```

```
            close_menu(pmenu);
            mouse_on();
            return;
        }
    }

    /* Load the fixed sensor map, if any */
    make_name(fixed_name, map_ptr->mapName, ".fix");
    fixed_tab = load_fixed_sensors(fixed_name, map_ptr);

    SetScale(map_ptr, 0,528, 15,gdmaxrow-15);
    DrawSFloorMap(map_ptr, WHITE, BLUE, GREEN);

    draw_map_edit_stats(edit_value);

    /* initialize the map cursor routines */
    mouse_on();
    mapc_Init(&mapc, map_ptr, LGREEN, IWHITE);

    /* Main menu loop until quit command received */
    doneFlg = banding = box_banding = drawing = NO;
    do {
        oldmapx = mapc.mapx, oldmapy = mapc.mapy;
        mapc_update(&mapc);          /* update the map cursor */
        if (mapc.in_map && ((oldmapx != mapc.mapx) || (oldmapy != mapc.mapy))) {
            all_coords(str, mapc.mapx, mapc.mapy, map_ptr);
            text_foreground(IWHITE);
            text_background(BLACK);
            PutString(25,1, str);
            PutString(19, 67, conv_value2str(floor(mapc.mapx, mapc.mapy, map_ptr)));
            putcoord(10, 70, mapc.mapx-xm, mapc.mapy-ym, map_ptr->squaresize);
            buttons = get_mouse(&mx, &my);
            if ((buttons & 0x01) && draw_mode == POINT && drawing) {
                mapc_off(&mapc);
                mouse_off();

                /* Draw the line into the actual floor map */
                init_line(&line_struc, oldmapx, oldmapy, mapc.mapx, mapc.mapy);
                do {
                    x = line_struc.x, y = line_struc.y;
                    if (x >= 0 && x < map_ptr->width && y >= 0 && y < map_ptr->height) {
                        floor(x, y, map_ptr) = (byte) edit_value;
                        ScalePoint(map_ptr, x, y, get_obj_color(edit_value));
                    }
                } while (get_line_point(&line_struc) == 0);
                floor(mapc.mapx, mapc.mapy, map_ptr) = (byte) edit_value;
                ScalePoint(map_ptr, mapc.mapx, mapc.mapy, get_obj_color(edit_value));
                mouse_on();
                mapc_on(&mapc);
            }
        }

        selection = NO_SELECTION;
        event_occurred = NO;
        if (GetEvent(&evnt)) {
            switch(evnt.type & 0xFF00) {
            case KEYBOARD :
                    if(evnt.data == 0x011B || evnt.data == F10) {
                        doneFlg = YES;
                    } else {
                        selection = pull_select_menu(pmenu, 0, 1);
                        event_occurred = YES;

                        if((new = CheckTrap()) != -1)
                            ii = new;
                    }
                    break;

            case MOUSEBUTTONDOWN :
```

```
                ii = 0;
                if((new = CheckTrap()) != -1)
                    ii = new;
                if (ii && (ii & 0x00FF) != 0x00FE && (ii & 0x00F0) == 0x00F0) {
                    selection = pull_select_menu(pmenu, (ii & 0x000F), 1);
                    event_occurred = YES;

                    if((new = CheckTrap()) != -1)
                        ii = new;
                }
                else if (((ii & 0xff) == 'P') {
                    draw_mode = POINT;
                    draw_icons(NO);
                }
                else if (((ii & 0xff) == 'L') {
                    draw_mode = LINE;
                    draw_icons(NO);
                }
                else if (((ii & 0xff) == 'R') {
                    draw_mode = RECT;
                    draw_icons(NO);
                }
                else if (mapc.in_map && edit_value == VIRTUALPOINT) {
                    mapc_off(&mapc);
                    mouse_on();
                    get_virtual_point(map_ptr, mapc.mapx, mapc.mapy);
                    mouse_off();
                    mapc_on(&mapc);
                }
                else if (mapc.in_map && edit_value == DOOR) {
                    mapc_off(&mapc);
                    mouse_on();
                    get_door_info(map_ptr, mapc.mapx, mapc.mapy);
                    mouse_off();
                    mapc_on(&mapc);
                }
                else if (mapc.in_map && draw_mode == POINT) {
                    if (mapc.mapx >= 0 && mapc.mapx < map_ptr->width &&
                        mapc.mapy >= 0 && mapc.mapy < map_ptr->height) {
                        drawing = YES;
                        floor(mapc.mapx, mapc.mapy, map_ptr) = (byte) edit_value;
                        ScalePoint(map_ptr, mapc.mapx, mapc.mapy, get_obj_color(edit_value));
                    }
                }
                else {
                    if (draw_mode == LINE && mapc.in_map) {
                        mapc.rx1 = mapc.mapx, mapc.ry1 = mapc.mapy;
                        xm = mapc.mapx;
                        ym = mapc.mapy;
                        putcoord(6, 70, xm, ym, map_ptr->squaresize);
                        putcoord(10, 70, mapc.mapx-xm, mapc.mapy-ym, map_ptr->squaresize);
                        start_banding(&mapc, mapc.mapx, mapc.mapy);
                        banding = YES;
                    }
                    else if (draw_mode == RECT && mapc.in_map) {
                        mapc.rx1 = mapc.mapx, mapc.ry1 = mapc.mapy;
                        xm = mapc.mapx;
                        ym = mapc.mapy;
                        putcoord(6, 70, xm, ym, map_ptr->squaresize);
                        putcoord(10, 70, mapc.mapx-xm, mapc.mapy-ym, map_ptr->squaresize);
                        start_box_banding(&mapc, mapc.mapx, mapc.mapy);
                        box_banding = YES;
                    }
                }
```

```
                        break;

                case MOUSEBUTTONUP:
                        drawing = NO;
                        if (banding) {
                            banding = NO;
                            stop_banding(&mapc);
                            if (mapc.in_map) {
                                x = mapc.mapx;
                                y = mapc.mapy;
                                mapc_off(&mapc);
                                /* Draw the line into the actual floor map */
                                init_line(&line_struc, xm, ym, x, y);
                                do {
                                    floor(line_struc.x, line_struc.y, map_ptr) = (byte) edit_value;
                                    ScalePoint(map_ptr, line_struc.x, line_struc.y, get_obj_color(edit_value));
                                } while (get_line_point(&line_struc) == 0);
                                floor(x, y, map_ptr) = (byte) edit_value;
                                ScalePoint(map_ptr, x, y, get_obj_color(edit_value));
                                mapc_on(&mapc);
                            }
                        }
                        else if (box_banding) {
                            box_banding = NO;
                            stop_box_banding(&mapc);
                            if (mapc.in_map) {
                                int lx,ly, ux,uy;

                                x = mapc.mapx;
                                y = mapc.mapy;
                                lx = (xm < x ? xm : x);
                                ux = (xm > x ? xm : x);
                                ly = (ym < y ? ym : y);
                                uy = (ym > y ? ym : y);
                                mapc_off(&mapc);
                                for (y = ly; y <= uy; y++) {
                                    for (x = lx; x <= ux; x++) {
                                        if (x >= 0 && x < map_ptr->width &&
                                            y >= 0 && y < map_ptr->height) {
                                                floor(x, y, map_ptr) = (byte) edit_value;
                                                ScalePoint(map_ptr, x, y, get_obj_color(edit_value));
                                        }
                                    }
                                }
                                mapc_on(&mapc);
                            }
                        }
                        break;
                }
        }
        if (event_occurred) {           /* if a selection was made */
                close_menu(pmenu);
                gpviewport(0,0, gdmaxcol, gdmaxrow);
        }
        text_foreground(IWHITE);
        text_background(BLACK);
        if (selection == 301) {         /* load map */
            mouse_off();
            /* If the current internal memory file has been edited then
             * see if the user wants to save the current map first.
             */
            if (file_edited) Confirm(map_ptr);
            if (Load_Floor_Map(map_ptr, NULL) == ERROR) {
                Draw_Status_Line("Error loading floor map -->");
                mgetkey();
                mouse_on();
                break;
            }
```

```

                SetScale(map_ptr, 0,528, 15,gdmaxrow-15);
                file_edited = FALSE;
                Draw_Status_Line(" Threshold? [n]");
                if (mgetkey() == 'y') {
                    Threshold(map_ptr);
                }
                gpcolor(BLACK);
                gpclear(0,16, 528,gdmaxrow);
                DrawSFloorMap(map_ptr, WHITE, BLUE, GREEN);
                draw_map_edit_stats(edit_value);

                mouse_on();
                mapc_Init(&mapc, map_ptr, LGREEN, IWHITE);
                Clear_Line(25);
            }
            else if (selection == 302) {    /* save map */
                mapc_off(&mapc);
                mouse_off();
                if (!Save_Floor_Map(map_ptr, NULL)) mgetkey();
                mouse_on();
                mapc_on(&mapc);
            }
            else if (selection == 303) {    /* new map */
                /* If the current internal memory file has been edited then
                 * see if the user wants to save the current map first.
                 */
                mouse_off();
                if (file_edited) Confirm(map_ptr);
                New_Floor_Map(map_ptr);
                zoomall(map_ptr, 0,15, 528,gdmaxrow-15);
                draw_map_edit_stats(edit_value);
                file_edited = FALSE;
                mouse_on();
            }
            else if (selection == 304) {    /* edit certain map parameters */
                mouse_off();
                mod_map_parms(map_ptr);
                mouse_on();
            }
            else if (selection == 320) {    /* redraw screen */
                mouse_off();
                gpcolor(BLACK);
                gpclear(0,16, 528,gdmaxrow);
                DrawSFloorMap(map_ptr, WHITE, BLUE, GREEN);
                if (sensor_overlay_enabled)
                    draw_all_fixed_sensors(map_ptr, fixed_tab);
                draw_map_edit_stats(edit_value);
                mouse_on();
            }
            else if (selection == 401) {    /* grow floor map */
                /* If there exists a floor map then grow it else print error */
                Grow_Floor_Map(map_ptr);
                Clear_Line(25);
                gpcolor(BLACK);
                gpclear(0,16, 528,gdmaxrow);
                DrawSFloorMap(map_ptr, WHITE, BLUE, GREEN);
                draw_map_edit_stats(edit_value);
            }
            else if (selection == 500) {    /* toggle sensor overlay display */
                sensor_overlay_enabled ^= 1;
                if (sensor_overlay_enabled) {
                    draw_all_fixed_sensors(map_ptr, fixed_tab);
                }
                else {
                    mouse_off();
                    gpcolor(BLACK);
                    gpclear(0,16, 528,gdmaxrow);
                    DrawSFloorMap(map_ptr, WHITE, BLUE, GREEN);
                    draw_map_edit_stats(edit_value);
                    mouse_on();
                }
            }
```

```
        else if (selection == 510) {    /* add a fixed sensor */
            mapc_off(&mapc);
            fixed_tab = add_fixed_sensor(map_ptr, fixed_tab);
            DrawSFloorMap(map_ptr, WHITE, BLUE, GREEN);
            draw_map_edit_state(edit_value);
            if (sensor_overlay_enabled)
                draw_all_fixed_sensors(map_ptr, fixed_tab);
            mapc_on(&mapc);
        }
        else if (selection == 520) {    /* edit a fixed sensor */
        }
        else if (selection == 530) {    /* delete a fixed sensor */
        }
        else if (selection == 540) {    /* save sensor table */
            make_name(fixed_name, map_ptr->mapName, ".fix");
            save_fixed_sensors(fixed_name, fixed_tab);
        }
        else if (selection == 600) {
            if ((dbox = OpenDialog(trans_dialog, 50, 30, NORMAL)) != NULL) {
                status = EditDialog(dbox);
                if (status != CANCEL_BUTTON) {
                    if (trans_val >= 0 && trans_val < 128)
                        edit_value = trans_val;
                    text_foreground(IWHITE);  text_background(BLACK);
                    PutString(15, 67, conv_value2str(edit_value));
                }
                CloseDialog(dbox);
            }
        }
        else if (selection == 9999) {
            /* If the current internal memory file has been edited then
             * see if the user wants to save the current map first.
             */
            if (file_edited) Confirm(map_ptr);
            doneFlg = YES;
        }
        else if (selection >= 0 && selection < 256) {   /* map color */
            edit_value = (int) selection;
            text_foreground(IWHITE);  text_background(BLACK);
            PutString(15, 67, conv_value2str(edit_value));
        }
        else if (selection == 9000) {           /* zoom in */
                mouse_off();
                mapc_off(&mapc);
                zoomIn(map_ptr, 0,15, 528,gdmaxrow-15);
                mapc_on(&mapc);
                mouse_on();
        }
        else if (selection == 9010) {           /* zoom out */
                mouse_off();
                mapc_off(&mapc);
                zoomout(map_ptr, 0,15, 528,gdmaxrow-15);
                mapc_on(&mapc);
                mouse_on();
        }
        else if (selection == 9020) {           /* zoom all */
                mouse_off();
                mapc_off(&mapc);
                zoomall(map_ptr, 0,15, 528,gdmaxrow-15);
                mapc_on(&mapc);
                mouse_on();
        }
        if (event_occurred) {           /* if an event occured, clean up screen
  */
                mouse_off();
                gpviewport(0,0, gdmaxcol, gdmaxrow);
                pmenu = RegisterMenu(map_edit_bar);
                draw_menu(pmenu);
                mouse_on();
        }

    }
    while (!doneFlg);
```

```
    remove_icon_traps();
    mapc_deinit(&mapc);
    free_fixed_sensors(fixed_tab);
    gpviewport(0,0, gdmaxcol, gdmaxrow);
}


static int trap1, trap2, trap3;

/* draw_icons - draw the icons for Point, Line and Rectangle modes.  If
 *      called with <settrap> non-zero, then the mouse traps for the icons
 *      are installed.
 */
void draw_icons(settrap)
int settrap;
{
        mouse_off();
        gpcolor(BLACK);
        gpclear(545,17, 639, 41);

        /* Draw the drawing mode icons and set the mouse traps */
        gpmove(545,18);
        gpmovmtg(point_icon, 29, 23, 15);

        gpmove(577, 18);
        gpmovmtg(line_icon, 29, 23, 15);

        gpmove(609, 18);
        gpmovmtg(rect_icon, 29, 23, 15);

        if (settrap) {
                trap1 = SetMouseTrap(545,18, 574,41, 'P');
                trap2 = SetMouseTrap(577,18, 606,41, 'L');
                trap3 = SetMouseTrap(609,18, 638,41, 'R');
        }

        gpcolor(YELLOW);
        switch (draw_mode) {
        case POINT:
                gpmove(544, 17);
                gprect(574,41);
                break;
        case LINE:
                gpmove(576, 17);
                gprect(606, 41);
                break;
        case RECT:
                gpmove(608, 17);
                gprect(638, 41);
                break;
        };
        mouse_on();
}


void remove_icon_traps()
{
        RemoveMouseTrap(trap1);
        RemoveMouseTrap(trap2);
        RemoveMouseTrap(trap3);
}

int mod_map_parms(map_ptr)
map *map_ptr;
{
        char    str[80], prompt[80];

        sprintf(prompt, "X map offset [%d]: ", map_ptr->xmapoff);
        if (ggets(str, prompt, "") == NULL)
            return (OK);
        if (str[0])
                map_ptr->xmapoff = atoi(str);
        sprintf(prompt, "Y map offset [%d]: ", map_ptr->ymapoff);
```

```
        if (ggets(str, prompt, "") == NULL)
            return (OK);
        if (str[0])
                map_ptr->ymapoff = atoi(str);
        sprintf(prompt, "Map name [%s]: ", map_ptr->mapName);
        if (ggets(str, prompt, "") == NULL)
            return (OK);
        if (str[0])
                strcpy(map_ptr->mapName, str);
        return (OK);
}




get_virtual_point(map_ptr, mapx, mapy)
map *map_ptr;
int mapx, mapy;
{
        int             status;
        int             dx, dy;
        MAPC_STRUCT     mapc;
        DIALOG          *dbox;
        VIRT_TYPE       *vpoint;

        mapx = (mapx + map_ptr->xmapoff) * map_ptr->squaresize;
        mapy = (mapy + map_ptr->ymapoff) * map_ptr->squaresize;

        sprintf(source_x, "%3d'%d\"", mapx/12, iabs(mapx%12));
        sprintf(source_y, "%3d'%d\"", mapy/12, iabs(mapy%12));
        while ((dbox = OpenDialog(virt_dialog, 50, 30, NORMAL)) != NULL) {
                status = EditDialog(dbox);
                CloseDialog(dbox);
                mouse_off();
                if ((status & 0x000f) == 6) {           /* "Use Mouse" button *
/
                        mapc_init(&mapc, map_ptr, LGREEN, IWHITE);
                        status = map_get_point(&mapc, &dx, &dy, YES);
                        if (status == OK) {
                                mapx = (dx + map_ptr->xmapoff) * map_ptr->squar
esize;
                                mapy = (dy + map_ptr->ymapoff) * map_ptr->squar
esize;
                                sprintf(dest_x, "%3d'%d\"", mapx/12, iabs(mapx%
12));
                                sprintf(dest_y, "%3d'%d\"", mapy/12, iabs(mapy%
12));
                        }
                        mapc_deinit(&mapc);
                        mouse_on();
                        continue;
                }
                if (status != CANCEL_BUTTON) {
                    mapx = sget_map_coord(source_x, map_ptr->squaresize, map_pt
r->xmapoff);
                    mapy = sget_map_coord(source_y, map_ptr->squaresize, map_pt
r->ymapoff);

                    if (mapx >= 0 && mapx < map_ptr->width &&
                        mapy >= 0 && mapy < map_ptr->height)
                            floor(mapx, mapy, map_ptr) = VIRTUALPOINT;
                    if (mapx >= map_ptr->lx && mapx <= map_ptr->ux &&
                        mapy >= map_ptr->ly && mapy <= map_ptr->uy)
                            ScalePoint(map_ptr, mapx, mapy, get_obj_color(VIRTU
ALPOINT));

                    if (map_ptr->nvpaths == 0) {
                        map_ptr->vpaths = (VIRT_TYPE *) malloc(sizeof(VIRT_TYPE
));
                    }
                    else {
                        map_ptr->vpaths = (VIRT_TYPE *) realloc(map_ptr->vpaths
, sizeof(VIRT_TYPE) * (map_ptr->nvpaths+1));
```

```
                    }
                    if (map_ptr->vpaths == (VIRT_TYPE *) NULL) {
                        errorbox("Not enough memory to add virtual point.");
                        mouse_on();
                        break;
                    }
                    vpoint = &map_ptr->vpaths[map_ptr->nvpaths];
                    memset(vpoint->source_name, 0, sizeof(vpoint->source_name))
;
                    memset(vpoint->dest_name, 0, sizeof(vpoint->dest_name));
                    strcpy(vpoint->source_name, source_name);
                    strcpy(vpoint->dest_name, dest_name);
                    vpoint->startx = mapx;
                    vpoint->starty = mapy;
                    mapx = sget_map_coord(dest_x, map_ptr->squaresize, map_ptr-
>xmapoff);
                    mapy = sget_map_coord(dest_y, map_ptr->squaresize, map_ptr-
>ymapoff);

                    if (mapx >= 0 && mapx < map_ptr->width &&
                        mapy >= 0 && mapy < map_ptr->height)
                            floor(mapx, mapy, map_ptr) = VIRTUALPOINT;
                    if (mapx >= map_ptr->lx && mapx <= map_ptr->ux &&
                        mapy >= map_ptr->ly && mapy <= map_ptr->uy)
                            ScalePoint(map_ptr, mapx, mapy, get_obj_color(VIRTU
ALPOINT));

                    vpoint->destx = mapx;
                    vpoint->desty = mapy;
                    vpoint->dist = 0;
                    vpoint->disabled = NO;
                    map_ptr->nvpaths++;
                }
                mouse_on();
                break;
        }
        return (OK);
}


get_door_info(map_ptr, mapx, mapy)
map *map_ptr;
int mapx, mapy;
{
        char            *cp;
        int             status;
        MAPC_STRUCT     mapc;
        DIALOG          *dbox;
        DOOR_TYPE       *vdoor;

        mapx = (mapx + map_ptr->xmapoff) * map_ptr->squaresize;
        mapy = (mapy + map_ptr->ymapoff) * map_ptr->squaresize;

        sprintf(sdoor_x, "%3d'%d\"", mapx/12, iabs(mapx%12));
        sprintf(sdoor_y, "%3d'%d\"", mapy/12, iabs(mapy%12));
        while ((dbox = OpenDialog(door_dialog, 50, 30, NORMAL)) != NULL) {
                status = EditDialog(dbox);
                CloseDialog(dbox);
                mouse_off();
                if (status != CANCEL_BUTTON) {
                    mapx = sget_map_coord(sdoor_x, map_ptr->squaresize, map_ptr
->xmapoff);
                    mapy = sget_map_coord(sdoor_y, map_ptr->squaresize, map_ptr
->ymapoff);

                    if (mapx >= 0 && mapx < map_ptr->width &&
                        mapy >= 0 && mapy < map_ptr->height)
                            floor(mapx, mapy, map_ptr) = DOOR;
                    if (mapx >= map_ptr->lx && mapx <= map_ptr->ux &&
                        mapy >= map_ptr->ly && mapy <= map_ptr->uy)
                            ScalePoint(map_ptr, mapx, mapy, get_obj_color(DOOR)
);
```

```
                        if (map_ptr->ndoors == 0) {
                            map_ptr->doors = (DOOR_TYPE *) malloc(sizeof(DOOR_TYPE)
);
                        }
                        else {
                            map_ptr->doors = (DOOR_TYPE *) realloc(map_ptr->doors,
sizeof(DOOR_TYPE) * (map_ptr->ndoors+1));
                        }
                        if (map_ptr->doors == (DOOR_TYPE *) NULL) {
                            errorbox("Not enough memory to add a door.");
                            mouse_on();
                            break;
                        }
                        vdoor = &map_ptr->doors[map_ptr->ndoors];
                        strcpy(vdoor->map_name, sdoor_mapname);
                        vdoor->doorx = mapx;
                        vdoor->doory = mapy;

                        vdoor->door_index = atoi(sdoor_ix);
                        vdoor->probability = atof(sdoor_prob) * 100.0 + 0.5;
                        cp = skipblank(sdoor_state);
                        if (*cp == 'o' || *cp == 'O')
                            vdoor->state = 0;
                        else if (*cp == 'c' || *cp == 'C')
                            vdoor->state = 1;
                        else
                            vdoor->state = 2;
                        vdoor->doorid = atoi(sdoor_id);
                        map_ptr->ndoors++;
                    }
                    mouse_on();
                    break;
            }
            return (OK);
}
```

```
/*************************************************************************
*****
* minimize_turns - uses parameters from Cut_Path_Corners
*         to minimize the turns in a path. It does this by repre-
*         -senting four inflection points into two lines. By finding
*         the intersection of the two lines, therefore, the turns are
*         eliminated.
*
* Call:             minimize_turns(map_ptr,inflection_list,pnpoints)
*
* where:            map_ptr  = (int) => a structure containing information
*                   about the map (height,width,scale,..etc).
*
*                   inflection_list = (int) => an array containing XY_PAIR
*                   of a inflection list.
*
*                   pnpoints = (int) => the total number of inflection points
*                   in a path.
*
* Returns:          If intersection points have been found and have passed lengh
t_
*                   of_new_line, check_boundary, and check_for_obstacle  routine
 then
*                   a new inflection list is created and pnpointz is updated.
*
* Author:           Hoai Nguyen
*
* Date:             12/22/89
*
*************************************************************************
*****/
#include <stdio.h>
#include <ega.h>
#include <math.h>

#include "headers/ibmio.h"


static int six_sq;


minimize_turns(map_ptr, inflection_list, pnpoints)
map     *map_ptr;
XY_PAIR *inflection_list;
int *pnpoints;

{
  int ipl,x0,y0,x1,y1,x2,y2,x3,y3;
  int ix,iy,six;

    if (*pnpoints>=4) {

       six= 72/map_ptr->squaresize;     /* set six feet to be the limmit path *
/
       six_sq= six*six;                 /* for finding intersection points    *
/
                                        /* see check_line_length routine      *
/

       for (ipl=1; ipl<=*pnpoints-3; ipl++) {

          x0= inflection_list[ipl-1].x;
          y0= inflection_list[ipl-1].y;     /* fours pairs of inflection points
 */
          x1= inflection_list[ipl].x;       /* are needed to form two lines
 */
          y1= inflection_list[ipl].y;
          x2= inflection_list[ipl+1].x;
          y2= inflection_list[ipl+1].y;
          x3= inflection_list[ipl+2].x;
          y3= inflection_list[ipl+2].y;

```

```
          if (check_line_length(x1,y1,x2,y2)) {

            if (find_intersection(inflection_list,ipl,&ix,&iy)) {

              if (length_of_new_line(x0,y0,x1,y1,x2,y2,x3,y3,ix,iy)) {

                if (check_boundary(map_ptr,ix,iy)) {

                  if (check_for_obstacle(x1,y1,x2,y2,ix,iy,map_ptr)) {

                      update_inflection_list(inflection_list,pnpoints,ipl,ix,iy
);

                      ipl--;  /* is decremented so that the intersection points
 (ix,iy) */
                              /* will be the second pair(x1,y1), when the progr
am      */
                              /* repeats
        */

                  }
                }
              }
            }
          }
       }
     return (0);
}

/*********************************************************************
* check_line_length - checks the path length before finding in-
*         -tersection. This routine is neccessary because if the length
*         is long the intersection points will be far off, therefore,
*         making new path length too long. It's set to six feet.
**********************************************************************/
check_line_length(x1,y1,x2,y2)
int x1,y1,x2,y2;

{
        long d,h,len_sq;
        d = x2-x1;
        h = y2-y1;
        len_sq = d*d + h*h;    /* square length of the path */

        if (len_sq<=six_sq)

                return(1);

        else
                return(0);


}

/*************************************************************************
*  find_intersection - calculates the intersection of two lines.
*        There are special cases for finding the intersection. For example,
*        normal(n) are lines with slope not equal to zero or infinity,
*        vertical(v) are lines with zero slope, and horizontal are lines
*        with infinite slope.
*
* Call:
*              find_intersection(inflection_list,ipl,pnx,pny)
*
* where:       inflection_list =(int) => an array containing XY_PAIR
*              points
*
*              ipl =(int) => a counter for accessing consecutive pairs
*              of points in a inflection_list
*
*              pnx and pny =(int) => are addresses of ix and iy
```

Apr 04 1991 09:42:25 minturns.c Page 3

```
*
* Returns:    The value of a intersection pair is stored in ix and ly.
*
*
*****************************************************************************/
find_intersection(inflection_list,ipl,pnx,pny)

XY_PAIR *inflection_list;
int *pnx,*pny;
int ipl;
{
        int xa,xb,xc,xd;
        int ya,yb,yc,yd;
        int dx1,dx2,dy1,dy2;
        double m1,m2,b2,b1;
        int vn,nv,hn,nh,normal;


        xa = inflection_list[ipl-1].x;
        ya = inflection_list[ipl-1].y;
        xb = inflection_list[ipl].x;
        yb = inflection_list[ipl].y;
        xc = inflection_list[ipl+1].x;
        yc = inflection_list[ipl+1].y;
        xd = inflection_list[ipl+2].x;
        yd = inflection_list[ipl+2].y;

        print_inflection_pt(xa,ya,xb,yb,xc,yc,xd,yd); /* use for debugging */

        dx1= xb-xa;       /* change in X coordinate */
        dx2= xd-xc;
        dy1= yb-ya;       /* change in Y coordinate */
        dy2= yd-yc;

        vn= !dx1 && dx2 && dy2;   /* a vertical and a normal lines  */
        hn= !dy1 && dx2 && dy2;   /* a horizonal and a normal lines */

        nv= !dx2 && dx1 && dy1;   /* a normal and a vertical lines  */
        nh= !dy2 && dx1 && dy1;   /* a normal and a horizonal lines */

        normal= dx1 && dy1 && dx2 && dy2;  /* two normal lines      */

        /* THE ABOVE FIVE STATEMENTS SHOULD BE IN THE ELSE-IF STATEMENTS */
        /* BELOW, BUT FOR SOME REASONS IT DOES NOT WORK.                 */


        if (!(dx1||dy2)) {

                        /* intersection points for vertical and horizonal lin
es */

                *pnx= xb;
                *pny= yc;
                prn_nw_p(pnx,pny);   /* print intersection points (use for debu
gging) */
#ifdef DEBUG
                printf(" vh ");
#endif
                return(1);
        }

        else if(!(dx2||dy1)) {

                        /* intersection points for horizonal and vertical line
s */

                *pnx= xc;
                *pny= yb;
                prn_nw_p(pnx,pny);
#ifdef DEBUG
                printf(" hv ");
#endif
                return(1);
```

Apr 04 1991 09:42:25 minturns.c Page 4

```
        }
        else if(normal) {

                        /* intersection points for two normal lines */

                m1=(double) dy1/dx1;    /* slope of a line  */
                m2=(double) dy2/dx2;

                b1= -(xb*m1)+yb;        /* b intersection  of a line y= mx + b
*/
                b2= -(xc*m2)+yc;

                        /* check for parallel lines */

                if (fabs(m2-m1) > .001) {

                        *pnx= (int) ((-b1+b2)/(m1-m2));       /* intersection p
air (pnx,pny) */
                        *pny= (int) (m1*(-b1+b2)/(m1-m2)+b1);

                        prn_nw_p(pnx,pny);
#ifdef DEBUG
                        printf(" normal ");
#endif
                        return(1);
                }
                else
                        return(0);
        }
        else if (vn) {

                        /* intersection points for vertical and normal lines *
/

                m2=(double) dy2/dx2;
                b2= -(m2*xc)+yc;

                *pnx=xb;
                *pny= (int) ((m2*xb)+b2);

                prn_nw_p(pnx,pny);
#ifdef DEBUG
                printf(" vn ");
#endif
                return(1);
        }

        else if (hn) {

                        /* intersection points for horizontal and normal lines
*/

                m2=(double) dy2/dx2;
                b2= -(m2*xc)+yc;

                *pnx= (int) ((yb-b2)/m2);
                *pny=yb;

                prn_nw_p(pnx,pny);
#ifdef DEBUG
                printf(" hn ");
#endif

                return(1);
        }

        else if (nv) {

                        /* intersection points for normal and vertical lines */

                m1=(double) dy1/dx1;
                b1=-(m1*xb)+yb;
```

```
                    *pnx=xc;
                    *pny= (int) ((ml*xc)+bl);
                    prn_nw_p(pnx,pny);
#ifdef DEBUG
                    printf(" nv ");
#endif
                    return(1);
            }

        else if (nh) {

                        /* intersection points for normal and horizontal lines */


                    ml=(double) dyl/dxl;
                    bl=-(ml*xb)+yb;

                    *pnx= (int) ((yc-bl)/ml);
                    *pny= yc;
                    prn_nw_p(pnx,pny);
#ifdef DEBUG
                    printf(" nh ");
#endif
                    return(1);

        }
        else
                    return(0);
}

/****************************************************************
*    check_boundary - makes sure at the intersection points are
*         in the map boundary.
****************************************************************/
check_boundary(map_ptr,x,y)
map *map_ptr;
int x,y;
{
        int width,height;

        width= map_ptr->width;
        height= map_ptr->height;

        if (x < 0 || x > width || y < 0 || y > height)
                return (0);
        return (1);
}


/******************************************************************
*     length_of_new_line - compares the old paths to the new paths.
*   If neither path one ( from (x1,y1) to (ix,iy)) or path two
*   (from (ix,iy) to (x2,y2)) is less than 130 percent of the
*   old paths from (x0,y0) to (x1,y1) or  from (x2,y2) to (x3,y3)
*   then check to see if both new paths are under 190 percent. If
*   both new paths are 190 under return a one. If they are not then
*   return a zero.
******************************************************************/
length_of_new_line(x0,y0,x1,y1,x2,y2,x3,y3,ix,iy)
int x0,y0,x1,y1,x2,y2,x3,y3,ix,iy;
{
        long x_sq1,y_sq1,x_sq2,y_sq2,nx1,ny1,nx2,ny2,old1,old2;
        double new1,new2,per1,per2,per3,per4;

        x_sq1= ((long)x0-x1)*(x0-x1);
        y_sq1= ((long)y0-y1)*(y0-y1);
        x_sq2= ((long)x2-x3)*(x2-x3);
        y_sq2= ((long)y3-y2)*(y3-y2);
        nx1  = ((long)ix-x1)*(ix-x1);
        ny1  = ((long)iy-y1)*(iy-y1);
        nx2  = ((long)x2-ix)*(x2-ix);
        ny2  = ((long)y2-iy)*(y2-iy);

```

```
        old1 = (x_sq1 + y_sq1);         /* finding length of old paths */
        old2 = (x_sq2 + y_sq2);

        new1 = ( nx1  +  ny1 );         /* finding length of new paths */
        new2 = ( nx2  +  ny2 );

        per1= 1.3*old1;                 /* set 130% for comparation to new paths
*/
        per2= 1.3*old2;

        per3= 1.90*old1;                /* set 190% for comparation to new paths
*/
        per4= 1.90*old2;

#ifdef DEBUG
        printf("\n%.4f<%.4f %.4f<%.4f ",new1,per1,new2,per2);
#endif
                        /* is neither new path less than 130% of old path ? *
/
                        /* are both new paths greater less that 190% of old p
aths ? */

        if ( (new1<per1) || (new2<per2) ) {
           if ( (new1<per3) && (new2<per4) ) {

                return(1);
           }
           else
                return(0);
        }
        else
             return(0);

}
/****************************************************************
* check_for_obstacle - detects any obstacles going form (x1,y1)
*        to intersection points(newx,newy) and from (newx,newy) to
*        (x2,y2).
*
* Call:       check_for_obstacle(x1,y1,x2,y2,newx,newy,map_ptr)
*
* where:      init_line(&line,x1,y1,newx,newy) a subroutine that intialized
*             the starting point when checking for obstacles.
*
*             get_line_point(&line) checks for the last inflection pair.
*             If It returns a one then end_of_line.
*
*             floor(line.x,line.y,map_ptr) assigns  numbers to
*             different types of obstacles it encounters. Otherwise,
*             it will return a zero.
*
*
* Return:     Zero is returned if there is an obstacle in the way.
*
****************************************************************/
check_for_obstacle(x1,y1,x2,y2,newx,newy,map_ptr)
int x1,y1,x2,y2;
int newx,newy;
map *map_ptr;
{

        int n,m,fi1,fi2;
        LINE_TYPE line;
        int end_of_line1,end_of_line2;

        init_line(&line,x1,y1,newx,newy);

        do {
                end_of_line1= get_line_point(&line);
                if (end_of_line1) {
#ifdef DEBUG
                        printf("clear1");
#endif
```

Apr 04 1991 09:42:25 minturns.c Page 7

```
                        n=1;   /* n= 1 the path is cleared then break and check
   */
                               /* the second path */

                        break;
                    }
                    fl1=floor(line.x,line.y,map_ptr);

                    n=0;            /* n= 0 then a obstacle  is in the way of the */
                                    /* path (returns a zero) */

#ifdef DEBUG
                    printf("fl1=%x ",fl1);
                    printf("l.x=%d l.y=%d\n",line.x,line.y);
#endif
                    if (fl1 == STRIPE) {
                        if ((line.x == x1 && line.y == y1) ||
                            (line.x == x2 && line.y == y2))
                                fl1 = CLEAR;
                    }
            } while(fl1==CLEAR || fl1 == FATMARKER || fl1 == THINMARKER || fl1 == V
IRTUALPOINT);

            if (n==1) {

                    init_line(&line,newx,newy,x2,y2);
                    do {
                        end_of_line2= get_line_point(&line);
                        if(end_of_line2){
#ifdef DEBUG
                                printf("clear2");
#endif
                                m=1;  /* m= 1  the path is cleared then break *
/
                                       /* (returns a one) */

                                break;
                        }
                        fl2=floor(line.x,line.y,map_ptr);

                        m=0;          /* m= 0 obstacle in the way (returns a zer
o) */
#ifdef DEBUG
                        printf("fl2=%x ",fl2);
                        printf("l.x=%d l.y=%d\n",line.x,line.y);
#endif
                        if (fl2 == STRIPE) {
                                if ((line.x == x1 && line.y == y1) ||
                                    (line.x == x2 && line.y == y2))
                                        fl2 = CLEAR;
                        }
                    } while(fl2==CLEAR || fl2 == FATMARKER || fl2 == THINMARKER ||
fl2 == VIRTUALPOINT);

                    if (m==1)
                        return(1);
                    else
#ifdef DEBUG
                        printf(" not clear2");
#endif
                        return(0);
            }

            else
#ifdef DEBUG
                    printf(" not clear1");
#endif
                    return(0);
}

/***************************************************************************
* update_inflection_list - does two things. One, it puts
```

Apr 04 1991 09:42:25 minturns.c Page 8

```
*       the intersection points(ix,iy) in the inflection list.
*       This is accomplished by  replacing (xb,yb) in find intersection
*       routine with (ix,iy) and move everything in the inflection
*       list array down by one [(xc,yc) is recplaced by (xd,yd) and so on].
*       Second, it updates the number of inflection points by
*       decrement pnpoints.
*
****************************************************************************/
update_inflection_list(inflection_list,pnpoints,ipl,ix,iy)
XY_PAIR *inflection_list;
int ipl;
int ix,iy,*pnpoints;
{
        int i;

        inflection_list[ipl].x = ix;
        inflection_list[ipl].y = iy;
        for(i=ipl;i<=*pnpoints-3;i++) {

                inflection_list[i+1]=inflection_list[i+2];
#ifdef DEBUG
                printf("p=%d",*pnpoints);
#endif
        }
                (*pnpoints)--;  /* decrement number of inflection points */


#ifdef DEBUG
        printf("pnpoints=%d",*pnpoints);
#endif
        return (0);
}

/*************************************************************/
delay()

{
#ifdef DEBUG
        int pd1,pd2,pd3,d;


        for(pd1=0;pd1<=10;pd1++)

         for(pd2=0;pd2<=10;pd2++)

          for(pd3=0;pd3<=700;pd3++)
                d=0;
#endif
        return (0);
}
/*************************************************************/
/*lint -e715 */
print_inflection_pt(xa,ya,xb,yb,xc,yc,xd,yd)
int xa,ya,xb,yb,xc,yc,yd,xd;
{
#ifdef DEBUG

        printf("\n(%d,%d)  (%d,%d)   (%d,%d)  (%d,%d)",xa,ya,
                xb,yb,xc,yc,xd,yd);
#endif
        return (0);
}

/*************************************************************/
prn_nw_p(px,py)
int *px,*py;
{
#ifdef DEBUG
        printf(" newp(%d,%d)",*px,*py);

#endif
        return (0);
}
```

```
/*lint +e715 */
```

```
/*********************************************************************
 *                       Obstacle Avoidance Stuff                    *
 *********************************************************************
 * The routines in this file handle obstacle avoidance maneuvers.    *
 *                                                                   *
 *********************************************************************/

#include <stdio.h>
#include <malloc.h>
#include <stdlib.h>
#include <ega.h>
#include <event.h>

#include "headers/ibmio.h"


extern drType   robart;

int     oa_override = 0;        /* override minimum obstacle detection distance
 */
int     avoid_wait = NO;        /* wait for user to hit a key before executing
                                 * the avoidance maneuver
                                 */
extern int demo_mode;           /* YES => in demo mode, so display more
                                 * information while executing/planning
                                 * paths.
                                 */
extern int      robot_type;
extern long     robotx, roboty, robothdg;


/* avoid - plan a path around the current obstacle.  Keep trying to go
 *      to the destination until we get there, get within 3", or the
 *      path planning operation fails.
 *
 * Call with:
 *      map_ptr                 = (map *) current map
 *      use_global_planner      = (int) 1 => use global path planner
 *      path                    = (PATHSEG *) list of path segments being execu
ted
 *      nsegs                   = (int) number of path segments in <path>
 *      dest_index              = (int) how far we got along the path list
 *                                until we ran into an obstacle.
 *
 * Returns:
 *      OK      if obstacle successfully avoided
 *      !OK     if couldn't find a way around it
 */
avoid(map_ptr, use_global_planner, path, nsegs, dest_index)
map *map_ptr;
int use_global_planner;
PATHSEG *path;
int nsegs, dest_index;
{
        char            str[80];
        byte            *bp;
        int             sqsize;
        int             status;
        int             curseg;
        int             destx, desty;
        int             ii, jj;
        int             npoints;
        int             sq_per_6_inches;        /* number of map squares per 6
inches */
        int             x, y;
        int             xstart, xlim, ystart, ylim;
        int             newnsegs;
        XY_PAIR         *avoid_list;
        map             tmap;
        PATHSEG         *newpath;

        /* Compact the current inflection list, getting rid of those
         * points that have already been traversed.
```

```
         */
        for (ii = 0, jj = dest_index; jj < nsegs; ii++, jj++) {
                path[ii] = path[jj];
        }
        nsegs -= dest_index;

        destx = path[0].x2;
        desty = path[0].y2;

        /* If robot really already at destination, don't try to plan another
         * path.
         */
        if ((destx == robart.x) && (desty == robart.y))
                goto continue_path;

avoid_again:

        /* Clear out the area occupied by the robot.  We make the incorrect
         * assumption that the robot occupies a square 12" on a side.  This
         * area surrounding (robart.x,robart.y) is cleared to 0
         */
        sq_per_6_inches = 6 / map_ptr->squaresize;
        xstart = robart.x - sq_per_6_inches;
        xlim = robart.x + sq_per_6_inches;
        ystart = robart.x - sq_per_6_inches;
        ylim = robart.x + sq_per_6_inches;
        for (x = xstart; x <= xlim; x++) {
                for (y = ystart; y <= ylim; y++) {
                        bp = map_ptr->mem_ptr + x + y*map_ptr->width;
                        if (*bp && *bp < 128)   /* clear only sonar returns */
                                *bp = 0;
                }
        }

        /* Bring the obstacle avoidance envelope in.  We probably have enough
         * clearance, we just need to decrease it temporarily so we don't
         * immediately run in to the object we're trying to avoid.
         */
        if (oa_override == 0) {         /* first time in avoid maneuver */
                oa_override = 4;
        }

        sqsize = map_ptr->squaresize;
        Clear_Line(1);
        Clear_Line(2);
        sprintf(str, "Obstacle at (%d, %d), (%d' %d\", %d' %d\")",
                        robart.x, robart.y, (robart.x*sqsize)/12,
                        (robart.x*sqsize)%12, (robart.y*sqsize)/12,
                        (robart.y*sqsize)%12);
        PutString(1,1, str);

        /* Grow the map 3 times to allow a buffer zone around any objects */
        inc_map(map_ptr, 1);
        grow_oa_map(map_ptr);
        inc_map(map_ptr, 1);
        grow_oa_map(map_ptr);
        inc_map(map_ptr, 1);
        grow_oa_map(map_ptr);

        /* Set up a temporary map for the path planner */
        tmap.mem_ptr = NULL;
        if (Copy_Floor_Map(map_ptr, &tmap, -1) == ERROR) {      /* copy the cur
rent map */
                /*lint -e506 */
                inc_map(map_ptr, -3);
                return (!OK);
                /*lint +e506 */
        }

        /* Clear out the area occupied by the robot.  We make the incorrect
         * assumption that the robot occupies a square 12" on a side.  This
         * area surrounding (robart.x,robart.y) is cleared to 0
         */
```

```
        sq_per_6_inches = 6 / map_ptr->squaresize;
        xstart = robart.x - sq_per_6_inches;
        xlim = robart.x + sq_per_6_inches;
        ystart = robart.x - sq_per_6_inches;
        ylim = robart.x + sq_per_6_inches;
        for (x = xstart; x <= xlim; x++) {
                for (y = ystart; y <= ylim; y++) {
                        bp = map_ptr->mem_ptr + x + y*map_ptr->width;
                        if (*bp && *bp < 128)   /* clear only sonar returns */
                                *bp = 0;
                }
        }

        if (demo_mode)
                DrawSFloorMap(&tmap, WHITE, BLUE, GREEN);       /* draw it on s
creen */

        /* Prepare an inflection list for the avoidance path */
        avoid_list = (XY_PAIR *) malloc(200 * sizeof(XY_PAIR));
        if (avoid_list == NULL) {
            Clear_Line(1);
            PutString(1,1, "Can't allocate space for avoid_list -->");
            mgetkey();
            free(tmap.mem_ptr);
            inc_map(map_ptr, -3);
            /*lint -e506 */
            return (!OK);
            /*lint +e506 */
        }


        /* Plunk the starting and ending points into the map */
        floor(robart.x, robart.y, &tmap) = START;
        floor(destx, desty, &tmap) = DEST;
        if (demo_mode) {
                ScalePoint(map_ptr, robart.x, robart.y, BLUE);
                ScalePoint(map_ptr, destx, desty, BLUE);
        }

        Clear_Line(1);  PutString(1,1, "Finding avoidance path...");
        /* Find a path to the destination */
        if (use_global_planner)
                status = global_planner(&tmap, robart.x, robart.y, &destx, &des
ty, demo_mode);
        else
                status =   Expand_Slime(&tmap, robart.x, robart.y, &destx, &des
ty, demo_mode);

        if (status == 0) {      /* no path found? */
                Clear_Line(1);
                PutString(1,1, "avoid: Unable to find a path -->");
                mgetkey();
                free(tmap.mem_ptr);
                inc_map(map_ptr, -3);
                /*lint -e506 */
                return (!OK);
                /*lint +e506 */
        }

        /* Path found, retrace steps back to the beginning and trim off any
         * unecessary turns.
         */
        if ((robart.x == destx) && (robart.y == desty)) {
                free(tmap.mem_ptr);
                goto continue_path;
        }
        status = Find_Path(&tmap, avoid_list, &npoints, robart.x, robart.y, des
tx, desty);
        /*lint -e506 */
        if (status != OK) return (!OK);
        /*lint +e506 */
        if (demo_mode) {
                Clear_Line(1);
```

```
                PutString(1,1, "Reducing inflection points...");
        }
        npoints++;

        free(tmap.mem_ptr);
        tmap.mem_ptr = NULL;

        Cut_Path_Corners(map_ptr, avoid_list, &npoints);
        minimize_turns(map_ptr, avoid_list, &npoints);

        DrawSFloorMap(map_ptr, WHITE, BLUE, GREEN);

        Draw_Inflection_List_Path(map_ptr, avoid_list, npoints, IWHITE);


        if (avoid_wait) {
                Clear_Line(1);
                PutString(1,1, "Hit a key to execute the path -->");
                if (mgetkey() == ESC)
                        /*lint -e506 */
                        return (!OK);
                        /*lint +e506 */
                Clear_Line(1);
        }

        /* Split path up into stripe and non-stripe segments */
        newpath = segment_path(map_ptr, avoid_list, npoints, &newnsegs);
        free(avoid_list);

        if (newpath == (PATHSEG *) NULL) {
                gstatus("Couldn't segment path -->"); mgetkey();
        }
        else {
            /* Execute the path around the obstacle */
            status = execute_path(map_ptr, newpath, newnsegs, &curseg);
            free(newpath);

            if (status != OK) {
                goto avoid_again;
#if 0
                if (avoid(map_ptr, use_global_planner, avoid_list, npoints, cur
seg) == !OK) {
                        return (!OK);
                }
#endif
            }
        }

        /* Now continue with the rest of the original path */
continue_path:
        oa_override = 0;                /* extend OA feelers again */
        if (nsegs > 1) {
            /* The path has already been truncated to the current segment.
             * Need to throw away the current segment and continue on with
             * the rest of the segments.
             */
            for (ii = 0, jj = 1; jj < nsegs; ii++, jj++) {
                path[ii] = path[jj];
            }
            nsegs--;

            status = execute_path(map_ptr, path, nsegs, &curseg);
            if (status != OK) {
                /*lint -e506 -e731 */
                if (avoid(map_ptr, use_global_planner, path, nsegs, curseg) ==
!OK) {
                        return (!OK);
                }
                /*lint +e506 +e731 */
            }
        }
        oa_override = 0;                /* turn off override */
        return (OK);
```

Apr 04 1991 09:42:25 O8.C Page 5

283 }

```
#if 0
_setargv() {}   /* environment too large!!? */
_setenvp() {}   /* remove if any calls to spawn() or exec() are made */
#endif

/************************************************************************
* Robart.c is the top level module for the higher-level IBM software. It
* contains the start of execution ("main") and routines which draw the main
* menu and dispatch menu choices.
*************************************************************************/
#include <stdio.h>
#include <io.h>
#include <string.h>
#include <fcntl.h>
#include <math.h>
#include <ega.h>
#include <syscolor.h>
#include <event.h>
#include <menu.h>
#include <dialog.h>

#include "headers/ibmio.h"
#include "headers/serial.h"

#ifndef ALTP
#define ALTP            0x1900
#endif
#ifndef ALTB
#define ALTB            0x3000
#endif
#ifndef ALTC
#define ALTC            0x2e00
#endif
#ifndef ALTD
#define ALTD            0x2000
#endif
#ifndef ALTH
#define ALTH            0x2300
#endif

#ifndef PI
#define PI   3.14159265358979323846
#endif


FILE *debug_fd = NULL;
int debug_mode = NO;
int paranoid   = NO;
int ser_disable = NO;
int robot_type = 0;              /* No robot yet */
int stripe_offset = 150;         /* offset of stripe from center of robot (in,
                                  * tenths of inches). Set when robot is
                                  * powered up.
                                  */
char robot_name[80] = "Not initialized";

/*lint -e708 -e570 */
DIALOG_ITEM about_dialog[] = {
        { 0, 15, 208, STRING, DIALOG_FORE, TRANSPARENT, "Robart II Control Soft
ware"},
        {56, 43,  96, STRING, DIALOG_FORE, TRANSPARENT, "Version 2.10"},
        {36, 57, 136, STRING, DIALOG_FORE, TRANSPARENT, "December 19, 1990"},
        {30, 80,  48, STRING, DIALOG_FORE, TRANSPARENT, "Robot:"},
        {86, 80,  80, STRING, DIALOG_FORE, TRANSPARENT, robot_name},
        {70,118,  67, OK_BUTTON|DEFAULT_BUTTON, DIALOG_FORE, TRANSPARENT, 0},
        {-1, -1, -1, TEXT, DIALOG_FORE, TRANSPARENT, NULL}
};
/*lint +e708 +e570 */

/* Define all the menus and sub-menus for the main menu */
MENU_ITEM connect_menu[] = {
        {"Power up", 0, 201, 0, NULL},
        {"Power Down", 0, 202, 0, NULL},
```

```
        {NULL, 0, 0, 0, NULL}
};

byte check_test = 1, char_test = 'A';
byte uchar_test = 240;
int int_test = 100;
unsigned uint_test = 49152;
long    long_test = 100000L;
unsigned long ulong_test = 4294967295;
float float_test = 3.14159265359;
double double_test = 2.71828182846;
double  d1 = 9.9e-1, d2=9.9e-2, d3=9.9e-3, d4=9.9e-4,d5=9.9e-5,d6=9.9e-6,
        d7=-99990.0;

MENU_ITEM test_menu[] = {
        {"Normal item", 0, 10000, 0, NULL},
        {"Grayed item", 0, 11111, GRAYED, NULL},
        {"Walking menu", 0, 10001, 0, connect_menu},
        {"Check test", 0, 10002, CHECK_DISPLAY, (MENU_ITEM *) &check_test},
        {"Char test", 0, 10003, CHAR_DISPLAY, (MENU_ITEM *) &char_test},
        {"Unsigned char", 0, 12345, UCHAR_DISPLAY, (MENU_ITEM *) &uchar_test},
        {"Hex char", 0, 12345, HCHAR_DISPLAY, (MENU_ITEM *) &char_test},
        {"Integer test", 0, 10004, INT_DISPLAY, (MENU_ITEM *) &int_test},
        {"Unsigned test", 0, 10004, UINT_DISPLAY, (MENU_ITEM *) &uint_test},
        {"Hex integer test", 0, 10004, HINT_DISPLAY, (MENU_ITEM *) &uint_test},
        {"Long test", 0, 10004, LONG_DISPLAY, (MENU_ITEM *) &long_test},
        {"Unsigned long test", 0, 10004, ULONG_DISPLAY, (MENU_ITEM *) &ulong_te
st},
        {"Hex long test", 0, 10004, HLONG_DISPLAY, (MENU_ITEM *) &ulong_test},
        {"Float test", 0, 12345, FLOAT_DISPLAY, (MENU_ITEM *) &float_test},
        {"Double test", 0, 12345, DOUBLE_DISPLAY, (MENU_ITEM *) &double_test},
        {"Teleoperated", 0, 1000, 0, NULL},
        {NULL, 0, 0, 0, NULL}
};

MENU_ITEM function_menu[] = {
        {"Power up", 0, 201, 0, NULL},
        {"Diagnostics", 0, 250, 0, NULL},
        {"Security Assessment", 0, 300, 0, NULL},
        {"Path Planning", 0, 400, 0, NULL},
        {"Position Estimation", 0, 500, 0, },
        {"Ultrasonic Plotting", 0, 600, 0, NULL},
        {"Map Editor", 0, 700, 0, NULL},
        {"Map Making", 0, 800, 0, NULL},
        {"Execute Script", 0, 900, 0, NULL},
        {"Teleoperated", 0, 1000, 0, NULL},
        {"Power down", 0, 202, 0, NULL},
        {"-", 0, 0, 0, NULL},
        {"Terminal Mode", 0, 100, 0, NULL},
        {"About", 0, 9998, 0, NULL},
        {"Quit", 0, 9999, 0, NULL},
        {NULL, 0, 0, 0, NULL}
};

MENU_ITEM option_menu[] = {
        {"Debug mode", 0, 2000, 1, (MENU_ITEM *) &debug_mode},
        {"Paranoid mode", 0, 2001, 1, (MENU_ITEM *) &paranoid},
        {NULL, 0, 0, 0, NULL}
};

MENU_ITEM main_menu_bar[] = {
        {"Functions", 0, 1, 0, function_menu},
        {"Options", 0, 2, 0, option_menu},
        {"Test", 0, 3, 0, test_menu},
        {NULL, 0, 0, 0, NULL}
};

int     mouse_enabled;                    /* used by the popmenu routines */

/* Robart's current map */
map curmap;

/* Current sensor table */
```

```
SENSOR_TAB      *curtab;

drType robart;

int     connected;
int     vgamode = NO;
static int doneFlg;

double sinary[361], cosary[361];


extern long     robotx, roboty, robothdg;

void    terminal();


/****************************************************************************/
/* DrawMainMenu puts the first menu up on the screen. Expects the IBM to be  */
/* in high resolution mode.                                                 */
/****************************************************************************/
void DrawMainMenu()
{
    mouse_off();
    gpcolor(BLACK);
    gpclear(0,0, gdmaxcol, gdmaxrow);
    text_foreground(IWHITE);
    text_background(BLACK);
    mouse_on();
}


/****************************************************************************/
/* Main initializes the IBM to hi-res mode, and the global floor map        */
/* structure. It then draws the main menu and handles keyboard requests.    */
/****************************************************************************/
void main(argc, argv)
int argc;
char **argv;
{
    char        str[80], word[80];
    int         seed;
    int         new, ii;
    int         fh;
    int         event_occurred;
    long        selection;
    double      radians;
    FILE        *fd;
    MENU        *pmenu;
    EVENT       evnt;
    DIALOG      *dbox;
    extern unsigned long rdtimer();
extern int _shadow_length;

    printf("Making sine/cosine arrays...\n");
    for (ii = 0; ii <= 360; ii++) {
        radians = Angle_To_Rads(ii);
        sinary[ii] = sin(radians);
        cosary[ii] = cos(radians);
    }
    while (--argc) {
        if (strcmp(*++argv, "-c") == 0)
                ser_disable = YES;
        else if (strcmp(*argv, "-v") == 0)
                vgamode = YES;
    }

_shadow_length = 10;
    /* Initialize shared globals */
    strcpy(curmap.mapName, "nlab.map");
    curmap.peName[0] = '\0';
    curmap.mem_ptr = NULL;
    curmap.pe_ptr  = NULL;
    robart.x = 60;
```

```
    robart.y = 33;
    robothdg = robart.dir * 100L;

    robart.battery_voltage = 1200;      /* 12 volts */
    robart.odometer = 0L;
    itimer();                   /* init the timer stuff */

    /* Initialize the random number generator with a pseudo-random value */
    seed = (unsigned int) (rdtimer() & 0xffffL);
    srand(seed);

    InitGraphics();

    /* Start up the mouse driver */
    InitEvent(20);

    Init_IBM_IO(ser_disable);

    robart.x = robart.y = robart.dir = 0;
    /* Get the saved information about the robot from the robot.inf file.
     * If we're unable to read the information, then make some other
     * assumptions.
     */
    if (read_setup("robot.inf") == ERROR) {
            robotx = robart.x * curmap.squaresize * 10L;
            roboty = robart.y * curmap.squaresize * 10L;
            robothdg = robart.dir * 100L;

            mouse_on();
            /* Load the default floor map file */
            fh = open(curmap.mapName, O_RDONLY | O_BINARY, 0);
            if (fh != -1) {
                load_map(fh, &curmap);
                close(fh);
            }
            else {
                    Load_Floor_Map(&curmap, NULL);
            }
            mouse_off();
    }

    mouse_on();
    DrawMainMenu();
    pmenu = RegisterMenu(main_menu_bar);
    draw_menu(pmenu);

    /* Enter the main loop.  Wait for a mouse button to be depressed or for
     * the keyboard to be struck.
     */
    doneFlg = NO;
    do {
        selection = NO_SELECTION;
        event_occurred = NO;
        if (GetEvent(&evnt)) {
                switch(evnt.type & 0xFF00) {
                case KEYBOARD :
                        if(evnt.data == 0x011B || evnt.data == F10) {
                                doneFlg = YES;
                        } else {
                                selection = pull_select_menu(pmenu, 0, 1);
                                event_occurred = YES;

                                if((new = CheckTrap()) != -1)
                                        ii = new;
                        }
                        break;

                case MOUSEBUTTONDOWN :
                        ii = 0;
                        if((new = CheckTrap()) != -1)
                                ii = new;
                        if (ii && (ii & 0x00FF) != 0x00FE && (ii & 0x00F0) == 0
x00F0) {
```

```
                                        selection = pull_select_menu(pmenu, (ii & 0x000
F), 1);
                                        event_occurred = YES;

                                        if((new = CheckTrap()) != -1)
                                                ii = new;
                                }
                                break;
                        }
                }

                if (event_occurred) {   /* a selection was made */
                        close_menu(pmenu);              /* shutdown the pulldown */
                        gpviewport(0,0, gdmaxcol, gdmaxrow);
                }

                if (selection == 100) {
                        terminal();
                }
                else if (selection == 201) {    /* connect to Robart */
                        ConnectToRobart(0);
                }
                else if (selection == 202) {    /* power down */
                        x_command(X_SYSTEM, 0);
                        connected = FALSE;
                }
                else if (selection == 250) {    /* execute diagnostics */
                        if (check_dock() != ERROR)
                            ConnectToRobart(1);
                }
                else if (selection == 300) {    /* security assessment */
                    Intruder(&curmap);
                }
                else if (selection == 400) {
                    PathPlan(&curmap);
                }
                else if (selection == 500) {    /* execute position estimation */
                    PositionEstimation(&curmap);
                }
                else if (selection == 600) {            /* ultrasonic plotting */
                    SonarPlot(&curmap);
                }
                else if (selection == 700) {            /* map editor */
                    MapEdit(&curmap);
                }
                else if (selection == 800) {            /* drive/map making */
                    makemap(&curmap);
                }
                else if (selection == 900) {            /* execute script */
                    str[0] = EOS;
                    SelectFile("*.s", str, " Load ");
#if 0
                    mouse_off();
                    text_move(0, 345);
                    ggets(str, "Name of script file --> ", "");
                    mouse_on();
#endif
                    mouse_off();
                    sgetw(word, str);
                    if (word[0] != EOS) {
                        doscript(word);
                        PutString(25, 1, " ----- End of Script -----"); mgetkey();
                    }
                    mouse_on();

                }
                else if (selection == 1000) {           /* teleoperated mode */
                        teleoperated(&curmap);
                }
                else if (selection == 2000) {
                        debug_mode ^= 1;
                        if (debug_mode && !paranoid)
                                debug_fd = fopen("debug.msg", "a+");
```

```
                        else if (!debug_mode && !paranoid) {
                                fclose(debug_fd);
                                debug_fd = NULL;
                        }
                }
                else if (selection == 2001) {
                        paranoid ^= 1;
                        if (paranoid && debug_mode) {
                                fclose(debug_fd);
                                debug_fd = NULL;
                        }
                }
                else if (selection == 9998) {
                        if((dbox = OpenDialog(about_dialog, 50, 30, NORMAL)) != NULL) {
                                (void) EditDialog(dbox);
                                CloseDialog(dbox);
                        }
                }

                else if (selection == 9999) {           /* quit command */
                    doneFlg = TRUE;
                }
                else if (selection == 10002) {  /* check test */
                        check_test ^= 1;
                }
                else if (selection == 10003) {  /* char test */
                        char_test++;
                }
                else if (selection == 10004) {  /* integer test */
                        ggets(str, "Enter new value for int_test", "");
                        int_test = atoi(str);
                }

                if (event_occurred) {           /* if an event occured, clean up screen
 */
                        mouse_off();
                        gpviewport(0,0, gdmaxcol, gdmaxrow);
                        gpcolor(BLACK);
                        gpclear(0,0, gdmaxcol, gdmaxrow);
                        pmenu = RegisterMenu(main_menu_bar);
                        draw_menu(pmenu);
                        mouse_on();
                }
        } while (!doneFlg);

        if (debug_fd != NULL)
            fclose(debug_fd);
        Finalize_IBM_IO();
        mouse_off();
        DeInitEvent();

        write_setup("robot.inf");
        gpterm();
}


unsigned char patt1[] = { WHITE, CYAN, CYAN, WHITE };
unsigned char patt2[] = { RED, WHITE, WHITE, RED };
unsigned char patt5[] = { BLUE, CYAN, CYAN, BLUE };
unsigned char patt6[] = { CYAN, IWHITE, IWHITE, CYAN };
unsigned char patt8[] = { GRAY, WHITE, WHITE, GRAY };
unsigned char patt9[] = { IWHITE, WHITE, WHITE, IWHITE };

unsigned char mpatt1[] = { WHITE, BLACK, BLACK, WHITE };
unsigned char mpatt2[] = { IWHITE, BLACK, BLACK, IWHITE };
unsigned char mpatt3[] = { WHITE, BLACK, BLACK, BLACK };

InitGraphics()
{
        gpparms();

        if(gdtype < 4)
        {
```

```
/*********************************************************************
 *                              execute                              *
 *********************************************************************
 * This file contains the routines that actually cause a turn or move *
 * instruction to be executed.                                       *
 *                                                                   *
 *********************************************************************/
#include <stdio.h>
#include <malloc.h>
#include <fcntl.h>
#include <stdlib.h>
#include <ega.h>
#include <event.h>
#include <menu.h>

#ifdef NARGS
#undef NARGS
#endif

#include <math.h>

#include "headers/ibmio.h"
#include "headers/serial.h"

#ifndef PI
#define PI   3.14159265358979323846
#endif

long                    robotx, roboty, robothdg;
static long             orgrobotx, orgroboty;
static long             marker_x, marker_y, marker_type;
static int              nhits;
static long             stripe_x, stripe_y, stripe_heading, stripe_avg_heading;
static long             newx, newy, newheading;

extern int              infl_count;
extern XY_PAIR          inflect_pts[200];
extern int              inter_packet_pause;
extern int              robot_type, stripe_offset;
extern drType           robart;
extern SENSOR_TAB       *curtab;
extern int              fixed_sensor_halt;
extern double           sinary[361], cosary[361];


/*********************************************************************
 *                           execute_path                            *
 *********************************************************************
 * Takes an inflection point list and issues instructions to the robot *
 * to follow the path.                                               *
 *                                                                   *
 * Call with:                                                        *
 *      map_ptr    = pointer to current map                          *
 *      inflect    = inflection point list, start is in inflect[0],  *
 *                   destination is in inflect[npnts-1].             *
 *      npnts      = number of inflection points                     *
 *      plastseg   = (int *) variable indicating last segment exe-   *
 *                   cuted (used by the caller primarily when a      *
 *                   segment failed to execute completely)           *
 *                                                                   *
 * Notes: robart.dir (robarts heading in degrees) is updated by this *
 * procedure.                                                        *
 *                                                                   *
 * Returns:                                                          *
 *      OK       if all segments executed successfully               *
 *      ERROR    if unable to execute a given segment (segment index *
 *               placed in *plastseg)                                *
 *      OBSTACLE if the robot stopped because of an obstacle (segment *
 *               index placed in *plastseg)                          *
 *      ABORT    if a serious error, like unable to send program to  *
 *               robot or user abort                                 *
 *                                                                   *
 * Author:       Gary Gilbreath, 22 Oct 87                           *
```

```
 *                                                                   *
 * Revisions:                                                        *
 *                                                                   *
 *********************************************************************/
execute_path(map_ptr, pathsegs, nsegs, plastseg)
map *map_ptr;
PATHSEG *pathsegs;
int nsegs;
int *plastseg;
{
    char        str[80];
    int         ii;
    long        x1, y1, x2, y2;
    int         deltahdg;
    long        distance;
    int         status;
    int         resolution;
    enum        {left, right} direction;
    int         desirehdg, curhdg;
    double      tmp;
    extern int  map_direction;
    packet      pack;


    /* Dump any extra packets first */
    while (wait_packet(&pack, NO_WAIT) == OK)
        ;

    if (nsegs < 1)                          /* if the path is empty, just return */
        return (OK);

    x_command(X_SONAR, 0);                  /* turn sonars off (automatically get t
urned on later) */
    waitms(500);
    x_command(X_OAARRAY, 1);                /* turn obstacle avoidance array on */
    waitms(500);

    /* Dump any more extra packets */
    while (wait_packet(&pack, NO_WAIT) == OK)
        ;

waitms(inter_packet_pause);

    resolution = map_ptr->squaresize;   /* get size each square in inches */
    for (ii = 0; ii < nsegs; ii++) {
        *plastseg = ii;
        x1 = (robotx + 5) / 10L; y1 = (roboty + 5) / 10L;
        x2 = pathsegs[ii].x2,   y2 = pathsegs[ii].y2;

        /*
         * Get distance to travel along this leg (in inches).
         */
/*      x1 *= resolution, y1 *= resolution;*/
        x2 *= resolution, y2 *= resolution;
        distance = (long) (sqrt((double) (x2 - x1)*(x2 - x1) + (y2 - y1)*(y2 -
y1)) + 0.5);
printf("%d: (%ld,%ld) to (%ld,%ld), dist=%ld, stripe=%d\n",ii,x1,y1,x2,y2,dista
nce,pathsegs[ii].stripe);
printf("(%ld'%21d\",%ld'%21d\") to (%ld'%21d\",%ld'%21d\")\n",
        x1/12,x1%12,y1/12,y1%12, x2/12,x2%12,y2/12,y2%12);
{ int ix, iy;
ix = robart.x * map_ptr->squaresize; iy = robart.y * map_ptr->squaresize;
printf("Robart: (%d'%2d\",%d'%2d\") dir=%d  robothdg=%ld.%02ld\n",
ix/12,ix%12, iy/12,iy%12, robart.dir, robothdg/100L, robothdg%100L);
}

        /*
         * Calculate the direction of the point to move to.  This uses
         * the normal cartesian coordinate system, not the strange
         * robart system.
         */
        tmp = atan2((double) y2 - y1, (double) x2 - x1) * 180/PI;
printf("tmp=%.2lf ", tmp);
```

```
        if (tmp < 0.0)                      /* round tmp */
            tmp -= 0.5;
        else
            tmp += 0.5;


        /* Convert to robart coordinate system and force to -180 to +180 */
        desirehdg = force180((int) 90 - ((int)tmp + map_direction));

        /* Convert robart's heading to normalized heading */
        curhdg = force180(robart.dir);

        /*
         * Calculate how many degrees and which direction to turn.  The
         * initial assumption is that we turn left (curhdg - desirehdg)
         * degrees.  If this value is less than zero, then we turn right
         * instead and convert the number of degrees to a positive number.
         * If the number of degrees to turn is greater than 180, then we
         * turn in the opposite direction (left if direction == right,
         * right if direction == left).
         */
        deltahdg = curhdg - desirehdg;  /* number of degrees to turn right */
printf("desirehdg=%d  curhdg=%d deltahdg=%d robart.dir=%d\n", desirehdg, curhdg
, deltahdg,robart.dir);
        direction = left;               /* assume we always rotate right */
        if (deltahdg < 0) {             /* get a negative rotation? */
                direction = right;      /* change direction */
                deltahdg = -deltahdg;   /* change the sign */
        }
        if (deltahdg > 180) {           /* more than 180 degree rotation? */
                deltahdg = 360 - deltahdg;      /* confine to 0 to 180 */
                if (direction == left)          /* change rotation direction */
                        direction = right;
                else
                        direction = left;
        }

#if 0
        /* See if we're moving a short distance and our heading change is
         * more than 90 degrees.  If so, then turn 180-deltahdg degrees
         * in the opposite direction and move backwards the same amount.
         */
        if (deltahdg > 90 && distance <= 12L) {
             distance = -distance;              /* move backwards */
             deltahdg = 180 - deltahdg;         /* turn smaller amount */
             direction = (direction == right ? left : right);    /* opposite dir
ection */
        }
#endif

        /*
         * Assemble the rotation packet.
         * Format:
         *      '0'             Robot command packet
         *      'M'             Move command
         *      '02' | '03'     Pivot left | right
         *      '33'            Velocity 3 on both wheels
         *      degrees         Number of degrees to rotate
         */
        if (deltahdg != 0) {
puts_time(stdout);
printf(" Turn %u degrees, robart.dir=%d\n", deltahdg,robart.dir);
             sprintf(str, "Rotate %s, speed %d, %d degrees",
                        direction == left ? "left" : "right", 33, deltahdg);
             Clear_Line(1);
             Clear_Line(2);
             PutString(1, 2, str);
             PutString(2, 2, "Hit a key, ESC to abort");
             waitms(inter_packet_pause);
             s*atus = execute_turn(map_ptr, direction == left ? -deltahdg : delt
ahdg);

             if (status < 0) {
```

```
                        Clear_Line(1);
                        Clear_Line(2);
                        return (status);
                }

                if (status != OK)               /* if failed to send, break out */
                        break;
        }

        if (robot_type == ROBARTII) {
                robart.dir = desirehdg;         /* set the new heading */
                robothdg = desirehdg * 100L;
        }

        waitms(inter_packet_pause);
puts_time(stdout);
printf(" execute_move forward %ld inches\n", distance);
        status = execute_move(map_ptr, distance, pathsegs[ii].x2, pathsegs[ii].
y2, pathsegs[ii].stripe);

        if (status == OBSTACLE) {
                return (status);
        }
        else if (status < 0) {
             Clear_Line(1);
             Clear_Line(2);
             return (status);
        }

#if 0
        /* Update robot's heading and position */
        robart.x = x2;
        robart.y = y2;
#endif
    }
#if 0
    robart.x = pathsegs[nsegs-1].x2;
    robart.y = pathsegs[nsegs-1].y2;
#endif
waitms(inter_packet_pause);
    x_command(X_SONAR, 0);                      /* turn sonar power off */
waitms(inter_packet_pause);
    Clear_Line(1);
    Clear_Line(2);
    return (OK);
}



/* flash_pos - flash the current position on the screen for a little
 *      while.  Input is in robart coordinates.
 */
flash_pos(map_ptr, x, y)
map *map_ptr;
int x, y;
{
    GBUF                    *savebuf;
    int                     restoring;
    int                     x1, y1, x2, y2;
    int                     xx, yy;
    unsigned int            hdg;
    int                     sqsize;
    int                     status, return_value;
    unsigned long           start_time, cur_time, packet_timeout;
    packet                  pack;

    sqsize = map_ptr->squaresize;
    savebuf = save_robart(map_ptr, robart.x, robart.y);

    /* Flash the box until a key is hit */
    restoring = 1;
    packet_timeout = get_long_time();
    start_time = mstime();
```

Apr 04 1991 09:12:04 execute.c Page 5

```
    return_value = OK;
    while (!keyhit()) {
        status = wait_packet(&pack, NO_WAIT);    /* get a packet */
        if (status == ABORT)                     /* user hit a key */
            break;
        if (status == OK) {                      /* got one */
            if (strncmp(pack.data, "9M", 2) == 0) {      /* move ack? */
                robart.battery_voltage = get_batt_volt(&pack);
                return_value = OK;
                break;
            }
            else if (pack.data[0] == '6') {      /* dead reckoning packet */
                Decode_Dead_Reckoning(&pack, &xx, &yy, &hdg);
                robotx = xx, roboty = yy, robothdg = hdg;
                /* Convert tenths of inches to squares */
                robart.x = ((xx+5)/10 + sqsize/2)/sqsize;
                robart.y = ((yy+5)/10 + sqsize/2)/sqsize;
                robart.dir = (int) ((force36000(robothdg) + 50L)/100L);
            }
            /* Nav sonar packet probably */
        }
        else if (get_long_time() - packet_timeout >= 150) {
            return_value = DROPPED_PACKET;
            break;
        }

        /* Get current time in milliseconds */
        cur_time = mstime();

        /* If time to update flash, do it now */
        if (cur_time < start_time || cur_time - start_time > 200L) {
            start_time = cur_time;
            restoring = !restoring;              /* toggle restore var */
            if (restoring) {
                restore_robart(savebuf);
                savebuf = save_robart(map_ptr, robart.x, robart.y);
            }
            else                                 /* blit the box down */
                draw_robart(map_ptr, robart.x, robart.y);
        }
    }

    restore_robart(savebuf);
    if (status == ABORT) {
        if (keyhit()) mgetkey();
        return (ABORT);
    }
    if (keyhit() && mgetkey() == ESC) {
        return (ABORT);
    }
    return (return_value);
}


/* flash_2pos - flash two positions on the screen until the user hits a key */
flash_2pos(map_ptr, dist, speed)
map *map_ptr;
int dist, speed;
{
    char        str[80];
    int         status;
    unsigned int ii;
    byte        old_fixed;
    byte        cur_fixed;
    int         xx, yy, px, py;
    unsigned int        hdg;
    int         rx2, ry2;
    int         HALT;
    int         stat, sqsize;
    int         return_value;
    int         gotpacket, save_x, save_y;
    unsigned long start_time, packet_timeout;
    packet      pack;
```

Apr 04 1991 09:12:04 execute.c Page 6

```
    GBUF        *savebuf;
    DISPLAY_LIST *dl;

    HALT = NO;
    old_fixed = 0xff;
    Calc_Dest_Grid_Unit(0, (double) dist, &rx2, &ry2, map_ptr->squaresize);

    dl = create_dl();
    init_fixed_dl(dl, map_ptr, curtab);

    /* Start dead reckoning.  Multiplication by <sqsize> is to convert
     * squares to inches.
     */
    return_value = OK;
    sqsize = map_ptr->squaresize;
    init_marker_info(map_ptr);
    init_deadreck(robart.x*sqsize, robart.y*sqsize, robart.dir, dist, speed, 1)
;

    /*
     * Save blob where Robart is.  This blob moves along the path as
     * Robart moves.
     */
    savebuf = save_robart(map_ptr, robart.x, robart.y);
    draw_robart(map_ptr, robart.x, robart.y);

    /* Initialize navigation sonar plotter */
    init_plot_nav();

    px = py = -1;                       /* force plotting of Robart's position
*/

    /* The following is used to detect a dropped packet.  If we don't get a
     * packet back from the robot (typically a sonar packet), then the move
     * packet was dropped and we have to send it again.
     */
    packet_timeout = get_long_time();   /* packet time out value */
    gotpacket = NO;
    save_x = robart.x;
    save_y = robart.y;

    /* Flash the box until a key is hit */
    while (!keyhit()) {
        if (robot_type == ROBARTII) {
                dead_reckon(&xx, &yy);
                /* Convert inches to squares */
                robotx = xx * 10L, roboty = yy * 10L;
                robart.x = (xx + sqsize/2)/sqsize;
                robart.y = (yy + sqsize/2)/sqsize;
        }

        /* Inhibit all the fixed sensors that are being affected by the
         * robot's motion.  Halt if a fixed sensor is going off that is
         * not caused by the robot's motion.
         */
        read_fixed(curtab);             /* read status of fixed sensors */
        update_dl(dl);                  /* update display of fixed sensors */

        /* See if we're affecting any sensors */
        cur_fixed = floor(robart.x, robart.y, curtab);
        if (old_fixed != cur_fixed) {
                old_fixed = cur_fixed;
                sprintf(str, "Fixed: %02x", cur_fixed);
                PutString(3, 1, str);
        }
        /* See if we need to mask the status of the fixed sensors */
        if (fixed_sensor_halt && cur_fixed) {

                /* First, make a mask to mask out the sensors that are being
                 * affected by the robot's motion.  Then, look at each sensor
                 * (after masking) to see if it is still activated.  If so,
                 * then we set the HALT flag to make the robot
                 * stop.
```

```
                        */
                        cur_fixed = -cur_fixed; /* turn into a mask */
                        for (ii = 0; ii < curtab->nsensors; ii++) {
                                if ((curtab->sensors[ii].sensor_id & cur_fixed)) {
                                        HALT = YES;
                                        start_time = mstime();
                                }
                        }
                }

                /* If robot has changed X-Y position, then update position on screen */
                if (robart.x != px || robart.y != py) {
                    px = robart.x, py = robart.y;
                    restore_robart(savebuf);
                    if (px <= map_ptr->lx || px >= map_ptr->ux ||
                        py <= map_ptr->ly || py >= map_ptr->uy) {

                        int deltax, deltay;

                        deltax = (map_ptr->ux - map_ptr->lx) / 2;
                        deltay = (map_ptr->uy - map_ptr->ly) / 2;
                        if (px <= map_ptr->lx)
                            deltax = -deltax;
                        else if (px >= map_ptr->ux)
                                ;
                        else
                                deltax = 0;
                        if (py <= map_ptr->ly)
                            deltay = -deltay;
                        else if (py >= map_ptr->uy)
                                ;
                        else
                                deltay = 0;
                        pan_map(map_ptr, deltax, deltay, 0,15, gdmaxcol,gdmaxrow-15);
                        Draw_Inflection_List_Path(map_ptr, inflect_pts, infl_count+1, I
WHITE);
                    }
                    savebuf = save_robart(map_ptr, robart.x, robart.y);
                    draw_robart(map_ptr, robart.x, robart.y);
                }

                /* If we have a fixed sensor halt alarm, blitz the robot with halt
                 * packets until he does.  A packet is sent every 250 ms.
                 */
                if (HALT && (mstime() - start_time > 250L)) {          /* if we need t
o force the robot to stop */
                        put_packet("0M070000");         /* send a halt command */
                        start_time = mstime();
                }

                /* See if any packets have come in. */
                status = wait_packet(&pack, NO_WAIT);
                if (status == ABORT) {
                    break;
                }
                /*
                 * If we got a packet, then see if it's a move complete packet.  If
                 * it is, then we're done and we return.  If it's an obstacle
                 * avoidance sonar packet, then try to get another one.  This will
                 * ensure that we're always using the latest sonar information.
                 */
                if (status == OK) {
                    gotpacket = YES;
                    for (;;) {
                        if (strncmp(pack.data, "9H", 2) == 0)
                            robart.battery_voltage = get_batt_volt(&pack);

                        if (strncmp(pack.data, "9M00", 4) == 0) { /* move ack? */
                            goto bomb_out;              /* finished move */
                        }
                        if (strncmp(pack.data, "9M06", 4) == 0) { /* stripe ack? */
                            update_stripe_info(map_ptr, &pack);
                            goto bomb_out;
```

```
                        }
                        if (strncmp(pack.data, "5", 1) == 0) { /* marker packet? */
                            add_marker_info(map_ptr, &pack);
                        }
                        if (strncmp(pack.data, "0M06", 4) == 0) {       /* nak packet?
*/
gstatus("LOST STRIPE");
/*
                            status = return_value = ERROR; */
                            status = return_value = OBSTACLE;
                            goto bomb_out;
                        }
                        if (strncmp(pack.data, "9M08", 4) == 0) { /* Robot stopped! */
                            return_value = OBSTACLE;
                            goto bomb_out;
                        }
                        if (pack.data[0] == '7') {      /* OA packet? */
                            status = wait_packet(&pack, NO_WAIT);       /* try to get a
nother */
                            if (status == ABORT) {      /* user hit abort? */
                                goto bomb_out;          /* quit */
                            }
                            if (status != OK) {         /* no more packets? */
                                stat = plot_nav_sonar(map_ptr, &pack, robart.x, robart.
y);

                                /* An obstacle was detected by the sonars.  The robot
                                 * should stop himself (in fact, should already have
                                 * done so), so just put a warning message on the
                                 * screen.
                                 */
                                if (stat != OK) {
                                    Inv_Draw(2, 69, " OBSTACLE ");
                                }
                                break;          /* got last oa packet, so break out */
                            }
                        }
                        else if (pack.data[0] == '6') { /* dead reckoning packet */
                                Decode_Dead_Reckoning(&pack, &xx, &yy, &hdg);
                                robotx  = xx, roboty = yy, robothdg = hdg;
                                /* Convert tenths of inches to squares */
                                robart.x = ((xx+5)/10 + sqsize/2)/sqsize;
                                robart.y = ((yy+5)/10 + sqsize/2)/sqsize;
                                robart.dir = (int) ((force36000(robothdg) + 50L)/100L);
                                break;
                        }
                        else
                                break;
                    }
                }
                else if (!gotpacket) {          /* if we haven't received a packet yet
*/
                    /* If we don't get packet within 3000 seconds of when we sent a
                     * move packet, then returned DROPPED_PACKET status.
                     */
                    if (get_long_time() - packet_timeout >= 3000) {
                        status = OK;
                        return_value = DROPPED_PACKET;
                        robotx = save_x * sqsize * 10L;
                        roboty = save_y * sqsize * 10L;
                        robart.x = save_x;      /* restore original X-Y coordinates */
                        robart.y = save_y;
                        goto bomb_out;
                    }
                }
        }
bomb_out:
    PutString(2, 69, "           ");    /* clear "OBSTACLE" line */
    deinit_plot_nav(map_ptr);   /* get rid of navigation dots */
    restore_robart(savebuf);

    destroy_dl(dl);

    PutString(3,1,"                   ");
```

```
        if (status == ABORT) {
            if (keyhit()) mgetkey();
            return (ABORT);
        }
        if (keyhit()) {
            if (mgetkey() == ESC)
                    return (ABORT);
            else {
                    robart.x = rx2, robart.y = ry2;
                    robotx = rx2 * sqsize * 10L, roboty = ry2 * sqsize * 10L;
            }
        }
        if (HALT)
            return (FIXED_SENSOR_HALT);
        return (return_value);
    }


    /* execute_turn - execute a turn, update robart's heading */
    execute_turn(map_ptr, deltahdg)
    map *map_ptr;
    int deltahdg;
    {
        char        str[80], packstr[80];
        int         cc, degs, direction, status;
        int         retry = 0;
        extern      int deftspeed;

        batt_update();

        if (deltahdg < 0) {
            degs = -deltahdg;
            direction = 2;
        }
        else {
            direction = 3;
            degs = deltahdg;
        }

        sprintf(packstr, "0M0%x%x%x%02x", direction, deftspeed, deftspeed, degs);
        do {
            status = put_packet(packstr);
            if (status != OK) {
                sprintf(str, "Communication error %d", status);
                return (ERROR);
            }
            cc = flash_pos(map_ptr, robart.x, robart.y);
            if (cc == DROPPED_PACKET) {
                sprintf(str,"PACKET DROPPED, retry #%d", ++retry);
                PutString(25,1, str);
            }
            if (cc == ABORT || cc == ESC || cc == F10) {
                put_packet("0M070000");
                waitms(200);
                x_command(X_SONAR, 0);                  /* turn sonar power off */
                waitms(100);
                return (ABORT);
            }
        } while (cc == DROPPED_PACKET);
        if (robot_type == ROBARTII) {
            robart.dir = force360(robart.dir + deltahdg);
            robothdg = robart.dir * 100L;
        }

        batt_update();
        return (status);
    }


    /* execute_move - execute a move (with OA enabled) */
    execute_move(map_ptr, distance, destx, desty, stripe)
    map *map_ptr;
```

```
long distance;
int destx, desty, stripe;
{
        char            packstr[80], str[80];
        int             cc, status;
        int             divisor, maxmove;
        int             xx, yy;
        int             oldx, oldy;
        int             orgx, orgy;
        int             backward, save_dir;
        int             retry = 0;
        long            abs_dist;
        extern int      deftspeed, deftspeed, stripespeed;

        batt_update();

        orgx = robart.x, orgy = robart.y;
        oldx = robart.x * map_ptr->squaresize, oldy = robart.y * map_ptr->squar
esize;
        save_dir = robart.dir;

        /* If we have a negative distance, then we want to move the robot
         * straight back and hope we don't hit anything, since there's no
         * sonars back there.
         */
        if (distance < 0L) {
                backward = YES;
                abs_dist = -distance;
                if (robot_type == ROBARTII) {
                    robart.dir = force360(robart.dir + 180);  /* fool dead reck
oner */
                    robothdg = robart.dir * 100L;
                }
        }
        else {
                backward = NO;
                abs_dist = distance;
        }

        /*
         * If the move is longer than 250 we have to split the move up into
         * two or more segments.  It is desirable that these segments be
         * of roughly equal length.  <maxmove> is set to the distance to be
         * moved each time.
         */
        if (abs_dist > 250L) {          /* 250 is maximum move */
            divisor = (int) (abs_dist / 250L);  /* how many times does 250 go i
nto distance? */
            maxmove = (int) (abs_dist / (divisor+1L));  /* move equal distances
 */
        }
        while (abs_dist > 0L) {
            int tdist;

            orgrobotx = robotx;         /* save where robot started */
            orgroboty = roboty;

            if (abs_dist > 250L) {      /* greater than maximum move? */
                tdist = maxmove;        /* move maxmove inches */
            }
            else                        /* move is 0 to 250 */
                tdist = (int) abs_dist;
            abs_dist -= (long) tdist;           /* update distance moved */

            /*
             * Assemble the move packet.
             * Format:
             *  '0'             Robot command packet
             *  'M'             Move command
             *  '00'            Move forward
             *  '55'            Velocity 5 on both wheels
             *  distance        Distance to move in inches
             */
```

```
            stripe_x = 0x7fffffff; /* so we know if we got a stripe update */

            if (backward)
                sprintf(packstr, "OM01%x%x%02x", defspeed, defspeed, tdist);
            else if (stripe)
                sprintf(packstr, "OM06%x%x%02x", stripespeed, stripespeed, tdis
t);
            else
                sprintf(packstr, "OM00%x%x%02x", defspeed, defspeed, tdist);

puts_time(stdout);
printf(" Move forward %u inches\n", tdist);
            sprintf(str, "Forward %d\", speed %d", tdist, defspeed);
            Clear_Line(1);
            Clear_Line(2);
            PutString(1, 2, str);
            PutString(2, 2, "Hit a key, ESC to abort");

            waitms(350);
            do {
                status = put_packet(packstr);
                if (status != OK) {
                    sprintf(str, "Communication error %d", status);
                    PutString(1,1, str);
                    return (ERROR);
                }

                cc = flash_2pos(map_ptr, tdist, defspeed);

                if (cc == DROPPED_PACKET) {
                    sprintf(str,"PACKET DROPPED, retry #%d", ++retry);
                    PutString(25,1, str);
                }

                /* The robot has detected an obstacle and has stopped */
                if (cc == ABORT || cc == ESC || cc == F10) {
                        put_packet("OM070000");
                        waitms(100);
                        x_command(X_SONAR, 0);          /* turn sonar power off
 */
                        waitms(200);
                        if (robot_type == ROBARTII) {
                                robart.dir = save_dir;
                                robothdg = robart.dir * 100L;
                        }
                        return (ABORT);
                }
                if (cc == OBSTACLE || cc == ERROR) {
                    if (robot_type == ROBARTII) {
                        /* Figure out where we are now */
                        dead_reckon(&xx, &yy);

                        robotx = xx * 10L, roboty = yy * 10L;
                        /* Convert inches to squares */
                        robart.x = (xx + map_ptr->squaresize/2) / map_ptr->squa
resize;
                        robart.y = (yy + map_ptr->squaresize/2) / map_ptr->squa
resize;
                        robart.odometer += (long) (sqrt((double) (xx-oldx)*(xx-
oldx) + (yy-oldy)*(yy-oldy)) + 0.5);
                    }
                    if (robot_type == ROBARTII) {
                        robart.dir = save_dir;
                        robothdg = robart.dir * 100L;
                    }
                    return (cc);                /* return inflection point we d
ied at */
                }
            } while (cc == DROPPED_PACKET);
            robart.odometer += tdist;

            if (status != OK)           /* if failed to send, break out */
```

```
                    break;

                /* If we were following a stripe and we got a stripe update,
                 * then update the robot's dead reckoned position.
                 */
                if (stripe && stripe_x != 0x7fffffff) {
                    correct_xyheading(map_ptr, save_dir, orgx, orgy, destx, desty,
orgrobotx, orgroboty);
                }
            }
            if (robot_type == ROBARTII) {
                robart.dir = save_dir;
                robothdg = robart.dir * 100L;
            }
            batt_update();

            return (OK);
}


/*****************************************************************
 *                      correct_xyheading                        *
 *****************************************************************
 * Correct the current X-Y position and heading of the robot based on  *
 * the stripe follower data received at the end of a stripe segment.   *
 * Either the X or Y coordinate is automatically known, since stripes  *
 * are always on 90 degree angles.  The heading can also be corrected  *
 * by knowing the average heading during the execution of the stripe   *
 * segment, the current robot heading, and the direction of the stripe. *
 * The correction is:                                                   *
 *                                                                      *
 *      robot_heading = (cur hdg) - (avg hdg) + (stripe hdg)            *
 *                                                                      *
 * In addition, if a marker was seen during the execution of the path, *
 * we can correct the other coordinate by knowing what the robot       *
 * coordinates were when the marker was seen, the current robot coord- *
 * inates, and the actual marker coordinates.  For example, if the     *
 * robot was traveling at a heading of 270 degrees and saw a marker    *
 * at (mx, my) and stopped at (rx, ry) and the actual marker location  *
 * was (amx, amy), then the correction for the x coordinate (y is      *
 * known from the orientation of the stripe) is:                       *
 *                                                                      *
 *      x = amx - sqrt((rx-mx)^2 + (ry-my)^2)                           *
 *                                                                      *
 * This assumes that the stripe does not curve.  It is also assumed    *
 * that stripes are on even multiples of 90 degrees.                   *
 *                                                                      *
 * Note:                                                                *
 * Markers are theoretically placed in the stripe, not off to the side. *
 * However, in the map they are placed just off to the side to simplify *
 * the path planning and segmentation code. In the marker search       *
 * below the coordinates of the marker just found would appear to be   *
 * off by one square, but the code is actually correct because it is  *
 * known that the marker is in-line with the stripe.                   *
 *                                                                      *
 *                                                                      *
 * Call with:                                                           *
 *      map_ptr = (map *) pointer to current map structure              *
 *      dir     = (int) stripe heading                                  *
 *      orgx    = (int) robot X coordinate at start of stripe move      *
 *      orgy    = (int) robot Y coordinate at start of stripe move      *
 *      destx   = (int) where robot should have gotten to at end (X)    *
 *      desty   = (int) where robot should have gotten to at end (Y)    *
 *                                                                      *
 * Returns:                                                             *
 *      0                                                               *
 *                                                                      *
 * Gary Gilbreath, 5 Dec 90                                             *
 *                                                                      *
 *****************************************************************/
correct_xyheading(map_ptr, dir, orgx, orgy, destx, desty, orx, ory)
map *map_ptr;
int dir, orgx, orgy, destx, desty;
```

```
long orx, ory;
{
        char    str[80];
        int     dir90;
        int     x, y;
        long    hdg, avghdg;
        long    dx, dy;
        long    dist_since_marker;
        double  c, s, theta;

puts_time(stdout);
printf("\ncorrect_xyheading(dir=%d, org(%d,%d), dest(%d,%d)\n", dir, orgx,  org
y, destx, desty);
        dir90 = ((force360(dir) + 45) / 90) * 90;
        if (dir90 == 360)
                dir90 = 0;
printf("dir90 = %d\n", dir90);

#define LOCATION_VERIFY
#ifdef LOCATION_VERIFY
waitms(250);
get_new_position(map_ptr);
#endif

{ long xx, yy;
  xx = (stripe_x + 5) / 10L, yy = (stripe_y + 5L)/10L;
printf("Stripe info: (%ld,%ld)->(%ld'%2ld\",%ld'%2ld\") H=%ld, Hbar=%ld\n",
        stripe_x, stripe_y,
        xx/12L, xx%12, yy/12L, yy%12L,
        stripe_heading, stripe_avg_heading);
}

#ifdef LOCATION_VERIFY
{ long xx, yy, dd;
  xx = stripe_x-robotx, yy = stripe_y-roboty;
  dd = stripe_heading - robothdg;
printf("Differences: Stripe: (%ld,%ld),%ld robot: (%ld,%ld),%ld diffs: (%ld,%ld
),%ld\n",
        stripe_x, stripe_y, stripe_heading,
        robotx, roboty, robothdg, xx,yy,dd);
}
        stripe_x = robotx;
        stripe_y = roboty;
        stripe_heading = robothdg;
#else
        robotx = stripe_x;
        roboty = stripe_y;
        robothdg = stripe_heading;
#endif

        if (stripe_avg_heading > 36000L || stripe_avg_heading < 0L) {
                errorbox("stripe_avg_heading = %ld, setting to stripe_heading %
ld", stripe_avg_heading, stripe_heading);
                stripe_avg_heading = stripe_heading;
        }

        /* First, rotate the final stripe coordinates, (stripe_x, stripe_y),
         * back onto the stripe from wherever the robot thought
         * it ended up.  This will correct the robot coordinates.
         */
        if (stripe_avg_heading > 31500L)
                theta = ((double) dir90 - (36000L - stripe_avg_heading)/100.0)
* PI/180.0;
        else
                theta = ((double) dir90 - stripe_avg_heading/100.0) * PI/180.0;
        c = cos(theta), s = sin(theta);
        dx = stripe_x - orx, dy = stripe_y - ory;
        newx = orx + (dx * c + dy * s + 0.5);
        newy = ory + (dy * c - dx * s + 0.5);

{ long xx, yy;
  xx = (newx+5L)/10L, yy = (newy+5L)/10L;
printf("Corrected stripe coords: (%ld,%ld)->(%ld'%2ld\",%ld'%2ld\") theta=%.2lf
```

```
\n",
        newx, newy,
        xx/12L, xx%12L, yy/12L, yy%12L,
        theta * 180.0/PI);
}

        /* Next, fix the coordinate that didn't change when we
         * followed the stripe.  If our heading was 0 or 90, then
         * the X coordinate was fixed, otherwise, the Y coordinate.
         */
        if (dir90 == 0 || dir90 == 180) {
                robart.x = destx;
                robotx = destx * map_ptr->squaresize * 10L;
                newx = robotx;
        }
        else {
                robart.y = desty;
                roboty = desty * map_ptr->squaresize * 10L;
                newy = roboty;
        }

{ long xx, yy;
  xx = (robotx+5L)/10L, yy=(roboty+5L)/10L;
printf("Robot coordinates: (%d,%d) --> (%ld,%ld) -->(%ld'%2ld\",%ld'%2ld\")\n",
        robart.x, robart.y, robotx, roboty,
        xx/12L,xx%12L, yy/12L,yy%12L);
  xx = (newx+5L)/10L, yy=(newy+5L)/10L;
printf("New robot coords: (%ld,%ld) -->(%ld'%2ld\",%ld'%2ld\")\n",
        newx, newy, xx/12L,xx%12L, yy/12L,yy%12L);
}

        /* Now correct the robot's heading.  If the angle is near 0 (or 360)
         * then we have to temporarily force all the angles into the -180 to
         * +180 range, so that averaging works correctly.  For example, we
         * would get bogus answers if the average heading was 358, the
         * current heading was 5 and the stripe heading was 0.
         */
        if (dir90 == 360 || dir90 == 0) {
                dir90 = force180(dir90);        /* convert to +-180 */
                hdg = force18000(stripe_heading);
                avghdg = force18000(stripe_avg_heading);
                newheading = hdg - avghdg + dir90*100L;
                newheading = force36000(newheading);
                dir90 = force360(dir90);        /* convert back to 0-360 */
        }
        else
                newheading = stripe_heading - stripe_avg_heading + dir90*100L;

printf("newheading = %ld.%02ld\n", newheading/100L, newheading%100L);

        /* Now try to fix the other coordinate by looking at the
         * marker information.  Here we have to examine the map,
         * looking for the last marker we encountered that was
         * within 1.5 feet of any marker on the stripe.
         */
        if (nhits) {
                /* The marker coordinates have been summed up to this
                 * point so we can get an average coordinate.  The actual
                 * averaging must be done now before we do the search.
                 */
                marker_x = (marker_x + (nhits >> 1)) / nhits;
                marker_y = (marker_y + (nhits >> 1)) / nhits;

{ long xx, yy;
  xx = (marker_x+5L)/10L, yy=(marker_y+5L)/10L;
printf("Original marker coords: (%ld,%ld)->(%ld'%2ld\",%ld'%2ld\")\n",
        marker_x, marker_y,
        xx/12L, xx%12L, yy/12L, yy%12L);
}

                dx = marker_x - stripe_x;
                dy = marker_y - stripe_y;
```

```
                        dist_since_marker = (long) sqrt((double) dx*dx + dy*dy);
        printf("Distance since marker: %ld.%01ld\n", dist_since_marker/10L, dist_since_
marker%10L);
                        dist_since_marker -= stripe_offset;

                        /* Compensate for the fact that the stripe follower
                         * sensor typically is mounted in front of the robot,
                         * so it sees the marker before the center of the
                         * robot gets there.  The position sent back for the
                         * marker is where the robot was when it saw the marker,
                         * not where the marker is.  For this reason, we have to
                         * add or subtract the offset of the stripe from the
                         * center of the robot in order to get the correct
                         * position of the marker.
                         */
                        marker_x += stripe_offset * sinary[(int) (stripe_avg_heading/10
0L)];
                        marker_y += stripe_offset * cosary[(int) (stripe_avg_heading/10
0L)];

{ long xx, yy;
  xx = (marker_x+5L)/10L, yy=(marker_y+5L)/10L;
printf("Corrected marker coords: (%ld,%ld)->(%ld'%21d\",%ld'%21d\")\n",
            marker_x, marker_y,
            xx/12L, xx%12L, yy/12L, yy%12L);
}

                        dx = marker_x - orx, dy = marker_y - ory;
                        marker_x = orx + (dx * c + dy * s + 0.5);
                        marker_y = ory + (dy * c - dx * s + 0.5);

{ long xx, yy;
  xx = (marker_x+5L)/10L, yy=(marker_y+5L)/10L;
printf("Corrected/rotated marker coords: (%ld,%ld)->(%ld'%21d\",%ld'%21d\")\n",
            marker_x, marker_y,
            xx/12L, xx%12L, yy/12L, yy%12L);
}
                        correct(map_ptr, dir90, orgx, orgy, destx, desty, dist_since_ma
rker);
                }
                robothdg = force36000(newheading);
                robart.dir = (int) ((robothdg + 50L) / 100L);

                /* Send the updated position and heading to the robot */
                sprintf(str, "ON01%041x%041x%041x", newx, newy, newheading);
                put_packet(str);
}



correct(map_ptr, dir90, orgx, orgy, destx, desty, dist_since_marker)
map *map_ptr;
int dir90;
int orgx, orgy, destx, desty;
long dist_since_marker;
{
        char    str[80];
        int     mx, my;
        int     amx, amy;
        int     found;
        int     xinc, yinc;
        byte    cur, left, right;
        long    ii, length;
        long    dx, dy;
        long    dist2;

        /* Convert to map coordinates */
        mx = (int) ((marker_x + 5L)/10L);
        my = (int) ((marker_y + 5L)/10L);
        mx = (mx + map_ptr->squaresize/2) / map_ptr->squaresize;
        my = (my + map_ptr->squaresize/2) / map_ptr->squaresize;

        /* Search backwards along the path just traversed, starting
```

```
         * at the robot's current location.
         */
        xinc = yinc = 0;
        switch (dir90) {
        case 0:
        case 360:
                yinc = -1; break;
        case 90:
                xinc = -1; break;
        case 180:
                yinc =  1; break;
        case 270:
                xinc =  1; break;
        }

        amx = destx, amy = desty;
        if (dir90 == 90 || dir90 == 180)
            amx = robart.x - xinc * (36 + map_ptr->squaresize/2)/map_ptr->squar
esize;
        else
            amy = robart.y - yinc * (36 + map_ptr->squaresize/2)/map_ptr->squar
esize;

        /* Search backwards until we either find a marker that is
         * within 1.5' of the last marker seen, or until we've
         * traversed the whole path.  See "Note" in function
         * header above for explanation of the strange search
         * strategy.
         */
        dx = orgx - amx, dy = orgy - amy;
        length = (long) (sqrt((double) dx*dx + dy*dy) + 0.5);
        found = 0;
        for (ii = 0; ii < length; ii++, amy += yinc, amx += xinc) {
            cur   = floor(amx, amy,   map_ptr);
            if (dir90 == 90 || dir90 == 270) {
                left  = floor(amx, amy-1, map_ptr);
                right = floor(amx, amy+1, map_ptr);
            }
            else {
                left  = floor(amx-1, amy, map_ptr);
                right = floor(amx+1, amy, map_ptr);
            }
            if (cur   == FATMARKER || cur   == THINMARKER ||
                left  == FATMARKER || left  == THINMARKER ||
                right == FATMARKER || right == THINMARKER) {
                    dx = (mx - amx) * map_ptr->squaresize;
                    dy = (my - amy) * map_ptr->squaresize;
                    dist2 = (dx*dx + dy*dy);
all_coords(str, amx, amy, map_ptr);
printf("Marker found at %s, dist**2 = %ld\n", str, dist2);
                    if (dist2 <= 324L) {
                        found++;
                        break;
                    }
            }
        }
        /* If a valid marker found, make the coordinate correction */
        if (found) {
            newx = robart.x * map_ptr->squaresize * 10L;
            newy = robart.y * map_ptr->squaresize * 10L;
            if (dir90 == 90 || dir90 == 270)
                newx = (long) amx * map_ptr->squaresize * 10L - xinc*dist_since
_marker;
            else
                newy = (long) amy * map_ptr->squaresize * 10L - yinc*dist_since
_marker;
            robotx = newx, roboty = newy;
            robart.x = (int) (((newx + 5L) / 10L) + map_ptr->squaresize/2) / ma
p_ptr->squaresize;
            robart.y = (int) (((newy + 5L) / 10L) + map_ptr->squaresize/2) / ma
p_ptr->squaresize;
{ long xx, yy;
all_coords(str, robart.x, robart.y, map_ptr);
```

```
   xx = (newx+5L)/10L, yy=(newy+5L)/10L;
printf("New coords: (%ld,%ld)->(%ld'%2ld\",%ld'%2ld\"), robart: %s\n",
        newx, newy,
        xx/12L, xx%12L, yy/12L, yy%12L);
}
        }
        return (0);
}


/* segment_path - convert an array of inflection points to a set of line
 *      segments.
 */
PATHSEG *segment_path(map_ptr, inflect, npnts, pnsegs)
map *map_ptr;
XY_PAIR *inflect;
int npnts, *pnsegs;
{
        byte            floorval;
        int             ii, jj, nsegs;
        int             x,y;
        int             x1,y1, x2,y2;
        int             newx, newy;
        int             savex2, savey2;
        int             status;
        int             sqsize;
        int             segtype;
        int             length, savelength;
        int             stripe_offset_squares;
        int             maxiter;
        double          dx, dy, dlen, stripe_angle;
        PATHSEG         *path;
        LINE_TYPE       line_struc;

        sqsize = map_ptr->squaresize;
        stripe_offset_squares = ((stripe_offset+5)/10 + sqsize/2) / sqsize + 3;
        path = (PATHSEG *) malloc(sizeof(PATHSEG));
        if (path == (PATHSEG *) NULL) {
                return ((PATHSEG *) NULL);
        }
printf("Before segmentation\n");
for (ii = 1; ii < npnts; ii++) {
 printf("%2d: (%3d,%3d) --> (%3d,%3d)\n", ii,inflect[ii-1].x,inflect[ii-1].y,in
flect[ii].x,inflect[ii].y);
}
        for (ii = 0, nsegs = 0; ii < npnts-1; ii++) {
            path = (PATHSEG *) realloc(path, sizeof(PATHSEG)*(nsegs+1));
            if (path == (PATHSEG *) NULL) {
                gstatus("Can't allocate path space -->"); mgetkey();
                return ((PATHSEG *) NULL);
            }
            x1 = path[nsegs].x1 = inflect[ii].x;
            y1 = path[nsegs].y1 = inflect[ii].y;
            x2 = path[nsegs].x2 = inflect[ii+1].x;
            y2 = path[nsegs].y2 = inflect[ii+1].y;

            if (robot_type != LABMATE) {
                path[nsegs].length = 12345;
                path[nsegs++].stripe = 0;
                continue;
            }

printf("Checking out (%3d,%3d) --> (%3d,%3d)\n", x1,y1,x2,y2);

again:
            init_line(&line_struc, x1, y1, x2, y2);
            length = 0;
            if (get_line_point(&line_struc) == 1) {
                goto belch;
            }
            length += sqsize;
            floorval = floor(line_struc.x, line_struc.y, map_ptr);
            if (floorval == STRIPE)
```

```
                segtype = STRIPE;
            else
                segtype = 0;
            path[nsegs].stripe = segtype;
            status = get_line_point(&line_struc);
            if (status == 1)
                goto belch;
            length += sqsize;
            x = line_struc.x, y = line_struc.y;
            status = get_line_point(&line_struc);
            while (status == 0) {
                length += sqsize;
                if (x >= 0 && x < map_ptr->width && y >= 0 && y < map_ptr->heig
ht) {
                    floorval = floor(x, y, map_ptr);
                    if ((segtype == STRIPE && floorval != STRIPE) ||
                        (segtype != STRIPE && floorval == STRIPE)) {

                        /* Next we have to check for stripe burps.  We continue
                         * to iterate along the current path for 3 feet, making
                         * sure that all subsequent floor values are also
                         * STRIPE.  If this is not the case, then we have a
                         * "stripe burp" and we just continue along the current
                         * path.  If the path ends before we have gone 3 feet,
                         * then break out to the main loop (continue).
                         */
                        if (floorval == STRIPE) {
                            maxiter = 36 / sqsize;
                            savelength = length;
                            for (jj = 0; jj < maxiter; jj++) {
                                length += sqsize;
                                if (floor(line_struc.x, line_struc.y, map_ptr)
!= STRIPE)
                                    goto ignore_burp;
                                if ((status = get_line_point(&line_struc)) != 0
)
                                    break;
                            }
                            if (jj != maxiter)
                                continue;
                            length = savelength;
                        }
                        else  {
                                if (length < 36) {
                                        path[nsegs].stripe = 0;
                                        goto ignore_burp;
                                }
                        }
                        path[nsegs].x2 = x, path[nsegs].y2 = y;
                        path[nsegs].length = length;
                        nsegs++;
                        path = (PATHSEG *) realloc(path, sizeof(PATHSEG)*(nsegs
+1));
                        if (path == (PATHSEG *) NULL) {
                            gstatus("Can't allocate path space -->"); mgetkey()
;
                            return ((PATHSEG *) NULL);
                        }
                        x1 = path[nsegs].x1 = x, y1 = path[nsegs].y1 = y;
                        x2 = path[nsegs].x2 = x2, y2 = path[nsegs].y2 = y2;
                        goto again;
                    }
                }
ignore_burp:
                x = line_struc.x, y = line_struc.y;
                status = get_line_point(&line_struc);
            }
belch:
            /* If the length of the path is less than 3 feet, then
             * don't let it be a stripe follower path - it's too short to
             * make it worthwhile.
             */
            if (length < 36)
```

```
                path[nsegs].stripe = 0;
            path[nsegs].length = length;
            nsegs++;
        }

printf("Segmented path: nsegs=%d\n", nsegs);
for (ii = 0; ii < nsegs; ii++)
printf("%3d: (%3d,%3d) --> (%3d,%3d) stripe=%2d length: %3d\"\n", ii,path[ii].x
1,path[ii].y1,path[ii].x2,path[ii].y2,path[ii].stripe,path[ii].length);
        /* Check for stripe segments that need to be shortened.  If a segment
         * leads the robot off the end of a stripe (versus stopping in the
         * middle of the stripe to change directions), then we need to
         * subtract the stripe_offset from the coordinate.
         */
        for (ii = 0; ii < nsegs; ii++) {
            if (path[ii].stripe) {
                /* Calculate the angle of the stripe.  Should be 0, 90,
                 * 180 or 270 (but we keep things in radians to make things
                 * easy).
                 */
                stripe_angle = atan2((double) path[ii].y2 - path[ii].y1, (doubl
e) path[ii].x2 - path[ii].x1);

                /* Calculate how far ahead of the middle of the robot the
                 * stripe will have to extend in order to guarantee that we
                 * don't need to shorten the stripe.
                 */
                x1 = path[ii].x2;
                y1 = path[ii].y2;
                x2 = (stripe_offset_squares * cos(stripe_angle) + x1 + 0.5);
                y2 = (stripe_offset_squares * sin(stripe_angle) + y1 + 0.5);

                /* Now look at the points in the map between the middle of
                 * the robot and the place the stripe follower points at when
                 * it is at the destination position of this segment.  If at
                 * any time there is NOT a stripe there, then we have to
                 * shorten this segment.
                 */
                init_line(&line_struc, x1, y1, x2, y2);
                x = x1, y = y1;
                while (floor(x, y, map_ptr) == STRIPE) {
                        if (get_line_point(&line_struc) == 1)
                            break;
                        x = line_struc.x;
                        y = line_struc.y;
                }

                /* If there isn't a stripe under the current point, then we
                 * have to shorten the stripe segment.  Calculate where the
                 * new endpoint will be.
                 */
                if (floor(x, y, map_ptr) != STRIPE) {
                        dx = (double) (path[ii].x2 - path[ii].x1) * sqsize;
                        dy = (double) (path[ii].y2 - path[ii].y1) * sqsize;
                        dlen = sqrt(dx*dx + dy*dy) - stripe_offset_squares * sq
size;
                        newx = (dlen * cos(stripe_angle) / sqsize + path[ii].x1
 + 0.5);
                        newy = (dlen * sin(stripe_angle) / sqsize + path[ii].y1
 + 0.5);
                        savex2 = path[ii].x2;
                        savey2 = path[ii].y2;
                        path[ii].x2 = newx;
                        path[ii].y2 = newy;
                        path[ii].length = (int) (dlen + 0.5);

                        /* If this is the last segment on the path, then we
                         * will have to add another non-stripe segment to
                         * get us to the destination.
                         */
                        if (ii == nsegs-1) {
                                path = (PATHSEG *) realloc(path, sizeof(PATHSEG
)*(nsegs+1));
```

```
                                if (path == (PATHSEG *) NULL) {
                                        gstatus("Can't allocate path space -->"
); mgetkey();
                                        return ((PATHSEG *) NULL);
                                }
                                path[ii+1].stripe = 0;
                                path[ii+1].length = 0;
                                path[ii+1].x2 = savex2;
                                path[ii+1].y2 = savey2;
                                nsegs++;
                        }
                        path[ii+1].x1 = newx;
                        path[ii+1].y1 = newy;
                        path[ii+1].length += stripe_offset_squares * sqsize;
                }
            }
        }
        *pnsegs = nsegs;

printf("Final segmented path: nsegs=%d\n", nsegs);
for (ii = 0; ii < nsegs; ii++)
printf("%3d: (%3d,%3d) --> (%3d,%3d) stripe=%2d length: %3d\"\n", ii,path[ii].x
1,path[ii].y1,path[ii].x2,path[ii].y2,path[ii].stripe,path[ii].length);
        return (path);
}


/**********************************************************************
 *                      update_stripe_info                            *
 **********************************************************************
 * At the conclusion of a path that followed a stripe, some data is   *
 * returned that we can use to correct the robot's dead-reckoned      *
 * position.  This data is extracted here, though the correction takes *
 * place elsewhere (execute_move).  The format of the packet decoded  *
 * by this routine is:                                                *
 *                                                                    *
 *      9M06<spd><dist><XXXX><YYYY><HHHH><meanHHHH><status><voltage>  *
 * where:                                                             *
 *      spd     2 ASCII bytes.  speed of robot during stripe follow   *
 *      dist    2 ASCII bytes. distance in inches (in hex)            *
 *      XXXX    4 ASCII bytes, representing the X coordinate in tenths *
 *              of inches                                             *
 *      YYYY    4 ASCII bytes, representing the Y coordinate in tenths *
 *              of inches                                             *
 *      HHHH    4 ASCII bytes, robot's current heading, in hundredths *
 *              of degrees                                            *
 *      mHHHH   4 ASCII bytes, robot's average heading during the     *
 *              execution of the stripe following segment             *
 *      status  2 ASCII bytes, current robot status                   *
 *      voltage 2 ASCII bytes, battery voltage (see get_batt_voltage() *
 *              in packet.c)                                          *
 *                                                                    *
 * Call with:                                                         *
 *      map_ptr = (map *) pointer to current map structure            *
 *      pack    = (packet *) packet to be decoded                     *
 *                                                                    *
 * Returns:                                                           *
 *      0                                                             *
 *                                                                    *
 **********************************************************************/
update_stripe_info(map_ptr, pack)
map *map_ptr;
packet *pack;
{
        sscanf(&pack->data[8], "%4lx%4lx%4lx%4lx", &stripe_x,
                &stripe_y, &stripe_heading, &stripe_avg_heading);
        return (0);
}


init_marker_info(map_ptr)
map *map_ptr;
{
```

```
        marker_x = marker_y = 0L;
        nhits = 0;
}


/*********************************************************************
 *                          add_marker_info                          *
 *********************************************************************
 * A marker packet has just been received, so update the current    *
 * marker position.  If the location of the current marker is more  *
 * than 6" away from the current average location, then throw away the *
 * old information and start a new set of data.                      *
 *                                                                   *
 * Marker packet format:                                             *
 *      5<XXXX><YYYY><type>                                          *
 *  where:                                                           *
 *      XXXX    is the X coordinate (in hex) in tenths of inches     *
 *      YYYY    is the Y coordinate (in hex) in tenths of inches     *
 *      type    is the type of marker (two digits), 01 => thin       *
 *              marker, 02 => fat marker                             *
 *                                                                   *
 * Call with:                                                        *
 *      map_ptr = (map *) pointer to current floor map structure     *
 *      pack    = (packet *) marker packet                           *
 *                                                                   *
 * Returns:                                                          *
 *      0                                                            *
 *                                                                   *
 * Modifies the static globals                                       *
 *      marker_x, marker_y, nhits                                    *
 *                                                                   *
 * Gary Gilbreath, 4 Dec 90                                          *
 *                                                                   *
 *********************************************************************/
add_marker_info(map_ptr, pack)
map *map_ptr;
packet *pack;
{
        int     type;
        long    avgx, avgy;
        long    x, y;
        long    dx, dy;
        long    dist;

        sscanf(pack->data, "%*1x%4lx%4lx%2x", &x, &y, &type);
printf("Marker found at (%4ld,%4ld), type %d...", x, y, type);
        if (nhits == 0) {
                marker_x = x, marker_y = y;
                nhits = 1;
                marker_type = type;
        }
        else {
                avgx = (marker_x + (nhits >> 1)) / nhits;
                avgy = (marker_y + (nhits >> 1)) / nhits;
                dx = avgx - x;
                dy = avgy - y;
                dist = dx * dx + dy * dy;
                /* If less than 6" (6" == 60 tenths, 60**2 == 3600) have
                 * gone by since the marker was seen, just add the coordinates
                 * to the marker coordinates.  Otherwise, start a new average.
                 */
                if (dist < 3600L) {     /* less than 6"? */
                        marker_x += x, marker_y += y;
                        nhits++;
                }
                else {
                        marker_x = x, marker_y = y;
                        nhits = 1;
                        marker_type = type;
                }
        }
printf("Average: (%4ld, %4ld) nhits=%d\n", marker_x/nhits, marker_y/nhits, nhit
s);
```

```
        return (0);
}


/* dummy routines for non-cybermotion hardware */
cyber_getstatus() {return (0);}
cyber_joystickmode(map *map_ptr) {return (0);}
cyber_stat2str(char *statstr, int statno) {return (0);}
cyber_set(unsigned int addr, unsigned int compno, unsigned int value) {return (
0);}
cyber_setb(unsigned int addr, unsigned int compno, byte value) {return (0);}
cyber_getmode() {return (0);}
cyber_getxy(int *px, int *py, int *pazimuth) {return (0);}
cyber_setmode(int mode) {return (0);}
cyber_sendprog(void *prog) {return (0);}
cyber_halt() {return (0);}
```

```
/*********************************************************************
 *                              fixed                                *
 *********************************************************************
 * Handle some of the fixed sensor functions, such as reading and    *
 * displaying the coverage areas.                                    *
 *                                                                   *
 *********************************************************************/

#include <stdio.h>
#include <string.h>
#include <math.h>
#include <ega.h>

#define  DOS 1
#include "headers/ibmio.h"


static map *fmap;

static int init_dl_fixed(), deinit_dl_fixed(), update_dl_fixed();

/*********************************************************************
 *                          init_fixed_dl                            *
 *********************************************************************
 * Initialize the fixed sensor display list.                         *
 *                                                                   *
 *********************************************************************/
init_fixed_dl(dl, map_ptr, tab)
DISPLAY_LIST *dl;
map *map_ptr;
SENSOR_TAB *tab;
{
        unsigned int    ii;
        FIXED_SENSOR    *fs;

        if (tab == NULL)
                return (OK);

        fmap = map_ptr;
        for (ii = 0; ii < tab->nsensors; ii++) {
            fs = &tab->sensors[ii];
            add_dl_item(dl, (void *) fs, sizeof(FIXED_SENSOR), DL_BLINK,
                init_dl_fixed, deinit_dl_fixed, NULL,
                NULL, update_dl_fixed, NULL);
        }
        return (OK);
}


static int init_dl_fixed(fs)
FIXED_SENSOR *fs;
{
        mouse_off();
        draw_fixed_sensor(fmap, fs, GRAY);
        mouse_on();
        return (OK);
}


static int deinit_dl_fixed(fs)
FIXED_SENSOR *fs;
{
        return (OK);
}


static int update_dl_fixed(ofs, nfs, on)
FIXED_SENSOR *ofs, *nfs;
int on;
{
        /* If they're both off, don't worry about it, the sensor has already
         * been turned off, so don't do it again.
         */
```

```
        if (!ofs->sensor_status && !nfs->sensor_status)
                return (OK);

        /* Either both are on (in which case we're probably blinking) or
         * the old and new states are different.  If we want to display it
         * and the new value says we should, then draw it in the appropriate
         * color.  Otherwise we're done.
         */
        mouse_off();
        draw_fixed_sensor(fmap, nfs, GRAY);
        if (on && nfs->sensor_status)
            draw_fixed_sensor(fmap, nfs, nfs->sensor_id + 2);
        mouse_on();
        return (OK);
}


#define LPT_DATA_PORT   0x378
#define LPT_STATUS_PORT (LPT_DATA_PORT+1)

/*********************************************************************
 *                              read_fixed                           *
 *********************************************************************
 * Read the status of all the fixed sensors.  Currently uses a crude *
 * scheme hooked up to the parallel port status bits.  Works by tog- *
 * gling bit 0 of the output port and then looking for a status bit  *
 * that changes in response.  Bits are numbered as follows:          *
 *                                                                   *
 * Sensor ID    Printer Name    Pin #    Mask                        *
 *    0             BUSY         11      10000000                    *
 *    1             -ACK         10      01000000                    *
 *    2              PE          12      00100000                    *
 *    3             SLCT         13      00010000                    *
 *    4            -ERROR        15      00001000                    *
 *                                                                   *
 *********************************************************************/
read_fixed(tab)
SENSOR_TAB *tab;
{
        unsigned char   mask;
        unsigned char   first, second;
        unsigned int    ii;

        if (tab == NULL)
                return (OK);

        mask = 0x80;
        for (ii = 0; ii < tab->nsensors; ii++) {
            outp(LPT_DATA_PORT, 0x01);
            first = inp(LPT_STATUS_PORT) & mask;
            outp(LPT_DATA_PORT, 0x00);
            second = inp(LPT_STATUS_PORT) & mask;

            /* Use exclusive-or to see if there was a change, indicating that
             * the sensor is in the alarmed state.  If there was no change,
             * the sensor is not alarmed.
             */
            if (first ^ second)         /* contact intact (no alarm)? */
                tab->sensors[ii].sensor_status = 0;
            else                        /* contact broken => alarm */
                tab->sensors[ii].sensor_status = 1;
            switch (mask) {
            case 0x80:
                mask = 0x10; break;
            case 0x10:
                mask = 0x08; break;
            case 0x08:
                mask = 0x40; break;
            case 0x40:
                mask = 0x20; break;
            }
        }
        return (OK);
```

Apr 04 1991 09:12:04 fixed.c Page 3

```
}
```

```
/**********************************************************************
 *                         Collision Sonar Plot Stuff                  *
 **********************************************************************
 * The routines in this file handle mapping the returns from the col-  *
 * lision avoidance sonar ring and what to do when the robot returns   *
 * obstacle detected status.                                           *
 *                                                                     *
 **********************************************************************/

#include <stdio.h>
#include <malloc.h>
#include <stdlib.h>
#include <ega.h>
#include <event.h>

#include "headers/ibmio.h"


#define MAX_OBS_RANGE   (20*12) /* Maximum range of objects to pay attention to
 */

extern drType   robart;

extern int oa_override;

/* Define the data structure for each sonar return point plotted. */
typedef struct nav_son_struct {
        int distance, x, y, color;
} OBS_SONAR_TYPE;

/* Allocate array to contain each one of the sonar returns. */
static OBS_SONAR_TYPE sonar_data[OBS_SONAR_NUM];

/* dont_plot is set every time a new leg is started.  When dont_plot
 * is set, the obstacle avoidance sonar returns aren't plotted.  This is
 * necessary because the first packet returned is always the one from the
 * previous request, and therefore contains out-of-date information.
 */
static int dont_plot;

/* init_plot_nav - initialize navigation sonar plotter */
init_plot_nav()
{
        int ii;

        dont_plot = YES;
        for (ii = 0; ii < OBS_SONAR_NUM; ii++) {
                sonar_data[ii].distance = 0;
                sonar_data[ii].x = sonar_data[ii].y = -1;
        }
        return (OK);
}


/* plot_nav_sonar - plot the navigation sonar returns
 *
 * Call with:
 *      map_ptr     = (map *) current map
 *      nav_packet  = (packet *) collision avoidance sonar packet to map
 *      rx,ry       = (int) current position of the robot
 *
 * Returns:
 *      OK          if successfully plotted
 *      OBSTACLE    if an obstacle within the stop distance (currently ignored)
 */
plot_nav_sonar(map_ptr, nav_packet, rx, ry)
map *map_ptr;
packet *nav_packet;
int rx, ry;
{
        byte    raw_son_dist[OBS_SONAR_NUM];
        int     sonar_dist[OBS_SONAR_NUM];
        int     ii;
```

```
        int     x, y, range, dir;
        int     sx, sy;
        int     scale, sqsize;
        int     return_value;
        int     expand_range;
        static int      sonar_angle[OBS_SONAR_NUM] = {
                        OBS_SON_SPACING*4,
                        OBS_SON_SPACING*3,
                        OBS_SON_SPACING*2,
                        OBS_SON_SPACING,
                        0,
                        360-OBS_SON_SPACING,
                        360-OBS_SON_SPACING*2,
                        360-OBS_SON_SPACING*3,
                        360-OBS_SON_SPACING*4
        };

        static int      stop_distance[OBS_SONAR_NUM] = {
                        12,
                        15,
                        19,
                        22,
                        24,
                        22,
                        19,
                        15,
                        12
        };

        return_value = OK;
        if (dont_plot) {                        /* if don't want to plot this one */
            dont_plot = NO;                     /* reset so we'll plot next time */
            return (OK);                        /* skip the rest of the code */
        }

        /*
         * First, replace the old pixels.
         */
        scale = map_ptr->scale;
        sqsize = map_ptr->squaresize;

        decode_nav_packet(nav_packet, raw_son_dist);    /* get raw sonar output
 */
        scale_nav_data(sonar_dist, raw_son_dist);       /* convert to inches */

        expand_range = YES;                     /* assume we can re-expand the detectio
n envelope */

        for (ii = 0; ii < OBS_SONAR_NUM; ii++) {
                /* Go to XOR mode */
                gpmerge(MXOR);
                range = sonar_dist[ii];
                dir   = sonar_angle[ii];

                /* If current value is outside of range, erase the old point
                 * if necessary (distance != 0), set the distance to 0 and
                 * go on to the next sonar.
                 */
                if (range == 0 || range > MAX_OBS_RANGE) {
                        if (sonar_data[ii].distance) {
                                ScalePoint(map_ptr, sonar_data[ii].x, sonar_dat
a[ii].y, WHITE);
                        }
                        sonar_data[ii].distance = 0;
                        continue;
                }

                /*
                 * Convert the polar coordinate to X-Y coordinates, relative
                 * to the current robot position.
                 */
                Calc_Dest_Grid_Unit(dir, (double) range, &x, &y, sqsize);
```

```
#if 0
                /* If X-Y value same as last time, leave it alone */
                if ((x == sonar_data[ii].x) && (y == sonar_data[ii].y))
                        ;
                else {
#endif
                        /* Erase old sonar plot */
                        if (sonar_data[ii].distance)
                                ScalePoint(map_ptr, sonar_data[ii].x, sonar_dat
a[ii].y, WHITE);
#if 0
                }
#endif

#if 0
                /*
                 * Clear out any old points that are within the current range
                 * of the sensor.
                 */
                if ((ii & 0x03) == 0) {         /* clear only two outside and c
enter sonars */
                        gpmerge(MRPL);
                        clear_path(map_ptr, rx, ry, dir, range);
                }
#else
                gpmerge(MRPL);
                clear_path(map_ptr, rx, ry, dir, range);
#endif
                gpmerge(MXOR);
                /*
                 * If the point is displayable on the current map, add the
                 * map offset in, get the current color of that square,
                 * and plot the point.
                 */
                if (Clip_To_Map(x, y, map_ptr)) {
                        sx = sonar_data[ii].x = x;
                        sy = sonar_data[ii].y = y;
                        sonar_data[ii].distance = range;

                        /*
                         * If the point is within 6 feet and the floor map
                         * shows the return as being free space, plot the
                         * point on the screen and update the map.
                         */
                        if (range < 60) {

                                /* Mark a large portion of the map as having
                                 * an obstacle.
                                 */
                                gpmerge(MRPL);
                                mark_map(x, y, map_ptr, dir, range);
                                gpmerge(MXOR);

                                /*
                                 * If the current range is inside the stopping
                                 * distance, then we can't reset oa_override
                                 * to zero.  Otherwise, if we get all the
                                 * way through all the sensors and they were
                                 * all outside the stopping distance, then we
                                 * can re-expand the detection range.
                                 */
                                if (range <= stop_distance[ii])
                                        expand_range = NO;
                                /*
                                 * If the current range is less than that
                                 * given in the stop_distance array, assume
                                 * there is an obstacle there and return
                                 * that status.  The oa_override value is
                                 * set by the obstacle avoidance path planner
                                 * to decrease the detection range so that
                                 * the robot won't get stuck in cramped
                                 * places.
                                 */
```

```
                                if (range <= stop_distance[ii] - oa_override) {
                                        return_value = OBSTACLE;
                                }
                        }

                        /* Plot the new point */
                        ScalePoint(map_ptr, sx, sy, WHITE);

                }
                else {  /* Not on map, make sure we don't "restore" it next tim
e */
                        sonar_data[ii].distance = 0;
                }
        }

        if (expand_range)                       /* no obstacles within the default enve
lope */
                oa_override = 0;                /* re-expand detection range */
        gpmerge(MRPL);
        return (return_value);
}


/* deinit_plot_nav - restore the old pixel values */
deinit_plot_nav(map_ptr)
map *map_ptr;
{
        int     ii, scale;

        /*
         * Restore the old pixels.
         */
        gpmerge(MXOR);
        scale = map_ptr->scale;
        for (ii = 0; ii < OBS_SONAR_NUM; ii++) {
                if (sonar_data[ii].distance) {
                        ScalePoint(map_ptr, sonar_data[ii].x, sonar_data[ii].y,
WHITE);
                }
        }
        gpmerge(MRPL);
        return (OK);
}




#if 1
/* mark_map - Mark the given portion of the map along with the surrounding
 *      points as being obstacles.
 */
mark_map(x, y, map_ptr, dir, range)
int x, y;
map *map_ptr;
int dir, range;
{
        int     xx, yy;
        int     width;
        byte    *bp;

        width = map_ptr->width;
        for (xx = x - 1; xx <= x+1; xx++) {
            for (yy = y-1; yy <= y+1; yy++) {
                /*
                 * If the point is on the map
                 */
                if (Clip_To_Map(xx, yy, map_ptr)) {
                    /*
                     * Point to current floor map cell
                     */
                    bp = map_ptr->mem_ptr + xx + width*yy;

                    /* If it's not a sonar return, check the next point */
```

```
                        if (*bp > 127)
                            continue;

                        /*
                         * If the point hasn't been plotted before, plot it on
                         * the screen.
                         */
#if 0
                        if (*bp == CLEAR)
                            ScalePoint(map_ptr, xx, yy, WHITE);
#endif
                        /*
                         * If this is the center of attention, bump the
                         * index three times.  Otherwise, only bump it twice.
                         */
                        *bp += 1;
                        if (xx == x && yy == y)      /* center of attention? */
                            (*bp)++;                 /* bump it again */
                        if (*bp > MAX_FLOOR_VAL)     /* greater than max? */
                            *bp = MAX_FLOOR_VAL;     /* force back to max */
#if 1
                        ScalePoint(map_ptr, xx, yy, get_obj_color(*bp));
#endif
                    }
                }
            }
        return (OK);
}


#else

/* mark_map - Mark the given portion of the map at the given range at each
 *      point 5 degrees to other side as being obstacles.
 */
mark_map(x, y, map_ptr, dir, range)
int x, y;
map *map_ptr;
int dir, range;
{
        int             x1, y1, x2, y2;
        int             xx, yy;
        int             width;
        int             end_of_line;
        byte            *bp;
        LINE_TYPE       line;

        width = map_ptr->width;
        Calc_Dest_Grid_Unit(dir-5, (double) range, &x1, &y1, map_ptr->squaresize);
        Calc_Dest_Grid_Unit(dir+5, (double) range, &x2, &y2, map_ptr->squaresize);
        init_line(&line, x1, y1, x2, y2);

        end_of_line = NO;

        while (!end_of_line) {
            xx = line.x;
            yy = line.y;
            if (Clip_To_Map(xx, yy, map_ptr)) {
                /*
                 * Point to current floor map cell
                 */
                bp = map_ptr->mem_ptr + xx + width*yy;

                /*
                 * If the point hasn't been plotted before, plot it on
                 * the screen.
                 */
                if (*bp == CLEAR)
                        ScalePoint(map_ptr, xx, yy, WHITE);
                /*
                 * If this is the center of attention, bump the
```

```
                 * index twice.  Otherwise, only bump it once.
                 */
                if (*bp < MAX_FLOOR_VAL) {      /* less than max? */
                    *bp += 3;
                    if (*bp > MAX_FLOOR_VAL)
                        *bp = MAX_FLOOR_VAL;
                }

            }
            end_of_line = get_line_point(&line);
        }
        return (OK);
}

#endif


#ifndef POLYFILLALG
/* clear_path - clear out the path in front of the current sonar
 *
 * Call with:
 *      map_ptr = (map *) current map
 *      x,y     = (int) current location of robot
 *      dir     = (int) direction the current sonar is facing
 *      range   = (int) distance to obstacle returned by current sonar
 *
 * Returns:
 *      OK      always
 */
clear_path(map_ptr, x, y, dir, range)
map *map_ptr;
int x, y, dir, range;
{
        int             x1, y1, x2, y2;
        int             xx, yy, cx, cy;
        int             width;
        int             end_of_line;
        int             length;
        byte            *bp;
        LINE_TYPE       bline, cline;

        width = map_ptr->width;

        length = 48;
        if (range <= (48 - map_ptr->squaresize))
                length = range - map_ptr->squaresize;

        Calc_Dest_Grid_Unit(dir-5, (double) length, &x1, &y1, map_ptr->squaresize);
        Calc_Dest_Grid_Unit(dir+5, (double) length, &x2, &y2, map_ptr->squaresize);

        init_line(&bline, x1, y1, x2, y2);

        end_of_line = NO;

        while (!end_of_line) {
                xx = bline.x;
                yy = bline.y;

                /*
                 * Decrement all the points along the line from the
                 * robot's current position to just short of the current
                 * range.  This should help refine the description of
                 * objects in the map.
                 */
                init_line(&cline, x, y, xx, yy);
                end_of_line = NO;
                while (!end_of_line) {
                    cx = cline.x;
                    cy = cline.y;

                    /* Don't clear the last point on the line */
```

Apr 04 1991 09:24:24 ca.c Page 7

```
                        if (cx == xx && cy == yy)
                            break;
                        bp = map_ptr->mem_ptr + cx + width*cy;
                        if (*bp && *bp < 128) {
                            (*bp)--;
#if 0
                            if (*bp == 0)
                                ScalePoint(map_ptr, cx, cy, BLACK);
#else
                            ScalePoint(map_ptr, cx, cy, get_obj_color(*bp));
#endif
                        }
                        end_of_line = get_line_point(&cline);
                    }
                    end_of_line = get_line_point(&bline);
            }
            return (OK);
}

#else

static map      *mp;
/* clear_path - clear out the path in front of the current sonar
 *
 * Call with:
 *          map_ptr = (map *) current map
 *          x,y     = (int) current location of robot
 *          dir     = (int) direction the current sonar is facing
 *          range   = (int) distance to obstacle returned by current sonar
 *
 * Returns:
 *          OK      always
 */
clear_path(map_ptr, x, y, dir, range)
map *map_ptr;
int x, y, dir, range;
{
            int             x1, y1, x2, y2;
            int             xx, yy, cx, cy;
            int             width;
            int             end_of_line;
            int             length;
            byte            *bp;
            LINE_TYPE       bline, cline;
            POLYGON         wedge;
            XY_PAIR         vert[3];
            int             clr_line();

            mp = map_ptr;
            wedge.npoints = 3;
            wedge.points = vert;
            width = map_ptr->width;

            length = 48;
            if (range <= (48 - map_ptr->squaresize))
                    length = range - map_ptr->squaresize;

            Calc_Dest_Grid_Unit(dir-5, (double) length, &x1, &y1, map_ptr->squaresi
ze);
            Calc_Dest_Grid_Unit(dir+5, (double) length, &x2, &y2, map_ptr->squaresi
ze);

            vert[0].x = x;
            vert[0].y = y;
            vert[1].x = x1;
            vert[1].y = y1;
            vert[2].x = x2;
            vert[2].y = y2;

            FillPolygon(&wedge, clr_line, 0);
            return (0);
}
```

Apr 04 1991 09:24:24 ca.c Page 8

```
clr_line(x1, y1, x2, y2, color)
register int x1, y1, x2, y2, color;
{
        byte    *bp;

        if (x1 > x2) {
                x1 ^= x2; x2 ^= x1; x1 ^= x2;
        }
        bp = mp->mem_ptr + x1 + mp->width*y1;
        for (; x1 <= x2; x1++) {
                if (*bp && *bp < 128) {
                    (*bp)--;
                    if (*bp == 0)
                        ScalePoint(mp, x1, y1, BLACK);
                }
        }
        return (OK);
}
#endif


/* grow_oa_map - grow the obstacle avoidance map by 1.  Increments all
 *      the unoccupied cells bordering occupied cells by 1.  Map growth
 *      and obstacles are not grown, just those cells that were marked
 *      with sonar returns (cell values between 1 and 127 inclusive).
 */
grow_oa_map(map_ptr)
map *map_ptr;
{
        int     width, height;
        int     x, y;
        int     xx, yy, ii;
        byte    *bp;
        extern char x_angle[8], y_angle[8];     /* see pathplan.c */

        width = map_ptr->width;
        height = map_ptr->height;

        for (x = 0; x < width; x++) {
            for (y = 0; y < height; y++) {
                bp = map_ptr->mem_ptr + x + y * width;

                /* If the current cell is a sonar return, then... */
                if (*bp > 1 && *bp < 128) {
                    /*
                     * Increment all the unoccupied adjacent neighbors.
                     */
                    for (ii = 0; ii < 8; ii++) {
                        xx = x + x_angle[ii];   /* re-use the path planner arra
ys */
                        yy = y + y_angle[ii];
                        if (Clip_To_Map(xx, yy, map_ptr)) {
                            bp = map_ptr->mem_ptr + xx + yy * width;
                            if (*bp == 0)
                                (*bp)++;
                        }
                    }
                }
            }
        }
        return (OK);
}


/* inc_map - increase the value of all non-zero cells in the map by the
 *      given amount.
 */
inc_map(map_ptr, inc_val)
map *map_ptr;
int inc_val;
{
        unsigned int ii;
        unsigned int nbytes;
```

```
        byte *bp;

        bp = map_ptr->mem_ptr;                      /* point to map */
        nbytes = map_ptr->width * map_ptr->height;
        for (ii = 0; ii < nbytes; ii++, bp++) {
                if (*bp && *bp < 128) { /* if not clear and not special cell */
                        /*lint -e734 */
                        *bp += inc_val;     /* adjust the value of the cell */
                        /*lint +e734 */
                        if (inc_val > 0) {  /* did we increment the value? */
                            if (*bp >= 128) /* is it greater than the max allowed?
*/
                                *bp = 127;  /* clip it at 127 */
                        }
                        else {              /* decremented the cell value */
                            if (*bp >= 128) /* decremented below 0? */
                                *bp = 0;    /* force to 0 */
                        }
                }
        }
        return (OK);
}
```

Apr 04 1991 09:24:24 cellist.c Page 1

```
/*********************************************************************
 *                              cellist.c                            *
 *********************************************************************
 * This file contains several routines for manipulating the "cell   *
 * lists" used by the A* search algorithm.  Most functions are fairly *
 * generic for linked lists, the only exception being sub_list(),    *
 * which extracts a sub-list out of a larger list.                   *
 *                                                                   *
 * Gary Gilbreath 10 Jan 90                                          *
 *                                                                   *
 *********************************************************************/


#include <stdio.h>
#include <malloc.h>
#include "cellist.h"



/*********************************************************************
 *                            create_cellist                         *
 *********************************************************************
 * Create a cell list prior to it being used.                        *
 *                                                                   *
 * Returns:                                                          *
 *      A pointer to an initialized cell list                        *
 *                                                                   *
 *********************************************************************/
CELLIST *create_cellist()
{
        CELLIST *cl;

        cl = (CELLIST *) malloc(sizeof(CELLIST));
        if (cl == NULL)
                return (NULL);
        cl->top = cl->cur = NULL;
        cl->ncells = 0;
        return (cl);
}



/*********************************************************************
 *                              add_cellist                          *
 *********************************************************************
 * Add a cell to an existing cell list.                              *
 *                                                                   *
 * Call with:                                                        *
 *      cl       = (CELLIST *) pointer to list to add cell to        *
 *      x,y      = (int) x-y location of the cell                    *
 *      parent   = (unsigned char) arrow pointing to this cell's parent *
 *      distance = (int) Manhattan distance traveled thus far to get *
 *                    to this cell                                   *
 *      cost     = (int) estimated cost of the path passing through  *
 *                    this cell                                      *
 *                                                                   *
 * Returns:                                                          *
 *      0       if successful                                        *
 *      -1      if an invalid cell list                              *
 *      -2      if unable to allocate space for the cell             *
 *                                                                   *
 *********************************************************************/
add_cellist(cl, x, y, parent, distance, cost)
CELLIST *cl;
int x, y;
unsigned char parent;
int distance, cost;
{
        CELL    *c, *nc;

        if (cl == NULL)
                return (-1);
        c = (CELL *) malloc(sizeof(CELL));
```

Apr 04 1991 09:24:24 cellist.c Page 2

```
        if (c == NULL)
                return (-2);

        /* Update the parameters for this cell */
        c->x = x;
        c->y = y;
        c->parent = parent;
        c->distance = distance;
        c->cost = cost;
        c->next = NULL;         /* this will always be the last cell */

        if (cl->top == NULL) {  /* first cell on the list? */
                cl->top = c;    /* make it the top cell */
                cl->cur = c;    /* ...and the current cell */
        }
        else {                  /* find the end of the cell list */
                nc = cl->top;
                while (nc->next != NULL)
                        nc = nc->next;
                nc->next = c;   /* c is now the last cell */
        }
        cl->ncells++;
        return (0);
}


/*********************************************************************
 *                              del_cellist                          *
 *********************************************************************
 * Delete the given cell from the cell list.                         *
 *                                                                   *
 * Call with:                                                        *
 *      cl      = (CELLIST *) cellist to delete the cell from        *
 *      cd      = (CELL *) pointer to cell to delete                 *
 *                                                                   *
 * Returns:                                                          *
 *      0       if successful                                        *
 *      -1      if an invalid cell list                              *
 *      -2      if cell not found                                    *
 *                                                                   *
 *********************************************************************/
del_cellist(cl, cd)
CELLIST *cl;
CELL *cd;
{
        CELL    *c, *prev;

        if (cl == NULL)
                return (-1);
        if (cl->top == NULL)
                return (-1);

        /* Search for a cell that matches the one we want to get rid of. */
        prev = c = cl->top;
        while (c != NULL && c != cd) {
                prev = c;
                c = c->next;
        }
        if (c == NULL)                  /* cell not found? */
                return (-2);            /* return error code */

        /* If the cell to be deleted is the first one in the list, it's a
         * special case, so handle it.
         */
        if (c == cl->top) {
                cl->top = c->next;      /* point to next item */
                if (cl->cur == c)       /* was it the current item too? */
                        cl->cur = cl->top;      /* update current */
        }
        else {
                prev->next = c->next;
                if (c == cl->cur)
                        cl->cur = prev;
```

```
	}
	free(c);
	cl->ncells--;
	return (0);
}


/*********************************************************************
 *                          get_first_cell                           *
 *********************************************************************
 * Return a pointer to the first cell in the cell list.             *
 *                                                                   *
 * Call with:                                                        *
 *      cl      = (CELLIST *) cell list to look at                  *
 *                                                                   *
 * Returns:                                                          *
 *      A pointer to the first cell on the list                     *
 *      NULL if the cell list is invalid or empty                    *
 *                                                                   *
 *********************************************************************/
CELL *get_first_cell(cl)
CELLIST *cl;
{
	if (cl == NULL)
		return (NULL);
	cl->cur = cl->top;		/* current cell now the first */
	return (cl->top);
}



/*********************************************************************
 *                           get_next_cell                           *
 *********************************************************************
 * Return a pointer to the next cell in the cell list.              *
 *                                                                   *
 * Call with:                                                        *
 *      cl      = (CELLIST *) cell list to look at                  *
 *                                                                   *
 * Returns:                                                          *
 *      A pointer to the next cell on the list                      *
 *      NULL if the cell list is invalid or there are no more cells on *
 *      the list                                                     *
 *                                                                   *
 *********************************************************************/
CELL *get_next_cell(cl)
CELLIST *cl;
{
	if (cl == NULL)
		return (NULL);
	if (cl->cur == (CELL *) NULL)
		return (NULL);
	cl->cur = cl->cur->next;
	return (cl->cur);
}


/*********************************************************************
 *                              sub_list                             *
 *********************************************************************
 * Create a sub-list of all the cells from <cl> that have the given *
 * cost.  All the cells with the given cost will be removed from <cl> *
 * and put on <sl> instead.  A pointer to the new sub-list is returned. *
 *                                                                   *
 * Call with:                                                        *
 *      cl      = (CELLIST *) pointer to list to make a sub-list from *
 *      cost    = (int) cost of cells to put on sub-list            *
 *                                                                   *
 * Returns:                                                          *
 *      pointer to sub-list containing cells with cost <cost>       *
 *      NULL if an error or no cells with the given cost            *
 *                                                                   *
 *********************************************************************/
```

```
CELLIST *sub_list(cl, cost)
CELLIST *cl;
int cost;
{
	CELLIST *sl;
	CELL    *c, *prev;

	if (cl == NULL)
		return (NULL);
	if (cl->top == NULL)
		return (NULL);

	sl = create_cellist();
	if (sl == NULL)
		return (NULL);

	prev = c = cl->top;
	while (c != NULL) {
	    if (c->cost <= cost) {			/* find one? */

		/* If this is the first cell on the new sub-list, then make
		 * sure that top points to this cell.
		 */
		if (sl->top == NULL) {
		    sl->top = sl->cur = c;
		    sl->ncells = 1;
		}
		else {
		    sl->cur->next = c;	/* append to current list */
		    sl->cur = c;	/* point to last cell in list */
		    sl->ncells++;	/* bump cell count */
		}

		/* The next statement removes <c> from the current list. */
		prev->next = c->next;
		if (c == cl->top)
			prev = cl->top = c->next;
		cl->ncells--;
	    }
	    else {
		prev = c;				/* remember where we came from
*/
	    }
	    c = c->next;			/* go to next cell */
	}
	cl->cur = cl->top;
	if (sl->cur != NULL)
		sl->cur->next = NULL;	/* terminate the cell list */
	if (sl->ncells == 0) {
		free(sl);
		return (NULL);
	}
	sl->cur = sl->top;			/* start off at beginning of list */
	return (sl);
}


/*********************************************************************
 *                          destroy_cellist                          *
 *********************************************************************
 * Free up all the memory occupied by the given cell list.          *
 *                                                                   *
 * Call with:                                                        *
 *      cl      = (CELLIST *) cell list delete                      *
 *                                                                   *
 * Returns:                                                          *
 *      0       if successful                                       *
 *      -1      if cell list is invalid                             *
 *                                                                   *
 *********************************************************************/
destroy_cellist(cl)
CELLIST *cl;
{
```

Apr 04 1991 09:24:24 cellist.c Page 5

```
        CELL    *c, *p;

        if (cl == NULL)
                return (-1);
        c = cl->top;
        while (c != NULL) {
                p = c;
                c = c->next;
                free(p);
        }
        free(cl);
        return (0);
}

#define DEBUG
#ifdef DEBUG
dump_cellist(cl)
CELLIST *cl;
{
        CELL *c;

        printf("list:%p top=%p cur=%p ncells=%d\n",cl,cl->top,cl->cur,cl->ncells);

        c = cl->top;
        while (c != (CELL *)NULL) {
                printf("%p: (%d,%d) cost=%d\n",c,c->x,c->y,c->cost);
                c = c->next;
        }
        return (0);
}
#endif
```

Apr 04 1991 09:24:24 deadreck.c Page 1

```
/*********************************************************************
 *                          deadreck                                 *
 *********************************************************************
 * This package implements the (temporary) dead reckoning software.  *
 * It depends completely on some empirically derived constants and   *
 * simplified acceleration/deceleration profiles.  The derivation    *
 * follows:                                                          *
 *                                                                   *
 *     Velocity    |                                                 *
 *    (inches/sec) |--t --|-----t ----|--t --|                       *
 *                 |   a  |      t    |   d  |                       *
 *              v +       +-----------+                              *
 *               f|      /             \     |                       *
 *                |     /               \    |                       *
 *                |    /                 \   |                       *
 *                |   / a               a \  |                       *
 *                |  /  a                d \ |                       *
 *                | /                       \|                       *
 *                +------+-----------+------+--------                *
 *                t      t           t      t    Time                *
 *                 0      1           2      3 (seconds)             *
 *                                                                   *
 *                                                                   *
 * The acceleration time, ta, is                                     *
 *                                                                   *
 * (1)                      t  = v  / a                              *
 *                           a    f    a                             *
 *                                                                   *
 * and similarly, the deceleration time, td, is                      *
 *                                                                   *
 * (2)                      t  = v  / a                              *
 *                           d    f    d                             *
 *                                                                   *
 * The distance to be traveled (d) and the velocity of travel (vf)   *
 * are known before-hand, so we can derive the travel time (tt) using*
 * the equation for distance:                                        *
 *                                          2                        *
 * (3)                      d = 0.5 * a * t  + v * t                 *
 *                                              1                    *
 *                                                                   *
 * As shown in the figure above, the problem can be broken into      *
 * three parts: the acceleration phase (t0 - t1), the constant velo- *
 * city phase (t1 - t2), and the deceleration phase (t2 - t3).  Using*
 * the equation given above for each part and combining them all into*
 * one equation, we get:                                             *
 *                             2                 2                   *
 * (4)              d = 0.5*a t  + v t  + 0.5*a t                    *
 *                          a a     f t         d d                  *
 *                                                                   *
 * The only unknown is tt, so solving for tt we get                  *
 *                                                                   *
 *                                  2            2                   *
 *                      d - (0.5*a t  + 0.5*a t  )                   *
 *                                a a          d d                   *
 * (5)              t  = ----------------------------                *
 *                   t                  v                            *
 *                                       f                           *
 *                                                                   *
 *                                                                   *
 * Finally, we have equations for each of the inflection times:      *
 *                                                                   *
 * (6)  t  = t  + t      (7)  t  = t  + t       (8) t  = t  + t      *
 *       1    0    a           2    1    t           3    2    d     *
 *                                                                   *
 *                                                                   *
 * The only remaining difficulty arises when the acceleration and    *
 * deceleration curves overlap, as shown below                       *
 *                                                                   *
 *      Velocity   |                                                 *
 *    (inches/sec) |--t --|--t --|                                   *
 *                 |   a  |   d  |                                   *
 *              v +       +      |                                   *
 *               f|      / \     |                                   *
```

Apr 04 1991 09:24:24 deadreck.c Page 2

```
 *                |    /   \    |                                    *
 *                |   /     \   |                                    *
 *                |  / a   a \  |                                    *
 *                | /   a   d \ |                                    *
 *                |/           \|                                    *
 *                +------+------+--------                            *
 *                t      t      t     Time                           *
 *                 0      1      2   (seconds)                       *
 *                                                                   *
 *                                                                   *
 * We use equation (4), but without the constant velocity term vf:   *
 *                             2          2                          *
 * (9)              d = 0.5*a t  + 0.5*a t                           *
 *                          a a          d d                         *
 *                                                                   *
 * Substituting (1) and (2) into the equation and simplifying, we get*
 *                                                                   *
 *                               2     2                             *
 *                              v     v                              *
 *                               f     f                             *
 * (10)             d  = 0.5 * (--- + ---)                           *
 *                              a     a                              *
 *                               a     d                             *
 *                                                                   *
 * and finally, solving for vf,                                      *
 *                                                                   *
 *                             ------------                          *
 *                            /                                      *
 *                           / 2d * a a                              *
 * (11)             v   =   /        a d                             *
 *                   f     /  ----------                             *
 *                      \  /    a  + a                               *
 *                       \/      a    d                              *
 *                                                                   *
 *                                                                   *
 *                                                                   *
 * Author: Gary Gilbreath  29 Jun 88                                 *
 *                                                                   *
 *********************************************************************/


#include <stdio.h>
#include <math.h>
#include "headers/ibmio.h"

#ifndef PI
#define PI   3.14159265358979323846
#endif

/* The velocity table.  Index is the commanded Robart speed, value in the
 * table is the actual velocity in inches per second.
 */
float   vel_table[16] = {
          0.0,    1.07,   2.46,   3.87,
          5.27,   6.66,   8.06,   9.47,
          10.87,  12.29,  13.68,  15.29,
          15.29,  15.29,  15.29,  15.29
};


/* Acceleration table.  Index is the commanded Robart speed, the value in
 * the table is the acceleration for that speed.
 */
static float    acc_table[16] = {
          0.01,   1.10,   2.59,   3.78,
          5.14,   6.83,   8.48,   8.81,
          5.65,   10.92,  11.40,  11.33,
          11.33,  11.33,  11.33,  1.0
};

/* Deceleration table.  Index is the commanded Robart speed, the value in
 * the table is the deceleration for that speed.
 */
```

```
static float    dec_table[16] = {
                0.01, 100.00,  1.23,   1.58,
                1.63,  2.32,   2.00,   2.83,
                2.82,  5.27,   5.53,   6.06,
                6.06,  6.06,   6.06,   0.5
};

static  long    epoch;                  /* time dead reckoning started, t0 */
static  long    epoch_x, epoch_y;       /* position at start of dead reckoning
*/
static  long    t1, t2;                 /* end of acc, begin of decel times */
static  int     acc_x, acc_y,           /* position when acceleration stopped *
/
                const_x, const_y;       /* position when deceleration began */

static  double  sinval, cosval;

static double   vf;
static double   ta, td;
static double   acceleration, deceleration;

extern int map_direction;
extern char warp_mode;
extern int warp_speed;

extern unsigned long    mstime();


static int debug = 0;

init_deadreck(start_x, start_y, dir, distance, speed, dscale)
int start_x, start_y, dir;
int distance, speed;
int dscale;
{
        double  rads;
        double  tt;

        if (debug)
                printf("init_deadreck(%d, %d, %d, %d, %d, %d)\n",
                        start_x, start_y, dir, distance, speed, dscale);

        epoch = mstime();               /* get time dead reckoning started */
        epoch_x = acc_x = const_x = start_x;
        epoch_y = acc_y = const_y = start_y;

        if (speed < 0 || speed >= sizeof(vel_table)) {
                vf = 0.0;
                acceleration = deceleration = 0.0;
                return (-1);
        }
        vf = vel_table[speed];          /* get values from table */
        acceleration = acc_table[speed];
        deceleration = dec_table[speed];

        /* If user is simulating, make the robot run artificially fast */
        if (warp_mode) {
                vf *= warp_speed;
                acceleration *= warp_speed;
                deceleration *= warp_speed;
        }

        /* Calculate acceleration and deceleration times */
        ta = vf / acceleration;
        td = vf / deceleration;

        if (debug)
                printf("acc=%g, dec=%g, vf=%g, ta=%g, td=%g\n",
                        acceleration, deceleration, vf, ta, td);

        distance *= dscale;             /* convert to inches */
        /* Calculate the constant velocity travel time */
        tt = (distance - 0.5*(acceleration * ta*ta + deceleration * td*td))/vf;
```

```

        if (debug)
                printf("tt = %g\n", tt);

        /* If tt is <= 0, then we have the degenerate case where the ac-
         * celeration and deceleration curves overlap.  So we have to figure
         * out what the maximum attainable velocity will be before deceleration
         * begins.
         */
        if (tt <= 0.0) {
                vf = sqrt(2.0*distance*acceleration*deceleration/(acceleration
+ deceleration));
                ta = vf / acceleration;
                td = vf / deceleration;
                t1 = t2 = (long) (epoch + ta*1000.0);   /* convert to milliseco
nds offset from the epoch */
        }
        else {
                t1 = (long) (epoch + ta*1000.0);                /* time when we
 stop accelerating */
                t2 = (long) (t1 + tt*1000.0);           /* time to start decele
rating */
        }

        rads = (double) ((dir+90+map_direction) % 360) * (PI/180.0);

        sinval = sin(rads)/1000.0 / (double) dscale;
        cosval = -cos(rads)/1000.0 / (double) dscale;

        if (debug)
                printf("t1=%ld, t2=%ld, sinval=%g, cosval=%g\n",
                        t1, t2, sinval, cosval);

        return (0);
}


dead_reckon(px, py)
int *px, *py;
{
        int     x, y;
        long    cur_time, delta_t;
        double  acc_term;
        double  dist;

        cur_time = mstime();
        delta_t = cur_time - epoch;

        /* The robot doesn't move for about the first 100ms, due to
         * propagation delays between the planner, planner communications
         * computer, robot comm. computer, scheduler and finally the
         * drive controller.
         */
        if (delta_t < 100) {
                *px = epoch_x, *py = epoch_y;
                return (OK);
        }

        delta_t -= 100, cur_time -= 100;

        /*
         * If the current time is less than t1, then we are still in
         * the acceleration phase, so we have to calculate the current
         * position using
         *                          2
         *          d = 0.5 * a (dt)  + d
         *                     a          0
         *
         * where:
         *          d       = absolute distance from start of dead reckoning
         *          aa      = acceleration
         *          dt      = time elapsed since epoch
         *          d0      = position at the epoch
```

```
        */
        if (cur_time < t1) {
                dist = 0.5 * (acceleration * delta_t * delta_t)/1000.0;
                x = (int) (epoch_x + dist * cosval + 0.5);
                y = (int) (epoch_y + dist * sinval + 0.5);
                acc_x = const_x = x;
                acc_y = const_y = y;
        }

        /*
         * If we're between t1 and t2, then we're in the constant
         * velocity phase, where the distance traveled is
         *
         *      d = v  * (cur_time - t1) + acc_?
         *           f
         *
         * where:
         *      d       = distance traveled since epoch
         *      vf      = steady state velocity
         *      cur_time= the current time
         *      t1      = time at which we switched from acceleration mode
         *                to constant velocity mode
         *      acc_?   = the position at which we switched from acceleration
         *                to constant velocity mode
         *
         */
        else if (cur_time < t2) {
                dist = vf * (cur_time - t1);
                x = const_x = (int) (acc_x + dist * cosval + 0.5);
                y = const_y = (int) (acc_y + dist * sinval + 0.5);
        }

        /*
         * If we're beyond t1 and t2, then we're in the deceleration
         * phase, where the distance is given by
         *                                                2
         *      d = v (cur_time - t2) - 0.5 a  (cur_time - t2)  + const_?
         *           f                       d
         * where:
         *      d       = distance traveled since epoch
         *      vf      = initial velocity
         *      cur_time= the current time
         *      t2      = time at which we switched from constant velocity
         *                mode to deceleration mode
         *      ad      = deceleration rate
         *      const_? = the position at which we switch from constant
         *                velocity mode to deceleration mode
         *
         */
        else {
                delta_t = (cur_time - t2);
                acc_term = deceleration * delta_t;

                /* See if the derivative of the expression above has gone
                 * to zero, i.e.
                 *      dd
                 *      -- = v = v  - a * (cur_time - t2)
                 *      dt        f    d
                 *
                 * If so, then don't change the current position, just leave
                 * it as is.
                 */
                if (acc_term/1000 > vf) {
                        x = *px, y = *py;
                }
                else {
                        dist = vf * delta_t - 0.5 * (acc_term * delta_t) / 1000
;
                        x = (int) (const_x + dist * cosval + 0.5);
                        y = (int) (const_y + dist * sinval + 0.5);
                }
        }
        *px = x;
```

```
        *py = y;
        return (OK);
}
```

Apr 04 1991 09:24:24 fill1.c Page 1

```c
/* Fill and flood routines. These are necessary because the ones in the
 * ega library don't work quite right.  Also, these can
 */

#include <stdio.h>
#include <ega.h>
#include <malloc.h>

typedef struct stack_node {
        int                     x,y;
        struct stack_node       *next;
} STACK_NODE;

typedef struct stack {
        STACK_NODE      *tos;
} STACK;


static void pop_stack();
static int push_stack();

/* fill - fill the given region bounded by the color <border>.  This is
 *      what's known as a boundary-defined fill.  An interior-defined
 *      or flood fill is given in flood.
 */
fill(border)
int border;
{
        int             stat;
        int             save_upper, save_lower;
        int             error;
        int             x, y;
        int             depth, maxdepth;
        STACK           s;
        extern unsigned char gdcolor;

        error = 0;
        s.tos = NULL;
        maxdepth = 0;
        depth = 1;
        if (push_stack(&s, gdcur_x, gdcur_y) == -1)
                return (-1);

        while (s.tos != NULL) {
                /* Save x and y */
                x = s.tos->x, y = s.tos->y;

                if (depth > maxdepth) maxdepth = depth;
                depth--;
                pop_stack(&s);          /* pop current coord off stack */

                stat = gprddot(x, y);
                if ((stat == border) || (stat == gdcolor))
                        continue;

                while (x < gdmaxcol && gprddot(x+1, y) != border)
                        x++;

                /* Fill in the scan line to the left */
                save_upper = save_lower = 1;
                while (x >= 0 && gprddot(x, y) != border) {
                        gpplot(x, y);
                        stat = gprddot(x, y-1);
                        if (save_upper && stat != border && stat != gdcolor) {
                                if (push_stack(&s, x, y-1) == -1) {
                                        error++;
                                        break;
                                }
                                depth++;
                                save_upper = 0;
                        }
                        else if (stat == border)
                                save_upper = 1;
```

Apr 04 1991 09:24:24 fill1.c Page 2

```c
                        stat = gprddot(x, y+1);
                        if (save_lower && stat != border && stat != gdcolor) {
                                if (push_stack(&s, x, y+1) == -1) {
                                        error++;
                                        break;
                                }
                                depth++;
                                save_lower = 0;
                        }
                        else if (stat == border)
                                save_lower = 1;
                        x--;
                }
                if (error)
                        break;
        }
        if (error) {
                while (s.tos != NULL)
                        pop_stack(&s);
                return (-1);
        }
        return (0);
}



/* flood - flood the given region defined by the color <interior> with
 *      the current color <gdcolor>.  This is an "interior-defined" fill.
 */
flood(interior)
int interior;
{
        int             stat;
        int             save_upper, save_lower;
        int             error;
        int             x, y;
        int             depth, maxdepth;
        STACK           s;
        extern unsigned char gdcolor;

        error = 0;
        s.tos = NULL;
        maxdepth = 0;
        depth = 1;
        if (push_stack(&s, gdcur_x, gdcur_y) == -1)
                return (-1);

        while (s.tos != NULL) {
                /* Save x and y */
                x = s.tos->x;
                y = s.tos->y;

                if (depth > maxdepth) maxdepth = depth;
                depth--;
                pop_stack(&s);          /* pop current coord off stack */

                if (gprddot(x, y) != interior)
                        continue;

                while (x < gdmaxcol && gprddot(x+1, y) == interior)
                        x++;

                /* Fill in the scan line to the left */
                save_upper = save_lower = 1;
                while (x >= 0 && gprddot(x, y) == interior) {
                        gpplot(x, y);
                        if (y > 0) {
                                stat = gprddot(x, y-1);
                                if (save_upper && stat == interior) {
                                        if (push_stack(&s, x, y-1) == -1) {
                                                error++;
                                                break;
                                        }
```

Apr 04 1991 09:24:24 fill1.c Page 3

```
                                depth++;
                                save_upper = 0;
                        }
                        else if (stat != interior)
                                save_upper = 1;
                }
                if (y < gdmaxrow) {
                        stat = gprddot(x, y+1);
                        if (save_lower && stat == interior) {
                                if (push_stack(&s, x, y+1) == -1) {
                                        error++;
                                        break;
                                }
                                depth++;
                                save_lower = 0;
                        }
                        else if (stat != interior)
                                save_lower = 1;
                }

                x--;
        }
        if (error)
                break;
    }
    if (error) {
        while (s.tos != NULL)
                pop_stack(&s);
        return (-1);
    }
    return (0);
}



static void pop_stack(s)
STACK *s;
{
        free(s->tos);
        s->tos = s->tos->next;
}

static int push_stack(s, x, y)
STACK *s;
int     x, y;
{
        STACK_NODE      *node;

        node = (STACK_NODE *) malloc(sizeof(STACK_NODE));
        if (node == NULL)
                return (-1);
        node->x = x;
        node->y = y;
        node->next = s->tos;
        s->tos = node;
        return (0);
}
```

```
/*******************************************************************
 *                              global.c                           *
 *******************************************************************
 * The routines in this file handle most of the stuff to perform an *
 * A* search on a Robart map.  See the headers at the beginning of each *
 * function for details.                                           *
 *                                                                 *
 *******************************************************************/

#include <stdio.h>
#include <malloc.h>
#include <fcntl.h>
#include <stdlib.h>
#include <ega.h>
#include <event.h>
#include <menu.h>
#include "cellist.h"

#ifdef NARGS
#undef NARGS
#endif

#include <math.h>

#include "headers/ibmio.h"


/* Static arrays of x,y directions used to look at eight closest neighbors.
 * The search will go in the order given below
 *
 *                      6 2 7
 *                      1 0 3
 *                      5 4 8
 *
 * where 0 is the cell being expanded.
 */

extern char     x_angle[8];
extern char     y_angle[8];

/* Array of pointer directions.  These are the values that are actually
 * stuffed into the floor map.  They indicate (point to) the cell that
 * was responsible for expanding them.  By following the arrows starting
 * at the destination, you eventually wind up back at the original
 * cell (marked by START).  The index into the array is the same as the
 * one used for the x_angle and y_angle arrays above.  When backtracking,
 * the next coordinate is arrived at by taking the direction stored in
 * the current cell, stuffing it into <dir>, and using the equations
 *
 *              nextx = curx + x_angle[dir & 0x07];
 *              nexty = cury + y_angle[dir & 0x07];
 *
 */
extern byte pointer_dir[8];


static int old_min_cost, new_min_cost;
static int dx, dy;

/*******************************************************************
 *                          global_planner                         *
 *******************************************************************
 * The global planner will perform an A* search of the given map   *
 * looking for a destination cell.  When finished (assuming a dest- *
 * ination cell was found), the map contains a bunch of "arrows".  *
 * These arrows can be followed from the destination to the source by *
 * the Find_Path() routine to generate the actual path.  Note that this *
 * "corrupts" the map, so a copy should be supplied to this routine *
 * rather thr7 the actual map.                                     *
 *                                                                 *
 * Call with:                                                      *
 *      map_ptr = (map *) pointer to map to be searched            *
```

```
 *      xs,ys   = (int) x-y location of starting point of search   *
 *      pxd,pyd = (int *) pointer to place to store the X-Y location *
 *                      of the destination found.  Necessary because *
 *                      in some cases multiple destinations are    *
 *                      possible.                                  *
 *      draw    = (int) flag indicating whether or not the screen  *
 *                      should be updated during the search process. *
 *                                                                 *
 * Returns:                                                        *
 *      TRUE    if destination found                               *
 *      ERROR   if unable to find destination                      *
 *                                                                 *
 *******************************************************************/
int  global_planner(map_ptr, xs, ys, pxd, pyd, draw)
map  *map_ptr;
int  xs, ys;
int  *pxd, *pyd;
int  draw;
{
    int         status;
    int         min_cost;
    CELLIST     *frontier, *expansion;

    dx = *pxd, dy = *pyd;
    min_cost = idist(xs, ys, dx, dy);

    frontier = create_cellist();
    if (frontier == NULL)
        return (ERROR);

    /* Put the starting location on the cell list */
    old_min_cost = 0;
    add_cellist(frontier, xs, ys, 0, 0, old_min_cost);

    Clear_Line(1);  PutString(1, 1, "Finding Path...");
    /* While there are still points to be expanded. */
    status = FALSE;
    while (frontier->ncells && status == FALSE) {

#if 1
        min_cost = find_min_cost(frontier);
#else
        min_cost = old_min_cost;
#endif
        expansion = sub_list(frontier, min_cost);
#if 0
        if (expansion == NULL) {
                gstatus("expansion null, min_cost=%d ncells=%d -->",min_cost,fr
ontier->ncells);
                return (ERROR);
        }
#else
        while (expansion == NULL) {
                if (++min_cost > 32000) {
                        gstatus("expansion null, min_cost=%d ncells=%d -->",min
_cost,frontier->ncells);
                        return (ERROR);
                }
                expansion = sub_list(frontier, min_cost);
        }
#endif

        status = expand(map_ptr, expansion, frontier, pxd, pyd, draw);
        old_min_cost = new_min_cost;
        destroy_cellist(expansion);

        if (status == TRUE) {
                Clear_Line(1); PutString(1,1, "Path found.");
        }
    }
    destroy_cellist(frontier);
    Clear_Line(1);
    return (status);
```

```
}



/***********************************************************************
 *                               expand                                *
 ***********************************************************************
 * Expand all the cells on the expansion list, putting new cells on the *
 * frontier list.  This routine takes care of cell erosion (for        *
 * transient objects) and cost calculations.                           *
 *                                                                     *
 * Call with:                                                          *
 *      map_ptr   = (map *) pointer to map being searched              *
 *      expansion = (CELLIST *) pointer to list of cells to be expanded *
 *      frontier  = (CELLIST *) place to put new cells                 *
 *      pxd,pyd   = (int *) pointer to X-Y coordinate of destination   *
 *                        cell (if found)                              *
 *      draw      = (int) flag indicating whether or not to update     *
 *                        the display during the search process.       *
 *                                                                     *
 * Returns:                                                            *
 *      TRUE    if destination found                                   *
 *      FALSE   if destination not found                               *
 *                                                                     *
 ***********************************************************************/
expand(map_ptr, expansion, frontier, pxd, pyd, draw)
map *map_ptr;
CELLIST *expansion, *frontier;
int *pxd, *pyd;
int draw;
{
    char        *pxa, *pya;
    byte        *pfloor;
    byte        *mem;
    byte        parent_dir;
    int         width, height;
    int         expand_x, expand_y;
    int         j, xn, yn;
    int         cost, dist;
    int         offset, newdir;
    CELL        *c;

    /* Initialize variables */
    width = map_ptr->width;
    height = map_ptr->height;
    mem = map_ptr->mem_ptr;

    new_min_cost = 32000;
    for (c = get_first_cell(expansion); c != NULL; c = get_next_cell(expansion)
) {
        expand_x = c->x;
        expand_y = c->y;

        if (draw)
            ScalePoint(map_ptr, expand_x, expand_y, MAGENTA);

        /*
         * Check value of floor map at current cell.  If it is zero, it
         * is OK to expand it.  Otherwise, decrement it and put it back
         * onto the frontier list.  This is what "eats through" obstacles.
         */
        pfloor = mem + expand_x + expand_y*width;       /* point to cell */
#if 0
        parent_dir = *pfloor;
#else
        parent_dir = c->parent;
#endif

        if (*pfloor && *pfloor < 127) {

            /*
             * Clear the dirty bit, decrement the floor value, then
             * set the dirty bit again if the floor value hasn't been
```

```
             * decremented to zero.
             */
            *pfloor &= ~DIRTY_MASK;
            (*pfloor)--;                    /* dec the value */
            if (*pfloor) {                  /* not fully eroded yet? */
                *pfloor |= DIRTY_MASK;
            }
            else {
                /*
                 * The cell has been fully eroded.  Stuff the
                 * expansion direction arrow into the map and
                 * update the screen.
                 */
                *pfloor = c->parent;
                if (draw)           /* update the screen */
                    ScalePoint(map_ptr, expand_x, expand_y, MAGENTA);
            }
            add_cellist(frontier, expand_x, expand_y, c->parent, c->distance, c
->cost);
        }
        else {              /* Expand the current point */
            if (draw)
                ScalePoint(map_ptr, expand_x, expand_y, MAGENTA);

            pxa = &x_angle[0];
            pya = &y_angle[0];

            switch (parent_dir) {
            case PUP:
                offset = 3; break;
            case PDOWN:
                offset = 1; break;
            case PLEFT:
                offset = 2; break;
            case PRIGHT:
                offset = 0; break;
            default:
                offset = 0; break;
            }
            /* Look at the 4 neighboring points */
            for (j = 0; j < 4; j++) {

                /* Get the neighbor point */
#if 0
                xn = expand_x + *pxa++;
                yn = expand_y + *pya++;
#else
                xn = expand_x + x_angle[(j+offset)&0x03];
                yn = expand_y + y_angle[(j+offset)&0x03];
                newdir = pointer_dir[(j+offset)&0x03];
#endif
                if (xn < 0 || yn < 0 ||
                    xn >= width || yn >= height)
                        continue;

                pfloor = mem + xn + width*yn;

                /* If the neighbor is clear then ... */
                if (*pfloor == CLEAR || *pfloor == STRIPE ||
                    *pfloor == VIRTUALPOINT ||
                    *pfloor == FATMARKER || *pfloor == THINMARKER) {

                    if (*pfloor == STRIPE) {
                        new_min_cost = 0;
                        cost = 0;
                        dist = c->distance;
                    }
                    else {
                        dist = c->distance + 1;
                        cost = idist(dx, dy,  xn,  yn) + dist;
                        if (parent_dir == 0 || newdir == parent_dir) {
                            new_min_cost = 0;
                            cost--;
```

121

Apr 04 1991 09:24:24 global.c Page 5

```
                        }
    cost = 1;
                    }

                    /* Put an arrow in the floor map that points to the parent
    */
                    *pfloor = newdir;

                    /* Mark that pixel */
                    if (draw)
                        ScalePoint(map_ptr, xn, yn, WHITE);

                    /* Add the neighbor point to the store list, to be expanded
                     * later
                     */
                    add_cellist(frontier, xn, yn, (byte) newdir, dist, cost);
                }

                /* Else check to see if the neighbor is the destination */
                else if (*pfloor == DEST) {
                    *pxd = xn;          /* record destination coord */
                    *pyd = yn;
                    *pfloor = newdir;
                    return(TRUE);
                }

                /*
                 * If it is a plotted obstacle and it hasn't already been
                 * added to the expansion list (the dirty bit not set yet)
                 * add it to the expansion list so we can begin eroding it.
                 * Also store the expansion direction arrow so that when
                 * the cell is fully eroded we can stuff the arrow into
                 * the map.
                 */
                else if (*pfloor < 13) {
                    /*
                     * Set the dirty bit so that we don't add this point
                     * to the expansion list again.
                     */
                    *pfloor |= DIRTY_MASK;
#if 0
                    cost = ihypot(dx - xn, dy - yn) + c->distance + 1;
#else
                    cost = idist(dx, dy,  xn,  yn) + c->distance + 1;
#endif
cost = 1;
                    add_cellist(frontier, xn, yn, (byte) newdir, c->distance +
1, cost);
                }
                new_min_cost = (new_min_cost < cost ? new_min_cost : cost);
            }
        }
    }
    return (FALSE);
}



/*********************************************************************
 *                          find_min_cost                            *
 *********************************************************************
 * For the given cell list, find and return the value of the cell with *
 * minimum cost.                                                     *
 *                                                                   *
 * Call with:                                                        *
 *      cl      = (CELLIST *) cell list to search                    *
 *                                                                   *
 * Returns:                                                          *
 *      The minimum cost for the given cell list, or -1 if an error  *
 *                                                                   *
 *********************************************************************/
int find_min_cost(cl)
CELLIST *cl;
```

Apr 04 1991 09:24:24 global.c Page 6

```
{
        int     cost;
        CELL    *c;

        c = get_first_cell(cl);
        if (c == NULL)
                return (-1);
        cost = c->cost;
        while ((c = get_next_cell(cl)) != NULL) {
                if (c->cost < cost)
                        cost = c->cost;
        }
        return (cost);
}
```

122

169

Apr 04 1991 09:24:24 map.c Page 1

```
/****************************************************************************
 * This file contains procedures that implement map data structures. In other
 * words, it attempts to encapsulate the map data structure. This set of
 * procedures is not however comprehensive; some elements of a map structure
 * need to be manipulated directly (that is not to say that someone couldn't
 * finish the encapsulation process). The map data structure itself is defined
 * in ibmio.h.
 ***************************************************************************/
#include <fcntl.h>
#include <malloc.h>
#include <sys/types.h>
#include <sys/stat.h>
#include <io.h>
#include <stdlib.h>
#include <stdio.h>
#include <string.h>
#include <ega.h>
#include <event.h>
#include <menu.h>

#include "headers/ibmio.h"


extern drType robart;

/***************************************************************************/
/* Open_File is a utility procedure used to open a given file. The mode    */
/* parameter is to allow the calling procedure to open a file for different */
/* purposes (read only, write only, create, ...). fileName points to block */
/* of storage to place final valid file name. printStr is a pointer to a   */
/* string to use prompt the user for a file name. Open_File will return    */
/* FALSE if the user types only a <CR> (the only way out of this routine   */
/* besides typing a valid file name).                                      */
/***************************************************************************/
static int Open_File(mode, fileName, printStr)
int  mode;
char *fileName, *printStr;
{
    int  fh;
    char str[80];

    /* Get the floor plan file name. */
    ggets(str, printStr, "");
    if (str[0] == '\0')
        return (-1);

    /* Open the floor plan file. */
    fh = open(str, mode, S_IREAD | S_IWRITE);

    /* while the file name is not correct */
    while (fh == -1) {

        /* Beep */
        putch(7);

        /* Input a file name. */
        ggets(str, printStr, "");
        if (str[0] == '\0')
            return (-1);

        /* Open the floor plan file. */
        fh = open(str, mode, S_IREAD | S_IWRITE);
    }

    /* Save the valid file name */
    strcpy(fileName, str);
    return(fh);
}


/***************************************************************************/
/* SetScale accepts a pointer to a map structure and screen display limits */
/* and sets the x,y offsets for the lower left-hand corner of the floor map. */
```

Apr 04 1991 09:24:24 map.c Page 2

```
/* It also sets the map's scale to be as large as possible, while still    */
/* fitting between the limits given. SetScale also centers the map within  */
/* the screen.                                                             */
/***************************************************************************/
int  SetScale(map_ptr, xlow, xhigh, ylow, yhigh)
map  *map_ptr;
int  xlow, xhigh, ylow, yhigh;
{
int tmp;
    int  wScale, hScale;
    int width, height;

    /* Set the scale to the largest factor of expansion that will fit between
     * the limits.
     */
    map_ptr->xoff = map_ptr->scale = 1;
    map_ptr->yoff = 340;
    width = map_ptr->ux - map_ptr->lx + 1;
    height = map_ptr->uy - map_ptr->ly + 1;

    if (width <= 0) {
        gstatus("Map width set to 0! -->"); mgetkey();
        return (ERROR);
    }
    if (height <= 0) {
        gstatus("Map height set to 0! -->"); mgetkey();
        return (ERROR);
    }
    wScale = (xhigh - xlow)/width;
    hScale = (yhigh - ylow)/height;
    if (wScale <= 0)
        wScale = 1;
    if (hScale <= 0)
        hScale = 1;
    map_ptr->scale = (wScale < hScale) ? (byte)wScale : (byte)hScale;

    /* Set the screen offsets so that the map is centered on the screen */
    map_ptr->xoff = xlow + (((xhigh - xlow) -
        (map_ptr->scale * width))/2);

    if (map_ptr->xoff < 7)
        map_ptr->xoff = 7;

    tmp = (yhigh - ylow - (map_ptr->scale * height))/2;

    if (height > (yhigh - ylow))
        map_ptr->yoff = ylow+10;
    else
        map_ptr->yoff = yhigh - tmp;

    if (map_ptr->yoff > yhigh)
        map_ptr->yoff = ylow;
    if (map_ptr->yoff < 10)
        map_ptr->yoff = 10;
    return ((int)map_ptr->scale);
}


#if 0
/***************************************************************************/
/* ScalePoint draws a "scale" sized point at "x,y" in "color". The point is */
/* "scale" points wide and high and start at "x,y" and extend to the right  */
/* and up.                                                                  */
/***************************************************************************/
void ScalePoint(x, y, scale, color)
int x, y, scale, color;
{
    int x2, y2;

    if (scale <= 1) {
        gpcolor(color);
        gpplot(x, y);
    }
```

```
    else {
        gpcolor(color);
        x2 = x+(scale-1);
        y2 = y-(scale-1);
        gpmove(x, y2);
        gpbox(x2, y);
    }
#if 0
    gpcolor(color);
    for(i=x;i < x+scale;i++) {
        for(j=y;j > y-scale;j--) {
            gpplot(i, j);
        }
    }
#endif
}

#else

/****************************************************************************/
/* ScalePoint draws a "scale" sized point at "x,y" in "color". The point is */
/* "scale" points wide and high and start at "x,y" and extend to the right  */
/* and up.                                                                  */
/****************************************************************************/
void ScalePoint(map_ptr, x, y, color)
map *map_ptr;
int x, y, color;
{
    int x2, y2;

    if (x < map_ptr->lx || x > map_ptr->ux ||
        y < map_ptr->ly || y > map_ptr->uy)
        return;

    x = map_ptr->xoff + (x - map_ptr->lx) * map_ptr->scale;
    y = map_ptr->yoff - (y - map_ptr->ly) * map_ptr->scale;
    if (map_ptr->scale <= 1) {
        gpcolor(color);
        gpplot(x, y);
    }
    else {
        gpcolor(color);
        x2 = x+(map_ptr->scale-1);
        y2 = y-(map_ptr->scale-1);
        gpmove(x, y2);
        gpbox(x2, y);
    }
}
#endif

/****************************************************************************/
/* DrawPEDatabase plots any valid position estimation data on the IBM screen */
/* in the specified color.                                                  */
/****************************************************************************/
void DrawPEDatabase(map_ptr, color)
map  *map_ptr;
int  color;
{
    int  i, j, sq, sf;
    int mapx, mapy;

    /* Find out where the floor map is on the screen. */
    sq = map_ptr->squaresize;

    sf = 12 / sq;            /* scale factor to make PED coord map coord */
    /* Step through the floor map plotting valid P.E. data in 'color' */
    mouse_off();
    for(i = 0; i < map_ptr->height/sq; i++) {
        mapy = i * sf;
        if ( apy < map_ptr->ly || mapy > map_ptr->uy)
            continue;
        for(j = 0; j < map_ptr->width/sq; j++) {
            mapx = j * sf;
```

```
            if (mapx < map_ptr->lx || mapx > map_ptr->ux)
                continue;
            if (pEAccess(map_ptr,j,i,0) != 0)
                ScalePoint(map_ptr, j * sf, i * sf, color);
        }
    }
    mouse_on();
}


get_obj_color(value)
int value;
{
        int     ret_val;

        switch (value) {
        case OBJECT:
                ret_val = WHITE;        break;
        case MOVEABLE:
                ret_val = IWHITE;       break;
        case RECHARGER:
                ret_val = YELLOW;       break;
        case DOOR:
                ret_val = RED;          break;
        case STRIPE:
                ret_val = GREEN;        break;
        case GROWTH:
                ret_val = BLUE;         break;
        case CAL1:
                ret_val = RED;          break;
        case CAL2:
                ret_val = LRED;         break;
        case CLEAR:
                ret_val = BLACK;        break;
        case FATMARKER:
                ret_val = MAGENTA;      break;
        case THINMARKER:
                ret_val = LMAGENTA;     break;
        case VIRTUALPOINT:
                ret_val = BROWN;        break;
        case 1:
        case 2:
                ret_val = GRAY;         break;
        case 3:
        case 4:
                ret_val = WHITE;        break;
        case 5:
        case 6:
                ret_val = CYAN;         break;
        case 7:
        case 8:
                ret_val = LCYAN;        break;
        case 9:
        case 10:
                ret_val = LBLUE;        break;
        case 11:
        case 12:
                ret_val = BLUE;         break;
        case 13:
        case 14:
                ret_val = MAGENTA;      break;
        case 15:
        case 16:
                ret_val = LMAGENTA;     break;
        case 17:
        case 18:
                ret_val = GREEN;        break;
        case 19:
        case 20:
                ret_val = LGREEN;       break;
        case 21:
        case 22:
                ret_val = YELLOW;       break;
```

```
        case 23:
        case 24:
                ret_val = BROWN;        break;
        case 25:
        case 26:
                ret_val = RED;          break;
        case 27:
        case 28:
                ret_val = LRED;         break;
        case 29:
        case 30:
                ret_val = IWHITE;       break;
        case 31:
        case 32:
        case 33:
                ret_val = IWHITE;       break;

        default:
                ret_val = WHITE;
        }
        return (ret_val);
}


/**************************************************************************
 * DrawSFloorMap draws a scaled floor map on the screen (i.e- it          *
 * map scale variable to blow up the floor map). SetScale must be called  *
 * first or unpredictable results will result.                            *
 **************************************************************************/
void DrawSFloorMap(map_ptr, obj_color, growth_color, sonar_color)
map  *map_ptr;
int  obj_color, growth_color, sonar_color;
{
    int         w, h, scale, scrx, scry, i, j;
    int         x1, y1, x2, y2;
    int         y;
    int         top, left, xoff, yoff;
    byte        *t_ptr, prev;


    /* Get a disposable copy of the internal memory floor map. */
    t_ptr = map_ptr->mem_ptr + map_ptr->ly * map_ptr->width + map_ptr->lx;

    /* Find out where to put the floor map on the screen. */
    scrx = map_ptr->xoff;
    scry = map_ptr->yoff;
    scale = map_ptr->scale;
    w = (map_ptr->ux - map_ptr->lx) * scale;
    h = (map_ptr->uy - map_ptr->ly) * scale;


    /* Step through the floor map plotting object in obj_color and growth in
     * growth_color.
     */
    x1 = scrx-2;
    y1 = scry+1;
    x2 = scrx + w;
    y2 = scry - h;
    /* Clear the screen */
    gpmerge(MRPL);
    gpcolor(BLACK);
    gpclear(0, y2, gdmaxcol, gdmaxrow);

    gpcolor(MAGENTA);
    gpmove(x1, y1);
    gpline(x2, y1);
    gpline(x2, y2);
    gpline(x1, y2);
    gpline(x1, y1);
    xoff = s.rx - 1;
    for (i = 0, y=map_ptr->ly; i < h; i += scale, y++) {
        t_ptr = map_ptr->mem_ptr + y * map_ptr->width + map_ptr->lx;
        prev = *t_ptr++;
```

```
        left = 0;
        top = scry - i - scale + 1;
        yoff = scry - i;
        for (j = scale; j < w; j += scale) {
            /* If there has been a change, then draw the previous run */
            if (prev != *t_ptr) {

                switch (prev) {
                case OBJECT:
                        gpcolor(obj_color);
                        break;
                case MOVEABLE:
                        gpcolor(obj_color+8);
                        break;
                case GROWTH:
                        gpcolor(growth_color);
                        break;
                default:
                        gpcolor(get_obj_color(prev));
                }
                gpmove(scrx+left, top);
                gpbox(xoff+j, yoff);
                prev = *t_ptr;
                left = j;
            }
            t_ptr++;
        }

        /* Now have to finish off the last run */
        switch (prev) {
        case OBJECT:
                gpcolor(obj_color);
                break;
        case MOVEABLE:
                gpcolor(obj_color+8);
                break;
        case GROWTH:
                gpcolor(growth_color);
                break;
        default:
                gpcolor(get_obj_color(prev));
        }
        gpmove(scrx+left, top);
        gpbox(xoff+j, yoff);
    }

    /* Draw bar on left hand edge showing how colors correspond to
     * number of sonar hits.  The close the color is to the top of the screen,
     * the higher the number of hits.
     */
    for (i = 0; i <= 32; i++) {
        gpcolor(get_obj_color(i));
        gpmove(0, scry-(i*4));
        gpbox(4, scry-(i*4)-3);
    }
    gpcolor(IWHITE);
    text_foreground(IWHITE);
    text_background(BLACK);
    text_move(0, scry-(i*4) - 34);
    text_out("N");
    gpmove(0, scry-(i*4));
    gpline(0, scry-(i*4) - 30);
    gpline(6, scry-(i*4) - 20);
    gpline(0, scry-(i*4) - 20);
}


/**************************************************************************/
/* Draw_Floor_Map will draw the floor map on the screen in the given object */
/* and growth color. It reads the map from internal memory, therefore, it   */
/* must have been read in from file first and be pointed to by mem_ptr.     */
/**************************************************************************/
void Draw_Floor_Map(map_ptr, obj_color, growth_color, sonar_color)
```

```
map  *map_ptr;
int  obj_color, growth_color, sonar_color;
{
     int          scrx, scry, i,j;
     int          x1, y1, x2, y2;
     byte         *t_ptr;

     /* Clear the screen */
     gpclear(0, 0, gdmaxcol, gdmaxrow);

     /* Get a disposable copy of the internal memory floor map. */
     t_ptr = map_ptr->mem_ptr;

     /* Find out where to put the floor map on the screen. */
     scrx = map_ptr->xoff;
     scry = map_ptr->yoff;

     /* Step through the floor map plotting object in obj_color and growth in
      * growth_color.
      */
     gpcolor(MAGENTA);
     x1 = scrx-2;
     y1 = scry;
     x2 = scrx + map_ptr->width * map_ptr->scale;
     y2 = scry + map_ptr->height * map_ptr->scale + 1;
     gpmove(x1, y1);
     gpline(x2, y1);
     gpline(x2, y2);
     gpline(x1, y2);
     gpline(x1, y1);
     for(i=0;i<map_ptr->height;i++)
          for(j=0;j<map_ptr->width;j++) {
               switch (*t_ptr) {
               case OBJECT:
                    gpcolor(obj_color);
                    gpplot(scrx+j, scry-i);
                    break;
               case MOVEABLE:
                    gpcolor(obj_color+8);
                    gpplot(scrx+j, scry-i);
                    break;
               case GROWTH:
                    gpcolor(growth_color);
                    gpplot(scrx+j, scry-i);
                    break;
               default:
                    gpcolor(get_obj_color(*t_ptr));
                    gpplot(scrx+j, scry-i);
               }
               t_ptr++;
          }
}


/*************************************************************************/
/* Copy_Floor_Map make a new copy of the floor map in dynamic memory, from  */
/* the original copy already in  memory. Note- there must be something to  */
/* copy... m1_ptr must point to a already loaded floor map. If clear is -1, */
/* the floor map data is copied. If clear is any other value between 0 and  */
/* 255, the new floor map's data is filled with that value.         */
/*************************************************************************/
Copy_Floor_Map(m1_ptr, m2_ptr, clear)
map  *m1_ptr, *m2_ptr;
int  clear;
{
     char str[80];
     byte *t1_ptr, *t2_ptr;
     unsigned int  i, size, door_length;

     /* Calculate the size of the floor map */
     size = m1_ptr->width * m1_ptr->height;

     /* Allocate storage for a working copy of the floor map */
```

```
     if (m2_ptr->mem_ptr != NULL) free(m2_ptr->mem_ptr);
     if ((m2_ptr->mem_ptr = (byte *)malloc(size)) == NULL) {
          sprintf(str, "Copy_Floor_Map: malloc(%u) failed->",size);
          Draw_Status_Line(str);
          mgetkey();
          return (ERROR);
     }

     /* Don't change master pointers, make copies first. */
     t1_ptr = m1_ptr->mem_ptr;
     t2_ptr = m2_ptr->mem_ptr;

     /* Copy all of the map structures. */
     m2_ptr->width  = m1_ptr->width;
     m2_ptr->height = m1_ptr->height;
     m2_ptr->xoff   = m1_ptr->xoff;
     m2_ptr->yoff   = m1_ptr->yoff;
     m2_ptr->scale  = m1_ptr->scale;
     m2_ptr->squaresize = m1_ptr->squaresize;
     m2_ptr->xmapoff = m1_ptr->xmapoff;
     m2_ptr->ymapoff = m1_ptr->ymapoff;
     m2_ptr->ndoors = m1_ptr->ndoors;
     m2_ptr->lx     = m1_ptr->lx;
     m2_ptr->ly     = m1_ptr->ly;
     m2_ptr->ux     = m1_ptr->ux;
     m2_ptr->uy     = m1_ptr->uy;


     /* If this map has doors in it, copy the door structure too */
     if (m2_ptr->ndoors) {
          door_length = m2_ptr->ndoors * sizeof(DOOR_TYPE);
          m2_ptr->doors = (DOOR_TYPE *) malloc(door_length);
          if (m2_ptr->doors == NULL) {
                    gstatus("Copy_Floor_Map: Not enough memory for door structure -
->");
                    mgetkey();
                    return (ERROR);
          }
          memcpy(m2_ptr->doors, m1_ptr->doors, door_length);
     }

     /* Initialize the new map's file name to NULL */
     m2_ptr->mapName[0] = 0;
     m2_ptr->peName[0] = 0;

     /* If not requested to clear the map contents then copy the contents */
     if (clear == -1)
          for(i=0;i < size;i++) *t2_ptr++ = *t1_ptr++;

     /* Else clear the new map to the desired value. */
     else
          for(i=0;i < size;i++) *t2_ptr++ = (byte)clear;
     return (OK);
}


/*************************************************************************/
/* LoadPEArray loads in from disk a file specified by the user as the      */
/* positionestimation array associated with the floor map pointed to by    */
/* map_ptr.                                                                */
/*************************************************************************/
int LoadPEArray(map_ptr, name)
map  *map_ptr;
char *name;
{
     char *cp, str[80];
     int  fh, count;
     int  sqsize;
     long length;
     byte *ptr;
     extern char *strchr();

     mouse_off();
```

```
    sqsize = map_ptr->squaresize;

    if (name == NULL) {
        if (map_ptr->peName[0] == EOS) {
            strcpy(map_ptr->peName, map_ptr->mapName);
            cp = strchr(map_ptr->peName, '.');
            if (cp != NULL)
                *cp = EOS;
            strcat(map_ptr->peName, ".pea");
        }

        strcat(str, " Type floor map file name <");
        if (map_ptr->mapName[0] != 0) strcat(str, map_ptr->mapName);
        strcat(str, "> ? ");

        sprintf(str, "PE file name <%s> ", map_ptr->peName);
        /* Get the PE database file name and open it for read access */
        if ((fh = Open_File(O_RDONLY | O_BINARY, map_ptr->peName, str)) == -1)
{
            if (map_ptr->peName[0] != 0)
                fh = open((char *)map_ptr->peName, (int)O_RDONLY | O_BINARY, S_
IREAD | S_IWRITE);
            else {
                mouse_on();
                return (ERROR);
            }
        }
    }
    else {
        fh = open(name, O_RDONLY | O_BINARY, S_IREAD | S_IWRITE);
        if (fh == -1) {
            mouse_on();
            return (ERROR);
        }
    }

    /* Let the user know the current status. */
    Draw_Status_Line(" Loading Position Estimation Array");

    length = ((long) map_ptr->width/sqsize * map_ptr->height/sqsize) * (long) P
E_SONAR_NUM;

    /* Free the old block of dynamic mem used for the previous PE database */
    if (map_ptr->pe_ptr != NULL) free(map_ptr->pe_ptr);

    /* Allocate enough space for the PE database */
    if ((map_ptr->pe_ptr = (byte *)malloc((int) length)) == NULL) {
        Draw_Status_Line(" LoadPEArray: malloc failed.");
        close(fh);
        mouse_on();
        return (ERROR);
    }

    /* Read in the PE database */
    ptr = map_ptr->pe_ptr;
    while (length > 32000L) {
        count = read(fh, (char *) ptr, 32000);
        if (count != 32000) {
            Draw_Status_Line(" LoadPEArray: Read failed.");
            close(fh);
            mouse_on();
            return (ERROR);
        }
        ptr += 32000L;
        length -= 32000L;
    }
    count = read(fh, (char *) ptr, (unsigned int)length);
    if (count != length) {
        Draw_Status_Line(" LoadPEArray: Read failed.");
        close(fh);
        mouse_on();
        return (ERROR);
    }
```

```

    /* Close the PE database file */
    close(fh);
    Clear_Line(25);                         /* clear load pe array message */
    mouse_on();
    return (OK);
}




/* load_map - load a floor map.  Assumes that the file has already been
 *      opened and everything is ready to go.
 */
load_map(fh, map_ptr)
int fh;
map *map_ptr;
{
    char                str[80];
    unsigned int        count, length, door_length;
    MAP_HEADER          map_info;

    /* Get the map header information */
    if ((count = read(fh, (char *) &map_info, sizeof(map_info))) != sizeof(map_
info)) {
        gstatus("Unable to read map header information -->");
        mgetkey();
        return (ERROR);
    }
    if (map_info.map_magic != MAPMAGIC) {
        gstatus("Not a valid map file -->"); mgetkey();
        return (ERROR);
    }

    map_ptr->width = map_info.width;
    map_ptr->height = map_info.height;
    map_ptr->squaresize = map_info.squaresize;
    map_ptr->xmapoff = map_info.xmapoff;
    map_ptr->ymapoff = map_info.ymapoff;
    map_ptr->ndoors = map_ptr->nvpaths = 0;
    map_ptr->doors = (DOOR_TYPE *) NULL;
    map_ptr->vpaths = (VIRT_TYPE *) NULL;
    map_ptr->lx = map_ptr->ly = 0;
    map_ptr->ux = map_ptr->width - 1;
    map_ptr->uy = map_ptr->height - 1;

    if (map_ptr->squaresize < 1) {
        gstatus("Illegal square size, %u.  Map not loaded -->", map_ptr->square
size);
        mgetkey();
        return (ERROR);
    }
    if (map_ptr->squaresize > 12) {
        gstatus("Large squaresize %u.  PE Database cannot be loaded correctly -
->", map_ptr->squaresize);
        mgetkey();
    }


    /* Free the old block of dynamic mem used for the previous floor map */
    if (map_ptr->mem_ptr != NULL) free(map_ptr->mem_ptr);

    /* Allocate enough space for the floor plan itself */
    length = map_ptr->width * map_ptr->height;
    if ((map_ptr->mem_ptr = (byte *)malloc(length)) == NULL) {
        sprintf(str, "load_map: malloc(%u) failed", length);
        Draw_Status_Line(str);
        return (ERROR);
    }

    /* Read in the floor plan. */
    count = read(fh, (char *) map_ptr->mem_ptr, length);
    if (count != length) {
```

```
            Draw_Status_Line(" load_map: read failed.");
            return (ERROR);
        }
        return (OK);
}


/**********************************************************************
 *                             load_door_info                         *
 **********************************************************************
 * Load the door information from the map.dor file.                  *
 *                                                                    *
 * Call with:                                                         *
 *      map_ptr = (map *) pointer to current map structure           *
 *      name    = (char *) name of current map file                  *
 *                                                                    *
 * Returns:                                                           *
 *      0         if successful                                      *
 *      ERROR     if some kind of error                              *
 *                                                                    *
 **********************************************************************/
load_door_info(map_ptr, name)
map *map_ptr;
char *name;
{
    char                str[80], doorname[80];
    char                *cp;
    int                 fh, count;
    unsigned int        door_length;
    DOOR_HEADER         hdr;

    /* Make the name of the file.  Should be <name>.dor.  Ignores any extension
     * that may already be on name.
     */
    strcpy(str, name);
    cp = strrchr(str, '.');
    if (cp != NULL)
        *cp = EOS;
    sprintf(doorname, "%s.dor", str);

    map_ptr->ndoors = 0;
    fh = open(doorname, O_RDONLY | O_BINARY);
    if (fh != -1) {
        if (read(fh, (char *) &hdr, sizeof(DOOR_HEADER)) != sizeof(DOOR_HEADER)
) {
                return (ERROR);
        }
        if (hdr.door_magic != DOOR_MAGIC) {
                close(fh);
                return (ERROR);
        }
        door_length = (unsigned int) hdr.ndoors * sizeof(DOOR_TYPE);
        map_ptr->doors = (DOOR_TYPE *) malloc(door_length);
        if (map_ptr->doors == (DOOR_TYPE *) NULL) {
                gstatus("Can't allocate space for %d doors -->", hdr.ndoors);
                close(fh);
                return (ERROR);
        }

        count = read(fh, (char *) map_ptr->doors, door_length);
        if (count != door_length) {
                gstatus("Error while reading door information -->"); mgetkey();
                close(fh);
                free(map_ptr->doors);
                map_ptr->doors = (DOOR_TYPE *) NULL;
                return (ERROR);
        }
        map_ptr->ndoors = hdr.ndoors;   /* update the door info in map_ptr */
        close(fh);
    }
    return (0);
}
```

```


/**********************************************************************
 *                             save_door_info                         *
 **********************************************************************
 * Save the door information to the map.dor file.                    *
 *                                                                    *
 * Call with:                                                         *
 *      map_ptr = (map *) pointer to current map structure           *
 *      name    = (char *) name of current map file                  *
 *                                                                    *
 * Returns:                                                           *
 *      0         if successful                                      *
 *      ERROR     if some kind of error                              *
 *                                                                    *
 **********************************************************************/
save_door_info(map_ptr, name)
map *map_ptr;
char *name;
{
    char                str[80], doorname[80];
    char                *cp;
    int                 fh, count;
    unsigned int        door_length;
    DOOR_HEADER         hdr;

    if (map_ptr->ndoors == 0)
        return (OK);

    /* Make the name of the file.  Should be <name>.dor.  Ignores any extension
     * that may already be on <name>.
     */
    strcpy(str, name);
    cp = strrchr(str, '.');
    if (cp != NULL)
        *cp = EOS;
    sprintf(doorname, "%s.dor", str);

    fh = open(doorname, O_WRONLY|O_BINARY|O_CREAT|O_TRUNC, S_IREAD|S_IWRITE);
    if (fh != -1) {
        hdr.door_magic = DOOR_MAGIC;
        hdr.ndoors = map_ptr->ndoors;
        if (write(fh, (char *) &hdr, sizeof(DOOR_HEADER)) != sizeof(DOOR_HEADER
)) {
                return (ERROR);
        }
        door_length = (unsigned int) hdr.ndoors * sizeof(DOOR_TYPE);
        count = write(fh, (char *) map_ptr->doors, door_length);
        if (count != door_length) {
                errorbox("Error while writing door information.");
                close(fh);
                return (ERROR);
        }
        close(fh);
    }
    else {
        errorbox("Can't open %s for writing.", doorname);
        return(ERROR);
    }
    return (0);
}



/**********************************************************************
 *                           load_virtual_info                        *
 **********************************************************************
 * Load the virtual path information from the map.vir file.          *
 *                                                                    *
 * Call with:                                                         *
 *      map_ptr = (map *) pointer to current map structure           *
 *      name    = (char *) name of current map file                  *
 *
```

6

```
 * Returns:                                                        *
 *      0       if successful                                      *
 *      ERROR   if some kind of error                              *
 *                                                                 *
 *******************************************************************/
load_virtual_info(map_ptr, name)
map *map_ptr;
char *name;
{
    char                str[80], virtualname[80];
    char                *cp;
    int                 fh, count;
    unsigned int        virtual_length;
    VIRT_HEADER         hdr;

    /* Make the name of the file.  Should be <name>.vir.  Ignores any extension
     * that may already be on name.
     */
    strcpy(str, name);
    cp = strrchr(str, '.');
    if (cp != NULL)
        *cp = EOS;
    sprintf(virtualname, "%s.vir", str);

    map_ptr->nvpaths = 0;
    fh = open(virtualname, O_RDONLY | O_BINARY);
    if (fh != -1) {
        if (read(fh, (char *) &hdr, sizeof(VIRT_HEADER)) != sizeof(VIRT_HEADER)
) {
                return (ERROR);
        }
        if (hdr.virt_magic != VIRT_MAGIC) {
                close(fh);
                return (ERROR);
        }
        virtual_length = (unsigned int) hdr.npaths * sizeof(VIRT_TYPE);
        map_ptr->vpaths = (VIRT_TYPE *) malloc(virtual_length);
        if (map_ptr->vpaths == (VIRT_TYPE *) NULL) {
                gstatus("Can't allocate space for %d vpaths -->", hdr.npaths);
                close(fh);
                return (ERROR);
        }

        count = read(fh, (char *) map_ptr->vpaths, virtual_length);
        if (count != virtual_length) {
                gstatus("Error while reading vpath information -->"); mgetkey()
;
                close(fh);
                free(map_ptr->vpaths);
                map_ptr->vpaths = (VIRT_TYPE *) NULL;
                return (ERROR);
        }
        map_ptr->nvpaths = hdr.npaths;  /* update the virtual path info in map_
ptr */
        close(fh);
    }
    return (0);
}


/*******************************************************************
 *                         save_virtual_info                       *
 *******************************************************************
 * Save the virtual path information to the map.vir file.          *
 *                                                                 *
 * Call with:                                                      *
 *      map_ptr = (map *) pointer to current map structure         *
 *      name    = (char *) name of current map file                *
 *                                                                 *
 * Returns:                                                        *
 *      0       if successful                                      *
 *      ERROR   if some kind of error                              *
 *                                                                 *
```

```
 *******************************************************************/
save_virtual_info(map_ptr, name)
map *map_ptr;
char *name;
{
    char                str[80], virtualname[80];
    char                *cp;
    int                 fh, count;
    unsigned int        virtual_length;
    VIRT_HEADER         hdr;

    if (map_ptr->nvpaths == 0)
        return (OK);

    /* Make the name of the file.  Should be <name>.vir.  Ignores any extension
     * that may already be on name.
     */
    strcpy(str, name);
    cp = strrchr(str, '.');
    if (cp != NULL)
        *cp = EOS;
    sprintf(virtualname, "%s.vir", str);

    fh = open(virtualname, O_WRONLY|O_BINARY|O_CREAT|O_TRUNC, S_IREAD|S_IWRITE)
;
    if (fh != -1) {
        hdr.virt_magic = VIRT_MAGIC;
        hdr.npaths = map_ptr->nvpaths;
        if (write(fh, (char *) &hdr, sizeof(VIRT_HEADER)) != sizeof(VIRT_HEADER
)) {
                return (ERROR);
        }
        virtual_length = (unsigned int) hdr.npaths * sizeof(VIRT_TYPE);
        count = write(fh, (char *) map_ptr->vpaths, virtual_length);
        if (count != virtual_length) {
                errorbox("Error while writing vpath information.");
                close(fh);
                return (ERROR);
        }
        close(fh);
    }
    else {
        errorbox("Can't open %s for writing.", virtualname);
        return (ERROR);
    }
    return (0);
}


/*************************************************************************/
/* Load_Floor_Map first gets a floor map file name from the user, opens the */
/* file and reads it's width and height. It computes it's size and checks  */
/* map_ptr->mem_ptr to see if a dynamically allocated array of internal    */
/* memory has already been allocated. If not or if it's too small, it      */
/* allocates the storage. It then reads the floor map data into the array. */
/*************************************************************************/
int  Load_Floor_Map(map_ptr, name)
map  *map_ptr;
char *name;
{
    int         fh;
    int         xmapoff, ymapoff;
    char        save_name[80];

    /* If no file name is provided, then prompt for one */
    strcpy(save_name, map_ptr->mapName);
    if (name == NULL) {
        /* Use the egalib routine to scan for .map files and allow him to
         * select a file that way.
         */
tryagain:
        mouse_on();
        SelectFile("*.map", map_ptr->mapName, " Load ");
```

```
        mouse_off();
        if (map_ptr->mapName[0] == EOS) {
            goto load_old;
        }
        fh = open((char *)map_ptr->mapName, (int)O_RDONLY | O_BINARY);
        if (fh == -1) {
            gstatus("Map not found -->"); mgetkey();
            goto tryagain;
        }
    }
    else {
        fh = open(name, O_RDONLY | O_BINARY);
        if (fh == -1) {
            return (ERROR);
        }
    }

    mouse_off();
    Draw_Status_Line("Loading Floor Map File...");

    /* Clear away the old map first */
    if (map_ptr->width != 0 && map_ptr->height != 0 && map_ptr->xoff != 0 &&
        map_ptr->yoff != 0) {
        int x1, y1, x2, y2, width, height;
        width = map_ptr->ux - map_ptr->lx + 1;
        height = map_ptr->uy - map_ptr->ly + 1;
        x1 = map_ptr->xoff-1;
        y1 = map_ptr->yoff - height*map_ptr->scale - 1;
        x2 = map_ptr->xoff + width*map_ptr->scale  + 1;
        y2 = map_ptr->yoff+1;
        if (x1 >= 0 && x1 <= gdmaxcol && y1 >= 0 && y1 <= gdmaxrow &&
            x2 >= 0 && x2 <= gdmaxcol && y2 >= 0 && y2 <= gdmaxrow) {
            gpcolor(BLACK);
            gpclear(x1, y1, x2, y2);
        }
    }

    xmapoff = map_ptr->xmapoff;
    ymapoff = map_ptr->ymapoff;
    if (load_map(fh, map_ptr) == ERROR) {
        close(fh);
load_old:
        strcpy(map_ptr->mapName, save_name);
        fh = open(map_ptr->mapName, O_RDONLY | O_BINARY);
        if (fh == -1) {
            mouse_on();
            return (ERROR);
        }
        Draw_Status_Line("Loading Floor Map File...");
        if (load_map(fh, map_ptr) == ERROR) {
            close(fh);
            mouse_on();
            return (ERROR);
        }
    }
    else {
        if (name != NULL)
            strcpy(map_ptr->mapName, name);
    }
    load_door_info(map_ptr, map_ptr->mapName);
    load_virtual_info(map_ptr, map_ptr->mapName);

    robart.x += xmapoff - map_ptr->xmapoff;
    robart.y += ymapoff - map_ptr->ymapoff;

    Clear_Line(25);
    close(fh);
    mouse_on();
    return (OK);
}


/****************************************************************************/
```

```
/* NewPEArray will free the old block of dymanic memory (if it exists) and  */
/* allocate a new block large enough for the position estimation array      */
/* associated with the floor map pointed to by map_ptr.      */
/****************************************************************************/
int NewPEArray(map_ptr)
map  *map_ptr;
{
    int  sqsize;
    long i, size;
    byte *t_ptr;

    mouse_off();
    sqsize = map_ptr->squaresize;
    /* Free the old block of dynamic mem used for the previous floor map */
    size = map_ptr->width/sqsize * map_ptr->height/sqsize * PE_SONAR_NUM;
    if (map_ptr->pe_ptr != NULL) free(map_ptr->pe_ptr);

    /* Allocate enough space for the floor plan itself */
    if ((map_ptr->pe_ptr = (byte *)malloc((int)size)) == NULL) {
        Draw_Status_Line(" NewPEArray: malloc failed.");
        mouse_on();
        return (FALSE);
    }

    /* Clear the map */
    t_ptr = map_ptr->pe_ptr;
    for(i=0;i < size;i++) *t_ptr++ = 0;

    /* Reset the file name */
    map_ptr->peName[0] = 0;
    mouse_on();
    return (TRUE);
}


/****************************************************************************/
/* New_Floor_Map will first ask the user to input floor dimensions for the  */
/* new floor map. It then frees any previously allocated internal storage   */
/* and allocates a floor map of the correct size. It then clears the map.   */
/****************************************************************************/
int  New_Floor_Map(map_ptr)
map  *map_ptr;
{
    char str[80];
    unsigned int  i, size;
    byte *t_ptr;

    mouse_off();
    /* Get the floor dimensions and allocate internal memory for the floor map*
/
    map_ptr->width =  GetSLValue(1, 255, " Type the floor width [1-255]> ");
    map_ptr->height = GetSLValue(1, 255, " Type the floor height [1-255]> ");

    map_ptr->lx = 0;
    map_ptr->ly = 0;
    map_ptr->ux = map_ptr->width - 1;
    map_ptr->uy = map_ptr->height - 1;

    map_ptr->squaresize = GetSLValue(1, 12, " Type the squaresize [1-12]> ");
    map_ptr->ndoors = 0;

    /* Free the old block of dynamic mem used for the previous floor map */
    if (map_ptr->mem_ptr != NULL) free(map_ptr->mem_ptr);

    /* Allocate enough space for the floor plan itself */
    size = map_ptr->width * map_ptr->height;
    if ((map_ptr->mem_ptr = (byte *)calloc(map_ptr->width, map_ptr->height)) ==
 NULL) {
        sprintf(str, " New_Floor_Map: calloc(%u,%u) failed.",map_ptr->width, ma
p_ptr->height);
        Draw_Status_Line(str);
        mouse_on();
        return (FALSE);
```

```
    }

    /* Clear the map */
    t_ptr = map_ptr->mem_ptr;
    for(i=0;i < size;i++) *t_ptr++ = CLEAR;

    /* Reset the file name */
    map_ptr->mapName[0] = 0;
    mouse_on();
    return (TRUE);
}


/****************************************************************************/
/* SavePEArray will save the internal memory position estimation array to  */
/* disk. If the user inputs a file that already exists, SavePEArray will    */
/* write over it.                                            */
/****************************************************************************/
int SavePEArray(map_ptr)
map *map_ptr;
{
    int  fh, sqsize;
    long size;
    byte *ptr;
    char str[80];

    mouse_off();
    sqsize = map_ptr->squaresize;
    /* Form the prompt string with the default file name, if any */
    str[0] = '\0';
    strcat(str, " Type P.E. file name <");
    if (map_ptr->peName[0] != 0) strcat(str, map_ptr->peName);
    strcat(str, "> ? ");

    /* Get a save file name and create it. Write over any old file by the
          same name.                                    */
    if ((fh = Open_File(O_WRONLY | O_CREAT | O_TRUNC | O_BINARY, map_ptr->peNam
e,
    "Type PE file name> ")) == -1){
        if (map_ptr->peName[0] != 0)
            fh = open((char *)map_ptr->peName, O_CREAT | O_TRUNC | O_BINARY, S_
IREAD | S_IWRITE);
        else {
                Clear_Line(25);
                mouse_on();
                return (FALSE);
        }
    }

    /* Print the Saving file message */
    str[0] = '\0';
    strcat(str, " Saving to file: ");
    strcat(str, map_ptr->peName);
    Draw_Status_Line(str);

    /* Write the floor data in chunks of no larger than 32K */
    size = map_ptr->width/sqsize * map_ptr->height/sqsize * PE_SONAR_NUM;
    ptr = map_ptr->pe_ptr;
    while (size > 32000L) {
        write(fh, (char *) ptr, 32000);
        ptr += 32000L;
        size -= 32000L;
    }
    write(fh, (char *) ptr, (unsigned int) size);

    /* Close the floor map file */
    close(fh);
    Clear_Line(25);
    mouse_on();
    return (.RUE);
}
```

```
/****************************************************************************/
/* Save_Floor_Map will save the internal memory floor map to disk. If the   */
/* user inputs a file that already exists, Save_Floor_Map will write over it.*/
/****************************************************************************/
int Save_Floor_Map(map_ptr, name)
map *map_ptr;
char *name;
{
    char              str[80];
    int               fh;
    unsigned int      length;
    MAP_HEADER        map_info;

    if (name == NULL) {
        /* Use the egalib routine to scan for .map files and allow him to
         * select a file that way.
         */
        mouse_on();
        SelectFile("*.map", map_ptr->mapName, " Save ");
        mouse_off();
        fh = open((char *) map_ptr->mapName, (int)O_WRONLY|O_CREAT|O_TRUNC|O_BI
NARY,S_IREAD|S_IWRITE);
    }
    else {
        fh = open(name, (int)O_WRONLY|O_CREAT|O_TRUNC|O_BINARY,S_IREAD|S_IWRITE
);
    }

    mouse_off();
    /* Print the Saving file message */
    sprintf(str, " Saving to file: %s ", name == NULL ? map_ptr->mapName : name
);
    Draw_Status_Line(str);

    map_info.map_magic = MAPMAGIC;
    map_info.version = 0x10;
    map_info.width = map_ptr->width;
    map_info.height = map_ptr->height;
    map_info.squaresize = map_ptr->squaresize;
    map_info.xmapoff = map_ptr->xmapoff;
    map_info.ymapoff = map_ptr->ymapoff;
    map_info.compression_scheme = COMP_NONE;
    strcpy(map_info.map_name, map_ptr->mapName);
    map_info.res1 = 0;
    map_info.res2 = 0;

    if (write(fh, (char *) &map_info, sizeof(map_info)) != sizeof(map_info)) {
        gstatus("Unable to write map header -->");
        mgetkey();
        mouse_on();
        return (ERROR);
    }

    /* Write the floor data */
    length = map_ptr->width * map_ptr->height;
    if (write(fh, (char *) map_ptr->mem_ptr, length) != length) {
        gstatus("Error in writing floor map data -->");
        mgetkey();
        mouse_on();
        return (ERROR);
    }

    /* Close the floor map file */
    close(fh);

    save_door_info(map_ptr, map_ptr->mapName);
    save_virtual_info(map_ptr, map_ptr->mapName);

    Clear_Line(25);
    mouse_on();
    return (TRUE);
}
```

```
/**************************************************************************/
/* Fix_Point accepts two pointers to x and y coordinates and handles cursor */
/* key events until a point location is selected (by typing a <return>). The */
/* point is plotted in the color specified by the parameter "color".        */
/* Fix_Point keeps the cursor within the given floor map boundaries and the */
/* x and y values pointed to by x_ptr and y_ptr are equal to the point      */
/* selected when the routine returns.                                       */
/**************************************************************************/
Fix_Point(map_ptr, x_ptr, y_ptr, color)
map  *map_ptr;
int  *x_ptr, *y_ptr;
int  color;
{
    char str[50];
    int  scale, scrx, scry, ii;
    int x1, y1, x2, y2;
    unsigned int  c;
    struct keydelta {
        int key;
        int dx,dy;
    };
    static struct keydelta keys[16] = {
        {END, -1, -1},  {LEFTARROW, -1, 0}, {HOME, -1, 1}, {UPARROW, 0, 1},
        {PGUP, 1, 1}, {RIGHTARROW, 1, 0}, {PGDN, 1, -1}, {DOWNARROW, 0, -1},
        {SEND, -10, -10}, {SLEFTARROW, -10, 0}, {SHOME, -10, 10},
        {SUPARROW, 0, 10}, {SPGUP, 10, 10}, {SRIGHTARROW, 10, 0},
        {SPGDN, 10, -10}, {SDOWNARROW, 0, -10}
    };
    GBUF        *savesq;
    extern GBUF *readsq();

    Clear_Line(1);
#if 0
    /* Set up the title fields */
    PutString(1,1,"                Accept:CR Abort:ESC");
#endif

    text_foreground(IWHITE);
    text_background(BLACK);
    /* Plot the initial point */
    scrx = map_ptr->xoff;
    scry = map_ptr->yoff;
    scale = map_ptr->scale;
    savesq = readsq(x1, y1, x2, y2);
    ScalePoint(map_ptr, *x_ptr, *y_ptr, color);

    /* Flush out the keyboard input buffer */
    while (keyhit())
        mgetkey();

    /* Edit menu loop, until quit command received */
    do {

        /* If there are no keys to process then
         * tell user the current location and mark */
        if (!keyhit()) {
            all_coords(str, *x_ptr, *y_ptr, map_ptr);
            PutString(1, 1, str);
        }

        c = mgetkey();
        if (c == F1) {
            continue;
        }
        for (ii = 0; ii < 16; ii++) {           /* search for matching key */
            if (keys[ii].key == c)              /* found it */
                break;
        }
        if ('i < 16) {
            writesq(x1, y1, savesq);            /* restore old square */
            freesq(savesq);
            *x_ptr += keys[ii].dx;
```

```
            *y_ptr += keys[ii].dy;
            if (*x_ptr < 0) *x_ptr = 0;
            if (*x_ptr >= map_ptr->width) *x_ptr = map_ptr->width - 1;
            if (*y_ptr < 0) *y_ptr = 0;
            if (*y_ptr >= map_ptr->height) *y_ptr = map_ptr->height - 1;
            x1 = scrx + *x_ptr * scale;
            x2 = x1 + scale - 1;
            y2 = scry - *y_ptr * scale;
            y1 = y2 - scale + 1;
            savesq = readsq(x1, y1, x2, y2);
            ScalePoint(map_ptr, *x_ptr, *y_ptr, color);
        }
    }
    while (c != CR && c != ESC && (c < ' ' || c > 0x7f));

    /* Restore the old value under the cursor */
    writesq(x1, y1, savesq);
    freesq(savesq);

    if (c == ESC)
        return (-1);
    return (c);
}


all_coords(str, robx, roby, map_ptr)
char *str;
int robx, roby;
map *map_ptr;
{
    int ix, iy;

    ix = (robx + map_ptr->xmapoff) * map_ptr->squaresize;
    iy = (roby + map_ptr->ymapoff) * map_ptr->squaresize;
    sprintf(str, "%3d,%-3d %2d'%2d\",%2d'%2d\" %02x", robx, roby,
            ix/12, ix%12, iy/12, iy%12,
            floor(robx, roby, map_ptr));
    return (OK);
}
```

```
/*******************************************************************
 *                              misc.c                             *
 *******************************************************************
 * Miscellaneous functions for the Robart software.                *
 *                                                                 *
 * Author: Gary Gilbreath, 2 Feb 88                                *
 *                                                                 *
 *******************************************************************/

#include <stdio.h>
#include <malloc.h>
#include <string.h>
#include <math.h>
#include <event.h>
#include <ega.h>
#include <syscolor.h>
#include <event.h>
#include <menu.h>
#include <dialog.h>
#include <crtvideo.h>

#include "headers/ibmio.h"

#ifndef PI
#define PI   3.14159265358979323846
#endif


/* Keyboard handling stuff */
#define KB_BUFF_SIZE    16

unsigned int    kbbuff[KB_BUFF_SIZE];
int             kbwtptr = 0;
int             kbrdptr = 0;

extern drType robart;
extern long     robotx, roboty, robothdg;
extern int debug_port;
extern int map_direction;

void    mouse_on(), mouse_off();
char    *mygets();


errorbox(format, a,b,c,d,e,f,g,h,i,j)
char *format;
long a,b,c,d,e,f,g,h,i,j;
{
        int             len;
        int             x;
        static char     str[512];
        static DIALOG_ITEM ebox[] = {
                {0,11,0,STRING,DIALOG_FORE,TRANSPARENT,str},
                {70, 45,  67, OK_BUTTON|DEFAULT_BUTTON, DIALOG_FORE, TRANSPAREN
T, NULL},
                {-1, -1, -1, TEXT, DIALOG_FORE, TRANSPARENT, NULL}
        };
        DIALOG  *dbox;

        sprintf(str, format, a,b,c,d,e,f,g,h,i,j);
        len = strlen(str);
        ebox[0].width = len * 8;
        x = (gdmaxcol - ebox[0].width) / 2;
        if (x < 0) x = 0;
        ebox[1].x = (ebox[0].width - ebox[1].width)/2;
        if((dbox = OpenDialog(ebox, x, gdmaxrow/2-30, ALERT)) != NULL) {
                (void) EditDialog(dbox);
                CloseDialog(dbox);
        }
        retu.n (OK);
}
```

```
/*******************************************************************
 *                          get_manual_path                        *
 *******************************************************************
 * Get a list of points from the user using the mouse.             *
 *                                                                 *
 * Call with:                                                      *
 *      map_ptr = (map *) pointer to current floor map             *
 *      xy_list = (XY_PAIR *) pointer to array to put set x-y pairs *
 *                      describing the path                        *
 *      max_pts = (int) maximum number of points allowed           *
 *                                                                 *
 * Returns:                                                        *
 *      number of points in the array                              *
 *      -1 if user aborted                                         *
 *******************************************************************/
get_manual_path(map_ptr, xy_list, max_pts)
map  *map_ptr;
XY_PAIR *xy_list;
int max_pts;
{
     char         str[80];
     int          ii;
     int          aborted, quit;
     int          oldmapx, oldmapy;
     int          prevx, prevy;
     MAPC_STRUCT mapc;
     EVENT        evnt;
     GBUF         *savebuf;

     mouse_off();
     Clear_Line(1);
     DrawSFloorMap(map_ptr, WHITE, BLUE, GREEN);

     /* Display Robart on the map */
     savebuf = save_robart(map_ptr, robart.x, robart.y);
     draw_robart(map_ptr, robart.x, robart.y);

     Clear_Line(25);

     text_foreground(IWHITE);
     text_background(BLACK);
     Clear_Line(2);
     PutString(1,1, "Enter destinations, terminate with ESC.");

     mouse_on();
     mapc_Init(&mapc, map_ptr, LGREEN, LRED);
     xy_list[0].x = prevx = robart.x;
     xy_list[0].y = prevy = robart.y;
     start_banding(&mapc, robart.x, robart.y);

     for (quit = aborted = NO, ii = 1; !quit && !aborted && ii < max_pts;) {
         oldmapx = mapc.mapx, oldmapy = mapc.mapy;
         mapc_update(&mapc);                 /* update cursor position */
         if (oldmapx != mapc.mapx || oldmapy != mapc.mapy) {
             all_coords(str, mapc.mapx, mapc.mapy, map_ptr);
             text_foreground(IWHITE);
             text_background(BLACK);
             mouse_off();
             PutString(25,1, str);
             mouse_on();
         }
         if (autopan(map_ptr, &mapc, &savebuf) == 1) {
                 restore_robart(savebuf);
                 Draw_Inflection_List_Path(map_ptr, xy_list, ii, IWHITE);
                 savebuf = save_robart(map_ptr, robart.x, robart.y);
                 draw_robart(map_ptr, robart.x, robart.y);
         }
         while (GetEvent(&evnt)) {
             switch(evnt.type & 0xFF00) {
             case KEYBOARD :
                 if(evnt.data == 0x011B || evnt.data == F10) {
                         aborted = quit = YES;
                 }
```

```
                        break;

                case MOUSEBUTTONDOWN:
                        if (!mapc.in_map)
                                break;
                        /* If the user double clicks the last point, then assume
                         * that is the last point on the path and just quit.
                         */
                        if (prevx == mapc.mapx && prevy == mapc.mapy) {
                                aborted = quit = YES;
                        }
                        else {
                                xy_list[ii].x = prevx = mapc.mapx;
                                xy_list[ii].y = prevy = mapc.mapy;
                                stop_banding(&mapc);
                                mapc_off(&mapc);
                                map_draw_line(mapc.rx1, mapc.ry1, mapc.rx2, mapc.ry2, I
WHITE);
                                mapc_on(&mapc);
                                start_banding(&mapc, mapc.mapx, mapc.mapy);
                                ii++;
                        }
                        break;
                }
        }
    }
    stop_banding(&mapc);
    mapc_off(&mapc);
    restore_robart(savebuf);
    mouse_on();
#if 0
    if (mapc.in_map) {              /* mouse in the map */
        mapc_off(&mapc);            /* turn map cursor off */
        mouse_on();                 /* turn mouse back on */
    }
#endif
    return (ii);                    /* return number of points */
}


/* make_name - make a file name.  Use the base string as the base part
 *      of the file name.  Delete any trailing extension and add the
 *      new ext.  NOTE: ext must include the '.', e.g. ".map"
 */
make_name(newname, basename, ext)
char *newname, *basename, *ext;
{
        char    *cp;

        strcpy(newname, basename);
        cp = strrchr(newname, '.');         /* find the last . */
        if (cp != NULL)                     /* if found one */
                *cp = EOS;                  /* truncate at dot */
        strcat(newname, ext);               /* tack on new ext */
        return (OK);
}


/* keyhit - see if a key on the keyboard has been struck.  If so, remove
 *      if from the event queue and stick it in our own circular buffer
 *      so that getkey and mgetkey can get it.  Also interprets mouse button
 *      presses as if the user had struck the Enter key.
 */
keyhit()
{
        EVENT   evnt;

        while (GetEvent(&evnt)) {
                if ((evnt.type & 0xff00) == KEYBOARD) {
                        kbbuff[kbwtptr++] = evnt.data;
                        if (kbwtptr >= KB_BUFF_SIZE)
                                kbwtptr = 0;
                }
```

```
                else if ((evnt.type & 0xff00) == MOUSEBUTTONDOWN) {
                        kbbuff[kbwtptr++] = 0x1c0d;
                        if (kbwtptr >= KB_BUFF_SIZE)
                                kbwtptr = 0;
                }
        }
        if (kbwtptr != kbrdptr)
                return (YES);
        return (NO);
}


/* getkey - wait for a key to be struck */
getkey()
{
        int     cc;

        while (!keyhit())
                ;
        cc = kbbuff[kbrdptr++];
        if (kbrdptr >= KB_BUFF_SIZE)
                kbrdptr = 0;
        return (cc);
}


/* mgetkey - my getkey.  Waits for the user to type a key.  If it was a
 *      normal keyboard character, then the ASCII value for that key is
 *      returned.  If it was a function key or part of the keypad, then
 *      the scan code is returned in the most significant byte and the
 *      ASCII (if any) is returned in the least significant byte.
 *      The distinction between function keys and normal keys is that
 *      everything with a scan code less than 0x3b is normal.  Anything
 *      else is a function key.
 */
unsigned int mgetkey()
{
        unsigned int cc;

        cc = getkey();
        /* If not a function key, return just the ASCII portion */
        if ((cc & 0xff) != 0 && cc < 0x3b00)
                return (cc & 0xff);
        return (cc);
}


/* mygets - my get string function.  Uses text mode. */
char *mygets(str)
char *str;
{
        int     quit;
        int     key;
        int     ix;
        int     row, col, orgrow, orgcol;

        ix = 0;
        crt_readcur(&orgrow, &orgcol);          /* get current position */
        row = orgrow;
        col = orgcol;
        quit = 0;
        while (!quit) {
                key = mgetkey();                /* get next key typed */
                if ((key & 0x7f) != 0)          /* if not a function key */
                        key &= 0x7f;            /* strip off scan code */

                switch (key) {
                case 0x1b:                      /* bomb out? */
                        *str = EOS;
                        return (NULL);
                case '\r':                      /* finished? */
                case F10:
                        quit = YES;             /* set flag */
```

```c
			break;

		/* Check for backspace */
		case 0x08:			/* ^H? */
		case 0x4b00:			/* left arrow? */
		case 0x5300:			/* Del? */
			if (ix > 0) {		/* any characters typed? */
				crt_movecur(row, --col);
				crt_clreol(BLACK, WHITE);
				ix--;		/* back up char index */
			}
			break;

		/* Check for line cancel */
		case 0x15:			/* ^U? */
		case 0x18:			/* ^X? */
		case 0x19:			/* ^Y? */
			crt_movecur(orgrow, orgcol);
			crt_clreol(BLACK, WHITE);
			row = orgrow, col = orgcol;
			ix = 0;			/* back at first char */
			break;

		/* Catch the rest of the characters */
		default:
			if (key >= ' ') {	/* ignore control chars */
				crt_putc(BLACK,WHITE,row,col, (byte) key,1);
				col++;
				str[ix++] = (char) key;
				crt_movecur(row, col);
			}
			break;
		}
	}
	str[ix] = EOS;
	return (str);
}


/* strxlat - using <str> as input, translate all occurences of <old> to
 *	<new>.  Translation is done in-place, but may involve multiple
 *	copy operations if the <old> and <new> strings are of different
 *	lengths.
 */
char *strxlat(str, old, new)
char *str, *old, *new;
{
	register char	*dp, *sp;
	char		*found_str;
	int		len, newlen, oldlen, difflen;
	int		ii, limit;

	oldlen = strlen(old);		/* save length of old string */
	newlen = strlen(new);		/* length of new string */
	difflen = newlen - oldlen;	/* save difference between old and new
*/
	for (found_str = str;;) {
		/* Find old string in current string */
		found_str = strstr(found_str, old);
		if (found_str == NULL)		/* not found, replacement done
*/
			break;
		len = strlen(found_str);	/* get current length */
		limit = len - oldlen;		/* get number of characters to
move */
		/* Move characters that are not being translated to
		 * their new location.  If <new> string is longer than
		 * <old> string, from last to first.  Otherwise, move from firs
t
		 * to last.  Note that the null terminator also must be moved.
		 */
		if (difflen > 0) {	/* new string longer than old? */
			dp = &found_str[len + difflen]; /* point to destination
```

```c
 */
			sp = &found_str[len];	/* point to source */
			/* Copy string from last char to first */
			for (ii = 0; ii <= limit; ii++)
				*dp-- = *sp--;
		}
		else if (difflen < 0) { /* new string shorter than old? */
			dp = &found_str[newlen];
			sp = &found_str[oldlen];
			for (ii = 0; ii <= limit; ii++)
				*dp++ = *sp++;
		}
		/*
		 * Copy the replacement characters over the old ones.
		 */
		for (ii = 0; ii < newlen; ii++)
			*found_str++ = new[ii];
	}
	return (str);
}


/* debug_out - output a formatted string of characters to the debug serial
 *	port if the port has been successfully opened.
 */
void debug_out(fmt, a1, a2, a3, a4, a5)
char *fmt;
long a1, a2, a3, a4, a5;
{
	char	str[256];

	if (debug_port < 0)		/* if debug_port not opened */
		return;
	sprintf(str, fmt, a1, a2, a3, a4, a5);
	sp_write(debug_port, str, strlen(str));
#if 0
	strxlat(str, "\n", "\r\n");	/* change plain \n to \r\n */
	sp_write(debug_port, str, strlen(str));
#endif
}


void mouse_on(void)
{
	if (MouseActive)
		show_mouse();
}


void mouse_off(void)
{
	if (MouseActive)
		hide_mouse();
}


/* tstatus - print a line of text on the status line in text mode */
void tstatus(fmt,a,b,c,d,e,f,g)
char *fmt;
long a,b,c,d,e,f,g;
{
	char str[132];

	crt_clearline(25, BLACK, WHITE);
	sprintf(str, fmt, a,b,c,d,e,f,g);
	crt_puts(BLACK, WHITE, 25, 0, str);
}


/* gstatus - print a line of text on the status line in graphics mode */
void gstatus(fmt,a,b,c,d,e,f,g)
char *fmt;
long a,b,c,d,e,f,g;
```

```
{
        char            str[255];
        extern FILE     *debug_fd;
        extern int      debug_mode, paranoid;

        text_foreground(WHITE);
        text_background(BLACK);
        gpmove(0, gdmaxrow-13);
        gpcolor(BLACK);
        gpbox(gdmaxcol, gdmaxrow);
        sprintf(str, fmt, a,b,c,d,e,f,g);
        text_move(0, gdmaxrow-3);
        text_out(str);

        if (paranoid && debug_mode)
                debug_fd = fopen("debug.msg", "a+");
        if (debug_mode) {
                if (debug_fd == NULL)
                        debug_fd = fopen("debug.msg", "a+");
                fprintf(debug_fd, "%s\n", str);
        }
        if (paranoid && debug_mode) {
                fclose(debug_fd);
                debug_fd = NULL;
        }
}


#include "headers/robicons.h"

void draw_robart(map_ptr, mapx, mapy)
map *map_ptr;
int mapx, mapy;
{
    register int        scale;
    int                 dir;

    if (mapx < map_ptr->lx || mapx > map_ptr->ux ||
        mapy < map_ptr->ly || mapy > map_ptr->uy)
            return;

    scale = map_ptr->scale;
#if 0
    ScalePoint(map_ptr->xoff + (mapx - map_ptr->lx) * scale -2,
            map_ptr->yoff - (mapy - map_ptr->ly) * scale +2, scale+4, IWHITE
);
#else
    dir = (force360(robart.dir) + 7) / 15;
    if (dir == 24) dir = 0;
    gpmove(map_ptr->xoff + (mapx - map_ptr->lx) * scale -10 + (scale+1)/2,
            map_ptr->yoff - (mapy - map_ptr->ly) * scale - 10 - (scale-1)/2)
;

    gpcolor(BLACK);
    gpsprite(robart_icons[dir], 19, 19, 10);
#endif
}


static int xx1, yy1, xx2, yy2;

GBUF *save_robart(map_ptr, mapx, mapy)
map *map_ptr;
int mapx, mapy;
{
        register int    scale;
        GBUF            *psave;

        if (mapx < map_ptr->lx || mapx > map_ptr->ux ||
            mapy < map_ptr->ly || mapy > map_ptr->uy)
                return (NULL);
        scale = map_ptr->scale;
#if 0
```

```
        xx1 = map_ptr->xoff + (mapx - map_ptr->lx) * scale - 2;
        yy2 = map_ptr->yoff - (mapy - map_ptr->ly) * scale + 2;
        xx2 = xx1 + scale + 4;
        yy1 = yy2 - scale - 4;
#else
        xx1 = map_ptr->xoff + (mapx - map_ptr->lx) * scale - 10 + (scale+1)/2;
        yy1 = map_ptr->yoff - (mapy - map_ptr->ly) * scale - 10 - (scale-1)/2;
        xx2 = xx1 + 20;
        yy2 = yy1 + 20;
#endif
        psave = readsq(xx1, yy1, xx2, yy2);
        return (psave);
}


void restore_robart(psave)
GBUF *psave;
{
    if (psave == NULL)
        return;
    writesq(xx1, yy1, psave);
    freesq(psave);
}


/* force180 - force the given angle to the range -180 <= degrees <= +180 */
force180(degrees)
int degrees;
{
        degrees %= 360;
        if (degrees > 180)       /* between 180 and 360? */
                degrees -= 360;  /* force to 0 to -180 */
        if (degrees < -180)      /* between -180 and -360? */
                degrees += 360;
        return (degrees);
}



/* force360 - force the given angle to the range 0 <= degrees <= +360 */
force360(degrees)
int degrees;
{
        degrees = force180(degrees);    /* make it between -180 and 180 */
        if (degrees < 0)                /* make it 0 to 360 */
                degrees += 360;
        return (degrees);
}


/* force18000 - force the given angle to the range -18000 <= degrees <= +18000
*/
long force18000(degrees)
long degrees;
{
        degrees %= 36000L;
        if (degrees > 18000L)           /* between 18000 and 36000? */
                degrees -= 36000L;      /* force to 0 to -18000 */
        if (degrees < -18000L)          /* between -18000 and -36000? */
                degrees += 36000L;
        return (degrees);
}



/* force36000 - force the given angle to the range 0 <= degrees <= +360 */
long force36000(degrees)
long degrees;
{
        degrees = force18000(degrees);  /* make it between -18000 and 18000 */
        if (degrees < 0L)               /* make it 0 to 36000 */
                degrees += 36000L;
        return (degrees);
```

```
}


/* readsq - read the rectangular chunk of memory indicated by the coordinates.
 *      Returns a pointer to a malloced array that contains the screen
 *      image covered the rectangle.
 */
GBUF *readsq(x1, y1, x2, y2)
int x1, y1, x2, y2;
{
    GBUF *save_array;

    save_array = (GBUF *) malloc(sizeof(GBUF));
    if (save_array == NULL)
        return (NULL);
    save_array->width = x2 - x1 + 1;
    save_array->height = y2 - y1 + 1;
    save_array->bytes = save_array->width/8 + 3;
    /* save the region of pixels */
    save_array->buff = malloc((save_array->width+2)*save_array->height);
    if (save_array->buff == NULL) {
        Draw_Status_Line("readsq: Can't alloc save buffer");
        mgetkey();
        return (NULL);
    }
    gpmove(x1, y1);
    gpmovgtm(save_array->buff, save_array->width, save_array->height, save_arra
y->width);

    return (save_array);

}



/* writesq - write the square of pixels returned by the readsq command. */
writesq(x, y, save_array)
int x, y;
GBUF *save_array;
{
    /* Restore the screen to it's previous state */
    gpmerge(MRPL);
    gpmove(x, y);
    gpmovmtg(save_array->buff, save_array->width, save_array->height, save_arra
y->width);
    return (0);
}


/* freesq - free up the memory occupied by the square just saved */
freesq(save_array)
GBUF *save_array;
{
        free(save_array->buff);
        free(save_array);
        return (OK);
}


/* batt_update - update the display of battery voltage and odometer */
batt_update()
{
    char str[40];

    sprintf(str, "(%21d'%21d.%1d\",%21d'%21d.%1d\") %31d.%021d",
        robotx/120L, (robotx%120L)/10L, (robotx%120L)%10L,
        roboty/120L, (roboty%120L)/10L, (roboty%120L)%10L,
        robothdg/100L, robothdg%100L);
    gstatus("                    Batt: %2d.%02dV Dist: %41d'%21d\" %s",
            robart.battery_voltage/100, robart.battery_voltage % 100,
            robart.odometer / 12L, robart.odometer % 12L, str);
}
```

```
iabs(x)
int x;
{
    if (x < 0)
        return (0 - x);
    return (x);
}

/*****************************************************************************/
/* Clip_To_Map will return true if the given input point is on the input map */
/* otherwise, it returns false.                                              */
/*****************************************************************************/
int Clip_To_Map(x, y, map_ptr)
int  x, y;
map  *map_ptr;
{
    if ((x >= map_ptr->width) || (x < 0) || (y < 0) ||
        (y >= map_ptr->height)) {
        return (FALSE);
    }
    else return (TRUE);
}


#if 1
/*****************************************************************************/
/* Calc_Dest_Grid_Unit accepts a sensor angle (relative to Robart's current  */
/* heading) and range and then computes the incremental x and y values in    */
/* multiple numbers of grid units relative to the map.                       */
/*****************************************************************************/
void Calc_Dest_Grid_Unit(sensor_angle, range, x_ptr, y_ptr, res)
int    sensor_angle;
double range;
int    *x_ptr, *y_ptr;
int    res;
{
    double      acc, dx, dy, radians;
    int         res2;
    extern double sinary[], cosary[];

    res2 = res/2;
    sensor_angle = force360(map_direction + robart.dir + sensor_angle);
    dx = range * sinary[sensor_angle];
    dy = range * cosary[sensor_angle];
    acc = (fabs(dx) - res2)/res;
    *x_ptr = (int) (robart.x + (isgn(dx) * acc) + 0.5);
    acc = (fabs(dy) - res2)/res;
    *y_ptr = (int) (robart.y + (isgn(dy) * acc) + 0.5);
}
#else
/*****************************************************************************/
/* Calc_Dest_Grid_Unit accepts a sensor angle (relative to Robart's current  */
/* heading) and range and then computes the incremental x and y values in    */
/* multiple numbers of grid units relative to the map.                       */
/*****************************************************************************/
void Calc_Dest_Grid_Unit(sensor_angle, range, x_ptr, y_ptr, res)
int    sensor_angle;
double range;
int    *x_ptr, *y_ptr;
int    res;
{
    double      acc, dx, dy, radians;
    int         res2;

    res2 = res/2;
    radians = Angle_To_Rads(map_direction + robart.dir + sensor_angle);
    dx = range * sin(radians);
    dy = range * cos(radians);
    acc = (fabs(dx) - res2)/res;
    *x_ptr = (int) (robart.x + (isgn(dx) * acc) + 0.5);
    acc = (fabs(dy) - res2)/res;
    *y_ptr = (int) (robart.y + (isgn(dy) * acc) + 0.5);
}
```

```


#endif

/*************************************************************************/
/* RotateSonarData accepts a pointer to a valid input PE array and rotates  */
/* the data based on the cardinal integer "rotate" and places the result in */
/* the PE array pointed to by out. "rotate" may be any valid integer, since */
/* RotateSonarData uses modulo math.                                        */
/*************************************************************************/
void RotateSonarData(rotate, in, out)
int  rotate;
byte *in, *out;
{
    int i;

    for(i=0;i<PE_SONAR_NUM;i++)
        out[(PE_SONAR_NUM+rotate+i) % PE_SONAR_NUM] = in[i];
}


/*********************************************************************
 *                          head_pos                                 *
 *********************************************************************
 * Position the head to the desired position.                        *
 *                                                                   *
 * Call with:                                                        *
 *     cc =     HOME or UPARROW: center head                         *
 *              LEFTARROW: jog counter-clockwise by <jog>            *
 *              RIGHTARROW: jog clockwise by <jog>                   *
 *              SLEFTARROW: jog counter-clockwise by <jog*5>         *
 *              SRIGHTARROW: jog clockwise by <jog*5>                *
 *              'p': Prompt for an absolute head position            *
 *              'j': Enter new jog increment                         *
 *                                                                   *
 * Author: Bart Everett  26 October 87                               *
 *                                                                   *
 *********************************************************************/
void head_pos(cc)
int cc;
{
    char str[80], packstr[40];
    int position;
    static int jog = 11;

    if (cc == HOME || cc == UPARROW) {
        sprintf(packstr, "OH1%02x", jog);
        robart.headDir = 0;
    }
    else if (cc == LEFTARROW) {
        sprintf(packstr, "OH2%02x", jog);
        robart.headDir = force360(robart.headDir - (jog*100 + 62)/124);
    }
    else if (cc == RIGHTARROW) {
        sprintf(packstr, "OH3%02x", jog);
        robart.headDir = force360(robart.headDir + (jog*100 + 62)/124);
    }
    else if (cc == SLEFTARROW) {
        sprintf(packstr, "OH2%02x", 5*jog);
        robart.headDir = force360(robart.headDir - (5*jog*100 + 62)/124);
    }
    else if (cc == SRIGHTARROW) {
        sprintf(packstr, "OH3%02x", 5*jog);
        robart.headDir = force360(robart.headDir + (5*jog*100 + 62)/124);
    }
    else if ((cc & 0x7f) == 'p') {
        if (ggets(str, "Enter Desired Head Position (270-360 0-90 degrees): ",
"") == NULL) {
            Clear_Line(25);
            return;
        }
        Clear_Line(25);
        sscanf(str, "%d", &position);
```

```
        pos_head(position);
    }
    else if ((cc & 0x7f) == 'j') {
        if (ggets(str, "Enter New Jogging Increment (1-15): ", "") == NULL) {
            Clear_Line(25);
            return;
        }
        Clear_Line(25);
        sscanf(str, "%x", &jog);
        if (jog > 15)
            jog = 15;
        return;
    }
    else
        return;
    put_packet(packstr);
    return;
}

puts_time(fd)
FILE *fd;
{
        time_type       cur_time;

        clk_gettime(&cur_time);
        fprintf(fd, "%02d:%02d:%02d.%d%d", cur_time.hours, cur_time.minutes,
                cur_time.seconds, cur_time.tenths, cur_time.hundredths);
        return (0);
}


static unsigned long int next = 1;
/* myrand - the random number function from the X3J11 ANSI C standard, section
 *      4.10.2.1.
 */
int myrand(void)
{
        next = next * 1103515245L + 12345L;
        return (unsigned int) (next/65536) % 32768;
}


void mysrand(unsigned int seed)
{
        next = seed;
}
```

```
/**********************************************************************
 *                      Obstacle Avoidance Stuff                      *
 **********************************************************************
 * The routines in this file handle obstacle avoidance maneuvers.     *
 *                                                                    *
 **********************************************************************/

#include <stdio.h>
#include <malloc.h>
#include <stdlib.h>
#include <ega.h>
#include <event.h>

#include "headers/ibmio.h"


extern drType   robart;

int     oa_override = 0;        /* override minimum obstacle detection distance
 */
int     avoid_wait = NO;        /* wait for user to hit a key before executing
                                 * the avoidance maneuver
                                 */
extern int demo_mode;           /* YES => in demo mode, so display more
                                 * information while executing/planning
                                 * paths.
                                 */
extern int      robot_type;
extern long     robotx, roboty, robothdg;


/* avoid - plan a path around the current obstacle.  Keep trying to go
 *      to the destination until we get there, get within 3", or the
 *      path planning operation fails.
 *
 * Call with:
 *      map_ptr                 = (map *) current map
 *      use_global_planner      = (int) 1 => use global path planner
 *      path                    = (PATHSEG *) list of path segments being execu
ted
 *      nsegs                   = (int) number of path segments in <path>
 *      dest_index              = (int) how far we got along the path list
 *                                until we ran into an obstacle.
 *
 * Returns:
 *      OK      if obstacle successfully avoided
 *      !OK     if couldn't find a way around it
 */
avoid(map_ptr, use_global_planner, path, nsegs, dest_index)
map *map_ptr;
int use_global_planner;
PATHSEG *path;
int nsegs, dest_index;
{
        char            str[80];
        byte            *bp;
        int             sqsize;
        int             status;
        int             curseg;
        int             destx, desty;
        int             ii, jj;
        int             npoints;
        int             sq_per_6_inches;        /* number of map squares per 6
inches */
        int             x, y;
        int             xstart, xlim, ystart, ylim;
        int             newnsegs;
        XY_PAIR         *avoid_list;
        map             tmap;
        PATHSEG         *newpath;

        /* Compact the current inflection list, getting rid of those
         * points that have already been traversed.
```

```
         */
        for (ii = 0, jj = dest_index; jj < nsegs; ii++, jj++) {
                path[ii] = path[jj];
        }
        nsegs -= dest_index;

        destx = path[0].x2;
        desty = path[0].y2;

        /* If robot really already at destination, don't try to plan another
         * path.
         */
        if ((destx == robart.x) && (desty == robart.y))
                goto continue_path;

avoid_again:

        /* Clear out the area occupied by the robot.  We make the incorrect
         * assumption that the robot occupies a square 12" on a side.  This
         * area surrounding (robart.x,robart.y) is cleared to 0
         */
        sq_per_6_inches = 6 / map_ptr->squaresize;
        xstart = robart.x - sq_per_6_inches;
        xlim = robart.x + sq_per_6_inches;
        ystart = robart.x - sq_per_6_inches;
        ylim = robart.x + sq_per_6_inches;
        for (x = xstart; x <= xlim; x++) {
                for (y = ystart; y <= ylim; y++) {
                        bp = map_ptr->mem_ptr + x + y*map_ptr->width;
                        if (*bp && *bp < 128)   /* clear only sonar returns */
                                *bp = 0;
                }
        }

        /* Bring the obstacle avoidance envelope in.  We probably have enough
         * clearance, we just need to decrease it temporarily so we don't
         * immediately run in to the object we're trying to avoid.
         */
        if (oa_override == 0) {         /* first time in avoid maneuver */
                oa_override = 4;
        }

        sqsize = map_ptr->squaresize;
        Clear_Line(1);
        Clear_Line(2);
        sprintf(str, "Obstacle at (%d, %d), (%d' %d\", %d' %d\")",
                        robart.x, robart.y, (robart.x*sqsize)/12,
                        (robart.x*sqsize)%12, (robart.y*sqsize)/12,
                        (robart.y*sqsize)%12);
        PutString(1,1, str);

        /* Grow the map 3 times to allow a buffer zone around any objects */
        inc_map(map_ptr, 1);
        grow_oa_map(map_ptr);
        inc_map(map_ptr, 1);
        grow_oa_map(map_ptr);
        inc_map(map_ptr, 1);
        grow_oa_map(map_ptr);

        /* Set up a temporary map for the path planner */
        tmap.mem_ptr = NULL;
        if (Copy_Floor_Map(map_ptr, &tmap, -1) == ERROR) {      /* copy the cur
rent map */
                /*lint -e506 */
                inc_map(map_ptr, -3);
                return (!OK);
                /*lint +e506 */
        }

        /* Clear out the area occupied by the robot.  We make the incorrect
         * assumption that the robot occupies a square 12" on a side.  This
         * area surrounding (robart.x,robart.y) is cleared to 0
         */
```

```
        sq_per_6_inches = 6 / map_ptr->squaresize;
        xstart = robart.x - sq_per_6_inches;
        xlim = robart.x + sq_per_6_inches;
        ystart = robart.x - sq_per_6_inches;
        ylim = robart.x + sq_per_6_inches;
        for (x = xstart; x <= xlim; x++) {
            for (y = ystart; y <= ylim; y++) {
                bp = map_ptr->mem_ptr + x + y*map_ptr->width;
                if (*bp && *bp < 128)   /* clear only sonar returns */
                    *bp = 0;
            }
        }

        if (demo_mode)
            DrawSFloorMap(&tmap, WHITE, BLUE, GREEN);       /* draw it on s
creen */

        /* Prepare an inflection list for the avoidance path */
        avoid_list = (XY_PAIR *) malloc(200 * sizeof(XY_PAIR));
        if (avoid_list == NULL) {
            Clear_Line(1);
            PutString(1,1, "Can't allocate space for avoid_list -->");
            mgetkey();
            free(tmap.mem_ptr);
            inc_map(map_ptr, -3);
            /*lint -e506 */
            return (!OK);
            /*lint +e506 */
        }


        /* Plunk the starting and ending points into the map */
        floor(robart.x, robart.y, &tmap) = START;
        floor(destx, desty, &tmap) = DEST;
        if (demo_mode) {
            ScalePoint(map_ptr, robart.x, robart.y, BLUE);
            ScalePoint(map_ptr, destx, desty, BLUE);
        }

        Clear_Line(1);  PutString(1,1, "Finding avoidance path...");
        /* Find a path to the destination */
        if (use_global_planner)
            status = global_planner(&tmap, robart.x, robart.y, &destx, &des
ty, demo_mode);
        else
            status =   Expand_Slime(&tmap, robart.x, robart.y, &destx, &des
ty, demo_mode);

        if (status == 0) {      /* no path found? */
            Clear_Line(1);
            PutString(1,1, "avoid: Unable to find a path -->");
            mgetkey();
            free(tmap.mem_ptr);
            inc_map(map_ptr, -3);
            /*lint -e506 */
            return (!OK);
            /*lint +e506 */
        }

        /* Path found, retrace steps back to the beginning and trim off any
         * unecessary turns.
         */
        if ((robart.x == destx) && (robart.y == desty)) {
            free(tmap.mem_ptr);
            goto continue_path;
        }
        status = Find_Path(&tmap, avoid_list, &npoints, robart.x, robart.y, des
tx, desty);
        /*lint -e506 */
        if (status != OK) return (!OK);
        /*lint +e506 */
        if (demo_mode) {
            Clear_Line(1);
```

```
            PutString(1,1, "Reducing inflection points...");
        }
        npoints++;

        free(tmap.mem_ptr);
        tmap.mem_ptr = NULL;

        Cut_Path_Corners(map_ptr, avoid_list, &npoints);
        minimize_turns(map_ptr, avoid_list, &npoints);

        DrawSFloorMap(map_ptr, WHITE, BLUE, GREEN);

        Draw_Inflection_List_Path(map_ptr, avoid_list, npoints, IWHITE);


        if (avoid_wait) {
            Clear_Line(1);
            PutString(1,1, "Hit a key to execute the path -->");
            if (mgetkey() == ESC)
                /*lint -e506 */
                return (!OK);
                /*lint +e506 */
            Clear_Line(1);
        }

        /* Split path up into stripe and non-stripe segments */
        newpath = segment_path(map_ptr, avoid_list, npoints, &newnsegs);
        free(avoid_list);

        if (newpath == (PATHSEG *) NULL) {
            gstatus("Couldn't segment path -->"); mgetkey();
        }
        else {
            /* Execute the path around the obstacle */
            status = execute_path(map_ptr, newpath, newnsegs, &curseg);
            free(newpath);

            if (status != OK) {
                goto avoid_again;
#if 0
                if (avoid(map_ptr, use_global_planner, avoid_list, npoints, cur
seg) == !OK) {
                    return (!OK);
                }
#endif
            }
        }

        /* Now continue with the rest of the original path */
continue_path:
        oa_override = 0;                /* extend OA feelers again */
        if (nsegs > 1) {
            /* The path has already been truncated to the current segment.
             * Need to throw away the current segment and continue on with
             * the rest of the segments.
             */
            for (ii = 0, jj = 1; jj < nsegs; ii++, jj++) {
                path[ii] = path[jj];
            }
            nsegs--;

            status = execute_path(map_ptr, path, nsegs, &curseg);
            if (status != OK) {
                /*lint -e506 -e731 */
                if (avoid(map_ptr, use_global_planner, path, nsegs, curseg) ==
!OK) {
                    return (!OK);
                }
                /*lint +e506 +e731 */
            }
        }
        oa_override = 0;                /* turn off override */
        return (OK);
```

```
}
```

```
/****************************************************************************
 * Pathplan.c is a module that implements global path panning (as opposed to
 * obstacle avoidance path planning, although they share some procedures). It is
 * invoked from the main menu (see robart.c).
 ****************************************************************************/
#include <stdio.h>
#include <malloc.h>
#include <fcntl.h>
#include <stdlib.h>
#include <ega.h>
#include <event.h>
#include <menu.h>

#ifdef NARGS
#undef NARGS
#endif

#include <math.h>

#include "headers/ibmio.h"
#include "headers/serial.h"
#include "headers/k2a.h"

#ifndef PI
#define PI    3.14159265358979323846
#endif

int     demo_mode = YES;
int     fixed_sensor_halt = NO;
int     warp_speed = 10;
char    warp_mode;
int     docked = NO;

/* dummy comment */
int     force180(int);
int     force360(int);
GBUF    *readsq();

int inter_packet_pause = 250;

extern int       robot_type;
extern char      robot_name[80];
extern long      robotx, roboty, robothdg;
extern drType    robart;
extern SENSOR_TAB *curtab;
extern int       oa_override, avoid_wait;
extern int       robot_port;
extern int       debug_port;
extern int       defspeed;
extern int       deftspeed;
extern int       stripespeed;

/************************** Local Globals **********************************/

/* Inflection point list and number of inflection points on the list. */
int infl_count;
XY_PAIR Inflect_pts[200];

/* Static arrays of x,y directions used to look at eight closest neighbors.
 * The search will go in the order given below
 *
 *                      6 2 7
 *                      1 0 3
 *                      5 4 8
 *
 * where 0 is the cell being expanded.
 */

char    x_angle[8] = {-1, 0, 1, 0,  -1,-1, 1, 1};
char    y_an;le[8] = { 0, 1, 0,-1,  -1, 1, 1,-1};

/* Array of pointer directions. These are the values that are actually
 * stuffed into the floor map. They indicate (point to) the cell that
```

```
 * was responsible for expanding them. By following the arrows starting
 * at the destination, you eventually wind up back at the original
 * cell (marked by START). The index into the array is the same as the
 * one used for the x_angle and y_angle arrays above. When backtracking,
 * the next coordinate is arrived at by taking the direction stored in
 * the current cell, stuffing it into <dir>, and using the equations
 *
 *              nextx = curx + x_angle[dir & 0x07];
 *              nexty = cury + y_angle[dir & 0x07];
 *
 */
/*lint -e569 */
byte pointer_dir[8] =   {PRIGHT,   PDOWN,      PLEFT,     PUP,
                         PUPRIGHT, PDOWNRIGHT, PDOWNLEFT, PUPLEFT};
/*lint +e569 */


extern double xdeg3d, ydeg3d, zdeg3d, zp;

extern char inpacket_logging, outpacket_logging;


void PathPlan(map_ptr)
map  *map_ptr;
{
    char               str[80], prompt[80], fixed_name[80];
    static char        fixed_flag = NO;
    int                inc_val, quit;
    int                ii, new, event_occurred;
    long               selection;
    int                oldmapx, oldmapy;
    int                newx, newy;
    int                lx,ly, ux,uy;
    int                deltax, deltay;
    static float       batt_volt;
    static char        inlogname[80] = "", outlogname[80] = "";
    GBUF               *savebuf;
    SENSOR_TAB         *fixed_tab;
    MAPC_STRUCT        mapc;
    MENU               *pmenu;
    EVENT              evnt;
    extern int         oa_override;
    static MENU_ITEM quit_menu[] = {
        {"Load floor map", 0, 100, 0, NULL},
        {"Save floor map", 0, 101, 0, NULL},
        {"Redraw", 0, 102, 0, NULL},
        {"-", 0, 0, 0, NULL},
        {"Joystick mode", 0, 110, 0, NULL},
        {"Download path", 0, 120, 0, NULL},
        {"-", 0, 0, 0, NULL},
        {"Quit, Update map", 0, 199, 0, NULL},
        {"Quit", 0, 9999, 0, NULL},
        {NULL, 0, 0, 0, NULL}
    };
    static MENU_ITEM func_menu[] = {
        {"Set position and heading", 0, 200, 0, NULL},
        {"Make path", 0, 210, 0, NULL},
        {"Plan path", 0, 220, 0, NULL},
        {"Global planner", 0, 230, 0, NULL},
        {"Random Paths", 0, 235, 0, NULL},
        {"-", 0, 0, 0, NULL},
        {"Recharge", 0, 240, 0, NULL},
        {"Recalibrate", 0, 250, 0, NULL},
        {"Undock", 0, 260, 0, NULL},
        {"-", 0, 0, 0, NULL},
        {"3-D Plot", 0, 265, 0, NULL},
        {"Animate", 0, 266, 0, NULL},
        {"-", 0, 0, 0, NULL},
        {"Load old path", 0, 270, 0, NULL},
        {"Save path", 0, 280, 0, NULL},
        {"-", 0, 0, 0, NULL},
        {"Clear transients", 0, 290, 0, NULL},
        {NULL, 0, 0, 0, NULL}
```

```
    };
    static MENU_ITEM option_menu[] = {
        {"Grow floor map", 0, 300, 0, NULL},
        {"Increment floor map", 0, 310, 0, NULL},
        {"Threshold floor map", 0, 320, 0, NULL},
        {"Wait before avoidance", 0, 330, CHECK_DISPLAY, (MENU_ITEM *) &avoid_w
ait},
        {"Demo mode", 0, 340, CHECK_DISPLAY, (MENU_ITEM *) &demo_mode},
        {"Save screen", 0, 350, 0, NULL},
        {"-", 0, 0, 0, NULL},
        {"Input packet logging", 0, 360, CHECK_DISPLAY, (MENU_ITEM *) &inpacket
_logging},
        {"Output packet logging", 0, 370, CHECK_DISPLAY, (MENU_ITEM *) &outpack
et_logging},
        {"-", 0, 0, 0, NULL},
        {"Inter-packet delay", 0, 380, INT_DISPLAY, (MENU_ITEM *) &inter_packet
_pause},
        {"Fixed sensor display", 0, 390, CHECK_DISPLAY, (MENU_ITEM *) &fixed_fl
ag},
        {"Halt on fixed alarm", 0, 395, CHECK_DISPLAY, (MENU_ITEM *) &fixed_sen
sor_halt},
        {NULL, 0, 0, 0, NULL}
    };
    static MENU_ITEM var_menu[] = {
        {"Odometer", 0, 0, LONG_DISPLAY, (MENU_ITEM *) &robart.odometer},
        {"Battery voltage", 0, 0, FLOAT_DISPLAY, (MENU_ITEM *) &batt_volt},
        {"-", 0, 0, 0, NULL},
        {"Path speed", 0, 600, INT_DISPLAY, (MENU_ITEM *) &defspeed},
        {"Turn speed", 0, 601, INT_DISPLAY, (MENU_ITEM *) &deftspeed},
        {"Stripe speed", 0, 602, INT_DISPLAY, (MENU_ITEM *) &stripespeed},
        {"-", 0, 0, 0, NULL},
        {"Warp mode", 0, 605, CHECK_DISPLAY, (MENU_ITEM *) &warp_mode},
        {"Warp speed", 0, 610, INT_DISPLAY, (MENU_ITEM *) &warp_speed},
        {"-", 0, 0, 0, NULL},
        {"X rotation", 0, 620, DOUBLE_DISPLAY, (MENU_ITEM *) &xdeg3d},
        {"Y rotation", 0, 630, DOUBLE_DISPLAY, (MENU_ITEM *) &ydeg3d},
        {"Z rotation", 0, 640, DOUBLE_DISPLAY, (MENU_ITEM *) &zdeg3d},
        {"Perspective", 0, 650, DOUBLE_DISPLAY, (MENU_ITEM *) &zp},
        {"Reset odometer", 0, 400, 0, NULL},
        {NULL, 0, 0, 0, NULL}
    };
    static MENU_ITEM sys_menu[] = {
        {"Power Up", 0, 500, 0, NULL},
        {"Power Down", 0, 510, 0, NULL},
        {"-", 0, 0, 0, NULL},
        {"Camera ON", 0, 520, 0, NULL},
        {"Camera OFF", 0, 530, 0, NULL},
        {NULL, 0, 0, 0, NULL}
    };
    static MENU_ITEM zoom_menu[] = {
        {"Zoom In", 0, 9000, 0, NULL},
        {"Zoom out", 0, 9010, 0, NULL},
        {"Zoom all", 0, 9020, 0, NULL},
        {NULL, 0, 0, 0, NULL}
    };
    static MENU_ITEM pp_menu_bar[] = {
        {"File", 0, 0, 0, quit_menu},
        {"Functions", 0, 1, 0, func_menu},
        {"Options", 0, 2, 0, option_menu},
        {"Variables", 0, 3, 0, var_menu},
        {"System", 0, 4, 0, sys_menu},
        {"Zoom", 0, 5, 0, zoom_menu},
        {NULL, 0, 0, 0, NULL}
    };

    /* Update menu for K2A specific items */
    if (robot_type != K2A) {
        quit_menu[4].check_item = GRAYED;
        quit_menu[5].check_item = GRAYED;
    }
    else {
        quit_menu[4].check_item = 0;
        quit_menu[5].check_item = 0;
```

```
    }

    mouse_off();

    /* Get the latest position of the robot */
    get_new_position(map_ptr);
    if (map_ptr == NULL) {
        Load_Floor_Map(map_ptr, map_ptr->mapName);
    }
    make_name(fixed_name, map_ptr->mapName, ".fix");
    fixed_tab = curtab = load_fixed_sensors(fixed_name, map_ptr);

    Clear_Line(25);
    SetScale(map_ptr, 0,gdmaxcol, 15, gdmaxrow-15);

    /* Get a working copy of the floor map and draw it on the screen */
    DrawSFloorMap(map_ptr, WHITE, BLUE, GREEN);
    if (robart.x < map_ptr->lx || robart.x > map_ptr->ux ||
        robart.y < map_ptr->ly || robart.y > map_ptr->uy) {
        robart.x = (map_ptr->lx + map_ptr->ux) / 2;
        robart.y = (map_ptr->ly + map_ptr->uy) / 2;
        robotx = robart.x * map_ptr->squaresize * 10L;
        roboty = robart.y * map_ptr->squaresize * 10L;
    }
    savebuf = save_robart(map_ptr, robart.x, robart.y);
    draw_robart(map_ptr, robart.x, robart.y);
    if (fixed_flag)
        draw_all_fixed_sensors(map_ptr, fixed_tab);

    pmenu = RegisterMenu(pp_menu_bar);
    draw_menu(pmenu);
    dump_packets();
    batt_update();
    mouse_on();
    mapc_Init(&mapc, map_ptr, LGREEN, IWHITE);
    quit = NO;
    while (!quit) {
        /* Take care of updating the map cursor.  If the cursor is on the
         * map and the position has changed, then display the current
         * coordinates and the value of the square under the cursor.
         */
        oldmapx = mapc.mapx, oldmapy = mapc.mapy;
        mapc_update(&mapc);

        if (mapc.in_map && (oldmapx != mapc.mapx || oldmapy != mapc.mapy)) {
            text_foreground(IWHITE);
            text_background(BLACK);
            all_coords(str, mapc.mapx, mapc.mapy, map_ptr);
            PutString(25,1, str);
        }

        /* Handle the menu selections */
        selection = NO_SELECTION;
        event_occurred = NO;
        if (GetEvent(&evnt)) {
            batt_volt = robart.battery_voltage / 100.0;
            switch(evnt.type & 0xFF00) {
            case KEYBOARD :

                mouse_off();
                mapc_off(&mapc);
                restore_robart(savebuf);

                deltax = (map_ptr->ux - map_ptr->lx)/4;
                deltay = (map_ptr->uy - map_ptr->ly)/4;

                switch (evnt.data) {
                case 0x011b:
                case F10:
                        quit = YES;
                        break;
                case LEFTARROW:                 /* pan left */
                        pan_map(map_ptr, -deltax, 0, 0,15, gdmaxcol,gdmaxrow-15
```

```
);
                        break;
                case RIGHTARROW:                /* pan right */
                        pan_map(map_ptr,  deltax, 0, 0,15, gdmaxcol,gdmaxrow-15
);
                        break;
                case UPARROW:                   /* pan up */
                        pan_map(map_ptr, 0,  deltay, 0,15, gdmaxcol,gdmaxrow-15
);
                        break;
                case DOWNARROW:                 /* pan down */
                        pan_map(map_ptr, 0, -deltay, 0,15, gdmaxcol,gdmaxrow-15
);
                        break;
                case SLEFTARROW:                /* small pan left */
                        pan_map(map_ptr, -1, 0, 0,15, gdmaxcol,gdmaxrow-15);
                        break;
                case SRIGHTARROW:               /* small pan right */
                        pan_map(map_ptr,  1, 0, 0,15, gdmaxcol,gdmaxrow-15);
                        break;
                case SUPARROW:                  /* small pan up */
                        pan_map(map_ptr, 0,  1, 0,15, gdmaxcol,gdmaxrow-15);
                        break;
                case SDOWNARROW:                /* small pan down */
                        pan_map(map_ptr, 0, -1, 0,15, gdmaxcol,gdmaxrow-15);
                        break;
                default:
                        selection = pull_select_menu(pmenu, 0, 1);
                        event_occurred = YES;
                        gpmerge(MRPL);

                        if((new = CheckTrap()) != -1)
                                ii = new;
                }
                savebuf = save_robart(map_ptr, robart.x, robart.y);
                draw_robart(map_ptr, robart.x, robart.y);
                mapc_on(&mapc);
                mouse_on();

                break;

            case MOUSEBUTTONDOWN :
                ii = 0;
                if((new = CheckTrap()) != -1)
                        ii = new;
                if (ii && (ii & 0x00FF) != 0x00FE && (ii & 0x00F0) == 0x00F0) {
                        selection = pull_select_menu(pmenu, (ii & 0x000F), 1);
                        event_occurred = YES;

                        if((new = CheckTrap()) != -1)
                                ii = new;
                }
                break;
            }
        }
        if (event_occurred) {                   /* if something selected */
                close_menu(pmenu);              /* shutdown the pulldown */
                gpviewport(0,0, gdmaxcol, gdmaxrow);
        }
        if (selection == 100) {                 /* Load different floor map */
            mapc_off(&mapc);
            mouse_off();
            free_fixed_sensors(fixed_tab);
            curtab = NULL;
            restore_robart(savebuf);
            Load_Floor_Map(map_ptr, NULL);
            make_name(fixed_name, map_ptr->mapName, ".fix");
            fixed_tab = curtab = load_fixed_sensors(fixed_name, map_ptr);

            SetScale(map_ptr, 0,gdmaxcol, 15, gdmaxrow-15);
            /* Get a working copy of the floor map and draw it on the screen */
            DrawSFloorMap(map_ptr, WHITE, BLUE, GREEN);
            if (fixed_flag)
```

```
                draw_all_fixed_sensors(map_ptr, fixed_tab);

            savebuf = save_robart(map_ptr, robart.x, robart.y);

            draw_robart(map_ptr, robart.x, robart.y);

            mouse_on();
            mapc_on(&mapc);
        }
        else if (selection == 101) {            /* save current floor map */
            mapc_off(&mapc);
            mouse_off();
            Save_Floor_Map(map_ptr, NULL);
            mouse_on();
            mapc_on(&mapc);
        }
        else if (selection == 102) {            /* re-display floor map */
                mouse_off();
                mapc_off(&mapc);
                DrawSFloorMap(map_ptr, WHITE, BLUE, GREEN);
                if (fixed_flag)
                    draw_all_fixed_sensors(map_ptr, fixed_tab);
                draw_robart(map_ptr, robart.x, robart.y);
                mapc_on(&mapc);
                mouse_on();
        }
        else if (selection == 110) {            /* joystick mode on K2A */
                mapc_off(&mapc);
                restore_robart(savebuf);
                cyber_joystickmode(map_ptr);
                savebuf = save_robart(map_ptr, robart.x, robart.y);
                draw_robart(map_ptr, robart.x, robart.y);
                mapc_on(&mapc);
        }
        else if (selection == 120) {            /* download path to K2A */
                mapc_off(&mapc);
                restore_robart(savebuf);
                download_path(map_ptr);
                savebuf = save_robart(map_ptr, robart.x, robart.y);
                draw_robart(map_ptr, robart.x, robart.y);
                mapc_on(&mapc);
        }
        else if (selection == 9000) {           /* zoom in */
                mouse_off();
                mapc_off(&mapc);
                restore_robart(savebuf);
                zoomin(map_ptr, 0,15, gdmaxcol,gdmaxrow-15);
                savebuf = save_robart(map_ptr, robart.x, robart.y);
                draw_robart(map_ptr, robart.x, robart.y);
                mapc_on(&mapc);
                mouse_on();
        }
        else if (selection == 9010) {           /* zoom out */
                mouse_off();
                mapc_off(&mapc);
                restore_robart(savebuf);
                zoomout(map_ptr, 0,15, gdmaxcol,gdmaxrow-15);
                savebuf = save_robart(map_ptr, robart.x, robart.y);
                draw_robart(map_ptr, robart.x, robart.y);
                mapc_on(&mapc);
                mouse_on();
        }
        else if (selection == 9020) {           /* zoom all */
                mouse_off();
                mapc_off(&mapc);
                restore_robart(savebuf);
                zoomall(map_ptr, 0,15, gdmaxcol,gdmaxrow-15);
                savebuf = save_robart(map_ptr, robart.x, robart.y);
                draw_robart(map_ptr, robart.x, robart.y);
                mapc_on(&mapc);
                mouse_on();
        }
        else if (selection == 199) {            /* quit, save floor map */
```

```
                quit = YES;
                Save_Floor_Map(map_ptr, NULL);
        }
        else if (selection == 9999) {           /* Quit */
                quit = YES;
        }
        else if (selection == 200) {
                mouse_off();
                Clear_Line(1);
                PutString(1,1, "Move cursor to desired position, then hit mouse
 button (ESC to cancel)");
                mouse_on();
                if (map_get_point(&mapc, &newx, &newy, NO) == OK) {
                    mapc_off(&mapc);
                    robart.x = newx;
                    robart.y = newy;
                    /* If the robot is now at the CAL2 position, assume he
                     * is docked.  Otherwise, reset the docked flag
                     */
                    if (floor(newx, newy, map_ptr) == CAL2)
                        docked = YES;
                    else
                        docked = NO;
                    restore_robart(savebuf);
                    savebuf = save_robart(map_ptr, robart.x, robart.y);
                    draw_robart(map_ptr, robart.x, robart.y);
                    mouse_off();
                    robart.dir = force360(robart.dir);
                    sprintf(prompt, "Enter Robart's heading (%d) --> ", robart.
dir);
                    Clear_Line(25);
                    if (rawggets(str, prompt, "", 0, 0, WHITE, BLACK) != NULL)
 {
                        if (str[0])
                                robart.dir = force360(atoi(str));
                    }
                    robotx = robart.x * map_ptr->squaresize * 10L;
                    roboty = robart.y * map_ptr->squaresize * 10L;
                    robothdg = robart.dir * 100L;
                    send_robot_position(map_ptr, robart.x, robart.y, robart.dir
);
                    mouse_on();
                    mapc_on(&mapc);
                }
                else {
                        mouse_off();
                        restore_robart(savebuf);
                        savebuf = save_robart(map_ptr, robart.x, robart.y);
                        draw_robart(map_ptr, robart.x, robart.y);
                        mouse_on();
                }
                mouse_off();
                Clear_Line(1);
                mouse_on();
        }
        else if (selection == 210) {            /* Specify a path */
                mapc_off(&mapc);
                if (check_dock() != ERROR) {
                        restore_robart(savebuf);
                        savebuf = NULL;
                        Spec_Plan(map_ptr);
                }
                mapc_on(&mapc);
        }
        else if (selection == 220) {            /* Plan a path */
                mapc_off(&mapc);
                if (check_dock() != ERROR) {
                        restore_robart(savebuf);
                        savebuf = NULL;
                        Path_Planner(map_ptr);
                }
                mapc_on(&mapc);
        }
```

```
        else if (selection == 230) {            /* Plan a global path */
                mapc_off(&mapc);
                if (check_dock() != ERROR) {
                        restore_robart(savebuf);
                        savebuf = NULL;
                        Global_Path_Planner(map_ptr);
                }
                mapc_on(&mapc);
        }
        else if (selection == 235) {            /* random paths */
                mapc_off(&mapc);
                if (check_dock() != ERROR) {
                        restore_robart(savebuf);
                        savebuf = NULL;
                        Random_Planner(map_ptr);
                }
                mapc_on(&mapc);
        }
        else if (selection == 240) {            /* Recharge */
                mapc_off(&mapc);
                if (check_dock() != ERROR) {
                        restore_robart(savebuf);
                        savebuf = NULL;
                        plan_recharge(map_ptr);
                }
                mapc_on(&mapc);
        }
        else if (selection == 250) {            /* Recalibrate */
                mapc_off(&mapc);
                if (check_dock() != ERROR) {
                        restore_robart(savebuf);
                        savebuf = NULL;
                        plan_recal(map_ptr);
                }
                mapc_on(&mapc);
        }
        else if (selection == 260) {            /* undock from recalibration st
ation */
                mapc_off(&mapc);
                undock(map_ptr);
                mapc_on(&mapc);
                docked = 0;
        }
        else if (selection == 265) {            /* Make 3-D plot of map */
                mapc_off(&mapc);
                restore_robart(savebuf);
                init_plot3d(map_ptr);
                plot3d(map_ptr, 1, 0);
                savebuf = save_robart(map_ptr, robart.x, robart.y);
                draw_robart(map_ptr, robart.x, robart.y);
                mapc_on(&mapc);
        }
        else if (selection == 266) {            /* animate */
                mapc_off(&mapc);
                restore_robart(savebuf);
                animate(map_ptr);
                mouse_off();
                DrawSFloorMap(map_ptr, WHITE, BLUE, GREEN);
                if (fixed_flag)
                    draw_all_fixed_sensors(map_ptr, fixed_tab);
                savebuf = save_robart(map_ptr, robart.x, robart.y);
                draw_robart(map_ptr, robart.x, robart.y);
                mouse_on();
                mapc_on(&mapc);
        }
        else if (selection == 270) {            /* Load previous path */
                mapc_off(&mapc);
                load_path(map_ptr);
                mapc_on(&mapc);
        }
        else if (selection == 280) {            /* Save current path */
                save_path(map_ptr);
        }
```

```
        else if (selection == 290) {            /* Grow floor map */
                mouse_off();
                mapc_off(&mapc);
                inc_map(map_ptr, -127);         /* clear floor map */
                DrawSFloorMap(map_ptr, WHITE, BLUE, GREEN);
                if (fixed_flag)
                    draw_all_fixed_sensors(map_ptr, fixed_tab);
                draw_robart(map_ptr, robart.x, robart.y);
                mapc_on(&mapc);
                mouse_on();
        }
        else if (selection == 300) {            /* Grow floor map */
                mouse_off();
                mapc_off(&mapc);
                Grow_Floor_Map(map_ptr);
                DrawSFloorMap(map_ptr, WHITE, BLUE, GREEN);
                if (fixed_flag)
                    draw_all_fixed_sensors(map_ptr, fixed_tab);
                draw_robart(map_ptr, robart.x, robart.y);
                mapc_on(&mapc);
                mouse_on();
        }
        else if (selection == 310) {            /* Inc OA object values */
                mouse_off();
                mapc_off(&mapc);
                if (rawggets(str, "Amount to inc map by (may be negative) [1]:
", "", 0, 0, WHITE, BLACK) != NULL) {
                        inc_val = 1;
                        if (str[0] != EOS)
                                inc_val = atoi(str);
                        PutString(24,1, "Incrementing...");
                        inc_map(map_ptr, inc_val);
                        DrawSFloorMap(map_ptr, WHITE, BLUE, GREEN);
                        if (fixed_flag)
                                draw_all_fixed_sensors(map_ptr, fixed_tab);
                        draw_robart(map_ptr, robart.x, robart.y);
                }
                Clear_Line(1);
                mapc_on(&mapc);
                mouse_on();
        }
        else if (selection == 320) {            /* threshold floor map */
                mapc_off(&mapc);
                oa_threshold(map_ptr);
                mapc_on(&mapc);
        }
        else if (selection == 330) {            /* toggle avoid_wait var */
                avoid_wait ^= 1;
        }
        else if (selection == 340) {            /* toggle avoid_wait var */
                demo_mode ^= 1;
        }
        else if (selection == 350) {            /* save screen image */
                mouse_off();
                sprintf(prompt, "Name of file to save image to: ");
                if (ggets(str, prompt, "") != NULL) {
                        if (str[0] != EOS) {
                                Clear_Line(25);
                                SaveGIF(str);
                        }
                }
                Clear_Line(25);
                mouse_on();
        }
        else if (selection == 360) {            /* input packet logging */
                if (inpacket_logging) {
                        stop_inpacket_logging();
                }
                else {
                    mapc_off(&mapc);
                    mouse_on();
                    if (SelectFile("*.log", inlogname, " Start ") != 0) {
                        start_inpacket_logging(inlogname);
```

```
                    }
                }
        }
        else if (selection == 370) {            /* output packet logging */
                if (outpacket_logging) {
                        stop_outpacket_logging();
                }
                else {
                    mapc_off(&mapc);
                    mouse_on();
                    if (SelectFile("*.log", outlogname, " Start ") != 0) {
                        start_outpacket_logging(outlogname);
                    }
                }
        }

        else if (selection == 380) {            /* set inter-packet delay */
                mouse_off();
                sprintf(prompt, "Enter new inter-packet delay [%d]: ", inter_pa
cket_pause);
                if (ggets(str, prompt, "") != NULL) {
                        if (str[0] != EOS)
                                inter_packet_pause = atoi(str);
                }
                Clear_Line(25);
                mouse_on();
        }
        else if (selection == 390) {            /* toggle display of fixed sens
ors */
                fixed_flag ^= 1;
                if (fixed_flag) {
                    draw_all_fixed_sensors(map_ptr, fixed_tab);
                }
                else {
                    mouse_off();
                    gpcolor(BLACK);
                    gpclear(0,16, gdmaxcol, gdmaxrow);
                    DrawSFloorMap(map_ptr, WHITE, BLUE, GREEN);
                    draw_robart(map_ptr, robart.x, robart.y);
                    mouse_on();
                }
        }
        else if (selection == 395) {            /* halt on fixed sensor alarm *
/
                fixed_sensor_halt ^= 1;
        }
        else if (selection == 400) {
                robart.odometer = 0L;
        }

        else if (selection == 500) {            /* Power up command */
                x_command(X_SYSTEM, 1);
        }
        else if (selection == 510) {            /* Power down command */
                x_command(X_SYSTEM, 0);
        }
        else if (selection == 520) {            /* Camera on command */
                x_command(X_CAMERA, 1);
        }
        else if (selection == 530) {            /* Camera off command */
                x_command(X_CAMERA, 0);
        }
        else if (selection == 600) {            /* set path execution speed */
                mouse_off();
                sprintf(prompt, "Enter new path execution speed [%d]: ", defspe
ed);
                if (ggets(str, prompt, "") != NULL) {
                        if (str[0] != EOS)
                                defspeed = atoi(str);
                }
                Clear_Line(25);
                mouse_on();
        }
```

```
        else if (selection == 601) {            /* set path execution speed */
                mouse_off();
                sprintf(prompt, "Enter new turn execution speed [%d]: ", deftsp
eed);
                if (ggets(str, prompt, "") != NULL) {
                        if (str[0] != EOS)
                                deftspeed = atoi(str);
                }
                Clear_Line(25);
                mouse_on();
        }
        else if (selection == 602) {            /* set path execution speed */
                mouse_off();
                sprintf(prompt, "Enter new stripe execution speed [%d]: ", stri
pespeed);
                if (ggets(str, prompt, "") != NULL) {
                        if (str[0] != EOS)
                                stripespeed = atoi(str);
                }
                Clear_Line(25);
                mouse_on();
        }
        else if (selection == 605) {            /* toggle warp mode */
                warp_mode ^= 1;
        }
        else if (selection == 610) {            /* set warp speed */
                mouse_off();
                sprintf(prompt, "Enter new warp speed [%d]: ", warp_speed);
                if (ggets(str, prompt, "") != NULL) {
                        if (str[0] != EOS)
                                warp_speed = atoi(str);
                }
                Clear_Line(25);
                mouse_on();
        }
        else if (selection == 620) {            /* set X rotation for 3-D plot
*/
                mouse_off();
                sprintf(prompt, "Enter X rotation [%.2f]: ", xdeg3d);
                if (ggets(str, prompt, "") != NULL) {
                        if (str[0] != EOS)
                                xdeg3d = atof(str);
                }
                Clear_Line(25);
                mouse_on();
        }
        else if (selection == 630) {            /* set Y rotation for 3-D plot
*/
                mouse_off();
                sprintf(prompt, "Enter Y rotation [%.2f]: ", ydeg3d);
                if (ggets(str, prompt, "") != NULL) {
                        if (str[0] != EOS)
                                ydeg3d = atof(str);
                }
                Clear_Line(25);
                mouse_on();
        }

        else if (selection == 640) {            /* set Z rotation for 3-D plot
*/
                mouse_off();
                sprintf(prompt, "Enter Z rotation [%.2f]: ", zdeg3d);
                if (ggets(str, prompt, "") != NULL) {
                        if (str[0] != EOS)
                                zdeg3d = atof(str);
                }
                Clear_Line(25);
                mouse_on();
        }

        else if (selection == 650) {            /* set perspective 3-D plot */
                mouse_off();
                sprintf(prompt, "Enter distance from plot [%.2f]: ", zp);
```

```
                if (ggets(str, prompt, "") != NULL) {
                        if (str[0] != EOS)
                                zp = atof(str);
                }
                Clear_Line(25);
                mouse_on();
        }


        if (event_occurred) {           /* if an event occured, clean up screen
*/
                mapc_off(&mapc);
                mouse_off();
                gpviewport(0,0, gdmaxcol, gdmaxrow);

                restore_robart(savebuf);
                get_new_position(map_ptr);
                savebuf = save_robart(map_ptr, robart.x, robart.y);
                draw_robart(map_ptr, robart.x, robart.y);

                pmenu = RegisterMenu(pp_menu_bar);
                draw_menu(pmenu);
                batt_update();
                mouse_on();
                mapc_on(&mapc);
        }
    }
    restore_robart(savebuf);
    free_fixed_sensors(fixed_tab);
    curtab = NULL;
    mapc_deinit(&mapc);
    close_menu(pmenu);
    gpviewport(0,0, gdmaxcol, gdmaxrow);
}


/*************************************************************************/
/* Path_Planner is the main path planning routine. It gets a working copy of */
/* the floor map and draws it on the screen. It then allows the user to pick */
/* start and destination path points in the map. It will perform a neighbor  */
/* expansion in all directions from the start point out to the destination   */
/* point and then backtracks through the altered floor map to find a path.   */
/* It then attempts to shorten the number of inflection points which         */
/* describe a path. The user can then iterate on this process until          */
/* satisfied.                                                                 */
/*************************************************************************/
void Path_Planner(map_ptr)
map  *map_ptr;
{
    char        prompt[40], str[80];
    map         fp_ptr;
    int         xs, ys, xd, yd, bool;
    int         status;
    int         oldmapx, oldmapy;
    int         curseg;
    int         aborted, quit;
    int         end_hdg;
    int         npoints, nsegs;
    int         deltax, deltay, width, height;
    int         mx, my;
    unsigned int c;
    MAPC_STRUCT mapc;
    EVENT       evnt;
    GBUF        *savebuf;
    PATHSEG     *path;

    mouse_off();
    DrawSFloorMap(map_ptr, WHITE, BLUE, GREEN);

    /* Display Robart on the map */
    savebuf = save_robart(map_ptr, robart.x, robart.y);
    draw_robart(map_ptr, robart.x, robart.y);
```

```
        text_foreground(IWHITE);
        text_background(BLACK);
        PutString(1,1, "Growing floor map...");

        /* Grow the map 3 times to allow a buffer zone around any objects */
        inc_map(map_ptr, 1);
        grow_os_map(map_ptr);
        inc_map(map_ptr, 1);
        grow_os_map(map_ptr);
        inc_map(map_ptr, 1);
        grow_os_map(map_ptr);

        fp_ptr.mem_ptr = NULL;
        if (Copy_Floor_Map(map_ptr, &fp_ptr, -1) == ERROR) {
            inc_map(map_ptr, -3);
            restore_robart(savebuf);
            return;
        }

        Clear_Line(1);
        PutString(1,1, "Enter destination (ESC to abort)");
        mx = gdmaxcol/2;
        my = gdmaxrow/2;
        put_mouse(mx, my);
        mouse_on();
        mapc_Init(&mapc, map_ptr, LGREEN, LRED);
        inflect_pts[0].x = robart.x;
        inflect_pts[0].y = robart.y;
        start_banding(&mapc, robart.x, robart.y);

        quit = aborted = NO;
        while (!quit && !aborted) {
            mapc_update(&mapc);                      /* update cursor position */
            if (oldmapx != mapc.mapx || oldmapy != mapc.mapy) {
                all_coords(str, mapc.mapx, mapc.mapy, map_ptr);
                text_foreground(IWHITE);
                text_background(BLACK);
                mouse_off();
                PutString(25,1, str);
                mouse_on();
                oldmapx = mapc.mapx;
                oldmapy = mapc.mapy;
            }
            autopan(map_ptr, &mapc, &savebuf);

            while (GetEvent(&evnt)) {
                switch(evnt.type & 0xFF00) {
                case KEYBOARD :
                    if(evnt.data == 0x011B || evnt.data == F10) {
                            quit = aborted = YES;
                    }
                    break;

                case MOUSEBUTTONDOWN:
                    if (!mapc.in_map)
                        break;
                    inflect_pts[1].x = mapc.mapx;
                    inflect_pts[1].y = mapc.mapy;
                    quit = YES;
                    break;
                }
            }
        }
        stop_banding(&mapc);          /* turn off rubber band */
        mapc_deinit(&mapc);
        mouse_off();

        restore_robart(savebuf);
        draw_robart(map_ptr, robart.x, robart.y);

        Clear_Line(1);
        Clear_Line(25);
        if (aborted) {
```

```
            mouse_on();
            return;
        }
        robart.dir = force360(robart.dir);
        sprintf(prompt, "Desired final heading (-1 if don't care) [-1]: ");
        if (rawggets(str, prompt, "", 0, 0, WHITE, BLACK) == NULL) {
            mouse_on();
            return;
        }
        if (str[0])
            end_hdg = atoi(str);
        else
            end_hdg = -1;

        xs = inflect_pts[0].x;
        ys = inflect_pts[0].y;
        xd = inflect_pts[1].x;
        yd = inflect_pts[1].y;

        fp_ptr.lx = map_ptr->lx, fp_ptr.ux = map_ptr->ux;
        fp_ptr.ly = map_ptr->ly, fp_ptr.uy = map_ptr->uy;
        fp_ptr.scale = map_ptr->scale;

        /* Insert the Source and destination  points into the floor map */
        floor(xs, ys, &fp_ptr) = START;
        floor(xd, yd, &fp_ptr) = DEST;

        DrawSFloorMap(&fp_ptr, WHITE, BLUE, GREEN);

        /* Search for a path */
        Clear_Line(1);
        PutString(1,1,"Hit <CR> to find path, 'd' to draw. ");
        c = mgetkey();
        if ((c == 'd') || (c == 'D'))
            bool = Expand_Slime(&fp_ptr, xs, ys, &xd, &yd, TRUE);
        else
            bool = Expand_Slime(&fp_ptr, xs, ys, &xd, &yd, FALSE);

        /* If a path was found then draw the floor plan and path */
        if (bool) {
            status = Find_Path(&fp_ptr, inflect_pts, &infl_count, xs, ys, xd, yd);

            free(fp_ptr.mem_ptr);            /* get rid of map copy now */
            if (status != OK) {
                    inc_map(map_ptr, -3);
                    mouse_on();
                    return;
            }

            Clear_Line(1);  PutString(1,1, "Reducing inflection points...");
            npoints = infl_count+1;
            Cut_Path_Corners(map_ptr, inflect_pts, &npoints);
            minimize_turns(map_ptr, inflect_pts, &npoints);
            inc_map(map_ptr, -3);             /* get rid of temporary growth */

            if ((c == 'd') || (c == 'D'))
                DrawSFloorMap(map_ptr, WHITE, BLUE, GREEN);

            Draw_Inflection_List_Path(map_ptr, inflect_pts, npoints, LBLUE);
            Clear_Line(1);
            PutString(1,1,"Path found. Execute [Y]?");
            c = tolower(mgetkey());
            if (c == 'y' || c == 'Y' || c == '\r') {
                    os_override = 0;
                    path = segment_path(map_ptr, inflect_pts, npoints, &nsegs);
                    if (path == (PATHSEG *) NULL) {
                        gstatus("Couldn't segment path -->"); mgetkey();
                    }
                    else {
                        status = execute_path(map_ptr, path, nsegs, &curseg);
                        if (status == OBSTACLE) {
                            status = avoid(map_ptr, 0, path, nsegs, nsegs-1);
                        }
```

```
                        free(path);

                        /* If a desired ending heading was selected, turn to that
                         * heading now.
                         */
                        if (status == OK && end_hdg != -1) {
                            sprintf(str, "%d", end_hdg);
                            sturnto(str);
                        }
                    }
            }

            /* Decrease weight of all OA sonar returns by 1 to get rid of noise */
/*          inc_map(map_ptr, -1); */

        }

        /* Else no path was found */
        else {
            free(fp_ptr.mem_ptr);           /* get rid of map copy now */
            inc_map(map_ptr, -3);           /* get rid of temporary growth */
            Clear_Line(1);
            PutString(1,1,"No Path: Hit a key -->");
            c = putch(7);
            c = mgetkey();
        }
        mouse_on();
}


/****************************************************************************/
/* Global_Path_Planner is the main path planning routine. It gets a working  */
/*copy of */
/* the floor map and draws it on the screen. It then allows the user to pick */
/* start and destination path points in the map. It will perform a neighbor */
/* expansion in all directions from the start point out to the destination  */
/* point and then backtracks through the altered floor map to find a path.  */
/* It then attempts to shorten the number of inflection points which        */
/* describe a path. The user can then iterate on this process until         */
/* satisfied.                                                               */
/****************************************************************************/
void Global_Path_Planner(map_ptr)
map  *map_ptr;
{
     char         prompt[40], str[80];
     map          fp_ptr;
     int          xs, ys, xd, yd, bool;
     int          curseg;
     int          status;
     int          oldmapx, oldmapy;
     int          aborted, quit;
     int          end_hdg;
     int          npoints, nsegs;
     unsigned int c;
     MAPC_STRUCT mapc;
     EVENT        evnt;
     GBUF         *savebuf;
     PATHSEG      *path;

     mouse_off();
     Draw3FloorMap(map_ptr, WHITE, BLUE, GREEN);

     /* Display Robart on the map */
     savebuf = save_robart(map_ptr, robart.x, robart.y);
     draw_robart(map_ptr, robart.x, robart.y);

     text_foreground(IWHITE);
     text_background(BLACK);
     PutString(1,1, "Growing floor map...");

     /* Grow the map 3 times to allow a buffer zone around any objects */
     inc_map(map_ptr, 1);
     grow_oa_map(map_ptr);
```

```
     inc_map(map_ptr, 1);
     grow_oa_map(map_ptr);
     inc_map(map_ptr, 1);
     grow_oa_map(map_ptr);

     fp_ptr.mem_ptr = NULL;
     if (Copy_Floor_Map(map_ptr, &fp_ptr, -1) == ERROR) {
         inc_map(map_ptr, -3);
         restore_robart(savebuf);
         return;
     }

     Clear_Line(1);
     PutString(1,1, "Enter destination (ESC to abort)");
     mouse_on();
     mapc_Init(&mapc, map_ptr, LGREEN, LRED);
     inflect_pts[0].x = robart.x;
     inflect_pts[0].y = robart.y;
     start_banding(&mapc, robart.x, robart.y);

     quit = aborted = NO;
     while (!quit && !aborted) {
         oldmapx = mapc.mapx, oldmapy = mapc.mapy;
         mapc_update(&mapc);                        /* update cursor position */
         if (oldmapx != mapc.mapx || oldmapy != mapc.mapy) {
             all_coords(str, mapc.mapx, mapc.mapy, map_ptr);
             text_foreground(IWHITE);
             text_background(BLACK);
             mouse_off();
             PutString(25,1, str);
             mouse_on();
         }
         autopan(map_ptr, &mapc, &savebuf);
         while (GetEvent(&evnt)) {
             switch(evnt.type & 0xFF00) {
             case KEYBOARD :
                 if(evnt.data == 0x011B || evnt.data == F10) {
                         quit = aborted = YES;
                 }
                 break;

             case MOUSEBUTTONDOWN:
                 if (!mapc.in_map)
                     break;
                 inflect_pts[1].x = mapc.mapx;
                 inflect_pts[1].y = mapc.mapy;
                 quit = YES;
                 break;
             }
         }
     }
     stop_banding(&mapc);          /* turn off rubber band */
     mapc_deinit(&mapc);
     mouse_off();
     restore_robart(savebuf);

     Clear_Line(1);
     Clear_Line(25);
     if (aborted) {
         mouse_on();
         inc_map(map_ptr, -3);
         free(fp_ptr.mem_ptr);             /* get rid of map copy now */
         return;
     }

     sprintf(prompt, "Desired final heading (-1 if don't care) [-1]: ");
     if (rawggets(str, prompt, "", 0, 0, WHITE, BLACK) == NULL) {
         mouse_on();
         inc_map(map_ptr, -3);
         free(fp_ptr.mem_ptr);             /* get rid of map copy now */
         return;
     }
     if (str[0])
```

```
        end_hdg = atoi(str);
    else
        end_hdg = -1;

    xs = inflect_pts[0].x;
    ys = inflect_pts[0].y;
    xd = inflect_pts[1].x;
    yd = inflect_pts[1].y;

    fp_ptr.lx = map_ptr->lx, fp_ptr.ux = map_ptr->ux;
    fp_ptr.ly = map_ptr->ly, fp_ptr.uy = map_ptr->uy;
    fp_ptr.scale = map_ptr->scale;

    /* Insert the Source and destination  points into the floor map */
    floor(xs, ys, &fp_ptr) = START;
    floor(xd, yd, &fp_ptr) = DEST;

    DrawSFloorMap(&fp_ptr, WHITE, BLUE, GREEN);

    /* Search for a path */
    Clear_Line(1);
    PutString(1,1,"Hit <CR> to find path, 'd' to draw. ");
    c = mgetkey();
    if ((c == 'd') || (c == 'D'))
        bool = global_planner(&fp_ptr, xs, ys, &xd, &yd, TRUE);
    else
        bool = global_planner(&fp_ptr, xs, ys, &xd, &yd, FALSE);

    /* If a path was found then draw the floor plan and path */
    if (bool == TRUE) {
        status = Find_Path(&fp_ptr, inflect_pts, &infl_count, xs, ys, xd, yd);

        free(fp_ptr.mem_ptr);           /* get rid of map copy now */
        if (status != OK) {
            inc_map(map_ptr, -3);
            mouse_on();
            return;
        }

        Clear_Line(1);  PutString(1,1, "Reducing inflection points...");
        npoints = infl_count+1;

        Cut_Path_Corners(map_ptr, inflect_pts, &npoints);
#if 1
        minimize_turns(map_ptr, inflect_pts, &npoints);
#endif
        inc_map(map_ptr, -3);           /* get rid of temporary growth */

        if ((c == 'd') || (c == 'D'))
            DrawSFloorMap(map_ptr, WHITE, BLUE, GREEN);

        Draw_Inflection_List_Path(map_ptr, inflect_pts, npoints, LBLUE);
        Clear_Line(1);
        PutString(1,1,"Path found. Execute [Y]?");
        c = tolower(mgetkey());
        if (c == 'y' || c == 'Y' || c == '\r') {
                oa_override = 0;
                path = segment_path(map_ptr, inflect_pts, npoints, &nsegs);
                if (path == (PATHSEG *) NULL) {
                    gstatus("Couldn't segment path -->"); mgetkey();
                }
                else {
                    status = execute_path(map_ptr, path, nsegs, &curseg);
                    if (status == OBSTACLE) {
                        status = avoid(map_ptr, 1, path, nsegs, nsegs-1);
                    }
                    free(path);

                    /* If a desired ending heading was selected, turn to that
                     * heading now.
                     */
                    if (status == OK && end_hdg != -1) {
                        sprintf(str, "%d", end_hdg);
```

```
                            sturnto(str);
                        }
                    }
                }

                /* Decrease weight of all OA sonar returns by 1 to get rid of noise */
/*              inc_map(map_ptr, -1); */

        }

        /* Else no path was found */
        else {
            free(fp_ptr.mem_ptr);           /* get rid of map copy now */
            inc_map(map_ptr, -3);           /* get rid of temporary growth */
            Clear_Line(1);
            PutString(1,1,"No Path: Hit a key -->");
            c = putch(7);
            c = mgetkey();
        }
        mouse_on();
}



/*********************************************************************
 *                          Random Planner                           *
 *********************************************************************
 * Plan a path to a random virtual point using the Global Path Planner. *
 * Continues to plan random paths (even when the robot is unable to  *
 * complete a path) until the user hits the ESC key.                 *
 *                                                                   *
 *********************************************************************/
void Random_Planner(map_ptr)
map  *map_ptr;
{
    char        str[80];
    map         fp_ptr;
    int         curloc;
    int         xs, ys, xd, yd;
    int         curseg, ii, jj;
    int         status, bool;
    int         aborted;
    int         npoints, nsegs, npaths;
    int         lastpoint, newpoint;
    unsigned int c;
    PATHSEG     *path;
    VIRT_TYPE   *vp;
    XY_PAIR     *pntlist;

    if (map_ptr->nvpaths == 0) {
        errorbox("The current map does not contain any virtual paths.");
        return;
    }

    vp = (VIRT_TYPE *) malloc(sizeof(VIRT_TYPE) * map_ptr->nvpaths);
    if (pntlist == (VIRT_TYPE *) NULL) {
        errorbox("Can't allocate space for pntlist");
        return;
    }

    /* Initialize the random number generator */
    status = mstime() & 0xffff;
    mysrand(status);

    for (ii = 0; ii < map_ptr->nvpaths; ii++)
        vp[ii] = map_ptr->vpaths[ii];

    if ((npaths = shuffle(vp, map_ptr->nvpaths)) == ERROR) {
        free(vp);
        errorbox("Can't shuffle off to Buffalo.");
        return;
    }
```

Apr 04 1991 09:24:24 pathplan.c Page 19

```
        aborted = NO;
        curloc = 0;
        mouse_off();
        while (!aborted) {
            /* Pick a random destination that is different than the current
             * location.
             */
            for (curloc = 0; curloc < npaths && !aborted; curloc++) {
                    Clear_Line(1);
                    sprintf(str, "Destination: %s", vp[curloc].dest_name);
                    PutString(1,50, str);
                    PutString(25,1, str);
                    xs = robart.x, ys = robart.y;
                    xd = vp[curloc].destx;
                    yd = vp[curloc].desty;

                    DrawSFloorMap(map_ptr, WHITE, BLUE, GREEN);

                    text_foreground(IWHITE);
                    text_background(BLACK);
                    PutString(1,1, "Growing floor map...");
                    inc_map(map_ptr, 1);
                    grow_oa_map(map_ptr);
                    inc_map(map_ptr, 1);
                    grow_oa_map(map_ptr);
                    inc_map(map_ptr, 1);
                    grow_oa_map(map_ptr);

                    fp_ptr.mem_ptr = NULL;
                    if (Copy_Floor_Map(map_ptr, &fp_ptr, -1) == ERROR) {
                            inc_map(map_ptr, -3);
                            free(vp);
                            return;
                    }

                    fp_ptr.lx = map_ptr->lx, fp_ptr.ux = map_ptr->ux;
                    fp_ptr.ly = map_ptr->ly, fp_ptr.uy = map_ptr->uy;
                    fp_ptr.scale = map_ptr->scale;

                    /* Insert the Source and destination  points into the floor map
 */
                    floor(xs, ys, &fp_ptr) = START;
                    floor(xd, yd, &fp_ptr) = DEST;

                    DrawSFloorMap(&fp_ptr, WHITE, BLUE, GREEN);

                    PutString(25,1, str);
                    /* Search for a path */
                    bool = global_planner(&fp_ptr, xs, ys, &xd, &yd, TRUE);

                    /* If a path was found then draw the floor plan and path */
                    if (bool == TRUE) {
                            PutString(25,1, str);
                            status = Find_Path(&fp_ptr, inflect_pts, &infl_count, x
s, ys, xd, yd);

                            free(fp_ptr.mem_ptr);           /* get rid of map copy
 now */
                            if (status != OK) {
                                    inc_map(map_ptr, -3);
                                    mouse_on();
                                    free(vp);
                                    return;
                            }

                            Clear_Line(1);  PutString(1,1, "Reducing inflection poi
nts...");
                            npoints = infl_count+1;

                            Cut_Path_Corners(map_ptr, inflect_pts, &npoints);
#if 1
                            minimize_turns(map_ptr, inflect_pts, &npoints);
#endif
```

Apr 04 1991 09:24:24 pathplan.c Page 20

```
                            inc_map(map_ptr, -3);           /* get rid of temporary
 growth */

                            DrawSFloorMap(map_ptr, WHITE, BLUE, GREEN);

                            Draw_Inflection_List_Path(map_ptr, inflect_pts, npoints
, IWHITE);
                            oa_override = 0;
                            path = segment_path(map_ptr, inflect_pts, npoints, &nse
gs);
                            PutString(25,1, str);
                            if (path == (PATHSEG *) NULL) {
                                    gstatus("Couldn't segment path -->"); mgetkey()
;
                                    aborted = YES;
                            }
                            else {
                                    status = execute_path(map_ptr, path, nsegs, &cu
rseg);
                                    if (status == OBSTACLE) {
                                            status = avoid(map_ptr, 1, path, nsegs,
 nsegs-1);
                                    }
                                    else if (status == ABORT)
                                            aborted = YES;
                                    free(path);
                            }
                            /* Decrease weight of all OA sonar returns by 1 to get
rid of noise */
                            inc_map(map_ptr, -1);
                    }

                    /* Else no path was found */
                    else {
                        free(fp_ptr.mem_ptr);               /* get rid of map copy
 now */
                        inc_map(map_ptr, -3);               /* get rid of temporary
 growth */
                        c = putch(7);
                    }
                    if (keyhit()) {
                        if (getkey() == ESC)
                            aborted = YES;
                    }
            }
            if ((npaths = shuffle(vp, npaths)) == ERROR) {
                    free(vp);
                    mouse_on();
                    errorbox("Can't shuffle off to Buffalo.");
                    return;
            }

        }
        free(vp);
        mouse_on();
}


shuffle(vp, nvpaths)
VIRT_TYPE *vp;
int nvpaths;
{
        int             ii, jj, kk, dupe;
        int             npoints;
        VIRT_TYPE       *copy;

        copy = (VIRT_TYPE *) malloc(nvpaths * sizeof(VIRT_TYPE));
        if (copy == (VIRT_TYPE *) NULL)
                return (ERROR);

        /* Make a copy of all the virtual path points, eliminating duplicate
         * destinations as we go.
         */
```

Apr 04 1991 09:24:24 pathplan.c Page 21

```
        for (ii = jj = 0; ii < nvpaths; ii++) {
            dupe = NO;
            /* See if we've already copied the same destination */
            for (kk = 0; kk < jj; kk++) {
                if (copy[kk].destx == vp[ii].destx &&
                    copy[kk].desty == vp[ii].desty) {
                        dupe = YES;             /* got a duplicate */
                        break;
                }
            }
            if (!dupe) {                /* copy if not a duplicate */
                copy[jj++] = vp[ii];
            }
        }
        npoints = jj;

        /* Now do the shuffle.  Simply index backwards through the array, using
         * the index <ii> as the modulus factor on the random number generator.
         * After the new point has been copied from <copy> to <vp>,
         * we delete the point just copied from <copy> and continue;
         */
        for (ii = npoints; ii > 0; ii--) {
                kk = myrand() % ii;
                vp[ii-1] = copy[kk];
                if (kk != ii-1)         /* if not last element in array */
                        memcpy((char *) &copy[kk], (char *) &copy[kk+1], sizeof
(VIRT_TYPE) * (ii - kk - 1));
        }
        free(copy);
        return (npoints);
}



/****************************************************************************/
/* Spec_Plan - create a user-specified movement plan                        */
/****************************************************************************/
void Spec_Plan(map_ptr)
map   *map_ptr;
{
    char        prompt[40];
    int         curseg;
    int         status;
    int         nsegs;
    unsigned int c;
    PATHSEG     *path;

    infl_count = get_manual_path(map_ptr, inflect_pts, 200);
    if (infl_count < 2)         /* user abort or insufficient points? */
        return;
    infl_count--;               /* needs to be one less than npts in ary */
    mouse_off();

    Clear_Line(1);
    Clear_Line(25);

    Clear_Line(1);
    PutString(1,1,"Ready to execute [Y]? ");
    c = tolower(mgetkey());
    if (c == 'y' || c == 'Y' || c == '\r') {
        oa_override = 0;
        path = segment_path(map_ptr, inflect_pts, infl_count+1, &nsegs);
        if (path == (PATHSEG *) NULL) {
                gstatus("Couldn't segment path -->"); mgetkey();
        }
        else {
            status = execute_path(map_ptr, path, nsegs, &curseg);
            if (status == OBSTACLE) {
                avoid(map_ptr, 0, path, nsegs, curseg);
            }
            free(path);
        }
```

Apr 04 1991 09:24:24 pathplan.c Page 22

```

        /* Decrease all cell values by 2 to get rid of transient returns */
        /* inc_map(map_ptr, -1); */

        DrawSFloorMap(map_ptr, WHITE, BLUE, GREEN);
    }
    mouse_on();
}


/* load_path - load an existing path from a file and execute it */
load_path(map_ptr)
map *map_ptr;
{
    char        str[80];
    int         curseg;
    int         c, ii, xx, yy;
    int         prevx, prevy;
    int         status;
    int         nsegs;
    FILE        *fd;
    PATHSEG     *path;

    mouse_off();
    do {
        if (rawggets(str, "Name of path file -->", "", 0, 0, WHITE, BLACK) == N
ULL) {
                Clear_Line(1);
                mouse_on();
                return (ABORT);
        }
        Clear_Line(1);
        if (str[0] == EOS) {            /* blank line means quit */
            mouse_on();
            return (ABORT);
        }
    } while ((fd = fopen(str, "r")) == NULL);
    DrawSFloorMap(map_ptr, WHITE, BLUE, GREEN);
    for (ii = 0; fgets(str, 40, fd) != NULL; ii++) {
        sscanf(str, "%d %d", &xx, &yy);
        inflect_pts[ii].x = xx;
        inflect_pts[ii].y = yy;
        if (ii == 0) {
            prevx = xx, prevy = yy;
        }
        else {
            map_draw_line(prevx, prevy, xx, yy, IWHITE);
            prevx = xx, prevy = yy;
        }
    }
    fclose(fd);
    infl_count = ii-1;
    text_foreground(IWHITE);
    text_background(BLACK);
    Clear_Line(1);
    PutString(1,1,"Ready to execute [Y]? ");
    c = tolower(mgetkey());
    Clear_Line(1);
    if (c == 'y' || c == 'Y' || c == '\r') {
        robart.x = inflect_pts[ii-1].x;
        robart.y = inflect_pts[ii-1].y;
        robotx = robart.x * map_ptr->squaresize * 10L;
        roboty = robart.y * map_ptr->squaresize * 10L;
        robothdg = robart.dir * 100L;
        oa_override = 0;
        path = segment_path(map_ptr, inflect_pts, infl_count+1, &nsegs);
        if (path == (PATHSEG *) NULL) {
                gstatus("Couldn't segment path -->"); mgetkey();
        }
        else {
            status = execute_path(map_ptr, path, nsegs, &curseg);
            if (status == OBSTACLE) {
                avoid(map_ptr, 0, path, nsegs, curseg);
```

```
            }
            free(path);
        }
    }
    mouse_on();
    return (OK);
}


/****************************************************************************/
/* Print_Inflection_List outputs the current inflection point list to the   */
/* Com1 port.                                                                */
/****************************************************************************/
void Print_Inflection_List(inflection_list, ncoords)
XY_PAIR *inflection_list;
int ncoords;
{
    int i;

    debug_out("Inflection Point List, I.P. count = %d\r\n\n", ncoords);
    for(i = 0; i < ncoords; i++) {
        debug_out("x[%d] = %d, y[%d] = %d)\r\n", i, inflection_list[i].x+1,
        i, inflection_list[i].y+1);
    }
}


/****************************************************************************/
/* Reorder_Inflection_List takes two indicies into the inflection point list */
/* and copies the back of the list (all elements including and after ip2) on */
/* to some point earlier in the list (ip1).                                  */
/****************************************************************************/
void Reorder_Inflection_list(inflection_list, pnpoints, ip1, ip2)
XY_PAIR *inflection_list;
int *pnpoints;
int ip1, ip2;
{
    int i;

    /* Move the back of the list, pointed to by ip2, onto the middle of the
        list, pointed to by ip1.                                  */
    for (i = ip2; i < *pnpoints; i++) {
        inflection_list[i+ip1-ip2+1].x = inflection_list[i].x;
        inflection_list[i+ip1-ip2+1].y = inflection_list[i].y;
    }

    /* Update the new inflection point count. */
    *pnpoints += ip1 - ip2 + 1;
}


/****************************************************************************/
/* Draw_Inflection_List_Path draws each of the lines formed by successive    */
/* elements of the inflection point list.                                    */
/****************************************************************************/
void Draw_Inflection_List_Path(map_ptr, inflection_list, npoints, color)
map  *map_ptr;
XY_PAIR *inflection_list;
int npoints, color;
{
    int  round_value, scale, i, scrx, scry;

    scrx = map_ptr->xoff;
    scry = map_ptr->yoff;
    scale = map_ptr->scale;
    round_value = (scale+1)/2;
    gpmove(scrx + (inflection_list[0].x - map_ptr->lx) * scale + round_value,
           scry - (inflection_list[0].y - map_ptr->ly)* scale - round_value);
    gpcolor(color);
    for (i = 1; i < npoints; i++)  {
#if 0
        gpline(scrx + (inflection_list[i].x - map_ptr->lx) * scale + round_valu
e,
```

```
               scry - (inflection_list[i].y - map_ptr->ly) * scale - round_valu
e);
#else
        map_draw_line(inflection_list[i-1].x, inflection_list[i-1].y,
                      inflection_list[i].x,   inflection_list[i].y, color);
#endif

    }
}


/****************************************************************************/
/* Cut_Path_Corners attempts to reduce the number of inflection points in a */
/* given path. It does this by scaning the inflection list, checking for    */
/* non-neighbor inflection point paths that do not intercept any object or */
/* growth. If it finds one it reorders the inflection point list without the */
/* points it was able to cut out.                                            */
/****************************************************************************/
int  Cut_Path_Corners(map_ptr, inflection_list, pnpoints)
map  *map_ptr;
XY_PAIR *inflection_list;
int *pnpoints;
{
    int         newList,ip1,ip2,xs,ys,xe,ye,fl;
    int         end_of_line;
    LINE_TYPE   line;

    newList = FALSE;
    for (ip1 = 0; ip1 <= *pnpoints-3; ip1++) {
        for (ip2 = *pnpoints-1; ip2 >= ip1+2; ip2--) {
            xs = inflection_list[ip1].x;
            ys = inflection_list[ip1].y;
            xe = inflection_list[ip2].x;
            ye = inflection_list[ip2].y;
            if ((floor(xs, ys, map_ptr) == STRIPE) || (floor(xe, ye, map_ptr) =
= STRIPE))
                continue;

            init_line(&line, xs, ys, xe, ye);
            do {
                end_of_line = get_line_point(&line);
                if (end_of_line) {
                    newList = TRUE;
                    Reorder_Inflection_list(inflection_list, pnpoints, ip1, ip2
);
                    Cut_Path_Corners(map_ptr, inflection_list, pnpoints);
                    return (TRUE);
                }

                fl = floor(line.x, line.y, map_ptr);
            }
#if 0
            while (fl == CLEAR || fl == STRIPE);
#else
            while (fl == CLEAR || fl == FATMARKER || fl == THINMARKER || fl ==
VIRTUALPOINT);
#endif
        }
    }
    return (newList);
}


/****************************************************************************/
/* Expand_Slime will perform an exhaustive search from the starting location */
/* in all directions, marking the floor map with distance from the start and */
/* turning on pixels until it finds the destination location. This routine   */
/* can not expand beyound a distance of 250 (because of the byte size limit) */
/****************************************************************************/
int  Expand_Slime(map_ptr, xs, ys, pxd, pyd, draw)
map  *map_ptr;
int  xs, ys;
int  *pxd, *pyd;
```

```
int  draw;
{
    int list1_num, list2_num;
    byte read_list, store_list;
    byte point_list[2][600][3];
    char *pxa, *pya;
    byte *pfloor;
    byte *mem;
    int  width, height;
    int  expand_x, expand_y;
    int  i, j, xn, yn;

    /* Initialize variables */
    width = map_ptr->width;
    height = map_ptr->height;
    mem = map_ptr->mem_ptr;
    read_list = 0;
    store_list = list1_num = 1;
    point_list[read_list][0][0] = (byte) xs;
    point_list[read_list][0][1] = (byte) ys;

    Clear_Line(1);  PutString(1, 1, "Finding Path...");
    /* While there are still points to be expanded. */
    while (list1_num != 0) {

        /* Reset the store list count to zero */
        list2_num = 0;

        /* For every point in the read list do */
        for(i=0;i<list1_num;i++) {

            expand_x = point_list[read_list][i][0];
            expand_y = point_list[read_list][i][1];

            /*
             * Check value of floor map at current cell.  If it is zero, it
             * is OK to expand it.  Otherwise, decrement it and put it back
             * onto the store list.  This is what "eats through" obstacles.
             */
            pfloor = mem + expand_x + expand_y*width;   /* point to cell */

/* printf("%3d: expand(%3d,%3d)=%02x\n", i, expand_x, expand_y, *pfloor);*/

            if (*pfloor && *pfloor < 127) {
/*sprintf(str,"(%d,%d)=%u, list2num=%d\n",expand_x,expand_y,*pfloor & 0x3f,list
2_num); puts_sp(0,str);*/

                /*
                 * Clear the dirty bit, decrement the floor value, then
                 * set the dirty bit again if the floor value hasn't been
                 * decremented to zero.
                 */
                *pfloor &= ~DIRTY_MASK;
                (*pfloor)--;            /* dec the value */
                if (*pfloor)            /* not fully eroded yet? */
                        *pfloor |= DIRTY_MASK;
                else {
                        /*
                         * The cell has been fully eroded.  Stuff the
                         * expansion direction arrow into the map and
                         * update the screen.
                         */
                        *pfloor = point_list[read_list][i][2];
                        if (draw)
                            ScalePoint(map_ptr, expand_x, expand_y, MAGENTA);
                }
                /* Put back on expansion list */
                point_list[store_list][list2_num][0] = (byte) expand_x;
                point_list[store_list][list2_num][1] = (byte) expand_y;
                point_list[store_list][list2_num][2] = point_list[read_list][i]
[2];
                if (++list2_num >= 600) {
                        Clear_Line(1);
```

```
                        PutString(1,1, "Expansion list full. No path -->");
                        mgetkey();
                        return (FALSE);
                }
            }
            else {                  /* Expand the current point */

                pxa = &x_angle[0];
                pya = &y_angle[0];

                /* Look at the 8 neighboring points */
                for (j = 0; j < 8; j++) {

                    /* Get the neighbor point */
                    xn = expand_x + *pxa++;
                    yn = expand_y + *pya++;
                    if (xn < 0 || yn < 0 ||
                        xn >= width || yn >= height)
                            continue;

                    pfloor = mem + xn + width*yn;

                    /* If the neighbor is clear then ... */
                    if (*pfloor == CLEAR || *pfloor == STRIPE ||
                        *pfloor == VIRTUALPOINT ||
                        *pfloor == FATMARKER || *pfloor == THINMARKER) {

                        /* Put an arrow in the floor map that points to the par
ent */
                        *pfloor = pointer_dir[j];

                        /* Mark that pixel */
                        if (draw)
                            ScalePoint(map_ptr, xn, yn, MAGENTA);

                        /* Add the neighbor point to the store list, to be expa
nded
                         * later
                         */
                        point_list[store_list][list2_num][0] = (byte) xn;
                        point_list[store_list][list2_num][1] = (byte) yn;
                        list2_num++;
                    }

                    /* Else check to see if the neighbor is the destination */
                    else if (*pfloor == DEST) {
                        *pxd = xn;              /* record destination coord */
                        *pyd = yn;
                        *pfloor = pointer_dir[j];
                        Clear_Line(1); PutString(1,1, "Path Found.");
                        return(TRUE);
                    }

                    /*
                     * If it is a plotted obstacle and it hasn't already been
                     * added to the expansion list (the dirty bit not set yet)
                     * add it to the expansion list so we can begin eroding it.
                     * Also store the expansion direction arrow so that when
                     * the cell is fully eroded we can stuff the arrow into
                     * the map.
                     */
                    else if (*pfloor < DIRTY_MASK) {
/*sprintf(str,"adding(%d,%d)=%u, list2num=%d\n",xn,yn,*pfloor & 0x3f,list2_num)
; puts_sp(0,str);*/
                        /*
                         * Set the dirty bit so that we don't add this point
                         * to the expansion list again.
                         */
                        *pfloor |= DIRTY_MASK;
                        point_list[store_list][list2_num][0] = (byte) xn;
                        point_list[store_list][list2_num][1] = (byte) yn;
                        point_list[store_list][list2_num][2] = pointer_dir[j];
                        list2_num++;
```

```
                    }
                    if (list2_num >= 600) {
                        Clear_Line(1);
                        PutString(1,1, "Expansion list full. No path -->");
                        mgetkey();
                        return (FALSE);
                    }
                }
            }
        }
/* printf("--list2num=%3d--\n",list2_num); */

        /* Swap the read and store lists */
        read_list ^= 1;
        store_list ^= 1;
        list1_num = list2_num;
    }
    Clear_Line(1);
    return(FALSE);
}


/****************************************************************************/
/* Find_Path searches a slime expanded floor map for a path starting at the */
/* destination point and working backwards to the starting point. The slime */
/* expanded floor map is one with a distance count, between 1 and 250, for  */
/* each grid point between the start and destination points.                */
/****************************************************************************/
Find_Path(map_ptr, inflection_list, pnpoints, xs, ys, xd, yd)
map  *map_ptr;
XY_PAIR *inflection_list;
int *pnpoints;
int  xs, ys, xd, yd;
{
    char str[80];
    int         last_dir, next_dir, path_x, path_y, x, y;
    int         dir;
    int         npoints;
    int         ii, jj, swapval;

    /* Initialize variables */

    sprintf(str,"Find_Path: (%d,%d) (%d,%d)",xs,ys,xd,yd);
    Clear_Line(1);  PutString(1,1, str);
    last_dir = -1;
    npoints = 0;
    path_x = x = xd;
    path_y = y = yd;

    /* Until we have reached the start do */
    while ((dir = floor(path_x, path_y, map_ptr)) != START) {
        if (keyhit()) {
            if (mgetkey() == ESC)
                return (ABORT);
        }
        dir &= 0x07;                    /* convert to an index */
        next_dir = dir;                 /* remember new direction */
        x += x_angle[dir];              /* go to next neighbor */
        y += y_angle[dir];


        /* If there has been a change in the path direction then mark it with
         * an inflection point.
         */
        if (next_dir != last_dir) {
            inflection_list[npoints].x = path_x;
            inflection_list[npoints].y = path_y;
            npoints++;
            last_dir = next_dir;
        }

        /* The best neighbor becomes the next path location */
        path_x = x;
```

```
        path_y = y;
    }

    /* Place the starting position into the inflection list array */
    inflection_list[npoints].x = xs;
    inflection_list[npoints].y = ys;

    /* Print_Inflection_List(inflection_list, npoints+1); */
    *pnpoints = npoints;

    /* Have to reverse the order of the points because we have backtracked
     * to the start from the destination.
     */
    for (ii = 0, jj = npoints; ii < jj; ii++, jj--) {
        swapval = inflection_list[ii].x;
        inflection_list[ii].x = inflection_list[jj].x;
        inflection_list[jj].x = swapval;

        swapval = inflection_list[ii].y;
        inflection_list[ii].y = inflection_list[jj].y;
        inflection_list[jj].y = swapval;
    }
    return (OK);
}


/* save_path - save the current path to a file */
save_path(map_ptr)
map *map_ptr;
{
    char        str[80];
    int         ii;
    FILE        *fd;

    mouse_off();
    do {
        if (rawggets(str, "Filename to save path in -->", "", 0, 0, WHITE, BLAC
K) == NULL) {
                Clear_Line(1);
                mouse_on();
                return (ABORT);
        }
        Clear_Line(1);
        if (str[0] == EOS) {            /* blank line means quit */
            mouse_on();
            return (ABORT);
        }
    } while ((fd = fopen(str, "w")) == NULL);
    for (ii = 0; ii <= infl_count; ii++) {
        fprintf(fd, "%d %d\n", inflect_pts[ii].x, inflect_pts[ii].y);
    }
    fclose(fd);
    mouse_on();
    return (OK);
}


os_threshold(map_ptr)
map *map_ptr;
{
        char    str[80];
        byte    *bp;
        int     threshold;
        int     cc, goodkey, quit;
        int     width;
        int     curx, cury;
        unsigned int    nbytes, ii;

        mouse_off();
        text_background(BLACK);
        text_foreground(INWHITE);

        width = map_ptr->width;
```

```
        nbytes = map_ptr->width * map_ptr->height;

        threshold = 0;
        quit = NO;
        DrawSFloorMap(map_ptr, WHITE, BLUE, GREEN);
        Clear_Line(1);
        Clear_Line(24);
        Clear_Line(25);
        PutString(24,1, "Use arrow keys to adjust threshold value, F10 to quit"
);
        sprintf(str, "Threshold = %2d", threshold);
        PutString(25,1, str);
        while (quit == NO) {
                cc = mgetkey();
                goodkey = YES;
                switch (cc) {
                case UPARROW:
                        threshold++;            break;
                case SUPARROW:
                        threshold += 10;        break;
                case DOWNARROW:
                        threshold--;            break;
                case SDOWNARROW:
                        threshold -= 10;        break;
                case F10:                       /* done thresholding */
                        quit = YES;
                        goodkey = NO;
                        break;
                case ESC:                       /* bomb out */
                        Clear_Line(24);
                        Clear_Line(25);
                        mouse_on();
                        return (OK);
                default:
                        goodkey = NO;
                }

                if (threshold < 0)
                        threshold = 0;
                else if (threshold > 127)
                        threshold = 127;

                sprintf(str, "Threshold = %2d", threshold);
                PutString(25,1, str);

                if (!goodkey) continue;

                bp = map_ptr->mem_ptr;
                curx = cury = 0;
                for (ii = 0; ii < nbytes; ii++) {
                        if (*bp > 127) {
                                switch (*bp) {
                                case OBJECT:
                                case MOVEABLE:
                                case RECHARGER:
                                case STRIPE:
                                        ScalePoint(map_ptr, curx, cury, get_obj
_color(*bp));
                                        break;
                                case GROWTH:
                                case DOOR:
                                        ScalePoint(map_ptr, curx, cury, get_obj
_color(*bp));
                                        break;
                                }
                        }
                        else if (*bp - threshold > 127 || *bp - threshold == 0)
                                ScalePoint(map_ptr, curx, cury, BLACK);
                        else {
                                ScalePoint(map_ptr, curx, cury, get_obj_color(*
bp - threshold));
                        }
                        if (++curx >= width) {
```

```
                                cury++;
                                curx = 0;
                        }
                        bp++;
                }
        }
        bp = map_ptr->mem_ptr;
        for (ii = 0; ii < nbytes; ii++, bp++) {
                if (*bp <= 127) {
                        /*lint -e734 */
                        *bp -= threshold;
                        /*lint +e734 */
                        if (*bp > 127)
                                *bp = 0;
                }
        }
        Clear_Line(24);
        Clear_Line(25);
        mouse_on();
        return (OK);
}


download_path(map_ptr)
map *map_ptr;
{
    char                    filename[80], str[80];
    int                     fd;
    int                     ii;
    int                     px, py, pdir;
    int                     sqsize;
    int                     mode, nmode, status, nstatus;
    int                     newx, newy;
    unsigned int            newaz;
    int                     oldx, oldy;
    unsigned int            oldaz;
    GBUF                    *savebuf;
    static CYBER_PROG       path;
#pragma pack(1)
    struct path_file_format {
                int         op, s, x, y;
    } *pff, *savepff;

    mouse_off();
    Clear_Line(1);
    Clear_Line(25);
    while (keyhit()) mgetkey();

    mode = status = oldx = oldy = -1;  oldaz = 10000;

    if (ggets(filename, "Name of path file to download: ", "") == NULL) {
        mouse_on();
        return (OK);
    }
    gstatus("Opening %s...", filename);
    fd = open(filename, O_RDONLY | O_BINARY);
    if (fd == -1) {
        gstatus("Can't open %s -->", filename);
        mgetkey();
        Clear_Line(25);
        mouse_on();
        return (ERROR);
    }
    /* Zero out the program memory */
    memset((char *) path.program, 0, sizeof(path.program));

    pff = savepff = malloc(8 * 255);
    if (pff == NULL) {
        gstatus("Can't allocate space for program -->"); mgetkey();
        Clear_Line(25);
        mouse_on();
        return (ERROR);
    }
```

```
    /* Read the program in */
    gstatus("Reading %s...", filename);
    status = read(fd, (char *) pff, 8 * 255);
    if (status != (8 * 255)) {
        gstatus("Read error: status %d != %d -->", status, (8 * 255));
        mgetkey();
        mouse_on();
        free(pff);
        return (ERROR);
    }
    read(fd, (char *) &path.daccel, 2);
    read(fd, (char *) &path.saccel, 2);
    close(fd);

    /* The path file is not in quite the same format as the program that
     * has to be downloaded to the K2A.  On the K2A, the opcode and
     * S-parameter occupy 1 byte each.  In the path file, they both
     * occupy two bytes.  The following loop fixes this problem.
     */
    for (ii = 0; ii < 255; ii++) {
        path.program[ii].opcode = pff->op;
        path.program[ii].sparm = pff->s;
        path.program[ii].xparm = pff->x;
        path.program[ii].yparm = pff->y;
        pff++;
    }
    free(savepff);

    /* Find last instruction in buffer, should have a zero opcode */
    for (ii = 0; ii < 255 && path.program[ii].opcode != 0; ii++)
        ;
    path.ninstructions = ii;
gstatus("Sending program...");
    if (cyber_sendprog(&path) < 0) {
        gstatus("Unable to send program to robot -->"); mgetkey(); gstatus("");
        mouse_on();
        return (0);
    }

    gstatus("Hit any key to start program, ESC to abort -->");
    if (mgetkey() == ESC) {
        mouse_on();
        return (0);
    }
    Clear_Line(25);

    cyber_set(0x2400, 1, 2);      /* does same as following ifdef'ed code,
                                   * but cheats, knowing that setting the word
                                   * at 0x2400 to 2 will set the mode to 2
                                   * and reset status to 0
                                   */
    cyber_setmode(2);             /* start executing */
    cyber_setb(0x2401, 1, 0);

    while (keyhit()) mgetkey();

    savebuf = save_robart(map_ptr, robart.x, robart.y);
    draw_robart(map_ptr, robart.x, robart.y);
    px = robart.x, py = robart.y;
    sqsize = map_ptr->squaresize;

    while ((nmode = cyber_getmode()) != 0) {
        if (keyhit()) {
                cyber_halt();
                break;
        }
        nstatus = cyber_getstatus();
        cyber_getxy(&newx, &newy, &newaz);

        robotx = (newx * 12L + 5) / 10L;
        roboty = (newy * 12L + 5) / 10L;
        robothdg = (newaz * 1125L + 16L) / 32L;
```

```
        robart.x = (((newx * 12L + 50L)/100L) + sqsize/2) / sqsize;
        robart.y = (((newy * 12L + 50L)/100L) + sqsize/2) / sqsize;
        if (robart.x < 0) robart.x = robotx = 0;
        if (robart.y < 0) robart.y = roboty = 0;
        robart.dir = ((unsigned int) ((unsigned int) newaz * 45 + 64) / 128);

        /* If robot has changed X-Y position, then update position on screen */
        if (robart.x != px || robart.y != py || robart.dir != pdir) {
            restore_robart(savebuf);
            savebuf = save_robart(map_ptr, robart.x, robart.y);
            draw_robart(map_ptr, robart.x, robart.y);
            px = robart.x, py = robart.y;
            pdir = robart.dir;
        }

        if (mode != nmode) {
                mode = nmode;
                sprintf(str, "Mode: %3d", mode);
                PutString(1, 70, str);
        }
        if (status != nstatus) {
                status = nstatus;
                cyber_stat2str(str, status);
                PutString(25, 1, str);
        }

        if (oldx != newx || oldy != newy || oldaz != newaz) {
                oldx = newx, oldy = newy, oldaz = newaz;
                sprintf(str, "(%2d.%02d, %2d.%02d) Heading: %5.1lf",
                        newx/100, newx%100, newy/100, newy%100,
                        (double) newaz * (360.0/1024.0));
                PutString(25, 39, str);
        }
    }
    restore_robart(savebuf);
    gpmerge(MRPL);
    mouse_on();
}



/* send_robot_position - tell robot where he is and what his heading is */
send_robot_position(map_ptr, x, y, heading)
map *map_ptr;
int x, y, heading;
{
        char    str[80];

        if (robot_type != ROBARTII && robot_type != 0) {
            sprintf(str, "ON01%04x%04x%04x", x * map_ptr->squaresize * 10,
                y * map_ptr->squaresize * 10,
                heading * 100);
            put_packet(str);
        }
        return (0);
}


/* get_new_position - get robot position */
get_new_position(map_ptr)
map *map_ptr;
{
        int             status;
        unsigned int    x, y, hdg;
        long            start;
        packet          pack;

        if (robot_type == ROBARTII || robot_type == 0)
                return (OK);
        put_packet("OR6");              /* request dead reckoning info */
        start = mstime();               /* start timeout now */
        while (mstime() - start < 500L) {
                status = wait_packet(&pack, NO_WAIT);   /* packet available? */
```

```
                printf("EGA not found!\n");
                exit(1);
        }

        if(gdmemory < 128)
        {
                printf("This program requires a 128k+ EGA");
                exit(1);
        }

        if (vgamode)
                gpinit(11);
        else
                gpinit(5);

        /* Setup system colors for monochrome system */
        if(gdtype == 4) {
                gppal(BLACK, 0, 0, 0);
                gppal(BLUE, 0, 0, 0);
                gppal(RED, 0, 0, 0);
                gppal(GREEN, 0, 0, 0);
                gppal(CYAN, 0, 0x40, 0x40);
                gppal(MAGENTA, 0, 0, 0);
                gppal(WHITE, 0, 0, 0x40);
                gppal(GRAY, 0, 0, 0x40);
                gppal(LRED, 0, 0x40, 0x40);
                gppal(LGREEN, 0, 0x40, 0x40);
                gppal(LBLUE, 0, 0x40, 0x40);
                gppal(LCYAN, 0, 0, 0);
                gppal(YELLOW, 0, 0x40, 0x40);
                gppal(LMAGENTA, 0, 0x40, 0x40);
                gppal(IWHITE, 0, 0x40, 0x40);

                SetSysColor(MENU_BAR_BACK, BLACK, mpatt1);
                SetSysColor(MENU_BAR_FORE, BLACK, NULL);
                SetSysColor(MENU_BORDER, IWHITE, NULL);
                SetSysColor(SELECTED_BAR_BACK, IWHITE, mpatt2);
                SetSysColor(SELECTED_BAR_FORE, IWHITE, NULL);

                SetSysColor(MENU_ITEM_BACK, BLACK, mpatt1);
                SetSysColor(MENU_ITEM_FORE, BLACK, NULL);
                SetSysColor(SELECTED_ITEM_BACK, IWHITE, mpatt2);
                SetSysColor(SELECTED_ITEM_FORE, IWHITE, NULL);

                SetSysColor(DIALOG_BACK, WHITE, mpatt1);
                SetSysColor(DIALOG_FORE, IWHITE, NULL);
                SetSysColor(DIALOG_BORDER, IWHITE, NULL);
                SetSysColor(SELECTED_DIALOG, IWHITE, NULL);

                SetSysColor(ALERT_BACK, WHITE, NULL);
                SetSysColor(ALERT_FORE, BLACK, NULL);
                SetSysColor(ALERT_BORDER, IWHITE, NULL);
                SetSysColor(SELECTED_ALERT, BLACK, NULL);

                SetSysColor(SLIDER_BORDER, WHITE, NULL);
                SetSysColor(SLIDER_BACK, BLACK, mpatt3);
                SetSysColor(SLIDER_THUMB, IWHITE, mpatt2);
                SetSysColor(SLIDER_BOX, IWHITE, NULL);

                SetSysColor(FILE_SELECT_FORE, BLACK, NULL);
                SetSysColor(FILE_SELECT_BACK, IWHITE, NULL);

                SetSysColor(DRIVE_SELECT_FORE, WHITE, NULL);
                SetSysColor(DRIVE_SELECT_BACK, BLACK, NULL);

        }

        /* Setup colors for color system */
        else {
                SetSysColor(MENU_BAR_BACK, RED, NULL);
                SetSysColor(MENU_BAR_FORE, IWHITE, NULL);
                SetSysColor(MENU_BORDER, IWHITE, NULL);
                SetSysColor(SELECTED_BAR_BACK, MAGENTA, NULL);
```

```
                SetSysColor(SELECTED_BAR_FORE, YELLOW, NULL);

                SetSysColor(MENU_ITEM_BACK, RED, NULL);
                SetSysColor(MENU_ITEM_FORE, IWHITE, NULL);
                SetSysColor(SELECTED_ITEM_BACK, MAGENTA, NULL);
                SetSysColor(SELECTED_ITEM_FORE, YELLOW, NULL);

                SetSysColor(DIALOG_BACK, BLUE, NULL);
                SetSysColor(DIALOG_FORE, IWHITE, NULL);
                SetSysColor(DIALOG_BORDER, YELLOW, NULL);
                SetSysColor(SELECTED_DIALOG, RED, NULL);

                SetSysColor(ALERT_BACK, RED, NULL);
                SetSysColor(ALERT_FORE, IWHITE, NULL);
                SetSysColor(ALERT_BORDER, IWHITE, NULL);
                SetSysColor(SELECTED_ALERT, IWHITE, NULL);

                SetSysColor(SLIDER_BORDER, WHITE, NULL);
                SetSysColor(SLIDER_BACK, BLACK, patt5);
                SetSysColor(SLIDER_THUMB, IWHITE, patt6);
                SetSysColor(SLIDER_BOX, RED, NULL);

                SetSysColor(FILE_SELECT_FORE, IWHITE, patt9);
                SetSysColor(FILE_SELECT_BACK, RED, patt2);

                SetSysColor(DRIVE_SELECT_FORE, GRAY, NULL);
                SetSysColor(DRIVE_SELECT_BACK, BLACK, patt8);
        }

        gpmerge(MRPL);
        gpcolor(WHITE);

        InitCritical();         /* make sure critical error handler active */
        return (OK);
}


/*********************************************************************
 *                      unimplemented_box                            *
 *********************************************************************
 * Put up a dialog box for unimplemented commands.                   *
 *                                                                   *
 *********************************************************************/
unimplemented_box()
{
        DIALOG  *dbox;
        /*lint -e708 -e570 */
        static DIALOG_ITEM not_imp[] = {
                {0, 15, 216, STRING, DIALOG_FORE, TRANSPARENT, "Command not ye
t implemented"},
                {74, 50,  67, OK_BUTTON, DIALOG_FORE, TRANSPARENT, 0},
                {-1, -1, -1, TEXT, DIALOG_FORE, TRANSPARENT, NULL}
        };
        /*lint +e708 +e570 */

        if((dbox = OpenDialog(not_imp, 50, 30, NORMAL)) != NULL) {
                (void) EditDialog(dbox);
                CloseDialog(dbox);
        }
        return (OK);
}


/*********************************************************************
 *                           terminal                                *
 *********************************************************************
 * Enter terminal mode for robart.  Normally, any characters typed   *
 * by the user are immediately sent to Robart.  Similarly, any char- *
 * acters received from Robart are display immediately.  However, when *
 * packet mode is enabled the user is prompted to enter a whole line *
 * of characters.  This will then be stuffed into a packet and sent  *
 * to the robot as a packet.                                         *
 *                                                                   *
```

```
 * Author:      Gary Gilbreath  27 Oct 87                                  *
 ***************************************************************************/
void terminal()
{
    char                    str[132];
    char                    baud_fact;
    int                     saverow, savecol;
    int                     cc, status;
    int                     logging;
    unsigned int            newrate;
    FILE                    *logfd;
    packet                  pack;
    static char stat_line[85] = "Help: Alt-H                    Duplex: FULL
AutoLF: OFF        Baudrate:  9600";
    extern struct sgtty robot_parms;
    extern int              robot_port;
    static unsigned int brate = 9600;
    static enum             {FULL, HALF} duplex = FULL;
    static int              autolf = NO;

    logging = 0;
    inittty(0, 0, 23, 79);
    crt_puts(BLACK, WHITE, 24, 0, stat_line);
    crt_movecur(0, 0);
    sp_ioctl(robot_port, TIOCSETP, &robot_parms);
    for (;;) {
        while ((cc = getc_sp(0)) != -1)
            ttyout(cc);
        if (robot_type == K2A) {
                Receive_Link(&pack, NO_WAIT, &status);
                if (status == OK) {
                        ttyout('!');
                        ttystr(pack.data);
                        ttystr("\r\n");
                }
        }
        if (keyhit()) {     /* character been hit? */
            cc = mgetkey();
            if (cc == F10)
                break;
            else if (cc == ALTP) {      /* Packet mode? */
                crt_readcur(&saverow, &savecol);
                crt_clearline(24, BLACK, WHITE);
                crt_puts(BLACK, WHITE, 24, 0, "!");
                if (mygets(str) == NULL) {
                    crt_clearline(24, BLACK, WHITE);
                    crt_puts(BLACK, WHITE, 24, 0, stat_line);
                    continue;
                }
                strcpy((char *) &pack.data[0], str);
                if (pack.data[0]) {
                    Send_Link(&pack, strlen((char *) pack.data), &status);
                }
                crt_clearline(24, BLACK, WHITE);
                crt_puts(BLACK, WHITE, 24, 0, stat_line);
                crt_movecur(saverow, savecol);
            }
            else if (cc == 0x2f00) {    /* Voice mode? */
                crt_readcur(&saverow, &savecol);
                crt_clearline(24, BLACK, WHITE);
                crt_puts(BLACK, WHITE, 24, 0, "Speak:");
                if (mygets(str) == NULL) {
                    crt_clearline(24, BLACK, WHITE);
                    crt_puts(BLACK, WHITE, 24, 0, stat_line);
                    continue;
                }
                say(str);

                crt_clearline(24, BLACK, WHITE);
                crt_puts(BLACK, WHITE, 24, 0, stat_line);
                crt_movecur(saverow, savecol);
            }
            else if (cc == ALTB) {
```

```
                crt_readcur(&saverow, &savecol);
                crt_clearline(24, BLACK, WHITE);
                crt_puts(BLACK, WHITE, 24, 0, "Enter new baud rate -->");
                mygets(str);
                if (str[0] != EOS) {
                        newrate = atoi(str);
                        switch (newrate) {
                        case 300:       baud_fact = B300; break;
                        case 1200:      baud_fact = B1200; break;
                        case 2400:      baud_fact = B2400; break;
                        case 4800:      baud_fact = B4800; break;
                        case 9600:      baud_fact = B9600; break;
                        case 19200:     baud_fact = B19200; break;
                        case 38400:     baud_fact = B38400; break;
                        default:
                                crt_movecur(saverow, savecol);
                                continue;
                        }
                        brate = newrate;
                        robot_parms.sg_speed = baud_fact;
                        sp_ioctl(robot_port, TIOCSETP, &robot_parms);
                        sprintf(&stat_line[75], "%5u", brate);
                        crt_clearline(24, BLACK, WHITE);
                        crt_puts(BLACK, WHITE, 24, 0, stat_line);
                        crt_movecur(saverow, savecol);
                }
            }
            else if (cc == ALTC) {
                ttyclear();
            }
            else if (cc == AF3) {       /* auto LF on CR */
                crt_readcur(&saverow, &savecol);
                autolf ^= 1;
                if (autolf)
                        strcpy(&stat_line[54], " ON");
                else
                        strcpy(&stat_line[54], "OFF");
                stat_line[57] = ' ';
                crt_puts(BLACK, WHITE, 24, 0, stat_line);
                crt_movecur(saverow, savecol);
            }
            else if (cc == ALTD) {      /* toggle duplex */
                crt_readcur(&saverow, &savecol);
                duplex = (duplex == HALF ? FULL : HALF);
                if (duplex == HALF)
                        strcpy(&stat_line[33], "HALF");
                else
                        strcpy(&stat_line[33], "FULL");
                stat_line[37] = ' ';
                crt_puts(BLACK, WHITE, 24, 0, stat_line);
                crt_movecur(saverow, savecol);
            }
            else if (cc == AF1 || cc == PGDN) {        /* toggle logging */
                if (logging) {                  /* already logging? */
                        fclose(logfd);
                        logging = NO;
                }
                else {                          /* start logging */
                    crt_readcur(&saverow, &savecol);
                    crt_clearline(24, BLACK, WHITE);
                    crt_puts(BLACK, WHITE, 24, 0, "Enter name of log file -->")
;
                    mygets(str);
                    if (str[0] != EOS) {
                        logfd = fopen(str, "wb");
                        if (logfd == NULL) {
                                crt_puts(BLACK, WHITE, 24, 0, "Couldn't open lo
g file -->");
                                mgetkey();
                        }
                        else {
                                logging = YES;
                        }
```

Apr 04 1991 09:42:25 robert.c Page 11

```
                        }
                        crt_puts(BLACK, WHITE, 24, 0, stat_line);
                        crt_movecur(saverow, savecol);
                    }
                }
                else if (cc == ALTH) {              /* help */
                    crt_clearline(24, BLACK, WHITE);
                    crt_puts(BLACK, WHITE, 24, 0, stat_line);
                    ttystr("\r\n\nTerminal help\r\n");
                    ttystr("F10         Exit terminal mode\r\n");
                    ttystr("Alt-B       Set baud rate\r\n");
                    ttystr("Alt-C       Clear screen\r\n");
                    ttystr("Alt-D       Full/half duplex toggle\r\n");
                    ttystr("Alt-H       Help screen\r\n");
                    ttystr("Alt-P       Packet mode\r\n");
                    ttystr("Alt-V       Voice mode\r\n");
                    ttystr("Alt-F1      Open/close log file\r\n");
                    ttystr("Alt-F3      Auto linefeed toggle\r\n");
                }
                else {      /* normal character, send to serial port */
                    putc_sp(0, cc&0xff);
                    if (logging)
                            putc(cc & 0xff, logfd);
                    if (duplex == HALF) {
                            ttyout(cc);
                            if (cc == '\r' && autolf)
                                    ttyout('\n');
                    }
                }
            }
        }
        deinittty();
        if (logging)
            fclose(logfd);
}


say(str)
char *str;
{
        char    spstr[300];
        int     status;
        packet  pack;

        strcpy((char *) pack.data, "0v");
        compile_speech(spstr, str);
        strcpy((char *) &pack.data[2], spstr);
        Send_Link(&pack, strlen((char *) pack.data), &status);
        return (OK);
}


/* crt_clearline - clear a display line to the given foreground and
 *      background colors
 *
 * Call with:   line = row to be cleared (0 - 24)
 *              fore = foreground color to use
 *              back = background color to use
 */
crt_clearline(line, fore, back)
int line, fore, back;
{
        int row, col;

        crt_readcur(&row, &col);                /* save cursor position */
        crt_putc(fore, back, line, 0, ' ', 80); /* clear the line */
        crt_movecur(row, col);          /* restore cursor line */
        return (OK);
}
```

Apr 04 1991 09:15:34 assess.c Page 1

```
/**********************************************************************\
*                              ASSESS.C                                *
************************************************************************
*                                                                      *
* Description:  This is the main program for the intrusion detection system *
*               threat assessment software.  This program performs the *
*               following functions:                                   *
*                                                                      *
*                       1.  updates all sensor information that has changed *
*                           since the last time it was called.        *
*                           (note: this may eventually be done by the higher-*
*                           level function prior to calling the main   *
*                           function.)                                 *
*                                                                      *
*                       2.  Adjusts the weights from their initial values *
*                           when some sort of purposeful motion is detected. *
*                                                                      *
*                       3.  Calculates the composite threat based on the sum *
*                           of the weights of the sensors that are active. *
*                                                                      *
* Files Included:                                                      *
*               headers\sysdefs.h:  Define system variables and constants. *
*               headers\timestmp.h: Timer functions.                   *
*               headers\assess.h:   External variables and constants.  *
*               headers\support.h:  Functions used in assess.c but not needed*
*                                   by calling program.                *
*               headers\bb_edit.h:  Blackboard editing functions.      *
*                                                                      *
* Notes:        1) When the program is changed to be called from a higher- *
*                  level program, the initialization of the blackboard *
*                  (ids_init_bb()) must be moved to the calling program. *
*                                                                      *
* Edit History: 02/26/91 - Written by Richard P. Smurlo.               *
*                                                                      *
\**********************************************************************/

#include <stdio.h>
#include "headers\sysdefs.h"
#ifdef SIO
#include <serial.h>
#endif
#include "headers\timestmp.h"
#include "headers\assess.h"
#include "headers\support.h"
#include "headers\bb_edit.h"
#ifdef SIO
#include "mra.h"
#include <lcc.h>
#endif

#define                 BELL    '\007'

static boolean          noise = TRUE;

/* Global communication parameter variables.                           */
/* Default values are from LCC.H - COM1:9600,n,8,1.                    */
#ifdef SIO
/* need this for ir module and lawn. */
struct sgtty serial_parms      = {B19200, CS8 | STOP1 | NOP | NOFLOW };
#endif

/* For lack of a better term, the statics defined below are what make  */
/* up the "blackboard".  The blackboard is simply the current state of */
/* all of the sensors located on the robot, and a linked list of       */
/* past sensor values (the amount of history information saved is one */
/* of the parameters passed to the functions that update the blackboard.*/
/* These functions are included in the bb_edit file.                   */

static  int     composite;
static  int     threshold = 85;
static  int     status;

int     zw[NUM_ZONES];
```

Apr 04 1991 09:15:34 assess.c Page 2

```

    struct gr_info  snr_gi;
    struct ra_info  snr_sensor[NUM_SNRS];

    struct gr_info  pir_gi;
    struct a_info   pir_sensor[NUM_PIRS];

    struct gr_info  acu_gi;
    struct a_info   acu_sensor[NUM_ACUS];

    struct gr_info  mwv_gi;
    struct a_info   mwv_sensor[NUM_MWVS];

    struct gr_info  vid_gi;
    struct a_info   vid_sensor[NUM_VIDS];

    struct initweights_type init_weights =
    {
      {SNW, SNW, SNW, SNW, SNW, SNW, SNW, SNW, SNW, SNW, SNW, SNW,
       SNW, SNW, SNW, SNW, SNW, SNW, SNW, SNW, SNW, SNW, SNW, SNW},

      {PIW, PIW, PIW, PIW, PIW, PIW, PIW, PIW, PIW, PIW, PIW, PIW,
       PIW, PIW, PIW, PIW, PIW, PIW, PIW, PIW, PIW, PIW, PIW, PIW,
       PIW, PIW, PIW, PIW, PIW, PIW, PIW, PIW, PIW, PIW, PIW, PIW,
       PIW, PIW, PIW, PIW, PIW, PIW, PIW, PIW, PIW, PIW, PIW, PIW},

      {ACW, ACW, ACW},

      {MWW, MWW, MWW, MWW},

      {VIW}
    };

#ifdef GAG
int ids_assess_threat(curr_time)
t_type  curr_time;
#else
main()
#endif
{
/*   #include "tstpmiri.c" */

#ifndef GAG
ids_init_bb();            /* Initializes all blackboard info (including   */
                          /* history info.)  Move to higher-level calling */
                          /* program eventually.                          */
while(1) {
#endif
    reset_bb_weights();   /* Resets individual weights to vals found in   */
                          /* init_weights.                                */
    reset_group_vals();   /* Resets gr_weights to 0.  Sets num_active to the */
                          /* total number of sensors active in each group. */
                          /* returns current time in tenths of seconds.   */

    /* include test code chunks here to update sensor values.            */
/*   #include "tstpmir.c" */

    /* delete all old information from bearing and info history lists.   */

    ids_del_hist_info(DECR_TIME(curr_time,MINS(5L)));

    /* Adjust the weights of the sensors based on purposeful motion,     */
    /* angular motion, misc. noise (thunder), etc.                       */

    #if 0
    adjw_random_noise();
    #endif

    adjw_purposeful_motion(curr_time, noise);
    calc_group_zone_weights();
/*    print_zone_weights(); */
    adjw_angular_sens_fusion();
/*    print_zone_weights(); */
```

```
#ifdef GAG
   return(calc_threat());
#else
   composite = calc_threat();
/*   printf("tot:  ");
   print_zones(zw); */
   printf("maxweight = %04d", composite);
#endif

   #ifdef SIO
   if (lci_error == AOK)
      printf(",   c1,c2,time= %02x %02x %07lu\n", c1, c2, curr_time);
   else
      printf(", lci_error = %d\r", lci_error);
   #else
      printf("\n");
   #endif

#ifndef GAG
   if (kbhit()) {
      if ((c = getch()) == ' ')
         noise = !noise;
      else
         if (c == 0x1b) {
            printf("Breaking out of main\n");
            goto out;
            }
      }
   } /* end while */
#endif

out:
   #ifdef SIO
   lcd_disable();
   #endif
   exit(0);
} /* end main */
```

```

/***********************************************************************\
*                              ids_init_bb                               *
*************************************************************************
*
* Function:     This function initializes the blackboard items.  Currently  *
*               it is called by the ids main() function, but later it will be*
*               called by a higher level program which will then call the    *
*               ids main program as needed.                                 *
*                                                                           *
* Input:        ids_init_bb();                                              *
*                                                                           *
* Output:       Nothing.                                                    *
*                                                                           *
* Globals:      None.                                                       *
*                                                                           *
* Edit History: 02/21/91 - Written by Richard P. Smurlo.                    *
*                                                                           *
\***********************************************************************/

void ids_init_bb()
{
   composite = 0;
   status    = AOK;

   init_anr_info();
   init_pir_info();
   init_acu_info();
   init_mwv_info();
   init_vid_info();
}
```

```
/**********************************************************************\
*                          ids_update_*                                *
************************************************************************
*                                                                      *
* Function:      updates the appropriately typed information by first copying *
*                the current information into the history list (if not already*
*                there), then putting the new information into the current    *
*                information fields.                                          *
*                                                                      *
* Input:         ids_update_*(                                         *
*                  ??_infoptr  L;       pointer to list to insert info.       *
*                  t_type      ntime;   new time to insert into list.         *
*                  weight_type nweight; new weight to insert into list.       *
*                  range_type  nrange;  new range to insert into list.        *
*                  active_type nactive; new activity to insert into list.     *
*                  bear_type   nbearing; new bearing to insert into list.     *
*                );                                                    *
*                                                                      *
* Output:        Updates blackboard.                                   *
*                                                                      *
* Globals:       None.                                                 *
*                                                                      *
* Edit History: 02/21/91 - Written by Richard P. Smurlo.               *
*                                                                      *
\**********************************************************************/

void ids_update_bearing(L, ntime, nbearing)
gr_infoptr      L;
t_type          ntime;
bear_type       nbearing;
{
   struct hist_bearing  temp;

   temp.otime = ntime;
   temp.obearing = nbearing;
   if (hb_insert_list(&temp, &L->bearinghead, &L->bearingtail) == 0)
      printf("ERROR:  hb_insert_list found no room for struct\n");
}

void ids_update_range_sen(L, ntime, nrange, nactive)
ra_infoptr      L;
t_type          ntime;
range_type      nrange;
active_type     nactive;
{
   struct hist_ract temp;
   int              result;

   if (nactive != L->cactive) {
      if (L->ctime != TIME_INVALID) {
         temp.otime    = L->ctime;
         temp.orange   = L->crange;
         temp.oactive  = L->cactive;
         if (hra_insert_list(&temp, &(L->histhead), &(L->histtail)) == 0)
            printf("ERROR:  hra_insert_list found no room for struct\n");
         }
      L->ctime   = ntime;
      L->crange  = nrange;
      L->cactive = nactive;
      }
}

void ids_update_onoff_sen(L, ntime, nactive)
a_infoptr       L;
t_type          ntime;
active_type     nactive;
{
   struct hist_act temp;
   int             result;

   if (nactive != L->cactive) {
      if (L->ctime != TIME_INVALID) {
```

```
         temp.otime   = L->ctime;
         temp.oactive = L->cactive;
         if (ha_insert_list(&temp, &(L->histhead), &(L->histtail)) == 0)
            printf("ERROR:  ha_insert_list found no room for struct\n");
         }
      L->ctime   = ntime;
      L->cactive = nactive;
      }
}
```

```

/***************************************************************************\
*                              ids_del_hist_info()                          *
*****************************************************************************
*                                                                           *
* Function:     Deletes old information from all of the sensor history lists *
*               in the blackboard.                                          *
*                                                                           *
* Input:        ids_del_hist_info(                                          *
*                  t_type      t; delete all list information time stamped  *
*                                 on or before the time given.              *
*               );                                                          *
*                                                                           *
* Output:       Updates blackboard.                                         *
*                                                                           *
* Globals:      None.                                                       *
*                                                                           *
* Edit History: 02/27/91 - Written by Richard P. Smurlo.                    *
*                                                                           *
\***************************************************************************/

void ids_del_hist_info(t)
t_type  t;
{
   int  i;

   hb_remove_old_info(t, &snr_gi.bearinghead, &snr_gi.bearingtail);
   for (i = 0; i < NUM_SNRS; i++)
      hra_remove_old_info(t, &snr_sensor[i].histhead, &snr_sensor[i].histtail);

   hb_remove_old_info(t, &pir_gi.bearinghead, &pir_gi.bearingtail);
   for (i = 0; i < NUM_PIRS; i++)
      ha_remove_old_info(t, &pir_sensor[i].histhead, &pir_sensor[i].histtail);

   hb_remove_old_info(t, &acu_gi.bearinghead, &acu_gi.bearingtail);
   for (i = 0; i < NUM_ACUS; i++)
      ha_remove_old_info(t, &acu_sensor[i].histhead, &acu_sensor[i].histtail);

   hb_remove_old_info(t, &mwv_gi.bearinghead, &mwv_gi.bearingtail);
   for (i = 0; i < NUM_MWVS; i++)
      ha_remove_old_info(t, &mwv_sensor[i].histhead, &mwv_sensor[i].histtail);

   hb_remove_old_info(t, &vid_gi.bearinghead, &vid_gi.bearingtail);
   for (i = 0; i < NUM_VIDS; i++)
      ha_remove_old_info(t, &vid_sensor[i].histhead, &vid_sensor[i].histtail);
}


```

```
/**********************************************************************\
*                              BB_EDIT.C                               *
************************************************************************
*                                                                      *
* Description:  This file contains "blackboard" editing functions as needed *
*               by the intrusion detection system main program (ids.c).  The *
*               .obj file must be linked to the ids.c file.            *
*                                                                      *
* Functions Included:                                                  *
*                                                                      *
*               init_snr_info()                                        *
*               init_pir_info()                                        *
*               init_acu_info()                                        *
*               init_mwv_info()                                        *
*               init_vid_info()                                        *
*                                                                      *
*               reset_bb_weights()                                     *
*               reset_group_vals()                                     *
*                                                                      *
*               t_rasen_was_act()                                      *
*               t_asen_was_act()                                       *
*                                                                      *
*               print_gr_info()                                        *
*               print_ra_info()                                        *
*               print_a_info()                                         *
*                                                                      *
* Edit History: 02/26/91 - Written by Richard P. Smurlo.               *
*                                                                      *
\**********************************************************************/

#include <stdio.h>
#include "headers\timestmp.h"
#include "headers\lists.h"
#include "headers\assess.h"
#include "headers\bb_edit.h"

```

```

/**********************************************************************\
*                           init_???_info                              *
************************************************************************
*                                                                      *
* Function:     These functions are called by ids_init_bb().           *
*               Each function initializes the blackboard items for that sen- *
*               sor group.                                             *
*                                                                      *
* Input:        init_???_info();                                       *
*                                                                      *
* Output:       Nothing.                                               *
*                                                                      *
* Globals:      None.                                                  *
*                                                                      *
* Edit History: 02/21/91 - Written by Richard P. Smurlo.               *
*                                                                      *
\**********************************************************************/

void init_snr_info()
{
   int  i;

   for(i=0; i<NUM_ZONES; i++)
      snr_gi.zw[i] = 0;
   snr_gi.num_active  = 0;
   snr_gi.bearinghead = NULL;
   snr_gi.bearingtail = NULL;

   for (i = 0; i < NUM_SNRS; i++) {
      snr_sensor[i].ctime    = TIME_INVALID;
      snr_sensor[i].crange   = 0;
      snr_sensor[i].cactive  = NOT_ACTIVE;
      snr_sensor[i].histhead = NULL;
      snr_sensor[i].histtail = NULL;
      }
}

void init_pir_info()
{
   int  i;

   for(i=0; i<NUM_ZONES; i++)
      pir_gi.zw[i] = 0;
   pir_gi.num_active  = 0;
   pir_gi.bearinghead = NULL;
   pir_gi.bearingtail = NULL;

   for (i = 0; i < NUM_PIRS; i++) {
      pir_sensor[i].ctime    = TIME_INVALID;
      pir_sensor[i].cactive  = NOT_ACTIVE;
      pir_sensor[i].histhead = NULL;
      pir_sensor[i].histtail = NULL;
      }
}

void init_acu_info()
{
   int  i;

   for(i=0; i<NUM_ZONES; i++)
      acu_gi.zw[i] = 0;
   acu_gi.num_active  = 0;
   acu_gi.bearinghead = NULL;
   acu_gi.bearingtail = NULL;

   for (i = 0; i < NUM_ACUS; i++) {
      acu_sensor[i].ctime    = TIME_INVALID;
      acu_sensor[i].cactive  = NOT_ACTIVE;
      acu_sensor[i].histhead = NULL;
      acu_sensor[i].histtail = NULL;
      }
}
```

Apr 04 1991 09:15:34 bb_edit.c Page 3

```
void init_mwv_info()
{
   int  i;

   for(i=0; i<NUM_ZONES; i++)
      mwv_gi.zw[i] = 0;
   mwv_gi.num_active  = 0;
   mwv_gi.bearinghead = NULL;
   mwv_gi.bearingtail = NULL;

   for (i = 0; i < NUM_MWVS; i++) {
      mwv_sensor[i].ctime    = TIME_INVALID;
      mwv_sensor[i].cactive  = NOT_ACTIVE;
      mwv_sensor[i].histhead = NULL;
      mwv_sensor[i].histtail = NULL;
      }
}

void init_vid_info()
{
   int  i;

   for(i=0; i<NUM_ZONES; i++)
      vid_gi.zw[i] = 0;
   vid_gi.num_active  = 0;
   vid_gi.bearinghead = NULL;
   vid_gi.bearingtail = NULL;

   for (i = 0; i < NUM_VIDS; i++) {
      vid_sensor[i].ctime    = TIME_INVALID;
      vid_sensor[i].cactive  = NOT_ACTIVE;
      vid_sensor[i].histhead = NULL;
      vid_sensor[i].histtail = NULL;
      }
}
```

Apr 04 1991 09:15:34 bb_edit.c Page 4

```
/*************************************************************************\
*                          reset_bb_weights                               *
***************************************************************************
*                                                                         *
* Function:    This function resets the blackboard weights to their       *
*              desired initial settings (the initial settings are set at  *
*              compile time and may eventually be able to be changed by a *
*              menu on the IDS screen).                                   *
*                                                                         *
* Input:       reset_bb_weights();                                        *
*                                                                         *
* Output:      Updates the weights of all items in the blackboard.        *
*                                                                         *
* Globals:     None.                                                      *
*                                                                         *
* Edit History: 02/27/91 - Written by Richard P. Smurlo.                  *
*                                                                         *
\*************************************************************************/

void reset_bb_weights()
{
   int  i;

   for (i = 0; i < NUM_SNRS; i++)
      snr_sensor[i].cweight  = init_weights.snr[i];
   for (i = 0; i < NUM_PIRS; i++)
      pir_sensor[i].cweight  = init_weights.pir[i];
   for (i = 0; i < NUM_ACUS; i++)
      acu_sensor[i].cweight  = init_weights.acu[i];
   for (i = 0; i < NUM_MWVS; i++)
      mwv_sensor[i].cweight  = init_weights.mwv[i];
   for (i = 0; i < NUM_VIDS; i++)
      vid_sensor[i].cweight  = init_weights.vid[i];
}
```

```
/**********************************************************************\
*                          reset_group_vals                            *
************************************************************************
*                                                                      *
* Function:    This function resets the gr_weight and num_active fields of *
*              all gr_info types in the blackboard.                    *
*                                                                      *
* Input:       reset_group_vals();                                     *
*                                                                      *
* Output:      resets (to 0) the gr_weight and num_active fields of all *
*              group info fields in the blackboard.                    *
*                                                                      *
* Globals:     None.                                                   *
*                                                                      *
* Edit History: 02/27/91 - Written by Richard P. Smurlo.               *
*                                                                      *
\**********************************************************************/

void reset_group_vals()
{
   int  i;

   for(i=0; i<NUM_ZONES; i++)
      snr_gi.zw[i] = 0;
   snr_gi.num_active = 0;
   for (i = 0; i < NUM_SNRS; i++)
      snr_gi.num_active += snr_sensor[i].cactive;

   for(i=0; i<NUM_ZONES; i++)
      pir_gi.zw[i] = 0;
   pir_gi.num_active = 0;
   for (i = 0; i < NUM_PIRS; i++)
      pir_gi.num_active += pir_sensor[i].cactive;

   for(i=0; i<NUM_ZONES; i++)
      acu_gi.zw[i] = 0;
   acu_gi.num_active = 0;
   for (i = 0; i < NUM_ACUS; i++)
      acu_gi.num_active += acu_sensor[i].cactive;

   for(i=0; i<NUM_ZONES; i++)
      mwv_gi.zw[i] = 0;
   mwv_gi.num_active = 0;
   for (i = 0; i < NUM_MWVS; i++)
      mwv_gi.num_active += mwv_sensor[i].cactive;

   for(i=0; i<NUM_ZONES; i++)
      vid_gi.zw[i] = 0;
   vid_gi.num_active = 0;
   for (i = 0; i < NUM_VIDS; i++)
      vid_gi.num_active += vid_sensor[i].cactive;
}
```

```
/**********************************************************************\
*                          t_*asen_was_act()                           *
************************************************************************
*                                                                      *
* Function:    These functions return the last time that the sensor pointed *
*              to by 's' was active prior to time 't' and later than time *
*              't - tw'                                                *
*                                                                      *
* Input:       t_rasen_was_act(                                        *
*                ra_infoptr s;  Pointer to sensor to be get time info on. *
*                t_type     t;  Upper bound of time that sensor must be act.*
*                t_type     tw; Window of time that sensor must be active. *
*              );                                                      *
*                                                                      *
* Output:      Returns the latest time that the sensor was active between *
*              times t and (t-tw).  If the sensor was not active during *
*              that time period, the routine returns TIME_INVALID.     *
*                                                                      *
* Globals:     None.                                                   *
*                                                                      *
* Edit History: 03/07/91 - Written by Richard P. Smurlo.               *
*                                                                      *
\**********************************************************************/

t_type t_rasen_was_act(s, t, tw)
ra_infoptr      s;
t_type          t;
t_type          tw;
{
   hra_nodeptr  currptr = (*s).histhead;
   t_type       active_time;

   active_time = TIME_INVALID;
   if ((*s).cactive == ACTIVE) {
      active_time = (*s).ctime;
      if ( t1_b_t2_a_t3(active_time, DECR_TIME(t,tw), t) )
         return(active_time);
   }
   while( (currptr != NULL) &&
          t1_b_t2_a_t3(currptr->info.otime,
                       DECR_TIME(t,tw), INCR_TIME(t,HRS(12L))) ) {
      if ( (currptr->info.oactive == ACTIVE) &&
           t1_b_t2_a_t3(currptr->info.otime, DECR_TIME(t,tw), t) )
         return(currptr->info.otime);
      currptr = currptr->next;
   }
   return(TIME_INVALID);
}

t_type t_asen_was_act(s, t, tw)
a_infoptr       s;
t_type          t;
t_type          tw;
{
   ha_nodeptr   currptr = (*s).histhead;
   t_type       active_time;

   active_time = TIME_INVALID;
   if ((*s).cactive == ACTIVE) {
      active_time = (*s).ctime;
      if ( t1_b_t2_a_t3(active_time, DECR_TIME(t,tw), t) )
         return(active_time);
   }
   while( (currptr != NULL) &&
          t1_b_t2_a_t3(currptr->info.otime,
                       DECR_TIME(t,tw), INCR_TIME(t,HRS(12L))) ) {
      if ( (currptr->info.oactive == ACTIVE) &&
           t1_b_t2_a_t3(currptr->info.otime, DECR_TIME(t,tw), t) )
         return(currptr->info.otime);
      currptr = currptr->next;
   }
   return(TIME_INVALID);
```

```
}

```

```

/***************************************************************************\
*                              print_??_info                              *
****************************************************************************
*
* Function:     Prints the given list pointed to by L.
*
* Input:        print_??_info(
                  ??_infoptr L; pointer to list to print
*               );
*
* Output:       Nothing.
*
* Globals:      None.
*
* Edit History: 02/21/91 - Written by Richard P. Smurlo.
*
\***************************************************************************/

void print_gr_info(L)
gr_infoptr L;
{
   printf("gr:  na=%08d\n", L->num_active);
   hb_print_list(L->bearinghead);
   printf("\n");
}

void print_ra_info(L)
ra_infoptr L;
{
   printf("ra:  ct=%08lu, cw=%08d, cr=%04d, ca=%02d\n",
          L->ctime, L->cweight, L->crange, L->cactive);
   hra_print_list(L->histhead);
   printf("\n");
}

void print_a_info(L)
a_infoptr L;
{
   printf("a:  ct=%08lu, cw=%08d, ca=%02d\n",
          L->ctime, L->cweight, L->cactive);
   ha_print_list(L->histhead);
   printf("\n");
}
```

```
/*************************************************************************\
*                                LISTS.C                                  *
***************************************************************************
*                                                                         *
* Description:  Dynamically-allocated doubly-linked list functions.       *
*                                                                         *
*               These functions perform the operations needed on the lists *
*               used in the Intrusion Detection System (IDS) software     *
*               system.                                                   *
*                                                                         *
* Functions included:                                                     *
*                                                                         *
*               hb_insert_list();                                         *
*               hra_insert_list();                                        *
*               ha_insert_list();                                         *
*                                                                         *
*               hb_remove_old_info();                                     *
*               hra_remove_old_info();                                    *
*               ha_remove_old_info();                                     *
*                                                                         *
*               hb_print_list();                                          *
*               hra_print_list();                                         *
*               ha_print_list();                                          *
*                                                                         *
*               hb_free_list();                                           *
*               hra_free_list();                                          *
*               ha_free_list();                                           *
*                                                                         *
*               hb_new_node();                                            *
*               hra_new_node();                                           *
*               ha_new_node();                                            *
*                                                                         *
* Edit History: 02/21/91 - Written by Richard P. Smurlo.                  *
*                                                                         *
\*************************************************************************/

#include <stdio.h>
#include <malloc.h>

#include "headers\timestmp.h"
#include "headers\assess.h"
#include "headers\lists.h"

/* Non-public function declarations. */
void            hb_free_list();
void            hra_free_list();
void            ha_free_list();
hb_nodeptr      hb_new_node();
hra_nodeptr     hra_new_node();
ha_nodeptr      ha_new_node();

/*************************************************************************\
*                             h* insert list                              *
***************************************************************************
*                                                                         *
* Function:     Inserts the appropriately typed data at the head of the list *
*               pointed to by (*headptr).  Updates the head and, if neces- *
*               sary, the tail.                                           *
*                                                                         *
* Input:        h*_insert_list(                                           *
*                 hist_*     *(*_data); pointer to data to be added to the *
*                                       list.                             *
*                 hb_nodeptr *headptr;  pointer to head of list.          *
*                 hb_nodeptr *tailptr;  pointer to tail of list.          *
*               );                                                        *
*                                                                         *
* Output:       Returns TRUE if new_node was generated correctly,         *
*                       FALSE if not enough memory to generate the new node. *
*               Updates headptr and tailptr as necessary.                 *
*                                                                         *
* Globals:      None.                                                     *
*                                                                         *
* Edit History: 02/21/91 - Written by Richard P. Smurlo.                  *
```

```
*                                                                         *
\*************************************************************************/

int hb_insert_list(bearing_data, headptr, tailptr)
struct hist_bearing     *bearing_data;
hb_nodeptr              *headptr;
hb_nodeptr              *tailptr;
{
    hb_nodeptr   hb_new_node(),
                 temp;

    if ((temp = hb_new_node(bearing_data)) != NULL) {
       if ((* headptr) == NULL) {
          (* tailptr) = temp;
          }
       else {
          (* headptr)->prev = temp;
          temp->next = (* headptr);
          }
       (* headptr) = temp;
       }
    return (temp != NULL);
}

int hra_insert_list(ra_data, headptr, tailptr)
struct hist_ract        *ra_data;
hra_nodeptr             *headptr;
hra_nodeptr             *tailptr;
{
    hra_nodeptr  hra_new_node(),
                 temp;

    if ((temp = hra_new_node(ra_data)) != NULL) {
       if ((* headptr) == NULL) {
          (* tailptr) = temp;
          }
       else {
          (* headptr)->prev = temp;
          temp->next = (* headptr);
          }
       (* headptr) = temp;
       }
    return (temp != NULL);
}

int ha_insert_list(a_data, headptr, tailptr)
struct hist_act *a_data;
ha_nodeptr      *headptr;
ha_nodeptr      *tailptr;
{
    ha_nodeptr   ha_new_node(),
                 temp;

    if ((temp = ha_new_node(a_data)) != NULL) {
       if ((* headptr) == NULL) {
          (* tailptr) = temp;
          }
       else {
          (* headptr)->prev = temp;
          temp->next = (* headptr);
          }
       (* headptr) = temp;
       }
    return (temp != NULL);
}
```

```
/**********************************************************************\
*                      h*_remove_old_info                              *
************************************************************************
*                                                                      *
* Function:     Removes all information in the list pointed to by headptr *
*               that has a time stamp less than the given time (i.e. removes *
*               the older data).  Updates the head and tail as needed.  *
*                                                                      *
* Input:        h*_remove_old_info(                                    *
*                 t_type        time;     delete info older than this time. *
*                 h*_nodeptr    *headptr; pointer to head of list to delete *
*                                         from.                        *
*                 h*_nodeptr    *tailptr; pointer to tail of list to delete *
*                                         from.                        *
*               );                                                     *
*                                                                      *
* Output:       Updates the pointers to the head and tail of the list as *
*               necessary.                                             *
*                                                                      *
* Globals:      None.                                                  *
*                                                                      *
* Edit History: 02/21/91 - Written by Richard P. Smurlo.               *
*                                                                      *
\**********************************************************************/

void hb_remove_old_info(time, headptr, tailptr)
t_type          time;
hb_nodeptr      *headptr;
hb_nodeptr      *tailptr;
{
   void         hb_free_list();
   hb_nodeptr   curr = (* tailptr);

   while((curr != NULL) &&
         t1_b_t2_a_t3(time, curr->info.otime,
                      INCR_TIME(curr->info.otime, HRS(12L))) )
      curr = curr->prev;
   if (curr != NULL) {
      hb_free_list(&(curr->next));
      curr->next  = NULL;
      (* tailptr) = curr;
      }
   else {
      hb_free_list(headptr);
      (* tailptr) = NULL;
      }
}

void hra_remove_old_info(time, headptr, tailptr)
t_type          time;
hra_nodeptr     *headptr;
hra_nodeptr     *tailptr;
{
   void         hra_free_list();
   hra_nodeptr  curr = (* tailptr);

   while((curr != NULL) &&
         t1_b_t2_a_t3(time, curr->info.otime,
                      INCR_TIME(curr->info.otime, HRS(12L))) )
      curr = curr->prev;
   if (curr != NULL) {
      hra_free_list(&(curr->next));
      curr->next = NULL;
      (* tailptr) = curr;
      }
   else {
      hra_free_list(headptr);
      (* tailptr) = NULL;
      }
}

void ha_remove_old_info(time, headptr, tailptr)
```

```
t_type          time;
ha_nodeptr      *headptr;
ha_nodeptr      *tailptr;
{
   void         ha_free_list();
   ha_nodeptr   curr = (* tailptr);

   while((curr != NULL) &&
         t1_b_t2_a_t3(time, curr->info.otime,
                      INCR_TIME(curr->info.otime, HRS(12L))) )
      curr = curr->prev;
   if (curr != NULL) {
      ha_free_list(&(curr->next));
      curr->next = NULL;
      (* tailptr) = curr;
      }
   else {
      ha_free_list(headptr);
      (* tailptr) = NULL;
      }
}
```

```
/**********************************************************************\
*                              h*_print_list                           *
************************************************************************
*                                                                      *
* Function:      Prints the given list pointed to by L.                *
*                                                                      *
* Input:         h*_print_list(                                        *
*                  h*_nodeptr L; pointer to list to print              *
*                );                                                    *
*                                                                      *
* Output:        Nothing.                                              *
*                                                                      *
* Globals:       None.                                                 *
*                                                                      *
* Edit History: 02/21/91 - Written by Richard P. Smurlo.               *
*                                                                      *
\**********************************************************************/

void hb_print_list(L)
hb_nodeptr   L;
{
   int  i = 0;
   int  j;

   for ( ; L != NULL; L = L->next) {
      for (j=0; j<=i; j++)
         printf(" ");
      printf("hb:  ot=%08lu, ob=%08d\n", L->info.otime, L->info.obearing);
      i++;
      }
}

void hra_print_list(L)
hra_nodeptr   L;
{
   int  i = 0;
   int  j;

   for ( ; L != NULL; L = L->next) {
      for (j=0; j<=i; j++)
         printf(" ");
      printf("hra:  ot=%08lu, or=%08d, oa=%02d\n",
             L->info.otime, L->info.orange, L->info.oactive);
      i++;
      }
}

void ha_print_list(L)
ha_nodeptr   L;
{
   int  i = 0;
   int  j;

   for ( ; L != NULL; L = L->next) {
      for (j=0; j<=i; j++)
         printf(" ");
      printf("ha:  ot=%08lu, oa=%02d\n",
             L->info.otime, L->info.oactive);
      i++;
      }
}
```

```
/**********************************************************************\
*                              h*_free_list                            *
************************************************************************
*                                                                      *
* Function:      Deletes the list pointed to by L and frees the memory space *
*                that was previously allocated to it.                  *
*                                                                      *
* Input:         h*_free_list(                                         *
*                  h*_nodeptr   *L;       pointer to list to delete.   *
*                );                                                    *
*                                                                      *
* Output:        Returns the NULL pointer in L.                        *
*                                                                      *
* Globals:       None.                                                 *
*                                                                      *
* Edit History: 02/21/91 - Written by Richard P. Smurlo.               *
*                                                                      *
\**********************************************************************/

void  hb_free_list(L)
hb_nodeptr *L;
{
   hb_nodeptr  curr = *L,
               temp;

   for (; curr != NULL; curr = temp) {
      temp = curr->next;
      free((char *) curr);
      }
   *L = NULL;
}

void  hra_free_list(L)
hra_nodeptr *L;
{
   hra_nodeptr curr = *L,
               temp;

   for (; curr != NULL; curr = temp) {
      temp = curr->next;
      free((char *) curr);
      }
   *L = NULL;
}

void  ha_free_list(L)
ha_nodeptr *L;
{
   ha_nodeptr  curr = *L,
               temp;

   for (; curr != NULL; curr = temp) {
      temp = curr->next;
      free((char *) curr);
      }
   *L = NULL;
}
```

```
/*************************************************************************\
*                               h* new node                               *
*************************************************************************
*                                                                         *
* Function:     Creates a new node of type hb_node, hra_node, or ha_node, *
*               respectively, and puts the data passed to it into the newly *
*               created node.  Note that this header is for all three     *
*               functions below.                                          *
*                                                                         *
* Input:        h*_new_node(                                              *
*                 hist_bearing  *bearing_data; pointer to data to be put into*
*                                              new node.                  *
*               );                                                        *
*                                                                         *
* Output:       Returns a pointer of type h*_nodeptr to the new node.     *
*                                                                         *
* Globals:      None.                                                     *
*                                                                         *
* Edit History: 02/21/91 - Written by Richard P. Smurlo.                  *
*                                                                         *
\*************************************************************************/

hb_nodeptr hb_new_node(bearing_data)
struct hist_bearing     *bearing_data;
{
   hb_nodeptr   newptr;

   if ((newptr = (hb_nodeptr) malloc(sizeof(struct hb_node))) != NULL) {
      newptr->info.otime    = (*bearing_data).otime;
      newptr->info.obearing = (*bearing_data).obearing;
      newptr->prev          = NULL;     /* to be set by calling routine */
      newptr->next          = NULL;     /* not a circular list          */
      }
   return newptr;
}

hra_nodeptr hra_new_node(ra_data)
struct hist_ract        *ra_data;
{
   hra_nodeptr  newptr;

   if ((newptr = (hra_nodeptr) malloc(sizeof(struct hra_node))) != NULL) {
      newptr->info.otime    = (*ra_data).otime;
      newptr->info.orange   = (*ra_data).orange;
      newptr->info.oactive  = (*ra_data).oactive;
      newptr->prev          = NULL;     /* to be set by calling routine */
      newptr->next          = NULL;     /* not a circular list          */
      }
   return newptr;
}

ha_nodeptr ha_new_node(a_data)
struct hist_act *a_data;
{
   ha_nodeptr   newptr;

   if ((newptr = (ha_nodeptr) malloc(sizeof(struct ha_node))) != NULL) {
      newptr->info.otime    = (*a_data).otime;
      newptr->info.oactive  = (*a_data).oactive;
      newptr->prev          = NULL;     /* to be set by calling routine */
      newptr->next          = NULL;     /* not a circular list          */
      }
   return newptr;
}
```

Apr 04 1991 09:15:34 support.c Page 1

```
/************************************************************************\
*                              SUPPORT.C                                 *
**************************************************************************
*                                                                        *
* Description:  This file contains all of the support functions for the  *
*               assess.c file ( any functions that will not be needed by the *
*               calling program.                                         *
*                                                                        *
* Public Files Included:                                                 *
*               int  calc_threat();                                      *
*               void calc_group_zone_weights();                          *
*               void print_zone_weights();                               *
*               void adjw_random_noise();                                *
*               void adjw_angular_sens_fusion();                         *
*               void adjw_purposeful_motion();                           *
*                void adjw_ra_motion();                                  *
*                void adjw_a_motion();                                   *
*               void increase_weight();                                  *
*               void decrease_weight();                                  *
* Private Files Included:                                                *
*               void calc_snr_zone_weights();                            *
*               void calc_pir_zone_weights();                            *
*               void calc_acu_zone_weights();                            *
*               void calc_mwv_zone_weights();                            *
*               void calc_vid_zone_weights();                            *
*               void set_Inter_weights();                                *
*                                                                        *
* Edit History: 02/26/91 - Written by Richard P. Smurlo.                 *
*                                                                        *
\************************************************************************/
#include <stdio.h>
#include "headers/sysdefs.h"
#include "headers\timestmp.h"
#include "headers\bb_edit.h"
#include "headers\assess.h"
#include "headers\support.h"

extern char     barrier_strings[5][40];

/* Private function declarations. */
void calc_snr_zone_weights();
void calc_pir_zone_weights();
void calc_acu_zone_weights();
void calc_mwv_zone_weights();
void calc_vid_zone_weights();
void set_Inter_weights();
```

Apr 04 1991 09:15:34 support.c Page 2

```

/************************************************************************\
*                              calc_threat                               *
**************************************************************************
*                                                                        *
* Function:     This function updates the group weights of each sensor type *
*               in the blackboard and then updates the composite threat. *
*                                                                        *
* Input:        calc_threat();                                           *
*                                                                        *
* Output:       Updates the group weights and the composite in the black- *
*               board.                                                   *
*                                                                        *
* Globals:      None.                                                    *
*                                                                        *
* Edit History: 02/28/91 - Written by Richard P. Smurlo.                 *
*                                                                        *
\************************************************************************/

int calc_threat()
{
   int  comp;
   int  i;
   int  maxweight;

   /* Calculate the overall zone weights based on the individual sensor      */
   /* zone weights.  Return the highest weight.                               */
   maxweight = 0;
   for (i=0; i<NUM_ZONES; i++) {
      zw[i] = (snr_gi.zw[i] +
               pir_gi.zw[i] +
               acu_gi.zw[i] +
               mwv_gi.zw[i] +
               vid_gi.zw[i]) / AVW;
      if (zw[i] > maxweight)
         maxweight = zw[i];
      }

   /* calculate composite threat.                                   */
   comp = 0;
   for(i=0; i<NUM_ZONES; i++)
      comp += zw[i];

   /* If composite > MAX_COMPOSITE, truncate it to MAX_COMPOSITE (100). */
   if (comp > MAX_COMPOSITE)
      comp = MAX_COMPOSITE;
   if (maxweight > MAX_COMPOSITE)
      maxweight = MAX_COMPOSITE;
   return(maxweight);
}
```

```

/*************************************************************************\
*                         calc_group_zone_weights                        *
***************************************************************************
*                                                                         *
* Function:     This function updates the group weights of each sensor type *
*               in the blackboard.                                        *
*                                                                         *
* Input:        calc_group_zone_weights();                                *
*                                                                         *
* Output:       Updates the group weights in the blackboard.              *
*                                                                         *
* Globals:      None.                                                     *
*                                                                         *
* Edit History: 03/27/91 - Written by Richard P. Smurlo.                  *
*                                                                         *
\*************************************************************************/

#define INZ(z)          ( (z)<NUM_ZONES-1 ? (z)+1 : 0 )
#define DEZ(z)          ( (z)!=0 ? (z)-1 : NUM_ZONES-1 )

void calc_group_zone_weights()
{
   calc_snr_zone_weights();
   calc_pir_zone_weights();
   calc_acu_zone_weights();
   calc_mwv_zone_weights();
   calc_vid_zone_weights();
}

void calc_snr_zone_weights()
{
   int  i;

   for(i=0; i<NUM_ZONES; i++)
      snr_gi.zw[i] =
         (snr_sensor[DEZ(i)].cweight)/4 * snr_sensor[DEZ(i)].cactive +
         (snr_sensor[i].cweight)/2      * snr_sensor[i].cactive      +
         (snr_sensor[INZ(i)].cweight)/4 * snr_sensor[INZ(i)].cactive;
}

void calc_pir_zone_weights()
{
   int  i;

   for(i=0; i<NUM_ZONES; i++)
      pir_gi.zw[i] =
         (pir_sensor[DEZ(2*i)].cweight)/2 * pir_sensor[DEZ(2*i)].cactive +
         (pir_sensor[2*i].cweight)        * pir_sensor[2*i].cactive      +
         (pir_sensor[INZ(2*i)].cweight)/2 * pir_sensor[INZ(2*i)].cactive;
}

void calc_acu_zone_weights()
{
   int  zone_num;

   if ( (acu_gi.bearinghead != NULL) &&
        (acu_gi.bearinghead->info.obearing != BEAR_INVALID) ) {
      zone_num = B2NUM(acu_gi.bearinghead->info.obearing, NUM_ZONES);
      acu_gi.zw[zone_num]       += GZW_ACU_K1*AVW;
      acu_gi.zw[INZ(zone_num)] += GZW_ACU_K2*AVW;
      acu_gi.zw[DEZ(zone_num)] += GZW_ACU_K2*AVW;
      } /* end if */
}

void calc_mwv_zone_weights()
{
   int  i;

   for(i=0; i<3; i++)
      mwv_gi.zw[i] = (mwv_sensor[0].cweight)/6 * mwv_sensor[0].cactive;
   mwv_gi.zw[3] = ((mwv_sensor[0].cweight)/12 * mwv_sensor[0].cactive   +
                   (mwv_sensor[1].cweight)/12 * mwv_sensor[1].cactive);
```

```
   for(i=4; i<9; i++)
      mwv_gi.zw[i] = (mwv_sensor[1].cweight)/6 * mwv_sensor[1].cactive;
   mwv_gi.zw[9] = ((mwv_sensor[1].cweight)/12 * mwv_sensor[1].cactive   +
                   (mwv_sensor[2].cweight)/12 * mwv_sensor[2].cactive);
   for(i=10; i<15; i++)
      mwv_gi.zw[i] = (mwv_sensor[2].cweight)/6 * mwv_sensor[2].cactive;
   mwv_gi.zw[15] =((mwv_sensor[2].cweight)/12 * mwv_sensor[2].cactive   +
                   (mwv_sensor[3].cweight)/12 * mwv_sensor[3].cactive);
   for(i=16; i<21; i++)
      mwv_gi.zw[i] = (mwv_sensor[3].cweight)/6 * mwv_sensor[3].cactive;
   mwv_gi.zw[21] =((mwv_sensor[3].cweight)/12 * mwv_sensor[3].cactive   +
                   (mwv_sensor[0].cweight)/12 * mwv_sensor[0].cactive);
   for(i=22; i<24; i++)
      mwv_gi.zw[i] = (mwv_sensor[0].cweight)/6 * mwv_sensor[0].cactive;
}

void calc_vid_zone_weights()
{
   int  zone_num;

   if ( (vid_gi.bearinghead != NULL) &&
        (vid_gi.bearinghead->info.obearing != BEAR_INVALID) ) {
      zone_num = B2NUM(vid_gi.bearinghead->info.obearing, NUM_ZONES);
      vid_gi.zw[zone_num]       += GZW_VID_K1*AVW;
      vid_gi.zw[INZ(zone_num)] += GZW_VID_K2*AVW;
      vid_gi.zw[DEZ(zone_num)] += GZW_VID_K2*AVW;
      } /* end if */
}

void print_zone_weights()
{
   int  i;

   printf("Individual zone weights: \n");
   printf("snr:  ");
   print_zones(snr_gi.zw);
   printf("pir:  ");
   print_zones(pir_gi.zw);
   printf("acu:  ");
   print_zones(acu_gi.zw);
   printf("mwv:  ");
   print_zones(mwv_gi.zw);
   printf("vid:  ");
   print_zones(vid_gi.zw);
}

void print_zones(wtarray)
weight_type     *wtarray;
{
   int  i;

   for (i=0; i<NUM_ZONES; i++) {
      printf("%02d ", wtarray[i]);
      if (i == 11) printf("\n      ");
      }
   printf("\n");
}
```

```
/***************************************************************************\
*                           adjw_random_noise                               *
*****************************************************************************
*                                                                           *
* Function:     This function decreases the weights of a sensor group (pos- *
*               ibly to 0) if it is determined that a large number of them  *
*               are active.  This function should be the first adjw_ type   *
*               function called so that angular sensor fusion, for example, *
*               can use what was found in this routine.                     *
*                                                                           *
* Input:        adjw_random_noise();                                        *
*                                                                           *
* Output:       Nothing (for now).  May eventually want to return booleans  *
*               indicating weather or not each sensor group has valid info. *
*                                                                           *
* Globals:      None.                                                       *
*                                                                           *
* Edit History: 03/05/91 - Written by Richard P. Smurlo.                    *
*                                                                           *
\***************************************************************************/

void adjw_random_noise()
{
   int  i;

   if (snr_gi.num_active > NUM_SNRS/2)
      for (i = 0; i < NUM_SNRS; i++)
         snr_sensor[i].cweight = RN_SETW;

   if (pir_gi.num_active > NUM_PIRS/2)
      for (i = 0; i < NUM_PIRS; i++)
         pir_sensor[i].cweight = RN_SETW;

   if (mwv_gi.num_active > NUM_MWVS/2)
      for (i = 0; i < NUM_MWVS; i++)
         mwv_sensor[i].cweight = RN_SETW;
}
```

```
/***************************************************************************\
*                        adjw_angular_sens_fusion                           *
*****************************************************************************
*                                                                           *
* Function:     This function increments the sensor group zone weights when *
*               two zones of the same angle in different sensor groups cor- *
*               relate (i.e. have non-zero values).                         *
*                                                                           *
* Input:        adjw_angular_sens_fusion();                                 *
*                                                                           *
* Output:       Updates the individual sensor zone weights (sen_gi.zw[i]) in *
*               the blackboard.                                             *
*                                                                           *
* Globals:      None.                                                       *
*                                                                           *
* Edit History: 03/28/91 - Written by Richard P. Smurlo.                    *
*                                                                           *
\***************************************************************************/

#define ZW_SNR_POS 0
#define ZW_PIR_POS 1
#define ZW_ACU_POS 2
#define ZW_MWV_POS 3
#define ZW_VID_POS 4

void adjw_angular_sens_fusion()
{
   int  i;
   weight_type  inter_zw[NUM_TYPES][NUM_ZONES];

   set_inter_weights(inter_zw);

   for (i=0; i < NUM_ZONES; i++) {
      if ( (snr_gi.zw[i] != 0) && (pir_gi.zw[i] != 0) ) {
         snr_gi.zw[i] += (inter_zw[ZW_SNR_POS][i] + inter_zw[ZW_PIR_POS][i])/2;
         pir_gi.zw[i] += (inter_zw[ZW_SNR_POS][i] + inter_zw[ZW_PIR_POS][i])/2;
         }
      if ( (snr_gi.zw[i] != 0) && (acu_gi.zw[i] != 0) ) {
         snr_gi.zw[i] += (inter_zw[ZW_SNR_POS][i] + inter_zw[ZW_ACU_POS][i])/2;
         acu_gi.zw[i] += (inter_zw[ZW_SNR_POS][i] + inter_zw[ZW_ACU_POS][i])/2;
         }
      if ( (snr_gi.zw[i] != 0) && (mwv_gi.zw[i] != 0) ) {
         snr_gi.zw[i] += (inter_zw[ZW_SNR_POS][i] + inter_zw[ZW_MWV_POS][i])/2;
         mwv_gi.zw[i] += (inter_zw[ZW_SNR_POS][i] + inter_zw[ZW_MWV_POS][i])/2;
         }
      if ( (snr_gi.zw[i] != 0) && (vid_gi.zw[i] != 0) ) {
         snr_gi.zw[i] += (inter_zw[ZW_SNR_POS][i] + inter_zw[ZW_VID_POS][i])/2;
         vid_gi.zw[i] += (inter_zw[ZW_SNR_POS][i] + inter_zw[ZW_VID_POS][i])/2;
         }

      if ( (pir_gi.zw[i] != 0) && (acu_gi.zw[i] != 0) ) {
         pir_gi.zw[i] += (inter_zw[ZW_PIR_POS][i] + inter_zw[ZW_ACU_POS][i])/2;
         acu_gi.zw[i] += (inter_zw[ZW_PIR_POS][i] + inter_zw[ZW_ACU_POS][i])/2;
         }
      if ( (pir_gi.zw[i] != 0) && (mwv_gi.zw[i] != 0) ) {
         pir_gi.zw[i] += (inter_zw[ZW_PIR_POS][i] + inter_zw[ZW_MWV_POS][i])/2;
         mwv_gi.zw[i] += (inter_zw[ZW_PIR_POS][i] + inter_zw[ZW_MWV_POS][i])/2;
         }
      if ( (pir_gi.zw[i] != 0) && (vid_gi.zw[i] != 0) ) {
         pir_gi.zw[i] += (inter_zw[ZW_PIR_POS][i] + inter_zw[ZW_VID_POS][i])/2;
         vid_gi.zw[i] += (inter_zw[ZW_PIR_POS][i] + inter_zw[ZW_VID_POS][i])/2;
         }

      if ( (acu_gi.zw[i] != 0) && (mwv_gi.zw[i] != 0) ) {
         acu_gi.zw[i] += (inter_zw[ZW_ACU_POS][i] + inter_zw[ZW_MWV_POS][i])/2;
         mwv_gi.zw[i] += (inter_zw[ZW_ACU_POS][i] + inter_zw[ZW_MWV_POS][i])/2;
         }
      if ( (acu_gi.zw[i] != 0) && (vid_gi.zw[i] != 0) ) {
         acu_gi.zw[i] += (inter_zw[ZW_ACU_POS][i] + inter_zw[ZW_VID_POS][i])/2;
         vid_gi.zw[i] += (inter_zw[ZW_ACU_POS][i] + inter_zw[ZW_VID_POS][i])/2;
         }
```

```
         if ( (mwv_gi.zw[i] != 0) && (vid_gi.zw[i] != 0) ) {
            snr_gi.zw[i] += (inter_zw[ZW_MWV_POS][i] + inter_zw[ZW_VID_POS][i])/2;
            pir_gi.zw[i] += (inter_zw[ZW_MWV_POS][i] + inter_zw[ZW_VID_POS][i])/2;
            }
         } /* end for */
   }

   void set_inter_weights(izw)
   weight_type izw[][NUM_ZONES];
   {
      int  i;

      for (i=0; i < NUM_ZONES; i++) {
         izw[ZW_SNR_POS][i] = snr_gi.zw[i];
         izw[ZW_PIR_POS][i] = pir_gi.zw[i];
         izw[ZW_ACU_POS][i] = acu_gi.zw[i];
         izw[ZW_MWV_POS][i] = mwv_gi.zw[i];
         izw[ZW_VID_POS][i] = vid_gi.zw[i];
         }
   }
```

```

/***********************************************************************\
*                      adjw_purposeful_motion                           *
*************************************************************************
*                                                                       *
* Function:     This function adjusts the weights of sensors when purposeful *
*               motion is detected.  Purposeful motion means that a specific *
*               sensor group detects motion by one sensor, and then by an   *
*               adjacent sensor, and then by the third sensor in line.      *
*                                                                       *
* Input:        adjw_purposeful_motion();                               *
*                                                                       *
* Output:       Updates the weights of associated sensors if purposeful *
*               motion is detected.                                     *
*                                                                       *
* Globals:      None.                                                   *
*                                                                       *
* Edit History: 03/06/91 - Written by Richard P. Smurlo.                *
*                                                                       *
\***********************************************************************/
void adjw_purposeful_motion(ct, noise)
t_type          ct;
boolean         noise;
{
   adjw_ra_motion(snr_sensor, NUM_SNRS, ct, noise);
   adjw_a_motion(pir_sensor, NUM_PIRS, ct, noise);
   /* no way to detect purposeful motion for acoustic sensors yet.       */
/*   adjw_a_motion(mwv_sensor, NUM_MWVS, ct, noise); */
   /* no way to detect purposeful motion for video sensor yet.           */

}

void adjw_ra_motion(sensor, num_sensors, ct, noise)
ra_infoptr      sensor;
int             num_sensors;
t_type          ct;
boolean         noise;
{
   int          i;
   int          index;
   t_type       t1, t2, t3;
   boolean      pm_detected = FALSE;

   for (i = 0; i < num_sensors; i++) {
      t1 = 0;
      t2 = 0;
      t3 = 0;
      if (sensor[i].cactive == ACTIVE) {
         /* Add to current weight if adjacent sensor is also on.         */
         if (sensor[(i+1)%num_sensors].cactive == ACTIVE)
            increase_weight(&sensor[i], PM_INCW_K0, PM_AINC_TYPE);
         if (sensor[(i+num_sensors-1)%num_sensors].cactive == ACTIVE)
            increase_weight(&sensor[i], PM_INCW_K0, PM_AINC_TYPE);

         t1 = ct;
         /* Check for purposeful left to right motion. */
         t2 = t_rasen_was_act(&sensor[(i+1)%num_sensors], t1, PM_TIME_WINDOW);
         index = 1;
         if (t2 == TIME_INVALID) {
            t2 = t_rasen_was_act(&sensor[(i+2)%num_sensors], t1, PM_TIME_WINDOW
);
            index = 2;
            }
         if (t2 != TIME_INVALID) {
#ifdef DEBUG
printf("Increasing sen[%d] for 1 to r PM\n", i);
#endif
            increase_weight(&sensor[i], PM_INCW_K1, PM_MINC_TYPE);
            t3 = t_rasen_was_act(&sensor[(i+index+1)%num_sensors],
                                 t2, PM_TIME_WINDOW);
            if (t3 == TIME_INVALID)
               t3 = t_rasen_was_act(&sensor[(i+index+2)%num_sensors],
                                    t2, PM_TIME_WINDOW);
```

```
                 if (t3 != TIME_INVALID) {
#ifdef DEBUG
printf("Increasing sen[%d] again for l to r PM\n", i);
#endif
                    increase_weight(&sensor[i], PM_INCW_K2, PM_MINC_TYPE);
                    pm_detected = TRUE;
                    }
                 } /* end if */

              /* Check for purposeful right to left motion. */
              if (!pm_detected) {
                 t2 = t_rasen_was_act(&sensor[(i+num_sensors-1)%num_sensors],
                                      t1, PM_TIME_WINDOW);
                 index = 1;
              if (t2 == TIME_INVALID) {
                 t2 = t_rasen_was_act(&sensor[(i+num_sensors-2)%num_sensors],
                                     t1, PM_TIME_WINDOW);
                 index = 2;
                 }
                 if (t2 != TIME_INVALID) {
#ifdef DEBUG
printf("Increasing sen[%d] for r to l PM\n", i);
#endif
                    increase_weight(&sensor[i], PM_INCW_K1, PM_MINC_TYPE);
                    t3 = t_rasen_was_act(&sensor[(i+num_sensors-index-1)%num_sensors
],
                                           t2, PM_TIME_WINDOW);
                    if (t3 == TIME_INVALID)
                       t3 = t_rasen_was_act(&sensor[(i+num_sensors-index-2)%num_sens
ors],
                                       t2, PM_TIME_WINDOW);
                    if (t3 != TIME_INVALID) {
#ifdef DEBUG
printf("Increasing sen[%d] again for r to l PM\n", i);
#endif
                       increase_weight(&sensor[i], PM_INCW_K2, PM_MINC_TYPE);
                       pm_detected = TRUE;
                       }
                    } /* end if */
                 } /* end if */
              } /* end if */
              if (pm_detected) {
                 int beepval;
                 if (noise == TRUE)
                    outp(0x61, ((beepval = inp(0x61)) | 3));
                 printf("BEEP-PM\n");
                 if (noise == TRUE)
                    outp(0x61, beepval);
                 pm_detected = FALSE;
                 }
           } /* end for */
} /* end adjw_ra_motion */

void adjw_a_motion(sensor, num_sensors, ct, noise)
a_infoptr       sensor;
int             num_sensors;
t_type          ct;
boolean         noise;
{
   int          i;
   int          index;
   t_type       t1, t2, t3;
   boolean      pm_detected = FALSE;

   for (i = 0; i < num_sensors; i++) {
      t1 = 0;
      t2 = 0;
      t3 = 0;
      if (sensor[i].cactive == ACTIVE) {
         /* Add to current weight if adjacent sensor is also on.          */
         if (sensor[(i+1)%num_sensors].cactive == ACTIVE)
            increase_weight(&sensor[i], PM_INCW_K0, PM_AINC_TYPE);
         if (sensor[(i+num_sensors-1)%num_sensors].cactive == ACTIVE)
```

```
            increase_weight(&sensor[i], PM_INCW_K0, PM_AINC_TYPE);

         t1 = ct;
         /* Check for purposeful left to right motion. */
         t2 = t_asen_was_act(&sensor[(i+1)%num_sensors], t1, PM_TIME_WINDOW);
         index = 1;
         if (t2 == TIME_INVALID) {
            t2 = t_asen_was_act(&sensor[(i+2)%num_sensors], t1, PM_TIME_WINDOW)
;
            index = 2;
            }
         if (t2 != TIME_INVALID) {
#ifdef DEBUG
printf("Increasing sen[%d] for l to r PM\n", i);
#endif
            increase_weight(&sensor[i], PM_INCW_K1, PM_MINC_TYPE);
            t3 = t_asen_was_act(&sensor[(i+index+1)%num_sensors],
                                  t2, PM_TIME_WINDOW);
            if (t3 == TIME_INVALID)
               t3 = t_asen_was_act(&sensor[(i+index+2)%num_sensors],
                                     t2, PM_TIME_WINDOW);
            if (t3 != TIME_INVALID) {
#ifdef DEBUG
printf("Increasing sen[%d] again for l to r PM\n", i);
#endif
               increase_weight(&sensor[i], PM_INCW_K2, PM_MINC_TYPE);
               pm_detected = TRUE;
               }
            } /* end if */

         /* Check for purposeful right to left motion. */
         if (!pm_detected) {
            t2 = t_asen_was_act(&sensor[(i+num_sensors-1)%num_sensors],
                                  t1, PM_TIME_WINDOW);
            index = 1;
         if (t2 == TIME_INVALID) {
            t2 = t_asen_was_act(&sensor[(i+num_sensors-2)%num_sensors],
                                 t1, PM_TIME_WINDOW);
            index = 2;
            }
            if (t2 != TIME_INVALID) {
#ifdef DEBUG
printf("Increasing sen[%d] for r to l PM\n", i);
#endif
               increase_weight(&sensor[i], PM_INCW_K1, PM_MINC_TYPE);
               t3 = t_asen_was_act(&sensor[(i+num_sensors-index-1)%num_sensors]
,
                                     t2, PM_TIME_WINDOW);
               if (t3 == TIME_INVALID)
                  t3 = t_asen_was_act(&sensor[(i+num_sensors-index-2)%num_senso
rs],
                                 t2, PM_TIME_WINDOW);
               if (t3 != TIME_INVALID) {
#ifdef DEBUG
printf("Increasing sen[%d] again for r to l PM\n", i);
#endif
                  increase_weight(&sensor[i], PM_INCW_K2, PM_MINC_TYPE);
                  pm_detected = TRUE;
                  }
               } /* end if */
            } /* end if */
         } /* end if */
         if (pm_detected) {
            int beepval;
            if (noise == TRUE)
               outp(0x61, ((beepval = inp(0x61)) | 3));
            printf("BEEP-PM\n");
            if (noise == TRUE)
               outp(0x61, beepval);
            pm_detected = FALSE;
            }
      } /* end for */
} /* end adjw_a_motion */
```

```
/**************************************************************************\
*                            increase_weight                              *
****************************************************************************
*                                                                          *
* Function:     This function is used to increase the weight of a sensor  *
*               when some type of patterned motion is detected.  The weight *
*               is increased by adding or multiplying (depending on 'c') to *
*               the sensor pointed to by tempptr by 'amt'.                 *
*                                                                          *
* Input:        increase_weight(                                           *
*                      a_infoptr tempptr;   pointer to sensor to increase  *
*                                           the weight of.                 *
*                      int       amt;       amount to add or multiply by.  *
*                      char      c;         '+' = add, '*' = multiply.     *
*                      );                                                  *
*                                                                          *
* Output:       Updates the weight of a sensor in the blackboard.          *
*                                                                          *
* Globals:      None.                                                      *
*                                                                          *
* Edit History: 03/01/91 - Written by Richard P. Smurlo.                   *
*                                                                          *
\**************************************************************************/
void increase_weight(tempptr, amt, c)
a_infoptr       tempptr;
int             amt;
char            c;
{
   switch(c) {
      case '+':  (* tempptr).cweight += amt;
                 (* tempptr).cactive = ACTIVE;
                 break;
      case '*':  (* tempptr).cweight *= amt;
                 (* tempptr).cactive = ACTIVE;
                 break;
      default:   printf("ERROR:  illegal character parameter in increase_weight
\n");
      }
}

/**************************************************************************\
*                            decrease_weight                              *
****************************************************************************
*                                                                          *
* Function:     This function is used to decrease the weight of a sensor  *
*               when some type of patterned motion is detected.  The weight *
*               is decreased by subtracting of dividing (depending on 'c') to*
*               the sensor pointed to by tempptr by 'amt'.                 *
*                                                                          *
* Input:        decrease_weight(                                           *
*                      a_infoptr tempptr;   pointer to sensor to decrease  *
*                                           the weight of.                 *
*                      int       amt;       amount to subtract or divide by.*
*                      char      c;         '-' = subtract, '/' = divide.  *
*                      );                                                  *
*                                                                          *
* Output:       Updates the weight of a sensor in the blackboard.          *
*                                                                          *
* Globals:      None.                                                      *
*                                                                          *
* Edit History: 03/01/91 - Written by Richard P. Smurlo.                   *
*                                                                          *
\**************************************************************************/
void decrease_weight(tempptr, amt, c)
a_infoptr       tempptr;
int             amt;
char            c;
{
   switch(c) {
      case '-':  (* tempptr).cweight -= amt;
                 (* tempptr).cactive = ACTIVE;
                 break;
```

Apr 04 1991 09:15:34 support.c Page 13

```
        case '/':  (* tempptr).cweight /= amt;
                   (* tempptr).cactive = ACTIVE;
                   break;
        default:   printf("ERROR:  illegal character parameter in decrease_weight
\n");
        }
}
```

Apr 04 1991 09:15:34 timestmp.c Page 1

```
/*************************************************************************
*                              timestmp.c                                *
**************************************************************************
*                                                                        *
* Description:  To be included by programs that want to make use of the  *
*               system timer located at 0x46c.  This timer is incremented *
*               at a frequency of 18.20648193 Hz and is reset when the DOS *
*               time changes days (at 12 Midnight).  The functions below  *
*               perform basic functions based on this 24 hour timer.     *
*                                                                        *
* Functions Included:                                                    *
*                                                                        *
*               DECR_TIME(t,x) - in timer.h                              *
*               INCR_TIME(t,x) - in timer.h                              *
*                                                                        *
*                                                                        *
*                                                                        *
* Edit History: 03/12/91 - Written by Richard P. Smurlo.                 *
*                                                                        *
*************************************************************************/

#include "headers\sysdefs.h"
#include "headers\timestmp.h"
```

Apr 04 1991 09:15:34 timestmp.c Page 2

```

/************************************************************************\
*                              t1_b_t2_a_t3                              *
**************************************************************************
*                                                                        *
* Function:     This function returns TRUE if t2 <= t1 <= t3, returns FALSE *
*               otherwise.  Returns TIME_INVALID if any of three times are *
*               greater than TIMER_LONG_MAX (illegal value).             *
                                                                         *
*                                                                        *
*               Note:  it is assumed that t2 <= t3.  If t2 is greater than t3*
*                      then it is assumed that t2 is of the previous day, *
*                      thus forcing t2 to be earlier in time than t3.    *
*                                                                        *
* Input:        t1_b_t2_a_t3(                                            *
*                      t1;      self explanatory.                        *
*                      t2;         "      "                              *
*                      t3;         "      "                              *
*                      )                                                 *
* Output:       Returns TRUE if t2 < t1 < t3, FALSE otherwise.  Returns -1 *
*               if t1, t2, or t3 are > TIMER_LONG_MAX.                   *
*                                                                        *
* Globals:      None.                                                    *
*                                                                        *
* Edit History: 03/12/91 - Written by Richard P. Smurlo.                 *
*                                                                        *
\************************************************************************/
boolean t1_b_t2_a_t3(t1, t2, t3)
t_type  t1;
t_type  t2;
t_type  t3;
{
    if ((t1 > TIMER_LONG_MAX) ||
        (t2 > TIMER_LONG_MAX) ||
        (t3 > TIMER_LONG_MAX)) {
        printf("ERROR: t1_b_t2_a_t3 algorithm\n");
        return(FALSE);
        }
    else {
        if (t2 <= t3) {
            if ( (t1 > t2) && (t1 < t3) )
                return(TRUE);
            else
                return(FALSE);
            }
        else { /* assume t2 is from previous day */
            if ( (t1 > t2) || (t1 < t3) )
                return(TRUE);
            else
                return(FALSE);
            }
        }
}
```

```c
/*************************************************************************
 *                              fixedsen.c                               *
 *************************************************************************
 * This file contains routines for dealing with fixed sensors.          *
 *                                                                       *
 *************************************************************************/

#include <stdio.h>
#include <stdlib.h>
#include <io.h>
#include <malloc.h>
#include <fcntl.h>
#include <sys/types.h>
#include <sys/stat.h>
#include <ega.h>
#include <event.h>
#include <menu.h>

#include "headers/ibmio.h"

static SENSOR_TAB *ctab = NULL;

/*************************************************************************
 *                          load_fixed_sensors                           *
 *************************************************************************
 * Load the fixed sensor information from a file.                        *
 *                                                                       *
 * Call with:                                                            *
 *      name    = (char *) name of file to load information from         *
 *                                                                       *
 * Returns:                                                              *
 *      pointer to item of type SENSOR_TAB, or NULL if unable to         *
 *      load the sensor table                                            *
 *                                                                       *
 *************************************************************************/
SENSOR_TAB *load_fixed_sensors(name, map_ptr)
char *name;
map *map_ptr;
{
        byte            mask;
        int             fd;
        unsigned int    ii, jj, kk;
        SENSOR_HEADER   header;
        SENSOR_TAB      *tab;
        FIXED_SENSOR    *fs;
        POLYGON         *poly;
        void            fixed_draw_line();

        if ((fd = open(name, O_RDONLY|O_BINARY)) < 0)
                return (NULL);
        if (read(fd, (char *) &header, sizeof(SENSOR_HEADER)) != (sizeof(SENSOR_HEADER))) {
            gstatus("%s: bad format -->", name); mgetkey();
            return (NULL);
        }
        if (header.sensor_magic != SENSOR_MAGIC) {
            gstatus("%s: bad format -->",name); mgetkey();
            return (NULL);
        }

        tab = (SENSOR_TAB *) malloc(sizeof(SENSOR_TAB));
        if (tab == NULL) {
            gstatus("Can't alloc space for table -->"); mgetkey();
            return (NULL);
        }
        tab->nsensors = header.nsensors;
        tab->squaresize = header.squaresize;

        tab->sensors = (FIXED_SENSOR *) malloc(sizeof(FIXED_SENSOR) * tab->nsensors);
        if (tab->sensors == NULL) {
            gstatus("Can't alloc space for table -->"); mgetkey();
            return (NULL);
```

```c
        }

        /* Read in the sensor and polygon information */
        for (ii = 0; ii < tab->nsensors; ii++) {
            fs = &tab->sensors[ii];

            /* Get information about the sensor */
            read(fd, (char *) &fs->sensor_type, sizeof(USHORT));
            read(fd, (char *) &fs->sensor_id, sizeof(USHORT));
            read(fd, (char *) &fs->sensor_status, sizeof(USHORT));
            read(fd, (char *) &fs->x, sizeof(USHORT));
            read(fd, (char *) &fs->y, sizeof(USHORT));
            read(fd, (char *) &fs->npolygons, sizeof(USHORT));

            /* Allocate space for each one of the polygons */
            fs->polys = (POLYGON *) malloc(sizeof(POLYGON) * fs->npolygons);
            if (fs->polys == NULL) {
                gstatus("Can't alloc space for table -->"); mgetkey();
                return (NULL);
            }

            /* Sensor information loaded, now get the polygon descriptions */

            for (jj = 0; jj < fs->npolygons; jj++) {

                /* Get the number of points */
                read(fd, (char *) &fs->polys[jj].npoints, sizeof(USHORT));
                fs->polys[jj].points = (XY_PAIR *) malloc(sizeof(XY_PAIR) * fs->polys[jj].npoints);
                if (fs->polys[jj].points == NULL) {
                    gstatus("Can't alloc space for table -->"); mgetkey();
                    return (NULL);
                }
                read(fd, (char *) fs->polys[jj].points, sizeof(XY_PAIR) * fs->polys[jj].npoints);
            }
        }

        tab->mem_ptr = NULL;
#if 1
        /* Allocate space for fixed sensor bitmap overlay.  Then draw the
         * bits into the bitmap.
         */
        tab->width = map_ptr->width;
        tab->height = map_ptr->height;
        tab->mem_ptr = calloc(tab->width, tab->height);
        if (tab->mem_ptr == NULL) {
                gstatus("Can't allocate space for fixed sensor overlay -->");
                mgetkey();
                return (tab);
        }
        ctab = tab;

        /* Draw each of the polygons into the sensor overlay, then fill
         * the polygons with the current mask value.  The mask value is
         * the sensor_id portion of the structure and is always a power
         * of 2.  This value is ORed into the table so that
         * polygons can have overlapping coverage areas.
         */
        for (ii = 0; ii < tab->nsensors; ii++) {
            fs = &tab->sensors[ii];
            mask = fs->sensor_id;
            for (jj = 0; jj < fs->npolygons; jj++) {
                poly = &fs->polys[jj];
                for (kk = 0; kk < poly->npoints-1; kk++) {
                    fixed_draw_line(poly->points[kk].x,poly->points[kk].y,
                                    poly->points[kk+1].x,poly->points[kk+1].y,
                                    mask);
                }
                fixed_draw_line(poly->points[kk].x,poly->points[kk].y,
                                poly->points[0].x,poly->points[0].y,
                                mask);
                FillPolygon(poly, fixed_draw_line, mask);
```

```
                }
        }
#endif
        return (tab);
}


/*******************************************************************
 *                          fixed_draw_line                        *
 *******************************************************************
 * Draw a line in the fixed sensor overlay bitmap.  Depends on the *
 * current map being pointed to by ctab.                           *
 *                                                                 *
 * Call with:                                                      *
 *      x1, y1, x2, y2  = (int) endpoints of line to be drawn      *
 *                                                                 *
 *******************************************************************/
void fixed_draw_line(x1, y1, x2, y2, bitmask)
int x1, y1, x2, y2;
byte bitmask;
{
        LINE_TYPE       line_struc;

        init_line(&line_struc, x1, y1, x2, y2);
        do {
            floor(line_struc.x, line_struc.y, ctab) |= bitmask;
        } while (get_line_point(&line_struc) == 0);
        floor(x2, y2, ctab) |= bitmask;
}


/*******************************************************************
 *                         save_fixed_sensors                      *
 *******************************************************************
 * Save the given fixed sensor map to the given file name.         *
 *                                                                 *
 * Call with:                                                      *
 *      name    = (char *) name of file to save info. to           *
 *      tab     = (SENSOR_TAB *) fixed sensor table                *
 *                                                                 *
 * Returns:                                                        *
 *      0 if successful                                            *
 *      -1 if an error                                             *
 *                                                                 *
 *******************************************************************/
int save_fixed_sensors(name, tab)
char *name;
SENSOR_TAB *tab;
{
        int             fd;
        unsigned int    ii, jj;
        SENSOR_HEADER   header;
        FIXED_SENSOR    *fs;

        if (tab == NULL)
            return (OK);

        if ((fd = open(name, O_WRONLY|O_CREAT|O_TRUNC|O_BINARY, S_IREAD|S_IWRIT
E)) < 0) {
            gstatus("Can't save information to %s -->"); mgetkey();
            return (-1);
        }
        header.sensor_magic = SENSOR_MAGIC;
        header.nsensors = tab->nsensors;
        header.squaresize = tab->squaresize;
        write(fd, (char *) &header, sizeof(SENSOR_HEADER));

        for (ii = 0; ii < tab->nsensors; ii++) {
            fs = &tab->sensors[ii];

            write(fd, (char *) &fs->sensor_type, sizeof(USHORT));
            write(fd, (char *) &fs->sensor_id, sizeof(USHORT));
            fs->sensor_status = 0;
```

```
            write(fd, (char *) &fs->sensor_status, sizeof(USHORT));
            write(fd, (char *) &fs->x, sizeof(USHORT));
            write(fd, (char *) &fs->y, sizeof(USHORT));
            write(fd, (char *) &fs->npolygons, sizeof(USHORT));

            for (jj = 0; jj < fs->npolygons; jj++) {
                write(fd, (char *) &fs->polys[jj].npoints, sizeof(USHORT));
                write(fd, (char *) fs->polys[jj].points, sizeof(XY_PAIR) * fs->
polys[jj].npoints);
            }
        }
        return (0);
}



/*******************************************************************
 *                         free_fixed_sensors                      *
 *******************************************************************
 * Free up the memory occupied by the fixed sensor table.          *
 *                                                                 *
 * Call with:                                                      *
 *      tab     = (SENSOR_TAB *) sensor table to free up           *
 *                                                                 *
 *******************************************************************/
void free_fixed_sensors(tab)
SENSOR_TAB *tab;
{
        unsigned int    ii, jj;
        FIXED_SENSOR    *fs;

        if (tab == NULL)
            return;
        for (ii = 0; ii < tab->nsensors; ii++) {
            fs = &tab->sensors[ii];
            for (jj = 0; jj < fs->npolygons; jj++)
                free(fs->polys[jj].points);
            free(fs->polys);
        }
        if (tab->mem_ptr != NULL)
            free(tab->mem_ptr);
        free(tab->sensors);
        free(tab);
}



/*******************************************************************
 *                        draw_all_fixed_sensors                   *
 *******************************************************************
 * Draw the coverage area of each fixed sensor.                    *
 *                                                                 *
 * Call with:                                                      *
 *      map_ptr = (map *) pointer to current map                   *
 *      tab     = (SENSOR_TAB *) fixed sensor table                *
 *                                                                 *
 *******************************************************************/
void draw_all_fixed_sensors(map_ptr, tab)
map *map_ptr;
SENSOR_TAB *tab;
{
        int             cx, cy;
        unsigned int    ii;
        FIXED_SENSOR    *fs;

        if (tab == NULL)
            return;
        for (ii = 0; ii < tab->nsensors; ii++) {
            fs = &tab->sensors[ii];
            draw_fixed_sensor(map_ptr, fs, fs->sensor_id+2);

            /* Draw a circle indicating the sensor's physical location */
            cx = map_ptr->xoff + (fs->x - map_ptr->lx)*map_ptr->scale + map_ptr
```

```
->scale/2;
            cy = map_ptr->yoff - (fs->y - map_ptr->ly)*map_ptr->scale - map_ptr
->scale/2;
            gpcolor(RED);
            gpmove(cx, cy);
            gpcir(map_ptr->scale*2);
        }
}


/*********************************************************************
 *                          draw_fixed_sensor                        *
 *********************************************************************
 * Draw the coverage area of a fixed sensor.                         *
 *                                                                   *
 * Call with:                                                        *
 *      map_ptr = (map *) pointer to current map                     *
 *      fs      = (FIXED_SENSOR *) fixed sensor to draw              *
 *      color   = (int) color to draw the sensor in                  *
 *                                                                   *
 *********************************************************************/
void draw_fixed_sensor(map_ptr, fs, color)
map *map_ptr;
FIXED_SENSOR *fs;
int color;
{
        int             x1, y1, x2, y2;
        unsigned int    jj, kk;
        POLYGON         *pg;

        if (fs == NULL)
                return;
        gpcolor(color);
        for (jj = 0; jj < fs->npolygons; jj++) {
                pg = &fs->polys[jj];
                for (kk = 1; kk < pg->npoints; kk++) {
#if 0
                        map_draw_line(pg->points[kk-1].x, pg->points[kk-1].y,
                                      pg->points[kk].x, pg->points[kk].y, color);
#else
                        x1 = map_ptr->xoff + map_ptr->scale*(pg->points[kk-1].x - m
ap_ptr->lx) + map_ptr->scale/2;
                        y1 = map_ptr->yoff - map_ptr->scale*(pg->points[kk-1].y - m
ap_ptr->ly) - map_ptr->scale/2;
                        x2 = map_ptr->xoff + map_ptr->scale*(pg->points[kk].x - map
_ptr->lx) + map_ptr->scale/2;
                        y2 = map_ptr->yoff - map_ptr->scale*(pg->points[kk].y - map
_ptr->ly) - map_ptr->scale/2;
                        gpmove(x1, y1);
                        gpline(x2, y2);
#endif
                }

                /* Connect the last point to the first point */
#if 0
                map_draw_line(pg->points[kk-1].x, pg->points[kk-1].y,
                              pg->points[0].x, pg->points[0].y, color);
#else
                x1 = map_ptr->xoff + map_ptr->scale*(pg->points[kk-1].x - map_p
tr->lx) + map_ptr->scale/2;
                y1 = map_ptr->yoff - map_ptr->scale*(pg->points[kk-1].y - map_p
tr->ly) - map_ptr->scale/2;
                x2 = map_ptr->xoff + map_ptr->scale*(pg->points[0].x - map_ptr-
>lx) + map_ptr->scale/2;
                y2 = map_ptr->yoff - map_ptr->scale*(pg->points[0].y - map_ptr-
>ly) - map_ptr->scale/2;
                gpmove(x1, y1);
                gpline(x2, y2);
#endif
        }

#if 0
        /* Draw a circle indicating the sensor's physical location */
```

```
        cx = map_ptr->xoff + (fs->x - map_ptr->lx)*map_ptr->scale + map_ptr->sc
ale/2;
        cy = map_ptr->yoff - (fs->y - map_ptr->ly)*map_ptr->scale - map_ptr->sc
ale/2;
        gpcolor(RED);
        gpmove(cx, cy);
        gpcir(map_ptr->scale*2);
#endif
}


/*********************************************************************
 *                          add_fixed_sensor                         *
 *********************************************************************
 * Add a sensor to the fixed sensor array.  Prompts the user for the *
 * sensor type, ID and location.  Then allows the user to draw the   *
 * coverage polygon on the screen.                                   *
 *                                                                   *
 *********************************************************************/
SENSOR_TAB *add_fixed_sensor(map_ptr, tab)
map  *map_ptr;
SENSOR_TAB *tab;
{
    char                str[80];
    int                 scale, x, y;
    int                 sensor_x, sensor_y;
    int                 npoints;
    int                 startx, starty;
    int                 banding;
    int                 done = NO;
    int                 cx, cy;
    USHORT              type, id;
    MAPC_STRUCT         mapc;
    XY_PAIR             *points;
    FIXED_SENSOR        *fs;

    mouse_off();

    scale = map_ptr->scale;
    DrawSFloorMap(map_ptr, WHITE, BLUE, GREEN);


    /* Get the sensor type first.  Currently, this is just a number that
     * the user has to know.  Eventually the user will be able to select
     * a sensor by name, which will then be translated automatically to
     * a sensor number.
     */
    if (ggets(str, "Enter sensor type (0-255) -->", "") == NULL) {
        Clear_Line(25);
        mouse_on();
        return (tab);
    }
    type = atoi(str);

    if (ggets(str, "Enter sensor ID (0-255) -->", "") == NULL) {
        Clear_Line(25);
        mouse_on();
        return (tab);
    }
    id = atoi(str);

    PutString(24,1,"Position cursor at X-Y location of sensor, then hit mouse b
utton");

    /* initialize the map cursor routines */
    mouse_on();
    mapc_Init(&mapc, map_ptr, LGREEN, IWHITE);

    if (map_get_point(&mapc, &sensor_x, &sensor_y, YES) == -1) {
        Clear_Line(24);
        mapc_deinit(&mapc);
        return (tab);
    }
```

```
        Clear_Line(24);
        /* Draw the location of the sensor on the screen as a circle */
        mapc_off(&mapc);
        cx = map_ptr->xoff + (sensor_x - map_ptr->lx)*scale + scale/2;
        cy = map_ptr->yoff - (sensor_y - map_ptr->ly)*scale - scale/2;
        gpcolor(RED);
        gpmove(cx, cy);
        gpcir(scale*2);

        points = (XY_PAIR *) malloc(sizeof(XY_PAIR) * 100);
        if (points == NULL) {
            gstatus("Can't alloc space for polygon points -->"); mgetkey();
            return (tab);
        }
        PutString(24,1,"Draw the coverage polygon.  Terminate with ESC.");

        mapc_on(&mapc);                 /* turn cursor back on */
        banding = NO;
        npoints = 0;
        while (!done) {
            /* Move the cursor around until the user either hits a mouse
             * button or the ESC or F10 keys.
             */
            if (map_get_point(&mapc, &x, &y, YES) == -1) {
                    done = YES;             /* hit ESC key, so we're done */
                    break;
            }
            if (!banding) {
                points[npoints].x = x;
                points[npoints++].y = y;
                startx = x, starty = y;
                start_banding(&mapc, mapc.mapx, mapc.mapy);
                banding = YES;
            }
            else {
                stop_banding(&mapc);
                points[npoints].x = x;
                points[npoints++].y = y;
                mapc_off(&mapc);
                map_draw_line(startx, starty, x, y, RED);
                startx = x;
                starty = y;
                mapc_on(&mapc);
                start_banding(&mapc, mapc.mapx, mapc.mapy);
            }
        }
        mapc_deinit(&mapc);
        mouse_off();
        Clear_Line(24);
        Clear_Line(25);
        mouse_on();

        /* If no points entered (or only 1) then just return the default table */
        if (npoints < 2)
            return (tab);

        /* Make the sensor table if it hasn't been made already */
        if (tab == NULL) {
            tab = (SENSOR_TAB *) malloc(sizeof(SENSOR_TAB));
            tab->nsensors = 1;
            tab->squaresize = map_ptr->squaresize;
            tab->sensors = (FIXED_SENSOR *) malloc(sizeof(FIXED_SENSOR));
        }
        else {      /* Table already exists, expand it by one sensor */
            tab->nsensors++;
            tab->sensors = realloc(tab->sensors, sizeof(FIXED_SENSOR) * tab->nsenso
rs);
        }
        if (tab->sensors == NULL) {
            gstatus("Can't alloc space for sensors -->"); mgetkey();
            return (tab);
```

```
        }

        /* Point to the current sensor */
        fs = &tab->sensors[tab->nsensors-1];
        fs->sensor_type = type;
        fs->sensor_id = id;
        fs->sensor_status = 0;
        fs->x = sensor_x, fs->y = sensor_y;
        fs->npolygons = 1;
        fs->polys = (POLYGON *) malloc(sizeof(POLYGON) * fs->npolygons);
        if (fs->polys == NULL) {
            gstatus("Can't alloc space for polygons -->"); mgetkey();
            return (tab);
        }
        fs->polys[0].npoints = npoints;
        points = realloc(points, sizeof(XY_PAIR) * npoints);
        if (points == NULL) {
            gstatus("Can't realloc space for points -->"); mgetkey();
            return (tab);
        }
        fs->polys[0].points = points;
        return (tab);
}
```

```
/*
 * Generalized Polygon Fill
 *
 * Implementation by Curt McDowell,
 * Carnegie Mellon University,
 * for Computer Graphics (15-462),
 * November 13, 1988
 *
 * Takes a raster and a polygon.
 * The polygon is filled within the raster
 * The polygonal area is clipped to the raster bounds.
 * A fill pattern must be specified (by another raster).
 * Current drawing mode is honored (three possibilities).
 */

#include <stdio.h>              /* needed for NULL definition */
#include <malloc.h>

#include "headers/ibmio.h"

/* Define macros used here */
#define ABS(x)   ((x) < 0 ? -(x) : (x))
#define SGN(x)   ((x) < 0 ? (-1) : (1))


struct edge {
    struct edge *next;
    int yTop, yBot;
    int xNowWhole, xNowNum, xNowDen, xNowDir;
    int xNowNumStep;
};

#define MAXVERTICAL     1024

static void FillEdges(p, edgeTable)
POLYGON *p;
struct edge *edgeTable[];
{
    int i, j, n;

    n = p->npoints;                     /* get number of points */

    for (i = 0; i < MAXVERTICAL; i++)
        edgeTable[i] = NULL;

    for (i = 0; i < n; i++) {
        XY_PAIR *p1, *p2, *p3;
        struct edge *e;

        p1 = &p->points[i];
        p2 = &p->points[(i+1)%n];       /* get next point (w wrap-around) */

        if (p1->y == p2->y)
            continue;   /* Skip horiz. edges */

        /* Find next vertex not level with p2 */
        for (j = (i + 2) % n; ; j = (j + 1) % n) {
            p3 = &p->points[j];
            if (p2->y != p3->y)
                break;
        }

        e = (struct edge *) malloc(sizeof(struct edge));
        e->xNowNumStep = ABS((int)p1->x - (int)p2->x);
        if (p2->y > p1->y) {
            e->yTop = p1->y;
            e->yBot = p2->y;
            e->xNowWhole = p1->x;
            e->xNowDir = SGN((int)p2->x - (int)p1->x);
            e->xNowDen = e->yBot - e->yTop;
            /*lint -e702 */
            e->xNowNum = (e->xNowDen >> 1);
            /*lint +e702 */
```

```
            if (p3->y > p2->y)
                e->yBot--;
        } else {
            e->yTop = p2->y;
            e->yBot = p1->y;
            e->xNowWhole = p2->x;
            e->xNowDir = SGN((int)p1->x - (int)p2->x);
            e->xNowDen = e->yBot - e->yTop;
            /*lint -e702 */
            e->xNowNum = (e->xNowDen >> 1);
            /*lint +e702 */
            if (p3->y < p2->y) {
                e->yTop++;
                e->xNowNum += e->xNowNumStep;
                while (e->xNowNum >= e->xNowDen) {
                    e->xNowWhole += e->xNowDir;
                    e->xNowNum -= e->xNowDen;
                }
            }
        }
        e->next = edgeTable[e->yTop];
        edgeTable[e->yTop] = e;
    }
}

/*
 * UpdateActive first removes any edges which curY has entirely
 * passed by.  The removed edges are freed.
 * It then removes any edges from the edge table at curY and
 * places them on the active list.
 */

static struct edge *UpdateActive(active, edgeTable, curY)
struct edge *active, *edgeTable[];
int curY;
{
    struct edge *e, **ep;

    for (ep = &active, e = *ep; e != NULL; e = *ep)
        if (e->yBot < curY) {
            *ep = e->next;
            free(e);
        } else
            ep = &e->next;

    *ep = edgeTable[curY];
    return active;
}

/*
 * DrawRuns first uses an insertion sort to order the X
 * coordinates of each active edge.  It updates the X coordinates
 * for each edge as it does this.
 * Then it draws a run between each pair of coordinates,
 * using the specified fill pattern.
 *
 * This routine is very slow and it would not be that
 * difficult to speed it way up.
 */

static void DrawRuns(active, curY, draw_line, color)
struct edge *active;
int curY;
int (*draw_line)();
int color;
{
    struct edge *e;
    static int xCoords[100];
    int numCoords = 0;
    int i;

    for (e = active; e != NULL; e = e->next) {
        /*lint -e727 */
```

Apr 04 1991 09:12:04 polyfill.c Page 3

```
        for (i = numCoords; i > 0 &&
          xCoords[i - 1] > e->xNowWhole; i--)
            xCoords[i] = xCoords[i - 1];
        /*lint +e727 */
        xCoords[i] = e->xNowWhole;
        numCoords++;
        e->xNowNum += e->xNowNumStep;
        while (e->xNowNum >= e->xNowDen) {
            e->xNowWhole += e->xNowDir;
            e->xNowNum -= e->xNowDen;
        }
    }
    if (numCoords % 2)  /* Protect from degenerate polygons */
        xCoords[numCoords] = xCoords[numCoords - 1],
        numCoords++;

    for (i = 0; i < numCoords; i += 2) {
        /* Here's the graphics-dependent part. */
        /* All we need is to draw a horizontal line */
        /* from (xCoords[i], curY) to (xCoords[i + 1], curY). */
        /* Example: I want to fill the polygon with a pattern. */
        /* (This example is very slow because it's done point by */
        /* point, thus not taking advantage of the potential for */
        /* speed afforded by the scan conversion...) */

        (void)(*draw_line)(xCoords[i], curY, xCoords[i+1], curY, color);
    }
}

/* FillPolygon
 * Fill a polygon given the vertices.  Fills any convex or concave polygon
 * without holes (currently there is no way to represent holes in the
 * polygon structure).
 *
 * Call with:
 *      p          = (POLYGON *) pointer to polygon structure
 *      draw_line  = (int (*)()) pointer to function to call to draw a line
 *                       The function will be called with
 *                               draw_line(x1, y, x2, y)
 */

void FillPolygon(p, draw_line, color)
POLYGON *p;
int (*draw_line)();
int color;
{
    static struct edge *edgeTable[MAXVERTICAL];
    struct edge *active;
    int curY;

    FillEdges(p, edgeTable);

    for (curY = 0; edgeTable[curY] == NULL; curY++)
        if (curY == MAXVERTICAL - 1)
            return;     /* No edges in polygon */

    for (active = NULL; (active = UpdateActive(active,
      edgeTable, curY)) != NULL; curY++)
        DrawRuns(active, curY, draw_line, color);
}
```

Apr 04 1991 09:24:24 pathplan.c Page 33

```
                /* If a packet is available and it is a dead-reckoning
                 * packet, then get the information and return.
                 */
                if (status == OK && pack.data[0] == '6') {
                        sscanf(pack.data, "%*1x%41x%41x%41x", &robotx, &roboty,
&robothdg);
                        robart.x = ((robotx+5L)/10L + map_ptr->squaresize/2) /
map_ptr->squaresize;
                        robart.y = ((roboty+5L)/10L + map_ptr->squaresize/2) /
map_ptr->squaresize;
                        robart.dir = (int) ((robothdg + 50L) / 100L);
                        return (OK);
                }
                else if (status == ABORT || status == ERROR)
                        return (OK);
                else
                        start = mstime();       /* restart counter */
        }
        start = mstime();               /* start timeout now */
        while (mstime() - start < 500L) {
                status = wait_packet(&pack, NO_WAIT);   /* packet available? */
                /* If a packet is available and it is a dead-reckoning
                 * packet, then get the information and return.
                 */
                if (status == OK && pack.data[0] == '6') {
                        Decode_Dead_Reckoning(&pack, &x, &y, &hdg);
                        robotx = x, roboty = y, robothdg = hdg;
                        robart.x = ((robotx+5L)/10L + map_ptr->squaresize/2) /
map_ptr->squaresize;
                        robart.y = ((roboty+5L)/10L + map_ptr->squaresize/2) /
map_ptr->squaresize;
                        robart.dir = (int) ((robothdg + 50L) / 100L);
                        return (OK);
                }
                else if (status == ABORT || status == ERROR)
                        return (OK);
                else
                        start = mstime();       /* restart counter */
        }

        return (OK);
}


check_dock()
{
        if (docked) {
                errorbox("%s is docked. Use the 'Undock' selection.", robot_nam
e);
                return (ERROR);
        }
        return (OK);
}
```

```
/************************************************************************
 *                              sonplot.c                               *
 ************************************************************************
 * Contains procedures that implement sonar data plotting and position  *
 * estimation (both building the database and correcting a dead         *
 * reckoned position).                                                   *
 ************************************************************************/

#include <stdio.h>
#include <math.h>
#include <ega.h>
#include <menu.h>
#include <event.h>

#include "headers/ibmio.h"

#define IR_NUM  4

#ifndef PI
#define PI    3.14159265358979323846
#endif

extern int robot_port;

char *malloc();
void sonhelp(), pos_head();

/* Robart's starting location in map coordinates and dead reck. position.
 * All info in units of inches.
 */
extern drType robart;

/* Map direction defines the number of degrees that magnetic north is from
 * map north (pointing straight up the video screen along the positive y-axis)
 */
#ifdef OLD_COORDINATE_SYSTEM
int map_direction = 270;
#else
int map_direction = 0;
#endif

/* PE Sonar transformation array. The sonar returns are sent in a different
 * order from the order needed by the position estimator. This constant array
 * transforms the returns to their proper place.
 */
int  pEMap[24] = {
     0, 12,  6, 18, 3, 15, 9, 21, 1, 13,  7, 19,
     4, 16, 10, 22, 2, 14, 8, 20, 5, 17, 11, 23};


/* Globals needed for ultrasonic sensor plotting */
int      old_sonar[PE_SONAR_NUM];
int      distances[PE_SONAR_NUM];
int      jitter = 4;                              /* 4" jitter */
int      maxrange = 120;                          /* 120" = 10' */
int      old_x[PE_SONAR_NUM], old_y[PE_SONAR_NUM],
         old_color[PE_SONAR_NUM], age[PE_SONAR_NUM],
         irage[IR_NUM];
int      intruder_bearing, intruder_range;
byte     intrusion = NO,
         irfusion = NO,
         move_head = NO,
         plot_ir_mode = NO,
         plot_sound_mode = NO,
         plot_optical_mode = NO;


byte DecodePEArray();


/************************************************************************
 * SonarPlot will superimpose sonar packets from Robart over a inputed  *
 * floor map. Any sonar returns outside the floor map dimensions are    *
```

```
 * thrown away.                                                         *
 *                                                                      *
 * A sonar is counted only if the corresponding IR sensor is also       *
 * firing.  If the sonar indicates movement but the IR doesn't, the     *
 * point is ignored.  The array irmask[] is used to determine if the    *
 * IR sensor for the given sonar sensor is firing.  A 1 bit in the mask *
 * indicates that the given IR sensor can "see" the same area as the    *
 * sonar sensor (the sonar sensor number, 0 - 23, is used to index the  *
 * array).  Note that the IRs overlap slightly.                         *
 *                                                                      *
 ************************************************************************/
int  SonarPlot(map_ptr)
map  *map_ptr;
{
    byte        param[3];
    char        str[80];
    packet      rec;
    map         sensor_map;
    int         scale;
    int         quit, status, gotpacket;
    unsigned long       start_time;
    static MENU_ITEM function_menu[] = {
        {"Redraw", 0, 100, 0, NULL},
        {"-", 0, 0, 0, NULL},
        {"Quit", 0, 199, 0, NULL},
        {NULL, 0, 0, 0, NULL}
    };

    static MENU_ITEM option_menu[] = {
        {"Intruder mode", 0, 200, 1, (MENU_ITEM *) &intrusion},
        {"IR fusion", 0, 201, 1, (MENU_ITEM *) &irfusion},
        {"Autoscan", 0, 202, 1, (MENU_ITEM *) &move_head},
        {"-", 0, 0, 0, NULL},
        {"Plot IRs", 0, 203, 1, (MENU_ITEM *) &plot_ir_mode},
        {"Plot sound", 0, 204, 1, (MENU_ITEM *) &plot_sound_mode},
        {"Plot optical", 0, 205, 1, (MENU_ITEM *) &plot_optical_mode},
        {NULL, 0, 0, 0, NULL}
    };

    static MENU_ITEM main_menu_bar[] = {
        {"Functions", 0, 1, 0, function_menu},
        {"Options", 0, 2, 0, option_menu},
        {NULL, 0, 0, 0, NULL}
    };
    int         ii, new;
    int         event_occurred;
    long        selection;
    MENU        *pmenu;
    EVENT       evnt;


    mouse_off();
    intrusion = move_head = 0;          /* not in intrusion mode initially */
    Load_Floor_Map(map_ptr, map_ptr->mapName);
    SetScale(map_ptr, 0, gdmaxcol, 15, gdmaxrow-15);
    /* Draw the given floor map with only object visible. */
    DrawSFloorMap(map_ptr, WHITE, BLUE, GREEN);

    /* Setup the PE sonar request packet parameter block to ask for
     * returns on all sensors.
     */
    param[0] = 2;
    param[1] = '1';
    param[2] = 'C';

    /* Get a copy of floor map for sensor returns, set all grid units to zero *
/
    sensor_map.mem_ptr = NULL;
    Copy_Floor_Map(map_ptr, &sensor_map, 0);
    scale = sensor_map.scale;

#if 0
    /* Let the user specify the current robot position and heading */
```

```
    Fix_Point(&sensor_map, &robart.x, &robart.y, WHITE);
#endif
    ScalePoint(&sensor_map, robart.x, robart.y, BLUE);
#if 0
    Clear_Line(1);
    robart.dir = force360(robart.dir);
    sprintf(str, "Enter Robart's heading [%d]: ", robart.dir);
    robart.dir = Get_Value(1, 1, 0, 360, robart.dir, str);
    Clear_Line(1);
#endif

    init_sonar_plotting();

    /* Get initial sonar packet.  If unable to get it, return */
    if (!Get_Packet(&rec, ISON_PTYPE, param, FALSE)) {
        Draw_Status_Line("Couldn't get sonar packet -->");
        mgetKey();
        mouse_on();
        return (FALSE);
    }
    start_time = mstime() - 5000;

    maxrange = (10*12);                 /* initial max range to 10 feet */
    jitter = 4;
    quit = 0;
    sprintf(str, "Heading=%d Jitter=%3d\" Range=%5.2f'", robart.dir,
            jitter, maxrange / 12.0);
    Clear_Line(25);
    PutString(25, 1, str);
    irfusion = NO;
    pmenu = RegisterMenu(main_menu_bar);
    draw_menu(pmenu);
    mouse_on();
    while (!quit) {
        if (mstime() - start_time > 5000) {
                req_packet(ISON_PTYPE, param);
                start_time = mstime();
        }

        /* See if a packet is available.  If so, grab it and process it */
        gotpacket = NO;
        if (wait_packet(&rec, NO_WAIT) == OK) {
                gotpacket = YES;
                /* Plot the sonar information */
                status = plot_sonars(&sensor_map, &rec);

                if (status == YES && intruder_bearing != -1) {
                    sprintf(str, "Intruder heading: %3d", intruder_bearing);
                    mouse_off();
                    Clear_Line(24);
                    PutString(24, 1, str);
                    mouse_on();
                }
        }

        selection = NO_SELECTION;
        event_occurred = NO;
        while (GetEvent(&evnt)) {
                switch(evnt.type & 0xFF00) {
                case KEYBOARD :
                        if(evnt.data == 0x011B || evnt.data == F10) {
                                quit = YES;
                        } else {
                                selection = pull_select_menu(pmenu, 0, 1);
                                event_occurred = YES;

                                if((new = CheckTrap()) != -1)
                                        ii = new;
                        }
                        break;

                case MOUSEINTRAP :
                        ii = evnt.type & 0x00FF;
```

```
                        break;

                case MOUSEOUTTRAP :
                        ii = 0;
                        break;

                case MOUSEBUTTONDOWN :
                        if (ii && (ii & 0x00FF) != 0x00FE && (ii & 0x00F0) == 0
x00F0) {
                                selection = pull_select_menu(pmenu, (ii & 0x000
F), 1);
                                event_occurred = YES;

                                if((new = CheckTrap()) != -1)
                                        ii = new;
                        }
                        break;
                }
        }

        if (event_occurred) {   /* a selection was made */
                close_menu(pmenu);                /* shutdown the pulldown */
                gpviewport(0,0, gdmaxcol, gdmaxrow);
        }

        if (selection == 100) {
                mouse_off();
                gpcolor(BLACK);
                gpmerge(MRPL);
                gpclear(0,0, gdmaxcol, gdmaxrow);
                draw_menu(pmenu);
                DrawSFloorMap(map_ptr, WHITE, BLUE, GREEN);
                ScalePoint(&sensor_map, robart.x, robart.y, BLUE);
                init_sonar_plotting();
                mouse_on();
        }

        if (selection == 199) {         /* Quit? */
                break;
        }
        else if (selection == 200) {    /* toggle intruder mode */
            intrusion ^= 1;
#if 0
            mouse_off();
            if (intrusion)
                alarm_draw(3, 1, " INTRUDER MODE ");
            else {
                normal_draw(3, 1, "               ");
                intruder_bearing = 0;
            }
            mouse_on();
#endif
        }
        else if (selection == 201) {    /* toggle IR fusion */
            irfusion ^= 1;
#if 0
            mouse_off();
            if (irfusion)
                alarm_draw(3, 20, " IR FUSION ");
            else
                normal_draw(3, 20, "           ");
            mouse_on();
#endif
        }
        else if (selection == 202) {    /* toggle autoscan */
            move_head ^= 1;
            if (move_head) {
                x_command(X_CAMERA, 1);
            }
            else {
                x_command(X_CAMERA, 0);
            }
        }
```

```
        else if (selection == 203) {    /* toggle plot IRs */
            plot_ir_mode ^= 1;
        }
        else if (selection == 204) {    /* toggle sound plotting */
            plot_sound_mode ^= 1;
        }
        else if (selection == 205) {    /* plot opticals */
            plot_optical_mode ^= 1;
        }

        if (event_occurred) {           /* if an event occured, clean up screen
 */
                mouse_off();
                gpviewport(0,0, gdmaxcol, gdmaxrow);
                pmenu = RegisterMenu(main_menu_bar);
                draw_menu(pmenu);
                mouse_on();
        }
        if (gotpacket) {
                /* Request next packet */
                req_packet(ISON_PTYPE, param);
                start_time = mstime();
        }

    }
    ScalePoint(&sensor_map, robart.x, robart.y, BLACK);
    ScalePoint(&sensor_map, (robart.x-1), robart.y, BLACK);
    ScalePoint(&sensor_map, (robart.x+1), robart.y, BLACK);

    x_command(X_SONAR, 0);              /* turn sonar array off */
    waitms(100);
    x_command(X_CAMERA, 0);             /* make sure camera is off too */
    waitms(100);
    close_menu(pmenu);
    gpviewport(0,0, gdmaxcol, gdmaxrow);
    mouse_on();
    return (OK);
}

/************************************************************************
 *                      init_sonar_plotting                             *
 ************************************************************************
 * Initialize all the variables needed to do ultrasonic sensor          *
 * plotting.                                                            *
 ************************************************************************/
void init_sonar_plotting()
{
    int ii;

    /* Init old_color array to indicate out-of-range */
    for (ii = 0; ii < PE_SONAR_NUM; ii++) {
        old_color[ii] = -1;
        age[ii] = 0;
    }

    for (ii = 0; ii < IR_NUM; ii++)
        irage[ii] = 0;

    /* Initialize the old sonar map to 0 distance */
    for (ii = 0; ii < PE_SONAR_NUM; ii++) {
        old_sonar[ii] = 0;
    }

    intruder_bearing = -1;
}

/************************************************************************
 *                          plot_sonars                                 *
 ************************************************************************
 * Plot the sonar returns on the map.  Also does all the calculations   *
 * as to where the intruder is.  If intrusion mode is active and an     *
 * intruder is detected, it returns YES.  Otherwise, it returns NO.     *
```

```
 * If <move_head> is set, it will also position the head to the area    *
 * where the intruder is detected.                                      *
 *                                                                      *
 * Call with:                                                           *
 *      map_ptr = (map *) map to plot data on                           *
 *      pack    = (packet *) sonar packet (including IR sensor values)  *
 *                                                                      *
 * Returns:                                                             *
 *      YES     if intrusion mode and intruder detected                 *
 *      NO      otherwise                                               *
 *                                                                      *
 ************************************************************************/
int  plot_sonars(map_ptr, pack)
map  *map_ptr;
packet *pack;
{
    byte        pESonars[PE_SONAR_NUM];
    int         scale, new_x, new_y, ii, diff;
    int         moving[PE_SONAR_NUM];
    int         nmoving;
    byte        irval;
    cond        intrusion_sensors;
    static byte irmask[24] = {
                0x06, 0x02, 0x03, 0x01, 0x01, 0x01, 0x01,       /* 0 - 6 */
                0x80, 0x80, 0x80, 0x80, 0x80, 0x80,             /* 7 - 12 */
                0x80, 0x80, 0x80, 0x80, 0x80,                   /* 13 - 17 */
                0x08, 0x08, 0x08, 0x08, 0x0c, 0x04              /* 18 - 23 */
    };

    scale = map_ptr->scale;
    switch (pack->data[0]) {
    case '3':                   /* navigation sonar report (no IR) */
        DecodePEArray(pack, pESonars, NO);
        ScalePEArray(distances, pESonars);
        break;
    case '5':                   /* Ultrasonic intrusion report (IR) */
        irval = DecodePEArray(pack, pESonars, YES);
        ScalePEArray(distances, pESonars);
        break;
    case '4':                   /* intrusion sensor report */
        Decode_Intruder_Packet(pack, &intrusion_sensors);
        /*lint -e616 */
        /* fall through... */
    default:
        return (NO);
    }
    /*lint +e616 */

    mouse_off();
    nmoving = 0;
    if (plot_ir_mode) {                 /* plotting IR values? */
        plot_irs(map_ptr, irval, NO);   /* plot them now */
    }
    if (!irfusion)                      /* not fusing IRs? */
        irval = 0xff;                   /* make sure we do whole loop anyway */
    /* For each sonar do */
    for (ii = 0; ii < PE_SONAR_NUM; ii++) {
        moving[ii] = 0;
        /* Ignore sonar returns that are out of range */
        if (distances[ii] > maxrange) { /* point is out of range */
            age[ii] = 0;
            if (old_color[ii] != -1) {  /* was a spot plotted there? */
                Calc_Dest_Grid_Unit(ii * PE_SON_SPACING,(double)distances[ii],&
new_x, &new_y, map_ptr->squaresize);
                ScalePoint(map_ptr, old_x[ii], old_y[ii], old_color[ii]);
            }
            old_color[ii] = -1; /* point is no longer plotted */
            continue;
        }

        /* If difference between current reading and last
         * reading is less than <jitter>, ignore it.
         */
```

```
        diff = old_sonar[ii] - distances[ii];
        if (diff < 0)           /* abs() doesn't work! */
            diff = -diff;

        /*
         * The sonar is within range.  If the point isn't jittering
         * we need to do the following:
         *   1. If we're not in intrusion detection mode, just continue.
         *      This leaves the point plotted where it was.
         *   2. We are in intrusion detection mode.  The point hasn't
         *      moved.  Is it time to delete it because it died of
         *          old age?  If not, continue, leaving the point on the
         *          screen.
         *   3. The point has died.  Remove it from the screen and
         *          reset color and age.
         */
        if (diff < jitter) {
            if (!intrusion)             /* not in intrusion detection mode? */
                continue;               /* leave it be */
            if (++age[ii] < 1)  /* intrusion mode, but not old enough yet */
                continue;
            if (old_color[ii] != -1) {  /* is there a previous point? */
                ScalePoint(map_ptr, old_x[ii], old_y[ii], old_color[ii]);
                old_color[ii] = -1;     /* nothing plotted here any more */
            }
            age[ii] = 0;                /* it's a baby again */
            continue;
        }
        if ((irval & irmask[ii]) == 0x00)       /* if IRs aren't showing anythi
ng */
            continue;
        nmoving++;
        age[ii] = 0;                    /* the point has moved, it's a baby age
in */
        moving[ii] = 1;         /* this point is moving */
        /* Get the absolute position of the sensor return in cartesian
         * map coordinates, pass in polar coordinates.
         */
        Calc_Dest_Grid_Unit(ii * PE_SON_SPACING,(double)distances[ii],&new_x, &
new_y, map_ptr->squaresize);

        /* If previous point at this index was plotted, need to
         * restore the old color.
         */
        if (old_color[ii] != -1)
            ScalePoint(map_ptr, old_x[ii], old_y[ii], old_color[ii]);

        /* If the return is on the floor map then */
        if (Clip_To_Map(new_x, new_y, map_ptr)) {

            /* Save the color of this square before we change
             * it to pink.  At the beginning of the next
             * iteration, this color will be restored.
             */
            old_x[ii] = new_x;
            old_y[ii] = new_y;
            old_color[ii] = gprddot(map_ptr->xoff + (old_x[ii]-map_ptr->lx)*sca
le,
                                    map_ptr->yoff - (old_y[ii]-map_ptr->ly)*sca
le);

            if (old_color[ii] == MAGENTA)    /* already occupied? */
                old_color[ii] = -1;  /* don't repaint next time */

            /* Plot the return on the screen and in the sonar map. */
            ScalePoint(map_ptr, old_x[ii], old_y[ii], MAGENTA);
        }
        else    /* Point off map, don't try to restore it next time */
            old_color[ii] = -1;
        old_sonar[ii] = distances[ii];
    }
    if (intrusion && nmoving) {
        intruder_bearing = get_ihdg(moving);
```

```
        if (intruder_bearing != -1 && move_head) {
            intruder_range = distances[(intruder_bearing+7)/15];
            pos_head(intruder_bearing);
        }
        mouse_on();
        return (YES);           /* got an intruder */
    }
    mouse_on();
    return (NO);                /* no intruder */
}


/***********************************************************************
 *                              plot_irs                               *
 ***********************************************************************
 * Plot the infrareds on the screen.                                   *
 *                                                                     *
 * Call with:                                                          *
 *      map_ptr = (map *) pointer to current map                       *
 *      irval   = (int) IR sensor byte (lower four bits)               *
 *      remove  = (int) YES => remove all currently plotted lines      *
 ***********************************************************************/
void plot_irs(map_ptr, irval, remove)
map *map_ptr;
unsigned int irval;
int remove;
{
        int             ii, scale;
        int             xco, yco;
        int             rx, ry;
        static int      irdeg[IR_NUM] = {60, 15, 345, 300};

        scale = map_ptr->scale;
        rx = map_ptr->xoff + (robart.x-map_ptr->lx)*scale + scale/2;
        ry = map_ptr->yoff - (robart.y-map_ptr->ly)*scale - scale/2;
        gpplane(PLANE2);                /* write to RED plane only */
        gpmerge(MRPL);

        /* First, see if we need to erase all the current lines */
        if (remove) {
            for (ii = 0; ii < IR_NUM; ii++) {
                if (irage[ii] == 0)
                    continue;
                Calc_Dest_Grid_Unit(irdeg[ii], 15.0, &xco,
                                    &yco, map_ptr->squaresize);
                gpmove(rx, ry);
                gpcolor(BLACK);
                gpline(map_ptr->xoff + (xco-map_ptr->lx)*scale,
                       map_ptr->yoff - (yco-map_ptr->ly)*scale);
                irage[ii] = 0;
            }
            gpplane(ALLPLANES);
            return;
        }

        for (ii = 0; ii < IR_NUM; ii++, irval >>=1) {
            if (irval & 1) {            /* this IR firing? */
                if (irage[ii] == 0) {   /* first time? */
                    Calc_Dest_Grid_Unit(irdeg[ii], 15.0, &xco,
                                        &yco, map_ptr->squaresize);
                    gpmove(rx, ry);
                    gpcolor(IWHITE);
                    gpline(map_ptr->xoff + (xco-map_ptr->lx)*scale,
                           map_ptr->yoff - (yco-map_ptr->ly)*scale)
;
                }
                irage[ii] = 1;          /* set age to 1 */
            }
            else if (irage[ii]) {       /* this one timing out? */
                if ((--irage[ii]) <= 0) {       /* timed out? */
                    Calc_Dest_Grid_Unit(irdeg[ii], 15.0, &xco,
                                        &yco, map_ptr->squaresize);
                    gpmove(rx, ry);
```

```
                                        gpcolor(BLACK);
                                        gpline(map_ptr->xoff + (xco-map_ptr->lx)*scale,
                                                map_ptr->yoff - (yco-map_ptr->ly)*scale)
;
                                        irage[ii] = 0;
                                }
                        }
                }
                gpplane(ALLPLANES);             /* get out a plane mode */
}


/*********************************************************************
 *                              plot_hearing                         *
 *********************************************************************
 * Plot the hearing vector on the screen.                            *
 *                                                                   *
 * Call with:                                                        *
 *      map_ptr = (map *) current map                                *
 *      bearing = (int) bearing returned by the hearing sensor, in   *
 *                      degrees, -180 <= bearing <= 180              *
 *      init    = (int) 1 => reset the <inited> flag. Do this when   *
 *                      you're ready to start using the hearing array, *
 *                      but before you actually have a bearing to plot. *
 *                                                                   *
 * Notes:                                                            *
 * Operation is normally, (1) erase old vector, (2) plot new vector. *
 * If bearing == NO_ANGLE, then step 2 is not performed.  All graphics *
 * done in XOR mode.  The plotted vector takes into account the current *
 * head bearing (contained in robart.headDir).                       *
 *********************************************************************/
void plot_hearing(map_ptr, bearing, init)
map *map_ptr;
int bearing, init;
{
        int             scale;
        int             xco, yco;
        int             rx, ry;
        static int      inited = NO;
        static int      prevx=-1, prevy=-1;

        if (init) {                     /* initiailize? */
                inited = NO;            /* act like we haven't been here before
 */
                prevx = prevy = -1;
                return;                 /* don't plot anything this time */
        }

        scale = map_ptr->scale;
        rx = map_ptr->xoff + (robart.x-map_ptr->lx)*scale + scale/2;
        ry = map_ptr->yoff - (robart.y-map_ptr->ly)*scale - scale/2;
        gpplane(PLANE1);                /* write to green plane only */
        gpmerge(MRPL);

        /* If we've been initialized and we have a vector on the screen,
         * erase the old vector.
         */
        if (inited && prevx != -1 && prevy != -1) {
                gpmove(rx, ry);         /* remove old line */
                gpcolor(BLACK);
                gpline(prevx, prevy);
        }
        else
                inited = YES;           /* no, so set the flag now */

        /* If we have a valid bearing, draw the vector on the display */
        if (bearing != NO_ANGLE) {
                bearing = force360(bearing + robart.headDir);
                Calc_Dest_Grid_Unit(bearing, 24.0, &xco, &yco, map_ptr->squares
ize);
                gpmove(rx, ry);
                prevx = map_ptr->xoff + (xco-map_ptr->lx)*scale;
                prevy = map_ptr->yoff - (yco-map_ptr->ly)*scale;
```

```
                gpcolor(WHITE);
                gpline(prevx, prevy);
        }
        gpplane(ALLPLANES);
}


/*********************************************************************
 *                              get_ihdg                             *
 *********************************************************************
 * Calculate the heading of the intruder using the sonar and IR sensor *
 * information.                                                      *
 *                                                                   *
 * Algorithm:                                                        *
 * Search through the array looking for the largest contiguous block *
 * of sonars that are indicating movement.  The search begins at     *
 * sonar number 18, continues up through #23, then goes to 0 thru 6. *
 *                                                                   *
 * Call:                                                             *
 *      get_ihdg(moving, irval)                                      *
 *                                                                   *
 * Where:                                                            *
 *      moving  = (int *) array of values indicating if a given sonar *
 *                      has changed in range.                        *
 *      irval   = (byte) IR sensors, bit 0 => IR #1, bit 3 => IR #4  *
 *                                                                   *
 *********************************************************************/
get_ihdg(moving)
int *moving;
{
    int start, inarow;
    int sstart, maxinarow;
    int ii, ix;
    int look_hdg;

    sstart = start = 0;
    maxinarow = inarow = 0;
    for (ii = -6; ii <= 6; ii++) {
        if (ii < 0)
            ix = ii + PE_SONAR_NUM;
        else
            ix = ii;
        if (inarow) {                   /* previous was moving */
            if (moving[ix])
                inarow++;               /* bump counter */
            else {
                inarow = 0;             /* reset number in a row */
                start = 0;
            }
        }
        else if (moving[ix]) {          /* start new in a row? */
            inarow = 1;
            start = ix;
        }
        if (inarow > maxinarow) {       /* exceed previous max? */
            maxinarow = inarow;
            sstart = start;
        }
    }
    if (maxinarow == 0)                 /* no movement? */
        return (-1);

    /* Test for wrap around from 345 to 0 */
    if (sstart + maxinarow > PE_SONAR_NUM) {
        look_hdg = -(PE_SONAR_NUM - sstart)*PE_SON_SPACING + ((maxinarow-1)*PE_
SON_SPACING)/2;
    }
    else {
        look_hdg = sstart*PE_SON_SPACING + ((maxinarow-1)*PE_SON_SPACING)/2;
    }
    if (look_hdg < 0)
        look_hdg = 360 - look_hdg;
    return (look_hdg);
```

```
}


/*************************************************************************
 *                           pos_head                                    *
 *************************************************************************
 * Point Robart's head in the desired direction.  Straight ahead is     *
 * 0 degrees, straight right is 90 degrees, and straight left is        *
 * 270 degrees.  The head is unable to look to the rear of the robot.   *
 * The heading must be translated to an absolute head position where    *
 * 0x80 is straight ahead, 0x13 is straight right and 0xed is straight  *
 * left.  Funny endpoints are because position 0 and 0xff look          *
 * slightly to the rear).  There are 1.2111 steps/degree.               *
 *                                                                       *
 * Call:                                                                 *
 *      pos_head(heading)                                               *
 *                                                                       *
 * Where:                                                                *
 *      heading = desired head position in degrees, range 0 - 359       *
 *                                                                       *
 *************************************************************************/
void pos_head(heading)
int heading;
{
    char packstr[40];
    int position, qsize;

    if (heading > 90 && heading < 270)
        return;                         /* can't look to the rear */

    robart.headDir = heading;           /* save the heading */
    if (heading > 90)                   /* between 270 and 355? */
        heading -= 360;                 /* convert to -1 to -90 */
    position = 90 - heading;            /* convert to 0 to 180 */

#ifdef THEORY
    position = 19 + (position * 121 + 50)/100;  /* convert to steps */
#else
    position = 19 + (position * 124 + 50)/100;  /* convert to steps */
#endif

    sprintf(packstr, "OHO%02x", position);

    /*
     * Make sure the output queue is empty
     */
    do {
        qsize = oqsize(robot_port);
    } while (qsize != 0);

#if 0
    /* Now make sure nothing is happening on the input side of the
     * communications port.
     */
    qsize = iqsize(robot_port);
    start_time = mstime();
    while (mstime() - start_time < 75) {
        if (iqsize(robot_port) != qsize) {
                qsize = iqsize(robot_port);
                start_time = mstime();
        }
    }
#endif

    /* NOW tell the robot to position the head! */
    put_packet(packstr);


    /*
     * Wait for the packet to empty.  If we don't do this we could be
     * writing characters to Robart's serial port when he isn't looking
     * at it, which means he'll drop all the characters.
     */
```

```
    do {
        qsize = oqsize(robot_port);
    } while (qsize != 0);
    waitms(110);                            /* wait for robart to process packet */
}
```

```
/*********************************************************************
 *                              speech.c                             *
 *********************************************************************
 * Speech compiler for Robart.  Takes a sentence as input and generates *
 * the appropriate list and word numbers to send as part of the packet *
 * to make Robart talk.                                              *
 *                                                                   *
 * Call with:                                                        *
 *      outstr  = (char *) string to put list/word numbers           *
 *      str     = (char *) sentence you want Robart to say           *
 *                                                                   *
 * Returns:                                                          *
 *      OK      if all words found                                   *
 *      !OK     if one or more words not found                       *
 *                                                                   *
 * NOTE: Even if a word is not found, a string will still be generated, *
 * with the space for the unknown word replaced with a short, 400 Hz *
 * tone.  This is to aid in fixing the sentence.                     *
 *                                                                   *
 *********************************************************************/


#include <stdio.h>
#include <string.h>
#include "headers/ibmio.h"

#define isdigit(a) ((a) >= '0' && (a) <= '9')

char *vox0[] = {
        NULL
};

char *vox1[] = {
#include "headers/vox1.h"
        NULL
};

char *vox2[] = {
#include "headers/vox2.h"
        NULL
};

char *vox3[] = {
#include "headers/vox3.h"
        NULL
};

char *vox4[] = {
        NULL
};

char **vlists[] = {
        vox0, vox1, vox2, vox3, vox4, NULL
};


char *sgetwc(char *out, char *in);
int find_word(char *, char ***, int *, int *);


compile_speech(outstr, str)
char *outstr, *str;
{
        char    *cp;
        char    word[80];
        int     status;
        int     listno, wordno;

        *outstr = EOS;
        cp = sgetwc(word, str);
        status = OK;
        while (word[0]) {
                strlwr(word);           /* convert to lower case */
```

```

                /* If we find the word, just output it to the list */
                if (find_word(word, vlists, &listno, &wordno) == OK) {
                        sprintf(outstr, "%02x%02x", listno, wordno);
                        outstr = &outstr[strlen(outstr)];
                }

                /* If it ends in an 's', see if it's just a plural.  If so,
                 * output the word without the 's', then append the 's'
                 * sound ('ss')
                 */
                else if (word[strlen(word)-1] == 's') {
                        word[strlen(word)-1] = '\0';

                        /* If we find the word without the 's', stick it
                         * on the list, then append the 's' sound
                         */
                        if (find_word(word, vlists, &listno, &wordno) == OK) {
                                sprintf(outstr, "%02x%02x0181", listno, wordno)
;
                                outstr = &outstr[strlen(outstr)];
                        }
                        else {
                                sprintf(outstr, "0141");
                                outstr = &outstr[strlen(outstr)];
                                /*lint -e506 */
                                status = !OK;
                                /*lint +e506 */
                        }
                }

                /* No word found, see if it's a bunch of numbers.  If so,
                 * then convert the numbers to words
                 */
                else if (word[0] >= '0' && word[0] <= '9') {
                        num2str(outstr, word);
                        outstr = &outstr[strlen(outstr)];
                }

                /* No word found, so just output a tone */
                else {
                        sprintf(outstr, "0141");
                        outstr = &outstr[strlen(outstr)];
                        /*lint -e506 */
                        status = !OK;
                        /*lint +e506 */
                }
                cp = sgetwc(word, cp);
        }
        return (status);
}


/* find - do a linear search of all the word tables looking for a word
 *      that matches <word>.  This routine IS case sensitive!
 *
 * Call with:
 *      word    = (char *) word to find
 *      vlists  = (char ***) NULL-terminated list of word tables
 *      plistno = (int *) pointer to variable to store list number in
 *      pwordno = (int *) pointer to variable to store list number in
 *
 * Returns:
 *      OK      if word found
 *      !OK     if not
 */
int find_word(w, vl, plistno, pwordno)
char *w, ***vl;
int *plistno, *pwordno;
{
        char    **list;
        int     listno, wordno;
        int     found;
```

```
        *plistno = *pwordno = 0;
        found = 0;
        for (listno = 0; !found && vl[listno] != NULL; listno++) {
                list = vl[listno];
                for (wordno = 0; list[wordno] != NULL; wordno++) {
                        if (strcmp(w, list[wordno]) == 0) {
                                found++;
                                break;
                        }
                }
        }
        if (found) {
                *plistno = listno-1;    /* gets bumped at end of for loop */
                *pwordno = wordno;
                return (OK);
        }
        /*lint -e506 */
        return (!OK);
        /*lint +e506 */
}


/* sgetwc - get the next word from <in> and put it in <out>.  Words are delimit
ed
 *      by anything <= space and also by commas.  A comma at the very beginning
 *      of a word is interpreted to be a word by itself.
 *
 * Returns:
 *      pointer to beginning of next word.
 */
char *sgetwc(out, in)
register char *out, *in;
{
        *out = '\0';                    /* start off with empty string */
        while (*in && *in <= ' ')       /* skip leading blanks/tabs */
                in++;
        if (*in == ',' || *in == '.') { /* start off with ','? */
                *out++ = *in++;         /* copy the punctuation */
                *out = '\0';
                return (in);            /* return ptr to next char */
        }
        while (*in > ' ' && *in != ',' && *in != '.')
                *out++ = *in++;
        *out = '\0';
        return (in);
}


/* num2str - convert a number to the equivalent string of words, then convert
 *      that string to wordlists and word indexes,  e.g. 1024 becomes
 *      "one thousand twenty four" and then "0101011d01140104"
 *
 * Call with:
 *      outstr = (char *) string to put word list on
 *      word   = (char *) string of digits to convert
 */
num2str(outstr, w)
char *outstr, *w;
{
        char    spelled_out[250], cur_word[5], save_word[80];
        char    *cp;
        int     len, tlen;

        strcpy(save_word, w);
        /* First, truncate the word at the first non-decimal digit */
        cp = save_word;
        while (*cp && isdigit(*cp))
                cp++;
        *cp = EOS;

        /* Get rid of leading zeros */
        while (save_word[0] == '0')
```

```
                strcpy(&save_word[0], &save_word[1]);
        if (save_word[0] == EOS)                /* if it was just zero, replace
 the 0 */
                save_word[0] = '0';

        /* If there are more than 9 digits (>= 1 billion) just announce them
         * as single digits.
         */
        if (strlen(save_word) > 9) {
                single_digits(outstr, save_word);
        }
        else {
                spelled_out[0] = EOS;
                cp = spelled_out;
                len = strlen(save_word);
                if (len >= 7) {         /* if it's greater than a million */
                        tlen = 3 - (9 - len);   /* # of digits in millions plac
e */
                        strncpy(cur_word, save_word, tlen);
                        cur_word[tlen] = EOS;
                        say_hundreds(spelled_out, cur_word);
                        strcat(spelled_out, " million");
                        strcpy(save_word, &save_word[tlen]);
                        len = strlen(save_word);
                }
                if (len >= 4) {         /* if we need to say thousands */
                        tlen = 3 - (6 - len);   /* # of digits in thousands pla
ce */
                        strncpy(cur_word, save_word, tlen);
                        cur_word[tlen] = EOS;
                        /* See if we need to say "thousand".  If thousands
                         * place is all zeros, we don't need to.
                         */
                        if (strcmp(cur_word, "000")) {
                                say_hundreds(spelled_out, cur_word);
                                strcat(spelled_out, " thousand");
                        }
                        strcpy(save_word, &save_word[tlen]);
                }
                say_hundreds(spelled_out, save_word);
                if (spelled_out[0] == EOS)
                        strcpy(spelled_out, "zero");
                compile_speech(outstr, spelled_out);
        }
        return (OK);
}


say_hundreds(outstr, instr)
char *outstr, *instr;
{
        char    xstr[40];
        int     ix, len;

        strcpy(xstr, instr);
        len = strlen(xstr);
        outstr = &outstr[strlen(outstr)];

        /* If it's all zeros, don't say anything */
        if (strcmp(xstr, "000") == 0)
                return (OK);
        if (len == 3) {
                if (xstr[0] != '0') {
                        strcat(outstr, " ");
                        ix = (xstr[0] == '0' ? 0x1f : xstr[0] - '0');
                        strcat(outstr, voxl[ix]);
                        strcat(outstr, " hundred");
                }
                strcpy(xstr, &xstr[1]);
                len = strlen(xstr);
        }
        if (strcmp(xstr, "00") == 0)
                return (OK);
```

```
        if (len == 2) {
                if (xstr[0] == '1') {           /* something in the teens */
                        strcat(outstr, " ");
                        strcat(outstr, voxl[xstr[1] - '0' + 0x0a]);
                        return (OK);
                }
                if (xstr[0] != '0') {
                        strcat(outstr, " ");
                        strcat(outstr, voxl[xstr[0] - '0' + 0x12]);
                }
                strcpy(xstr, &xstr[1]);
        }
        if (xstr[0] == '0')
                return (OK);
        strcat(outstr, " ");
        strcat(outstr, voxl[xstr[0] - '0']);
        return (OK);
}


single_digits(outstr, w)
char *outstr, *w;
{
        *outstr = EOS;
        while (*w) {
                sprintf(outstr, "01%02x", *w == '0' ? 0x1f : *w - '0');
                outstr = &outstr[strlen(outstr)];
                w++;
        }
        return (OK);
}
```

Apr 04 1991 10:44:37 sqrt.c Page 1

```
/**********************************************************************
 *                              sqrt.c                                *
 **********************************************************************
 * This file contains an integer version of a function to calculate   *
 * the hypotenuse of a triangle given the length of the two opposite  *
 * sides.  Uses the usual Newton-Raphson method.                      *
 **********************************************************************/


#if 0
/*lint -e704 */
/* ihypot - normal integer square root routine based on the Newton-Raphson
 *      iteration method.  Takes about 100us for the square root of 65535 on
 *      a 25MHz 80386.
 */
ihypot(x, y)
int x, y;
{
        long            val;
        long            guess, nguess;

        val = (long) x*x + (long) y*y;
        guess = val >> 1;
        for (;;) {
                if (guess == 0)
                        return (0);

                nguess = (guess + val / guess) >> 1;
                if (labs(nguess - guess) <= 1)
                        return ((int) nguess);
                guess = nguess;
        }
        return (0);
}
/*lint +e704 */

#else

/*
A Fast Approximation to the Hypotenuse
by Alan Paeth
from "Graphics Gems", Academic Press, 1990
*/

 int idist(x1, y1, x2, y2)
        int x1, y1, x2, y2;
                {
/*
 * gives approximate distance from (x1,y1) to (x2,y2)
 * with only overestimations, and then never by more
 * than (9/8) + one bit uncertainty.
 */
        if ((x2 -= x1) < 0) x2 = -x2;
        if ((y2 -= y1) < 0) y2 = -y2;
        return (x2 + y2 - (((x2>y2) ? y2 : x2) >> 1) );
        }

#endif
```

```
/***********************************************************************
 *                          tele.c                                     *
 ***********************************************************************
 * This file contains all the information to do the teleoperated mode. *
 *                                                                     *
 ***********************************************************************/
#include <stdio.h>
#include <string.h>
#include <math.h>
#include <malloc.h>
#include <ega.h>
#include <event.h>
#include <menu.h>
#include <syscolor.h>
#include <dialog.h>

#include "headers/ibmio.h"

#ifndef PI
#define PI    3.14159265358979323846
#endif

/* Define a few things about the physical dimensions of the robot */
#define WHEEL_CIRCUMFERENCE     24.347   /* circumference of the wheel */
#define NTREADS                 24       /* number of treads on robot */

/* Define the lengths and widths of all the parts of the robot in screen
 * coordinates.
 */
#define ROBOT_WIDTH       150           /* 150 dots = 15 inches */
#define ROBOT_LENGTH      158           /* 21", 4/3 aspect => 158 dots */
#define WHEEL_DIAMETER    58            /* 7.75" => 58 dots */
#define WHEEL_WIDTH       20            /* width of wheels */
#define WHEEL_SEP         120           /* wheel separation */
#define SCREEN_WIDTH      640
#define SCREEN_HEIGHT     350

/* Now define the screen locations for all the robot parts */
#define BASE_LOC_X       ((SCREEN_WIDTH-ROBOT_WIDTH)/2)
#define BASE_LOC_Y       ((SCREEN_HEIGHT-ROBOT_LENGTH)/2)
#define BASE_COR_X       (BASE_LOC_X + ROBOT_WIDTH)
#define BASE_COR_Y       (BASE_LOC_Y + ROBOT_LENGTH)
#define LEFT_W_LOC_X     (SCREEN_WIDTH-WHEEL_SEP-WHEEL_WIDTH)/2
#define LEFT_W_LOC_Y     (SCREEN_HEIGHT-WHEEL_DIAMETER)/2
#define LEFT_W_COR_X     (LEFT_W_LOC_X + WHEEL_WIDTH)
#define LEFT_W_COR_Y     (LEFT_W_LOC_Y + WHEEL_DIAMETER)
#define RIGHT_W_LOC_X    (SCREEN_WIDTH+WHEEL_SEP-WHEEL_WIDTH)/2
#define RIGHT_W_LOC_Y    (SCREEN_HEIGHT-WHEEL_DIAMETER)/2
#define RIGHT_W_COR_X    (RIGHT_W_LOC_X + WHEEL_WIDTH)
#define RIGHT_W_COR_Y    (RIGHT_W_LOC_Y + WHEEL_DIAMETER)
#define LEFT_W_ARR_X     (LEFT_W_COR_X+10)
#define LEFT_W_ARR_Y     (SCREEN_HEIGHT/2)
#define RIGHT_W_ARR_X    (RIGHT_W_LOC_X-10)
#define RIGHT_W_ARR_Y    (SCREEN_HEIGHT/2)
#define HEAD_CENTER_X    (SCREEN_WIDTH/2)
#define HEAD_CENTER_Y    (SCREEN_HEIGHT/2)

/* Bumpers */
#define BUMPER_WIDTH     5
#define U_L_BUMPER_X     (BASE_LOC_X-BUMPER_WIDTH-3)      /* upper left */
#define U_L_BUMPER_Y     (BASE_LOC_Y)
#define T_L_BUMPER_X     (BASE_LOC_X)                     /* top left */
#define T_L_BUMPER_Y     (BASE_LOC_Y-2)
#define T_R_BUMPER_X     (BASE_LOC_X+ROBOT_WIDTH/2)       /* top right */
#define T_R_BUMPER_Y     (BASE_LOC_Y-2)
#define U_R_BUMPER_X     (BASE_COR_X+3)                   /* upper right */
#define U_R_BUMPER_Y     (BASE_LOC_Y)
#define L_R_BUMPER_X     (BASE_COR_X+3)                   /* lower right */
#define L_R_BUMPER_Y     (BASE_LOC_Y+ROBOT_LENGTH/2)
#define B_R_BUMPER_X     (BASE_LOC_X+ROBOT_WIDTH/2)       /* bottom right */
#define B_R_BUMPER_Y     (BASE_COR_Y+2)
#define B_L_BUMPER_X     (BASE_LOC_X)                     /* bottom left */
#define B_L_BUMPER_Y     (BASE_COR_Y+2)
```

```
#define L_L_BUMPER_X     (BASE_LOC_X-BUMPER_WIDTH-3)      /* lower left */
#define L_L_BUMPER_Y     (BASE_LOC_Y+ROBOT_LENGTH/2)


/* Define types for the TEXT structure */
#define T_SHORT          1              /* short integer (16 bits) */
#define T_LONG           2              /* long integer (32 bits */
#define T_STRING         3              /* string type */
#define T_FLOAT          4              /* floating point (32 bits) */

#define NUM_MASK         0x20           /* Num Lock mask */
#define KB_FLAG_SEG      0x40           /* KB_FLAG segment */
#define KB_FLAG_OFF      0x17           /* KB_FLAG offset */

#define MAX_SPEED        15             /* maximum robot speed */


#define ENTERKEY         0x1c0d /* scan code fore the Enter key */

extern int               left_speed, right_speed;
extern int               left_velocity, right_velocity;
extern unsigned char     turn_preference;
extern unsigned char     follow_mode;
extern float             vel_table[16];

char                     speed_govern_disable = NO;

float                    angular_vel_table[16];
float                    left_angular_vel, right_angular_vel;

struct VECTOR {
        int      x, y;
};

struct VECTOR head_vec[8] = {
        { 3, -18}, { 3,  11}, { 8,  11}, {0,  21},
        {-8,  11}, {-3,  11}, {-3, -18}, {3, -18}
};

struct VECTOR rotated_head_vec[8];


/* Define the information needed for each wheel tread */
typedef struct wheel_tread {
        float    angle;
        int      xpos,
                 ypos;
} TREAD;

/* Define structure used by arrow drawing display list primitives */
typedef struct arrow_struct {
        int      *velocity;      /* velocity of the wheel */
        int      x, y;           /* X Y position */
} ARROW;

typedef struct temperature_struct {
        int      value;
        int      xpos, ypos;
        int      height, width;
        int      range;
        float    scale;
} TEMPERATURE;

typedef struct text_struct {
        union {
                 short    s;
                 long     l;
                 char     *cp;
                 float    f;
        } t;
        char     type;
        int      x, y;
        char     fore, back;
```

```
        char    *label;
        char    *fmt;
} T_TEXT;

typedef struct flasher_struct {
        unsigned char   turn_pref;      /* turn preference */
        int             x, y;
        int             separation;     /* separation in X and Y */
} FLASHER;


/* Display list strings */
static char null_str[] = "";
static char reflex_str[] = "Reflexive Mode";
static char seek_str[]   = "   Seek Mode  ";
static char govern_str[] = "EMERGENCY - Speed Governing Disabled";
static char follow_str[] = "Follow Mode";

/* Define all the display list structures */
static ARROW lw_arrow = { &left_velocity,  LEFT_W_ARR_X,   LEFT_W_ARR_Y};
static ARROW rw_arrow = { &right_velocity, RIGHT_W_ARR_X, RIGHT_W_ARR_Y};

static TEMPERATURE lw_temp = {0, 490, 125, 100, 20, 15, 1.0};
static TEMPERATURE rw_temp = {0, 525, 125, 100, 20, 15, 1.0};

/*lint -e708 */
static T_TEXT velocity_text = {{0}, T_FLOAT, 450, 300, WHITE, BLACK, "Velocity:
", "%5.2f ips"};
static T_TEXT headdir_text  = {{0}, T_SHORT, 450, 314, WHITE, BLACK, "Head dir:
", " %4d deg"};
static T_TEXT battery_text  = {{0}, T_FLOAT, 450, 328, WHITE, BLACK, "Battery:
", "%5.2f V"};
static T_TEXT speed1_text   = {{0}, T_SHORT, 482, 240, WHITE, BLACK, "", " %2d
-"};
static T_TEXT speed2_text   = {{0}, T_SHORT, 522, 240, WHITE, BLACK, "", " %d "
};
static T_TEXT reflex_text   = {{0}, T_STRING, 264, 35, GREEN, BLACK, "", "%s"};
static T_TEXT govern_text   = {{0}, T_STRING, 176, 49, RED, BLACK, "", "%s"};
static T_TEXT follow_text   = {{0}, T_STRING, 276, 40, CYAN, BLACK, "", "%s"};
/*lint +e708 */

static FLASHER turn_dir = {0, 320, 70, 10};
static FLASHER seek_dir = {0, 320, 175, 190};

int seekmode = 0;                       /* seek mode flag */
unsigned long seektimeout;
static int bumper_value = 0;            /* bumper value */


/* Define some miscellaneous local globals */
static char             debug = NO;


/* The ypos_array contains the Y coordinate of the treads for all the
 * treads around the circumference of the wheel.  The only ones that have
 * real values calculated for them are the ones that can actually be visible,
 * namely, from angles 0 - 90 and 270 - 359.
 */
static int ypos_array[360];

/* Create the two tread arrays */
static TREAD            left_wheel[NTREADS], right_wheel[NTREADS];


extern drType robart;

extern int map_direction;


extern byte             DecodePEArray();
extern void             Confirm();
extern unsigned long    mstime();
extern GBUF             *readsq();
```

```
extern unsigned long    mstime();



static int move_wheel ( TREAD *wheel , double angular_velocity , long delta_t )
;
static int init_arrow ( ARROW *parrow );
static ARROW *copy_arrow ( ARROW *curarrow , ARROW *oldarrow );
static int free_arrow ( ARROW *oldarrow );
static int update_arrow ( ARROW *poldarr , ARROW *pnewarr , int on );
static int cmp_arrow ( ARROW *pold , ARROW *pnew );
static int deinit_arrow ( ARROW *parrow );
static int draw_arrow ( int x , int y , int vel , int color );
static int init_temp ( TEMPERATURE *ptemp );
static int deinit_temp ( TEMPERATURE *ptemp );
static int update_temp ( TEMPERATURE *otemp , TEMPERATURE *ntemp , int on );
static int draw_temp ( TEMPERATURE *ptemp , int on );
static int init_text ( T_TEXT *ptext );
static int deinit_text ( T_TEXT *ptext );
static int update_text ( T_TEXT *otext , T_TEXT *ntext , int on );
static int draw_text ( T_TEXT *ptext , int on );
static int text_fmt_str ( char *str , T_TEXT *ptext );
static int cmp_text ( T_TEXT *otext , T_TEXT *ntext );
static int init_flasher ( FLASHER *pflash );
static int deinit_flasher ( FLASHER *pflash );
static int update_flasher ( FLASHER *oflash , FLASHER *nflash , int on );
static int flash_arrow ( FLASHER *pflash , int dir );
static int init_bumper ( byte *pbumpers );
static int deinit_bumper ( byte *pbumpers );
static int update_bumper ( byte *obumpers , byte *nbumpers , int on );
static int init_hdvec ( int *pdir );
static int deinit_hdvec ( int *pdir );
static int update_hdvec ( int *odir , int *ndir , int on );
static int rotate ( struct VECTOR *dest , struct VECTOR *src , int degrees , in
t n );



/***********************************************************************
 *                          teleoperated                              *
 ***********************************************************************
 * This function is used solely to drive the robot around.            *
 *                                                                    *
 * Author: Gary Gilbreath,  4 Dec 89                                  *
 ***********************************************************************/
int  teleoperated(map_ptr)
map  *map_ptr;
{
     char        str[80];
     byte        batval;
     int         quit;
     int         ii, new, event_occurred;
     long        selection;
     unsigned long       start_time, delta_t;
     packet      pack;
     MENU        *pmenu;
     EVENT       evnt;
     DISPLAY_LIST        *dl;
     static MENU_ITEM file_menu[] = {
         {"Help", 0, 10, 0, 0},
         {"Redraw", 0, 20, 0, NULL},
         {"-", 0, 0, 0, NULL},
         {"Quit", 0, 102, 0, NULL},
         {"Quit and power down", 0, 103, 0, NULL},
         {NULL, 0, 0, 0, NULL}
     };
     static MENU_ITEM wander_menu[] = {
         {"Left turns", 0, 210, 0, 0},
         {"Right turns", 0, 220, 0, 0},
         {"Random turns", 0, 230, GRAYED, 0},
         {"Halt on turn ambiguity", 0, 240, GRAYED, 0},
         {NULL, 0, 0, 0, NULL}
     };
```

```
	static MENU_ITEM map_menu[] = {
		{"Wander turn direction", 0, 300, 0, wander_menu},
		{NULL, 0, 0, 0, NULL}
	};
	static MENU_ITEM bumper_menu[] = {
		{"Top Left Bumper", 0, 10000, 0, NULL},
		{"Top Right Bumper", 0, 10100, 0, NULL},
		{"Upper Right Bumper", 0, 10200, 0, NULL},
		{"Lower Right Bumper", 0, 10300, 0, NULL},
		{"Bottom Right Bumper", 0, 10400, 0, NULL},
		{"Bottom Left Bumper", 0, 10500, 0, NULL},
		{"Lower Left Bumper", 0, 10600, 0, NULL},
		{"Upper Left Bumper", 0, 10700, 0, NULL},
		{NULL, 0, 0, 0, NULL}
	};

	static MENU_ITEM voice_menu[] = {
		{"Assistance", 0, 705, 0, NULL},
		{"Bong", 0, 715, 0, NULL},
		{"Code Red...", 0, 720, 0, NULL},
		{"Go away", 0, 605, 0, NULL},
		{"Greet", 0, 600, 0, NULL},
		{"Help me", 0, 640, 0, NULL},
		{"Intruder, intruder", 0, 645, 0, NULL},
		{"Moving forward", 0, 630, 0, NULL},
		{"Stop", 0, 730, 0, NULL},
		{"Thank you", 0, 615, 0, NULL},
		{"Time", 0, 710, 0, NULL},
		{"Up", 0, 670, 0, NULL},
		{"-", 0, 0, 0, NULL},
		{"Voice power off", 0, 731, 0, NULL},
		{"Keyboard", 0, 631, 0, NULL},
		{NULL, 0, 0, 0, NULL},
	};

	static MENU_ITEM sys_menu[] = {
		{"Camera ON", 0, 500, 0, NULL},
		{"Camera OFF", 0, 510, 0, NULL},
		{"Siren ON", 0, 520, 0, NULL},
		{"Siren OFF", 0, 530, 0, NULL},
		{"Security ON", 0, 540, 0, NULL},
		{"Security OFF", 0, 550, 0, NULL},
		{"Power Up", 0, 32000, 0, NULL},
		{"Power Down", 0, 32005, 0, NULL},
		{NULL, 0, 0, 0, NULL}
	};
	static MENU_ITEM pp_menu_bar[] = {
		{"File", 0, 0, 0, file_menu},
/*		{"Functions", 0, 1, 0, map_menu},*/
		{"Voice", 0, 3, 0, voice_menu},
		{"Bumpers", 0, 4, 0, bumper_menu},
		{"System", 0, 5, 0, sys_menu},
		{NULL, 0, 0, 0, NULL}
	};

extern int debug_port, robot_port;
//debug_port = robot_port;

	mouse_off();
	gpmerge(MRPL);
	gpcolor(BLACK);
	gpclear(0,0, gdmaxcol, gdmaxrow);

	dl = create_dl();		/* create the display list */
	init_tele_display_list(dl);

	pmenu = RegisterMenu(pp_menu_bar);

	tele_init();			/* do initial setup */
	draw_robot();			/* draw the robot outline */

	init_drive();			/* init drive mode */

```

```
	draw_menu(pmenu);

	mouse_on();
	quit = 0;
	left_angular_vel = right_angular_vel = 0.0;
	start_time = mstime();
	while (!quit) {
		/* See if we got a packet. If so, see if it is a halt packet.
		 * The halt packet is layed out as follows:
		 *	<9M07000><01><33>
		 *	    1      2   3
		 * where:
		 *	1 represents the move complete portion
		 *	2 is the robot status (01 is OK)
		 *	3 is the battery voltage in 50mV increments, with an offset
		 *	  of -10.1V (i.e. add 10V to get true voltage after converting
		 *	  to volts).
		 */
		if (wait_packet(&pack, NO_WAIT) == OK) {
			if (strnicmp((char *) pack.data, "9M", 2) == 0) {
				robart.battery_voltage = get_batt_volt(&pack);
				battery_text.t.f = (float) robart.battery_voltage / 100.0;
			}
		}

		/* Handle selections from the mouse */
		selection = NO_SELECTION;
		event_occurred = NO;
		while (GetEvent(&evnt)) {
			switch(evnt.type & 0xFF00) {
			case KEYBOARD :
				if(evnt.data == 0x011B || evnt.data == F10) {
					quit = YES;
				}
				else if (evnt.data == ENTERKEY) {
					selection = pull_select_menu(pmenu, 0, 1);
					event_occurred = YES;
					gpmerge(MRPL);

					if((new = CheckTrap()) != -1)
						il = new;
				}
				else {
					follow_mode = NO;
					do_drive(evnt.data);	/* drive robot around */
					/* If we've just entered follow mode, disable all
					 * the other modes and enable follow mode.
					 */
					if (follow_mode) {
						turn_preference = 0;
						govern_text.t.cp = null_str;
						reflex_text.t.cp = null_str;
						speed_govern_disable = NO;
						/* Need to update the display list here because
						 * the follow text and govern and reflex
						 * texts overlap.
						 */
						update_dl(dl);
						follow_text.t.cp = follow_str;
					}
					else
						follow_text.t.cp = null_str;
					if (seekmode) {
						seek_dir.turn_pref = turn_preference;
						if (turn_preference == 1)
							robart.headDir = 280;
						else
							robart.headDir = 80;
					}
					else {
						seek_dir.turn_pref = 0;
					}

```

```
                        left_angular_vel = angular_vel_table[left_speed];
                        right_angular_vel = angular_vel_table[right_speed];
                        if (left_velocity < 0)
                                left_angular_vel = -left_angular_vel;
                        if (right_velocity < 0)
                                right_angular_vel = -right_angular_vel;
                        lw_temp.value = left_speed;
                        rw_temp.value = right_speed;
                        speed1_text.t.s = left_speed;
                        speed2_text.t.s = right_speed;
                        velocity_text.t.f = vel_table[(left_speed+right_speed)/
2];
                        turn_dir.turn_pref = turn_preference;
                }
                break;

            case MOUSEBUTTONDOWN :
                ii = 0;
                if((new = CheckTrap()) != -1)
                        ii = new;
                if (ii && (ii & 0x00FF) != 0x00FE && (ii & 0x00F0) == 0x00F0) {
                        selection = pull_select_menu(pmenu, (ii & 0x000F), 1);
                        gpmerge(MRPL);
                        event_occurred = YES;

                        if((new = CheckTrap()) != -1)
                                ii = new;
                }
                break;
          }
        }

        if (event_occurred) {                   /* if something selected */
                mouse_off();
                close_menu(pmenu);              /* shutdown the pulldown */
                gpviewport(0,0, gdmaxcol, gdmaxrow);    /* FIX MENU BUG */
        }
        text_foreground(WHITE);
        text_background(BLACK);
        if (selection == 10) {          /* Help! */
                drive_help();
        }
        else if (selection == 20) {     /* redraw the screen */
            gpmerge(MRPL);
            gpcolor(BLACK);
            gpclear(0,0, gdmaxcol, gdmaxrow);
            tele_init();
            draw_robot();
            redraw_dl(dl);
        }
        else if (selection == 102) {            /* quit */
            quit = YES;
        }
        else if (selection == 103) {            /* quit and power down */
            quit = YES;
            x_command(X_SYSTEM, 0);     /* turn system off */
            waitms(250);                /* make sure it gets through */
        }
        else if (selection == 210) {    /* left turn preference */
                turn_preference = 1;
                sprintf(str, "OW%02d", turn_preference);
                put_packet(str);
        }
        else if (selection == 220) {    /* right turn preference */
                turn_preference = 2;
                sprintf(str, "OW%02d", turn_preference);
                put_packet(str);
        }
        else if (selection == 230) {    /* random turn preference */
                turn_preference = 3;
                sprintf(str, "OW%02d", turn_preference);
                put_packet(str);
        }
```

```
        else if (selection == 240) {    /* halt when turn direction is ambiguou
s */
                turn_preference = 4;
                sprintf(str, "OW%02d", turn_preference);
                put_packet(str);
        }
        else if (selection == 500) {
            x_command(X_CAMERA, 1);             /* turn camera on */
        }
        else if (selection == 510) {
            x_command(X_CAMERA, 0);             /* turn camera off */
        }
        else if (selection == 520) {
            x_command(X_SIREN, 1);              /* turn siren on */
        }
        else if (selection == 530) {
            x_command(X_SIREN, 0);              /* turn siren off */
        }
        else if (selection == 530) {
            x_command(X_SIREN, 0);              /* turn siren off */
        }
        else if (selection == 540) {            /* turn intrusion sensors on */
            x_command(X_INTRUSION, 1);
        }
        else if (selection == 550) {            /* turn intrusion sensors off *
/
            x_command(X_INTRUSION, 0);
        }
        else if (selection == 560) {
            debug ^= 1;
        }
        else if (selection == 705) {
                put_packet("Ov0401");   /* say "I need assistance" */
        }
        else if (selection == 715) {
                put_packet("Ov0438");   /* do 3 quick beeps (Bong) */
        }
        else if (selection == 720) {
                put_packet("Ov0439");   /* 3 beeps, then "Code red, repeat, cod
e red" */
        }
        else if (selection == 605) {    /* Go away */
                say("go away");
        }
        else if (selection == 600) {    /* Greet */
                if (rand() & 1)
                        say("hello");
                else
                        say("high");
        }
        else if (selection == 640) {    /* Help me */
                say("help me");
        }
        else if (selection == 645) {    /* Intruder, intruder */
                say("intruder, intruder");
        }
        else if (selection == 630) {    /* Moving forward */
                say("move ing forward");
        }
        else if (selection == 730) {    /* Stop */
                say("stop");
        }
        else if (selection == 615) {    /* Thank you */
                say("thankyou");
        }
        else if (selection == 710) {
                put_packet("Ov0403");   /* Time */
        }
        else if (selection == 670) {    /* Up */
                say("up yours");
        }
        else if (selection == 731) {
                put_packet("Ov0412");   /* turn off voice power */
```

```
        }
        else if (selection == 631) {
            mouse_off();
            while (ggets(str, "Speak:", "") != NULL && str[0]) {
                say(str);
            }
            Clear_Line(25);
            mouse_on();
        }

        else if (selection == 10000) {
                bumper_value ^= 1;
        }
        else if (selection == 10100) {
                bumper_value ^= 2;
        }
        else if (selection == 10200) {
                bumper_value ^= 4;
        }
        else if (selection == 10300) {
                bumper_value ^= 8;
        }
        else if (selection == 10400) {
                bumper_value ^= 0x10;
        }
        else if (selection == 10500) {
                bumper_value ^= 0x20;
        }
        else if (selection == 10600) {
                bumper_value ^= 0x40;
        }
        else if (selection == 10700) {
                bumper_value ^= 0x80;
        }
        else if (selection == 32000) {
            x_command(X_SYSTEM, 1);             /* turn system on */
        }
        else if (selection == 32005) {
            x_command(X_SYSTEM, 0);             /* turn system off */
        }

        if (event_occurred) {           /* if an event occurred, clean up scree
n */
            gpviewport(0,0, gdmaxcol, gdmaxrow);
            pmenu = RegisterMenu(pp_menu_bar);
            draw_menu(pmenu);
            mouse_on();
        }
        if (mstime() - start_time > 4) {
                delta_t = mstime() - start_time;
                if (delta_t > 10000L)
                        delta_t = 0;
                start_time = mstime();
                move_wheel(left_wheel, left_angular_vel, delta_t);
                move_wheel(right_wheel, right_angular_vel, delta_t);
        }
        if (turn_preference == 0) {
                reflex_text.t.cp = null_str;
                govern_text.t.cp = null_str;
                speed_govern_disable = NO;
        }
        else if (seekmode && (mstime() - seektimeout < 10000L)) {
                reflex_text.t.cp = seek_str;
                govern_text.t.cp = null_str;
                speed_govern_disable = NO;
        }
        else {
                reflex_text.t.cp = reflex_str;
                if (speed_govern_disable)
                        govern_text.t.cp = govern_str;
                else
                        govern_text.t.cp = null_str;
                if (seekmode) {
```

```
                                seek_dir.turn_pref = 0;
                                seekmode = NO;
                                robart.headDir = 0;
                        }
                }
                headdir_text.t.s = robart.headDir;
debug_out("UD\r\n");
                update_dl(dl);
debug_out("du\r\n");
        }

        deinit_drive();

        destroy_dl(dl);

        close_menu(pmenu);
debug_port = -1;

        return (OK);
}


/* tele_init - initialize some of the global variables, create tables, etc. */
tele_init()
{
        int     ii;
        double  angle_inc, cur_angle, rad_angle;

        /* Create the ypos array.  This array contains the Y coordinate of
         * each tread, indexed by the treads current angle.  An array is
         * used to avoid calculating a transcendental every time a tread
         * needs to be moved.  Note that the values between 91 and 269 are
         * all set to -1, indicating that that line will never be visible.
         * The center of the wheel (as viewed from the top) is taken to
         * be at 0 degrees.  The part of the wheel furthest forward on
         * the robot (most toward the top of the screen) is at 90 degrees,
         * and that most toward the rear of the robot (most toward the bottom
         * of the screen) is at 270 degrees.
         */
        for (ii = 0, cur_angle = 0.0; ii < 360; ii++, cur_angle += 1.0) {

                /* If the angle is in the "invisible" zone, mark it with -1 */
                if (ii > 90 && ii < 270) {
                        ypos_array[ii] = -1;
                        continue;
                }
                rad_angle = cur_angle * (PI/180.0);     /* degrees -> radians *
/
                if (cur_angle >= 270)
                        ypos_array[ii] = (int) ((SCREEN_HEIGHT/2) - (sin(rad_an
gle) * (WHEEL_DIAMETER/2)));
                else
                        ypos_array[ii] = (int) ((SCREEN_HEIGHT/2) - (sin(rad_an
gle) * (WHEEL_DIAMETER/2)));
        }

        /* Now initialize the tread arrays.  This involves setting the
         * X and Y position of each tread and the angle of each tread
         */
        angle_inc = 360.0 / NTREADS;            /* angular spacing of treads */
        for (ii = 0, cur_angle = 0.0; ii < NTREADS; ii++, cur_angle += angle_in
c) {
                left_wheel[ii].xpos = LEFT_W_LOC_X;
                left_wheel[ii].ypos = ypos_array[(int) cur_angle];
                left_wheel[ii].angle = (int) cur_angle;
                right_wheel[ii].xpos = RIGHT_W_LOC_X;
                right_wheel[ii].ypos = ypos_array[(int) cur_angle];
                right_wheel[ii].angle = (int) cur_angle;
        }

        /* Create the angular velocity table.  This is derived from the
         * vel_table information in the deadreck.c file.
         */
```

```
        for (ii = 0; ii < 16; ii++) {
                angular_vel_table[ii] = (int) (vel_table[ii] * 360.0 / WHEEL_CI
RCUMFERENCE);
        }
        return (OK);
}


/* init_tele_display_list - initialize the display list for the teleoperated
 *      screen.
 */
init_tele_display_list(dl)
DISPLAY_LIST *dl;
{
        add_dl_item(dl, &lw_arrow, sizeof(lw_arrow), 0, init_arrow, deinit_arro
w,
                        copy_arrow, free_arrow,
                        update_arrow, cmp_arrow);
        add_dl_item(dl, &rw_arrow, sizeof(rw_arrow), 0, init_arrow, deinit_arro
w,
                        copy_arrow, free_arrow,
                        update_arrow, cmp_arrow);
        add_dl_item(dl, &lw_temp, sizeof(lw_temp), 0, init_temp, deinit_temp,
                        NULL, NULL,
                        update_temp, NULL);
        add_dl_item(dl, &rw_temp, sizeof(rw_temp), 0, init_temp, deinit_temp,
                        NULL, NULL,
                        update_temp, NULL);

        add_dl_item(dl, &turn_dir, sizeof(turn_dir), 0, init_flasher, deinit_fl
asher,
                        NULL, NULL,
                        update_flasher, NULL);
        add_dl_item(dl, &seek_dir, sizeof(seek_dir), 0, init_flasher, deinit_fl
asher,
                        NULL, NULL,
                        update_flasher, NULL);

        /* Add battery voltage */
        battery_text.t.f = 12.0;
        add_dl_item(dl, &battery_text, sizeof(battery_text), 0, init_text, dein
it_text,
                        NULL, NULL,
                        update_text, cmp_text);
        /* Add average forward/backward velocity */
        velocity_text.t.f = 0.0;
        add_dl_item(dl, &velocity_text, sizeof(velocity_text), 0, init_text, de
init_text,
                        NULL, NULL,
                        update_text, cmp_text);

        headdir_text.t.s = 0;
        add_dl_item(dl, &headdir_text, sizeof(headdir_text), 0, init_text, dein
it_text,
                        NULL, NULL,
                        update_text, cmp_text);

        /* Add robot commanded speed */
        add_dl_item(dl, &speed1_text, sizeof(speed1_text), 0, init_text, deinit
_text,
                        NULL, NULL,
                        update_text, cmp_text);
        add_dl_item(dl, &speed2_text, sizeof(speed2_text), 0, init_text, deinit
_text,
                        NULL, NULL,
                        update_text, cmp_text);

        /* Bumper values */
        add_dl_item(dl, &bumper_value, sizeof(bumper_value), DL_BLINK, init_bum
per, deinit_bumper,
                        NULL, NULL,
                        update_bumper, NULL);
```

```
        /* Text strings */
        reflex_text.t.cp = null_str;
        govern_text.t.cp = null_str;
        follow_text.t.cp = null_str;
        add_dl_item(dl, &reflex_text, sizeof(reflex_text), 0, init_text, deinit
_text,
                        NULL, NULL,
                        update_text, cmp_text);
        add_dl_item(dl, &govern_text, sizeof(govern_text), DL_BLINK, init_text,
deinit_text,
                        NULL, NULL,
                        update_text, cmp_text);
        add_dl_item(dl, &follow_text, sizeof(follow_text), 0, init_text, deinit
_text,
                        NULL, NULL,
                        update_text, cmp_text);

        /* Head vector */
        add_dl_item(dl, &robart.headDir, sizeof(robart.headDir), 0, init_hdvec,
deinit_hdvec,
                        NULL, NULL, update_hdvec, NULL);
        return (OK);
}


/* draw_robot - draw the outline of the robot */
draw_robot()
{
        int     ii;

        gpcolor(GREEN);

        /* First, draw the outline of the robot */
        gpmove(BASE_LOC_X, BASE_LOC_Y);
        gprect(BASE_COR_X, BASE_COR_Y);

        /* Draw the wheels within the robot */
        gpcolor(WHITE);
        gpmove(LEFT_W_LOC_X, LEFT_W_LOC_Y-1);
        gpbox(LEFT_W_COR_X, LEFT_W_COR_Y+1);
        gpmove(RIGHT_W_LOC_X, RIGHT_W_LOC_Y-1);
        gpbox(RIGHT_W_COR_X, RIGHT_W_COR_Y+1);

        /* Draw the treads on the wheels */
        gpcolor(BLACK);                         /* tread is black */
        for (ii = 0; ii < NTREADS; ii++) {
                if (left_wheel[ii].ypos != -1) {
                        gpmove(left_wheel[ii].xpos, left_wheel[ii].ypos);
                        gpline(left_wheel[ii].xpos+WHEEL_WIDTH, left_wheel[ii].
ypos);
                }
                if (right_wheel[ii].ypos != -1) {
                        gpmove(right_wheel[ii].xpos, right_wheel[ii].ypos);
                        gpline(right_wheel[ii].xpos+WHEEL_WIDTH, right_wheel[ii
].ypos);
                }
        }

        /* Draw Speed above speed temperature bars */
        text_foreground(MAGENTA);
        text_move(498, 117);
        text_out("Speed");
        return (OK);
}


/* move_wheel - move the spoke/tread marks of the wheel, according to the
 *      given speed and wheel structure
 */
static move_wheel(wheel, angular_velocity, delta_t)
TREAD *wheel;
double angular_velocity;
long delta_t;
```

```
{
        int     ii;
        int     newypos;
        int     mouse_is_off;
        float   delta_angle, newangle;

        mouse_is_off = 0;
        delta_angle = (float) (angular_velocity * delta_t / 1000.0);
debug_out("EM\r\n");
        for (ii = 0; ii < NTREADS; ii++) {
                /* Calculate the new angular position (in degrees), making
                 * sure it is in the range 0 - 359
                 */
                newangle = (float) fmod(wheel->angle + delta_angle, 360.0);
                if (newangle < 0.0)
                        newangle += 360.0;

                newypos = ypos_array[(int) newangle];   /* get new ypos of line
 */
                /* If the new tread position is different than the old one,
                 * we need to update the screen.
                 */
                if (newypos != wheel->ypos) {
                        /* If the tread mark is currently visible, see if
                         * we need to erase it and possibly move it.
                         */
                        if (wheel->angle <= 90.0 || wheel->angle >= 270.0) {
                                /* If the new angle will move the tread
                                 * beyond visibility, then just erase the
                                 * tread.
                                 */
                                if (newangle > 90.0 && newangle < 270.0) {
                                        if (!mouse_is_off) {
                                                mouse_is_off++;
                                                mouse_off();
                                        }
                                        gpmove(wheel->xpos, wheel->ypos);
                                        gpcolor(WHITE);
                                        gpline(wheel->xpos+WHEEL_WIDTH, wheel->
ypos);
                                }
                                /* If tread is still visible, just move it.
                                 */
                                else {
                                        if (!mouse_is_off) {
                                                mouse_is_off++;
                                                mouse_off();
                                        }
                                        /* erase old line */
                                        gpmove(wheel->xpos, wheel->ypos);
                                        gpcolor(WHITE);
                                        gpline(wheel->xpos+WHEEL_WIDTH, wheel->
ypos);

                                        /* draw new one */
                                        gpmove(wheel->xpos, newypos);
                                        gpcolor(BLACK);
                                        gpline(wheel->xpos+WHEEL_WIDTH, newypos
);
                                }
                        }
                        /* If the tread wasn't visible, see if it is now
                         * visible, and if so, draw it on the screen.
                         */
                        else {
                                if (newangle <= 90.0 || newangle >= 270.0) {
                                        if (!mouse_is_off) {
                                                mouse_is_off++;
                                                mouse_off();
                                        }
                                        gpmove(wheel->xpos, newypos);
                                        gpcolor(BLACK);
                                        gpline(wheel->xpos+WHEEL_WIDTH, newypos
```

```
);
                                }
                        }
                }
                wheel->angle = newangle;
                wheel->ypos = newypos;
                wheel++;
        }
        if (mouse_is_off)
                mouse_on();
debug_out("lm\r\n");
        return (OK);
}


/*********************************************************************
 *                      Display List Functions                       *
 *********************************************************************/


static int init_arrow(parrow)
ARROW *parrow;
{
        mouse_off();
        draw_arrow(parrow->x, parrow->y, *(parrow->velocity), RED);
        gpmove(parrow->x, parrow->y);
        gpball(3);
        mouse_on();
        return (OK);
}


static ARROW *copy_arrow(curarrow, oldarrow)
ARROW *curarrow, *oldarrow;
{
        if (oldarrow == NULL) {
                oldarrow = (ARROW *) calloc(1, sizeof(ARROW));
                if (oldarrow == NULL)
                        return (NULL);
                oldarrow->velocity = (int *) malloc(sizeof(*oldarrow->velocity)
);
                if (oldarrow->velocity == NULL) {
                        free(oldarrow);
                        return (NULL);
                }
        }

        oldarrow->x = curarrow->x;
        oldarrow->y = curarrow->y;
        *(oldarrow->velocity) = *(curarrow->velocity);
        return (oldarrow);
}


static int free_arrow(oldarrow)
ARROW *oldarrow;
{
        if (oldarrow == NULL)
                return (-1);
        free(oldarrow->velocity);
        free(oldarrow);
        return (0);
}

static int update_arrow(poldarr, pnewarr, on)
ARROW *poldarr, *pnewarr;
int on;
{
        mouse_off();
        gpcolor(BLACK);
        gpmove(poldarr->x, poldarr->y);
        gpball(3);
        draw_arrow(poldarr->x, poldarr->y, *(poldarr->velocity), BLACK);
```

```
	if (on) {
		draw_arrow(pnewarr->x, pnewarr->y, *(pnewarr->velocity), RED);
		gpmove(poldarr->x, poldarr->y);
		gpball(3);
	}
	mouse_on();
	return (OK);
}


static int cmp_arrow(pold, pnew)
ARROW *pold, *pnew;
{
	return (!(*(pold->velocity) == *(pnew->velocity)));
}


static int deinit_arrow(parrow)
ARROW *parrow;
{
	mouse_off();
	draw_arrow(parrow->x, parrow->y, *(parrow->velocity), BLACK);
	gpmove(parrow->x, parrow->y);
	gpball(3);
	mouse_on();
	return (OK);
}



static draw_arrow(x, y, vel, color)
int x, y, vel, color;
{
	int	ycoord;

	mouse_off();
	gpcolor(color);
	gpmove(x, y);
	gpball(3);
	if (vel) {
		ycoord = y - (vel * 3);
		gpmove(x-1, y);
		gpbox(x+1, ycoord);

		/* Now draw the arrow part */
		gpmove(x-1, ycoord);
		gpline(x-4, ycoord);
		if (vel < 0)
			gpline(x, ycoord+4);
		else
			gpline(x, ycoord-4);
		gpline(x+4, ycoord);
		gpline(x+1, ycoord);
		if (vel < 0)
			gpmove(x, ycoord+2);
		else
			gpmove(x, ycoord-2);
		gpfill(color);
	}
	mouse_on();
	return (0);
}


/************************ Temperature gauge speed **********************/
static int init_temp(ptemp)
TEMPERATURE *ptemp;
{
	int	box_height, height_10, width;
	int	x, y;

	mouse_off();
	box_height = ptemp->height / 3;
```

```
	height_10 = ptemp->height / 10;
	width = ptemp->width;
	gpcolor(RED);
	gpmerge(MRPL);
	x = ptemp->xpos, y = ptemp->ypos;
	gpmove(x, y);
	gpbox(x+width, y+box_height);

	y += box_height;
	gpcolor(YELLOW);
	gpmove(x, y);
	gpbox(x+width, y+box_height);

	y += box_height;
	gpcolor(GREEN);
	gpmove(x, y);
	gpbox(x+width, y+box_height);


	ptemp->scale = ((double) ptemp->height - height_10*2) / (double) ptemp->range;

/*	draw_temp(ptemp, 0);*/
	mouse_on();
	return (OK);
}


static int deinit_temp(ptemp)
TEMPERATURE *ptemp;
{
	mouse_off();
	gpmerge(MRPL);
	gpcolor(BLACK);
	gpmove(ptemp->xpos, ptemp->ypos);
	gpbox(ptemp->xpos+ptemp->width, ptemp->ypos+ptemp->height);
	mouse_on();
	return (OK);
}


static int update_temp(otemp, ntemp, on)
TEMPERATURE *otemp, *ntemp;
int on;
{
	mouse_off();
	draw_temp(otemp, 0);
	draw_temp(ntemp, on);
	mouse_on();
	return (OK);
}


static draw_temp(ptemp, on)
TEMPERATURE *ptemp;
int on;
{
	int	box_height, height_10;
	int	length, red_height, yellow_height;
	int	botx, boty, topx, topy;

	length = (int) (ptemp->value * ptemp->scale + 0.5);
	height_10 = ptemp->height/10;
	box_height = ptemp->height / 3;

	red_height = ptemp->ypos + box_height;
	yellow_height = red_height + box_height;

	topx = ptemp->xpos + ptemp->width - ptemp->width/4;
	topy = ptemp->ypos + ptemp->height - height_10 - length;
	botx = ptemp->xpos + ptemp->width/4;
	boty = ptemp->ypos + ptemp->height - height_10;

```

```
        mouse_off();
        if (on) {
                gpcolor(MAGENTA);
                gpmove(botx, boty);
                gpbox (topx, topy);
        }
        else {
                if (topy <= red_height) {
                        gpcolor(RED);
                        gpmove(botx, red_height);
                        gpbox(topx, topy);
                }
                if (topy <= yellow_height) {
                        gpcolor(YELLOW);
                        gpmove(botx, yellow_height);
                        gpbox(topx, red_height);
                }
                gpcolor(GREEN);
                gpmove(botx, boty);
                gpbox(topx, yellow_height);
        }
        mouse_on();
        return (0);
}


/****************************** Text Stuff ******************************/

static int init_text(ptext)
T_TEXT *ptext;
{
        char    str[132];
        int     x, y;

        mouse_off();
        x = ptext->x;
        y = ptext->y;
        text_foreground(ptext->fore);
        text_background(ptext->back);
        text_move(x, y);
        text_out(ptext->label);
        text_fmt_str(str, ptext);
        /*lint -e15 */
        text_move(x+strlen(ptext->label)*8, y);
        /*lint +e15 */
        text_out(str);
        mouse_on();
        return (OK);
}


static int deinit_text(ptext)
T_TEXT *ptext;
{
        int     x, y;

        mouse_off();
        x = ptext->x;
        y = ptext->y;
        text_foreground(BLACK);
        text_background(BLACK);
        text_move(x, y);
        text_out(ptext->label);
        draw_text(ptext, 0);
        mouse_on();
        return (OK);
}


static int update_text(otext, ntext, on)
T_TEXT *otext, *ntext;
int on;
{
```

```
        mouse_off();
        draw_text(otext, 0);
        if (on)
                draw_text(ntext, 1);
        mouse_on();
        return (OK);
}


static draw_text(ptext, on)
T_TEXT *ptext;
int on;
{
        char    str[132];
        int     x, y;
        unsigned int len;

        mouse_off();
        if (on) {
                text_foreground(ptext->fore);
                text_background(ptext->back);
        }
        else {
                text_foreground(BLACK);
                text_background(BLACK);
        }
        len = strlen(ptext->label)*8;
        x = ptext->x + len;
        y = ptext->y;
        text_fmt_str(str, ptext);
        text_move(x, y);
        text_out(str);
        mouse_on();
        return (0);
}


static text_fmt_str(str, ptext)
char *str;
T_TEXT *ptext;
{
        switch (ptext->type) {
        case T_SHORT:
                sprintf(str, ptext->fmt, ptext->t.s);
                break;
        case T_LONG:
                sprintf(str, ptext->fmt, ptext->t.l);
                break;
        case T_STRING:
                sprintf(str, ptext->fmt, ptext->t.cp);
                break;
        case T_FLOAT:
                sprintf(str, ptext->fmt, ptext->t.f);
                break;
        default:
                sprintf(str, "BAD TYPE: %d", ptext->type);
        }
        return (0);
}


static cmp_text(otext, ntext)
T_TEXT *otext, *ntext;
{
        switch (otext->type) {
        case T_SHORT:
                return (!(otext->t.s == ntext->t.s));
        case T_LONG:
                return (!(otext->t.l == ntext->t.l));
        case T_STRING:
                return (strcmp(otext->t.cp, ntext->t.cp));
        case T_FLOAT:
                return (!(otext->t.f == ntext->t.f));
```

```
        }
        return (0);
}


/****************************** Flasher Functions *************************/

static int init_flasher(pflash)
FLASHER *pflash;
{
        mouse_off();
        flash_arrow(pflash, 1);          /* draw left arrow */
        flash_arrow(pflash, 2);          /* draw right arrow */
        if (pflash->turn_pref == 1) {
                gpmove(pflash->x - pflash->separation/2, pflash->y);
                fill(GREEN);
        }
        else if (pflash->turn_pref == 2) {
                gpmove(pflash->x + pflash->separation/2, pflash->y);
                fill(GREEN);
        }
        mouse_on();
        return (OK);
}


static int deinit_flasher(pflash)
FLASHER *pflash;
{
        mouse_off();
        gpcolor(BLACK);
        gpmove(pflash->x - pflash->separation/2 + 1, pflash->y);
        flood(GREEN);
        gpmove(pflash->x + pflash->separation/2 - 1, pflash->y);
        flood(GREEN);
        mouse_on();
        return (OK);
}


static int update_flasher(oflash, nflash, on)
FLASHER *oflash, *nflash;
int on;
{
        mouse_off();
        gpcolor(BLACK);

        /* Erase left arrow */
        if (oflash->turn_pref == 1) {
                gpmove(oflash->x - oflash->separation/2 + 1, oflash->y);
                flood(GREEN);
                flash_arrow(oflash, 1);
        }
        else if (oflash->turn_pref == 2) {
                /* Erase right arrow */
                gpmove(oflash->x + oflash->separation/2 - 1, oflash->y);
                flood(GREEN);
                flash_arrow(oflash, 2);
        }
        if (nflash->turn_pref == 1) {
                gpcolor(GREEN);
                gpmove(nflash->x - nflash->separation/2, nflash->y);
                fill(GREEN);
        }
        else if (nflash->turn_pref == 2) {
                gpcolor(GREEN);
                gpmove(nflash->x + nflash->separation/2, nflash->y);
                fill(GREEN);
        }
        mouse_on();
        return (OK);
}
```

```

static flash_arrow(pflash, dir)
FLASHER *pflash;
int dir;
{
        int     x, y;

        mouse_off();
        y = pflash->y;
        if (dir == 1) {          /* Draw left facing arrow */
                x = pflash->x - pflash->separation/2;
                gpcolor(GREEN);
                gpmove(x + 1, y + 4);
                gpline(x - 10, y + 4);
                gpline(x - 10, y + 8);
                gpline(x - 18, y);
                gpline(x - 10, y - 8);
                gpline(x - 10, y - 4);
                gpline(x + 1, y - 4);
                gpline(x + 1, y + 4);
        }
        else if (dir == 2) {             /* Draw right facing arrow */
                x = pflash->x + pflash->separation/2;
                gpcolor(GREEN);
                gpmove(x - 1, y + 4);
                gpline(x + 10, y + 4);
                gpline(x + 10, y + 8);
                gpline(x + 18, y);
                gpline(x + 10, y - 8);
                gpline(x + 10, y - 4);
                gpline(x - 1, y - 4);
                gpline(x - 1, y + 4);
        }
        mouse_on();
        return (OK);
}


/***************************** Bumper Routines *************************/

static int init_bumper(pbumpers)
byte *pbumpers;
{
        mouse_off();
        gpcolor(LRED);

        /* Draw upper left bumper */
#if 0
        gpmove(U_L_BUMPER_X+BUMPER_WIDTH+1, U_L_BUMPER_Y);
        gpline(U_L_BUMPER_X+BUMPER_WIDTH+1, U_L_BUMPER_Y+ROBOT_LENGTH/2);
        gpline(U_L_BUMPER_X, U_L_BUMPER_Y+ROBOT_LENGTH/2);
        gpline(U_L_BUMPER_X, U_L_BUMPER_Y-BUMPER_WIDTH);
        gpline(U_L_BUMPER_X+BUMPER_WIDTH+1, U_L_BUMPER_Y);
#else
        gpmove(U_L_BUMPER_X, U_L_BUMPER_Y);
        gprect(U_L_BUMPER_X+BUMPER_WIDTH+1, U_L_BUMPER_Y+ROBOT_LENGTH/2);
#endif

        /* Top left bumper */
        gpmove(T_L_BUMPER_X, T_L_BUMPER_Y);
        gprect(T_L_BUMPER_X+ROBOT_WIDTH/2, T_L_BUMPER_Y-BUMPER_WIDTH);

        /* Top right bumper */
        gpmove(T_R_BUMPER_X, T_R_BUMPER_Y);
        gprect(BASE_COR_X, T_R_BUMPER_Y-BUMPER_WIDTH);

        /* Draw upper right bumper */
        gpmove(U_R_BUMPER_X, U_R_BUMPER_Y);
        gprect(U_R_BUMPER_X+BUMPER_WIDTH+1, U_R_BUMPER_Y+ROBOT_LENGTH/2);

        /* Draw lower right bumper */
        gpmove(L_R_BUMPER_X, L_R_BUMPER_Y);
        gprect(L_R_BUMPER_X+BUMPER_WIDTH+1, BASE_COR_Y);
```

```
	/* Bottom right bumper */
	gpmove(B_R_BUMPER_X, B_R_BUMPER_Y);
	gprect(BASE_COR_X, B_R_BUMPER_Y+BUMPER_WIDTH);

	/* Bottom left bumper */
	gpmove(B_L_BUMPER_X, B_L_BUMPER_Y);
	gprect(B_L_BUMPER_X+ROBOT_WIDTH/2, B_L_BUMPER_Y+BUMPER_WIDTH);

	/* Draw lower left bumper */
	gpmove(L_L_BUMPER_X, L_L_BUMPER_Y);
	gprect(L_L_BUMPER_X+BUMPER_WIDTH+1, BASE_COR_Y);

	mouse_on();
	return (OK);
}


static int deinit_bumper(pbumpers)
byte *pbumpers;
{
	return (OK);
}

static int update_bumper(obumpers, nbumpers, on)
byte *obumpers, *nbumpers;
int on;
{
	byte	bumper_change;

	mouse_off();
	bumper_change = *obumpers ^ *nbumpers;
	/* If we want everything turned off, turn off the ones that are
	 * currently on.
	 */
	gpcolor(BLACK);
	if ((!on && (*obumpers & 0x01)) || ((bumper_change & 0x01) && !(*nbumpers & 0x01))) {
		gpmove(T_L_BUMPER_X+1, T_L_BUMPER_Y-1);
		gpfill(LRED);
	}
	if ((!on && (*obumpers & 0x02)) || ((bumper_change & 0x02) && !(*nbumpers & 0x02))) {
		gpmove(T_R_BUMPER_X+1, T_R_BUMPER_Y-1);
		gpfill(LRED);
	}
	if ((!on && (*obumpers & 0x04)) || ((bumper_change & 0x04) && !(*nbumpers & 0x04))) {
		gpmove(U_R_BUMPER_X+1, U_R_BUMPER_Y+1);
		gpfill(LRED);
	}
	if ((!on && (*obumpers & 0x08)) || ((bumper_change & 0x08) && !(*nbumpers & 0x08))) {
		gpmove(L_R_BUMPER_X+1, L_R_BUMPER_Y+1);
		gpfill(LRED);
	}
	if ((!on && (*obumpers & 0x10)) || ((bumper_change & 0x10) && !(*nbumpers & 0x10))) {
		gpmove(B_R_BUMPER_X+1, B_R_BUMPER_Y+1);
		gpfill(LRED);
	}
	if ((!on && (*obumpers & 0x20)) || ((bumper_change & 0x20) && !(*nbumpers & 0x20))) {
		gpmove(B_L_BUMPER_X+1, B_L_BUMPER_Y+1);
		gpfill(LRED);
	}
	if ((!on && (*obumpers & 0x40)) || ((bumper_change & 0x40) && !(*nbumpers & 0x40))) {
		gpmove(L_L_BUMPER_X+1, L_L_BUMPER_Y+1);
		gpfill(LRED);
	}
	if ((!on && (*obumpers & 0x80)) || ((bumper_change & 0x80) && !(*nbumpers & 0x80))) {
```

```
		gpmove(U_L_BUMPER_X+1, U_L_BUMPER_Y+1);
		gpfill(LRED);
	}
	if (on) {
		gpcolor(RED);
		if (*nbumpers & 0x01) {
			gpmove(T_L_BUMPER_X+1, T_L_BUMPER_Y-1);
			gpfill(LRED);
		}
		if (*nbumpers & 0x02) {
			gpmove(T_R_BUMPER_X+1, T_R_BUMPER_Y-1);
			gpfill(LRED);
		}
		if (*nbumpers & 0x04) {
			gpmove(U_R_BUMPER_X+1, U_R_BUMPER_Y+1);
			gpfill(LRED);
		}
		if (*nbumpers & 0x08) {
			gpmove(L_R_BUMPER_X+1, L_R_BUMPER_Y+1);
			gpfill(LRED);
		}
		if (*nbumpers & 0x10) {
			gpmove(B_R_BUMPER_X+1, B_R_BUMPER_Y+1);
			gpfill(LRED);
		}
		if (*nbumpers & 0x20) {
			gpmove(B_L_BUMPER_X+1, B_L_BUMPER_Y+1);
			gpfill(LRED);
		}
		if (*nbumpers & 0x40) {
			gpmove(L_L_BUMPER_X+1, L_L_BUMPER_Y+1);
			gpfill(LRED);
		}
		if (*nbumpers & 0x80) {
			gpmove(U_L_BUMPER_X+1, U_L_BUMPER_Y+1);
			gpfill(LRED);
		}
	}
	mouse_on();
	return (OK);
}


/******************************** Head vector *************************/
static int init_hdvec(pdir)
int *pdir;
{
	int	ii;

	rotate(rotated_head_vec, head_vec, *pdir, 8);
	mouse_off();
	gpmove(HEAD_CENTER_X + rotated_head_vec[0].x, HEAD_CENTER_Y - rotated_head_vec[0].y);
	gpcolor(YELLOW);
	for (ii = 1; ii < 8; ii++)
		gpline(HEAD_CENTER_X + rotated_head_vec[ii].x, HEAD_CENTER_Y - rotated_head_vec[ii].y);
#if 1
	gpmove(HEAD_CENTER_X, HEAD_CENTER_Y);
	fill(YELLOW);
#endif
	mouse_on();
	return (OK);
}


static int deinit_hdvec(pdir)
int *pdir;
{
	return (OK);
}
```

```
static int update_hdvec(odir, ndir, on)
int *odir, *ndir;
int on;
{
        int     ii;

        mouse_off();
        gpcolor(BLACK);
#if 1
        gpmove(HEAD_CENTER_X, HEAD_CENTER_Y);
        flood(YELLOW);
#else
        gpmove(HEAD_CENTER_X + rotated_head_vec[0].x, HEAD_CENTER_Y - rotated_h
ead_vec[0].y);
        for (ii = 1; ii < 8; ii++)
                gpline(HEAD_CENTER_X + rotated_head_vec[ii].x, HEAD_CENTER_Y -
rotated_head_vec[ii].y);
#endif
        rotate(rotated_head_vec, head_vec, *ndir, 8);
        gpcolor(YELLOW);
        gpmove(HEAD_CENTER_X + rotated_head_vec[0].x, HEAD_CENTER_Y - rotated_h
ead_vec[0].y);
        for (ii = 1; ii < 8; ii++)
                gpline(HEAD_CENTER_X + rotated_head_vec[ii].x, HEAD_CENTER_Y -
rotated_head_vec[ii].y);
#if 1
        gpmove(HEAD_CENTER_X, HEAD_CENTER_Y);
        fill(YELLOW);
#endif
        mouse_on();
        return (OK);
}


static rotate(dest, src, degrees, n)
struct VECTOR *dest, *src;
int degrees, n;
{
        double  sinval, cosval, radians, xval, yval;
        int     ii;

        degrees = force360(degrees);
        radians = degrees * PI / 180.0;
        sinval = sin(radians);
        cosval = cos(radians);

        for (ii = 0; ii < n; ii++) {
                xval =  src[ii].x * cosval + src[ii].y * sinval;
                yval = -src[ii].x * sinval + src[ii].y * cosval;
                if (xval < 0.0)
                        dest[ii].x = (int) (xval - 0.5);
                else
                        dest[ii].x = (int) (xval + 0.5);
                if (yval < 0.0)
                        dest[ii].y = (int) (yval - 0.5);
                else
                        dest[ii].y = (int) (yval + 0.5);
        }
        return (OK);
}
```

```
/*******************************************************************
 *                          tty.c                                  *
 *******************************************************************
 * A simple tty driver.  Puts characters into a window on the IBM as *
 * if the window were a terminal.                                  *
 *                                                                 *
 * Written by:  Gary Gilbreath  20 Aug 87                          *
 *                                                                 *
 *******************************************************************/

#include <stdio.h>
#include <crtvideo.h>
#include <event.h>

#include "headers/ibmio.h"

static int  urow, ucol, lrow, lcol;

static int  currow, curcol;

static int  inited = 0;     /* 1 => package has been initialized */


/* inittty - initialize the tty interface.  Sets the window size and position
 *  and initializes everything.
 *
 * Call:    inittty(row, col, nlines, ncols);
 *
 * Where:
 *  row = row of upper left corner, 0 - 24 (0 is top line)
 *  col = leftmost column, 0 - 79 (0 is left most)
 *  nlines  = number of lines in window, max is 25 - row
 *  ncols   = number of columns in window, max is 80 - col
 *
 * Returns: 0 if everything OK
 *      -1 if something wasn't right
 */
inittty(row, col, nlines, ncols)
int row, col, nlines, ncols;
{
    mouse_off();
    gpterm();
    if (row < 0 || row > 24)
        return (-1);
    if (col < 0 || col > 79)
        return (-1);
    if (nlines < 1 || nlines > (25-row))
        return (-1);
    if (ncols < 1 || ncols > (80-col))
        return (-1);

    urow = row;
    lrow = row + nlines;
    ucol = col;
    lcol = col + ncols;

    /* Set the cursor position to the upper left corner */
    currow = row;
    curcol = col;
    crt_video();
    crt_movecur(currow, curcol);

    /* Clear the screen */
    crt_clsa(IWHITE, BLUE);     /* clear the screen */
    inited = 1;
    return (0);
}


/* deinittty - de-initialize the tty interface
 *
 * Returns:
```

```
 *      0 if everything OK
 *     -1 if tty not already initialized
 */
deinittty()
{
    if (inited != 1)
        return (-1);
    crt_clsa(IWHITE, BLACK);    /* clear the screen */
    gpinit(5);
    mouse_on();
    return (0);
}


/* ttyclear - clear the screen
 *
 * Returns:
 *      0
 */
ttyclear()
{
    crt_scroll(IWHITE, BLUE, urow, ucol, lrow-urow+1, lcol-ucol+1, 0, WSCROLLUP
);
    currow = urow;
    curcol = ucol;
    crt_movecur(currow, curcol);
}


/* ttyout - output a character to the tty window.
 *
 * Returns:  0 if output OK
 *      -1 if terminal window not initialized yet
 */
ttyout(cc)
int cc;
{
    if (inited != 1)
        return (-1);
    cc &= 0x7f;
    switch (cc) {
    case 0x00:
    case 0x01:
    case 0x02:
    case 0x03:
    case 0x04:
    case 0x05:
    case 0x06:
    case 0x0b:
    case 0x0e:
    case 0x0f:
    case 0x10:
    case 0x11:
    case 0x12:
    case 0x13:
    case 0x14:
    case 0x15:
    case 0x16:
    case 0x17:
    case 0x18:
    case 0x19:
    case 0x1a:
    case 0x1b:
    case 0x1c:
    case 0x1d:
    case 0x1e:
    case 0x1f:
        break;  /* do nothing will control characters */

    case 0x07:  /* bell? */
        putch(cc);
        break;
```

```
        case 0x08:  /* backspace? */
            if (--curcol < 0) { /* backup a line also? */
                if (--currow < 0)   /* back off of screen? */
                    currow = curcol = 0;
                else
                    curcol = 79;    /* go to end of previous line */
            }
            crt_movecur(currow, curcol);
            break;

        case 0x09:  /* tab? */
            curcol = (curcol & 0xfff8) + 8; /* go to next tab stop */
            if (curcol > 79) {      /* screen wrap? */
                curcol = 0;     /* go to first column */
                if (++currow > lrow) {  /* at bottom of window? */
                    currow = lrow;  /* go back to bottom row */
                    crt_scroll(IWHITE, BLUE, urow, ucol, lrow-urow+1, lcol-ucol+1,
 1, WSCROLLUP);
                }
            }
            crt_movecur(currow, curcol);
            break;

        case 0x0a:  /* line feed? */
            if (++currow > lrow) {  /* fall off bottom of window? */
                currow = lrow;  /* go back to bottom row */
                    crt_scroll(IWHITE, BLUE, urow, ucol, lrow-urow+1, lcol-ucol+1,
 1, WSCROLLUP);
            }
            crt_movecur(currow, curcol);
            break;

        case 0x0c:  /* form feed? */
            /* Blank the screen */
            crt_clsa(IWHITE, BLUE); /* clear the screen */
            currow = curcol = 0;
            crt_movecur(currow, curcol);
            break;

        case 0x0d:  /* carriage return? */
            curcol = 0;
            crt_movecur(currow, curcol);
            break;

        default:        /* a printable ASCII character */
            crt_putc(IWHITE, BLUE, currow, curcol, (byte) cc, 1);
            if (++curcol > 79) {        /* go beyond 80th column? */
                curcol = 0;     /* go to first column */
                if (++currow > lrow) {  /* at bottom of window? */
                    currow = lrow;  /* go back to bottom row */
                    crt_scroll(IWHITE, BLUE, urow, ucol, lrow-urow+1, lcol-ucol+1,
 1, WSCROLLUP);
                }
            }
            crt_movecur(currow, curcol);
            break;
        }
        return (0);
}


/* ttystr - output a string to the terminal window.
 *
 * Returns:
 *      0 if everything OK
 *      -1 if an error
 */
ttystr(str)
char *str;
{
    while (*str) {
        if (ttyout(*str++) == -1)
```

```
            return (-1);
    }
    return (0);
}


#if 0
/* scgets - get a string from the keyboard.  This is a more glorious version
 *      of the usual gets() function in that it requires:
 *          1. A prompt string.
 *          2. An initial value string (may be "")
 *          3. Uses the screen package for cursor positioning, etc.
 *      It assumes that the screen I/O takes place on line 24.
 *
 * Call with:   str     = name of string to put characters into
 *              prompt  = string to prompt user with
 *              initial = initial value of str. may be backspace over.
 *              echo    = 1 => echo keyboard to screen, 0 => no echo
 *
 * Returns:     str     if a string gotten
 *              NULL    if user bombed out
 */
char *scgets(str, prompt, initial)
char *str, *prompt, *initial;
{
        static int fore = 0x00, back = 0x07;
        static int orgcol = 0;
        int row, col, key;
        int ix, quit;
        int srow, scol;

        row = 24;
        strcpy(str, initial);           /* copy initial value to str */
        clearline(row, 0x00, 0x07);     /* clear the line */
        crt_puts(fore, back, row, orgcol, prompt);      /* display prompt */
        ix = 0;
        if (strlen(initial)) {          /* if initial value, display it */
                crt_puts(fore, back, row, strlen(prompt) + orgcol, initial);
                ix = strlen(initial);           /* character index */
        }
        col = strlen(prompt) + strlen(initial) + orgcol;
        crt_readcur(&srow, &scol);
        crt_movecur(row, col);          /* position the cursor */

        quit = NO;
        while (!quit) {
                key = mgetkey();                /* get next key typed */
                if ((key & 0x7f) != 0)          /* if not a function key */
                        key &= 0x7f;            /* strip off scan code */

                switch (key) {
                case '\r':                      /* finished? */
                case 0x1b:                      /* bomb out? */
                case F10:
                    quit = YES;                 /* set flag */
                    break;

                /* Check for backspace */
                case 0x08:                      /* ^H? */
                case 0x4b00:                    /* left arrow? */
                case 0x5300:                    /* Del? */
                    if (ix > 0) {               /* any characters typed? */
                        --col;
                        crt_putc(fore, back, row, col, ' ', 1); /* erase */
                        ix--;                   /* back up char index */
                    }
                    break;

                /* Check for line cancel */
                case 0x15:                      /* ^U? */
                case 0x18:                      /* ^X? */
                case 0x19:                      /* ^Y? */
                    col = strlen(prompt);       /* go back to end of prompt */
```

Apr 04 1991 10:44:37 tty.c Page 5

```
                        crt_movecur(row, col);
                        if (ix)
                            crt_putc(fore, back, row, col, ' ', ix);        /* eras
e prev. chars */
                        ix = 0;                         /* back at first char */
                        break;

                    /* Catch the rest of the characters */
                    default:
                        if (key >= ' ') {   /* ignore control chars */
                            crt_putc(fore, back, row, col, key, 1); /* draw it */
                            crt_movecur(row, ++col);
                            str[ix++] = key;
                        }
                        break;
                    }
            }

            if (key == 0x1b || key == F10) { /* if wants to just quit */
                    str[0] = EOS;            /* terminate the string */
                    return (NULL);
            }
            str[ix] = EOS;
            crt_movecur(srow, scol);
            return (str);
}


#endif
```

```
/*********************************************************************
 *                              zoom                                 *
 *********************************************************************
 * The functions in this package take care of zooming in and out of  *
 * a map.                                                            *
 *                                                                   *
 * Author:      Gary Gilbreath, 2 Aug 90                             *
 *                                                                   *
 *********************************************************************/


#include <stdio.h>
#include <stdlib.h>
#include <ega.h>
#include <event.h>

#include "headers/ibmio.h"

extern drType robart;


/*********************************************************************
 *                              zoomin                               *
 *********************************************************************
 * This function allows the user to specify a portion of the map to  *
 * zoom in on. The user uses the mouse to move a full-screen cross-hair *
 * around until he gets to a corner of the area he wishes to display. *
 * He then presses and holds one of the mouse buttons.  This will cause *
 * a rubberband box to appear.  When the box covers the area the user *
 * wishes to display, he releases the mouse button.  The map coord-  *
 * inates are returned in the pointer variables plx, ply, pux, puy.  *
 * If at any time the user hits ESC, the process will be aborted and *
 * ABORT will be returned to the caller.                             *
 *                                                                   *
 * Call with:                                                        *
 *      map_ptr = (map *) map structure for the currently displayed map *
 *      xmin    = (int) lower left corner of the portion to display  *
 *      ymin    = (int) lower left corner of the portion to display  *
 *      xmax    = (int) upper right corner of the portion to display *
 *      ymax    = (int) upper right corner of the portion to display *
 *                                                                   *
 * Returns:                                                          *
 *      OK      if zoom was successful                               *
 *      ABORT   if user aborted operation                            *
 *                                                                   *
 *********************************************************************/
zoomin(map_ptr, xmin,ymin, xmax,ymax)
map *map_ptr;
int xmin,ymin, xmax,ymax;
{
        int     quit, abort;
        int     startx, starty;
        int     nx, ny, ox, oy;
        int     lx, ly, ux, uy;
        int     x1, y1, x2, y2;
        EVENT   evnt;

        mouse_off();
        quit = abort = NO;

        /* Draw initial cursor */
        get_mouse(&nx, &ny);
        snap_coord(map_ptr, &nx, &ny);
        ox = nx, oy = ny;
        gpmerge(MXOR);
        line_cursor(nx, ny);

        /* Select the starting point of the bounding box */
        while (!quit && !abort) {

            /* Update the cursor position */
            get_mouse(&nx, &ny);                /* get mouse coordinates */
            snap_coord(map_ptr, &nx, &ny);      /* snap to map grid position */
```

```
            if (nx != ox || ny != oy) {         /* update cursor position */
                line_cursor(ox, oy);            /* erase old cursor */
                line_cursor(nx, ny);            /* draw new cursor */
                ox = nx, oy = ny;
            }
            /* See if the user has hit either ESC (to abort) or is holding
             * down the mouse button.
             */

            while (GetEvent(&evnt)) {
                switch(evnt.type & 0xFF00) {
                case KEYBOARD:
                        if(evnt.data == 0x011B || evnt.data == F10) {
                                abort = YES;
                        }
                        break;

                case MOUSEBUTTONDOWN:
                        quit = YES;
                        break;
                }
            }
        }

        if (abort)
                goto finish;

        startx = ox, starty = oy;
        gpcolor(LGREEN);
        gpmove(startx, starty);
        gprect(ox, oy);

        /* Now enter the rubberbox stage, waiting for the user to release
         * the mouse button.
         */

        quit = NO;
        while (!quit && !abort) {

            /* Update the cursor position */
            get_mouse(&nx, &ny);                /* get mouse coordinates */
            snap_coord(map_ptr, &nx, &ny);      /* snap to map grid position */
            if (nx != ox || ny != oy) {         /* update cursor position */
                /* Erase the old box */
                gpcolor(LGREEN);
                gpmove(startx, starty);
                gprect(ox, oy);

                line_cursor(ox, oy);            /* erase old cursor */
                line_cursor(nx, ny);            /* draw new cursor */

                /* Draw the new box */
                gpcolor(LGREEN);
                gpmove(startx, starty);
                gprect(nx, ny);
                ox = nx, oy = ny;
            }
            /* See if the user has hit either ESC (to abort) or is holding
             * down the mouse button.
             */

            while (GetEvent(&evnt)) {
                switch(evnt.type & 0xFF00) {
                case KEYBOARD:
                        if(evnt.data == 0x011B || evnt.data == F10) {
                                abort = YES;
                        }
                        break;

                case MOUSEBUTTONUP:
                        quit = YES;
                        break;
                }
```

```
        }
    }

    /* Erase the old box */
    gpcolor(LGREEN);
    gpmove(startx, starty);
    gprect(ox, oy);

finish:
    line_cursor(ox, oy);            /* erase the cursor */
    gpmerge(MRPL);                  /* return to replace mode */
    mouse_on();

    if (!abort) {
        to_map_coord(map_ptr, startx, starty, &x1, &y1);
        to_map_coord(map_ptr, ox, oy, &x2, &y2);
        x1 += map_ptr->lx, y1 += map_ptr->ly;
        x2 += map_ptr->lx, y2 += map_ptr->ly;
        if (x1 < 0) x1 = 0;
        if (y1 < 0) y1 = 0;
        if (x2 < 0) x2 = 0;
        if (y2 < 0) y2 = 0;
        if (x1 >= map_ptr->width) x1 = map_ptr->width-1;
        if (y1 >= map_ptr->height) y1 = map_ptr->height-1;
        if (x2 >= map_ptr->width) x2 = map_ptr->width-1;
        if (y2 >= map_ptr->height) y2 = map_ptr->height-1;

        map_ptr->lx = min(x1, x2);
        map_ptr->ly = min(y1, y2);
        map_ptr->ux = max(x1, x2);
        map_ptr->uy = max(y1, y2);

        gpcolor(BLACK);
        gpclear(xmin,ymin, xmax,ymax);
        SetScale(map_ptr, xmin,xmax, ymin,ymax);
        DrawSFloorMap(map_ptr, WHITE, BLUE, GREEN);

        return (OK);
    }
    return (ABORT);
}


/***********************************************************************
 *                              zoomall                               *
 ***********************************************************************
 * This function sets the display window to display the whole map.    *
 *                                                                    *
 * Call with:                                                         *
 *      map_ptr = (map *) map structure for the currently displayed map *
 *      xmin    = (int) lower left corner of the portion to display   *
 *      ymin    = (int) lower left corner of the portion to display   *
 *      xmax    = (int) upper right corner of the portion to display  *
 *      ymax    = (int) upper right corner of the portion to display  *
 *                                                                    *
 * Returns:                                                           *
 *      OK      if zoom was successful                                *
 *      ABORT   if user aborted operation                             *
 *                                                                    *
 ***********************************************************************/
zoomall(map_ptr, xmin,ymin, xmax,ymax)
map *map_ptr;
int xmin,ymin, xmax,ymax;
{
    map_ptr->lx = map_ptr->ly = 0;
    map_ptr->ux = map_ptr->width - 1;
    map_ptr->uy = map_ptr->height - 1;
    if (map_ptr->ux >= xmax - xmin)
        map_ptr->ux = xmax - xmin;
    if (mrp_ptr->uy >= ymax - ymin)
        map_ptr->uy = ymax - ymin;
    gpcolor(BLACK);
    gpclear(xmin,ymin, xmax,ymax);
```

```
    SetScale(map_ptr, xmin,xmax, ymin,ymax);
    DrawSFloorMap(map_ptr, WHITE, BLUE, GREEN);
    return (OK);
}


/***********************************************************************
 *                              zoomout                               *
 ***********************************************************************
 * This function zooms out by 1/4 of the total map size.              *
 *                                                                    *
 * Call with:                                                         *
 *      map_ptr = (map *) map structure for the currently displayed map *
 *      xmin    = (int) lower left corner of the portion to display   *
 *      ymin    = (int) lower left corner of the portion to display   *
 *      xmax    = (int) upper right corner of the portion to display  *
 *      ymax    = (int) upper right corner of the portion to display  *
 *                                                                    *
 * Returns:                                                           *
 *      OK      if zoom was successful                                *
 *      ABORT   if user aborted operation                             *
 *                                                                    *
 ***********************************************************************/
zoomout(map_ptr, xmin,ymin, xmax,ymax)
map *map_ptr;
int xmin,ymin, xmax,ymax;
{
    int     xfactor, yfactor;

    xfactor = (map_ptr->width  +4)/8;
    yfactor = (map_ptr->height +4)/8;
    if (xfactor <= 0) xfactor = 1;
    if (yfactor <= 0) yfactor = 1;

    map_ptr->lx -= xfactor;
    if (map_ptr->lx < 0) {
        map_ptr->lx = 0;
        map_ptr->ux += xfactor;
    }
    map_ptr->ly -= yfactor;
    if (map_ptr->ly < 0) {
        map_ptr->ly = 0;
        map_ptr->uy += yfactor;
    }

    map_ptr->ux += xfactor;
    if (map_ptr->ux >= map_ptr->width) {
        map_ptr->ux = map_ptr->width-1;
        map_ptr->lx -= xfactor;
        if (map_ptr->lx < 0) map_ptr->lx = 0;
    }
    map_ptr->uy += yfactor;
    if (map_ptr->uy >= map_ptr->height) {
        map_ptr->uy = map_ptr->height-1;
        map_ptr->ly -= yfactor;
        if (map_ptr->ly < 0) map_ptr->ly = 0;
    }

    gpcolor(BLACK);
    gpclear(xmin,ymin, xmax,ymax);
    SetScale(map_ptr, xmin,xmax, ymin,ymax);
    DrawSFloorMap(map_ptr, WHITE, BLUE, GREEN);
    return (OK);
}


/***********************************************************************
 *                              pan_map                               *
 ***********************************************************************
 * This function pans the current map by the given amounts.           *
 *                                                                    *
 * Call with:                                                         *
 *      map_ptr = (map *) map structure for the currently displayed map *
```

```
 *      dx      = (int) change in X-coordinate                      *
 *      dy      = (int) change in Y-coordinate                      *
 *                                                                   *
 * Returns:                                                          *
 *      OK      if pan was successful                                *
 *      ABORT   if user aborted operation                            *
 *                                                                   *
 *********************************************************************/
pan_map(map_ptr, dx, dy, xmin,ymin, xmax,ymax)
map *map_ptr;
int dx, dy;
int xmin,ymin, xmax,ymax;
{
        map_ptr->lx += dx;
        map_ptr->ux += dx;
        map_ptr->ly += dy;
        map_ptr->uy += dy;
        if (map_ptr->lx < 0) {
                map_ptr->ux -= map_ptr->lx;     /* re-adjust ux */
                map_ptr->lx = 0;
        }
        if (map_ptr->ly < 0) {
                map_ptr->uy -= map_ptr->ly;     /* re-adjust uy */
                map_ptr->ly = 0;
        }
        if (map_ptr->ux >= map_ptr->width) {
                map_ptr->lx -= map_ptr->ux - map_ptr->width + 1;
                map_ptr->ux = map_ptr->width - 1;
        }
        if (map_ptr->uy >= map_ptr->height) {
                map_ptr->ly -= map_ptr->uy - map_ptr->height + 1;
                map_ptr->uy = map_ptr->height - 1;
        }

        /* Paranoid fix.  lx and ly should never be less than zero at
         * this point.
         */
        if (map_ptr->lx < 0)
                map_ptr->lx = 0;
        if (map_ptr->ly < 0)
                map_ptr->ly = 0;
        gpcolor(BLACK);
        gpclear(xmin,ymin, xmax,ymax);
        SetScale(map_ptr, xmin,xmax, ymin,ymax);
        DrawSFloorMap(map_ptr, WHITE, BLUE, GREEN);
        return (OK);
}


/*********************************************************************
 *                              autopan                              *
 *********************************************************************
 * Automatically pan the map to center on the area where the map    *
 * cursor is.  Automatically restores the pixels under the robot icon *
 * before redrawing, and also updates the GBUF pointer with the new *
 * array of saved pixels before exiting.                            *
 *                                                                   *
 * Call with:                                                        *
 *      map_ptr = (map *) pointer to current map                    *
 *      mapc    = (MAPC_STRUCT *) pointer to current map cursor struc *
 *      savebuf = (GBUF **) pointer to current saved robart, NULL if *
 *                robart not being displayed.                        *
 *                                                                   *
 * Returns:                                                          *
 *      OK                                                           *
 *                                                                   *
 *********************************************************************/
autopan(map_ptr, mapc, savebuf)
map *map_ptr;
MAPC_STRUCT *mapc;
GBUF **savebuf;
{
        int     deltax, deltay;
```

```
        int     width, height;
        int     mx, my;
        int     banding, bandx, bandy;
        int     mapx, mapy;

        mapx = mapc->mapx;
        mapy = mapc->mapy;
        bandx = mapc->rxl;
        bandy = mapc->ryl;
        if (mapx <= map_ptr->lx || mapx >= map_ptr->ux ||
            mapy <= map_ptr->ly || mapy >= map_ptr->uy) {
            deltax = deltay = 0;
            width = map_ptr->ux - map_ptr->lx;
            height = map_ptr->uy - map_ptr->ly;
            if (mapx <= map_ptr->lx && map_ptr->lx != 0)
                deltax = mapx - map_ptr->lx - width/2;
            else if (mapx >= map_ptr->ux && map_ptr->ux != map_ptr->width-1)
                deltax = mapx - map_ptr->ux + width/2;

            if (mapy <= map_ptr->ly && map_ptr->ly != 0)
                deltay = mapy - map_ptr->ly - height/2;
            else if (mapy >= map_ptr->uy && map_ptr->uy != map_ptr->height-1)
                deltay = mapy - map_ptr->uy + height/2;

            if (deltay || deltax) {
                if (banding = mapc->rubber_banding)
                        stop_banding(mapc);
                mapc_deinit(mapc);
                mouse_off();
                if (savebuf != NULL)
                        restore_robart(*savebuf);
                pan_map(map_ptr, deltax, deltay, 0,15, gdmaxcol,gdmaxrow-15);
                mx = map_ptr->xoff + (mapx - map_ptr->lx)*map_ptr->scale;
                my = map_ptr->yoff - (mapy - map_ptr->ly)*map_ptr->scale;
                put_mouse(mx, my);
                if (savebuf != NULL) {
                        *savebuf = save_robart(map_ptr, robart.x, robart.y);
                        draw_robart(map_ptr, robart.x, robart.y);
                }
                mouse_on();
                mapc_init(mapc, map_ptr, LGREEN, LRED);
                if (banding)
                        start_banding(mapc, bandx, bandy);
                return (1);
            }
        }
        return (0);
}


/* line_cursor - draw a line cursor on the screen */
line_cursor(x, y)
int x, y;
{
        gpcolor(IWHITE);
        gpmove(0, y);
        gpline(gdmaxcol, y);
        gpmove(x, 15);
        gpline(x, gdmaxrow-15);
}



/* to_map_coord - convert screen coordinates to the nearest map coordinates.
 *
 * Call with:
 *      map_ptr = (map *) pointer to current map structure
 *      sx,sy   = (int) screen coordinate to be converted
 *      pmx,pmy = (int *) place to put map coordinates
 *
 */
to_map_coord(map_ptr, sx, sy, pmx, pmy)
map *map_ptr;
```

Apr 04 1991 10:44:37 zoom.c Page 7

```
int sx, sy;
int *pmx, *pmy;
{
        *pmx = (sx - map_ptr->xoff) / map_ptr->scale;
        *pmy = (map_ptr->yoff - sy) / map_ptr->scale;
}


/* snap_coord - take a screen coordinate as input snap it to the nearest
 *      map coordinate, but keep it in screen coordinates.  This will cause
 *      the cursor to jump only to map squares.
 *
 * Call with:
 *      map_ptr = (map *) pointer to current map structure
 *      px,py   = (int *) pointers to coordinate to snap
 *
 */
snap_coord(map_ptr, px, py)
map *map_ptr;
int *px, *py;
{
        to_map_coord(map_ptr, *px, *py, px, py);
        *px = *px * map_ptr->scale + map_ptr->xoff;
        *py = map_ptr->yoff - *py * map_ptr->scale;
}
```

Apr 04 1991 10:48:03 asynch.h Page 1

```
/* Header file for the asynchronous communcations package */

#define IN_Q_EMPTY      2

#ifndef CR
#define CR      13
#define LF      10
#endif

/* Blaise error constants. */
#ifndef OK
#define OK      0
#endif

#ifndef GOOD
#define GOOD            1
#endif
```

Apr 04 1991 10:48:03 baudrate.h Page 1

```
/*
 *   define baud rate divide factors for interrupt serial port driver
 *   Pete Ridley
 *   06/02/86
 */

#define BR_300          384
#define BR_1200         96
#define BR_2400         48
#define BR_4800         24
#define BR_9600         12
#define BR_19200        6
#define BR_38400        3

/*
 *   end include
 */
```

Apr 04 1991 10:48:03 displist.h Page 1

```
/*
 * Header file for the display list handler
 *
 */


#define DL_BLINK        0x0001          /* blink attribute */

typedef struct DL_ITEM_STRUCT {
        void    *dlitemptr;             /* pointer to the item being displayed
*/
        void    *dlolditem;             /* copy of the old item */
        int     itemlength;             /* length of item in bytes */
        int     dlattributes;           /* attributes, e.g. blinking */
        int     (*dlinit)(),            /* user-supplied initilization routine
*/
                (*dldeinit)();          /* user-supplied removal routine */
        void    *(*dlcopy)();           /* user-supplied duplication routine */
        int     (*dlfreecopy)(),        /* u-s duplication deleter */
                (*dlupdate)(),          /* user-supplied update routine */
                (*dlcompare)();         /* user-supplied comparison */
        struct DL_ITEM_STRUCT *next;    /* pointer to next item */
} DL_ITEM;


typedef struct DL_LIST {
        unsigned long   dlmagic;
        unsigned long   blinktime;
        int             blinkstate;
        DL_ITEM         *first;
} DISPLAY_LIST;

DISPLAY_LIST *create_dl();
DL_ITEM *add_dl_item(DISPLAY_LIST *dl, void *itemptr, int len, int attribute,
                int (*init)(), int (*deinit)(),
                void *(*copy)(), int (*freecopy)(),
                int (*update)(), int (*compare)());
int  delete_dl_item(DISPLAY_LIST *dl, DL_ITEM *dlitem);
int  update_dl(DISPLAY_LIST *dl);
int  redraw_dl(DISPLAY_LIST *dl);
int  destroy_dl(DISPLAY_LIST *dl);
```

```
/***********************************************************************
 *                          funckeys.h                                 *
 ***********************************************************************
 *                                                                     *
 * This file defines the return codes for the function keys on the    *
 * IBM keyboard.  F1 is the return code for the F1 key when no other  *
 * keys are held down.  AF1 is returned when the Alt key is held down,*
 * CF1 when the Ctrl key is held down, and SF1 when the shift key     *
 * is held down.  Note that some of the keys on the numeric keypad    *
 * do not return codes in all modes.                                   *
 *                                                                     *
 ***********************************************************************/



/* Normal function keys */
#define F1              0x3b00
#define F2              0x3c00
#define F3              0x3d00
#define F4              0x3e00
#define F5              0x3f00
#define F6              0x4000
#define F7              0x4100
#define F8              0x4200
#define F9              0x4300
#define F10             0x4400
#define HOME            0x4700
#define UPARROW         0x4800
#define PGUP            0x4900
#define LEFTARROW       0x4b00
#define RIGHTARROW      0x4d00
#define END             0x4f00
#define DOWNARROW       0x5000
#define PGDN            0x5100
#define INS             0x5200
#define DEL             0x5300


/* Control function keys */
#define CF1             0x5e00
#define CF2             0x5f00
#define CF3             0x6000
#define CF4             0x6100
#define CF5             0x6200
#define CF6             0x6300
#define CF7             0x6400
#define CF8             0x6500
#define CF9             0x6600
#define CF10            0x6700
#define CHOME           0x7700
#define CPGUP           0x8400
#define CLEFTARROW      0x7300
#define CRIGHTARROW     0x7400
#define CEND            0x7500
#define CPGDN           0x7600



/* Shift function keys */
#define SF1             0x5400
#define SF2             0x5500
#define SF3             0x5600
#define SF4             0x5700
#define SF5             0x5800
#define SF6             0x5900
#define SF7             0x5a00
#define SF8             0x5b00
#define SF9             0x5c00
#define SF10            0x5d00
#define SUPARROW        0x4838
#define SDOWNARROW      0x5032
#define SLEFTARROW      0x4b34
#define SRIGHTARROW     0x4d36
```

```
#define SEND            0x4f31
#define SHOME           0x4737
#define SPGUP           0x4939
#define SPGDN           0x5133

/* Alt function keys */
#define AF1             0x6800
#define AF2             0x6900
#define AF3             0x6a00
#define AF4             0x6b00
#define AF5             0x6c00
#define AF6             0x6d00
#define AF7             0x6e00
#define AF8             0x6f00
#define AF9             0x7000
#define AF10            0x7100


/* Num Lock keys */
#define NUM0            0x5230
#define NUM1            0x4f31
#define NUM2            0x5032
#define NUM3            0x5133
#define NUM4            0x4b34
#define NUM5            0x4c35
#define NUM6            0x4d36
#define NUM7            0x4737
#define NUM8            0x4838
#define NUM9            0x4939


/* Miscellaneous keys */
#define ALTP            0x1900
```

```
#define OK      0               /* return code indicating good status */

/* Type definitions */
#ifndef DOS
typedef unsigned char   byte;

#else
#ifdef M_I86
typedef unsigned char byte;
#endif
#endif

typedef unsigned int    word;

/* Standard boolean definitions */
#define TRUE            1
#define FALSE           0

#define NO                0
#define YES               1
#define EOS             '\0'
#define ERROR            -1
#define ABORT            -2
#define FIXED_SENSOR_HALT -3
#define DROPPED_PACKET   -4
#define ESC             0x1b

#ifndef CR
#define CR              13
#define LF              10
#define BS              8
#endif

/* Define which robots can be controlled */
#define ROBARTII        1       /* Robart II */
#define LABMATE         2       /* TRC LabMate */
#define K2A             3       /* Cybermotion K2A+ */


/* Types of packets, either a packet requiring a response from the robot, or
 * just a command to the robot.
 */
#define REQUEST         1
#define X_COMMAND       2

/* List the X commands */
#define X_SYSTEM        0               /* system power */
#define X_SIREN         1               /* siren power */
#define X_CAMERA        2               /* camera power */
#define X_INTRUSION     3               /* intrusion detection sensors */
#define X_SONAR         4               /* sonar power */
#define X_SPEECH        5               /* speech power */
#define X_OAARRAY       6               /* obstacle avoidance array */
#define X_SPDGOVERNING  7               /* enable/disable speed governing */

/* Possible log mode values */
#define CLOSED  0
#define OPEN            1
#define REPLAY  2

/* Used as magic numbers in intruder packet decoding */
#define NO_ANGLE        -1000
#define MULT_ANGLE      -32000

/* Constant arrays for optical and infrared sensor positions */
extern int irPos[];
extern int omPos[];

/* Defines the size in inches of a single grid unit in any given floor map */
#define GRID_UNIT_SIZE    6.0
#define HALF_GRID_SIZE    3.0
#define SONAR_RANGE_SCALE 1.6
#define MAX_SONAR_RANGE   0xF0
```

```

/* Define Position Estimation constants, for the upper ultrasonic ring */
#define PE_SONAR_NUM    24
#define PE_SON_SPACING  15      /* PE sonar transducer spacing in degrees */
#define PESON_OFFSET    725     /* radius of PE sonar ring, times 100 */

/* Define obstacle avoidance constants, for the lower sonar ring */
#define OBS_SONAR_NUM     9
#define OBS_SON_SPACING  18     /* transducer spacing in degrees */
#define OBS_SON_OFFSET  675     /* radius of OA sonar ring, times 100 */

/* define Obst. Avoidance constants, OA_MAX_DIST and OASON_OFFSET
 * are in inches.
 */
#define OBSTACLE        -3      /* obstacle is in the way */
#define OA_MAX_DIST     60
#define OASON_OFFSET    6.25
#define OA_SONAR_NUM    9

/* PE Sonar transformation array. The sonar returns are sent in a different
 * order from the order needed by the position estimator. This constant array
 * transforms the returns to their proper place.
 */
extern  int  pEMap[];

#define pEAccess(m,x,y,s) (* ((byte *)((m)->pe_ptr+(((y)*((m)->width/(m)->squar
esize)+(x))\
                                *PE_SONAR_NUM+(s)))))

/* Floor map access macro. This correctly addresses a floor map in dynamic
 * memory given an x,y coordinate and given a pointer to a floor map
 * structure.
 */
#define floor(x,y,m)    (*((byte *)((m)->mem_ptr+(x)+((m)->width*(y)))))
#define OAFloor(x,y,m)  (*((byte *)((m)->oa_ptr+(x)+((m)->width*(y)))))

/* Macros for sign and round off functionality */
#define isgn(x)   ((x)<0?-1:1)
#define fsgn(x)   ((x)<(0.0)?(-1.0):(1.0))
#define fround(x) ((double)(x)-(int)(x)>0.5?(int)(x)+1:(int)(x))

#define Angle_To_Rads(angle) (((double)((angle) % 360) * PI)/180.0)

unsigned int mgetkey();

/*
#include "headers/funckeys.h"
*/

#include "headers/linestuf.h"
#include "headers/packet.h"
#include "headers/linkdefs.h"
#include "headers/mapdefs.h"
#include "headers/rtclk.h"
#include "headers/mytypes.h"
#include "headers/displist.h"

#include "headers/protos.h"
```

Apr 04 1991 10:48:03 k2a.h Page 1

```
/* Status byte definitions */
#define K2ANORMAL              0
#define K2APARMERROR           1
#define K2ASTALLKICKOUT        2
#define K2ADEADMANKICKOUT      3
#define K2ANOPROGLOADED        4
#define K2ADRIVELIMIT          5
#define K2ASTEERLIMIT          6
#define K2ACCLINKFAIL          7
#define K2ADOCKFAIL            8
#define K2AFOLLOWINGBEACON     9
#define K2ANOMARKER            10
#define K2AFOLLOWMODE          11
#define K2ANOCA                12
#define K2ANOVDB               13
#define K2ANOLIFT              14
#define K2ANODAC               15
#define K2ALOST                16
#define K2ARADIUSERROR         17
#define K2AESTOPERROR          18
#define K2ABLOCKEDFOR          19
#define K2ABLOCKEDBACK         20
#define K2ABLOCKEDLEFT         21
#define K2ABLOCKEDRIGHT        22
#define K2ANOWALL              23
#define K2AILLEGALFUNC         24
#define K2ASARGERROR           25
#define K2AXARGERROR           26
#define K2AYARGERROR           27
#define K2ANOCTD               28
#define K2APORTHRUMODE         29
#define K2ANOPROM              30
#define K2ACOMPERROR           31
#define K2ACIRCUMNAV           32
#define K2ACAHOLD              33


#define K2ARUNOP               1
#define K2ATURNOP              2
#define K2AWAITOP              3
#define K2ABACKOP              4
#define K2AJUMPOP              5
#define K2AHALTOP              20
#define K2ADOCKOP              21
#define K2AUNDOCKOP            22
#define K2ASETXYOP             23
#define K2ASETAZOP             24
#define K2AJOGOP               25
#define K2AMEANAZOP            31
#define K2AAVOIDOP             32
#define K2AWARNOP              33
#define K2AFOLLOWOP            38
#define K2AWALLOP              39
#define K2ARADIUSOP            40
#define K2ARUNONOP             41
#define K2AAPPROACHOP          44
#define K2ASCANOP              45
#define K2ACRUISEOP            49
#define K2ACIRCUMOP            55

#pragma pack(1)
/* Cybermotion intruction format */
typedef struct {
        unsigned char   opcode,
                        sparm;
        int             xparm,
                        yparm;
} CYBER_INSTRUCTION;

/* Cybermotion program format */
typedef struct {
        int                  ninstructions;  /* number of instructions */
        CYBER_INSTRUCTION    program[255];   /* program itself */
```

Apr 04 1991 10:48:03 k2a.h Page 2

```
        int             daccel, saccel; /* drive/steering accelerations
    */
} CYBER_PROG;

#pragma pack()
```

Apr 04 1991 10:48:03 linestuf.h Page 1

```
/************************************************************************
 *                              linestuf.h                              *
 ************************************************************************
 * Header file to define LINE_TYPE type                                 *
 ************************************************************************/


typedef struct {
        int     x,y;            /* next X-Y coordinate */
        int     dx, dy;         /* change in X and Y */
        int     error;          /* Bresenham error term */
        int     npoints;        /* number of points left on line */
        int     xinc, yinc;     /* amount to add to current x or y value */
        int     inc_x;          /* 1 if abs(slope) <= 1, 0 otherwise */
} LINE_TYPE;


int init_line();
int get_line_point();
```

Apr 04 1991 10:48:03 llnkdefs.h Page 1

```
#ifndef CR
#define CR      13
#define LF      10
#endif

/* Blaise error constants. */
#ifndef OK
#define OK      0
#endif

#ifndef GOOD
#define GOOD            1
#endif

#define INV_PORT                2
#define PORT_NOT_OPEN           3
#define INV_PARAMETER           4
#define NO_PORT_FOUND           6
#define OUT_Q_FULL              7
#define PORT_OPEN_ALREADY       9
#define IN_QUEUE_FULL           10

/* Extra error codes. */
#define PACKET_NOT_AVAILABLE    2
#define CRC_ERROR               5
#define COMMUNICATION_ERROR     11
#define RESET_FAILED            12

/* Comm port error masks (used by decode_port_status). */
#define INPUT_LOST              0x0001
#define ASYNCH_ERROR            0x0002
#define PARITY_ERROR            0x0010
#define OVERRUN                 0x0020
#define FRAMING                 0x0040
#define BREAK                   0x0080
#define REM_XOFF                0x1000
#define REM_XON                 0x2000
#define LOC_XOFF                0x4000
#define LOC_XON                 0x8000

#define WAIT_FOREVER            1
#define NO_WAIT                 0

#define MAX_PACKET_SIZE         256

#define COM1                    0
#define COM2                    1

#define IO_QUEUE_SIZE           2056
#define SEQUENCE_OFFSET         2
#define RESET_LINK_FAILED       8
```

Apr 04 1991 10:48:03 mapdefs.h Page 1

```
/*********************************************************************
 *                            mapdefs.h                              *
 *********************************************************************
 *                                                                   *
 * Define all the values that will be stored in the map.  These include *
 * fixed objects, doors, the recharger, path planner stuff, etc.     *
 *                                                                   *
 *********************************************************************/


#define OBJECT          0xff        /* immovable object */
#define MOVEABLE        0xfe        /* moveable object */
#define GROWTH          0xfd        /* growth around an object */
#define DOOR            0xfc        /* open doorway */
#define STRIPE          0xfb        /* freeway stripe */
#define RECHARGER       0xfa        /* recharging station */
#define CAL1            0xf9        /* first calibration position */
#define CAL2            0xf8        /* second (final) cal. position */
#define FATMARKER       0xf7        /* fat marker */
#define THINMARKER      0xf6        /* thin marker */
#define VIRTUALPOINT    0xf5        /* virtual path point */
#define CLEAR           0x00        /* free space */

/* Path planning defines.  Arranged in a specific order.  DO NOT CHANGE!  */
#define DEST            0xef
#define START           0xee

#define PRIGHT          0xe2
#define PDOWN           0xe3
#define PLEFT           0xe0
#define PUP             0xe1
#define PUPRIGHT        0xe6
#define PDOWNRIGHT      0xe7
#define PDOWNLEFT       0xe4
#define PUPLEFT         0xe5


/* Obstacle avoidance defines */
#define OASTART         0
#define OADEST          254
#define OABOUNDARY      255
#define OALIMIT         253
#define MAX_FLOOR_VAL   16          /* max value floor can attain from
                                     * OA sonars
                                     */


/* The dirty bit is used during the path planning process.  When a floor
 * cell is about to be added to the expansion list, a check is made on
 * the actual value.  If the dirty bit is set, then the cell is already
 * on the expansion list so we don't need to add it again.  Otherwise, the
 * cell is added to the list and the dirty bit is set.
 */
#define DIRTY_MASK      0x40
```

```
/* Definitions of the various types used in the Robart software */


typedef unsigned long ULONG;
typedef unsigned short USHORT;


typedef struct {
            byte  head;
            byte  data[MAX_PACKET_SIZE+2];
} packet;

typedef struct {
        USHORT  x, y;
} XY_PAIR;

typedef struct pathseg {
        int             x1,y1, x2,y2;
        unsigned int    length;
        char            stripe;
} PATHSEG;

/* Robart position data structure */
typedef struct  {
        int     x, y;           /* map coordinate position */
        int     ix,iy;          /* position in inches */
        int     dir;            /* robot heading */
        int     headDir;        /* current head heading */
        long    odometer;       /* amount moved (in inches) since reset */
        int     battery_voltage;        /* battery voltage in hundredths */
} drType;


/*********************************************************************
 *                              Map Stuff                            *
 *********************************************************************/
#define MAPMAGIC        0x524d4150      /* "RMAP" */

/* Define compression schemes available */
#define COMP_NONE       0               /* no compression */
#define COMP_PACKBITS   1               /* PackBits compression */
#define COMP_LZW        2               /* Lempel-Ziv-Welch compression */

/* The following structure is placed at the beginning of each map file. */
typedef struct map_header {
        ULONG   map_magic;              /* magic number for map */
        USHORT  version;                /* version number */
        USHORT  width, height;
        USHORT  squaresize;             /* size of each square, in inches */
        USHORT  xmapoff, ymapoff;       /* how much to offset map coordinates *
/
        USHORT  res0;                   /* USED TO BE: number of doors in map *
/
        USHORT  compression_scheme;     /* how map is compressed */
        char    map_name[32];           /* name of map */
        USHORT  res1,                   /* future expansion */
                res2;                   /* future expansion */
} MAP_HEADER;

/* The door type is used for locating doorways and indicating where a
 * door leads to.
 */
typedef struct door_type {
        USHORT  doorx, doory;           /* location of door in current room */
        USHORT  door_index;             /* index into door table of map this
                                         * door leads to */
        USHORT  probability;            /* probability door is open */
        USHORT  state;                  /* open, closed or unknown */
        USHORT  doorid,                 /* unique door id */
                res2;                   /* future expansion */
        char    map_name[32];           /* name of map this door leads to */
} DOOR_TYPE;

```

```
/* The following definitions have to do with how the door information
 * is stored in a file.
 */

#define DOOR_MAGIC      0x444f4f52      /* "DOOR" */

typedef struct {
        ULONG   door_magic;             /* file ID */
        USHORT  ndoors;                 /* number of doors */
} DOOR_HEADER;

/* The virtual type is used for locating virtual path points, giving both
 * the names and X-Y locations of the source and destination points and
 * the distance traveled between them.
 */
typedef struct virtual_type {
        char    source_name[32],        /* name of starting location */
                dest_name[32];          /* name of destination location */
        USHORT  startx, starty,         /* X-Y location of source */
                destx, desty;           /* X-Y location of destination */
        long    dist;                   /* distance traveled during traversal *
/
        USHORT  disabled;               /* non-zero if path disabled */
} VIRT_TYPE;

/* The following definitions have to do with how the virtual information
 * is stored in a file.
 */

#define VIRT_MAGIC      0x56495254      /* "VIRT" */

typedef struct {
        ULONG   virt_magic;             /* file ID */
        USHORT  npaths;                 /* number of virtual paths */
} VIRT_HEADER;


/* The action type is used to define the format of the set of actions in the
 * Cybermotion data file.  This file is read and used to update the array
 * of VIRTUAL_TYPE points.
 */
typedef struct action {
        char    path[30],               /* name of action subroutine */
                start[30];              /* place where action begins */
        int     startid;                /* id of place where action begins */
        char    end[30];                /* place where action ends */
        int     endid;                  /* id of place where action ends */
        int     type[2];                /* action type */
        int     time[3];                /* time action takes */
        long    dist;                   /* travel distance of action */
        int     equip[10];              /* equipment required to perform action
*/
        int     fact[10];               /* assorted application specific facts
*/
} ACTION;

typedef struct {
        int     width;                  /* map width in squares */
        int     height;                 /* map height in squares */
        int     squaresize;             /* size of each square in inches */
        int     xmapoff, ymapoff;       /* amount to offset displayed coordinat
es */
        int     ndoors;                 /* number of doors in map */
        int     nvpaths;                /* number of virtual paths */
        int     xoff, yoff;             /* graphics screen offsets */
        int     scale;                  /* size of each square in pixels */
        int     lx,ly, ux,uy;           /* Displayed window (in squares) */
        DOOR_TYPE *doors;               /* array of door structures */
        VIRT_TYPE *vpaths;              /* array of virtual paths */
        byte    *mem_ptr;               /* pointer to uncompressed map */
        byte    *pe_ptr;                /* pointer to PE array */
        char    mapName[80];            /* file name of the map */
        char    peName[80];             /* name of PE database file */
```

```
} map;


/*********************************************************************
 *                       Fixed Sensor Stuff                          *
 *********************************************************************/

/* Define what a polygon looks like */
typedef struct polygon {
        USHORT          npoints;        /* number of points in the polygon */
        XY_PAIR         *points;        /* array of points describing polygon *
/
} POLYGON;

/* Define what is in a fixed sensor entry */
typedef struct fixed_sensor {
        USHORT          sensor_type;    /* type of sensor, IR, MW, optical, etc
 */
        USHORT          sensor_id;      /* ID for this sensor */
        USHORT          sensor_status;  /* current status of sensor */
        USHORT          x,y;            /* physical location of sensor */
        USHORT          npolygons;      /* number of polygons describing sensor
 coverage */
        POLYGON         *polys;         /* array of polygons */
} FIXED_SENSOR;

typedef struct fixed_sensor_tab {
        USHORT          nsensors;       /* number of fixed sensors */
        USHORT          squaresize;     /* size of each square, in inches */
        FIXED_SENSOR    *sensors;       /* array of fixed sensors */
        byte            *mem_ptr;       /* bit map of coverage area */
        USHORT          width, height;  /* width and height of bit map */
} SENSOR_TAB;


/* The following definitions have to do with how the fixed sensor information
 * is stored in a file.
 */

#define SENSOR_MAGIC    0x53454e53      /* "SENS" */

typedef struct {
        ULONG   sensor_magic;           /* file ID */
        USHORT  nsensors;               /* number of sensors */
        USHORT  squaresize;             /* size of each square in inches */
} SENSOR_HEADER;

/* The header is followed immediately by the definition for the first
 * sensor, which is basically a block copy of FIXED_SENSOR, lacking the
 * polygon pointer.  This in turn is followed by the first polygon
 * description.  The polygon description consists of the number of points,
 * followed by <npoints> sets of X-Y pairs.  The last pair is followed by
 * the next polygon description (if there is more than 1).  The last
 * polygon is followed by the next FIXED_SENSOR description, and so-on.
 */


/*********************************************************************
 *                         Robot Sensors                             *
 *********************************************************************/

/* Define the bits in the sen_status byte */
#define INFRARED_MASK   0x01
#define MICROWAVE_MASK  0x02
#define ULTRASONIC_MASK 0x04
#define OPTICAL_MASK    0x08
#define HEARING_MASK    0x10
#define VIBRATION_MASK  0x20
#define VIDEO MASK      0x40

typedef struct  {
   byte sen_status;                     /* All Intruder Sensor Status       */
```

```
   byte ir[5];                          /* Infrared sensors' ON/OFF         *
/
   int  irAngle;                        /* Infrared sensor group angle      *
/
   struct {byte stat;int sens; } mw;    /* Microwave ON/OFF and sensitivity */
   struct {byte stat;int angle;
           double range;    } sn;       /* Sonar ON/OFF, angle and range    */
   byte om[4];                          /* Optical Motion ON/OFF            */
   int  omAngle;                        /* Optical Motion sensor group angle */
   struct {byte stat[4];int angle;} hr; /* Discrim. Hearing ON/OFF and angle */
   byte vb;                             /* Vibration Sensor ON/OFF          */
   byte alarm;                          /* Robart's Alarm assesment value   */
} cond;

typedef struct  {
   byte toxic_gas;                      /* Toxic Gas ON/OFF                 */
   byte smoke;                          /* Smoke ON/OFF                     */
   byte flooding;                       /* Flooding ON/OFF                  */
   char int_temp[4];                    /* Internal Temperature reading     */
   char ext_temp[4];                    /* External Temperature reading     */
   char voltage[5];                     /* Battery Voltage reading          */
   char humidity[4];                    /* Relative Humidity reading        */
   char pressure[6];                    /* Barometric Pressure reading      */
   byte error;                          /* Current error code               */
} rStatus;


/*********************************************************************
 *                      Miscellaneous Stuff                          *
 *********************************************************************/

typedef struct {
        short sonar_data[PE_SONAR_NUM];
        short x[PE_SONAR_NUM], y[PE_SONAR_NUM];
} SONAR;


typedef struct graphics_buffer {
        int width, height;
        int bytes;
        unsigned char *buff;
} GBUF;

typedef struct {
        cond      c1, c2, *cPtr1, *cPtr2;
        packet receive;
        char      isrBuffer[ISR_PLENGTH+1];
} cond_packets;

typedef struct {
        rStatus   rs1, rs2, *rsPtr1, *rsPtr2;
        packet    receive;
        long      rsTime;
        char      rsrBuffer[RSR_PLENGTH+1];
} stat_packets;


typedef struct mapcstruct {
        char      cursor_visible,       /* 1 => cursor on screen */
                  in_map,               /* 1 => mouse within map boundary */
                  rubber_banding,       /* 1 => rubber-banding a line */
                  rubber_box_banding;   /* 1 => rubber-banding a box */
        int       scx, scy,             /* grid-snapped mouse coords */
                  mapx, mapy,           /* cursor pos in map coords */
                  rx1,ry1, rx2,ry2;     /* rubber-band line coordinates */
        int       cursor_color,         /* cursor color */
                  line_color;           /* rubber-banded line color */
        map       *map_ptr;             /* floor map pointer */
} MAPC_STRUCT;
```

Apr 04 1991 10:48:03 packet.h Page 1

```
/* Data type definitions */
#define BYTE_TYPE         2
#define WORD_TYPE         4
#define LONG_TYPE         8

/* Packet type definitions */
#define RC_PTYPE          '0'      /* Robot Command Packet */
#define CSSR_PTYPE        '1'      /* Collision Sonar Senor Report Packet*/
#define RSR_PTYPE         '2'      /* Robot Status Report Packet */
#define PES_PTYPE         '3'      /* Position Estimation Sonar Report */
#define ISR_PTYPE         '4'      /* Intrusion Sensor Report Packet */
#define ISON_PTYPE        '5'      /* IR/Sonar report */
#define RDR_PTYPE         '6'      /* Robot Dead Reck Report */

/* Packet length definitions */
#define CSSR_PLENGTH      13      /* Collision Sonar Sensor Packet */
#define ISR_PLENGTH       21
#define RSR_PLENGTH       20
#define ISON_PLENGTH      51

#define WAIT_FOREVER              1
#define NO_WAIT                   0

/* Extra error codes. */
#define PACKET_NOT_AVAILABLE      2
#define CRC_ERROR                 5
#define COMMUNICATION_ERROR      11
#define RESET_FAILED             12


#define MAX_PACKET_SIZE          256

#define COM1                      0
#define COM2                      1

#define IO_QUEUE_SIZE          2056
#define SEQUENCE_OFFSET           2
#define RESET_LINK_FAILED         8
```

```
/* deadreck.c */
int init_deadreck ( int start_x , int start_y , int dir , int distance , int sp
eed , int dscale );
int dead_reckon ( int *px , int *py );

/* displist.c */
DISPLAY_LIST *create_dl ( void );
DL_ITEM *add_dl_item ( DISPLAY_LIST *dl , void *itemptr , int len , int attribu
te , int (*init )(), int (*deinit )(), void *(*copy )(), int (*freecopy )(), int
 (*update )(), int (*compare )());
int delete_dl_item ( DISPLAY_LIST *dl , DL_ITEM *item );
int update_dl ( DISPLAY_LIST *dl );
int redraw_dl ( DISPLAY_LIST *dl );
int destroy_dl ( DISPLAY_LIST *dl );

/* filll.c */
int fill ( int border );
int flood ( int interior );

/* fixedsen.c */
SENSOR_TAB *load_fixed_sensors ( char *name , map *map_ptr );
void fixed_draw_line ( int x1 , int y1 , int x2 , int y2 , byte bitmask );
int save_fixed_sensors ( char *name , SENSOR_TAB *tab );
void free_fixed_sensors ( SENSOR_TAB *tab );
void draw_all_fixed_sensors ( map *map_ptr , SENSOR_TAB *tab );
void draw_fixed_sensor ( map *map_ptr , FIXED_SENSOR *fs , int color );
SENSOR_TAB *add_fixed_sensor ( map *map_ptr , SENSOR_TAB *tab );

/* ibmio.c */
void Init_IBM_IO ( int ser_disable );
void Finalize_IBM_IO ( void );
void Clear ( void );
int Get_String ( char *str_ptr );
int Get_Integer ( int *int_ptr );
void PutString ( int row , int col , char *str );
void PutInteger ( int row , int col , int i );
int Get_Value ( int row , int col , int lLimit , int hLimit , int defalt , char
 *str_ptr );
void Box_Text ( int row , int col , char *text );
void Inv_Erase ( int row , int col , char *text );
void Inv_Draw ( int row , int col , char *text );
int Get_Inv_String ( char *str_ptr );
int GetInvInteger ( int *int_ptr );
void DrawWindow ( int row , int col , int width , int height , char *title );
void Draw_Status_Line ( char *str );
int GetSLValue ( int lLimit , int hLimit , char *prompt );
void Draw_Date ( time_type *timePtr , int row , int col , char *str );
void Draw_Time ( time_type *timePtr , int row , int col , char *str , int tFlag
 );
char *ggets ( char *str , char *prompt , char *initial );
char *rawggets ( char *str , char *prompt , char *initial , int row , int col ,
 int fore , int back );
void Clear_Line ( int row );
void clearline ( int line , int fore , int back );

/* ibmrtclk.c */
void clk_gettime ( time_type *time );
char *str_time ( void );
long strtime_to_100s ( char *stime );
long clktime_to_100s ( time_type *time );
unsigned long get_long_time ( void );
void WaitSeconds ( int x );
unsigned long mstime ( void );
int waitms ( unsigned int nms );

/* indisp.c */
void Dump_Robot_Status_Data ( rStatus *newPtr , rStatus *oldPtr );
void Dump_Intruder_Data ( cond *newPtr , cond *oldPtr );
void normal_d-aw ( int row , int col , char *str );
void alarm_draw ( int row , int col , char *str );
void threshup ( void );
void threshdown ( void );
```

```
void Draw_Error_Line ( char *str );
void Clear_Robot_Status_Structure ( rStatus *rsPtr );
void Clear_Condition_Structure ( cond *cPtr );
void Setup_Intruder_Display ( void );
void IR_disp_update ( byte active , byte *newir , byte *oldir , int newangle ,
int oldangle );
void MW_disp_update ( byte active , byte newmw , byte oldmw , byte newsens , by
te oldsens );
void OP_disp_update ( byte active , byte *newop , byte *oldop , int newangle ,
int oldangle );
void VB_disp_update ( byte active , byte newvb , byte oldvb );
void HR_disp_update ( byte active , byte *newhr , byte *oldhr , int newangle ,
int oldangle );
void update_time_display ( void );
void update_packet_display ( void );
void update_IR_active ( byte new , byte old );
void update_MW_active ( byte new , byte old );
void update_OP_active ( byte new , byte old );
void update_VB_active ( byte new , byte old );
void update_HR_active ( byte new , byte old );
void update_US_active ( byte new , byte old );
void update_VD_active ( byte new , byte old );
void update_sonar_display ( int bearing , int range );
void update_threat ( int level );
int init_intrusion_sonar_plot ( void );
int deinit_intrusion_sonar_plot ( map *map_ptr );
int plot_intrusion_sonars ( map *map_ptr , packet *pack );
int erase_intrusion_sonars ( map *map_ptr , SONAR *sonar );
int draw_intrusion_sonars ( map *map_ptr , SONAR *sonar );
int init_fixed_dl ( DISPLAY_LIST *dl , map *map_ptr , SENSOR_TAB *tab );

/* intruder.c */
void Intruder ( map *map_ptr );
int handle_packet ( map *map_ptr , packet *pack , cond_packets *pcur_cond , sta
t_packets *pcur_stat );
int check_sonar_state ( map *map_ptr , packet *pack , cond_packets *pcur_cond ,
 stat_packets *pcur_stat );
void local_toggle ( void );
void remote_toggle ( void );
void LogDelay ( void );
int Read_Packet ( packet *buf_ptr );
int pullup_map ( map *map_ptr );
void pushdown_map ( map *map_ptr , cond_packets *pcur_cond , stat_packets *pcur
_stat );
int clear_packets ( void );
int stat_update ( stat_packets *pcur_stat , cond_packets *pcur_cond );
int cond_update ( cond_packets *pcur_cond , stat_packets *pcur_stat );
int replay ( map *map_ptr , cond_packets *pcur_cond , stat_packets *pcur_stat )
;
void do_log_command ( map *map_ptr , cond_packets *pcur_cond , stat_packets *pc
ur_stat , char *cmd_str );
void stop_replay ( cond_packets *pcur_cond , stat_packets *pcur_stat );
int log_open ( void );
int log_close ( void );
int start_replay ( cond_packets *pcur_cond , stat_packets *pcur_stat );
void head_pos ( int cc );
int set_mouse_page ( int page );
int read_fixed ( SENSOR_TAB *tab );

/* linestuf.c */
int init_line ( LINE_TYPE *pline , int x1 , int y1 , int x2 , int y2 );
int get_line_point ( LINE_TYPE *pline );
int circle_points ( int center_x , int center_y , int radius , int (*pt_plotter
 )());

/* linkrbrt.c */
void Reset_Link ( int *status , int ser_disable );
void Close_Link ( int *pstatus );
void Send_Link ( packet *pack_ptr , unsigned int length , int *status );
int Receive_Link ( packet *pack_ptr , int wait , int *pstatus );
int x_command ( int cmd , int state );
void dump_packets ( void );
```

```
/* logger.c */
int OpenLogFile ( char *fileName , int newFile , long *fileSize );
int CloseLogFile ( int fD );
int MoveFP ( int fD , int n );
void WriteLogEntry ( int fD , packet *pack_ptr , char *timePtr , unsigned int p
ack_length );
int ReadLogEntry ( int fD , packet *buf_ptr , char *timePtr );
int FindPType ( int fD , packet *pBuf , int pType , char *tPtr , int forward );

/* makemap.c */
int makemap ( map *map_ptr );
int update_drive_screen ( void );
int drive_help ( void );
int start_mapping ( map *map_ptr );
int update_map ( map *map_ptr );
void init_drive ( void );
void deinit_drive ( void );
void do_drive ( int cc );
int state_check ( void );
void forward ( void );
void backward ( void );
void left_turn ( void );
void right_turn ( void );
void stop ( void );
void getdparms ( map *map_ptr );
void getpos ( map *map_ptr );
void getspeed ( void );
int save_blob ( map *map_ptr , int x , int y , int size );
int rest_blob ( void );
int set_blob ( int size , int color );
int mod_map_parms(map *map_ptr);

/* map.c */
int SetScale ( map *mapPtr , int xlow , int xhigh , int ylow , int yhigh );
void ScalePoint ( map *map_ptr, int x , int y , int color );
void DrawPEDatabase ( map *map_ptr , int color );
int get_obj_color ( int value );
void DrawSFloorMap ( map *map_ptr , int obj_color , int growth_color , int sona
r_color );
void Draw_Floor_Map ( map *map_ptr , int obj_color , int growth_color , int son
ar_color );
void Screen_To_Memory ( map *map_ptr );
int Copy_Floor_Map ( map *m1_ptr , map *m2_ptr , int clear );
int LoadPEArray ( map *map_ptr , char *name );
int load_map ( int fh , map *map_ptr );
int load_door_info ( map *map_ptr , char *name );
int load_virtual_info ( map *map_ptr , char *name );
int Load_Floor_Map ( map *map_ptr , char *name );
int NewPEArray ( map *map_ptr );
int New_Floor_Map ( map *map_ptr );
int SavePEArray ( map *map_ptr );
int Save_Floor_Map ( map *map_ptr , char *name );
int Fix_Point ( map *map_ptr , int *x_ptr , int *y_ptr , int color );
int all_coords ( char *str , int robx , int roby , map *map_ptr );

/* mapcur.c */
void mapc_init ( MAPC_STRUCT *mapc , map *map_ptr , int cursorcolor , int linec
olor );
void mapc_deinit ( MAPC_STRUCT *mapc );
void mapc_update ( MAPC_STRUCT *mapc );
void start_banding ( MAPC_STRUCT *mapc , int x , int y );
void stop_banding ( MAPC_STRUCT *mapc );
void mapc_scale ( MAPC_STRUCT *mapc );
void mapc_draw ( MAPC_STRUCT *mapc );
void mapc_on ( MAPC_STRUCT *mapc );
void mapc_off ( MAPC_STRUCT *mapc );
void xor_cursor ( map *map_ptr , int x , int y , int color );
void xor_box ( int x1 , int y1 , int x2 , int y2 , int color );
void xor_line ( int x1 , int y1 , int x2 , int y2 , int color );
void map_draw_line ( int x1 , int y1 , int x2 , int y2 , int color );
int map_get_point ( MAPC_STRUCT *mapc , int *px , int *py , int verbose );

/* mapedit.c */
```

```
void Confirm ( map *map_ptr );
void Grow_Floor_Map ( map *map_ptr );
int putcoord ( int row , int col , int x , int y , int sqsize );
char *conv_value2str ( int value );
void draw_map_edit_stats ( int edit_value );
void MapEdit ( map *map_ptr );
void draw_icons ( int settrap );
void remove_icon_traps ( void );


/* minturns.c */
int minimize_turns ( map *map_ptr , XY_PAIR *inflection_list , int *pnpoints );
int check_line_length ( int x1 , int y1 , int x2 , int y2 );
int find_intersection ( XY_PAIR *inflection_list , int ip1 , int *pnx , int *pn
y );
int check_boundary ( map *map_ptr , int x , int y );
int length_of_new_line ( int x0 , int y0 , int x1 , int y1 , int x2 , int y2 ,
int x3 , int y3 , int ix , int iy );
int check_for_obstacle ( int x1 , int y1 , int x2 , int y2 , int newx , int new
y , map *map_ptr );
int update_inflection_list ( XY_PAIR *inflection_list , int *pnpoints , int ip1
, int ix , int iy );
int delay ( void );
int print_inflection_pt ( int xa , int ya , int xb , int yb , int xc , int yc ,
int xd , int yd );
int prn_nw_p ( int *px , int *py );

/* misc.c */
int get_manual_path ( map *map_ptr , XY_PAIR *xy_list , int max_pts );
int make_name ( char *newname , char *basename , char *ext );
int keyhit ( void );
int getkey ( void );
unsigned int mgetkey ( void );
char *mygets ( char *str );
char *strxlat ( char *str , char *old , char *new );
void debug_out ( char *fmt , ...);
int pophelp ( char **strs );
void mouse_on ( void );
void mouse_off ( void );
void tstatus ( char *fmt , ...);
void gstatus ( char *fmt , ...);
void draw_robart ( map *map_ptr , int mapx , int mapy );
GBUF *save_robart ( map *map_ptr , int mapx , int mapy );
void restore_robart ( GBUF *psave );
GBUF *readsq ( int x1 , int y1 , int x2 , int y2 );
int writesq ( int x , int y , GBUF *save_array );
int freesq ( GBUF *save_array );
int force180 ( int degrees );
int force360 ( int degrees );
long force18000 ( long degrees );
long force36000 ( long degrees );
int myrand ( void );
void mysrand ( unsigned int seed );

/* oa.c */
int avoid ( map *map_ptr , int use_global_planner , PATHSEG *path , int nsegs ,
int dest_index );
int init_plot_nav ( void );
int plot_nav_sonar ( map *map_ptr , packet *nav_packet , int rx , int ry );
int deinit_plot_nav ( map *map_ptr );
int mark_map ( int x , int y , map *map_ptr , int dir , int range );
int mark_map ( int x , int y , map *map_ptr , int dir , int range );
int clear_path ( map *map_ptr , int x , int y , int dir , int range );
int grow_oa_map ( map *map_ptr );
int inc_map ( map *map_ptr , int inc_val );

/* packet.c */
void DecodeByte ( byte *in_ptr , byte *out_ptr );
void DecodeWord ( byte *in_ptr , word *out_ptr );
void Decode_Robot_Status_Packet ( packet *pack_ptr , rStatus *rsPtr );
void Decode_Intruder_Packet ( packet *pack_ptr , cond *cPtr );
byte DecodePEArray ( packet *pPtr , byte sonars [], int ir );
int ScalePEArray ( int *output , byte *input );
```

```
int decode_nav_packet ( packet *pPtr , byte *sonars );
int scale_nav_data ( int *output , byte *input );
void DecodeDR ( packet *pPtr , drType *drPtr );
int waitchr ( int chr );
int Xmit ( int chr );
int XmitString ( char *str );
int ConnectToRobart ( int diagnostics );
int DisconnectFromRobart ( void );
int req_packet ( int pack_type , byte *args );
int Get_Packet ( packet *buf_ptr , int pack_type , byte *pBlockPtr , int retry
);
int put_packet ( char *strpacket );
int send_time ( void );
int wait_packet ( packet *recv_packet , int wait );

/* pathplan.c */
void Print_Inflection_List ( XY_PAIR *inflection_list , int ncoords );
void Reorder_Inflection_list ( XY_PAIR *inflection_list , int *pnpoints , int i
p1 , int ip2 );
void Draw_Inflection_List_Path ( map *map_ptr , XY_PAIR *inflection_list , int
npoints , int colors );
int Cut_Path_Corners ( map *map_ptr , XY_PAIR *inflection_list , int *pnpoints
);
int Expand_Slime ( map *map_ptr , int xs , int ys , int *pxd , int *pyd , int d
raw );
int Find_Path ( map *map_ptr , XY_PAIR *inflection_list , int *pnpoints , int x
s , int ys , int xd , int yd );
void Path_Planner ( map *map_ptr );
void Global_Path_Planner( map *map_ptr );
void Random_Planner ( map *map_ptr );
void Spec_Plan ( map *map_ptr );
int load_path ( map *map_ptr );
int save_path ( map *map_ptr );
void PathPlan ( map *map_ptr );
int oa_threshold ( map *map_ptr );

/* execute.c */
int execute_path ( map *map_ptr , PATHSEG *inflect , int npnts , int *plastseg
);
int flash_pos ( map *map_ptr , int x , int y );
int flash_2pos ( map *map_ptr , int dist , int speed );
int execute_turn ( map *map_ptr , int deltahdg );
int execute_move ( map *map_ptr , long distance , int destx, int desty, int str
ipe );
PATHSEG *segment_path ( map *map_ptr , XY_PAIR *inflect , int npnts , int *pnse
gs );

/* pe.c */
int EstimatePosition ( int gridDist , int angleDist , drType *drPtr , map *map_
ptr , drType *pePtr , byte pESonars []);
int byte_compare ( byte *l , byte *r );
int get_avg_pe_sig ( byte *sonar_array );
int CorrectDR ( map *map_ptr , byte pESonars [], int threshold , int ngrids , i
nt skew );
int manual_pe ( map *map_ptr );
int plot_points ( map *map_ptr , int *distances , int *pt_plotted , int *x_coor
d , int *y_coord );
int move_points ( int cc , map *map_ptr , int *x_coord , int *y_coord , int *pt
_plotted , GBUF **psave_buf );
int print_pe_data ( map *map_ptr , int cor );
void refine_heading ( map *map_ptr );
int PositionEstimation ( map *map_ptr );
int make_estimation_path ( map *map_ptr );
int get_pe_signature ( map *map_ptr );

/* polyfill.c */
void FillPolygon ( POLYGON *p , int (*draw_line )(), int color );

/* recal.c */
int plan_reca' ( map *map_ptr );
int dorecalibrate ( map *map_ptr );
int undock ( map *map_ptr );
```

```
/* recharge.c */
int plan_recharge ( map *map_ptr );
int dorecharge ( map *map_ptr );
int recharge_points ( int x , int y );
int update_recharger_pos ( map *map_ptr , packet *recharge_packet , int *rx , i
nt *ry );

/* robart.c */
int _setargv ( void );
int _setenvp ( void );
void DrawMainMenu ( void );
void main ( int argc , char **argv );
int InitGraphics ( void );
int unimplemented_box ( void );
void terminal ( void );
int say ( char *str );
int crt_clearline ( int line , int fore , int back );

/* script.c */
int doscript ( char *name );
void strip_comments ( char * str );
int sbackward ( char *str );
int sconnect ( char *str );
int sdisconnect ( char *str );
int sstub ( void );
int sestimate ( char *str );
int sforward ( char *str );
int sgets ( char *str );
int sloadmap ( char *str );
int smoveto ( char *str );
int srecalibrate ( char *str );
int srecharge ( char *str );
int ssecurity ( char *str );
int ssetdir ( char *str );
int ssetpos ( char *str );
int ssleep ( char *str );
int sturn ( char *str );
int sturnto ( char *str );
int sultrasonic ( char *str );
void script_error ( char *fmt , ...);
int do_move_cmd ( int command , int parm , int speed );
int binary ( char *pat , char **ary , int n , int (*compare )());
char *sgetw ( char *os , char *is );
char *skipblank ( char *s );
char *rlf ( char *s , int n , FILE *fd );
int sget_map_coord( char *str , int squaresize , int offset );

/* sio.c */
int getc_sp ( int port );
void putc_sp ( int port , unsigned int cc );
void puts_sp ( int port , char *str );
unsigned int iqsize ( int port );
unsigned int oqsize ( int port );
int slow_sp_write ( int port , unsigned char *cp , int nbytes );

/* sonplot.c */
int iabs ( int x );
int Clip_To_Map ( int x , int y , map *map_ptr );
void Calc_Dest_Grid_Unit ( int sensor_angle , double range , int *x_ptr , int *
y_ptr , int res );
void RotateSonarData ( int rotate , byte *in , byte *out );
int SonarPlot ( map *map_ptr );
void init_sonar_plotting (void);
int plot_sonars ( map *map_ptr , packet *pack );
void plot_irs ( map *map_ptr , unsigned int irval , int remove );
void plot_hearing ( map *map_ptr , int bearing , int init );
int get_ihdg ( int *moving );
void pos_head ( int heading );

/* speech.c */
int compile_speech ( char *outstr , char *str );
int find_word ( char *w , char ***vl , int *plistno , int *pwordno );
char *sgetwc ( char *out , char *in );
```

Apr 04 1991 10:48:03 protos.h Page 7

```
int num2str ( char *outstr , char *w );
int say_hundreds ( char *outstr , char *instr );
int single_digits ( char *outstr , char *w );

/* tele.c */
int teleoperated ( map *map_ptr );
int tele_init ( void );
int init_tele_display_list ( DISPLAY_LIST *dl );
int draw_robot ( void );

/* tty.c */
int inittty ( int row , int col , int nlines , int ncols );
int deinittty ( void );
int ttyout ( int cc );
int ttystr ( char *str );
char *scgets ( char *str , char *prompt , char *initial );

/* zoom.c */
int zoomin ( map *map_ptr , int xmin , int ymin , int xmax , int ymax );
int zoomall ( map *map_ptr , int xmin , int ymin , int xmax , int ymax );
int zoomout ( map *map_ptr , int xmin , int ymin , int xmax , int ymax );
int pan_map ( map *map_ptr , int dx , int dy , int xmin , int ymin , int xmax ,
 int ymax );
int autopan ( map *map_ptr , MAPC_STRUCT *mapc, GBUF **savebuf);
int line_cursor ( int x , int y );
int to_map_coord ( map *map_ptr , int sx , int sy , int *pmx , int *pmy );
int snap_coord ( map *map_ptr , int *px , int *py );
```

Apr 04 1991 10:48:03 queue.h Page 1

```
/*******************************************************************
 *                              queue.h                              *
 *******************************************************************
 * Queue handling header file.
 *                                                                   *
 *******************************************************************/


typedef struct nodeq {
        void            *item;
        struct nodeq    *next;
} QNODE;

typedef struct q {
        QNODE   *top;
        QNODE   *last;
} QUEUE;


QUEUE   *make_queue(void);
void    unmake_queue(QUEUE *pq);
int     add_queue(QUEUE *pq, void *item);
void    *next_queue(QUEUE *pq);
```

Apr 04 1991 10:48:03 robicons.h Page 1

```
unsigned char ic000[] = {
0x00,0x00,0x00,0x00,0x00,0x00,0x00,0x00,0x00,0x00,
0x00,0x00,0x00,0x00,0x00,0x00,0x00,0x00,0x00,0x00,
0x00,0x02,0x22,0x22,0x22,0x22,0x22,0x22,0x00,0x00,
0x00,0x02,0x11,0x11,0x1e,0x11,0x11,0x12,0x00,0x00,
0x00,0x02,0x11,0x11,0xee,0xe1,0x11,0x12,0x00,0x00,
0x00,0x02,0x11,0x11,0xe5,0xe1,0x11,0x12,0x00,0x00,
0x00,0x02,0x11,0x1e,0xe5,0xee,0x11,0x12,0x00,0x00,
0x00,0x02,0x11,0x1e,0x55,0x5e,0x11,0x12,0x00,0x00,
0x00,0x02,0x11,0xee,0x55,0x5e,0xe1,0x12,0x00,0x00,
0x00,0x02,0x11,0xee,0x55,0x5e,0xe1,0x12,0x00,0x00,
0x00,0x02,0x1e,0xe5,0x55,0x55,0xee,0x12,0x00,0x00,
0x00,0x02,0x1e,0xe5,0x55,0x55,0xee,0x12,0x00,0x00,
0x00,0x02,0xee,0x55,0x55,0x55,0x5e,0xe2,0x00,0x00,
0x00,0x02,0xee,0x55,0x55,0x55,0x5e,0xe2,0x00,0x00,
0x00,0x02,0xee,0xee,0xee,0xee,0xee,0xe2,0x00,0x00,
0x00,0x02,0xee,0xee,0xee,0xee,0xee,0xe2,0x00,0x00,
0x00,0x02,0x22,0x22,0x22,0x22,0x22,0x22,0x00,0x00,
0x00,0x00,0x00,0x00,0x00,0x00,0x00,0x00,0x00,0x00,
0x00,0x00,0x00,0x00,0x00,0x00,0x00,0x00,0x00,0x00
};
unsigned char ic015[] = {
        0x00, 0x00, 0x00, 0x00, 0x00, 0x00, 0x00, 0x00,
        0x00, 0x00,
        0x00, 0x00, 0x02, 0x22, 0x20, 0x00, 0x00, 0x00,
        0x00, 0x00,
        0x00, 0x00, 0x02, 0x11, 0x22, 0x22, 0x00, 0x00,
        0x00, 0x00,
        0x00, 0x00, 0x21, 0x11, 0x11, 0x1E, 0x22, 0x22,
        0x00, 0x00,
        0x00, 0x00, 0x21, 0x11, 0x11, 0xEE, 0x11, 0x11,
        0x22, 0x00,
        0x00, 0x00, 0x21, 0x11, 0x1E, 0x5E, 0x11, 0x11,
        0x20, 0x00,
        0x00, 0x00, 0x21, 0x11, 0xEE, 0x5E, 0x11, 0x11,
        0x20, 0x00,
        0x00, 0x02, 0x11, 0xEE, 0x55, 0x5E, 0x11, 0x11,
        0x20, 0x00,
        0x00, 0x02, 0x11, 0xEE, 0x55, 0x5E, 0x11, 0x12,
        0x00, 0x00,
        0x00, 0x02, 0x1E, 0xE5, 0x55, 0x5E, 0xE1, 0x12,
        0x00, 0x00,
        0x00, 0x02, 0x1E, 0xE5, 0x55, 0x5E, 0xE1, 0x12,
        0x00, 0x00,
        0x00, 0x2E, 0xE5, 0x55, 0x55, 0x55, 0xE1, 0x12,
        0x00, 0x00,
        0x00, 0x2E, 0xE5, 0x55, 0x55, 0x55, 0xE1, 0x20,
        0x00, 0x00,
        0x00, 0x2E, 0xEE, 0xE5, 0x55, 0x55, 0xEE, 0x20,
        0x00, 0x00,
        0x02, 0x2E, 0xEE, 0xEE, 0xEE, 0xE5, 0xEE, 0x20,
        0x00, 0x00,
        0x00, 0x02, 0x22, 0x2E, 0xEE, 0xEE, 0xEE, 0x20,
        0x00, 0x00,
        0x00, 0x00, 0x00, 0x02, 0x22, 0x2E, 0xE2, 0x00,
        0x00, 0x00,
        0x00, 0x00, 0x00, 0x00, 0x00, 0x22, 0x22, 0x00,
        0x00, 0x00,
        0x00, 0x00, 0x00, 0x00, 0x00, 0x00, 0x00, 0x00,
        0x00, 0x00, };
unsigned char ic030[] = {
        0x00, 0x00, 0x00, 0x02, 0x20, 0x00, 0x00, 0x00,
        0x00, 0x00,
        0x00, 0x00, 0x00, 0x02, 0x12, 0x20, 0x00, 0x00,
        0x00, 0x00,
        0x00, 0x00, 0x00, 0x21, 0x11, 0x22, 0x00, 0x00,
        0x00, 0x00,
        0x00, 0x00, 0x02, 0x21, 0x11, 0x11, 0x22, 0x00,
        0x00, 0x00,
        0x00, 0x00, 0x02, 0x11, 0x11, 0x1E, 0xE1, 0x22,
        0x00, 0x00,
        0x00, 0x00, 0x21, 0x11, 0x1E, 0xEE, 0xE1, 0x11,
        0x22, 0x00,
```

Apr 04 1991 10:48:03 robicons.h Page 2

```
        0x00, 0x00, 0x21, 0x11, 0xEE, 0xE5, 0xE1, 0x11,
        0x12, 0x20,
        0x00, 0x02, 0x11, 0x1E, 0xE5, 0x55, 0xE1, 0x11,
        0x12, 0x00,
        0x00, 0x02, 0x1E, 0xEE, 0x55, 0x55, 0xE1, 0x11,
        0x22, 0x00,
        0x00, 0x2E, 0xEE, 0xE5, 0x55, 0x5E, 0xE1, 0x11,
        0x20, 0x00,
        0x02, 0x2E, 0xE5, 0x55, 0x55, 0x5E, 0xE1, 0x12,
        0x00, 0x00,
        0x02, 0xEE, 0x55, 0x55, 0x55, 0x5E, 0x11, 0x12,
        0x00, 0x00,
        0x22, 0xEE, 0xEE, 0x55, 0x55, 0x5E, 0x11, 0x20,
        0x00, 0x00,
        0x02, 0x2E, 0xEE, 0xE5, 0x55, 0x5E, 0x11, 0x20,
        0x00, 0x00,
        0x00, 0x02, 0x2E, 0xEE, 0xE5, 0x5E, 0x12, 0x00,
        0x00, 0x00,
        0x00, 0x00, 0x02, 0x2E, 0xEE, 0xEE, 0x22, 0x00,
        0x00, 0x00,
        0x00, 0x00, 0x00, 0x02, 0x2E, 0xEE, 0x20, 0x00,
        0x00, 0x00,
        0x00, 0x00, 0x00, 0x00, 0x22, 0xE2, 0x00, 0x00,
        0x00, 0x00,
        0x00, 0x00, 0x00, 0x00, 0x00, 0x22, 0x00, 0x00,
        0x00, 0x00, };
unsigned char ic045[] = {
        0x00, 0x00, 0x00, 0x00, 0x00, 0x20, 0x00, 0x00,
        0x00, 0x00,
        0x00, 0x00, 0x00, 0x00, 0x02, 0x12, 0x00, 0x00,
        0x00, 0x00,
        0x00, 0x00, 0x00, 0x00, 0x21, 0x11, 0x20, 0x00,
        0x00, 0x00,
        0x00, 0x00, 0x00, 0x02, 0x11, 0x11, 0x12, 0x00,
        0x00, 0x00,
        0x00, 0x00, 0x00, 0x21, 0x11, 0x11, 0x11, 0x20,
        0x00, 0x00,
        0x00, 0x00, 0x02, 0x11, 0x11, 0x1E, 0xEE, 0x12,
        0x00, 0x00,
        0x00, 0x00, 0x21, 0x11, 0xEE, 0xEE, 0x5E, 0x11,
        0x20, 0x00,
        0x00, 0x02, 0x1E, 0xEE, 0xE5, 0x55, 0xEE, 0x11,
        0x12, 0x00,
        0x00, 0x2E, 0xEE, 0xE5, 0x55, 0x55, 0xE1, 0x11,
        0x11, 0x20,
        0x02, 0xEE, 0xE5, 0x55, 0x55, 0x55, 0xE1, 0x11,
        0x12, 0x00,
        0x2E, 0xEE, 0x55, 0x55, 0x55, 0x5E, 0xE1, 0x11,
        0x20, 0x00,
        0x02, 0xEE, 0xE5, 0x55, 0x55, 0x5E, 0x11, 0x12,
        0x00, 0x00,
        0x00, 0x2E, 0xEE, 0x55, 0x55, 0xEE, 0x11, 0x20,
        0x00, 0x00,
        0x00, 0x02, 0xEE, 0xE5, 0x55, 0xEE, 0x12, 0x00,
        0x00, 0x00,
        0x00, 0x00, 0x2E, 0xEE, 0x5E, 0xE1, 0x20, 0x00,
        0x00, 0x00,
        0x00, 0x00, 0x02, 0xEE, 0xEE, 0xE2, 0x00, 0x00,
        0x00, 0x00,
        0x00, 0x00, 0x00, 0x2E, 0xEE, 0x20, 0x00, 0x00,
        0x00, 0x00,
        0x00, 0x00, 0x00, 0x02, 0xE2, 0x00, 0x00, 0x00,
        0x00, 0x00,
        0x00, 0x00, 0x00, 0x00, 0x20, 0x00, 0x00, 0x00,
        0x00, 0x00, };
unsigned char ic060[] = {
        0x00, 0x00, 0x00, 0x00, 0x00, 0x00, 0x20, 0x00,
        0x00, 0x00,
        0x00, 0x00, 0x00, 0x00, 0x00, 0x22, 0x22, 0x00,
        0x00, 0x00,
        0x00, 0x00, 0x00, 0x00, 0x02, 0x21, 0x12, 0x00,
        0x00, 0x00,
        0x00, 0x00, 0x00, 0x02, 0x21, 0x11, 0x11, 0x20,
```

```
        0x00, 0x00,
        0x00, 0x00, 0x02, 0x21, 0x11, 0x11, 0x11, 0x20,
        0x00, 0x00,
        0x00, 0x02, 0x21, 0x11, 0x11, 0x11, 0x11, 0x12,
        0x00, 0x00,
        0x00, 0x22, 0x11, 0x11, 0x11, 0xEE, 0xEE, 0xE2,
        0x00, 0x00,
        0x22, 0xEE, 0xEE, 0xEE, 0xEE, 0x55, 0x55, 0xE1,
        0x20, 0x00,
        0x2E, 0xEE, 0x55, 0x55, 0x55, 0x55, 0x5E, 0x11,
        0x22, 0x00,
        0x02, 0xEE, 0x55, 0x55, 0x55, 0x55, 0xEE, 0x11,
        0x12, 0x00,
        0x02, 0x2E, 0xE5, 0x55, 0x55, 0x5E, 0xE1, 0x11,
        0x11, 0x20,
        0x00, 0x2E, 0xE5, 0x55, 0x55, 0xEE, 0x11, 0x11,
        0x12, 0x20,
        0x00, 0x02, 0xEE, 0x55, 0x5E, 0xE1, 0x11, 0x12,
        0x20, 0x00,
        0x00, 0x02, 0xEE, 0xE5, 0x5E, 0xE1, 0x11, 0x22,
        0x00, 0x00,
        0x00, 0x00, 0x2E, 0xE5, 0xEE, 0x11, 0x22, 0x00,
        0x00, 0x00,
        0x00, 0x00, 0x2E, 0xEE, 0xEE, 0x22, 0x00, 0x00,
        0x00, 0x00,
        0x00, 0x00, 0x02, 0xEE, 0x22, 0x00, 0x00, 0x00,
        0x00, 0x00,
        0x00, 0x00, 0x02, 0x22, 0x20, 0x00, 0x00, 0x00,
        0x00, 0x00,
        0x00, 0x00, 0x00, 0x20, 0x00, 0x00, 0x00, 0x00,
        0x00, 0x00, };
unsigned char ic075[] = {
        0x00, 0x00, 0x00, 0x00, 0x00, 0x00, 0x00, 0x00,
        0x00, 0x00,
        0x00, 0x00, 0x00, 0x00, 0x00, 0x00, 0x00, 0x20,
        0x00, 0x00,
        0x00, 0x00, 0x00, 0x00, 0x00, 0x02, 0x22, 0x20,
        0x00, 0x00,
        0x00, 0x00, 0x00, 0x02, 0x22, 0x21, 0x11, 0x12,
        0x00, 0x00,
        0x00, 0x02, 0x22, 0x21, 0x11, 0x11, 0x11, 0x12,
        0x00, 0x00,
        0x02, 0x21, 0x11, 0x11, 0x11, 0x11, 0x11, 0x12,
        0x00, 0x00,
        0x02, 0xEE, 0xEE, 0xEE, 0xEE, 0x11, 0x11, 0x12,
        0x00, 0x00,
        0x02, 0xEE, 0x55, 0x55, 0x55, 0xEE, 0xEE, 0xEE,
        0x20, 0x00,
        0x02, 0x2E, 0xE5, 0x55, 0x55, 0x55, 0x55, 0xE1,
        0x20, 0x00,
        0x00, 0x2E, 0xE5, 0x55, 0x55, 0x55, 0xEE, 0xE1,
        0x20, 0x00,
        0x00, 0x2E, 0xE5, 0x55, 0x55, 0x55, 0xE1, 0x11,
        0x22, 0x00,
        0x00, 0x2E, 0xE5, 0x55, 0x55, 0xEE, 0x11, 0x11,
        0x12, 0x00,
        0x00, 0x02, 0xEE, 0x55, 0xEE, 0xEE, 0x11, 0x11,
        0x12, 0x00,
        0x00, 0x02, 0xEE, 0x55, 0xEE, 0x11, 0x11, 0x11,
        0x22, 0x00,
        0x00, 0x02, 0xEE, 0xEE, 0x11, 0x11, 0x22, 0x22,
        0x00, 0x00,
        0x00, 0x02, 0xEE, 0xEE, 0x22, 0x22, 0x00, 0x00,
        0x00, 0x00,
        0x00, 0x00, 0x22, 0x22, 0x00, 0x00, 0x00, 0x00,
        0x00, 0x00,
        0x00, 0x00, 0x20, 0x00, 0x00, 0x00, 0x00, 0x00,
        0x00, 0x00,
        0x00, 0x00, 0x00, 0x00, 0x00, 0x00, 0x00, 0x00,
        0x00, 0x00, };
unsigned char ic090[] = {
0x00,0x00,0x00,0x00,0x00,0x00,0x00,0x00,0x00,0x00,
0x00,0x00,0x00,0x00,0x00,0x00,0x00,0x00,0x00,0x00,
```

```
0x00,0x00,0x00,0x00,0x00,0x00,0x00,0x00,0x00,0x00,
0x00,0x22,0x22,0x22,0x22,0x22,0x22,0x22,0x20,0x00,
0x00,0x2e,0xee,0xe1,0x11,0x11,0x11,0x11,0x20,0x00,
0x00,0x2e,0xee,0xee,0xe1,0x11,0x11,0x11,0x20,0x00,
0x00,0x2e,0xe5,0x5e,0xee,0xe1,0x11,0x11,0x20,0x00,
0x00,0x2e,0xe5,0x55,0x5e,0xee,0xe1,0x11,0x20,0x00,
0x00,0x2e,0xe5,0x55,0x55,0x55,0xee,0xe1,0x20,0x00,
0x00,0x2e,0xe5,0x55,0x55,0x55,0x55,0xee,0x20,0x00,
0x00,0x2e,0xe5,0x55,0x55,0x55,0xee,0xe1,0x20,0x00,
0x00,0x2e,0xe5,0x55,0x5e,0xee,0xe1,0x11,0x20,0x00,
0x00,0x2e,0xe5,0x5e,0xee,0xe1,0x11,0x11,0x20,0x00,
0x00,0x2e,0xee,0xee,0xe1,0x11,0x11,0x11,0x20,0x00,
0x00,0x2e,0xee,0xe1,0x11,0x11,0x11,0x11,0x20,0x00,
0x00,0x22,0x22,0x22,0x22,0x22,0x22,0x22,0x20,0x00,
0x00,0x00,0x00,0x00,0x00,0x00,0x00,0x00,0x00,0x00,
0x00,0x00,0x00,0x00,0x00,0x00,0x00,0x00,0x00,0x00,
0x00,0x00,0x00,0x00,0x00,0x00,0x00,0x00,0x00,0x00
};
unsigned char ic105[] = {
        0x00, 0x00, 0x00, 0x00, 0x00, 0x00, 0x00, 0x00,
        0x00, 0x00,
        0x00, 0x00, 0x20, 0x00, 0x00, 0x00, 0x00, 0x00,
        0x00, 0x00,
        0x00, 0x00, 0x22, 0x22, 0x00, 0x00, 0x00, 0x00,
        0x00, 0x00,
        0x00, 0x02, 0xEE, 0xEE, 0x22, 0x22, 0x00, 0x00,
        0x00, 0x00,
        0x00, 0x02, 0xEE, 0xEE, 0x11, 0x11, 0x22, 0x22,
        0x00, 0x00,
        0x00, 0x02, 0xEE, 0x55, 0xEE, 0x11, 0x11, 0x11,
        0x22, 0x00,
        0x00, 0x02, 0xEE, 0x55, 0xEE, 0xEE, 0x11, 0x11,
        0x12, 0x00,
        0x00, 0x2E, 0xE5, 0x55, 0x55, 0xEE, 0x11, 0x11,
        0x12, 0x00,
        0x00, 0x2E, 0xE5, 0x55, 0x55, 0x55, 0xE1, 0x11,
        0x22, 0x00,
        0x00, 0x2E, 0xE5, 0x55, 0x55, 0x55, 0xEE, 0xE1,
        0x20, 0x00,
        0x02, 0x2E, 0xE5, 0x55, 0x55, 0x55, 0x55, 0xE1,
        0x20, 0x00,
        0x02, 0xEE, 0x55, 0x55, 0x55, 0xEE, 0xEE, 0xEE,
        0x20, 0x00,
        0x02, 0xEE, 0xEE, 0xEE, 0xEE, 0x11, 0x11, 0x12,
        0x00, 0x00,
        0x02, 0x21, 0x11, 0x11, 0x11, 0x11, 0x11, 0x12,
        0x00, 0x00,
        0x00, 0x02, 0x22, 0x21, 0x11, 0x11, 0x11, 0x12,
        0x00, 0x00,
        0x00, 0x00, 0x00, 0x02, 0x22, 0x21, 0x11, 0x12,
        0x00, 0x00,
        0x00, 0x00, 0x00, 0x00, 0x00, 0x02, 0x22, 0x20,
        0x00, 0x00,
        0x00, 0x00, 0x00, 0x00, 0x00, 0x00, 0x00, 0x20,
        0x00, 0x00,
        0x00, 0x00, 0x00, 0x00, 0x00, 0x00, 0x00, 0x00,
        0x00, 0x00, };
unsigned char ic120[] = {
        0x00, 0x00, 0x00, 0x20, 0x00, 0x00, 0x00, 0x00,
        0x00, 0x00,
        0x00, 0x00, 0x02, 0x22, 0x20, 0x00, 0x00, 0x00,
        0x00, 0x00,
        0x00, 0x00, 0x02, 0xEE, 0x22, 0x00, 0x00, 0x00,
        0x00, 0x00,
        0x00, 0x00, 0x2E, 0xEE, 0xEE, 0x22, 0x00, 0x00,
        0x00, 0x00,
        0x00, 0x00, 0x2E, 0xE5, 0xEE, 0x11, 0x22, 0x00,
        0x00, 0x00,
        0x00, 0x02, 0xEE, 0xE5, 0x5E, 0xE1, 0x11, 0x22,
        0x00, 0x00,
        0x00, 0x02, 0xEE, 0x55, 0x5E, 0xE1, 0x11, 0x12,
        0x20, 0x00,
        0x00, 0x2E, 0xE5, 0x55, 0x55, 0xEE, 0x11, 0x11,
```

```
            0x12, 0x20,
            0x02, 0x2E, 0xE5, 0x55, 0x55, 0x5E, 0xE1, 0x11,
            0x11, 0x20,
            0x02, 0xEE, 0x55, 0x55, 0x55, 0x55, 0xEE, 0x11,
            0x12, 0x00,
            0x2E, 0xEE, 0x55, 0x55, 0x55, 0x55, 0x5E, 0x11,
            0x22, 0x00,
            0x22, 0xEE, 0xEE, 0xEE, 0xEE, 0x55, 0x55, 0xE1,
            0x20, 0x00,
            0x00, 0x22, 0x11, 0x11, 0x11, 0xEE, 0xEE, 0xE2,
            0x00, 0x00,
            0x00, 0x02, 0x21, 0x11, 0x11, 0x11, 0x11, 0x12,
            0x00, 0x00,
            0x00, 0x00, 0x02, 0x21, 0x11, 0x11, 0x11, 0x20,
            0x00, 0x00,
            0x00, 0x00, 0x00, 0x02, 0x21, 0x11, 0x11, 0x20,
            0x00, 0x00,
            0x00, 0x00, 0x00, 0x00, 0x02, 0x21, 0x12, 0x00,
            0x00, 0x00,
            0x00, 0x00, 0x00, 0x00, 0x00, 0x22, 0x22, 0x00,
            0x00, 0x00,
            0x00, 0x00, 0x00, 0x00, 0x00, 0x00, 0x20, 0x00,
            0x00, 0x00, };
    unsigned char ic135[] = {
            0x00, 0x00, 0x00, 0x00, 0x20, 0x00, 0x00, 0x00,
            0x00, 0x00,
            0x00, 0x00, 0x00, 0x02, 0xE2, 0x00, 0x00, 0x00,
            0x00, 0x00,
            0x00, 0x00, 0x00, 0x2E, 0xEE, 0x20, 0x00, 0x00,
            0x00, 0x00,
            0x00, 0x00, 0x02, 0xEE, 0xEE, 0xE2, 0x00, 0x00,
            0x00, 0x00,
            0x00, 0x00, 0x2E, 0xEE, 0x5E, 0xE1, 0x20, 0x00,
            0x00, 0x00,
            0x00, 0x02, 0xEE, 0xE5, 0x55, 0xEE, 0x12, 0x00,
            0x00, 0x00,
            0x00, 0x2E, 0xEE, 0x55, 0x55, 0xEE, 0x11, 0x20,
            0x00, 0x00,
            0x02, 0xEE, 0xE5, 0x55, 0x55, 0x5E, 0x11, 0x12,
            0x00, 0x00,
            0x2E, 0xEE, 0x55, 0x55, 0x55, 0x5E, 0xE1, 0x11,
            0x20, 0x00,
            0x02, 0xEE, 0xE5, 0x55, 0x55, 0x55, 0xE1, 0x11,
            0x12, 0x00,
            0x00, 0x2E, 0xEE, 0xE5, 0x55, 0x55, 0xE1, 0x11,
            0x11, 0x20,
            0x00, 0x02, 0x1E, 0xEE, 0xE5, 0x55, 0xEE, 0x11,
            0x12, 0x00,
            0x00, 0x00, 0x21, 0x11, 0xEE, 0xEE, 0x5E, 0x11,
            0x20, 0x00,
            0x00, 0x00, 0x02, 0x11, 0x11, 0x1E, 0xEE, 0x12,
            0x00, 0x00,
            0x00, 0x00, 0x00, 0x21, 0x11, 0x11, 0x11, 0x20,
            0x00, 0x00,
            0x00, 0x00, 0x00, 0x02, 0x11, 0x11, 0x12, 0x00,
            0x00, 0x00,
            0x00, 0x00, 0x00, 0x00, 0x21, 0x11, 0x20, 0x00,
            0x00, 0x00,
            0x00, 0x00, 0x00, 0x00, 0x02, 0x12, 0x00, 0x00,
            0x00, 0x00,
            0x00, 0x00, 0x00, 0x00, 0x00, 0x20, 0x00, 0x00,
            0x00, 0x00, };
    unsigned char ic150[] = {
            0x00, 0x00, 0x00, 0x00, 0x00, 0x22, 0x00, 0x00,
            0x00, 0x00,
            0x00, 0x00, 0x00, 0x00, 0x22, 0xE2, 0x00, 0x00,
            0x00, 0x00,
            0x00, 0x00, 0x00, 0x02, 0x2E, 0xEE, 0x20, 0x00,
            0x00, 0x00,
            0x00, 0x00, 0x02, 0x2E, 0xEE, 0xEE, 0x22, 0x00,
            0x00, 0x00,
            0x00, 0x02, 0x2E, 0xEE, 0xE5, 0x5E, 0x12, 0x00,
            0x00, 0x00,
```

```
            0x02, 0x2E, 0xEE, 0xE5, 0x55, 0x5E, 0x11, 0x20,
            0x00, 0x00,
            0x22, 0xEE, 0xEE, 0x55, 0x55, 0x5E, 0x11, 0x20,
            0x00, 0x00,
            0x02, 0xEE, 0x55, 0x55, 0x55, 0x5E, 0x11, 0x12,
            0x00, 0x00,
            0x02, 0x2E, 0xE5, 0x55, 0x55, 0x5E, 0xE1, 0x12,
            0x00, 0x00,
            0x00, 0x2E, 0xEE, 0xE5, 0x55, 0x5E, 0xE1, 0x11,
            0x20, 0x00,
            0x00, 0x02, 0x1E, 0xEE, 0x55, 0x55, 0xE1, 0x11,
            0x22, 0x00,
            0x00, 0x02, 0x11, 0x1E, 0xE5, 0x55, 0xE1, 0x11,
            0x12, 0x00,
            0x00, 0x00, 0x21, 0x11, 0xEE, 0xE5, 0xE1, 0x11,
            0x12, 0x20,
            0x00, 0x00, 0x21, 0x11, 0x1E, 0xEE, 0xE1, 0x11,
            0x22, 0x00,
            0x00, 0x00, 0x02, 0x11, 0x11, 0x1E, 0xE1, 0x22,
            0x00, 0x00,
            0x00, 0x00, 0x02, 0x21, 0x11, 0x11, 0x22, 0x00,
            0x00, 0x00,
            0x00, 0x00, 0x00, 0x21, 0x11, 0x22, 0x00, 0x00,
            0x00, 0x00,
            0x00, 0x00, 0x00, 0x02, 0x12, 0x20, 0x00, 0x00,
            0x00, 0x00,
            0x00, 0x00, 0x00, 0x02, 0x20, 0x00, 0x00, 0x00,
            0x00, 0x00, };
    unsigned char ic165[] = {
            0x00, 0x00, 0x00, 0x00, 0x00, 0x00, 0x00, 0x00,
            0x00, 0x00,
            0x00, 0x00, 0x00, 0x00, 0x00, 0x22, 0x22, 0x00,
            0x00, 0x00,
            0x00, 0x00, 0x00, 0x02, 0x22, 0x2E, 0xE2, 0x00,
            0x00, 0x00,
            0x00, 0x02, 0x22, 0x2E, 0xEE, 0xEE, 0xEE, 0x20,
            0x00, 0x00,
            0x02, 0x2E, 0xEE, 0xEE, 0xEE, 0xE5, 0xEE, 0x20,
            0x00, 0x00,
            0x00, 0x2E, 0xEE, 0xE5, 0x55, 0x55, 0xEE, 0x20,
            0x00, 0x00,
            0x00, 0x2E, 0xE5, 0x55, 0x55, 0x55, 0xE1, 0x20,
            0x00, 0x00,
            0x00, 0x2E, 0xE5, 0x55, 0x55, 0x55, 0xE1, 0x12,
            0x00, 0x00,
            0x00, 0x02, 0x1E, 0xE5, 0x55, 0x5E, 0xE1, 0x12,
            0x00, 0x00,
            0x00, 0x02, 0x1E, 0xE5, 0x55, 0x5E, 0xE1, 0x12,
            0x00, 0x00,
            0x00, 0x02, 0x11, 0xEE, 0x55, 0x5E, 0x11, 0x12,
            0x00, 0x00,
            0x00, 0x02, 0x11, 0xEE, 0x55, 0x5E, 0x11, 0x11,
            0x20, 0x00,
            0x00, 0x00, 0x21, 0x11, 0xEE, 0x5E, 0x11, 0x11,
            0x20, 0x00,
            0x00, 0x00, 0x21, 0x11, 0x1E, 0x5E, 0x11, 0x11,
            0x20, 0x00,
            0x00, 0x00, 0x21, 0x11, 0x11, 0xEE, 0x11, 0x11,
            0x22, 0x00,
            0x00, 0x00, 0x21, 0x11, 0x11, 0x1E, 0x22, 0x22,
            0x00, 0x00,
            0x00, 0x00, 0x02, 0x11, 0x22, 0x22, 0x00, 0x00,
            0x00, 0x00,
            0x00, 0x00, 0x02, 0x22, 0x20, 0x00, 0x00, 0x00,
            0x00, 0x00,
            0x00, 0x00, 0x00, 0x00, 0x00, 0x00, 0x00, 0x00,
            0x00, 0x00, };
    unsigned char ic180[] = {
    0x00,0x00,0x00,0x00,0x00,0x00,0x00,0x00,0x00,0x00,
    0x00,0x00,0x00,0x00,0x00,0x00,0x00,0x00,0x00,0x00,
    0x00,0x02,0x22,0x22,0x22,0x22,0x22,0x22,0x00,0x00,
    0x00,0x02,0xee,0xee,0xee,0xee,0xee,0xe2,0x00,0x00,
    0x00,0x02,0xee,0xee,0xee,0xee,0xee,0xe2,0x00,0x00,
```

```
0x00,0x02,0xee,0x55,0x55,0x55,0x5e,0xe2,0x00,0x00,
0x00,0x02,0xee,0x55,0x55,0x55,0x5e,0xe2,0x00,0x00,
0x00,0x02,0x1e,0xe5,0x55,0x55,0xee,0x12,0x00,0x00,
0x00,0x02,0x1e,0xe5,0x55,0x55,0xee,0x12,0x00,0x00,
0x00,0x02,0x11,0xee,0x55,0x5e,0xe1,0x12,0x00,0x00,
0x00,0x02,0x11,0xee,0x55,0x5e,0xe1,0x12,0x00,0x00,
0x00,0x02,0x11,0x1e,0x55,0x5e,0x11,0x12,0x00,0x00,
0x00,0x02,0x11,0x1e,0xe5,0xee,0x11,0x12,0x00,0x00,
0x00,0x02,0x11,0x11,0xe5,0xe1,0x11,0x12,0x00,0x00,
0x00,0x02,0x11,0x11,0xee,0xe1,0x11,0x12,0x00,0x00,
0x00,0x02,0x11,0x11,0x1e,0x11,0x11,0x12,0x00,0x00,
0x00,0x02,0x22,0x22,0x22,0x22,0x22,0x22,0x00,0x00,
0x00,0x00,0x00,0x00,0x00,0x00,0x00,0x00,0x00,0x00,
0x00,0x00,0x00,0x00,0x00,0x00,0x00,0x00,0x00,0x00
};
unsigned char ic195[] = {
        0x00, 0x00, 0x00, 0x00, 0x00, 0x00, 0x00, 0x00,
        0x00, 0x00,
        0x00, 0x00, 0x02, 0x22, 0x20, 0x00, 0x00, 0x00,
        0x00, 0x00,
        0x00, 0x00, 0x02, 0xEE, 0x22, 0x22, 0x00, 0x00,
        0x00, 0x00,
        0x00, 0x00, 0x2E, 0xEE, 0xEE, 0xEE, 0x22, 0x22,
        0x00, 0x00,
        0x00, 0x00, 0x2E, 0xE5, 0xEE, 0xEE, 0xEE, 0xEE,
        0x22, 0x00,
        0x00, 0x00, 0x2E, 0xE5, 0x55, 0x55, 0xEE, 0xEE,
        0x20, 0x00,
        0x00, 0x00, 0x21, 0xE5, 0x55, 0x55, 0x55, 0xEE,
        0x20, 0x00,
        0x00, 0x02, 0x11, 0xE5, 0x55, 0x55, 0x55, 0xEE,
        0x20, 0x00,
        0x00, 0x02, 0x11, 0xEE, 0x55, 0x55, 0xEE, 0x12,
        0x00, 0x00,
        0x00, 0x02, 0x11, 0xEE, 0x55, 0x55, 0xEE, 0x12,
        0x00, 0x00,
        0x00, 0x02, 0x11, 0x1E, 0x55, 0x5E, 0xE1, 0x12,
        0x00, 0x00,
        0x00, 0x21, 0x11, 0x1E, 0x55, 0x5E, 0xE1, 0x12,
        0x00, 0x00,
        0x00, 0x21, 0x11, 0x1E, 0x5E, 0xE1, 0x11, 0x20,
        0x00, 0x00,
        0x00, 0x21, 0x11, 0x1E, 0x5E, 0x11, 0x11, 0x20,
        0x00, 0x00,
        0x02, 0x21, 0x11, 0x1E, 0xE1, 0x11, 0x11, 0x20,
        0x00, 0x00,
        0x00, 0x02, 0x22, 0x2E, 0x11, 0x11, 0x11, 0x20,
        0x00, 0x00,
        0x00, 0x00, 0x00, 0x02, 0x22, 0x21, 0x12, 0x00,
        0x00, 0x00,
        0x00, 0x00, 0x00, 0x00, 0x00, 0x22, 0x22, 0x00,
        0x00, 0x00,
        0x00, 0x00, 0x00, 0x00, 0x00, 0x00, 0x00, 0x00,
        0x00, 0x00, };
unsigned char ic210[] = {
        0x00, 0x00, 0x00, 0x02, 0x20, 0x00, 0x00, 0x00,
        0x00, 0x00,
        0x00, 0x00, 0x00, 0x02, 0xE2, 0x20, 0x00, 0x00,
        0x00, 0x00,
        0x00, 0x00, 0x00, 0x2E, 0xEE, 0x22, 0x00, 0x00,
        0x00, 0x00,
        0x00, 0x00, 0x02, 0x2E, 0xEE, 0xEE, 0x22, 0x00,
        0x00, 0x00,
        0x00, 0x00, 0x02, 0x1E, 0x55, 0xEE, 0xEE, 0x22,
        0x00, 0x00,
        0x00, 0x00, 0x21, 0x1E, 0x55, 0x55, 0xEE, 0xEE,
        0x22, 0x00,
        0x00, 0x00, 0x21, 0x1E, 0x55, 0x55, 0x5E, 0xEE,
        0xE2, 0x20,
        0x00, 0x02, 0x11, 0x1E, 0x55, 0x55, 0x55, 0x5E,
        0xE2, 0x00,
        0x00, 0x02, 0x11, 0xEE, 0x55, 0x55, 0x55, 0xEE,
        0x22, 0x00,
```

```
        0x00, 0x21, 0x11, 0xEE, 0x55, 0x55, 0xEE, 0xEE,
        0x20, 0x00,
        0x02, 0x21, 0x11, 0xE5, 0x55, 0x5E, 0xEE, 0x12,
        0x00, 0x00,
        0x02, 0x11, 0x11, 0xE5, 0x55, 0xEE, 0x11, 0x12,
        0x00, 0x00,
        0x22, 0x11, 0x11, 0xE5, 0xEE, 0xE1, 0x11, 0x20,
        0x00, 0x00,
        0x02, 0x21, 0x11, 0xEE, 0xEE, 0x11, 0x11, 0x20,
        0x00, 0x00,
        0x00, 0x02, 0x21, 0xEE, 0x11, 0x11, 0x12, 0x00,
        0x00, 0x00,
        0x00, 0x00, 0x02, 0x21, 0x11, 0x11, 0x22, 0x00,
        0x00, 0x00,
        0x00, 0x00, 0x00, 0x02, 0x21, 0x11, 0x20, 0x00,
        0x00, 0x00,
        0x00, 0x00, 0x00, 0x00, 0x22, 0x12, 0x00, 0x00,
        0x00, 0x00,
        0x00, 0x00, 0x00, 0x00, 0x00, 0x22, 0x00, 0x00,
        0x00, 0x00, };
unsigned char ic225[] = {
        0x00, 0x00, 0x00, 0x00, 0x00, 0x20, 0x00, 0x00,
        0x00, 0x00,
        0x00, 0x00, 0x00, 0x00, 0x02, 0xE2, 0x00, 0x00,
        0x00, 0x00,
        0x00, 0x00, 0x00, 0x00, 0x2E, 0xEE, 0x20, 0x00,
        0x00, 0x00,
        0x00, 0x00, 0x00, 0x02, 0xEE, 0xEE, 0xE2, 0x00,
        0x00, 0x00,
        0x00, 0x00, 0x00, 0x21, 0xEE, 0x5E, 0xEE, 0x20,
        0x00, 0x00,
        0x00, 0x00, 0x02, 0x1E, 0xE5, 0x55, 0xEE, 0xE2,
        0x00, 0x00,
        0x00, 0x00, 0x21, 0x1E, 0xE5, 0x55, 0x5E, 0xEE,
        0x20, 0x00,
        0x00, 0x02, 0x11, 0x1E, 0x55, 0x55, 0x55, 0xEE,
        0xE2, 0x00,
        0x00, 0x21, 0x11, 0xEE, 0x55, 0x55, 0x55, 0x5E,
        0xEE, 0x20,
        0x02, 0x11, 0x11, 0xE5, 0x55, 0x55, 0x55, 0xEE,
        0xE2, 0x00,
        0x21, 0x11, 0x11, 0xE5, 0x55, 0x55, 0xEE, 0xEE,
        0x20, 0x00,
        0x02, 0x11, 0x1E, 0xE5, 0x55, 0xEE, 0xEE, 0x12,
        0x00, 0x00,
        0x00, 0x21, 0x1E, 0x5E, 0xEE, 0xE1, 0x11, 0x20,
        0x00, 0x00,
        0x00, 0x02, 0x1E, 0xEE, 0x11, 0x11, 0x12, 0x00,
        0x00, 0x00,
        0x00, 0x00, 0x21, 0x11, 0x11, 0x11, 0x20, 0x00,
        0x00, 0x00,
        0x00, 0x00, 0x02, 0x11, 0x11, 0x12, 0x00, 0x00,
        0x00, 0x00,
        0x00, 0x00, 0x00, 0x21, 0x11, 0x20, 0x00, 0x00,
        0x00, 0x00,
        0x00, 0x00, 0x00, 0x02, 0x12, 0x00, 0x00, 0x00,
        0x00, 0x00,
        0x00, 0x00, 0x00, 0x00, 0x20, 0x00, 0x00, 0x00,
        0x00, 0x00, };
unsigned char ic240[] = {
        0x00, 0x00, 0x00, 0x00, 0x00, 0x00, 0x20, 0x00,
        0x00, 0x00,
        0x00, 0x00, 0x00, 0x00, 0x00, 0x22, 0x22, 0x00,
        0x00, 0x00,
        0x00, 0x00, 0x00, 0x00, 0x02, 0x2E, 0xE2, 0x00,
        0x00, 0x00,
        0x00, 0x00, 0x00, 0x02, 0x2E, 0xEE, 0xEE, 0x20,
        0x00, 0x00,
        0x00, 0x00, 0x02, 0x21, 0x1E, 0xE5, 0xEE, 0x20,
        0x00, 0x00,
        0x00, 0x02, 0x21, 0x11, 0xEE, 0x55, 0xEE, 0xE2,
        0x00, 0x00,
        0x00, 0x22, 0x11, 0x11, 0xEE, 0x55, 0x5E, 0xE2,
```

```
            0x00, 0x00,
            0x22, 0x11, 0x11, 0x1E, 0xE5, 0x55, 0x55, 0xEE,
            0x20, 0x00,
            0x21, 0x11, 0x11, 0xEE, 0x55, 0x55, 0x55, 0xEE,
            0x22, 0x00,
            0x02, 0x11, 0x1E, 0xE5, 0x55, 0x55, 0x55, 0x5E,
            0xE2, 0x00,
            0x02, 0x21, 0x1E, 0x55, 0x55, 0x55, 0x55, 0x5E,
            0xEE, 0x20,
            0x00, 0x21, 0xE5, 0x55, 0x5E, 0xEE, 0xEE, 0xEE,
            0xE2, 0x20,
            0x00, 0x02, 0xEE, 0xEE, 0xE1, 0x11, 0x11, 0x12,
            0x20, 0x00,
            0x00, 0x02, 0x11, 0x11, 0x11, 0x11, 0x11, 0x22,
            0x00, 0x00,
            0x00, 0x00, 0x21, 0x11, 0x11, 0x11, 0x22, 0x00,
            0x00, 0x00,
            0x00, 0x00, 0x21, 0x11, 0x11, 0x22, 0x00, 0x00,
            0x00, 0x00,
            0x00, 0x00, 0x02, 0x11, 0x22, 0x00, 0x00, 0x00,
            0x00, 0x00,
            0x00, 0x00, 0x02, 0x22, 0x20, 0x00, 0x00, 0x00,
            0x00, 0x00,
            0x00, 0x00, 0x00, 0x20, 0x00, 0x00, 0x00, 0x00,
            0x00, 0x00, };
    unsigned char ic255[] = {
            0x00, 0x00, 0x00, 0x00, 0x00, 0x00, 0x00, 0x00,
            0x00, 0x00,
            0x00, 0x00, 0x00, 0x00, 0x00, 0x00, 0x00, 0x20,
            0x00, 0x00,
            0x00, 0x00, 0x00, 0x00, 0x00, 0x02, 0x22, 0x20,
            0x00, 0x00,
            0x00, 0x00, 0x00, 0x02, 0x22, 0x2E, 0xEE, 0xE2,
            0x00, 0x00,
            0x00, 0x02, 0x22, 0x21, 0x11, 0x1E, 0xEE, 0xE2,
            0x00, 0x00,
            0x02, 0x21, 0x11, 0x11, 0x1E, 0xE5, 0x5E, 0xE2,
            0x00, 0x00,
            0x02, 0x11, 0x11, 0x1E, 0xEE, 0xE5, 0x5E, 0xE2,
            0x00, 0x00,
            0x02, 0x11, 0x11, 0x1E, 0xE5, 0x55, 0x55, 0xEE,
            0x20, 0x00,
            0x02, 0x21, 0x11, 0xE5, 0x55, 0x55, 0x55, 0xEE,
            0x20, 0x00,
            0x00, 0x21, 0xEE, 0xE5, 0x55, 0x55, 0x55, 0xEE,
            0x20, 0x00,
            0x00, 0x21, 0xE5, 0x55, 0x55, 0x55, 0x55, 0xEE,
            0x22, 0x00,
            0x00, 0x2E, 0xEE, 0xEE, 0xE5, 0x55, 0x55, 0x5E,
            0xE2, 0x00,
            0x00, 0x02, 0x11, 0x11, 0x1E, 0xEE, 0xEE, 0xEE,
            0xE2, 0x00,
            0x00, 0x02, 0x11, 0x11, 0x11, 0x11, 0x11, 0x11,
            0x22, 0x00,
            0x00, 0x02, 0x11, 0x11, 0x11, 0x11, 0x22, 0x22,
            0x00, 0x00,
            0x00, 0x02, 0x11, 0x11, 0x22, 0x22, 0x00, 0x00,
            0x00, 0x00,
            0x00, 0x00, 0x22, 0x22, 0x00, 0x00, 0x00, 0x00,
            0x00, 0x00,
            0x00, 0x00, 0x20, 0x00, 0x00, 0x00, 0x00, 0x00,
            0x00, 0x00,
            0x00, 0x00, 0x00, 0x00, 0x00, 0x00, 0x00, 0x00,
            0x00, 0x00, };
    unsigned char ic270[] = {
    0x00,0x00,0x00,0x00,0x00,0x00,0x00,0x00,0x00,0x00,
    0x00,0x00,0x00,0x00,0x00,0x00,0x00,0x00,0x00,0x00,
    0x00,0x00,0x00,0x00,0x00,0x00,0x00,0x00,0x00,0x00,
    0x00,0x22,0x22,0x22,0x22,0x22,0x22,0x22,0x20,0x00,
    0x00,0x21,0x11,0x11,0x11,0x11,0xee,0xee,0x20,0x00,
    0x00,0x21,0x11,0x11,0x11,0xee,0xee,0xee,0x20,0x00,
    0x00,0x21,0x11,0x11,0xee,0xee,0x55,0xee,0x20,0x00,
    0x00,0x21,0x11,0xee,0xee,0x55,0x55,0xee,0x20,0x00,
```

```
    0x00,0x21,0xee,0xe5,0x55,0x55,0x55,0xee,0x20,0x00,
    0x00,0x2e,0xe5,0x55,0x55,0x55,0x55,0xee,0x20,0x00,
    0x00,0x21,0xee,0xe5,0x55,0x55,0x55,0xee,0x20,0x00,
    0x00,0x21,0x11,0xee,0xee,0x55,0x55,0xee,0x20,0x00,
    0x00,0x21,0x11,0x11,0xee,0xee,0x55,0xee,0x20,0x00,
    0x00,0x21,0x11,0x11,0x11,0xee,0xee,0xee,0x20,0x00,
    0x00,0x21,0x11,0x11,0x11,0x11,0xee,0xee,0x20,0x00,
    0x00,0x22,0x22,0x22,0x22,0x22,0x22,0x22,0x20,0x00,
    0x00,0x00,0x00,0x00,0x00,0x00,0x00,0x00,0x00,0x00,
    0x00,0x00,0x00,0x00,0x00,0x00,0x00,0x00,0x00,0x00,
    0x00,0x00,0x00,0x00,0x00,0x00,0x00,0x00,0x00,0x00
    };
    unsigned char ic285[] = {
            0x00, 0x00, 0x00, 0x00, 0x00, 0x00, 0x00, 0x00,
            0x00, 0x00,
            0x00, 0x00, 0x20, 0x00, 0x00, 0x00, 0x00, 0x00,
            0x00, 0x00,
            0x00, 0x00, 0x22, 0x22, 0x00, 0x00, 0x00, 0x00,
            0x00, 0x00,
            0x00, 0x02, 0x11, 0x11, 0x22, 0x22, 0x00, 0x00,
            0x00, 0x00,
            0x00, 0x02, 0x11, 0x11, 0x11, 0x11, 0x22, 0x22,
            0x00, 0x00,
            0x00, 0x02, 0x11, 0x11, 0x11, 0x11, 0x11, 0x11,
            0x22, 0x00,
            0x00, 0x02, 0x11, 0x11, 0x1E, 0xEE, 0xEE, 0xEE,
            0xE2, 0x00,
            0x00, 0x2E, 0xEE, 0xEE, 0xE5, 0x55, 0x55, 0x5E,
            0xE2, 0x00,
            0x00, 0x21, 0xE5, 0x55, 0x55, 0x55, 0x55, 0xEE,
            0x22, 0x00,
            0x00, 0x21, 0xEE, 0xE5, 0x55, 0x55, 0x55, 0xEE,
            0x20, 0x00,
            0x02, 0x21, 0x11, 0xE5, 0x55, 0x55, 0x55, 0xEE,
            0x20, 0x00,
            0x02, 0x11, 0x11, 0x1E, 0xE5, 0x55, 0x55, 0xEE,
            0x20, 0x00,
            0x02, 0x11, 0x11, 0x1E, 0xEE, 0xE5, 0x5E, 0xE2,
            0x00, 0x00,
            0x02, 0x21, 0x11, 0x11, 0x1E, 0xE5, 0x5E, 0xE2,
            0x00, 0x00,
            0x00, 0x02, 0x22, 0x21, 0x11, 0x1E, 0xEE, 0xE2,
            0x00, 0x00,
            0x00, 0x00, 0x00, 0x02, 0x22, 0x2E, 0xEE, 0xE2,
            0x00, 0x00,
            0x00, 0x00, 0x00, 0x00, 0x00, 0x02, 0x22, 0x20,
            0x00, 0x00,
            0x00, 0x00, 0x00, 0x00, 0x00, 0x00, 0x00, 0x20,
            0x00, 0x00,
            0x00, 0x00, 0x00, 0x00, 0x00, 0x00, 0x00, 0x00,
            0x00, 0x00, };
    unsigned char ic300[] = {
            0x00, 0x00, 0x00, 0x20, 0x00, 0x00, 0x00, 0x00,
            0x00, 0x00,
            0x00, 0x00, 0x02, 0x22, 0x20, 0x00, 0x00, 0x00,
            0x00, 0x00,
            0x00, 0x00, 0x02, 0x11, 0x22, 0x00, 0x00, 0x00,
            0x00, 0x00,
            0x00, 0x00, 0x21, 0x11, 0x11, 0x22, 0x00, 0x00,
            0x00, 0x00,
            0x00, 0x00, 0x21, 0x11, 0x11, 0x11, 0x22, 0x00,
            0x00, 0x00,
            0x00, 0x02, 0x11, 0x11, 0x11, 0x11, 0x11, 0x22,
            0x00, 0x00,
            0x00, 0x02, 0xEE, 0xEE, 0xE1, 0x11, 0x11, 0x12,
            0x20, 0x00,
            0x00, 0x21, 0xE5, 0x55, 0x5E, 0xEE, 0xEE, 0xEE,
            0xE2, 0x20,
            0x02, 0x21, 0x1E, 0x55, 0x55, 0x55, 0x55, 0x5E,
            0xEE, 0x20,
            0x02, 0x11, 0x1E, 0xE5, 0x55, 0x55, 0x55, 0x5E,
            0xE2, 0x00,
            0x21, 0x11, 0x11, 0xEE, 0x55, 0x55, 0x55, 0xEE,
```

```
        0x22, 0x00,
        0x22, 0x11, 0x11, 0x1E, 0xE5, 0x55, 0x55, 0xEE,
        0x20, 0x00,
        0x00, 0x22, 0x11, 0x11, 0xEE, 0x55, 0x5E, 0xE2,
        0x00, 0x00,
        0x00, 0x02, 0x21, 0x11, 0xEE, 0x55, 0xEE, 0xE2,
        0x00, 0x00,
        0x00, 0x00, 0x02, 0x21, 0x1E, 0xE5, 0xEE, 0x20,
        0x00, 0x00,
        0x00, 0x00, 0x00, 0x02, 0x2E, 0xEE, 0xEE, 0x20,
        0x00, 0x00,
        0x00, 0x00, 0x00, 0x00, 0x02, 0x2E, 0xE2, 0x00,
        0x00, 0x00,
        0x00, 0x00, 0x00, 0x00, 0x00, 0x22, 0x22, 0x00,
        0x00, 0x00,
        0x00, 0x00, 0x00, 0x00, 0x00, 0x00, 0x20, 0x00,
        0x00, 0x00, };
unsigned char ic315[] = {
        0x00, 0x00, 0x00, 0x00, 0x20, 0x00, 0x00, 0x00,
        0x00, 0x00,
        0x00, 0x00, 0x00, 0x02, 0x12, 0x00, 0x00, 0x00,
        0x00, 0x00,
        0x00, 0x00, 0x00, 0x21, 0x11, 0x20, 0x00, 0x00,
        0x00, 0x00,
        0x00, 0x00, 0x02, 0x11, 0x11, 0x12, 0x00, 0x00,
        0x00, 0x00,
        0x00, 0x00, 0x21, 0x11, 0x11, 0x11, 0x20, 0x00,
        0x00, 0x00,
        0x00, 0x02, 0x1E, 0xEE, 0x11, 0x11, 0x12, 0x00,
        0x00, 0x00,
        0x00, 0x21, 0x1E, 0x5E, 0xEE, 0xE1, 0x11, 0x20,
        0x00, 0x00,
        0x02, 0x11, 0x1E, 0xE5, 0x55, 0xEE, 0xEE, 0x12,
        0x00, 0x00,
        0x21, 0x11, 0x11, 0xE5, 0x55, 0x55, 0xEE, 0xEE,
        0x20, 0x00,
        0x02, 0x11, 0x11, 0xE5, 0x55, 0x55, 0x55, 0xEE,
        0xE2, 0x00,
        0x00, 0x21, 0x11, 0xEE, 0x55, 0x55, 0x55, 0x5E,
        0xEE, 0x20,
        0x00, 0x02, 0x11, 0x1E, 0x55, 0x55, 0x55, 0xEE,
        0xE2, 0x00,
        0x00, 0x00, 0x21, 0x1E, 0xE5, 0x55, 0x5E, 0xEE,
        0x20, 0x00,
        0x00, 0x00, 0x02, 0x1E, 0xE5, 0x55, 0xEE, 0xE2,
        0x00, 0x00,
        0x00, 0x00, 0x00, 0x21, 0xEE, 0x5E, 0xEE, 0x20,
        0x00, 0x00,
        0x00, 0x00, 0x00, 0x02, 0xEE, 0xEE, 0xE2, 0x00,
        0x00, 0x00,
        0x00, 0x00, 0x00, 0x00, 0x2E, 0xEE, 0x20, 0x00,
        0x00, 0x00,
        0x00, 0x00, 0x00, 0x00, 0x02, 0xE2, 0x00, 0x00,
        0x00, 0x00,
        0x00, 0x00, 0x00, 0x00, 0x00, 0x20, 0x00, 0x00,
        0x00, 0x00, };
unsigned char ic330[] = {
        0x00, 0x00, 0x00, 0x00, 0x00, 0x22, 0x00, 0x00,
        0x00, 0x00,
        0x00, 0x00, 0x00, 0x00, 0x22, 0x12, 0x00, 0x00,
        0x00, 0x00,
        0x00, 0x00, 0x00, 0x02, 0x21, 0x11, 0x20, 0x00,
        0x00, 0x00,
        0x00, 0x00, 0x02, 0x21, 0x11, 0x11, 0x22, 0x00,
        0x00, 0x00,
        0x00, 0x02, 0x21, 0xEE, 0x11, 0x11, 0x12, 0x00,
        0x00, 0x00,
        0x02, 0x21, 0x11, 0xEE, 0xEE, 0x11, 0x11, 0x20,
        0x00, 0x00,
        0x22, 0x11, 0x11, 0xE5, 0xEE, 0xE1, 0x11, 0x20,
        0x00, 0x00,
        0x02, 0x11, 0x11, 0xE5, 0x55, 0xEE, 0x11, 0x12,
        0x00, 0x00,
```

```
        0x02, 0x21, 0x11, 0xE5, 0x55, 0x5E, 0xEE, 0x12,
        0x00, 0x00,
        0x00, 0x21, 0x11, 0xEE, 0x55, 0x55, 0xEE, 0xEE,
        0x20, 0x00,
        0x00, 0x02, 0x11, 0xEE, 0x55, 0x55, 0x55, 0xEE,
        0x22, 0x00,
        0x00, 0x02, 0x11, 0x1E, 0x55, 0x55, 0x55, 0x5E,
        0xE2, 0x00,
        0x00, 0x00, 0x21, 0x1E, 0x55, 0x55, 0x5E, 0xEE,
        0xE2, 0x20,
        0x00, 0x00, 0x21, 0x1E, 0x55, 0x55, 0xEE, 0xEE,
        0x22, 0x00,
        0x00, 0x00, 0x02, 0x1E, 0x55, 0xEE, 0xEE, 0x22,
        0x00, 0x00,
        0x00, 0x00, 0x02, 0x2E, 0xEE, 0xEE, 0x22, 0x00,
        0x00, 0x00,
        0x00, 0x00, 0x00, 0x2E, 0xEE, 0x22, 0x00, 0x00,
        0x00, 0x00,
        0x00, 0x00, 0x00, 0x02, 0xE2, 0x20, 0x00, 0x00,
        0x00, 0x00,
        0x00, 0x00, 0x00, 0x02, 0x20, 0x00, 0x00, 0x00,
        0x00, 0x00, };
unsigned char ic345[] = {
        0x00, 0x00, 0x00, 0x00, 0x00, 0x00, 0x00, 0x00,
        0x00, 0x00,
        0x00, 0x00, 0x00, 0x00, 0x00, 0x22, 0x22, 0x00,
        0x00, 0x00,
        0x00, 0x00, 0x00, 0x02, 0x22, 0x21, 0x12, 0x00,
        0x00, 0x00,
        0x00, 0x02, 0x22, 0x2E, 0x11, 0x11, 0x11, 0x20,
        0x00, 0x00,
        0x02, 0x21, 0x11, 0x1E, 0xE1, 0x11, 0x11, 0x20,
        0x00, 0x00,
        0x00, 0x21, 0x11, 0x1E, 0x5E, 0x11, 0x11, 0x20,
        0x00, 0x00,
        0x00, 0x21, 0x11, 0x1E, 0x5E, 0xE1, 0x11, 0x20,
        0x00, 0x00,
        0x00, 0x21, 0x11, 0x1E, 0x55, 0x5E, 0xE1, 0x12,
        0x00, 0x00,
        0x00, 0x02, 0x11, 0x1E, 0x55, 0x5E, 0xE1, 0x12,
        0x00, 0x00,
        0x00, 0x02, 0x11, 0xEE, 0x55, 0x55, 0xEE, 0x12,
        0x00, 0x00,
        0x00, 0x02, 0x11, 0xEE, 0x55, 0x55, 0xEE, 0x12,
        0x00, 0x00,
        0x00, 0x02, 0x11, 0xE5, 0x55, 0x55, 0x55, 0xEE,
        0x20, 0x00,
        0x00, 0x00, 0x21, 0xE5, 0x55, 0x55, 0x55, 0xEE,
        0x20, 0x00,
        0x00, 0x00, 0x2E, 0xE5, 0x55, 0x55, 0xEE, 0xEE,
        0x20, 0x00,
        0x00, 0x00, 0x2E, 0xE5, 0xEE, 0xEE, 0xEE, 0xEE,
        0x22, 0x00,
        0x00, 0x00, 0x2E, 0xEE, 0xEE, 0xEE, 0x22, 0x22,
        0x00, 0x00,
        0x00, 0x00, 0x02, 0xEE, 0x22, 0x22, 0x00, 0x00,
        0x00, 0x00,
        0x00, 0x00, 0x02, 0x22, 0x20, 0x00, 0x00, 0x00,
        0x00, 0x00,
        0x00, 0x00, 0x00, 0x00, 0x00, 0x00, 0x00, 0x00,
        0x00, 0x00, };

unsigned char *robart_icons[] = {
        ic000,
        ic015,
        ic030,
        ic045,
        ic060,
        ic075,
        ic090,
        ic105,
        ic120,
        ic135,
```

Apr 04 1991 10:48:03 robicons.h Page 13

```
            ic150,
            ic165,
            ic180,
            ic195,
            ic210,
            ic225,
            ic240,
            ic255,
            ic270,
            ic285,
            ic300,
            ic315,
            ic330,
            ic345
    };
```

Apr 04 1991 10:48:03 rtclk.h Page 1

```
/*****************************************************************************/
/*                               rtclk.h                                     */
/*****************************************************************************/
/*                                                                           */
/*  Description :      Real time clock header file.                          */
/*                                                                           */
/*****************************************************************************/

typedef struct {unsigned char ten_thousandths;  /* 0 <= t  <= 9  */
                unsigned char hundredths;       /* 0 <= h  <= 9  */
                unsigned char tenths;           /* 0 <= t  <= 9  */
                unsigned char seconds;          /* 0 <= ss <= 59 */
                unsigned char minutes;          /* 0 <= mm <= 59 */
                unsigned char hours;            /* 0 <= hh <= 23 */
                unsigned char day_of_week;      /* 1 <= w  <= 7  */
                unsigned char day_of_month;     /* 1 <= dd <= 31 */
                unsigned char month;            /* 1 <= mm <= 12 */
                unsigned int  year;             /* 1980 <= yr <= 2xxx */
} time_type;

char *str_time(void);
```

Apr 04 1991 10:48:03 sensor.h Page 1

```
/* Robart position data structure */
extern struct {
        int     x;
        int     y;
        int     dir;
        int headDir;
} robart;
```

```
/*
 *  Header file for NOSC serial port subroutine library
 *
 *     Defines structures and fields for use in setting baud rates,
 *     flow control, etc., also provides function prototypes
 *     for the serial port subroutines
 */

#define TIOCGETP        0               /* Get Parameters */
#define TIOCSETP        1               /* Set Parameters */
#define TIOCSBRK        2               /* Set Break Condition */
#define TIOCCBRK        3               /* Clear Break Condition */
#define TIOCSDTR        4               /* Set DTR */
#define TIOCCDTR        5               /* Clear DTR */
#define TIOCGBUF        6               /* Get the address of device buffer */
#define TIOCSBUF        7               /* Set the address of device buffer */
#define TIOCGETC        8               /* Get the flow control characters */
#define TIOCSETC        9               /* Set the flow control characters */
#define TIOCSOUT        10              /* Set the Timeout interval */
#define TIOCINIT        11              /* Initialize the serial port */
#define FIONREAD        12              /* Return number of bytes in buffer */
#define TIOCFLUSH       13              /* Flush the input and output queues */
#define TIOCSPAK        14              /* Set PACKET mode */
#define TIOCCPAK        15              /* Reset PACKET mode */
#define TIOCSRAW        17              /* Set to BINARY mode */
#define TIOCCRAW        18              /* Set to TEXT mode */

/*
 *  The following structure is returned (or set) by the TIOCGETP
 *     (and TIOCSETP).
 */

        struct sgtty
        {
            char        sg_speed;       /* Baud rate */
            char        sg_flags;       /* Port parameters */
        };

/*
 *  Baud rate definitions - sg_speed
 */
#define B50     0                       /*    50 baud */
#define B75     1                       /*    75 baud */
#define B110    2                       /*   110 baud */
#define B134    3                       /*   134 baud */
#define B150    4                       /*   150 baud */
#define B300    5                       /*   300 baud */
#define B600    6                       /*   600 baud */
#define B1200   7                       /*  1200 baud */
#define B1800   8                       /*  1800 baud */
#define B2000   9                       /*  2000 baud */
#define B2400   10                      /*  2400 baud */
#define B3600   11                      /*  3600 baud */
#define B4800   12                      /*  4800 baud */
#define B7200   13                      /*  7200 baud */
#define B9600   14                      /*  9600 baud */
#define B19200  15                      /* 19200 baud */
#define B38400  16                      /* 38400 baud */

/*
 *  Flag definitions - sg_flags
 */
#define WSIZE   0x03                    /* Word size field */
#define CS5     0x00                    /* 5 bit word */
#define CS6     0x01                    /* 6 bit word */
#define CS7     0x02                    /* 7 bit word */
#define CS8     0x03                    /* 8 bit word */

#define STOPB   0x04                    /* Stop Bits field */
#define STOP1   0x00                    /* One Stop Bit */
#define STOP2   0x04                    /* Two Stop Bits */

#define PARITY  0x30                    /* Parity enable field */
```

```
#define NOP     0x00                    /* Parity Disabled */
#define ODDP    0x10                    /* Odd parity generated/checked */
#define EVENP   0x30                    /* Even parity generated/checked */

#define FLOW    0xc0                    /* Flow control field */
#define NOFLOW  0x00                    /* Flow control disabled */
#define FXON    0x40                    /* XON/XOFF flow selected */
#define FEIA    0x80                    /* EIA flow selected */

/*
 *  Buffer structure for serial driver.  This is used by the
 *  user programs to set up a larger (or smaller) buffer.  Note
 *  that the two buffers MUST be in the same segment as this
 *  structure.
 */
        struct buffer
        {
            int         size;           /* size of buffers */
            int         hitide;         /* place to disable input */
            int         lotide;         /* place to re-enable input */
            int         inchars;        /* number of characters in buffer */
            int         inhead;         /* input buffer head index ->buffer */
            int         intail;         /* input buffer tail index buffer-> */
            int         outfull;        /* output buffer full flag */
            int         outhead;        /* output buffer head index ->buffer */
            int         outtail;        /* output buffer tail index buffer-> */
            char        *inbuff;        /* input buffer (offset only) */
            char        *outbuff;       /* output buffer (offset only) */
        };

/*
 *  structure returned (or set) with TIOCGETC (TIOCSETC)
 */
        struct tchars
        {
            char        t_stopc;        /* stop output (XOFF) */
            char        t_startc;       /* start output (XON) */
            char        t_eop;          /* end of packet */
        };
/*
```

Apr 04 1991 10:48:03 serial.h Page 3

```
 *    function prototypes
 */

extern int sp_open(char *device_name_strin);
extern int sp_close(int pix);
extern int sp_read(int pix,char *buffer,int count);
extern int sp_write(int pix,char *buffer,int count);
extern int sp_ioctl(int pix,int fcn, ...);
```

Apr 04 1991 10:48:03 syscall.h Page 1

```
/*
 *   Define MS-DOS system calls for c programs
 *   Pete Ridley
 *   05/13/44
 */


#define CRY_MSK 1                  /* mask for carry flag */
                                   /* set => MS-DOS call failed */
#define ZERO_MSK 0x40              /* zero bit set */

/*
 *   define system function call numbers
 */
#define SC_CONI   0x0100           /* Consol input */
#define SC_CONO   0x0200           /* Consol output */
#define SC_AUXI   0x0300           /* Auxiliary input */
#define SC_AUXO   0x0400           /* Auxiliary output */
#define SC_PRNO   0x0500           /* Printer output */
#define SC_DCIO   0x0600           /* Direct consol I/O */
#define SC_DCINE  0x0700           /* Direct consol input with no echo */
#define SC_CINE   0x0800           /* Consol input with no echo */
#define SC_PSTR   0x0900           /* Print string */
#define SC_INLN   0x0a00           /* Buffered keyboard input */
#define SC_CKIS   0x0b00           /* Check standard input status */
#define SC_CIB    0x0c00           /* Clear standard input buffer */
#define SC_DKRST  0x0d00           /* Disk reset */
#define SC_SELDK  0x0e00           /* Select disk */
#define SC_OOPN   0x0f00           /* Old form open file */

#define SC_OCLS   0x1000           /* Old form close file */
#define SC_OSFF   0x1100           /* Old form search for first entry */
#define SC_OSFN   0x1200           /* Old form search for next entry */
#define SC_ODEL   0x1300           /* Old form delete file */
#define SC_OSRD   0x1400           /* Old form sequential read */
#define SC_OSWT   0x1500           /* Old form sequential write */
#define SC_OCRT   0x1600           /* Old form create file */
#define SC_OREN   0x1700           /* Old form rename file */
#define SC_RDDD   0x1900           /* Read default drive */
#define SC_STDTA  0x1a00           /* Set disk transfer area */
#define SC_RDAT   0x1b00           /* Read allocation information */
#define SC_RDATD  0x1c00           /* Read allocation information for drive */

#define SC_ORRD   0x2100           /* Old form random read */
#define SC_ORWT   0x2200           /* Old form random write */
#define SC_RDFSZ  0x2300           /* Read file size */
#define SC_OSTRR  0x2400           /* Old form set random record field */
#define SC_STIV   0x2500           /* Set interupt vector */
#define SC_CNPS   0x2600           /* Create new program segment */
#define SC_ORBRD  0x2700           /* Old form random block read */
#define SC_ORBWT  0x2800           /* Old form random block write */
#define SC_OPFN   0x2900           /* Old form parce file name */
#define SC_RDDATE 0x2a00           /* Read date */
#define SC_STDATE 0x2b00           /* Set date */
#define SC_RDTIME 0x2c00           /* Read time */
#define SC_STTIME 0x2d00           /* Set time */
#define SC_WTVS   0x2e00           /* Set/Clear verify switch */
#define SC_RDDTA  0x2f00           /* Read data transfer area address */

#define SC_RDVRSN 0x3000           /* Read DOS vesion number */
#define SC_TPNK   0x3100H          /* Terminate process and keep it resident */
#define SC_CBCK   0x3300           /* Control break check */
#define SC_RDIV   0x3500           /* Read interrupt vector */
#define SC_RDDFS  0x3600           /* Read disk free space */
#define SC_RDCDI  0x3800           /* Read country dependent information */
#define SC_MKDIR  0x3900           /* Create subdirectory */
#define SC_RMDIR  0x3a00           /* Delete subdirectory */
#define SC_CHDIR  0x3b00           /* Change directory */
#define SC_CRTFL  0x3c00           /* Create file */
#define SC_OPNFL  0x3d00           /* Open file */
#define SC_CLSFL  0x3e00           /* Close file */
#define SC_RDFL   0x3f00           /* Read from file */
```

Apr 04 1991 10:48:03 syscall.h Page 2

```
#define SC_WTFL   0x4000           /* Writer to file */
#define SC_DELFL  0x4100           /* Delete file */
#define SC_SEEK   0x4200           /* Seek within file */
#define SC_CHMOD  0x4300           /* Change file access modes */
#define SC_IOCTL  0x4400           /* I/O control */
#define SC_DUPFH  0x4500           /* Duplicate file handle */
#define SC_FDUPFH 0x4600           /* Force duplicate file handle */
#define SC_RDDIR  0x4700           /* Read current directory path name */
#define SC_ALOCM  0x4800           /* Allocate memory */
#define SC_FREEM  0x4900           /* Free memory */
#define SC_MODMB  0x4a00           /* Modify allocated memory blocks */
#define SC_EXEC   0x4b00           /* Load or execute program */
#define SC_TRPOC  0x4c00           /* Terminate process */
#define SC_GETRC  0x4d00           /* Retrieve return code of subprocess */
#define SC_FINDF  0x4e00           /* Find first matching file name */
#define SC_FINDN  0x4f00           /* Find next matching file name */

#define SC_RDVFS  0x5400           /* Read verify switch */
#define SC_RENFL  0x5600           /* Rename file */
#define SC_FDATE  0x5700           /* Read/Set file date */
/*
 *   end of include file
 */
```

Apr 04 1991 10:48:03 vox1.h Page 1

```
"0", "one", "two", "three", "four", "five", "six", "seven", "eight", "nine",
"ten", "eleven", "twelve", "thirteen", "fourteen", "fifteen", "sixteen",
"seventeen", "eighteen", "nineteen",
"twenty", "thirty", "forty", "fifty", "sixty", "seventy", "eighty", "ninety",
"hundred", "thousand", "million", "zero",
"a", "b", "c", "d", "e", "f", "g", "h", "i", "j", "k", "l", "m", "n", "o",
"p", "q", "r", "s", "t", "u", "v", "w", "x", "y", "z",
"again", "ampere", "and", "at", "cancel", "case", "cent",
"t400", "t80",
"ms20", "ms40", ",", ".", "ms320",
"centi", "check", "comma", "control", "danger", "degree", "dollar", "down",
"equal", "error", "feet", "flow", "fuel", "gallon", "go", "gram", "great",
"greater", "have", "high", "higher", "hour", "in", "inches", "is", "it",
"kilo", "left", "less", "lesser", "limit", "low", "lower", "mark", "meter",
"mile", "milli", "minus", "minute", "near", "number", "of", "off", "on",
"out", "over", "parenthesis", "percent", "please", "plus", "point",
"pound", "pulses", "rate", "re", "ready", "right", "ss", "second", "set",
"space", "speed", "star", "start", "stop", "than", "the", "time", "try",
"up", "volt", "weight",
```

Apr 04 1991 10:48:03 vox2.h Page 1

```
"abort",
"add",
"adjust",
"alarm",
"alert",
"all",
"ask",
"assistance",
"attention",
"brake",
"button",
"buy",
"call",
"caution",
"change",
"circuit",
"clear",
"close",
"complete",
"connect",
"continue",
"copy",
"correct",
"date",
"day",
"decrease",
"deposit",
"dial",
"divide",
"door",
"east",
"ed",
"ed1",
"ed2",
"ed3",
"emergency",
"end",
"enter",
"entry",
"er",
"evacuate",
"exit",
"fail",
"failure",
"farad",
"fast",
"faster",
"fifth",
"fire",
"first",
"floor",
"forward",
"from",
"gas",
"get",
"going",
"half",
"hello",
"help",
"hertz",
"hold",
"incorrect",
"increase",
"intruder",
"just",
"key",
"level",
"load",
"lock",
"meg",
"mega",
"micro",
"more",
```

Apr 04 1991 10:48:03 vox2.h Page 2

```
"move",
"nano",
"need",
"next",
"no",
"normal",
"north",
"not",
"notice",
"ohms",
"onward",
"open",
"operator",
"or",
"pass",
"per",
"pico",
"place",
"press",
"pressure",
"quarter",
"range",
"reach",
"receive",
"record",
"replace",
"reverse",
"room",
"safe",
"secure",
"select",
"send",
"service",
"side",
"slow",
"slower",
"smoke",
"south",
"station",
"switch",
"system",
"test",
"th",
"thank",
"third",
"this",
"total",
"turn",
"use",
"eth",
"waiting",
"warning",
"water",
"west",
"which",
"window",
"yes",
"zone",
```

Apr 04 1991 10:48:03 vox3.h Page 1

```
"",
"ing",
"a",
"activate",
"active",
"am",
"an",
"available",
"average",
"barometric",
"battery",
"before",
"between",
"black",
"building",
"busy",
"celsius",
"channel",
"code",
"cold",
"command",
"common",
"communication",
"condition",
"configuration",
"converter",
"count",
"data",
"dc",
"default",
"demonstration",
"did",
"disable",
"enable",
"examine",
"extreme",
"far",
"fire",
"here",
"if",
"inactive",
"insert",
"interface",
"invalid",
"keypad",
"link",
"module",
"monitor",
"move",
"my",
"night",
"oclock",
"optical",
"pm",
"power",
"program",
"push",
"put",
"receiver",
"red",
"remove",
"repair",
"repeat",
"restore",
"return",
"route",
"running",
"security",
"sensor",
"sequence",
"short",
"sight",
"stair",
```

Apr 04 1991 10:48:03 vox3.h Page 2

```
"stair",
"status",
"storm",
"supervisory",
"target",
"temperature",
"terminate",
"thankyou",
"thee",
"there",
"today",
"tone",
"tone800",
"tone5000",
"touch",
"tracking",
"trunk",
"unable",
"unattended",
"unknown",
"use",
"voltage",
"wait",
"wakeup",
"week",
"welcome",
"what",
"working",
"your",
"able",
"acknowledge",
"away",
"back",
"hit",
"light",
"listen",
```

Apr 04 1991 10:48:03 vox4.h Page 1

```
ALL.CKT DISABLD
ASSIST ACTVATD
CPU.UP EMR.ACT
EX.TIME GREET
FIV.SEC OK
IT.IS REC.OK
LD.TIME TST.STP
LOCK UN.TST
MARK SEC.REC
NOT.NOR RED.UNA
SET.TIM REM.COM
SYS.CHK NOT.ACK
SHT.DWN ACK
T.MINUS PRS.BUT
TEST.PT THS.TIM
TH.TIME FAILURE
VOX.ON BEEP2
VOX.OFF BONG3
WAITING CODE
SUPER WAT.COM
IF.CKT REP.COM
CONN YES.NO
SWITCH MOD.NUM
CKT.BRK ENT.NUM
UNABLE
BAROM
RM.TMP
SYS.TMP
RS232
BAT.LOW
REL.HUM
DOOR
BAT.VOL
OPT.TRK
DEM.PRO
HIT.RET
UN.MOV
POW.DIS
```

```
/*********************************************************************\
*                           ASSESS.H                                  *
***********************************************************************
*                                                                     *
* Description:  Intrusion Detection System threat assessment variables and *
*               functions.  Contains constant function parameter declarations*
*               (#defines) as well as function stubs for the assess.c file. *
*                                                                     *
* Edit History: 02/26/91 - Written by Richard P. Smurlo.              *
*                                                                     *
\*********************************************************************/

#define ERR_COMPOSITE_TOO_HIGH  1001

#define AOK                 1
#define ACTIVE              1
#define NOT_ACTIVE          0

#define NUM_SNRS            24
#define NUM_PIRS            48
#define NUM_ACUS             3
#define NUM_MWVS             4
#define NUM_VIDS             1
#define NUM_SENSORS         (NUM_SNRS+\
                             NUM_PIRS+\
                             NUM_ACUS+\
                             NUM_MWVS+\
                             NUM_VIDS)

#define NUM_ZONES           24
#define NUM_TYPES           5       /* number of different types of sensors.  */
#define MAX_COMPOSITE       100
#define AVW                 12      /* Least common multiple of zone divisors */
#define SNW                 AVW
#define PIW                 2*AVW
#define ACW                 AVW
#define MWW                 AVW
#define VIW                 AVW

/* Define coverage area of each type of sensor.  Coverage area is the area  */
/* that a given sensor can detect motion.                                   */
/* NOT CURRENTLY USED ANYWHERE!!                                            */
#define FOV_SNRS            30
#define FOV_PIRS            7
#define FOV_ACUS            360
#define FOV_MWVS            90
#define FOV_VIDS            30


#define ABS(x)              (((x) < 0) ? -(x) : (x))
/* The following #defines convert the bearing in (x) to the sensor number   */
/* that corresponds to that bearing.  This assumes that sensor number 0     */
/* is at zero degrees for all sensor groups.                                */
#define B2NUM(x,n)          ( (((360*(n))-((x)%360)*(n)+180 ) / 360 ) % (n) )
#define Z2B(z)              ( (z)<NUM_ZONES/2 ? -((z)*15) : ((NUM_ZONES-(z))*15) )

typedef struct hb_node  *hb_nodeptr;
typedef struct hra_node *hra_nodeptr;
typedef struct ha_node  *ha_nodeptr;

typedef struct gr_info  *gr_infoptr;
typedef struct ra_info  *ra_infoptr;
typedef struct a_info   *a_infoptr;

typedef struct hist_bearing      *hist_bearingptr;
typedef struct hist_ract         *hist_ractptr;
typedef struct hist_act          *hist_actptr;

typedef unsigned char   boolean;
typedef unsigned char   range_type;
typedef int             weight_type;
typedef int             bear_type;
typedef int             active_type;
```

```

/* Dynamic node info field structures.                                     */

struct hist_bearing {
    t_type      otime;
    bear_type   obearing;
};

struct hist_ract {
    t_type      otime;
    range_type  orange;
    active_type oactive;
};

struct hist_act {
    t_type      otime;
    active_type oactive;
};

/* Dynamic node structures.                                               */

struct hb_node {
    struct hist_bearing  info;
    hb_nodeptr           prev;
    hb_nodeptr           next;
};

struct hra_node {
    struct hist_ract     info;
    hra_nodeptr          prev;
    hra_nodeptr          next;
};

struct ha_node {
    struct hist_act      info;
    ha_nodeptr           prev;
    ha_nodeptr           next;
};

/*
*/

struct gr_info {
    weight_type  zw[NUM_ZONES];
    int          num_active;
    hb_nodeptr   bearinghead;
    hb_nodeptr   bearingtail;
};

struct ra_info {
    t_type       ctime;
    weight_type  cweight;
    active_type  cactive;
    range_type   crange;
    hra_nodeptr  histhead;
    hra_nodeptr  histtail;
};

struct a_info {
    t_type       ctime;
    weight_type  cweight;
    active_type  cactive;
    ha_nodeptr   histhead;
    ha_nodeptr   histtail;
};

/* For lack of a better term, the statics defined below are what make  */
/* up the "blackboard".  The blackboard is simply the current state of */
/* all of the sensors located on the robot, and a linked list of       */
/* past sensor values (the amount of history information saved is one */
/* of the parameters passed to the functions that update the blackboard.*/
/* These functions are included in the bb_edit file.                   */

```

Apr 16 1991 10:07:22 assess.h Page 3

```
extern int              zw[NUM_ZONES];

extern struct gr_info   snr_gi;
extern struct ra_info   snr_sensor[NUM_SNRS];

extern struct gr_info   pir_gi;
extern struct a_info    pir_sensor[NUM_PIRS];

extern struct gr_info   acu_gi;
extern struct a_info    acu_sensor[NUM_ACUS];

extern struct gr_info   mwv_gi;
extern struct a_info    mwv_sensor[NUM_MWVS];

extern struct gr_info   vid_gi;
extern struct a_info    vid_sensor[NUM_VIDS];

/* end of blackboard definitions */

struct initweights_type {
    int snr[NUM_SNRS];
    int pir[NUM_PIRS];
    int acu[NUM_ACUS];
    int mwv[NUM_MWVS];
    int vid[NUM_VIDS];
};

extern struct initweights_type init_weights;

#if defined(__STDC__) || defined(__cplusplus)
# define _P(s) s
#else
# define _P(s) ()
#endif

int ids_assess_threat _P((t_type curr_time));
void ids_init_bb _P((void));
void ids_update_bearing _P((gr_infoptr L, t_type ntime, bear_type nbearing));
void ids_update_range_sen _P((ra_infoptr L, t_type ntime, range_type nrange, ac
tive_type nactive));
void ids_update_onoff_sen _P((a_infoptr L, t_type ntime, active_type nactive));
void ids_del_hist_info _P((t_type t));
```

Apr 16 1991 10:07:22 bb_edit.h Page 1

```
/***************************************************************************\
*                               BB_EDIT.H                                   *
*****************************************************************************
*                                                                           *
* Description:  Blackboard Editing variables and functions.                 *
*               Contains constant function parameter declarations (#defines) *
*               as well as function stubs for the bb_edit.c file.           *
*                                                                           *
* Edit History: 02/26/91 - Written by Richard P. Smurlo.                    *
*                                                                           *
\***************************************************************************/

#define BEAR_INVALID    0x7fff

#if defined(__STDC__) || defined(__cplusplus)
# define _P(s) s
#else
# define _P(s) ()
#endif

void init_snr_info _P((void));
void init_pir_info _P((void));
void init_acu_info _P((void));
void init_mwv_info _P((void));
void init_vid_info _P((void));
void reset_bb_weights _P((void));
void reset_group_vals _P((void));
t_type t_rasen_was_act _P((ra_infoptr s, t_type t, t_type tw));
t_type t_asen_was_act _P((a_infoptr s, t_type t, t_type tw));
void print_gr_info _P((gr_infoptr L));
void print_ra_info _P((ra_infoptr L));
void print_a_info _P((a_infoptr L));
```

Apr 16 1991 10:07:22 support.h Page 1

```
/***********************************************************************\
*                              SUPPORT.H                                *
*************************************************************************
*                                                                       *
* Description:  Security Assessment System variables and functions for  *
*               "support" functions.  Contains constant function parameter *
*               declarations (#defines) as well as function stubs for the *
*               support.c file.                                         *
*                                                                       *
* Edit History: 02/26/91 - Written by Richard P. Smurlo.                *
*                                                                       *
\***********************************************************************/

/* The following constants allow one to "tweek" the amount weights are inc-*/
/* remented or decremented for various patterened motions.                 */

/* Angular Sensor Fusion parameters: */
#define ASF_INCW          5         /* Amount by which to increase weights    */
                                    /* if different groups of sensors detect  */
                                    /* motion at the same time and angle.     */
#define ASF_INC_TYPE     '+'        /* Add or Multiply?                       */
#define ASF_TIME_WINDOW MSECS(112L)  /* Amount of time that a sensor could */
                                    /* have. (112ms = 2 time ticks)           */
                                    /* last been updated and still be con-    */
                                    /* sidered current.                       */
#define ASF_CLOSE_ANGLE 15          /* If bearings of two sensors of different */
                                    /* groups are within this angle, inc. wghts*/

/* Random Noise parameters: */
#define RN_SETW           0         /* Set weights to this number for a sensor */
                                    /* group if readings are thought to be    */
                                    /* random noise.                          */

/* Purposeful Motion parameters: */
#define PM_INCW_K0       2*AVW      /* Amount by which to increase weights    */
                                    /* if two adjacent sensors are both on.   */
#define PM_AINC_TYPE     '+'        /* Add or Multiply if two adjacent sensors */
                                    /* both active?                           */

#define PM_INCW_K1        3         /* Amount by which to increase weights    */
                                    /* if purposeful motion is detected with  */
                                    /* two sensors.                           */
#define PM_INCW_K2        5         /* Amount by which to increase weights    */
                                    /* if purposeful motion is detected with  */
                                    /* three sensors (already incremented for */
                                    /* two sensors).                          */
#define PM_MINC_TYPE     '*'        /* Add or Multiply for purposeful motion? */

#define PM_TIME_WINDOW  SECS(5L)

/* Group Zone Weight parameters: */
#define GZW_ACU_K1       15         /* Used in calculating the acoustic and   */
#define GZW_ACU_K2        7         /* video zone weights based on bearing info*/
#define GZW_VID_K1       15
#define GZW_VID_K2        7

/* Microwave Parameters:            /* Microwave zone calculation parameters. */
#define MWV_KF            9         /* Front Constant.                        */
#define MWV_KS            5         /* Side Constants.                        */
#define MWV_KB            2         /* Back Constant.                         */
                                    /* e.g. mwv_gi.zw[0] = sensor[0]active*KF+ */
                                    /*                     sensor[1]active*KS+ */
                                    /*                     sensor[3]active*KS+ */
                                    /*                     sensor[2]active*KB. */
/* End tweak parameters. */

#if defined(__STDC__) || defined(__cplusplus)
# define _P(s) s
#else
# define _P(s) ()
#endif

int calc_threat _P((void));
```

Apr 16 1991 10:07:22 support.h Page 2

```
void calc_group_zone_weights _P((void));
void calc_snr_zone_weights _P((void));
void calc_pir_zone_weights _P((void));
void calc_acu_zone_weights _P((void));
void calc_mwv_zone_weights _P((void));
void calc_vid_zone_weights _P((void));
void print_zone_weights _P((void));
void print_zones _P((weight_type *wtarray));
void adjw_random_noise _P((void));
void adjw_angular_sens_fusion _P((void));
void set_inter_weights _P((weight_type izw[][NUM_ZONES ]));
void adjw_purposeful_motion _P((t_type ct, boolean noise));
void adjw_ra_motion _P((ra_infoptr sensor, int num_sensors, t_type ct, boolean
noise));
void adjw_a_motion _P((a_infoptr sensor, int num_sensors, t_type ct, boolean no
ise));
void increase_weight _P((weight_type *wtptr, int amt, int c));
void decrease_weight _P((weight_type *wtptr, int amt, int c));
```

Apr 16 1991 10:07:22 sysdefs.h Page 1

```
/*************************************************************************\
*                              SYSDEFS.H                                  *
***************************************************************************
*                                                                         *
* CPCI:         IED90-MRA-COM-HDR-SYSDEFS-H-R0C0                          *
*                                                                         *
* Description:  Global system definitions/declarations.                   *
*               Defines absolute and common values used by all modules.   *
*                                                                         *
* Notes:        1) All modules should include this file.                  *
*               2) XDATA modifier not required for Microsoft C (MSC).     *
*                                                                         *
* Edit History: 07/07/90 - Written by Robin T. Laird.                     *
*                                                                         *
\*************************************************************************/

#ifndef SYS_MODULE_CODE
#define SYS_MODULE_CODE          0

#define AOK                      1

#define TRUE                     1
#define FALSE                    0

#define YES                      1
#define NO                       0

#ifndef NULL
#define NULL                     ((void *)0L)
#endif

#ifdef SIO
#define SYS_MAX_PACKET_SIZE      256

#ifdef MSDOS
#define XDATA
#else
#define XDATA                    xdata
#endif
#endif
typedef unsigned char byte;
typedef unsigned int word;

#endif
```

Apr 16 1991 10:07:22 timestmp.h Page 1

```
/************************************************************************\
*                              TIMESTMP.H                                *
**************************************************************************
*                                                                        *
* Description:  Timer variables and definitions that are needed for use *
*               by other functions that use the timer located at 0x46c to *
*               calculate the time of day.                               *
*                                                                        *
* Edit History: 03/12/91 - Written by Richard P. Smurlo.                 *
*                                                                        *
\************************************************************************/

#define TIME_INVALID    0xFFFFFFFF
#define TIMER_LONG_MAX  0x1800B0L       /* 24 hours. */

/* 24 hours = 1573040   */
/* x hours  = 65543*x   */
/* x mins.  = 1092*x    */
/* x secs.  = 18*x      */
/* MINS(5L) = 5461      */
/* SECS(3L) = 54        */
#define HRS_24          TIMER_LONG_MAX
#define HRS(x)          (HRS_24*(x)/24L)
#define MINS(x)         (HRS(1L)*(x)/60L)
#define SECS(x)         (MINS(1L)*(x)/60L)
#define MSECS(x)        (SECS(1L)*(x)/1000L) /* 56ms is best resolution     */
                                             /* possible.                   */

#define DECR_TIME(t,x)  ( ((t) + TIMER_LONG_MAX - (x)) % TIMER_LONG_MAX )
                /* decrements t by amount x.  */
#define INCR_TIME(t,x)  ( ((t) + (x)) % TIMER_LONG_MAX )
                /* increments t by amount x.  */

typedef unsigned long   t_type;
typedef unsigned char   boolean;

#if defined(__STDC__) || defined(__cplusplus)
# define _P(s) s
#else
# define _P(s) ()
#endif

boolean t1_b_t2_a_t3 _P((t_type t1, t_type t2, t_type t3));
```

Apr 16 1991 10:08:19 asynch.h Page 1

```
/* Header file for the asynchronous communcations package */

#define IN_Q_EMPTY      2

#ifndef CR
#define CR     13
#define LF     10
#endif

/* Blaise error constants. */
#ifndef OK
#define OK     0
#endif

#ifndef GOOD
#define GOOD            1
#endif
```

Apr 16 1991 10:08:19 baudrate.h Page 1

```
/*
 *   define baud rate divide factors for interrupt serial port driver
 *   Pete Ridley
 *   06/02/86
 */

#define BR_300          384
#define BR_1200         96
#define BR_2400         48
#define BR_4800         24
#define BR_9600         12
#define BR_19200        6
#define BR_38400        3

/*
 *   end include
 */
```

Apr 16 1991 10:08:19 displist.h Page 1

```
/*
 * Header file for the display list handler
 *
 */


#define DL_BLINK        0x0001          /* blink attribute */

typedef struct DL_ITEM_STRUCT {
        void    *dlitemptr;             /* pointer to the item being displayed
*/
        void    *dlolditem;             /* copy of the old item */
        int     itemlength;             /* length of item in bytes */
        int     dlattributes;           /* attributes, e.g. blinking */
        int     (*dlinit)(),            /* user-supplied initilization routine
*/
                (*dldeinit)();          /* user-supplied removal routine */
        void    *(*dlcopy)();           /* user-supplied duplication routine */
        int     (*dlfreecopy)(),        /* u-s duplication deleter */
                (*dlupdate)(),          /* user-supplied update routine */
                (*dlcompare)();         /* user-supplied comparison */
        struct DL_ITEM_STRUCT *next;    /* pointer to next item */
} DL_ITEM;


typedef struct DL_LIST {
        unsigned long   dlmagic;
        unsigned long   blinktime;
        int             blinkstate;
        DL_ITEM         *first;
} DISPLAY_LIST;

DISPLAY_LIST *create_dl();
DL_ITEM *add_dl_item(DISPLAY_LIST *dl, void *itemptr, int len, int attribute,
                int (*init)(), int (*deinit)(),
                void *(*copy)(), int (*freecopy)(),
                int (*update)(), int (*compare)());
int  delete_dl_item(DISPLAY_LIST *dl, DL_ITEM *dlitem);
int  update_dl(DISPLAY_LIST *dl);
int  redraw_dl(DISPLAY_LIST *dl);
int  destroy_dl(DISPLAY_LIST *dl);
```

Apr 16 1991 10:08:19 funckeys.h Page 1

```
/*********************************************************************
 *                              funckeys.h                           *
 *********************************************************************
 *                                                                   *
 * This file defines the return codes for the function keys on the   *
 * IBM keyboard.  F1 is the return code for the F1 key when no other *
 * keys are held down.  AF1 is returned when the Alt key is held down,*
 * CF1 when the Ctrl key is held down, and SF1 when the shift key    *
 * is held down.  Note that some of the keys on the numeric keypad   *
 * do not return codes in all modes.                                 *
 *                                                                   *
 *********************************************************************/



/* Normal function keys */
#define F1              0x3b00
#define F2              0x3c00
#define F3              0x3d00
#define F4              0x3e00
#define F5              0x3f00
#define F6              0x4000
#define F7              0x4100
#define F8              0x4200
#define F9              0x4300
#define F10             0x4400
#define HOME            0x4700
#define UPARROW         0x4800
#define PGUP            0x4900
#define LEFTARROW       0x4b00
#define RIGHTARROW      0x4d00
#define END             0x4f00
#define DOWNARROW       0x5000
#define PGDN            0x5100
#define INS             0x5200
#define DEL             0x5300


/* Control function keys */
#define CF1             0x5e00
#define CF2             0x5f00
#define CF3             0x6000
#define CF4             0x6100
#define CF5             0x6200
#define CF6             0x6300
#define CF7             0x6400
#define CF8             0x6500
#define CF9             0x6600
#define CF10            0x6700
#define CHOME           0x7700
#define CPGUP           0x8400
#define CLEFTARROW      0x7300
#define CRIGHTARROW     0x7400
#define CEND            0x7500
#define CPGDN           0x7600



/* Shift function keys */
#define SF1             0x5400
#define SF2             0x5500
#define SF3             0x5600
#define SF4             0x5700
#define SF5             0x5800
#define SF6             0x5900
#define SF7             0x5a00
#define SF8             0x5b00
#define SF9             0x5c00
#define SF10            0x5d00
#define SUPARROW        0x4838
#define SDOWNARROW      0x5032
#define SLEFTARROW      0x4b34
#define SRIGHTARROW     0x4d36
```

Apr 16 1991 10:08:19 funckeys.h Page 2

```
#define SEND            0x4f31
#define SHOME           0x4737
#define SPGUP           0x4939
#define SPGDN           0x5133

/* Alt function keys */
#define AF1             0x6800
#define AF2             0x6900
#define AF3             0x6a00
#define AF4             0x6b00
#define AF5             0x6c00
#define AF6             0x6d00
#define AF7             0x6e00
#define AF8             0x6f00
#define AF9             0x7000
#define AF10            0x7100


/* Num Lock keys */
#define NUM0            0x5230
#define NUM1            0x4f31
#define NUM2            0x5032
#define NUM3            0x5133
#define NUM4            0x4b34
#define NUM5            0x4c35
#define NUM6            0x4d36
#define NUM7            0x4737
#define NUM8            0x4838
#define NUM9            0x4939


/* Miscellaneous keys */
#define ALTP            0x1900
```

```
#define OK      0               /* return code indicating good status */

/* Type definitions */
#ifndef DOS
typedef unsigned char   byte;

#else
#ifdef M_I86
typedef unsigned char byte;
#endif
#endif

typedef unsigned int    word;

/* Standard boolean definitions */
#define TRUE            1
#define FALSE           0

#define NO               0
#define YES              1
#define EOS             '\0'
#define ERROR           -1
#define ABORT           -2
#define FIXED_SENSOR_HALT -3
#define DROPPED_PACKET  -4
#define ESC             0x1b

#ifndef CR
#define CR              13
#define LF              10
#define BS              8
#endif

/* Define which robots can be controlled */
#define ROBARTII        1       /* Robart II */
#define LABMATE         2       /* TRC LabMate */
#define K2A             3       /* Cybermotion K2A+ */


/* Types of packets, either a packet requiring a response from the robot, or
 * just a command to the robot.
 */
#define REQUEST         1
#define X_COMMAND       2

/* List the X commands */
#define X_SYSTEM        0               /* system power */
#define X_SIREN         1               /* siren power */
#define X_CAMERA        2               /* camera power */
#define X_INTRUSION     3               /* intrusion detection sensors */
#define X_SONAR         4               /* sonar power */
#define X_SPEECH        5               /* speech power */
#define X_OAARRAY       6               /* obstacle avoidance array */
#define X_SPDGOVERNING  7               /* enable/disable speed governing */

/* Possible log mode values */
#define CLOSED  0
#define OPEN            1
#define REPLAY  2

/* Used as magic numbers in intruder packet decoding */
#define NO_ANGLE        -1000
#define MULT_ANGLE      -32000

/* Constant arrays for optical and infrared sensor positions */
extern int irPos[];
extern int omPos[];

/* Defines the size in inches of a single grid unit in any given floor map */
#define GRID_UNIT_SIZE    6.0
#define HALF_GRID_SIZE    3.0
#define SONAR_RANGE_SCALE 1.6
#define MAX_SONAR_RANGE   0xF0
```

```

/* Define Position Estimation constants, for the upper ultrasonic ring */
#define PE_SONAR_NUM    24
#define PE_SON_SPACING  15      /* PE sonar transducer spacing in degrees */
#define PESON_OFFSET     725    /* radius of PE sonar ring, times 100 */

/* Define obstacle avoidance constants, for the lower sonar ring */
#define OBS_SONAR_NUM      9
#define OBS_SON_SPACING  18     /* transducer spacing in degrees */
#define OBS_SON_OFFSET  675     /* radius of OA sonar ring, times 100 */

/* define Obst. Avoidance constants, OA_MAX_DIST and OASON_OFFSET
 * are in inches.
 */
#define OBSTACLE        -3      /* obstacle is in the way */
#define OA_MAX_DIST     60
#define OASON_OFFSET    6.25
#define OA_SONAR_NUM    9

/* PE Sonar transformation array. The sonar returns are sent in a different
 * order from the order needed by the position estimator. This constant array
 * transforms the returns to their proper place.
 */
extern  int  pEMap[];

#define pEAccess(m,x,y,s)  (* ((byte *)((m)->pe_ptr+(((y)*((m)->width/(m)->squaresize)+(x))\
                                *PE_SONAR_NUM+(s)))))

/* Floor map access macro. This correctly addresses a floor map in dynamic
 * memory given an x,y coordinate and given a pointer to a floor map
 * structure.
 */
#define floor(x,y,m)    (*((byte *)((m)->mem_ptr+(x)+((m)->width*(y)))))
#define OAFloor(x,y,m)  (*((byte *)((m)->oa_ptr+(x)+((m)->width*(y)))))

/* Macros for sign and round off functionality */
#define isgn(x)     ((x)<0?-1:1)
#define fsgn(x)     ((x)<(0.0)?(-1.0):(1.0))
#define fround(x)  ((double)(x)-(int)(x)>0.5?(int)(x)+1:(int)(x))

#define Angle_To_Rads(angle)  (((double)((angle) % 360) * PI)/180.0)

unsigned int mgetkey();

/*
#include "headers/funckeys.h"
*/

#include "headers/linestuf.h"
#include "headers/packet.h"
#include "headers/linkdefs.h"
#include "headers/mapdefs.h"
#include "headers/rtclk.h"
#include "headers/mytypes.h"
#include "headers/displist.h"

#include "headers/protos.h"
```

Apr 16 1991 10:08:19 sensor.h Page 1

```
/* Robart position data structure */
extern struct {
        int     x;
        int     y;
        int     dir;
        int headDir;
} robart;
```

Apr 16 1991 10:13:07 recal.c Page 1

```c
/*********************************************************************
 *                               recal                               *
 *********************************************************************
 * This file contains all the routines that have to do with the      *
 * recalibration procedure.                                          *
 *                                                                   *
 * Description                                                       *
 * The idea behind the recalibration procedure is to get the robot into *
 * a known location in the room so that he can have an accurate idea *
 * of exactly where he is in the room and what his heading is.  To    *
 * achieve this end, we pick a certain location in the room surrounded *
 * by two or three "walls" that the robot can go into.  The robot will *
 * physically hit one of the walls (though very slowly).  Once he has *
 * struck the wall, he "centers" himself by looking at the bumpers.  If *
 * the left bumper is closed, he shuts off the right motor, and simil- *
 * arly for the right side.  He then backs up and does it again.  At  *
 * this point, he takes a sonar reading to the left and right.  This  *
 * information is returned to the Planner, then the robot backs up    *
 * one foot.                                                         *
 * This accomplishes three things: (1) his heading is now known      *
 * accurately, (2) his wheels are both pre-loaded in the same dir-   *
 * ection, and (3) one of his coordinates (either x or y) is now     *
 * known.                                                            *
 *                                                                   *
 * To do the recalibration, the robot plans a path to the point marked *
 * by CAL1 in the map.  The robot then executes a path to this point. *
 * A path to CAL2 is then planned.  A line drawn through CAL1 and CAL2 *
 * forms a line that is perpendicular to the wall we want to run into. *
 * It is assumed that no objects will occlude the path between CAL1 and *
 * CAL2.  Also, CAL2 should be exactly one foot from the wall, so the *
 * robot will be at the CAL2 position (at least on one of the co-    *
 * ordinate axes) when he is finished.  Once the robot has been pos- *
 * itioned at CAL2, the calibration packet is sent, which performs the *
 * actions outlined above.                                           *
 *                                                                   *
 *********************************************************************/

#include <stdio.h>
#include <fcntl.h>
#include <stdlib.h>
#include <math.h>
#include <ega.h>

#include "headers/ibmio.h"

#ifndef PI
#define PI    3.14159265358979323846
#endif

#ifdef NARGS
#undef NARGS
#endif


extern int       robot_type;
extern long      robotx, roboty, robothdg;
extern int       docked;
extern drType robart;
extern int map_direction;

/* Inflection point list and number of inflection points on the list. */
extern int       infl_count;
extern XY_PAIR   inflect_pts[200];

extern int       oa_override;

/* plan_recal - set up initial for doing the recalibration routine. */
int plan_recal(map_ptr)
map *map_ptr;
{
    char         str[80], coords[40];
    int          cc, px, py, stat;
```

Apr 16 1991 10:13:07 recal.c Page 2

```c
    mouse_off();
    DrawSFloorMap(map_ptr, WHITE, BLUE, GREEN);

    px = robart.x;
    py = robart.y;
    Clear_Line(1);
    Clear_Line(2);

    draw_robart(map_ptr, robart.x, robart.y);
    all_coords(coords, robart.x, robart.y, map_ptr);
    sprintf(str, "Heading: %3d, Coordinates: %s", robart.dir, coords);
    PutString(2,1, str);

    PutString(1,1, "Ready to recalibrate [Y]? ");
    cc = mgetkey();
    Clear_Line(1);
    Clear_Line(2);

    if (cc != '\r' && cc != 'Y' && cc != 'y') {
        mouse_on();
        return (ABORT);
    }

    stat = dorecalibrate(map_ptr);
    if (stat == ERROR) {
        Clear_Line(1);
        PutString(1,1, "Recalibration coordinates not in map -->");
        mgetkey();
    }
    mouse_on();
    return (OK);
}



/* dorecalibrate - plan a path to the recalibration points.
 */
int dorecalibrate(map_ptr)
map *map_ptr;
{
char str[80];
    map          fp_ptr;
    byte         val;
    int          curseg;
    int          blockage_count, range_error, ir_confirm_count;
    int          ix, iy;
    int          xs, ys, xd, yd, bool;
    int          rx, ry;
    int          cal1x, cal2x, cally, cal2y;
    int          found;
    int          heading;
    int          npoints;
    int          status;
    int          nsegs;
    word         left_dist, right_dist;
    double       xr;
    double       dx, dy, dist;
    double       fheading;
    packet       pack;
    PATHSEG      *path;

    /* First, find the two calibration points */
    found = 0;
    cal1x = cally = cal2x = cal2y = -1;
    for (ry = 0; found < 2 && ry < map_ptr->height; ry++) {
        for (rx = 0; found < 2 && rx < map_ptr->width; rx++) {
            val = floor(rx, ry, map_ptr);
            if (val == CAL1) {
                cal1x = rx, cally = ry;
                found++;
            }
            else if (val == CAL2) {
                cal2x = rx, cal2y = ry;
```

```
                        found++;
                    }
                }
            }

            if (found != 2)
                return (ERROR);

            Clear_Line(1);
            PutString(1,1, "Growing floor map...");

            /* Grow the map 3 times to allow a buffer zone around any objects */
            inc_map(map_ptr, 1);
            grow_oa_map(map_ptr);
            inc_map(map_ptr, 1);
            grow_oa_map(map_ptr);
            inc_map(map_ptr, 1);
            grow_oa_map(map_ptr);

            fp_ptr.mem_ptr = NULL;
            if (Copy_Floor_Map(map_ptr, &fp_ptr, -1) == ERROR) {
                inc_map(map_ptr, -3);
                PutString(1,1, "No memory -->"); mgetkey();
                return (ERROR);
            }

            xs = robart.x;
            ys = robart.y;
            floor(xs, ys, &fp_ptr) = START;
            floor(callx, cally, &fp_ptr) = DEST;

            Clear_Line(1);
            Clear_Line(2);
            robart.dir = force360(robart.dir);

            DrawSFloorMap(&fp_ptr, WHITE, BLUE, GREEN);

            dx = robart.x - callx;
            dy = robart.y - cally;
            dist = sqrt(dx*dx + dy*dy);
            /* If the robot is more than 1 square away from the recalibration point,
             * plan a path to the first point, then move to the second point.
             */
            if (dist > 1.0) {
                    /* Search for a path */
                    Clear_Line(1);
                    PutString(1,1,"Searching for CAL1 position. ");
                    bool = Expand_Slime(&fp_ptr, xs, ys, &xd, &yd, TRUE);
                    if (!bool) {            /* no path found, giveup */
                        free(fp_ptr.mem_ptr);           /* get rid of map copy now */
                        inc_map(map_ptr, -3);           /* get rid of temporary growth
 */
                        Clear_Line(1);
                        PutString(1,1,"No path to CAL1 position -->");
                        mgetkey();
                        /*lint -e506 */
                        return (!OK);
                        /*lint +e506 */
                    }
                    /* If a path was found then draw the floor plan and path */
                    status = Find_Path(&fp_ptr, inflect_pts, &infl_count, xs, ys, xd, y
d);

                    free(fp_ptr.mem_ptr);               /* get rid of map copy now */
                    if (status != OK) {
                        inc_map(map_ptr, -3);
                        PutString(1,1, "Can't backtrack -->");
                        /*lint -e506 */
                        return (!OK);
                        /*lint +e506 */
                    }

                    npoints = infl_count+1;
```

```
                    Cut_Path_Corners(map_ptr, inflect_pts, &npoints);
                    minimize_turns(map_ptr, inflect_pts, &npoints);
                    inc_map(map_ptr, -3);               /* get rid of temporary growth
 */

                    DrawSFloorMap(map_ptr, WHITE, BLUE, GREEN);

                    Draw_Inflection_List_Path(map_ptr, inflect_pts, npoints, LBLUE);
                    oa_override = 0;
                    path = segment_path(map_ptr, inflect_pts, npoints, &nsegs);
                    if (path == (PATHSEG *) NULL) {
                        gstatus("Couldn't segment path -->"); mgetkey();
                    }
                    else {
                        status = execute_path(map_ptr, path, nsegs, &curseg);
                        if (status == ERROR) {
                            status = avoid(map_ptr, 0, path, nsegs, nsegs-1);
                        }
                        free(path);
                    }
                    /* Decrease weight of all OA sonar returns by 1 to get rid of noise
 */
                /*  inc_map(map_ptr, -1); */
                    if (status != OK)                   /* if unable to get to CAL1 */
                        return (ERROR);                 /* tell caller we couldn't get there */
            }

            /* Robot is now at the CAL1 position, so just turn to point at the CAL2
             * position.  Don't actually go there, just face that direction.  That
             * will point the robot at the calibration wall.
             */
            fheading = atan2((double) cal2y - robart.y, (double) cal2x - robart.x) * 18
0.0/PI;
            if (fheading < 0.0)
                heading = (int) (fheading - 0.5);
            else
                heading = (int) (fheading + 0.5);
            heading = force360((int) 90 - ((int) heading + map_direction));
            sprintf(str, "%d", heading);
            sturnto(str);

#ifdef OLDWAY
            oa_override = 10000;
            inflect_pts[0].x = robart.x;
            inflect_pts[0].y = robart.y;
            inflect_pts[1].x = cal2x;
            inflect_pts[1].y = cal2y;

            execute_path(map_ptr, inflect_pts, 2, &curseg);
#endif

#ifdef OLDWAY
            put_packet("OM0011FF");                 /* go forward slowly forever */
            start_time = mstime();
            for (;;) {
                /* If user hit a key, halt the robot and quit with an error code */
                if (keyhit()) {
                        if (getkey() == ESC) {
                                stop();
                                return (ERROR);
                        }
                }
                if (mstime() - start_time > 20000L) {
                        stop();
                        break;
                }
            }
            x_command(X_OAARRAY, 0);                /* turn obstacle avoidance array off */

            /*
             * The following code is specific to the current calibration environment
             * and will have to be changed whenever the corner changes in some
             * respect.  The current physical configuration is as follows:
```

```
 *
 *      .       1'        2'         3'
 *      .  +---------|---------|----------|-------+
 *      .  | <------------- 37" --------------> |
 * Wall->|                                      |
 *      .  |                                      |
 *      .  |                                      |
 *      .  |            +---------------+         | <- Filing cabinet
 *      .  |            |    Robart     |         |
 *      .  |            |               |         |
 *      .  |            |               |         |
 *      .  |<--11.0"->| <- Sonars -> |<-11.25"->|
 *      .  |     rl     |               |    r2   |
 *      .  |            |<-- 14.298" ->|          |
 *      .  |            +---------------+         |
 *
 * This is just a rough diagram.  When the robot is precisely positioned
 * in the corner, he is at coordinates (11', 2').  When he is rammed
 * up against the wall, his x-coordinate is fixed, so that will always
 * be 11'.  The y-coordinate will vary, and that is what the sonars
 * are used to determine.  The radius of the robot is 7.149 +-.006".
 * The door jamb on the left is 11" and the filing cabinet is 11.25"
 * to the right when the robot is exactly at the calibration position.
 * Thus, the following equations can be used to determine the y-coordinate
 * in inches:
 *
 * Estimate using left sonar:
 *
 *                yl = rl + 7.149 + (24 - 11.0 - 7.149)
 *                   = rl + 13.0
 *
 * Estimate using right sonar:
 *
 *                yr = 24 + 24 - (r2 + 7.149 + (24 - 11.25 - 7.149))
 *                   = 35.25 - r2
 *
 * These two estimates can then be averaged to obtain the current
 * position.  However, these calculations ignore the fact that the sonars
 * don't work when the range is less than 9".  So an additional check is
 * made to determine if one of the sonars is too close to the wall or
 * cabinet.  If we're too close to the left wall (rl <= 9.5"), then r2 will
 * be greater than or equal to 11.25 + 1.5 = 12.75, so we just use the
 * estimate obtained from r2.  Likewise, if the range from r2 is less
 * than 9.5", then rl will be >= (11.25 - 9.5 + 11.0) = 12.75.
 */

robart.x = (11 * 12) / map_ptr->squaresize; /* already know x-coordinate */
get_avg_pe_sig(sonars);              /* get sonar reading */
rl = sonars[17] * 1.6;               /* scale range from port sonar */
r2 = sonars[5] * 1.6;                /* scale range from starboard sonar */
yl = rl + 13.0;
yr = 35.25 - r2;
rnd = map_ptr->squaresize/2;
if (sonars[17] <= 7 && sonars[5] > 8) {      /* can't use rl range */
    robart.y = (int) (yr / map_ptr->squaresize + 0.5);
    robart.iy = (int) (yr + 0.5);
}
else if (sonars[5] <= 7 && sonars[17] > 8) { /* can't use r2 range */
    robart.y = (int) (yl / map_ptr->squaresize + 0.5);
    robart.iy = (int) (yl + 0.5);
}
else {
    robart.y = (int) (((yl+yr)/2.0) / map_ptr->squaresize + 0.5);
    robart.iy = (int) ((yl+yr)/2.0 + 0.5);
}
robart.ix = 11 * 12;

sprintf(str, "L:raw=%d sc=%.2f y=%.2f R:raw=%d sc=%.2f y=%.2f (%d\",%d\")",
    sonars[17], rl, yl, sonars[5], r2, yr,robart.ix,robart.iy);
Clear_Line(24);  Clear_Line(25);
PutString(24, 1, str);
all_coords(str, robart.x, robart.y, map_ptr);
PutString(25, 1, str);
```

```

#else
    range_error = blockage_count = ir_confirm_count = 0;
error_retry:
    waitms(400);
    put_packet("0c00");          /* tell robot to recalibrate */
    do {
        status = wait_packet(&pack, NO_WAIT);
        if (status == ABORT)
                return (ERROR);
        else if (keyhit()) {
                mgetkey();
                return (ERROR);
        }
    } while (status != OK);

    /* Got a packet from the robot.  Look at it to make sure it is a
     * "calibration complete" packet, consisting of:
     *          9CLLLLRRRR
     * where LLLL is the distance (in tenths of inches) of the sensor from
     * the left wall, and RRRR is the distance from the right wall.  Both
     * numbers are encoded in ASCII hexadecimal.
     */
    if (strnicmp(pack.data, "9E", 2) == 0) {
        switch (atoi((char *)&pack.data[2])) {
        case 0:                          /* command error */
                gstatus("COMMAND ERROR -->");
                break;
        case 1:                          /* range error */
                if (++range_error < 8) {
                        gstatus("RECALIBRATE: RANGE ERROR.  Retry #%d.", range_
error);
                        waitms(400);
                        sforward("12 2");      /* move forward a foot */
                        goto error_retry;
                }
                gstatus("RECALIBRATE: RANGE ERROR -->");
                break;
        case 2:                          /* blockage error */
                blockage_count++;
                if (blockage_count < 8) {
                        gstatus("RECALIBRATE: BLOCKAGE ERROR.  Retry #%d", bloc
kage_count);
                        goto error_retry;
                }
                gstatus("RECALIBRATE: BLOCKAGE ERROR -->");
                break;
        case 3:
                ir_confirm_count++;
                if (ir_confirm_count < 8) {
                        gstatus("RECALIBRATE: I/R CONFIRMATION ERROR.  Retry #%
d", ir_confirm_count);
                        goto error_retry;
                }
                gstatus("RECALIBRATE: I/R CONFIRMATION ERROR -->");
                break;
        default:
                gstatus("UNKNOWN ERROR CODE: %u -->", atoi((char *) &pack.data[
2]));
                break;
        }
        mgetkey();
        gstatus("");
        return (-2);
    }
    else if (strnicmp(pack.data, "9C", 2) != 0) {
        gstatus("Ignoring packet '!%10.10s' -->", pack.data);
        goto error_retry;
    }

    /* Decode the left and right distances */
    DecodeWord(&pack.data[2], &left_dist);
    DecodeWord(&pack.data[6], &right_dist);
```

```
    gstatus("[l:%04x r:%04x] left dist: %3d.%d\", right dist: %3d.%d\" -->",
        left_dist, right_dist,
        left_dist/10, left_dist%10, right_dist/10, right_dist%10);
    robart.y = cal2y;           /* already know Y-coordinate */


    /* the right wall (bookcase) is at 15'10.125" and the robot's diameter
     * is 7.149"
     */
    xr = 15*12 + 10.125 + right_dist/10.0 + 7.149;


    /* FUDGE: the sonars fall short by about 1", so compensate for it here.
     */
    xr += 1.0;


gstatus("xr = %.3lf, about to calculate robart.x -->",xr);
    robart.x = (int) ((xr + map_ptr->squaresize/2.0) / map_ptr->squaresize);

    robotx = robart.x * map_ptr->squaresize * 10L;
    roboty = robart.y * map_ptr->squaresize * 10L;
    robothdg = robart.dir * 100L;
    ix = (int) xr, iy = robart.y * map_ptr->squaresize;
    gstatus("Calculated position: (%d'%d\", %d'%d\")",ix/12,ix%12,iy/12,iy%12);
    docked = YES;

#if 0
/*     gstatus("Waiting for MOVE COMPLETE report...");*/
    do {
        status = wait_packet(&pack, NO_WAIT);
        if (status == ABORT)
                return (ERROR);
        else if (keyhit()) {
                mgetkey();
                return (ERROR);
        }
    } while (status != OK);

   gstatus("");
#endif
#endif

    return (OK);
}


/* undock - move the robot out of the docking position. */
int undock(map_ptr)
map *map_ptr;
{
        char    str[80];
        int     offset;
        int     nrx, nry;
        packet  pack;

        /* Back the robot up 12 inches */
        put_packet("0C010C");

        while (!keyhit()) {
                if (wait_packet(&pack, NO_WAIT) == OK) {
                        if (strnicmp((char *) pack.data, "9M", 2) == 0)
                                break;
                        else {
                                gstatus("Ignoring packet '!%10.10s' -->", pack.
data);
                        }
                }
                if (keyhit())
                        getkey();
        }

```

```
        Calc_Dest_Grid_Unit(180, 12.0, &nrx, &nry, map_ptr->squaresize);
        robart.x = nrx;
        robart.y = nry;
        robotx = robart.x * map_ptr->squaresize * 10L;
        roboty = robart.y * map_ptr->squaresize * 10L;

        return (OK);
}
```

```
/****************************************************************************
 * pe.c contains procedures for position estimation (both building the   *
 * database and correcting a dead reckoned position).                     *
 ***************************************************************************/
#include <stdio.h>
#include <math.h>
#include <malloc.h>
#include <string.h>
#include <stdlib.h>
#include <search.h>
#include <ega.h>
#include <event.h>
#include <menu.h>

#include "headers/ibmio.h"
#include "headers/serial.h"

#define ENTERKEY        0x1c0d  /* scan code fore the Enter key */


static int debug = 0;

/* Robart's starting location in map coordinates and dead reck. position.
 * All info in units of inches.
 */
int             xOrigin, yOrigin;
int             xpoints, ypoints;       /* number of interpolation points */
int             est_x, est_y;           /* estimated xy position */
int             est_dir;
int             short_cor = 22;         /* minimum short-circuit correlation.
                                         * If correlation >= short_cor anytime
                                         * during database search, stop
                                         * immediately.
                                         */
int             search_all = NO;        /* YES => search whole database */
int             ngrids = 4;             /* search size, grid units around
                                         * current robot location
                                         */
unsigned int    nreadings = 5;          /* number of readings to average */

extern  int     robot_type;
extern  long    robotx, roboty, robothdg;
extern  drType  robart;
extern  int     debug_port;
extern  XY_PAIR inflect_pts[200];

byte DecodePEArray();



/****************************************************************************/
/* EstimatePosition finds the best match in the PE database for the current */
/* sonar readings. It's input parameters are:                               */
/*                                                                          */
/*  gridDist: integral number of units to check for correspondence in.     */
/*       (i.e. if gridDist = 1 then EstimatePosition checks a 3x3          */
/*        array of grid positions centered at the dead reckoned            */
/*        position. If gridDist = 2, then it's a 5x5 array, etc...)        */
/*                                                                          */
/*  angleDist:  same as above, except for angle. It skews the data         */
/*              through the angluar interval one angleDist to the right    */
/*              and left.                                                  */
/*                                                                          */
/*  drPtr:      pointer to the current dead reckoning information. This    */
/*              should be in grid units, not inches.                       */
/*                                                                          */
/*  map_ptr:    pointer to the current floor map structure.                */
/*                                                                          */
/*  pePtr:      result returned as a new map position, also in map units.  */
/*                                                                          */
/*  pESonars:   pointer to the current position sonar returns.             */
/*                                                                          */
/****************************************************************************/
```

```
int EstimatePosition(gridDist, angleDist, drPtr, map_ptr, pePtr, pESonars)
int     gridDist, angleDist;
drType *drPtr;
map     *map_ptr;
drType *pePtr;
byte    pESonars[];
{
    int  sqsize;
    int  s, i, xl, xu, yl, yu, corr, tol, peRet, dir;
    int  x, y, ty, diffs, delta;
    int  xmax, ymax;
    int  maxcnt;
    int  tally, maxtally, bestx, besty;
    int  mindiff, bdx, bdy;
    int  rxl, ryl, rx2, ry2;
    int  sf, peascale;
    byte rotdata[PE_SONAR_NUM][PE_SONAR_NUM];
    byte *peaptr, *tptr;
    byte val;

    sqsize = map_ptr->squaresize;
    sf = 12 / sqsize;                   /* convert map coords to PEA coords */
    peascale = map_ptr->width/sqsize;

    /* Just search the current D.R. position first */
    xl = drPtr->x / sf;
    xu = drPtr->x / sf;
    yl = drPtr->y / sf;
    yu = drPtr->y / sf;

    /* Set the maximum coordinates to search */
    xmax = map_ptr->width/sf  - 1;
    ymax = map_ptr->height/sf - 1;

    bestx = besty = maxtally = 0;
    corr = 0;
    tol  = 8;                       /* 11.2" tolerance */

if (debug) {
 debug_out("\nSonar Return:\n00,00:");
 for (i = 0; i < PE_SONAR_NUM; i++) {
  debug_out("%02x ", pESonars[i]);
 }
 debug_out("\n");
}

    /* For each skewed angle look for the best fit */
    mindiff = 32000;
    tally = 0;

    /*
     * Pre-rotate the current sonar data and put it in the array
     * rotdata[].  This will be accessed as &rotdata[dir], which
     * will point to the sonar data for that rotation.
     */
    for (dir = 0; dir < PE_SONAR_NUM; dir++) {
        RotateSonarData(drPtr->dir/PE_SON_SPACING+dir, pESonars, &rotdata[dir][
0]);
    }

    /*
     * Begin the search.  Searches from the current dead reckoned position
     * and expands outward by one square in each direction until either the
     * correlation, <tally>, exceeds 15 or the entire database has been
     * searched.
     */
    if (xl < 0)
        xl = 0;
    if (xu > xmax)
        xu = xmax;
    if (yl < 0)
        yl = 0;
    if (yu > ymax)
```

```
        yu = ymax;
    maxcnt = 0;
    gpmerge(MXOR);
    gpcolor(RED);
    do {
        rx1 = xl < map_ptr->lx/sf ? (map_ptr->xoff) : (map_ptr->xoff + (xl-map_
ptr->lx) * map_ptr->scale * sf);
        ry1 = yl < map_ptr->ly/sf ? (map_ptr->yoff) : (map_ptr->yoff - (yl-map_
ptr->ly) * map_ptr->scale * sf);
        rx2 = map_ptr->xoff + (xu-map_ptr->lx) * map_ptr->scale * sf;
        ry2 = map_ptr->yoff - (yu-map_ptr->ly) * map_ptr->scale * sf;
        gpmove(rx1, ry1);
        gprect(rx2, ry2);

        if (debug) {
                debug_out("(%2d,%2d)  (%2d,%2d)\r",xl,yl,xu,yu);
        }

        /*
         * Search all directions
         */
        for (dir = 0; tally < short_cor && dir < PE_SONAR_NUM; dir++) {

            /* Scan the PE database for the best correlation */
            for (x=xl; tally < short_cor && x <= xu; x++) {
                if (x > xmax) break;      /* if at upper limit, done */
                if (x < 0)                /* already searched left hand edge? */
                    x = 0;                /* force to left boundary */
                if (keyhit()) {
                    getkey();
                    debug ^= 1;
                }
                for (y=yl; tally < short_cor && y <= yu; y++) {
                    if (y > ymax) break;
                    ty = y;
                    if (y < 0) {
                        if (x == xl)
                            ty = 0;
                        else
                            ty = yu;
                    }

                    /* Point to the first return value in the PEA array */
                    peaptr = map_ptr->pe_ptr +
                            (ty * peascale + x)*PE_SONAR_NUM;
                    if (*peaptr == 0)
                        continue;

                    diffs = 0;
                    tally = 0;

                    for(s=0, tptr = (byte *) &rotdata[dir][0]; s < PE_SONAR_NUM
; s++) {
                        peRet = *peaptr++;
                        val = *tptr++;
                        if ((peRet >= val - tol) && (peRet <= val + tol)) {
                            tally++;
                            delta = val - peRet;
                            if (delta < 0)
                                diffs -= delta;
                            else
                                diffs += delta;
                        }
                    }

                    /* If this has the highest tally, update estimates */
                    if (tally > maxtally) {
                        if (debug) {
                            debug_out("%2d,%2d:",x,ty);
                            for(s=0, tptr = (byte *) &rotdata[dir][0]; s < PE_S
ONAR_NUM; s++) {
                                peRet = pEAccess(map_ptr, x, ty, s);
                                val = *tptr++;
```

```
                                if ((peRet >= val - tol) && (peRet <= val + tol
)) {
                                    debug_out("\033p%02x \033q", peRet);
                                }
                                else {
                                    debug_out("%02x ", peRet);
                                }
                            }
                            debug_out("\n");
                        }
                        mindiff = (diffs * 10) / tally;
                        bdx = x;
                        bdy = ty;
                        maxtally = tally;
                        bestx = x;
                        besty = ty;
                    }
                    else if (tally == maxtally) {
                        diffs = (diffs * 10) / tally;
                        if (diffs < mindiff) {
                            mindiff = diffs;
                            bdx = x;
                            bdy = ty;
                        }
                    }

                    /*
                     * Following code makes sure that we just search the out-
                     * line of the square enclosed by (xl,yl) (xu,yu).  If
                     * the X-coordinate is xl or xu, then we have to search
                     * each y-coordinate.  Otherwise, we only have to search
                     * (x, yl) or (x, yu), since all the y-values in between
                     * have already been searched.
                     */
                    if (y == yl && x != xl && x != xu)
                        y = yu - 1;
                }
            }


            bestx = bdx;
            besty = bdy;
            /* Remember the best angular correspondence */
            if (maxtally > corr) {
                corr = maxtally;
                pePtr->x   = bestx * sf;
                pePtr->y   = besty * sf;
                pePtr->dir = dir * PE_SON_SPACING;
            }
        }

        gpmove(rx1, ry1);               /* erase the old rectangle */
        gprect(rx2, ry2);
        /*
         * Expand the search area by one square in each direction
         */
        xl--; xu++;
        yl--; yu++;
        if (xl < -1) xl = -1;
        if (xu [illegible] xmax+1) xu = xmax+1;
        if (yl < -1) yl = -1;
        if (yu > ymax+1) yu = ymax+1;
    } while (++maxcnt < gridDist && tally < short_cor && (xl >= 0 || yl >= 0 ||
 xu <= xmax || yu <= ymax));

    gpmerge(MRPL);
debug_out("best(%d,%d)\n",bdx,bdy);
    return (corr);
}


byte_compare(l, r)
byte *l, *r;
```

```
{
        if (*l < *r)
                return (-1);
        else if (*l > *r)
                return (1);
        return (0);
}

/*********************************************************************
 *                          get_avg_pe_sig                           *
 *********************************************************************
 * Take <nreadings> sonar readings from each sonar sensor, then take *
 * the median value and put that in the array <sonar_array>.        *
 *                                                                   *
 * Call with:                                                        *
 *      sonar_array     = (byte *) array to put resulting median values *
 *                         into                                      *
 *                                                                   *
 * Returns:                                                          *
 *      ERROR   if unable to get any of the requested sonar packets *
 *      OK      if everything is hunky-dory                          *
 *                                                                   *
 *********************************************************************/
get_avg_pe_sig(sonar_array)
byte *sonar_array;
{
    unsigned int        ii, jj;
    byte                *sonar_readings;
    byte                *cur_array, *sort_array;
    unsigned int        avg;
    packet              pack;
    static byte param[] = {2, '1', 'C', 0};

    dump_packets();

    /* Get and throw away the first reading (it's probably erroneous) */
    if (!Get_Packet(&pack, PES_PTYPE, param, TRUE)) return (ERROR);

    /*
     * Allocate space for <nreadings> sonar arrays
     */
    sonar_readings = (byte *) malloc(nreadings * PE_SONAR_NUM);
    if (sonar_readings == NULL) {
        gstatus("Can't allocate %d bytes for sonar array -->", nreadings*PE_SON
AR_NUM);
        mgetkey();
        return (ERROR);
    }

    /*
     * Take <nreadings> sonar readings and stuff them into the <sonar_readings>
     * array.
     */
    cur_array = sonar_readings;
    for (ii = 0; ii < nreadings; ii++, cur_array += PE_SONAR_NUM) {
        if (!Get_Packet(&pack, PES_PTYPE, param, TRUE)) {
            free(sonar_readings);
            return (ERROR);
        }
        DecodePEArray(&pack, cur_array, NO);
    }

    /*
     * For every sensor, take either the average of all the readings (if
     * nreadings <= 2) or take the median of all the values.
     */
    for (ii = 0; ii < PE_SONAR_NUM; ii++) {
        cur_array = sonar_readings;

        /* If we only got one or two readings, just take the average */
        if (nreadings <= 2) {
            avg = 0;
```

```
            for (jj = 0; jj < nreadings; jj++) {
                if (cur_array[ii] != 0xff) {
                    avg += cur_array[ii];
                    cur_array += PE_SONAR_NUM;
                }
            }
            avg /= nreadings;
            sonar_array[ii] = (byte) avg;
        }
        else {
            /*
             * Take the median value of all the sonar readings.  Involves
             * sorting all the values and then finding the middle value.
             */
            sort_array = (byte *) malloc(nreadings);
            if (sort_array == NULL) {
                gstatus("Can't allocate %d bytes for sort_array -->",nreadings)
;
                mgetkey();
                free(sonar_readings);
                return (ERROR);
            }

            /*
             * Copy the current sonar readings into <sort_array>, then sort
             * the array.
             */
            cur_array = sonar_readings;
            for (jj = 0; jj < nreadings; jj++) {
                sort_array[jj] = cur_array[ii];
                cur_array += PE_SONAR_NUM;
            }
            qsort(sort_array, nreadings, 1, byte_compare);
            /*
             * Now get the median value.
             */
            sonar_array[ii] = sort_array[nreadings/2];
            free(sort_array);
        }
    }
    free(sonar_readings);
    return (OK);
}


/****************************************************************************/
/* CorrectDR accepts a pointer to a floor map and a pointer to a PE array    */
/* and uses this info to correct the dead reckoning global structure. On     */
/* entry the dead reckoning info should be in inches, and will be on exit.   */
/* The threshold parameter is a constant against which the correlation count */
/* will be judged, the dead reckoning will be updated only if the count is   */
/* greater than the threshold.                                               */
/****************************************************************************/
int  CorrectDR(map_ptr, pESonars, threshold, ngrids, skew)
map  *map_ptr;
byte pESonars[];
int  threshold, ngrids, skew;
{
    int     del, sqsize, pex, pey;
    int     n, m, x, y, cor;
    int     val;
    drType  copy, peDr;
    byte    r, temp[PE_SONAR_NUM];

    sqsize = map_ptr->squaresize;
    if (get_avg_pe_sig(pESonars) == ERROR)
        return (ERROR);

    /* Set the DR info to be in map absolute coords */

    copy.x = robart.x;
    copy.y = robart.y;
    copy.dir = robart.dir;
```

```

debug_out("robart = (%d, %d) xOrigin,yOrigin=(%d,%d)\n",copy.x,copy.y,xOrigin,y
Origin);

    /* Get the best fit in a ngrids x ngrids grid around the dead reck
     * position, looking <skew> sensors in angle both left and right.
     */
    cor = EstimatePosition(ngrids, skew, &copy, map_ptr, &peDr, pESonars);

    /* Temporary code to dump the new estimated position for debugging */
    debug_out("Correlation = %d, New coord (%d, %d), new dir=%d\n",
              cor, peDr.x, peDr.y, peDr.dir);

    /* If the correlation factor is less than the given minimum then return
     * without updating the dead reckoning.
     */
    if (cor < threshold) return (cor);

    est_x = peDr.x;
    est_y = peDr.y;
    est_dir = peDr.dir;

    /* Interpolate an aproximate position within the grid unit, using 4
     * returns from the pos. and neg. x and y directions.
     */
    RotateSonarData((copy.dir+peDr.dir)/PE_SON_SPACING, pESonars, temp);
    x = y = n = m = 0;

   pex = peDr.x / (12 / sqsize);
   pey = peDr.y / (12 / sqsize);
   /* Calculate distance from north wall */
    r = pEAccess(map_ptr, pex, pey, 0);
   val = temp[0];
  debug_out("r=%02x, val=%02x (%d\") ", r, val, (val*160-50)/100);
    if ((val < r+8) && (val > r-8) && (r < MAX_SONAR_RANGE)) {
        del = r - val;
        if (del < 0)
            x -= (del * 160 - 50)/100;
        else
            x -= (del * 160 + 50)/100;
        n++;
    }

    /* Calculate distance from south wall */
    r = pEAccess(map_ptr, pex, pey, 12);
   val = temp[12];
  debug_out("r=%02x, val=%02x (%d\")\n", r, val, (val*160-50)/100);
    if ((val < r+8) && (val > r-8) && (r < MAX_SONAR_RANGE)) {
        del = r - val;
        if (del < 0)
            x += (del * 160 - 50)/100;
        else
            x += (del * 160 + 50)/100;
        n++;
    }

    /* Calculate distance from east wall */
    r = pEAccess(map_ptr, pex, pey, 6);
   val = temp[6];
  debug_out("r=%02x, val=%02x (%d\") ", r, val, (val*160-50)/100);
    if ((val < r+8) && (val > r-8) && (r < MAX_SONAR_RANGE)) {
        del = r - val;
        if (del < 0)
            y += (del * 160 - 50)/100;
        else
            y += (del * 160 + 50)/100;
        m++;
    }

    /* Calculate distance from west wall */
    r = pEAccess(map_ptr, pex, pey, 18);
    val = temp[18];
  debug_out("r=%02x, val=%02x (%d\")\n", r, val, (val*160-50)/100);
```

```
    if ((val < r+8) && (val > r-8) && (r < MAX_SONAR_RANGE)) {
        del = r - val;
        if (del < 0)
            y -= (del * 160 - 50)/100;
        else
            y -= (del * 160 + 50)/100;
        m++;
    }

    /* Calculate the new x,y position within the grid unit. */
    xOrigin = peDr.x * sqsize + sqsize/2;
    yOrigin = peDr.y * sqsize + sqsize/2;

    if (n > 0) xOrigin += x/n;
    if (m > 0) yOrigin += y/m;

    /* Send a reset dead reckoning packet to robart
     *      pack.data[0] = RC_PTYPE;
     *      pack.data[1] = 'D';
     *      Send_Link(&pack, 2, &status);
     */

    /* Temporary code to dump the new estimated position for debugging */

    debug_out("\nNew abs x = %d\", %d'%d\", # of x interp. points = %d\n",
              xOrigin, xOrigin/12,xOrigin % 12, n);
    xpoints = n;
    ypoints = m;
    debug_out("New abs y = %d\", %d'%d\", # of y interp. points = %d\n",
              yOrigin, yOrigin/12, yOrigin%12, m);

    return (cor);
}



/***********************************************************************
 * manual_pe - do position estimation manually.  Fires the sonars and  *
 * allows the user to move the robot's map position around until the   *
 * sonar returns match the surroundings.                               *
 ***********************************************************************/
manual_pe(map_ptr)
map *map_ptr;
{
    byte        param[3], pESonars[PE_SONAR_NUM];
    char        str[80];
    packet      rec;
    int         distances[PE_SONAR_NUM], pt_plotted[PE_SONAR_NUM];
    int         x_coord[PE_SONAR_NUM], y_coord[PE_SONAR_NUM];
    int         xoff, yoff;
    int         scale, ii;
    int         quit;
    int         cc;
    int         x1, y1, x2, y2;
    long        req_time;
    GBUF        *save_buf;

    mouse_off();
    text_foreground(WHITE);
    text_background(BLACK);
    gpcolor(BLACK);
    Clear_Line(1);  Clear_Line(2);  Clear_Line(3);
    all_coords(str, robart.x, robart.y, map_ptr);
    sprintf(&str[strlen(str)], "  Heading: %3d", robart.dir);
    gpcolor(BLACK);
    PutString(1,1, str);

    /* Init pt_plotted array to indicate no points have been plotted */
    for (ii = 0; ii < PE_SONAR_NUM; ii++) {
        pt_plotted[ii] = NO;
    }
```

```
/*
    Clear_Line(1);
    sprintf(str, "Enter Robart's heading [%d]: ", robart.dir);
    robart.dir = Get_Value(1, 1, 0, 360, robart.dir, str);
    robart.dir = force360(robart.dir);
    Clear_Line(1);
*/

    scale = map_ptr->scale;

    xoff = map_ptr->xoff;
    yoff = map_ptr->yoff;
    save_buf = save_robart(map_ptr, robart.x, robart.y);
    draw_robart(map_ptr, robart.x, robart.y);

    /* Setup the PE sonar request packet parameter block to ask for
     * returns on all sensors.
     */
    param[0] = 2;
    param[1] = '1';
    param[2] = 'C';
#if 0
    if (Get_Packet(&rec, PES_PTYPE, param, FALSE) != TRUE) {
        gpmerge(MRPL);
        restore_robart(save_buf);
        mouse_on();
        return (FALSE);
    }
#else
    Get_Packet(&rec, PES_PTYPE, param, FALSE);
#endif
    DecodePEArray(&rec, pESonars, NO);
    ScalePEArray(distances, pESonars);
    plot_points(map_ptr, distances, pt_plotted, x_coord, y_coord);
    req_packet(PES_PTYPE, param);
    req_time = mstime();

    quit = 0;
    gpmerge(MRPL);
    Clear_Line(25);
    Draw_Status_Line("Hit F10 to quit");
    while (!quit) {

        /*
         * If a key has been struck, look at it and see if it's either
         * F10 or ESC.  If so, then quit.  Otherwise, assume it's an
         * arrow key and the user is adjusting Robart's position and
         * the sonar returns need to be re-plotted.  There is also
         * a one second "grace" period after the last key has been struck
         * to allow the user to hit another before the computer gets another
         * sonar packet.
         */
        if (keyhit()) {
                cc = mgetkey();
                if (cc == F10 || cc == ESC) {
                    quit = YES;
                    break;
                }
                if (cc == 0x4d36) {             /* rotate robot clockwise */
                    robart.dir = force360(robart.dir+1);
                    plot_points(map_ptr, distances, pt_plotted, x_coord, y_coor
d);
                }
                else if (cc == 0x4b34) {
                    robart.dir = force360(robart.dir-1);
                    plot_points(map_ptr, distances, pt_plotted, x_coord, y_coor
d);
                }
                else
                    move_points(cc, map_ptr, x_coord, y_coord, pt_plotted, &sav
e_buf);
                gpmerge(MRPL);
                gpcolor(BLACK);
```

```
                    all_coords(str, robart.x, robart.y, map_ptr);
                    sprintf(&str[strlen(str)], "  Heading: %3d", robart.dir);
                    gpcolor(BLACK);
                    Clear_Line(1);
                    PutString(1,1, str);
        }

        /*
         * If the next sonar packet is available, get it and plot the latest
         * return.
         */
        if (wait_packet(&rec, NO_WAIT) == OK) {
                DecodePEArray(&rec, pESonars, NO);
                ScalePEArray(distances, pESonars);
                plot_points(map_ptr, distances, pt_plotted, x_coord, y_coord);
                req_packet(PES_PTYPE, param);   /* request another packet */
                req_time = mstime();            /* reset timeout value */
        }
        /*
         * If it's been more than 2 seconds since the packet request went out
         * and no sonar data has arrived yet, issue the request again.
         */
        else if (mstime() - req_time >= 2000) {
                req_packet(PES_PTYPE, param);   /* request sonar packet */
                req_time = mstime();            /* reset timeout value */
        }
    }

    /* Erase all the sonar returns */
    x1 = (robart.x - map_ptr->lx)*scale + xoff;
    y1 = yoff - (robart.y - map_ptr->ly)*scale;
    gpmerge(MXOR);
    for (ii = 0; ii < PE_SONAR_NUM; ii++) {
        if (pt_plotted[ii]) {
                x2 = xoff + (x_coord[ii]-map_ptr->lx)*scale;
                y2 = yoff - (y_coord[ii]-map_ptr->ly)*scale;
                gpmove(x1, y1);
                gpcolor(WHITE);
                gpline(x2, y2);
            ScalePoint(map_ptr, x_coord[ii], y_coord[ii], WHITE);
        }
    }

    /* Remove Robart blob from screen */
    gpmerge(MRPL);
    restore_robart(save_buf);

    Clear_Line(25);
    mouse_on();
    return (OK);
}



/**************************************************************************
 *                              plot_points                               *
 **************************************************************************
 * Plot the sonar returns as lines.  Erases the old line that was         *
 * previously plotted and plots the new line (unless it would plot off    *
 * the map).                                                              *
 *                                                                        *
 * Call with:                                                             *
 *      map_ptr         = (map *) pointer to current floor map            *
 *      distances       = (int *) array of 24 range values (in inches)    *
 *      pt_plotted      = (int *) boolean array, indicating if the        *
 *                                range return for the given sonar was    *
 *                                plotted the last time.                  *
 *      x_coord         = (int *) X-coordinate of plotted point in        *
 *                                map domain                              *
 *      y_coord         = (int *) Y-coordinate of plotted point in        *
 *                                map domain                              *
 *                                                                        *
 **************************************************************************/
```

```
plot_points(map_ptr, distances, pt_plotted, x_coord, y_coord)
map *map_ptr;
int *distances, *pt_plotted, *x_coord, *y_coord;
{
        int     x1, y1, x2, y2;
        int     new_x, new_y;
        int     scale, xoff, yoff;
        int     ii, range;

        xoff = map_ptr->xoff;
        yoff = map_ptr->yoff;
        scale = map_ptr->scale;

        x1 = (robart.x-map_ptr->lx)*scale + xoff;
        y1 = yoff - (robart.y-map_ptr->ly)*scale;
        /* For each sonar do */
        gpmerge(MXOR);
        for (ii = 0; ii < PE_SONAR_NUM; ii++) {
            range = distances[ii];          /* get current range */
            if (range == 0) {               /* no range? */
                if (pt_plotted[ii]) {   /* erase old point */
                        x2 = xoff + (x_coord[ii]-map_ptr->lx)*scale;
                        y2 = yoff - (y_coord[ii]-map_ptr->ly)*scale;
                        gpcolor(WHITE);
                        gpmove(x1, y1);
                        gpline(x2, y2);
                        ScalePoint(map_ptr, x_coord[ii], y_coord[ii], WHITE);
                }
                pt_plotted[ii] = NO;    /* point not plotted now */
                continue;
            }

            /* Get the absolute position of the sensor return in cartesian
             * map coordinates, pass in polar coordinates.
             */
            Calc_Dest_Grid_Unit(ii * PE_SON_SPACING,(double)range,&new_x, &new_
y, map_ptr->squaresize);

            /* If new coordinates different than old coordinates, update */
            if (new_x != x_coord[ii] || new_y != y_coord[ii]) {
                /* Erase old point */
                if (pt_plotted[ii]) {           /* previously on screen? */
                    x2 = xoff + (x_coord[ii]-map_ptr->lx)*scale;
                    y2 = yoff - (y_coord[ii]-map_ptr->ly)*scale;
                    gpcolor(WHITE);
                    gpmove(x1, y1);
                    gpline(x2, y2);
                    ScalePoint(map_ptr, x_coord[ii], y_coord[ii], WHITE);
                }
                /* If the return is on the floor map then */
                if (Clip_To_Map(new_x, new_y, map_ptr)) {
                    pt_plotted[ii] = YES;
                    x_coord[ii] = new_x;
                    y_coord[ii] = new_y;
                    ScalePoint(map_ptr, new_x, new_y, WHITE);
                    x2 = xoff + (x_coord[ii]-map_ptr->lx)*scale;
                    y2 = yoff - (y_coord[ii]-map_ptr->ly)*scale;
                    gpmove(x1, y1);
                    gpcolor(WHITE);
                    gpline(x2, y2);
                }
                else            /* not on floor map, don't plot it */
                    pt_plotted[ii] = NO;
            }
        }
        gpmerge(MRPL);
        return (OK);
}


/*************************************************************************
 *                              move_points                             *
 *************************************************************************
```

```
 * Move the robot to a new position (based on the character <cc>, which *
 * should be one of the four arrow keys) and re-plot the range returns  *
 * at that point.                                                        *
 *                                                                       *
 * Call with:                                                            *
 *      cc          = (int) character indicating which direction to move *
 *      map_ptr     = (map *) current floor map                          *
 *      x_coord     = (int *) array of X-coords of range last plotted    *
 *      y_coord     = (int *) array of Y-coords of range last plotted    *
 *      pt_plotted = (int *) boolean array indicating if point actually *
 *                      plotted on the screen                            *
 *      psave_buf   = (GBUF **) pointer to graphics buffer containing    *
 *                  screen image of robart's current position            *
 *                                                                       *
 ************************************************************************/
move_points(cc, map_ptr, x_coord, y_coord, pt_plotted, psave_buf)
int cc;
map *map_ptr;
int *x_coord, *y_coord, *pt_plotted;
GBUF **psave_buf;
{
    int         x1, y1, x2, y2;
    int         scale, xoff, yoff, ii, keyix;
    int         prevx, prevy, delta_x, delta_y;
    struct keydelta {
        int key;
        int dx,dy;
    };
    static struct keydelta keys[16] = {
        {END, -1, -1},  {LEFTARROW, -1, 0}, {HOME, -1, 1}, {UPARROW, 0, 1},
        {PGUP, 1, 1}, {RIGHTARROW, 1, 0}, {PGDN, 1, -1}, {DOWNARROW, 0, -1},
        {SEND, -10, -10}, {SLEFTARROW, -10, 0}, {SHOME, -10, 10},
        {SUPARROW, 0, 10}, {SPGUP, 10, 10}, {SRIGHTARROW, 10, 0},
        {SPGDN, 10, -10}, {SDOWNARROW, 0, -10}
    };

    /* Plot the initial point */
    xoff = map_ptr->xoff;
    yoff = map_ptr->yoff;
    scale = map_ptr->scale;

    x1 = (robart.x-map_ptr->lx)*scale + xoff;
    y1 = yoff - (robart.y-map_ptr->ly)*scale;
    for (keyix = 0; keyix < 16; keyix++) {                 /* search for matching
key */
        if (keys[keyix].key == cc)                  /* found it */
            break;
    }
    if (keyix < 16) {                               /* found the key */
        gpmerge(MXOR);
        for (ii = 0; ii < PE_SONAR_NUM; ii++) {
            if (pt_plotted[ii]) {
                x2 = xoff + (x_coord[ii]-map_ptr->lx)*scale;
                y2 = yoff - (y_coord[ii]-map_ptr->ly)*scale;
                gpmove(x1, y1);
                gpcolor(WHITE);
                gpline(x2, y2);
                ScalePoint(map_ptr, x_coord[ii], y_coord[ii], WHITE);
            }
        }

        gpmerge(MRPL);
        /* Remove Robart blob from screen */
        restore_robart(*psave_buf);

        /* Move robot to new position.  Save the amount robart actually
         * moved in <delta_x> and <delta_y>.
         */
        prevx = robart.x;
        prevy = robart.y;
        robart.x += keys[keyix].dx;
        robart.y += keys[keyix].dy;
        if (robart.x < 0) robart.x = 0;
```

```
        if (robart.x >= map_ptr->width) robart.x = map_ptr->width - 1;
        if (robart.y < 0) robart.y = 0;
        if (robart.y >= map_ptr->height) robart.y = map_ptr->height - 1;
        robotx = robart.x * map_ptr->squaresize * 10L;
        roboty = robart.y * map_ptr->squaresize * 10L;
        delta_x = robart.x - prevx;
        delta_y = robart.y - prevy;

        /* Draw Robart on the screen */
        *psave_buf = save_robart(map_ptr, robart.x, robart.y);
        draw_robart(map_ptr, robart.x, robart.y);

        /* Move the sonar returns by the same amount that the robot's
         * position moved.
         */
         x1 = (robart.x-map_ptr->lx)*scale + xoff;
        y1 = yoff - (robart.y-map_ptr->ly)*scale;
        gpmerge(MXOR);
        for (ii = 0; ii < PE_SONAR_NUM; ii++) {
            x_coord[ii] += delta_x;
            y_coord[ii] += delta_y;
            if (Clip_To_Map(x_coord[ii], y_coord[ii], map_ptr)) {
                ScalePoint(map_ptr, x_coord[ii], y_coord[ii], WHITE);
                x2 = xoff + (x_coord[ii]-map_ptr->lx)*scale;
                y2 = yoff - (y_coord[ii]-map_ptr->ly)*scale;
                gpmove(x1, y1);
                gpcolor(WHITE);
                gpline(x2, y2);
                pt_plotted[ii] = YES;
            }
            else
                pt_plotted[ii] = NO;
        }
    }
    gpmerge(MRPL);
    return (0);
}


print_pe_data(map_ptr, cor)
map *map_ptr;
int cor;
{
    char        str[80];
    int         ix, iy;

    ix = est_x * map_ptr->squaresize;
    iy = est_y * map_ptr->squaresize;
    sprintf(str, "Estimate: (%d,%d) (%d'%d\",%d'%d\")",
                  est_x, est_y, ix/12, ix%12, iy/12, iy%12);
    Clear_Line(2);
    PutString(2, 1, str);
    sprintf(str, "Interpolated: (%d'%d\", %d'%d\"), points: %d,%d",
          xOrigin/12, xOrigin%12, yOrigin/12, yOrigin%12, xpoints, ypoints);
    PutString(2,35, str);
    sprintf(str, "dir=%d Cor=%d", est_dir, cor);
    Clear_Line(3);
    PutString(3,1, str);
    return (OK);
}


/**********************************************************************
 *                          refine_heading                            *
 **********************************************************************
 * Refine the robot's heading.  This is done by taking position       *
 * estimation readings and rotating the robot by one degree until the *
 * estimated heading changes.  At this point, the robot will be about *
 * 7.5 degrees from either estimated heading. The robot can then be   *
 * turned 7 or 8 degrees in one direction or the other so that his    *
 * perceived heading will be within about 2 degrees of his true       *
 * heading.                                                           *
 *                                                                    *
```

```
 **********************************************************************/
void refine_heading(map_ptr)
map *map_ptr;
{
    char        str[80];
    byte        raw_data[PE_SONAR_NUM];
    int         cor, nrotations;
    int         ix, iy;
    int         prev_dir;

    dump_packets();                         /* dump any pending packets */
    mouse_off();
    robart.dir = 0;

    /*
     * Get initial position estimate
     */
    if (search_all)
        cor = CorrectDR(map_ptr, raw_data, 12, 1000, 0);
    else
        cor = CorrectDR(map_ptr, raw_data, 12, ngrids, 0);
    if (cor < 12) {
        gstatus("Cor=%d: Insufficient correlation for heading refinement -->",
cor);
        mgetkey();
        mouse_on();
        return;
    }

    robart.x = est_x;
    robart.y = est_y;
    robotx = robart.x * map_ptr->squaresize * 10L;
    roboty = robart.y * map_ptr->squaresize * 10L;

    /*
     * Rotate robot clockwise by 1 degree until the new estimated direction
     * differs from the old one.
     */
    prev_dir = est_dir;
    nrotations = 0;
    while (prev_dir == est_dir) {
print_pe_data(map_ptr, cor);
        execute_turn(map_ptr, 1);               /* turn clockwise 1 degree */
        gstatus("nrotations = %d", ++nrotations);
        cor = CorrectDR(map_ptr, raw_data, 12, ngrids, 0);
    }
print_pe_data(map_ptr, cor);

    /*
     * The previous heading and the new heading are now different.  If they
     * only differ by 15 degrees, then we probably have a fairly good chance
     * of refining our heading (and also our position).  We now rotate the
     * robot 7 degrees (since he should now be 7 degrees from the new heading)
     * in the same direction (since the wheels are already pre-loaded
     * in that direction).  We then take another position estimation reading.
     * If we get two interpolation points on either axis, we can use the
     * interpolated value for position instead of making do with the 1 foot
     * resolution of the data base.
     */
    if (abs(est_dir - prev_dir) > 15) {         /* bogus heading value */
        gstatus("new=%d - prev=%d > 15, so no refinement possible (cor=%d) -->"
,
                est_dir, prev_dir, cor);
        mgetkey();
        mouse_on();
        return;
    }

    execute_turn(map_ptr, 9);           /* turn to point exactly at heading */
    /* Note - 9 seems to work better for lining up than 7, though 7 is the
     * correct theoretical value.  Robot just doesn't rotate very accurately.
     */
```

```
    /*
     * Confirm new heading, and get data for interpolation of position.
     */
    prev_dir = est_dir;                         /* save current heading */
    cor = CorrectDR(map_ptr, raw_data, 12, ngrids, 0);
print_pe_data(map_ptr, cor);
    if (prev_dir != est_dir) {
        gstatus("new=%d, prev=%d, cor=%d after turn, unable to refine heading -
->",
                est_dir, prev_dir, cor);
        mgetkey();
        mouse_on();
    }

    /* Set position as closely as possible */
    if (xpoints == 2)                   /* got 2 interpolation points? */
        robart.x = xOrigin / map_ptr->squaresize;       /* get interp pos */
    else                                /* settle for 1' resolution */
        robart.x = est_x;
    if (ypoints == 2)                   /* got 2 interpolation points? */
        robart.y = yOrigin / map_ptr->squaresize;       /* get interp pos */
    else                                /* settle for 1' resolution */
        robart.y = est_y;
    robart.dir = est_dir;
    robotx = robart.x * map_ptr->squaresize * 10L;
    roboty = robart.y * map_ptr->squaresize * 10L;
    robothdg = robart.dir * 100L;

    ix = robart.x * map_ptr->squaresize;
    iy = robart.y * map_ptr->squaresize;
    sprintf(str, "Estimate: (%d,%d) (%d'%d\",%d'%d\")",
                    robart.x, robart.y, ix/12, ix%12, iy/12, iy%12);
    Clear_Line(2);
    PutString(2, 1, str);
    sprintf(str, "Interpolated: (%d'%d\", %d'%d\"), points: %d,%d",
        xOrigin/12, xOrigin%12, yOrigin/12, yOrigin%12, xpoints, ypoints);
    PutString(2,35, str);
    sprintf(str, "dir=%d Cor=%d", est_dir, cor);
    Clear_Line(3);
    PutString(3,1, str);
    mouse_on();
}


/************************************************************************
 * PositionEstimation accepts a pointer to a floor map structure and    *
 * depending on the state of the initFlag will either correct the dead  *
 * reckoning info. or build a new PE database (or simply add to an      *
 * existing one).                                                       *
 ************************************************************************/
int PositionEstimation(map_ptr)
map *map_ptr;
{
    char                *cp, str[80], pstr[80], prompt[80];
    byte                pESonars[PE_SONAR_NUM];
    int                 ix, iy;
    int                 quit, s;
    int                 scale;
    int                 cor, skew;
    int                 srx, sry;
    int                 ii, new, event_occurred;
    int                 newx, newy, oldmapx, oldmapy;
    long                selection;
    GBUF                *savebuf;
    MENU                *pmenu;
    EVENT               evnt;
    MAPC_STRUCT         mapc;
    static MENU_ITEM file_menu[] = {
        {"Load floor map", 0, 100, 0, NULL},
        {"Load PE database", 0, 101, 0, NULL},
        {"Save PE database", 0, 102, 0, NULL},
        {"-", 0, 0, 0, NULL},
        {"Quit", 0, 103, 0, NULL},
```

```
        {NULL, 0, 0, 0, NULL}
    };
    static MENU_ITEM estimate_menu[] = {
        {"Estimate position", 0, 200, 0, NULL},
        {"Manual estimation", 0, 201, 0, NULL},
        {"Refine heading", 0, 202, 0, NULL},
        {NULL, 0, 0, 0, NULL}
    };
    static MENU_ITEM build_menu[] = {
        {"Get signature", 0, 300, 0, NULL},
        {"Get & Move", 0, 301, 0, NULL},
        {"Delete signature", 0, 302, 0, NULL},
        {"-", 0, 0, 0, NULL},
        {"Make estimation path", 0, 303, GRAYED, NULL},
        {NULL, 0, 0, 0, NULL}
    };
    static MENU_ITEM variables[] = {
        {"Search whole database", 0, 400, CHECK_DISPLAY, (MENU_ITEM *) &search_
all},
        {"Search size", 0, 401, INT_DISPLAY, (MENU_ITEM *) &ngrids},
        {"Minimum correlation", 0, 402, INT_DISPLAY, (MENU_ITEM *) &short_cor},
        {"Number of readings", 0, 403, INT_DISPLAY, (MENU_ITEM *) &nreadings},
        {NULL, 0, 0, 0, NULL},
    };
    static MENU_ITEM other_menu[] = {
        {"Move forward  1 foot", 0, 500, 0, NULL},
        {"Move backward 1 foot", 0, 501, 0, NULL},
        {"-", 0, 0, 0, NULL},
        {"Rotate 90 deg.  CW", 0, 502, 0, NULL},
        {"Rotate 90 deg. CCW", 0, 503, 0, NULL},
        {"-", 0, 0, 0, NULL},
        {"Rotate 1 deg.  CW", 0, 504, 0, NULL},
        {"Rotate 1 deg. CCW", 0, 505, 0, NULL},
        {"-", 0, 0, 0, NULL},
        {"Redraw", 0, 506, 0, NULL},
        {"Set Robart position", 0, 507, 0, NULL},
        {"Debug mode", 0, 508, CHECK_DISPLAY, (MENU_ITEM *) &debug},
        {NULL, 0, 0, 0, NULL}
    };
    static MENU_ITEM pp_menu_bar[] = {
        {"File", 0, 0, 0, file_menu},
        {"Estimate", 0, 1, 0, estimate_menu},
        {"Build", 0, 2, 0, build_menu},
        {"Vars", 0, 3, 0, variables},
        {"Other", 0, 4, 0, other_menu},
        {NULL, 0, 0, 0, NULL}
    };

    mouse_off();
    gpmerge(MRPL);
    gpcolor(BLACK);
    gpclear(0,0, gdmaxcol, gdmaxrow);

    pmenu = RegisterMenu(pp_menu_bar);

    if (map_ptr->mapName[0] == '\0') {
        if (Load_Floor_Map(map_ptr, NULL) == ERROR) {
            close_menu(pmenu);
            mouse_on();
            return (ERROR);
        }
    }
    SetScale(map_ptr, 0, gdmaxcol, 15, gdmaxrow-15);
    DrawSFloorMap(map_ptr, WHITE, BLUE, GREEN);
    scale = map_ptr->scale;

    /* Load an existing floor map if any */
    if (map_ptr->peName[0] == '\0') {
        strcpy(map_ptr->peName, map_ptr->mapName);
        cp = strrchr(map_ptr->peName, '.');
        if (cp != NULL)
            *cp = EOS;
        strcat(map_ptr->peName, ".pea");
```

```
	}
	if (LoadPEArray(map_ptr, map_ptr->peName) == OK)
	    DrawPEDatabase(map_ptr, BLUE);
	else
	    NewPEArray(map_ptr);

	skew = 0;			/* search every direction too */

	x_command(X_OAARRAY, 0);		/* turn OA off */
	quit = NO;
	draw_menu(pmenu);

	/* Save the screen contents at the robot's current location, then draw
	 * a blob where the robot is.
	 */
	gpmerge(MRPL);
	savebuf = save_robart(map_ptr, robart.x, robart.y);
	draw_robart(map_ptr, robart.x, robart.y);

	mouse_on();
	mapc_Init(&mapc, map_ptr, LGREEN, IWHITE);
	while (!quit) {
	    oldmapx = mapc.mapx, oldmapy = mapc.mapy;
	    mapc_update(&mapc);

	    if (mapc.in_map && (oldmapx != mapc.mapx || oldmapy != mapc.mapy)) {
		text_foreground(IWHITE);
		text_background(BLACK);
		all_coords(str, mapc.mapx, mapc.mapy, map_ptr);
		PutString(25,1, str);
	    }

	    /* Handle selections from the mouse */
	    selection = NO_SELECTION;
	    event_occurred = NO;
	    while (GetEvent(&evnt)) {
		switch(evnt.type & 0xFF00) {
		case KEYBOARD :
		    if(evnt.data == 0x011B || evnt.data == F10) {
			    quit = YES;
		    }
		    else if (evnt.data == ENTERKEY) {
			    selection = pull_select_menu(pmenu, 0, 1);
			    event_occurred = YES;
			    gpmerge(MRPL);

			    if((new = CheckTrap()) != -1)
				    ii = new;
		    }
		    else
			    head_pos(evnt.data);
		    break;

		case MOUSEBUTTONDOWN :
		    ii = 0;
		    if((new = CheckTrap()) != -1)
			    ii = new;
		    if (ii && (ii & 0x00FF) != 0x00FE && (ii & 0x00F0) == 0x00F0) {
			    selection = pull_select_menu(pmenu, (ii & 0x000F), 1);
			    gpmerge(MRPL);
			    event_occurred = YES;

			    if((new = CheckTrap()) != -1)
				    ii = new;
		    }
		    break;
		}
	    }

	    if (event_occurred) {			/* if something selected */
		    mapc_off(&mapc);
		    mouse_off();
		    close_menu(pmenu);			/* shutdown the pulldown */
```

```
			gpviewport(0,0, gdmaxcol, gdmaxrow);	/* FIX MENU BUG */
			restore_robart(savebuf);
			savebuf = save_robart(map_ptr, robart.x, robart.y);
		}
		text_foreground(WHITE);
		text_background(BLACK);
		if (selection == 100) {			/* Load different floor map */
		    Load_Floor_Map(map_ptr, NULL);
		    SetScale(map_ptr, 0,gdmaxcol, 15, gdmaxrow-15);
		    DrawSFloorMap(map_ptr, WHITE, BLUE, GREEN);
		}
		else if (selection == 101) {		/* load different PE array */
		    if (LoadPEArray(map_ptr, NULL) == OK)
			DrawPEDatabase(map_ptr, BLUE);
		}
		else if (selection == 102) {		/* Save the PE array */
		    SavePEArray(map_ptr);
		}
		else if (selection == 103) {		/* Quit */
			quit = YES;
		}
		else if (selection == 200) {		/* Estimate current position */
		    robart.dir = 0;
		    if (search_all)
			cor = CorrectDR(map_ptr, pESonars, 10, 1000, skew);
		    else
			cor = CorrectDR(map_ptr, pESonars, 10, ngrids, skew);
		    if (cor >= 10) {
			if (xpoints < 2)		/* can't use interpolated value
? */
			    robart.x = est_x;
			else				/* CAN use interp value! */
			    robart.x = xOrigin / map_ptr->squaresize;
			if (ypoints < 2)		/* can't use interpolated value
? */
			    robart.y = est_y;
			else				/* CAN use interp value! */
			    robart.y = yOrigin / map_ptr->squaresize;
			robart.dir = est_dir;
			robotx = robart.x * map_ptr->squaresize * 10L;
			roboty = robart.y * map_ptr->squaresize * 10L;
			robothdg = robart.dir * 100L;
			ix = robart.x * map_ptr->squaresize;
			iy = robart.y * map_ptr->squaresize;
			sprintf(str, "Estimate: (%d,%d) (%d'%d\",%d'%d\")",
				robart.x, robart.y, ix/12, ix%12, iy/12, iy%12);
			Clear_Line(2);
			PutString(2, 1, str);
			sprintf(str, "Interpolated: (%d'%d\", %d'%d\"), points: %d,%d",
			xOrigin/12, xOrigin%12, yOrigin/12, yOrigin%12, xpoints, ypoint
s);
			PutString(2,35, str);
			sprintf(str, "dir=%d Cor=%d", est_dir, cor);
			Clear_Line(3);
			PutString(3,1, str);
		    }
		}
		else if (selection == 201) {		/* Manual estimation */
		    manual_pe(map_ptr);
		}
		else if (selection == 202) {		/* refine heading */
		    refine_heading(map_ptr);
		}
		else if (selection == 300) {		/* get PE signature */
		    get_pe_signature(map_ptr);
		}
		else if (selection == 301) {		/* get sig. & move 1 ft */
		    get_pe_signature(map_ptr);
		    execute_move(map_ptr, 12);
		}
		else if (selection == 302) {		/* delete current signature */
			for (s = 0; s < PE_SONAR_NUM; s++)
			    pEAccess(map_ptr, robart.x, robart.y, s) = 0;
```

```
                ScalePoint(map_ptr, robart.x, robart.y, BLACK);
        }
        else if (selection == 303) {            /* build estimation path */
                make_estimation_path(map_ptr);
        }
        else if (selection == 400) {            /* search all toggle */
                search_all ^= 1;
        }
        else if (selection == 401) {            /* set grid search size */
                sprintf(pstr, "%d", ngrids);
                if (ggets(str, "Number of grids around current position to sear
ch -->", pstr) != NULL) {
                        ngrids = atoi(str);
                }
                Clear_Line(25);
        }
        else if (selection == 402) {            /* set nubmer of sonar readings
*/
                sprintf(pstr, "%d", short_cor);
                if (ggets(str, "New short-circuit correlation value -->", pstr)
!= NULL) {
                        short_cor = atoi(str);
                }
                Clear_Line(25);
        }
        else if (selection == 403) {            /* set number of sonar readings
*/
                sprintf(pstr, "%d", nreadings);
                if (ggets(str, "Number of sonar readings to take -->", pstr) !=
NULL) {
                        nreadings = atoi(str);
                }
                Clear_Line(25);
        }
        else if (selection == 500) {            /* move fwd 1 foot */
                x_command(X_OAARRAY, 0);        /* make sure OA array is off */
                execute_move(map_ptr, 12);
        }
        else if (selection == 501) {            /* move bkwd 1 foot */
                execute_move(map_ptr, -12);
        }
        else if (selection == 502) {            /* rotate CW 90 degrees */
                execute_turn(map_ptr, 90);
        }
        else if (selection == 503) {            /* rotate CW 90 degrees */
                execute_turn(map_ptr, -90);
        }
        else if (selection == 504) {            /* rotate CW 1 degree */
                execute_turn(map_ptr, 1);
        }
        else if (selection == 505) {            /* rotate CW 1 degree */
                execute_turn(map_ptr, -1);
        }
        else if (selection == 506) {            /* redraw the screen */
            gpmerge(MRPL);
            gpcolor(BLACK);
            gpclear(0,0, gdmaxcol, gdmaxrow);
            DrawSFloorMap(map_ptr, WHITE, BLUE, GREEN);
            DrawPEDatabase(map_ptr, BLUE);
        }
        else if (selection == 507) {            /* set Robart position */
                Clear_Line(1);
                PutString(1,1, "Move cursor to desired position, then hit mouse
button (ESC to cancel)");
                draw_robart(map_ptr, robart.x, robart.y);
                mouse_on();
                mapc_on(&mapc);
                if (map_get_point(&mapc, &newx, &newy, NO) == OK) {
                    mapc_off(&mapc);
                    robart.x = newx;
                    robart.y = newy;
                    mouse_off();
```

```
                        restore_robart(savebuf);
                        savebuf = save_robart(map_ptr, robart.x, robart.y);
                        draw_robart(map_ptr, robart.x, robart.y);

                        robart.dir = force360(robart.dir);
                        sprintf(prompt, "Enter Robart's heading [%d] --> ", robart.
dir);
                        Clear_Line(25);
                        if (rawggets(str, prompt, "", 0, 0, WHITE, BLACK) != NULL)
{
                            if (str[0])
                                    robart.dir = force360(atoi(str));
                        }
                        robotx = robart.x * map_ptr->squaresize * 10L;
                        roboty = robart.y * map_ptr->squaresize * 10L;
                        robothdg = robart.dir * 100L;
                        mouse_on();
                        mapc_on(&mapc);
                    }
                    else {
                            mouse_off();
                            restore_robart(savebuf);
                            savebuf = save_robart(map_ptr, robart.x, robart.y);
                            draw_robart(map_ptr, robart.x, robart.y);
                            mouse_on();
                    }
                    mouse_off();
                    mapc_off(&mapc);
                    Clear_Line(1);
            }
            else if (selection == 508) {
                    debug ^= 1;
            }


            if (event_occurred) {           /* if an event occurred, clean up scree
n */
                gpmerge(MRPL);
                gpviewport(0,0, gdmaxcol, gdmaxrow);
                pmenu = RegisterMenu(pp_menu_bar);
                draw_menu(pmenu);
                ix = robart.x * map_ptr->squaresize;
                iy = robart.y * map_ptr->squaresize;
                text_foreground(WHITE);
                text_background(BLACK);
                all_coords(str, robart.x, robart.y, map_ptr);
                PutString(25,1, str);

                restore_robart(savebuf);
                savebuf = save_robart(map_ptr, robart.x, robart.y);
                draw_robart(map_ptr, robart.x, robart.y);

                mouse_on();
                mapc_on(&mapc);
            }
        }
        restore_robart(savebuf);

        x_command(X_SONAR, 0);                  /* turn sonar array off */
        waitms(100);
        x_command(X_SONAR, 0);                  /* turn sonar array off */
        mapc_deinit(&mapc);
        close_menu(pmenu);
        gpviewport(0,0, gdmaxcol, gdmaxrow);
        return (TRUE);
}



/* make_estimation_path - build an estimation path to follow for creating
 *      a PE database.
 */
make_estimation_path(map_ptr)
```

Apr 16 1991 10:13:07 pe.c Page 21

```
map *map_ptr;
{
        get_manual_path(map_ptr, inflect_pts, 200);
        return (OK);
}


/* get_pe_signature - get a sonar signature for the current position and
 *      stuff it into the PE array.
 */
get_pe_signature(map_ptr)
map *map_ptr;
{
        byte    pESonars[PE_SONAR_NUM], tsonars[PE_SONAR_NUM];
        int     s;
        int     pex, pey;
        packet  rec;
        static byte param[] = {2, '1', 'C', '\0'};

        waitms(55);             /* wait for slow 6502 */

        /* Dump the previous PE Sonar and Dead Reck. info */
        if (!Get_Packet(&rec, PES_PTYPE, param, FALSE)) {
                mouse_off();
                Clear_Line(25);
                PutString(25,1, "Couldn't get sonar packet -->");
                mgetkey();
                Clear_Line(25);
                mouse_on();
                return (-1);
        }

        /* Get the current PE Sonar and Dead Reck. info */
        if (get_avg_pe_sig(pESonars) == ERROR) {
                mouse_off();
                Clear_Line(25);
                PutString(25,1, "Couldn't get sonar packet -->");
                mgetkey();
                Clear_Line(25);
                mouse_on();
                return (-1);
        }

        if (robart.dir != 0) {          /* have to skew the data around */
                RotateSonarData(robart.dir/PE_SON_SPACING, pESonars, tsonars);
                for (s = 0; s < PE_SONAR_NUM; s++)
                        pESonars[s] = tsonars[s];
        }
        /* Enter range returns into the internal PE database. */
        pex = robart.x / (12 / map_ptr->squaresize);
        pey = robart.y / (12 / map_ptr->squaresize);
        for(s=0;s<PE_SONAR_NUM;s++) {
                pEAccess(map_ptr, pex, pey, s) = pESonars[s];
                if (debug) {
                        debug_out("%02x ", pESonars[s]);
                }
        }
        mouse_off();
        /* Let the user know that the database location has been updated. */
        ScalePoint(map_ptr, robart.x, robart.y, WHITE);
        mouse_on();
        return (OK);
}
```

METHOD AND SYSTEM FOR FUSING DATA FROM FIXED AND MOBILE SECURITY SENSORS

NAVY CASE NO. 72775

INVENTORS: HOBART R. EVERETT
GARY A. GILBREATH

APPENDIX 2

```
;
;
;
;         FILENAME:  rf33                    6 December 1990
;
;         ROBART Operating System
;
;         Modified for new Module 12 ROM                3 January 89
;         Modified for Module 12 RF upgrade            12 December 89
;         Modified to read commands via COM2           20 December 89
;         Wander routine merged                        22 December 89
;         Library Module 14 split off                  30 January 90
;
;         This code runs on CPU #1  (SCHEDULER)
;
;
            .ba $0
            .os
            .ce
start       .ds 1
stop        .ds 1
rng.lo1     .ds 13
rng.hi1     .ds 13
rng.lo2     .ds 13
rng.hi2     .ds 13
feet        .ds 1
inches      .ds 1
in/10       .ds 1
max.rng     .ds 1
DD          .ds 1
Z           .ds 1
temp        .ds 1
char        .ds 1
mask        .ds 1
portsv      .ds 1
fault       .ds 1
pass        .ds 1
prv.err     .ds 1
ty.flg      .ds 1
zone        .ds 1
mux.flg     .ds 1
col.sta     .ds 1
fol.sta     .ds 1
diff        .ds 1
cf          .ds 1
tol         .ds 1
tol.hi      .ds 1
nearest     .ds 1
near        .ds 1
near.hi     .ds 1
drv.cmd     .ds 1
hd.pos      .ds 1
trk.flg     .ds 1
Vx          .ds 1
Vy          .ds 1
theta.l     .ds 1
```

```
theta.h    .ds 1
UT         .ds 1
LT         .ds 1
carry      .ds 1
crc.hi     .ds 1
crc.lo     .ds 1
buffer     .ds 2
int.flg    .ds 1
mw.flg     .ds 1
us.flg     .ds 1
ir.flg     .ds 1
op.flg     .ds 1
dh.flg     .ds 1
vb.flg     .ds 1
cmp.thr    .ds 1
buf.ind    .ds 1
dh.thr     .ds 1
veloc      .ds 1
displ      .ds 1
hours      .ds 1
minutes    .ds 1
seconds    .ds 1
cur.mod    .ds 1
sys.flg    .ds 1
max.spd    .ds 1
rch.flg    .ds 1
cf.add     .ds 1
cf.sub     .ds 1
dh.brg     .ds 1
prv.brg    .ds 1
count      .ds 1
dih.flg    .ds 1
index      .ds 1
CF         .ds 1
wan.flg    .ds 1
res.reg    .ds 1
max.saf    .ds 1
avg.vel    .ds 1
LED        .ds 1
;
scr3       .de $a633
;
           .ba $7e00
in.buf     .ds 256
out.buf    .ds 256
;
           .ba $800
;
t2clo      .de $a008
t2chi      .de $a009
ifr2       .de $a00d
ddra1      .de $a003
ora1       .de $a001
ddrb1      .de $a002
orb1       .de $a000
ddra2      .de $a803
ora2       .de $a801
```

```
ddrb2       .de $a802
orb2        .de $a800
ddra3       .de $ac03
ora3        .de $ac01
ddrb3       .de $ac02
orb3        .de $ac00
ddra4       .de $a401
ora4        .de $a400
orb4        .de $a402
PCR2        .de $a80c
irq.vec     .de $a678
IER2        .de $a80e
IFR2        .de $a80d
techo       .de $a653
toutfl      .de $a654
;
inchr       .de $8a1b
inbyt       .de $81d9
ascnib      .de $8275
outbyt      .de $82fa
nibasc      .de $8309
crlf        .de $834d
comma       .de $833a
space       .de $8342
outchr      .de $8a47
nbasoc      .de $8a44
;
;
;           Library Module 11 Subroutines
;
replay      .de $c0e1
cpu3        .de $c139
cpu4        .de $c13f
vox0        .de $c169
vox1        .de $c16e
vox2        .de $c173
vox3        .de $c178
vox4        .de $c17d
vox         .de $c17f
mode        .de $c19d
ld.time     .de $c1ac
wait.5      .de $c1f2
delay.5     .de $c1f5
delay1      .de $c1fa
delay2      .de $c1ff
delay3      .de $c204
wait1       .de $c213
wait2       .de $c218
wait3       .de $c21d
delay       .de $c230
if.on       .de $c283
cpu4.on     .de $c2ab
cpu4.off    .de $c2d5
posit       .de $c34b
scan        .de $c355
center      .de $c367
drive       .de $c36d
```

```
home        .de $c3e8
halt        .de $c3f1
hndshk3     .de $c3fa
set.son     .de $c451
disply      .de $c45d
son.one     .de $c464
sel.chk     .de $c476
sel.dis     .de $c482
select2     .de $c4cc
tmp.chk     .de $c505
rm.tmp      .de $c515
sys.tmp     .de $c522
a/d         .de $c534
rel.hum     .de $c54b
nib.rt      .de $c55a
nib.lf      .de $c55f
sel.tes     .de $c564
sir.on      .de $c5c6
sir.off     .de $c5ce
thank       .de $c5d7
intrude     .de $c5e7
bat.vol     .de $c628
greet       .de $c65e
qstart      .de $c664
sht.dwn     .de $c683
drv.chk     .de $c6ab
stp.chk     .de $c6b8
pow.chk     .de $c6f1
stp.tst     .de $c72d
delchk<     .de $c76c
delchk>     .de $c784
rs232       .de $c79c
initial     .de $c7bc
;
;
;           Library Module 12 Subroutines
;
dmp.pak     .de $c800
buf.byt     .de $c816
son.scl     .de $c82c
son.pak     .de $c894
inpak       .de $c8df
zer.buf     .de $c8fe
hex.bcd     .de $c9b2
rd.buf      .de $ca31
new.son     .de $cbe9
sec.pow     .de $cdec
outpak      .de $ce39
survey      .de $ce51
new.cmd     .de $ce9f
son.cmd     .de $ced5
;
;
;           Library Module 13 Subroutines
;
sonar       .de $d000
H.parse     .de $d00d
```

```
T.parse     .de $d045
sys.pow     .de $d08b
son.pow     .de $d09a
vox.pow     .de $d0a8
vox.off     .de $d0b2
col.arr     .de $d0b8
report1     .de $d0d1
;report3 .de $d0ec
recharge    .de $d10c
exit        .de $d178
drv.fwd     .de $d2e4
bkn.rng     .de $d2ff
set.cf      .de $d39b
off.rt      .de $d3df
off.lf      .de $d409
follow      .de $d431
flush       .de $d623
;
;       Library Module 14 Subroutines
siren       .de $d800
camera      .de $d813
report9     .de $d826
report7     .de $d864
V.parse     .de $d87f
R.parse     .de $d8dc
M.parse     .de $d917
dr.diag     .de $d9a5
get.pak     .de $da21
ir.on       .de $da58
rd.lf       .de $da6f
rd.rt       .de $da75
prx.hit     .de $da7b
prx.all     .de $da90
son.flg     .de $daea
prx.flg     .de $db13
avoid       .de $dbec
restore     .de $dc60
govern      .de $dcac
rotate      .de $ddc7
Q.parse     .de $de29
;
;
;
;       Main Code
;
boot           jsr initial
               jsr robart
               rts
;
robart
               lda #$ff
               sta start
               sta stop
               lda #$00
               sta techo      ;turn off echo
               sta wan.flg    ;initialize "wander" mode off
rob.1          jsr parser     ;parse incoming commands
```

```
                jmp rob.1
                lda #$80      ;turn echo back on
                sta techo
                rts
;
parser          jsr get.pak   ;wait for next packet
                ldx #0        ;check packet ID
                lda in.buf,X
                cmp #'0       ;robot command?
                beq prs.chk
                jmp prs.ret   ;change this later
prs.chk         ldx #1        ;check first parameter
                lda in.buf,X
C               cmp #'C       ;Calibrate command?
                bne D
                jsr C.parse
                jmp prs.ret
D               cmp #'D       ;Diagnostic command?
                bne F
                jsr diagnos
                jsr dgn.rpt   ;send report
                jmp prs.ret
F               cmp #'F       ;Follow command?
                bne H
                jsr follow
                jmp prs.ret
H               cmp #'H       ;Head Positon?
                bne M
                jsr H.parse
                jmp prs.ret
M               cmp #'M       ;Move command?
                bne Q
                jsr M.parse
                jmp prs.ret
Q               cmp #'Q       ;Query?
                bne R
                jsr Q.parse
                jmp prs.ret
R               cmp #'R       ;Report request?
                bne S
                jsr R.parse
                jmp prs.ret
S               cmp #'S       ;Security Assessment?
                bne T
                jsr S.parse
                jmp prs.ret
T               cmp #'T       ;Time Set command?
                bne V
                jsr wait2
                jsr T.parse
                jsr vox.off   ;power down speech
                jmp prs.ret
V               cmp #'V       ;VOX command?
                bne W
                jsr V.parse
                jmp prs.ret
W               cmp #'W       ;Wander command?
```

```
                bne X
                jsr W.parse  ;interpret the W command
                jmp prs.ret
X               cmp #'X      ;is it an Execute command?
                bne err      ;else report error
                jsr X.parse  ;interpret the X command
                jmp prs.ret
err             jsr cmd.err
prs.ret         rts
;
C.parse         ldx #2
                jsr rd.buf   ;next parameter
                cmp #$00     ;calibrate?
                bne C1
                jsr calib    ;wall docking maneuver
                jmp C.ret
C1              cmp #$01     ;undock?
                bne C2
                jsr undock
                jmp C.ret
C2              cmp #$02     ;beacon recharge?
                bne C3
                jsr recharge
                jmp C.ret
C3              jsr cmd.err
C.ret           rts
;
cmd.err         ldx #$14     ;'command'
                jsr vox3
                ldx #$51     ;'error'
                jsr vox1
                ldx #$ff
echo.lp         inx
                lda in.buf,X
                sta out.buf,X
                cmp #$0d     ;CR?
                bne echo.lp
                jsr outpak   ;send back to Host
                rts
;
S.parse         ldx #2
                jsr vox.off  ;turn off speech
                jsr delay
                jsr survey   ;Security Assessment mode
                rts
;
W.parse         ldx #2       ;check second parameter
                jsr rd.buf
                sta temp     ;save temporarily
                lda temp
                beq wp.2     ;branch if "disable" command
wp.1            lda wan.flg  ;"wander" mode already set?
                bne wp.2     ;if so, don't call again
                lda temp     ;else recall command
                sta wan.flg  ;save in flag
                jsr wander   ;activate "wander" mode
                jmp wp.ret
```

```
wp.2        lda temp       ;recall new command
            sta wan.flg    ;and load into flag
wp.ret      rts
;
X.parse     ldx #2
            jsr rd.buf     ;check next parameter
X0          cmp #$00       ;system power?
            bne X1
            jsr sys.pow
            jmp X.ret
X1          cmp #$01       ;siren?
            bne X2
            jsr siren
            jmp X.ret
X2          cmp #$02       ;camera?
            bne X3
            jsr camera
            jmp X.ret
X3          cmp #$03       ;security sensors?
            bne X4
            jsr sec.pow
X4          cmp #$04       ;sonar power?
            bne X5
            jsr son.pow
            jmp X.ret
X5          cmp #$05       ;speech power?
            bne X6
            jsr vox.pow
            jmp X.ret
X6          cmp #$06       ;collision array output?
            bne X7
            jsr col.arr
            jmp X.ret
X7          cmp #$07       ;speed governing?
            bne X8
            jsr gov.dis
            jmp X.ret
X8
X.ret       rts
;
gov.dis     lda sys.flg
            and #$fd       ;clear speed governing bit
            sta sys.flg
            rts
;
wander
            jsr center
            lda sys.flg
            ora #$02       ;default speed governing on
            sta sys.flg
            lda #$00
            sta drv.cmd    ;clear drive command register
            lda veloc
            sta max.spd    ;initialize maximum speed
            lda #$03
            sta mux.flg
            lda #$29       ;turn on sonars 2-9
```

```
                jsr son.cmd
w.0             jsr hndshk3  ;throw away any old sonar data
                jsr flush    ;flush the sonar buffer
w.1             jsr new.cmd  ;check for a new command (RTS)
                bmi w.2      ;branch if no command waiting
                jsr parser   ;else read new command
w.2             lda wan.flg  ;recall wander flag
                beq wan.ret  ;exit if disabled
                lda cur.mod  ;recall current mode
                bne w.0      ;branch unless mode 00 (forward)
                jsr new.son  ;new sonar data?
                bmi w.3      ;branch if none
                jsr hndshk3  ;read in data
                jsr son.scl  ;scale to 1 byte
                jsr govern   ;govern speed
w.3             jsr son.flg  ;set sonar collision flags
                jsr prx.flg  ;set proximity collision flags
                lda col.sta  ;recall collision status register
                bne w.4      ;branch if hit
                jsr seek     ;check for seek mode
                jmp w.1
w.4             lda wan.flg
                and #$0f     ;clear seek mode
                sta wan.flg
                jsr avoid    ;avoid obstructions
                jsr restore  ;restore straight-line motion
                jmp w.0      ;loop
wan.ret         lda #$ff     ;turn off sonars
                jsr son.cmd
                jsr delay.5
                jsr hndshk3
                rts
;
calib           jsr apprch   ;approach the calibration station
                jsr align    ;align with receiver
                jsr sid.rng  ;report ranges to left and right
                rts
;
apprch          lda #$18
                jsr son.cmd  ;sonar 8
                lda #$03
                sta mux.flg  ;set flag for MUX 3
                lda #$00
                sta drv.cmd  ;initialize drive command flag
                jsr hndshk3  ;throw away any old data
                jsr center   ;center head
                jsr delay1
                jsr hndshk3  ;read in new data
                jsr chk.rng  ;ensure within acceptance range
                jsr error?
                beq app.hlt  ;branch if error
app1            jsr hndshk3  ;read data
                ldx #$08     ;read middle sensor
                lda rng.hi1,X
                beq app2
                lda #$33
                jsr drv.fwd  ;move forward
```

```
                jmp app1
app2            jsr chk.blk   ;check for blockage
                jsr error?
                beq app.hlt   ;stop on error
                lda #$88      ;reset sonar
                jsr son.cmd
                jsr delay
                lda #$22
                jsr drv.fwd
                jsr delay.5
app3            jsr hndshk3   ;look for new sonar data
                ldx #$08
                lda rng.lo1,X
                cmp #$C0
                bcs app3      ;branch if range less than threshold
                jmp app.ret
app.hlt         jsr halt
app.ret         rts
;
error?          lda out.buf+1
                cmp #'E       ;error?
                rts
;
chk.rng         jsr zer.buf   ;zero output buffer
                lda rng.hi1+8
                cmp #$02      ;check within max allowed range
                bcc cr.ret    ;branch if less
                lda #$01      ;error code for excess range
                jsr err.cd
cr.ret          rts
;
chk.blk         jsr zer.buf   ;zero output buffer
                lda rng.hi1+1
                beq cb.ret    ;branch if clear
                lda #$02      ;error code for blockage
                jsr err.cd
cb.ret          rts
;
align           jsr error?
                beq al.hlt    ;branch if previous error
                jsr ir.chk    ;check IR sensor alignment
                jsr error?
                beq al.hlt    ;branch if IR error
                lda #$11
                jsr drv.fwd
lf.bmp          ldx #$60
                jsr sel.chk   ;check for impact
                bvs rt.bmp    ;branch no hit
                lda drv.cmd   ;recall drv.cmd
                and #$01      ;stop left motor
                jsr drv.fwd
rt.bmp          ldx #$61
                jsr sel.chk   ;check for impact
                bvs chk.stp   ;branch no hit
                lda drv.cmd
                and #$10      ;stop right motor
                jsr drv.fwd
```

```
chk.stp   lda drv.cmd   ;both motors stopped?
          bne lf.bmp    ;loop if not
          lda #$01
          jsr mode
          lda #$11
          jsr cpu4
          jsr delay1    ;back up slightly
          jsr halt
          jsr delay1
          lda #$11
          jsr drv.fwd
          jsr delay2    ;and pull forward again
          jsr halt
          jsr cpu4.off
al.hlt    jsr halt
          jsr delay1
          rts
;
ir.chk    jsr zer.buf
          lda #$11
          jsr drv.fwd
irc.0     jsr prx.all   ;all scanners hit?
          bcc irc.go    ;branch if all hit
          jsr prx.hit   ;any hit?
          bcs irc.hlt   ;branch if no hits
          jsr rd.lf     ;check left scanner
          bvc rt.prx    ;branch if hit
          lda drv.cmd
          and #$f0      ;stop stbd motor
          jsr drv.fwd
rt.prx    jsr rd.rt     ;check right scanner
          bvc irc.1     ;branch if hit
          lda drv.cmd
          and #$0f      ;stop port motor
          jsr drv.fwd
irc.1     lda drv.cmd
          jsr outbyt
          jsr space
          bne irc.0     ;loop if not stopped
irc.hlt   jsr halt
          lda #$03      ;error code for IR confirm
          jsr err.cd    ;send error message
          jmp irc.ret
irc.go    lda #$11
          jsr drv.fwd
irc.ret   rts
;
err.cd    ldx #$02
          jsr buf.byt
          lda #'9
          sta out.buf
          lda #'E       ;error
          sta out.buf+1
          ldx #4
          lda #$0d
          sta out.buf,X
          jsr outpak    ;send error packet
```

```
                rts
;
undock          jsr cpu4.on
                jsr delay
                ldx #4          ;second parameter
                jsr rd.buf
                and #$0f        ;limit to 15
                sta displ       ;set displacement
                lda #$06
                jsr mode
                lda displ       ;recall specified distance
                jsr cpu4        ;pass to drive controller
                jsr delay
                lda #$01        ;reverse
                jsr mode
                lda #$11
                jsr cpu4
                jsr delay1      ;wait for motion to start
ud.1            ldx #$2d        ;check drive motion verify
                jsr sel.chk
                bvs ud.1        ;branch if high (still moving)
                lda #$01
                sta cur.mod
                lda #$11
                sta veloc
                jsr report9
ud.ret          rts
;
sid.rng         jsr error?
                beq sr.ret      ;branch if previous error
                lda #$00        ;set MUX flag for 1&2
                sta mux.flg
                lda #$02
                jsr son.cmd     ;set up NAV array
                lda #$01
                sta start       ;reset start index
                jsr hndshk3     ;throw away old data
                jsr delay.5
                jsr hndshk3     ;get ranges
                jsr zer.buf     ;zero output buffer
                lda #'9
                sta out.buf
                ldx #$01
                lda #'C
                sta out.buf,X
                inx
                lda rng.hi2+2           ;high byte left side
                jsr buf.byt
                lda rng.lo2+2           ;low byte left side
                jsr buf.byt
                lda rng.hi1+2           ;high byte right side
                jsr buf.byt
                lda rng.lo1+2           ;low byte right side
                jsr buf.byt
                lda #$0d
                sta out.buf,X
                jsr outpak
```

```
sr.ret      rts
;
dish        jsr ir.on      ;energize I/R circuitry
            ldx #$ff       ;head 90 deg left
            stx count
            jsr posit
            jsr delay3     ;wait to position
look1       lda count
            tax
            jsr posit
            jsr delay
            jsr ir.rng
            jsr crlf
            dec count
            bne look1
            rts
;
ir.rng      lda #$0
            sta LED        ;holds number of LEDs, - 1, which emit
loop1       asl LED
            asl LED
            lda ora3       ;get port to set PA2 & PA3
            and #$f3       ;mask for pins 3 and 4
            ora LED        ;set how many to emit (less one)
            sta ora3       ;fire!
            lsr LED
            lsr LED
            ldy #$ff       ;this is for a delay
loop2       ldx #$7f       ;read selector 7 pin 12
loop3       jsr sel.chk    ;checks the selector
            bvc out.res    ;branch if low to output results
            dex
            cpx #$7b       ;up to four detectors could have detected
            bne loop3
            dey
            bne loop2      ;check all four detectors each loop
            inc LED        ;fire another LED
            lda #$4
            cmp LED
            bne loop1
            dec LED        ;make it back to a 4
out.res     inc LED        ;actual number of LEDs fired
            asl LED
            asl LED
            asl LED
            asl LED        ;shift to upper nibble
            txa
            cmp #$80       ;now get number that detected
            beq out.1
            sec
            sbc #$7b       ;how many LEDs detected
            jmp out.2
out.1       lda #$00
out.2       ora LED        ;put number that detect in lower nibble
            jsr outbyt
            lda ora3
            and #$f3
```

```
                sta ora3
                rts
;
fire1           lda ora3
                and #$f3       ;fire 1 LED only
                sta ora3
                ldx #$7c
                jsr sel.chk    ;check for threshold 1
                rts
;
stub            jsr inbyt
                sta wan.flg
                rts
;
seek            lda wan.flg    ;recall reflexive command
                and #$f0       ;upper nibble
                cmp #$10       ;seek left?
                beq seek.lf
                cmp #$20       ;seek right?
                beq seek.rt
                jmp sk.ret     ;else skip
seek.rt         ldx #$20
                jsr posit
                jmp sl.1
seek.lf         ldx #$e0
                jsr posit
sk.1            jsr ir.on      ;activate LED array
                lda #$00
                sta drv.cmd
                jsr delay2
                lda #$44
                jsr drv.fwd
sk.2            jsr delay
                jsr fire1
                bvc sk.2       ;branch if wall present
                jsr center     ;center head
                lda #$02       ;set raw CF
                jsr set.cf
                lda wan.flg    ;recall direction
                and #$f0
                cmp #$10       ;left?
                beq alt.lf
alt.rt          lda #$33
                jsr off.rt     ;alter course to right
                jmp sk.3
alt.lf          lda #$33
                jsr off.lf     ;alter course to left
sk.3            lda #$b0       ;loop delay
                sta count
                jsr sk.loop    ;check for hits or new command
                jsr halt
sk.ret          rts
;
sk.loop         jsr new.cmd    ;new command waiting?
                bpl sl.ret     ;exit
                jsr new.son    ;new sonar data?
                bmi sl.1       ;branch if none
```

```
                  jsr hndshk3   ;read in data
                  jsr son.scl   ;scale it
      sl.1        jsr son.flg   ;set sonar collision flags
                  jsr prx.flg   ;set proximity flags
                  lda col.sta   ;any hits?
                  bne sl.ret    ;kick out if any hits
                  jsr delay     ;loop delay
                  dec count
                  bne sk.loop
      sl.ret      rts
      ;
      compass
                  jsr zer.buf   ;zero buffer
                  lda #'6       ;packet ID
                  sta out.buf
                  ldx #$08      ;Vx
                  jsr a/d
                  jsr outbyt
                  ldx #1
                  jsr buf.byt
                  ldx #$09      ;Vy
                  jsr a/d
                  jsr outbyt
                  ldx #3
                  jsr buf.byt
                  ldx #$0a      ;Vref
                  jsr a/d
                  jsr outbyt
                  ldx #5
                  jsr buf.byt
                  lda #$0d      ;CR
                  sta out.buf,X
                  jsr outpak    ;send the packet
                  jsr delay.5
                  jsr crlf
                  jmp compass
      ;
      report3     jsr zer.buf
                  lda #'3       ;packet ID
                  sta out.buf
                  ldx #3
                  jsr rd.buf    ;get sonar command parameter
                  and #$0f      ;ensure start = 0
                  jsr outbyt
                  jsr son.cmd   ;send to CPU #3
                  jsr sonar     ;scale, buffer, and send
                  rts
      ;
      look        jsr son.off   ;turn off sonars
                  jsr crlf
                  jsr crlf
                  ldx #$ef      ;head left
                  jsr posit
                  jsr delay
                  ldx #$49      ;'check'
                  jsr voxl
                  ldx #$63      ;'left'
```

```
                jsr vox1
                jsr delay
                lda #$11
                jsr son.cmd
                jsr delay
                jsr bkn.rng
                jsr center
                ldx #$49      ;'check'
                jsr vox1
                ldx #$33      ;'forward'
                jsr vox2
                jsr bkn.rng
                ldx #$10      ;head right
                jsr posit
                ldx #$49      ;'check'
                jsr vox1
                ldx #$80      ;'right'
                jsr vox1
                jsr bkn.rng
                jsr center
                jsr wait.5
                jsr crlf
                jsr crlf
                rts
;
dgn.rpt         jsr zer.buf
                lda #'9       ;response ID
                sta out.buf
                lda #'D
                sta out.buf+1
                ldx #2
                lda #$0d      ;CR
                sta out.buf,X
                jsr outpak
                rts
;
son.off         lda #$ee      ;sonar off
                jsr son.cmd
                jsr delay
                jsr hndshk3   ;flush
                rts
;
diagnos         jsr son.off
                ldx #$0b      ;'system checks to start in 5 seconds'
                jsr vox4
                jsr wait2
                ldx #$23      ;'this is a demonstration program'
                jsr vox4
                jsr wait1
                jsr select2   ;test switch positions
                jsr wait1
                jsr bat.vol   ;announce battery voltage
                jsr sel.tes   ;test data selectors
                jsr wait1
                jsr tmp.chk   ;announce room temp and system temp
                jsr rel.hum   ;'RH...percent'
                jsr wait3
```

```
                ldx #$1a        ;'barometric pressure ...'
                jsr vox4
                jsr wait1
                jsr scan        ;scan head
                jsr delay1
                lda #$0c        ;fire sonars 1 through 12
                jsr son.cmd
                jsr delay1
                jsr hndshk3
                jsr disply      ;display sonar ranges
                jsr crlf
                jsr look        ;check left, center, right
                jsr wait1
                jsr stp.tst     ;test emergency stop system
                jsr wait2
                ldx #$07        ;'close and lock entry doors'
                jsr vox4
                jsr wait2
                jsr drv.dgn     ;drive diagnostics
                jsr wait1
                jsr bat.vol
                jsr wait1
                ldx #$05
                jsr vox4        ;'it's (time)'
                jsr wait1
                ldx #$0f        ;'all test points in correct range'
                jsr vox4
                rts
;
drv.dgn         jsr pow.chk     ;do drive diagnostics
                jsr stp.chk
                ldx #$37        ;beep beep
                jsr vox4
                jsr wait1
                jsr rt.45
                jsr moving
                jsr delay.5
                jsr lf.90
                jsr moving
                jsr delay.5
                jsr rt.45
                jsr moving
                rts
;
moving          ldy #$15        ;loop counter
mvg1            jsr delay
                dey
                beq mvg3
                ldx #$2d        ;drive motion verify
                jsr sel.chk
                bvc mvg1        ;branch low (not moving)
                jsr delay
mvg2            ldx #$2d
                jsr sel.chk
                bvs mvg2        ;branch if still moving
                sec :           ;moved
                jmp mvg.ret
```

```
mvg3        clc  ;didn't move
mvg.ret     rts
;
rt.45       ldx #$45      ;'45'
            jsr vox0
            ldx #$4d      ;'degree'
            jsr vox1
            ldx #$81      ;'-s'
            jsr vox1
            ldx #$80      ;'right'
            jsr vox1
            lda #$06
            jsr mode
            lda #45       ;45 degrees
            jsr cpu4
            jsr delay
            lda #$03      ;right turn
            jsr mode
            lda #$11      ;speed $11
            jsr cpu4
            rts
;
lf.90       ldx #$90      ;'90'
            jsr vox0
            ldx #$4d      ;'degree'
            jsr vox1
            ldx #$81      ;'-s'
            jsr vox1
            ldx #$63      ;'left'
            jsr vox1
            lda #$06
            jsr mode
            lda #90       ;90 degrees
            jsr cpu4
            jsr delay
            lda #$02      ;left turn
            jsr mode
            lda #$11      ;speed $11
            jsr cpu4
            rts
;
            .en
//

>
```

```
^M
0005 ;
0010 ;
0015 ;
0020 ;      FILENAME:  mod1114                        27 April 1989
0025 ;
0030 ;    Library Module 11    Revised EPROM Version      2 June 87
0035 ;
0040 ;      This code runs on CPU #1 (Scheduler)
0045 ;
0050 ;
0055                .ba $0
0060                .os
0065 ;
0070 start      .ds 1
0075 stop       .ds 1
0080 rng.lo1    .ds 13
0085 rng.hi1    .ds 13
0090 rng.lo2    .ds 13
0095 rng.hi2    .ds 13
0100 feet       .ds 1
0105 inches     .ds 1
0110 in/10      .ds 1
0115 max.rng    .ds 1
0120 D          .ds 1
0125 Z          .ds 1
0130 temp       .ds 1
0135 char       .ds 1
0140 mask       .ds 1
0145 portsv     .ds 1
0150 fault      .ds 1
0155 pass       .ds 1
0160 prv.err    .ds 1
0165 ty.flg     .ds 1
0170 zone       .ds 1
0175 mux.flg    .ds 1
0180 ;
0185            .ba $c000      ;for EPROM #1
0190            .mc $7000      ;save code at $7000 for EPROM burner
0195 ;
0200 t2clo      .de $a008
0205 t2chl      .de $a009
0210 ifr2       .de $a00d
0215 ddra1      .de $a003
0220 ora1       .de $a001
0225 ddrb1      .de $a002
0230 orb1       .de $a000
0235 ddra2      .de $a803
0240 ora2       .de $a801
0245 ddrb2      .de $a802
0250 orb2       .de $a800
0255 ddra3      .de $ac03
0260 ora3       .de $ac01
0265 ddrb3      .de $ac02
0270 orb3       .de $ac00
0275 ddra4      .de $a401
0280 ora4       .de $a400
0285 ;
0290 PCR2       .de $a80c
0295 irq.vec    .de $a678
0300 IER2       .de $a80e
0305 IFR2       .de $a80d
0310 toutfl     .de $a654
0315 inchr      .de $8a1b
0320 inbyt      .de $81d9
0325 outbyt     .de $82fa
0330 crlf       .de $834d
0335 comma      .de $833a
0340 space      .de $8342
0345 outchr     .de $8a47
0350 nbasoc     .de $8a44
0355 ;
0360 son.rng1   ldx #$00       ;initialize table pointer to zero
```

```
0365 nexdig1    lda #$00       ;initialize digit count to zero
0370            sta feet,X
0375 sub1       lda rng.lo1,Y        ;fetch lower sonar range value
0380            sec :          ;subtract lower byte (table value)
0385            sbc sbtbl,X
0390            sta rng.lo1,Y        ;return result to memory
0395            lda rng.hi1,Y        ;fetch upper sonar range value
0400            sbc #00        ;subtract upper byte (zero)
0405            bcc adback1    ;if result negative, add back lower byte
0410            sta rng.hi1,Y        ;else store
0415            sed :          ;set decimal mode
0420            lda feet,X
0425            clc
0430            adc #01        ;increment digit count
0435            sta feet,X
0440            cld :          ;clear decimal mode
0445            jmp sub1       ;loop and subtract table value again
0450 ;
0455 adback1    lda rng.lo1,Y        ;fetch lower value of sonar range
0460            adc sbtbl,X    ;add back lsby of table value
0465            sta rng.lo1,Y
0470            inx :          ;point to next table value
0475            cpx #02        ;end of table?
0480            bcc nexdig1    ;no, continue with next digit weight
0485            lda rng.lo1,Y        ;else put remainder in accumulator
0490            sta feet,X     ;store remainder (tenths of inches)
0495            jsr rng.out
0500            rts
0505 ;
0510 son.rng2   ldx #$00       ;initialize table pointer to zero
0515 nexdig2    lda #$00       ;initialize digit count to zero
0520            sta feet,X
0525 sub2       lda rng.lo2,Y        ;fetch lower sonar range value
0530            sec :          ;subtract lower byte (table value)
0535            sbc sbtbl,X
0540            sta rng.lo2,Y        ;return result to memory
0545            lda rng.hi2,Y        ;fetch upper sonar range value
0550            sbc #00        ;subtract upper byte (zero)
0555            bcc adback2    ;if result negative, add back lower byte
0560            sta rng.hi2,Y        ;else store
0565            sed :          ;set decimal mode
0570            lda feet,X
0575            clc
0580            adc #01        ;increment digit count
0585            sta feet,X
0590            cld :          ;clear decimal mode
0595            jmp sub2       ;loop and subtract table value again
0600 ;
0605 adback2    lda rng.lo2,Y        ;fetch lower value of sonar range
0610            adc sbtbl,X    ;add back lsby of table value
0615            sta rng.lo2,Y
0620            inx :          ;point to next table value
0625            cpx #02        ;end of table?
0630            bcc nexdig2    ;no, continue with next digit weight
0635            lda rng.lo2,Y        ;else put remainder in accumulator
0640            sta feet,X     ;store remainder (tenths of inches)
0645            jsr rng.out
0650            rts
0655 ;
0660 sbtbl      .by 120 10
0665 ;
0670 rng.out    jsr space
0675            jsr space
0680            jsr space
0685            jsr space
0690            jsr space
0695            lda feet
0700            jsr outbyt
0705            jsr space
0710            lda #'f
0715            jsr outchr
0720            lda #'t
0725            jsr outchr
```

Apr 18 1991 11:56:36 mod11l4.asm Page 3

```
0730           jsr space
0735           jsr space
0740           lda inches
0745           jsr outbyt
0750           lda #'.
0755           jsr outchr
0760           lda in/10
0765           jsr nbasoc
0770           jsr space
0775           lda #'i
0780           jsr outchr
0785           lda #'n
0790           jsr outchr
0795           rts
0800  ;
0805  son.id   jsr crlf
0810           lda #'#
0815           jsr outchr
0820           tya :          ;Y is sonar device index
0825           jsr outbyt     ;print device number
0830           jsr space      ;space over
0835           jsr space
0840           jsr space
0845           rts
0850  ;
0855  replay   jsr crlf
0860           ldy start
0865  repl     jsr son.id
0870           jsr son.reg
0875           jsr son.rng1
0880           jsr son.rng2
0885           iny
0890           cpy stop
0895           bcc repl
0900           beq repl
0905           rts
0910  ;
0915  son.reg  lda rng.hi1,Y
0920           jsr outbyt
0925           lda rng.lo1,Y
0930           jsr outbyt
0935           jsr space
0940           jsr space
0945           lda rng.hi2,Y
0950           jsr outbyt
0955           lda rng.lo2,Y
0960           jsr outbyt
0965           rts
0970  ;
0975  son.com  jsr cpu3       ;set sonar command
0980           sta start      ;save starting index
0985           and #$0f       ;zero out upper nibble
0990           sta stop       ;save stop index
0995           lsr start
1000           lsr start
1005           lsr start
1010           lsr start
1015           rts
1020  ;
1025  cpu2     pha
1030           lda #$fe
1035           jmp cpu.out
1040  cpu3     pha
1045           lda #$fd
1050           jmp cpu.out
1055  cpu4     pha
1060           lda #$fb
1065           jmp cpu.out
1070  cpu5     pha
1075           lda #$f7
1080  cpu.out  sta temp       ;save latching value
1085           lda #$ff       ;ensure configured for output
1090           sta ddra4
```

Apr 18 1991 11:56:36 mod11l4.asm Page 4

```
1095           pla
1100           pha
1105           sta ora4       ;set A onto data bus
1110           lda orbl
1115           and temp       ;set appropriate latching bit low
1120           sta orbl
1125           nop :          ;delay for latching
1130  cpu.ret  lda orbl       ;ensure PB0 - PB3 are high
1135           ora #$0f
1140           sta orbl
1145           pla :          ;recover accumulator
1150           rts
1155  ;
1160  vox0     lda #$00       ;select mode zero
1165           jmp vox
1170  vox1     lda #$01       ;select mode one
1175           jmp vox
1180  vox2     lda #$02       ;select mode two
1185           jmp vox
1190  vox3     lda #$03       ;select mode three
1195           jmp vox
1200  vox4     lda #$04       ;select mode four
1205  vox      jsr busy?      ;wait if CPU #5 is busy
1210           jsr mode       ;set mode required
1215           txa
1220           jsr cpu5       ;put X onto the bus to CPU #5
1225           txa
1230           pha
1235           ldx #$20
1240  vox.lp   dex
1245           bne vox.lp
1250           pla
1255           tax
1260           rts
1265  ;
1270  busy?    pha
1275  bus      lda #$08       ;set mask for PA3 (CPU Busy)
1280           bit oral       ;see if CPU #5 is busy
1285           beq bus        ;loop if busy
1290           pla
1295           rts
1300  ;
1305  mode     sta temp       ;save desired mode
1310           lda oral
1315           and #$f8
1320           ora temp
1325           sta oral       ;set desired mode on bus
1330           rts
1335  ;
1340  ld.time  ldx #$06       ;select ld.time on vox4
1345           jsr vox4
1350           lda #'H
1355           jsr outchr
1360           lda #'?
1365           jsr outchr
1370           jsr inbyt      ;read hours from keyboard
1375           cmp #$0d       ;was it a carriage return?
1380           beq ld.ret
1385           tax
1390           jsr vox        ;send to CPU #5 to set 6526 clpck
1395           jsr crlf
1400           lda #'M
1405           jsr outchr
1410           lda #'?
1415           jsr outchr
1420           jsr inbyt      ;read minutes from keyboard
1425           tax
1430           jsr vox        ;send to CPU #5
1435           jsr crlf
1440           lda #'S
1445           jsr outchr
1450           lda #'?
1455           jsr outchr
```

```
                jsr inbyt       ;read seconds from keyboard
                tax
                jsr vox         ;send to CPU #5
ld.ret          jsr crlf
                rts
;
wait.5          jsr busy?
delay.5         ldx #$01
                jmp hf.sec
delay1          ldx #$01
                jmp sec.del
delay2          ldx #$02
                jmp sec.del
delay3          ldx #$03
                jmp sec.del
delay4          ldx #$04
                jmp sec.del
delay5          ldx #$05
                jmp sec.del
wait1           ldx #$01
                jmp wait
wait2           ldx #$02
                jmp wait
wait3           ldx #$03
                jmp wait
wait4           ldx #$04
                jmp wait
wait5           ldx #$05
wait            jsr busy?       ;loop until CPU #5 busy signal goes high
wt.lp           jsr sec.del
                rts
;
delay           lda #$ff
                sta t2clo
                lda #$ff
                sta t2chi
chkt1           lda #$20        ;set T2 interrupt mask
                bit ifr2
                beq chkt1
                lda t2clo       ;clear flag
                rts
;
sec.del         lda #13
                sta D
                jmp sec2
hf.sec          lda #$6
                sta D
sec2            jsr delay
                dec D
                bne sec2
                dex
                bne sec.del
                rts
;
;
cp5.pwr         jsr cpu5.on
                jsr delay
                lda #$08        ;busy is active low
                bit oral        ;test if busy low, if low, Z=0
                bne error       ;error if busy high
                jsr delay5      ;wait till end of sentence
                lda #$08
                bit oral        ;test if busy high
                bne pwr.ret     ;no error if busy high
error           lda #'E
                jsr outchr
                lda #'R
                jsr outchr
                jmp $b003
pwr.ret         rts
;
if.on           lda orbl
                and #$ef        ;pull PB4 low
```

```
                sta orbl
                rts
;
if.off          lda orbl
                ora #$10        ;set PB4 high
                sta orbl
                rts
;
cpu2.on         lda oral
                and #$ef        ;pull PA4 low
                sta oral
                jmp on.ret
cpu3.on         lda oral
                and #$df        ;pull PA5 low
                sta oral
                jmp on.ret
cpu4.on         lda oral
                and #$bf        ;pull PA6 low
                sta oral
                jmp on.ret
cpu5.on         lda oral
                and #$7f        ;pull PA7 low
                sta oral
on.ret          rts
;
cpu2.off        lda oral
                ora #$10        ;set PA4 high
                sta oral
                jmp off.ret
cpu3.off        lda oral
                ora #$20        ;set PA5 high
                sta oral
                jmp off.ret
cpu4.off        lda oral
                ora #$40        ;set PA6 high
                sta oral
                jmp off.ret
cpu5.off        lda oral
                ora #$80        ;set PA7 high
                sta oral
off.ret         rts
;
son.tlk         ldx #$5e        ;'range'
                jsr vox2
                tya :           ;say sonar number
                tax
                jsr vox0
                jsr wait1
                jsr tlk.ft      ;say correct form of feet
                jsr wait.5
                jsr say.inc     ;say number of inches
                jsr wait.5
                rts
;
tlk.ft          lda feet
                cmp #$02        ;if >=2 use plural
                bcs say.ft      ;say number of feet
                lda feet
                cmp #$01        ;if = 1, add 12 to inches
                bne tlk.ret
                lda inches
                sed
                clc
                adc #12
                sta inches      ;store new value back in inches
                cld
tlk.ret         rts
;
say.ft          ldx feet        ;say number of feet
                jsr vox0
                ldx #$52        ;'feet'
                jsr vox1
                rts
```

```
;
say.inc     ldx inches    ;say number of inches
            jsr vox0
            ldx #$7a      ;'point"
            jsr vox1
            ldx in/10     ;say tenths
            jsr vox0
            ldx #$5f      ;'inches'
            jsr vox1
            rts
;
cpu.up      ldx #$02      ;'CPU # -- is up'
            jsr vox4
            tya
            tax
            jsr vox       ;send CPU ID number
            rts
;
posit       lda #$03
            jsr mode
            txa :         ;transfer the desired head position
            jsr cpu2
            rts
;
scan        lda #$05      ;set mode 5 on bus
            jsr mode
            jsr cpu2
            rts
;
seek        lda #$00      ;set mode 0 on bus
            jsr mode
            jsr cpu2
            rts
;
center      ldx #$80
            jsr posit     ;center head
            rts
;
drive       lda #'?
            jsr outchr
            jsr inchr     ;get command from keyboard
            cmp #'F       ;forward?
            bne not.f
            ldx #$33      ;'forward'
            jsr vox2
            lda #$00      ;set mode zero
            jmp dril
not.f       cmp #'R       ;reverse?
            bne not.r
            ldx #$63      ;'reverse'
            jsr vox2
            lda #$01      ;set mode one
            jmp dril
not.r       cmp #'P       ;port?
            bne not.p
            ldx #$63      ;'left'
            jsr vox1
            lda #$02      ;set mode two
            jmp dril
not.p       cmp #'S       ;starboard?
            bne not.s
            ldx #$80      ;'right'
            jsr vox1
            lda #$03      ;set mode three
            jmp dril
not.s       cmp #'H       ;halt?
            bne not.h     ;check for exit command
            ldx #$88      ;'stop'
            jsr vox1
dri0        jsr halt      ;else stop drive motors
            jmp dri2
not.h       cmp #'Q       ;quit?
            bne err       ;else announce error
```

```
            jmp quit
dril        jsr mode
            jsr inbyt     ;read in speed command
            jsr cpu4      ;latch it into cpu4
            tax :         ;move speed command to X
            jsr delay
            jsr vox0      ;voice output velocity
dri2        jsr crlf
            jmp drive     ;repeat
err         ldx #$51      ;'error'
            jsr vox1
            jmp dri0
quit        jsr halt
            jsr crlf
            rts
;
home        lda #$02      ;mode two
            jsr mode
            jsr cpu2
            rts
;
halt        lda #$07      ;mode seven
            jsr mode
            jsr cpu4      ;stop drive motors
            rts
;
hndshk3     lda orb3      ;set RS-232 MUX for CPU #3
            and #$f8      ;zero out lower three bits
            ora #$03      ;reset to 3
            sta orb3
            lda orb1      ;check for RTS CPU #3
            bmi hs3.ret   ;branch if RTS (PB7) high
            and #$df      ;send CTS (PB5) low
            sta orb1
            jsr rd.dmp    ;read data string into page zero
hs3.ret     rts
;
rd.dmp      tya :         ;push Y on stack
            pha
            ldy start     ;get index for sonars
            lda #$60      ;set toutfl for tty RS-232
            sta toutfl
rd.dmp1     jsr inbyt     ;read in two MUX1 ascii values
            sta rng.hi1,Y
            jsr inbyt     ;read in low byte
            sta rng.lo1,Y
            lda mux.flg   ;MUX3?
            bne rd.dmp2   ;skip MUX2 if flag set
            jsr inbyt     ;read in two MUX2 ascii values
            sta rng.hi2,Y
            jsr inbyt
            sta rng.lo2,Y
rd.dmp2     iny
            cpy stop      ;finished?
            bcc rd.dmp1
            beq rd.dmp1
            lda #$b0      ;reset toutfl for CRT
            sta toutfl
            lda orb1      ;reset CTS high
            ora #$20      ;PB5
            sta orb1
            pla :         ;recover Y
            tay
            rts
;
set.son     lda #'?
            jsr outchr
            jsr inbyt
            jsr son.com
            rts
;
disply      jsr hndshk3
            jsr replay
```

Apr 18 1991 11:56:36 mod11i4.asm Page 9

```
                rts
;
son.one         lda #$11        ;sonar #1 only
                jsr son.com
                jsr delay.5
                jsr hndshk3
                jsr delay.5
                jsr hndshk3
                rts
;
sel.chk         lda #$ff        ;ensure output
                sta ddra4
                stx ora4
                bit ora3        ;read selector input X
                rts
;
sel.dis         clc :           ;create end flag from
                adc #$01        ;last input to be read
                sta temp        ;and save temporarily
                lda #$00        ;clear fault register
                sta fault
sel1            jsr crlf
                txa
                jsr outbyt      ;print input number
                jsr space
                jsr sel.chk     ;read selector input X
                bvc sel2        ;branch if low
                lda #'H
                jsr outchr
                lda fault       ;is fault already set?
                bne sel3        ;branch if set
                stx fault       ;else set fault (first input found high)
                stx ty.flg      ;and set thank you flag
                jmp sel3
sel2            lda #'L
                jsr outchr
sel3            inx :           ;increment input number
                cpx temp        ;finished?
                bne sel1
                jsr crlf
                rts
;
select0         ldx #$00        ;start with input 0 on selector 0
                lda #$0b        ;and read through input 11
                jmp disp
select1         ldx #$10        ;start with input 0 on selector 1
                lda #$16        ;and read through input 7
                jmp disp
select2         ldx #$21        ;start with input 1 on selector 2
                lda #$25        ;through input #5
                jmp disp
select3         ldx #$30        ;start with input 0 on selector 3
                lda #$35        ;through input 5
disp            jsr sel.dis     ;displaying logic level on CRT
                lda fault       ;was there an error?
                beq sel.ret     ;return if fault clear
                lda fault       ;recall fault value
                jsr nib.rt      ;set index for proper selector
                clc :           ;add to start of jump table
                adc #$15        ;for appropriate vox4 speech routine
                tax
                jsr vox4
                jsr crlf
                jsr delay1
                lda fault       ;recall fault value
                and #$0f        ;lower nibble only
                jsr outbyt
                tax
                jsr vox4        ;send it to CPU #4
sel.ret         jsr crlf
                jsr crlf
                rts
;
```

Apr 18 1991 11:56:36 mod11i4.asm Page 10

```
tmp.chk         jsr wait2
                jsr rm.tmp
                jsr wait1
                jsr sys.tmp
                jsr wait2
                rts
;
rm.tmp          ldx #$1b        ;'room temperature...'
                jsr vox4
                jsr delay1
                ldx #$07        ;room temp is input 7 on a/d
                jmp tmp.ad
sys.tmp         ldx #$1c        ;'system temperature...'
                jsr vox4
                jsr delay1
                ldx #$00        ;system temp is input 0 on a/d
tmp.ad          jsr a/d
                tax
                jsr vox4        ;send temperature a/d value
                rts
;
a/d             lda #$04        ;mode 4 for a/d conversion
                jsr mode
                txa :           ;a/d input X
                jsr cpu2        ;send to CPU #2
eoc1            bit ora3        ;check EOC
                bmi eoc1        ;wait for it to go low
eoc2            bit ora3        ;check it again
                bpl eoc2        ;wait for it to go high
                lda ora2        ;then read a/d value from CPU #2
                rts
;
rel.hum         ldx #$1f        ;'relative humidity...'
                jsr vox4
                ldx #$01        ;input 1 for relative humidity
                jsr a/d
                tax
                jsr vox4        ;pass a/d value to CPU #5
                rts
;
nib.rt          lsr A
                lsr A
                lsr A
                lsr A
                rts
;
nib.lf          asl A
                asl A
                asl A
                asl A
                rts
;
sel.tes         lda #$03
                sta pass        ;set max number of passes
                lda #$00        ;clear thank you flag
                sta ty.flg
st1             jsr select0     ;test selector 0
                lda fault       ;any errors?
                beq st2         ;branch if none
                cmp prv.err     ;same error as before?
                beq st1.1       ;branch if same
                sta prv.err     ;else reset previous error flag
                lda #$03        ;and reset pass
                sta pass
st1.1           jsr wait5       ;delay for operator assistance
                dec pass
                bne st1         ;loop if not done yet
                jsr sht.dwn     ;else shut down
                jmp $b003
st2             jsr thank       ;'thank you' if appropriate
                lda #$03
                sta pass
                jsr wait3       ;delay between tests
```

```
st3         jsr select1   ;test selector 1
            lda fault     ;any errors?
            beq st4       ;branch if none
            cmp prv.err   ;same error as before?
            beq st3.1     ;branch if same
            sta prv.err   ;else reset previous error flag
            lda #$03      ;and reset pass
            sta pass
st3.1       jsr wait5     ;delay for assist
            dec pass
            bne st3       ;loop if not done yet
            jsr sht.dwn   ;else shut down
            jmp $b003
st4         jsr thank     ;'thank you' if appropriate
            jsr wait3
            rts
;
sir.on      lda ora3
            and #$fd      ;send PA1 low to enable
            jmp sir.ret
sir.off     lda ora3
            ora #$02      ;send PA1 high to disable
sir.ret     sta ora3
            rts
;
thank       lda ty.flg
            beq th.ret
            ldx #$50      ;'thank you'
            jsr vox3
            lda #$00      ;clear thank you flag
            sta ty.flg
th.ret      rts
;
intrude     ldx #$50
int1        jsr sel.chk   ;read selector 5
            bvc int2      ;branch if low
            inx
            cpx #$54      ;finished?
            bne int1      ;loop until finished
            jmp intrude   ;else start again
int2        txa
            and #$0f      ;lower nibble only
            clc
            adc #$01      ;number range 1-4
            sta zone      ;save zone number
            jsr outbyt
            ldx #$3f      ;'intruder'
            jsr vox2
            jsr vox2
            jsr pos.hd    ;position head to center of zone
            jsr wait.5
            ldx #$82      ;'zone'
            jsr vox2
            ldx zone      ;zone ID
            jsr vox0
            jsr wait.5
            jsr sir.on    ;turn on siren
            jsr delay5
            jsr sir.off
            rts
;
bat.vol     ldx #$21      ;'battery voltage...'
            jsr vox4
            jsr delay1
            ldx #$05      ;battery voltage is input 5 on a/d
            jsr a/d
            tax
            jsr vox4      ;pass a/d value to CPU #5
            rts
;
pos.hd      lda zone      ;recall zone of detection
            tax
            cmp #$01
```

```
            bne nt1
            ldx #$38      ;position head to center zone 1
            jmp posit
nt1         cmp #$02
            bne nt2
            ldx #$95      ;position head to center zone 2
            jmp posit
nt2         cmp #$03
            bne nt3
            ldx #$6a      ;position head to center zone 3
            jmp posit
nt3         ldx #$c8      ;position head to center zone 4
            jmp posit
;
greet       ldx #$2a      ;'hi' or 'hello'
            jsr vox4
            rts
;
qstart      jsr initial
            jsr if.on
            jsr delay.5
            jsr cpu5.on
            jsr delay.5
            jsr cpu2.on
            jsr delay.5
            jsr cpu3.on
            jsr delay.5
            jsr cpu4.on
            rts
;
sht.dwn     jsr delay1
            ldx #$0d      ;'system to secure...'
            jsr vox4
            jsr wait1
            ldx #$05      ;'it's --(time)--'
            jsr vox4
            ldx #$12      ;power down synthesizer
            jsr vox4
            jsr wait1
            jsr cpu4.off
            jsr wait1
            jsr cpu3.off
            jsr wait1
            jsr cpu2.off
            rts
;
drv.chk     jsr cpu4.on   ;ensure CPU #4 powered up
            jsr rs232     ;check RS-232 disconnected
            jsr stp.chk   ;check emergency stop control status
            jsr pow.chk   ;check drive power status
            rts
;
stp.chk     ldx #$2f      ;input 15 on selector 2
            jsr sel.chk   ;check emergency stop status
            bvc scl       ;branch if low (drive enabled)
            jsr halt      ;ensure no motion on reset
            jsr wait1
            ldx #$29      ;'emergency stop activated'
            jsr vox4
            stx ty.flg    ;set thank you flag
            ldx #$2f
            jsr delchk<   ;loop delay with test on $2f
            bvc scl       ;branch if low
            ldx #$78      ;'please'
            jsr vox1
            ldx #$7e      ;'re-'
            jsr vox1
            ldx #$83      ;'set'
            jsr vox1
            ldx #$2f
            jsr delchk<   ;loop delay with test on $2f
            bvc scl       ;branch if low
            jmp stp.chk   ;loop and retest
```

```
scl        jsr thank      ;'thank you' if appropriate
           rts
;
pow.chk    ldx #$25       ;input 5 on selector 2
           jsr sel.chk    ;check drive power switch
           bvc pc3        ;branch if low (power on)
           jsr halt       ;ensure no motion on reset
           jsr wait1
           ldx #$25       ;'unable to move'
           jsr vox4
           stx ty.flg     ;set thank you flag
           ldx #$25
           jsr delchk<
           bvc pc3        ;branch if low
           ldx #$26       ;'power disabled'
           jsr vox4
           ldx #$25
           jsr delchk<
           bvc pc3
           ldx #$78       ;'please'
           jsr vox1
           ldx #$3f       ;'restore'
           jsr vox3
           jsr wait1
           jmp pow.chk    ;loop and recheck
pc3        jsr thank      ;'thank you' if appropriate
           rts
;
stp.tst    jsr stp.chk    ;test emergency stop control status
           jsr wait1
           ldx #$2d       ;'please test emergency stop...'
           jsr vox4
           ldy #$1f       ;initialize timer loop
tst1       jsr delay.5    ;unit loop delay
           ldx #$2f       ;check emergency stop status
           jsr sel.chk
           bvs tst2
           dey
           bne tst1       ;loop if time not up
           ldx #$50       ;'not'
           jsr vox2
tst2       ldx #$67       ;'acknowledge-'
           jsr vox3
           ldx #$21       ;'d'
           jsr vox2
           ldx #$2f       ;recheck status
           jsr sel.chk
           bvs tst3       ;branch if activated
           ldx #$2e       ;'unable to test'
           nop  ;change later to vox4
           jmp tst4
tst3       jsr wait1
           ldx #$2c       ;'receiver working OK'
           jsr vox4
tst4       rts
;
delchk<    ldy #$08       ;for a three second delay
d.cl       txa
           pha
           jsr wait.5
           pla
           tax
           jsr outbyt
           jsr sel.chk    ;check selector input X
           bvc d.c3       ;branch if low
           dey
           bne d.cl       ;loop if not done
d.c3       jsr sel.chk    ;set flag for conditional
           rts
;
delchk>    ldy #$08       ;for a three second delay
dcl        txa
           pha
```

```
           jsr wait.5
           pla
           tax
           jsr outbyt
           jsr sel.chk    ;check selector input X
           bvs dc3        ;branch if high
           dey
           bne dcl        ;loop if not done
dc3        jsr sel.chk    ;set flag for conditional
           rts
;
rs232      ldx #$2e       ;input 14 on selector 2
           jsr sel.chk    ;check to see if RS 232 connected
           bvs rsl        ;branch if high (not connected)
           jsr halt       ;ensure vehicle not moving
           ldx #$1d       ;'RS 232 is connected'
           jsr vox4
           stx ty.flg     ;set thank you flag
           ldx #$2e
           jsr delchk>
           bvs rsl
           jmp rs232
rsl        jsr thank      ;'thank you' if appropriate
           rts
;
initial    lda #$ff
           sta ddra4      ;configure output port for data bus
           lda #$3f
           sta ddrbl      ;configure port for latching
           lda #$3f       ;set PB0 - PB5 high
           sta orbl       ;initialize latching and CTS
           lda #$1f       ;PB0 - PB4 outputs
           sta ddrb2
           lda orb2
           ora #$1f       ;ensure off
           sta orb2
           lda #$f7
           sta ddral      ;configure outputs
           lda #$ff
           sta oral       ;ensure all cpus powered down
           lda #$3f       ;PA0 - PA5 outputs
           sta ddra3
           lda #$3f       ;PB0 - PB5 outputs
           sta ddrb3
           lda #$00       ;clear thank-you flag
           sta ty.flg
           rts
;
           .en
//

>
```

Apr 18 1991 11:56:36 mod12l.asm Page 1

```
^M
;
;
;
;        FILENAME: mod121               6 April 1990
;
;        Adapted from survey5 dtd 21 February 1990
;
;        This code runs on CPU #1  (SCHEDULER)
;
;'
            .ba $0
            .ce
            .os
;
start       .ds 1
stop        .ds 1
rng.lo1     .ds 13
rng.hi1     .ds 13
rng.lo2     .ds 13
rng.hi2     .ds 13
feet        .ds 1
inches      .ds 1
in/10       .ds 1
max.rng     .ds 1
D           .ds 1
Z           .ds 1
temp        .ds 1
char        .ds 1
mask        .ds 1
portsv      .ds 1
fault       .ds 1
pass        .ds 1
prv.err     .ds 1
ty.flg      .ds 1
zone        .ds 1
mux.flg     .ds 1
piv.sta     .ds 1
fol.sta     .ds 1
diff        .ds 1
cf          .ds 1
tol         .ds 1
tol.hi      .ds 1
nearest     .ds 1
near        .ds 1
near.hi     .ds 1
drv.com     .ds 1
hd.pos      .ds 1
trk.flg     .ds 1
mot.lf      .ds 1
mot.rt      .ds 1
theta.l     .ds 1
theta.h     .ds 1
UT          .ds 1
LT          .ds 1
carry       .ds 1              ;check this for conflict
gat.rng     .ds 1
crc.lo      .ds 1
buffer      .ds 2
int.flg     .ds 1
mw.flg      .ds 1
us.flg      .ds 1
ir.flg      .ds 1
op.flg      .ds 1
dh.flg      .ds 1
vb.flg      .ds 1
cmp.thr     .ds 1
buf.ind     .ds 1
dh.thr      .ds 1
veloc       .ds 1
displ       .ds 1
hours       .ds 1
minutes     .ds 1
```

Apr 18 1991 11:56:36 mod12l.asm Page 2

```
seconds     .ds 1
cur.mod     .ds 1
sys.flg     .ds 1
max.spd     .ds 1
rch.flg     .ds 1
cf.add      .ds 1
cf.sub      .ds 1
dh.brg      .ds 1
prv.brg     .ds 1
count       .ds 1
dih.flg     .ds 1
index       .ds 1
CF          .ds 1
wan.flg     .ds 1
sur.lp      .ds 1
us.lp       .ds 1
prv.son     .ds 13
;
            .ba $7e00
in.buf      .ds 256
out.buf     .ds 256
;
            .ba $c800
            .mc $800       ;for EPROM burner
;
t2clo       .de $a008
t2chl       .de $a009
ifr2        .de $a00d
ddra1       .de $a003
ora1        .de $a001
ddrb1       .de $a002
orb1        .de $a000
ddra2       .de $a803
ora2        .de $a801
ddrb2       .de $a802
orb2        .de $a800
ddra3       .de $ac03
ora3        .de $ac01
ddrb3       .de $ac02
orb3        .de $ac00
ddra4       .de $a401
ora4        .de $a400
PCR2        .de $a80c
irq.vec     .de $a678
IER2        .de $a80e
IFR2        .de $a80d
scr3        .de $a633
techo       .de $a653
toutfl      .de $a654
;
inchr       .de $8a1b
inbyt       .de $81d9
ascnib      .de $8275
outbyt      .de $82fa
nibasc      .de $8309
crlf        .de $834d
comma       .de $833a
space       .de $8342
outchr      .de $8a47
nbasoc      .de $8a44
;
;      Library Module 11 Subroutines
;
replay      .de $c0e1
son.com     .de $c11b
vox1        .de $c16e
posit       .de $c34b
scan        .de $c355
seek        .de $c35e
center      .de $c367
drive       .de $c36d
home        .de $c3e8
halt        .de $c3f1
```

```
hndshk3   .de $c3fa
rd.dmp    .de $c412
set.son   .de $c451
disply    .de $c45d
son.one   .de $c464
sel.chk   .de $c476
rm.tmp    .de $c515
sys.tmp   .de $c522
a/d       .de $c534
rel.hum   .de $c5b4
nib.rt    .de $c55a
nib.lf    .de $c55f
sel.tes   .de $c564
sir.on    .de $c5c6
sir.off   .de $c5ce
thank     .de $c5d7
intrude   .de $c5e7
bat.vol   .de $c628
greet     .de $c65e
qstart    .de $c664
initial   .de $c7bc
;
;
;
dmp.pak
          lda #'!         ;send sync character
          jsr outchr
          ldx #$00        ;dump the packet buffer
o.p1      lda out.buf,X
          jsr outchr
          cmp #$0d        ;carriage return?
          beq o.p2
          inx :           ;else get next buffer entry
          jmp o.p1
o.p2      rts
;
buf.byt   pha :           ;put A into buffer at X
          pha
          jsr nib.rt      ;shift high nibble to low
          jsr nibasc      ;convert to ascii
          sta out.buf,X
          inx
          pla :           ;get lower nibble
          jsr nibasc      ;convert to ascii
          sta out.buf,X
          inx
          pla
          rts
;
son.scl   nop :           ;scale to one byte
          ldx start
ss0       ldy #$04        ;shift right 4 bits
          lda #$00
          sta carry
          lda rng.lo1,X
          and #$0f        ;zero upper nibble
          cmp #$08        ;greater than 8?
          bcc ss1         ;branch if less than 8
          lda #$01
          sta carry       ;round up
ss1       lsr rng.hi1,X
          ror rng.lo1,X
          dey
          bne ss1         ;loop until four shifts
          lda rng.lo1,X
          clc
          adc carry
          sta rng.lo1,X         ;save rounded off value
          inx
          cpx stop        ;finished MUX1 data?
          bcc ss0
          beq ss0
          ldx start
```

```
ss2       ldy #$04        ;shift right 4 bits
          lda #$00
          sta carry
          lda rng.lo2,X
          and #$0f        ;zero upper nibble
          cmp #$08        ;greater than 8?
          bcc ss3         ;branch if less than 8
          lda #$01
          sta carry       ;round up
ss3       lsr rng.hi2,X
          ror rng.lo2,X
          dey
          bne ss3         ;loop until four shifts
          lda rng.lo2,X
          clc
          adc carry
          sta rng.lo2,X         ;save rounded off value
          inx
          cpx stop        ;finished MUX2 data?
          bcc ss2
          beq ss2
          rts
;
son.pak   ldx #$01
          ldy start
sp1       lda rng.lo1,Y
          jsr buf.byt     ;load MUX1 (3) data into buffer
          lda mux.flg     ;navigational or collision array?
          bne sp2         ;skip MUX2 if MUX3 (collision) only
          lda rng.lo2,Y
          jsr buf.byt     ;load MUX2 data into buffer
sp2       iny
          cpy stop        ;finished?
          bcc sp1
          beq sp1
          lda #$0d        ;end with carriage return
          sta out.buf,X
          rts
;
rng.gat   ldx #0
          sta gat.rng     ;save limit
rg1       lda rng.lo1,X
          cmp gat.rng
          bcc rg2         ;branch if < limit
          lda gat.rng     ;else reset to limit
          sta rng.lo1,X
rg2       lda rng.lo2,X
          cmp gat.rng
          bcc rg3         ;branch if < limit
          lda gat.rng     ;else reset to limit
          sta rng.lo2,X
rg3       inx
          cpx #13         ;finished?
          bne rg1
          rts
;
inpak
          jsr inchr       ;read in a character
ip0       cmp #'!         ;start of packet?
          bne inpak
          ldx #$00        ;initialize buffer index
ip1       jsr inchr       ;read in next character
          cmp #'!         ;start of another packet?
          beq ip0         ;restart if "!"
          sta in.buf,X          ;place in input buffer
          cmp #$0d        ;carriage return?
          beq ip2         ;branch if carriage return
          inx
          jmp ip1         ;loop for next character
ip2       stx buf.ind     ;save buffer EOF index
          rts
;
zer.buf   txa
```

```
              pha
              ldx #$ff
              lda #$0d       ;carriage return
zb1           sta out.buf,X
              lda #'0        ;zero
              dex
              bne zb1        ;loop and clear buffer
              sta out.buf,X
              pla
              tax
              rts
;
mot.ini       lda #$00
              sta cmp.thr    ;clear composite threat score
              sta ir.flg     ;initialize infrared motion flag
              sta us.flg     ;initialize ultrasonic motion flag
              sta op.flg     ;initialize optical motion flag
              sta vb.flg     ;initialize vibration monitor flag
              sta int.flg    ;clear the intrusion sensor status flag
              lda mw.flg     ;initialize microwave motion flag
              and #$0f       ;clear upper nibble
              sta mw.flg
              lda dh.flg     ;initialize discriminatory hearing flag
              and #$f0       ;clear lower nibble
              sta dh.flg
              rts
;
ir.mot
              lda int.flg    ;recall intrusion sensor status
              ora #$01       ;set bit 0 high (infrared enabled)
              sta int.flg
              ldx #1
              jsr buf.byt    ;put into buffer at X = 1,2
              jsr ir.rd      ;read IR sensors
              lda ir.flg     ;recall alarm status
              ldx #3
              jsr buf.byt    ;put into buffer at X = 3,4
              rts
;
mw.mot
              lda int.flg    ;recall intrusion sensor status
              ora #$02       ;set bit 1 high (microwave enabled)
              sta int.flg
              ldx #1
              jsr buf.byt    ;put into buffer at X = 1,2
              ldx #$78       ;input 8 on selector 7
              jsr sel.chk    ;check for microwave motion
              bvs mm1        ;branch if no motion
              lda #$10       ;set upper nibble to indicate alarm
              ora mw.flg     ;set lower nibble to current sensitivity
              sta mw.flg     ;save
mm1           lda mw.flg
              ldx #5
              jsr buf.byt    ;put into buffer at X = 5,6
mm.ret        rts
;
op.mot
              lda int.flg    ;recall intrusion sensor status
              ora #$08       ;set bit 3 high (optical enabled)
              sta int.flg
              ldx #1
              jsr buf.byt    ;put into buffer at X = 1,2
              ldx #$71       ;input 1 on selector 7
op1           jsr sel.chk    ;read selector 5
              bvc op4        ;branch if low (no alarm)
              lda #$01       ;set bit mask
              sta mask
              txa :          ;get sensor ID
              and #$0f       ;from lower nibble X
              tay :          ;and place in Y
op2           dey
              beq op3        ;branch if masked aligned for sensor ID
              asl mask       ;else shift mask bit to left
```

```
              jmp op2
op3           lda op.flg     ;recall IR alarm flag
              ora mask       ;set appropriate bit high (sensor alarmed)
              sta op.flg
op4           inx :          ;next sensor
              cpx #$75       ;finished?
              bne op1        ;loop until finished
              lda op.flg     ;recall alarm status
              ldx #11
              jsr buf.byt    ;put into buffer at X = 11,12
              rts
;
hex.bcd       ldy #00        ;initialize hundreds counter
c100          cmp #100       ;is hex value in A => 100?
              bcc out1       ;no, store hundreds digit in Y
              sbc #100       ;yes, subtract 100
              iny :          ;increment hundreds counter
              jmp c100       ;loop and compare again
out1          ldx #00        ;initialize tens counter
c10           cmp #10        ;is it => 10?
              bcc out2       ;no, branch
              sbc #10        ;yes, subtract 10
              inx :          ;increment tens count
              jmp c10        ;loop and compare again
out2          pha :          ;save remainder on stack
              txa :          ;move tens count to A
              jsr nib.lf     ;move to upper nibble
              and #$f0       ;zero out lower nibble
              sta temp       ;save
              pla :          ;retrieve remainder
              ora temp       ;put in lower nibble
              sta temp       ;save
              tya :          ;put hundreds in accumulator
              ldy temp       ;put tems and units in Y
              rts
;
jog.lf        jsr rd.buf
              sta scr3       ;save
              ldx #6         ;read head position
              jsr a/d
              clc
              adc scr3       ;add jog increment
              bcc jog.lf1    ;branch no overflow
              lda #$ff       ;else reset
jog.lf1       tax
              jsr posit
              rts
;
jog.rt        jsr rd.buf
              sta scr3       ;save
              ldx #6         ;read head position
              jsr a/d
              sec
              sbc scr3       ;subtract jog increment
              bcs jog.rt1    ;branch no rollover
              lda #00        ;else reset
jog.rt1       tax
              jsr posit
              rts
;
cam.on        lda sys.flg
              ora #$80       ;set video bit
              sta sys.flg
              lda orb2
              and #$fe       ;set PB0 low
              jmp cam1
cam.off       lda sys.flg
              and #$7f       ;clear video bit
              sta sys.flg
              lda orb2
              ora #$01       ;set PB0 high
cam1          sta orb2
              rts
```

```
;
rd.buf      lda in.buf,X
            jsr ascnib      ;ascii to nibble
            bcs not.hex
            jsr nib.lf
            sta scr3        ;save
            inx
            lda in.buf,X
            jsr ascnib
            bcs nhl         ;branch not hex
            ora scr3        ;pack to a byte
            jmp rb.ret
not.hex     inx
nhl         txa
            pha :           ;save buffer index
            ldx #$51        ;'error'
            jsr voxl
            pla
            tax
rb.ret      inx
            rts
;
;
ir.rd       ldx #$50        ;input 0 on selector 5
irl         jsr sel.chk     ;read selector 5
            bvs ir4         ;branch if high (no alarm)
            lda #$01        ;set mask bit
            sta mask
            txa :           ;get sensor ID
            and #$0f        ;from lower nibble X
            tay :           ;and place in Y
            iny :           ;add 1
ir2         dey
            beq ir3         ;branch if mask aligned for sensor ID
            asl mask        ;else shift mask bit to left
            jmp ir2
ir3         lda ir.flg      ;recall IR alarm flag
            ora mask        ;set appropriate bit high (sensor alarmed)
            sta ir.flg
ir4         inx :           ;next sensor
            cpx #$54        ;finished?
            bne irl
            rts
;
ir.grab     jsr ir.rd       ;read IR sensors
            lda ir.flg      ;place in buffer
            ldx #49         ;at X = 49, 50
            jsr buf.byt
            rts
;
paraml      ldx #4          ;get first parameter
            lda in.buf,X
            cmp #'0         ;zero?
            rts
;
report2
            jsr zer.buf     ;zero out the output buffer
            lda #'2         ;packet ID
            sta out.buf
            ldx #$00        ;system temperature is A/D input 0
            jsr a/d
            ldx #3
            jsr buf.byt
            ldx #$07        ;room temperature A/D input 7
            jsr a/d
            ldx #5
            jsr buf.byt
            ldx #$05        ;battery voltage is a/d input 5
            jsr a/d         ;read it
            ldx #7
            jsr buf.byt
            ldx #$01        ;relative humidity is A/D input 1
            jsr a/d
```

```
            ldx #9
            jsr buf.byt
            ldx #13
            lda #$0d        ;terminate with carriage return
            sta out.buf,X
            jsr outpak      ;send the packet
            rts
;
sec.sen     jsr zer.buf     ;zero out the output buffer
            lda #'4         ;packet ID
            sta out.buf
            jsr mot.inl     ;initialize motion detector flags
            lda #$3f        ;test each sensor several times
            sta pass        ;loop counter
rp4.1       jsr ir.mot      ;check I/R motion detectors
            jsr mw.mot      ;check microwave motion detector
            jsr op.mot      ;check optical motion detectors
            jsr vb.mot      ;check vibration detector
            dec pass        ;decrement number of passes
            bne rp4.1       ;loop back and test again
            jsr dh.mot      ;check discriminatory hearing detector
            jsr us.mot      ;check ultrasonic motion detectors
            jsr ir.fuse     ;fuse with IR sensors and buffer
            jsr vd.mot      ;pan head and look for video motion
            jsr assess      ;assess the results
            rts
;
vd.mot      jsr pan.hd      ;position head if US motion
            lda hd.pos      ;recall head position
            ldx #7          ;put in buffer
            jsr buf.byt
            bit sys.flg     ;check video camera status
            bpl vm.ret      ;branch if off
            lda int.flg
            ora #$40        ;set video bit
            sta int.flg
            ldx #1
            jsr buf.byt     ;place in buffer
vm.ret      rts
;
pan.hd      lda #0
            sta mot.lf
            sta mot.rt
            ldx #21         ;start of sonar data
ph.0        lda out.buf,X
            cmp #'0
            bne ph.1        ;branch not 0
            inx
            jmp ph.0
ph.1        cmp #$0d        ;CR?
            beq ph.ret
            stx mot.lf      ;save index of left boundary
            txa
            and #$fe        ;odd or even?
            bne ph.2        ;branch if even
            inx :           ;start looking for right boundary
ph.2        lda out.buf,X
            cmp #$0d        ;CR?
            bne ph.3
            dex
            stx mot.rt      ;set right boundary
            jmp ph.ret
ph.3        jsr chk.two     ;check next two bytes
            lda mot.rt      ;right edge found?
            beq ph.2        ;loop if not
ph.ret      lda mot.lf
            lda mot.rt
            bne ph.4
            lda mot.lf
ph.4        clc
            adc mot.lf
            lsr A
            beq ph.5
```

```
                sec
                sbc #21
ph.5            lsr A
                beq ph.6        ;skip head positioning
                tax
                lda pos.arr,X
                tax
                sta hd.pos      ;save head position
                jsr posit       ;position head
                jsr cam.on      ;turn on video
ph.6            rts
;
pos.arr         .by $f9 $e6 $d0 $bb $a7 $94 $7f $6a $57 $46 $33 $21 $0e
;
stub            jsr inbyt
                tax
                jsr posit
                jmp stub
;
chk.two         lda out.buf,X
                cmp #'0
                bne c.t.1
                inx
                lda out.buf,X
                cmp #'0
                bne c.t.ret
                stx mot.rt      ;else set right boundary index
                jmp c.t.ret
c.t.1           inx
c.t.ret         rts
;
us.mot
                lda start       ;check sonar on-line
                cmp #$01
                bne us.1        ;branch if off
                lda int.flg     ;recall intrusion sensor status
                ora #$04        ;set bit 2 high (ultrasonic enabled)
                sta int.flg
                ldx #1
                jsr buf.byt     ;put into buffer
us.1            jsr new.son     ;check for new sonar data
                bmi us.3        ;branch if none
                dec us.lp       ;decrement loop counter
                bne us.2
                lda #$ff        ;turn off sonar
                jsr son.cmd
                jsr cam.off     ;turn off camera
us.2            jsr hndshk3     ;read in range data
                jsr son.scl     ;scale to 1 byte
                lda #$4b        ;10 feet
                jsr rng.gat     ;gate sonar ranges
                jsr sort        ;sort into sequential order
                jsr cmp.son     ;check for motion
                jsr cpy.son     ;save ranges for next time
us.3            rts
;
new.son         lda orb3        ;set RS-232 MUX for CPU #3
                and #$f8
                ora #$03
                sta orb3
                lda orb1        ;check RTS
                rts
;
sort            ldx #2          ;sorts into rng.hi1, left to right
srt.lf          ldy ind.arr,X
                lda rng.lo2,X
                sta rng.hi1,Y
                sta rng.hi2,Y
                inx
                inx
                cpx #14         ;finished left?
                bne srt.lf
                ldx #1          ;reset index to 1 for right side
```

```
srt.rt          ldy ind.arr,X
                lda rng.lo1,X
                sta rng.hi1,Y
                sta rng.hi2,Y
                inx
                inx
                cpx #13         ;finished right?
                bne srt.rt
                lda rng.lo1+2
                sta rng.hi1+12
                sta rng.hi2+12
                rts
;
cpy.son         ldx #0
cpy.s1          lda rng.hi2,X
                sta prv.son,X
                inx
                cpx #13
                bne cpy.s1      ;loop until array copied
                rts
;
cmp.son         ldx #0          ;initialize index
cmp.s1          inc us.flg      ;increment weighting
                lda rng.hi1,X
                sec :           ;subtract previous from current range
                sbc prv.son,X
                sta temp
                lda #$00        ;move sign to high byte
                sbc #$00
                bpl cmp.s2      ;branch if positive
                lda temp        ;recall difference
                eor #$ff        ;take absolute value
                clc
                adc #$01        ;two's complement + 1
                sta temp
cmp.s2          lda temp        ;recall absolute value
                cmp #5          ;1.6" units
                bcs cmp.s3      ;branch if > threshold
                lda #$00        ;zero out if < threshold
                sta rng.hi1,X
                dec us.flg      ;decrement weighting
cmp.s3          lda rng.hi1,X
                cmp gat.rng     ;same as gated range?
                bne cmp.s4
                lda #$00        ;reset to 0
                sta rng.hi1,X
cmp.s4          inx
                cpx #13         ;finished?
                bne cmp.s1
                lda us.flg
                cmp #4
                bcc cmp.s5      ;branch if less than limit
                lda #3          ;else reset
                sta us.flg
cmp.s5          rts
;
ir.fuse         ldx #21
IR4             lda #$08        ;set mask for IR4
                bit ir.flg      ;check status
                beq IR3         ;branch not set
                ldy #0
IR4.1           lda rng.hi1,Y
                jsr buf.byt     ;put into buffer
                iny
                cpy #4          ;finished?
                bne IR4.1
IR3             lda #$04        ;set mask for IR3
                bit ir.flg
                beq IR2         ;branch not set
                ldx #29
                ldy #4
IR3.1           lda rng.hi1,Y
                jsr buf.byt
```

```
                 iny
                 cpy #7          ;finished?
                 bne IR3.1
        IR2      lda #$02        ;set mask for IR2
                 bit ir.flg
                 beq IR1         ;branch not set
                 ldx #33
                 ldy #6
        IR2.1    lda rng.hi1,Y
                 jsr buf.byt
                 iny
                 cpy #9          ;finished?
                 bne IR2.1
        IR1      lda #$01        ;set mask for IR1
                 bit ir.flg
                 beq irf.ret     ;branch not set
                 ldx #39
                 ldy #9
        IR1.1    lda rng.hi1,Y
                 jsr buf.byt
                 iny
                 cpy #12
                 bne IR1.1
        irf.ret  jsr truncat     ;truncate trailing zeroes
                 rts
        ;
        truncat  dex
                 cpx #21         ;finished all sonar data?
                 bcc put.cr
                 lda out.buf,X
                 cmp #'0
                 bne put.cr      ;branch if not 0
                 dex
                 lda out.buf,X
                 cmp #'0
                 beq truncat     ;branch if another 0
        put.cr   inx
                 lda #$0d        ;terminate with carriage return
                 sta out.buf,X
                 rts
        ;
        ind.arr  .by 0 6 0 9 3 7 1 10 4 8 2 11 5
        ;
        dh.mot
                 lda int.flg     ;recall intrusion sensor status
                 ora #$10        ;set bit 4 high (hearing enabled)
                 sta int.flg
                 ldx #1
                 jsr buf.byt     ;put into buffer at X = 1,2
                 jsr hndshk0     ;check CPU #10 for bearing solution
                 jsr dh.bits     ;check individual array elements
                 lda dh.brg      ;recall bearing
                 cmp prv.brg     ;same as previous bearing?
                 beq dh0         ;branch if same
                 sta prv.brg     ;else save for later reference
                 jmp dh1
        dh0      dec count       ;decrement the loop counter
                 bne dh2         ;branch if no timeout
                 lda #$ff        ;reset bearing to null (no plot)
                 sta dh.brg
        dh1      lda #$20        ;reset timeout counter
                 sta count
        dh2      lda dh.brg      ;recall bearing
                 ldx #15
                 jsr buf.byt     ;put into buffer at X = 15,16
                 lda dih.flg     ;recall sensor flag status and sign
                 jsr buf.byt     ;put into buffer at X = 17,18
                 rts
        ;
        dh.bits  ldx #$3d        ;input d on selector 3
                 lda dih.flg
                 and #$f8        ;clear lower three bits
                 sta dih.flg
```

```
        db1      jsr sel.chk     ;read selector 3
                 bvs db2         ;branch if high (no alarm)
                 lda dih.flg
                 ora #$01        ;set flag bit for sensor 1
                 sta dih.flg
        db2      inx
                 jsr sel.chk     ;read next sensor input
                 bvs db3         ;branch if high
                 lda dih.flg
                 ora #$02        ;set flag for sensor 2
                 sta dih.flg
        db3      inx
                 jsr sel.chk     ;read last sensor input
                 bvs db.ret      ;branch if high
                 lda dih.flg
                 ora #$04        ;set flag for sensor 3
                 sta dih.flg
        db.ret   rts
        ;
        vb.mot
                 ldx #$13        ;put in buffer at X = 13,14
                 rts
        ;
        assess
                 lda ir.flg      ;recall infrared flag
                 ldx #$06        ;check first five bits
        as1      dex
                 beq as2         ;finished with ir.flg
                 ror A           ;shift right 1 bit
                 bcc as1         ;bit high (alarm condition)?
                 inc cmp.thr     ;increment composite threat score
                 jmp as1
        as2      lda cmp.thr     ;more than one I/R sensor?
                 cmp #$02
                 bcc as3         ;branch if < 2
                 inc cmp.thr     ;increase weighting if > 1
        as3      lda mw.flg      ;recall microwave flag
                 and #$f0        ;zero out lower nibble
                 beq as4         ;branch if no MW alarm
                 inc cmp.thr     ;else increment composite threat
        as4      lda us.flg      ;recall ultrasonic flag
                 clc
                 adc cmp.thr     ;add to composite threat
                 sta cmp.thr
        as5      lda op.flg      ;recall optical flag
                 beq as6         ;branch if no optical alarm
                 inc cmp.thr     ;else increment composite threat
        as6      lda dih.flg     ;recall discriminatory hearing flag
                 and #$07        ;lower three bits only
                 beq as7         ;branch if no alarm
                 inc cmp.thr     ;increment composite threat
        as7      lda dh.brg      ;recall bearing
                 cmp #$ff        ;null (no solution)?
                 beq as8         ;branch if no solution
                 inc cmp.thr     ;else increment composite threat
        as8      lda vb.flg      ;recall vibration flag
                 beq as9         ;branch if no alarm
                 inc cmp.thr     ;else increment composite threat
        as9      lda cmp.thr
                 ldx #19         ;place in buffer at X = 19
                 jsr buf.byt
                 rts
        ;
        sec.on   lda orb2        ;turn on security sensors
                 and #$ef        ;pull PB5 low
                 jmp sec.ret
        sec.off  lda orb2        ;turn off
                 ora #$10        ;set PB5 high
        sec.ret  sta orb2
                 rts
        ;
        sec.pow  ldx #4          ;get next parameter
                 lda in.buf,X
```

```
                cmp #'0        ;a zero?
                beq se.off     ;turn off
                jsr sec.on     ;turn on
                jmp s.ret
se.off          jsr sec.off
s.ret           rts
;
hndshk0         ;upload data from CPU #10
                lda orb3       ;set RS-232 MUX for input 0
                and #$f8
                sta orb3
                lda orb1       ;check for RTS
                bmi hs0.ret    ;branch if RTS (PB7) high
                and #$df       ;send CTS (PB5) low
                sta orb1
                lda #$60       ;set toutfl for COM2
                sta toutfl
                lda #$00       ;clear sign bit and flags
                sta dih.flg
                jsr inbyt      ;read in sign of bearing
                beq hs0.1      ;branch if not set
                lda #$80       ;else set high bit
                sta dih.flg    ;and store
hs0.1           jsr inbyt      ;read in the bearing
                sta dh.brg
                lda #$b0       ;reset COM1
                sta toutfl
                lda orb1       ;reset CTS high
                ora #$20       ;PB5
                sta orb1
hs0.ret         rts
;
outpak
                lda orb3       ;set RS-232 MUX for output 1
                and #$f8
                ora #$01
                sta orb3
                lda #$60       ;set toutfl for COM2
                sta toutfl
                jsr dmp.pak    ;dump the packet
                lda #$b0       ;reset COM1
                sta toutfl
                rts
;
survey          lda #$01
                sta sur.lp     ;preset loop counter
                jsr sec.on     ;turn on security sensors
                jsr center     ;center head
                lda #$7f
                sta hd.pos
sur.1           jsr new.cmd    ;new command waiting?
                bpl sur.ret    ;exit if waiting
                jsr sec.sen    ;poll security sensors
                jsr cmp.buf    ;same as before?
                beq sur.2      ;skip report if same
                jsr outpak     ;report
                jsr cpy.buf    ;save for next comparison
sur.2           dec sur.lp     ;loop counter
                bne sur.3
                jsr report2    ;report robot status
                lda #$ff       ;reset loop counter
                sta sur.lp
sur.3           lda cmp.thr    ;recall composite threat
                cmp #$03
                bcc sur.1      ;branch if < threshold
                lda #$0c       ;activate navigational sonar array
                jsr son.cmd
                lda #8
                sta us.lp      ;set loop counter for us.mot
                jmp sur.1
sur.ret         jsr center     ;center head
                jsr cam.off    ;turn off video
                jsr sec.off    ;turn off security sensors
```

```
                rts
;
new.cmd         lda orb3       ;RS-232 MUX input 1
                and #$f8       ;zero lower 3 bits
                ora #$01       ;set to 1
                sta orb3
                lda orb1       ;check for RF link RTS
                rts
;
cpy.buf         ldx #0         ;copy output buffer to input
cpy.1           lda out.buf,X
                sta in.buf,X
                cmp #$0d       ;CR?
                beq cpy.ret    ;finished
                inx
                beq cpy.ret    ;error
                jmp cpy.1
cpy.ret         rts
;
cmp.buf         ldx #0         ;compare output buffer to input
cmp.1           lda out.buf,X
                cmp in.buf,X
                bne cmp.ret    ;branch if different
                cmp #$0d       ;CR?
                beq cmp.ret    ;finished
                inx
                beq cmp.ret    ;error
                jmp cmp.1
cmp.ret         rts
;
son.cmd         jsr son.com    ;pass to CPU #3
                lda start      ;check start flag
                bne sc.1       ;branch if MUX 3
                sta mux.flg    ;clear for MUX 1&2
                inc start      ;reset start index to 01
                jmp sc.ret
sc.1            lda #$03       ;set for MUX 3
                sta mux.flg
sc.ret          rts
;
                .en
//

>^@
```

```
^M
0005 ;
0010 ;
0015 ;
0020 ;       FILENAME:  mod13e           07 April 1990
0025 ;
0030 ;       Originated 26 December 1983
0035 ;       Revised 25 October 1987 for new Module 11 ROM
0040 ;       Revised 3 January 1989 for new Module 12 ROM
0045 ;       Revised 17 December 89 for "Wander" upgrades
0050 ;       Revised 6 April 90 for new Module 12 ROM
0055 ;
0060 ;       This code runs on CPU #1  (SCHEDULER)
0065 ;
0070 ;
0075               .ba $0
0080               .os
0085               .ce
0090 ;
0095 start     .ds 1
0100 stop      .ds 1
0105 rng.lo1   .ds 13
0110 rng.hi1   .ds 13
0115 rng.lo2   .ds 13
0120 rng.hi2   .ds 13
0125 feet      .ds 1
0130 inches    .ds 1
0135 in/10     .ds 1
0140 max.rng   .ds 1
0145 D         .ds 1
0150 Z         .ds 1
0155 temp      .ds 1
0160 char      .ds 1
0165 mask      .ds 1
0170 portsv    .ds 1
0175 fault     .ds 1
0180 pass      .ds 1
0185 prv.err   .ds 1
0190 ty.flg    .ds 1
0195 zone      .ds 1
0200 mux.flg   .ds 1
0205 col.sta   .ds 1
0210 fol.sta   .ds 1
0215 diff      .ds 1
0220 cf        .ds 1
0225 tol       .ds 1
0230 tol.hi    .ds 1
0235 nearest   .ds 1
0240 near      .ds 1
0245 near.hi   .ds 1
0250 drv.cmd   .ds 1
0255 hd.pos    .ds 1
0260 trk.flg   .ds 1
0265 Vx        .ds 1
0270 Vy        .ds 1
0275 theta.l   .ds 1
0280 theta.h   .ds 1
0285 UT        .ds 1
0290 LT        .ds 1
0295 carry     .ds 1            ;check this for conflict
0300 crc.hi    .ds 1
0305 crc.lo    .ds 1
0310 buffer    .ds 2
0315 int.flg   .ds 1
0320 mw.flg    .ds 1
0325 us.flg    .ds 1
0330 ir.flg    .ds 1
0335 op.flg    .ds 1
0340 dh.flg    .ds 1
0345 vb.flg    .ds 1
0350 cmp.thr   .ds 1
0355 buf.ind   .ds 1
0360 dh.thr    .ds 1
```

```
0365 veloc     .ds 1
0370 displ     .ds 1
0375 hours     .ds 1
0380 minutes   .ds 1
0385 seconds   .ds 1
0390 cur.mod   .ds 1
0395 sys.flg   .ds 1
0400 max.spd   .ds 1
0405 rch.flg   .ds 1
0410 cf.add    .ds 1
0415 cf.sub    .ds 1
0420 dh.brg    .ds 1
0425 prv.brg   .ds 1
0430 count     .ds 1
0435 dih.flg   .ds 1
0440 index     .ds 1
0445 CF        .ds 1
0450 wan.flg   .ds 1
0455 ;
0460 scr3      .de $a633
0465 ;
0470           .ba $7e00
0475 in.buf    .ds 256
0480 out.buf   .ds 256
0485 ;
0490           .ba $d000
0495           .mc $800      ;save for eprom burner
0500 ;
0505 t2clo     .de $a008
0510 t2chi     .de $a009
0515 ifr2      .de $a00d
0520 ddra1     .de $a003
0525 ora1      .de $a001
0530 ddrb1     .de $a002
0535 orb1      .de $a000
0540 ddra2     .de $a803
0545 ora2      .de $a801
0550 ddrb2     .de $a802
0555 orb2      .de $a800
0560 ddra3     .de $ac03
0565 ora3      .de $ac01
0570 ddrb3     .de $ac02
0575 orb3      .de $ac00
0580 ddra4     .de $a401
0585 ora4      .de $a400
0590 orb4      .de $a402
0595 PCR2      .de $a80c
0600 irq.vec   .de $a678
0605 IER2      .de $a80e
0610 IFR2      .de $a80d
0615 techo     .de $a653
0620 toutfl    .de $a654
0625 ;
0630 inchr     .de $8a1b
0635 inbyt     .de $81d9
0640 ascnib    .de $8275
0645 outbyt    .de $82fa
0650 nibasc    .de $8309
0655 crlf      .de $834d
0660 comma     .de $833a
0665 space     .de $8342
0670 outchr    .de $8a47
0675 nbasoc    .de $8a44
0680 ;
0685 ;
0690 ;       Library Module 11 Subroutines
0695 ;
0700 son.rng1  .de $c000
0705 replay    .de $c0e1
0710 son.com   .de $c11b
0715 cpu2      .de $c133
0720 cpu3      .de $c139
0725 cpu4      .de $c13f
```

```
0730  vox0       .de $c169
0735  vox1       .de $c16e
0740  vox2       .de $c173
0745  vox3       .de $c178
0750  vox4       .de $c17d
0755  vox        .de $c17f
0760  mode       .de $c19d
0765  ld.time    .de $c1ac
0770  wait.5     .de $c1f2
0775  delay.5    .de $c1f5
0780  delay1     .de $c1fa
0785  delay2     .de $c1ff
0790  delay3     .de $c204
0795  delay4     .de $c209
0800  delay5     .de $c20e
0805  wait1      .de $c213
0810  wait2      .de $c218
0815  wait3      .de $c21d
0820  wait4      .de $c222
0825  wait5      .de $c227
0830  delay      .de $c230
0835  cp5.pwr    .de $c25e
0840  if.on      .de $c283
0845  if.off     .de $c28c
0850  cpu2.on    .de $c295
0855  cpu3.on    .de $c2a0
0860  cpu4.on    .de $c2ab
0865  cpu5.on    .de $c2b6
0870  cpu2.off   .de $c2bf
0875  cpu3.off   .de $c2ca
0880  cpu4.off   .de $c2d5
0885  cpu5.off   .de $c2e0
0890  tlk.ft     .de $c303
0895  say.ft     .de $c31d
0900  say.inc    .de $c329
0905  cpu.up     .de $c340
0910  posit      .de $c34b
0915  scan       .de $c355
0920  seek       .de $c35e
0925  center     .de $c367
0930  drive      .de $c36d
0935  home       .de $c3e8
0940  halt       .de $c3f1
0945  hndshk3    .de $c3fa
0950  rd.dmp     .de $c412
0955  set.son    .de $c451
0960  disply     .de $c45d
0965  son.one    .de $c464
0970  sel.chk    .de $c476
0975  sel.dis    .de $c482
0980  select0    .de $c4be
0985  select1    .de $c4c5
0990  select2    .de $c4cc
0995  select3    .de $c4d3
1000  tmp.chk    .de $c505
1005  rm.tmp     .de $c515
1010  sys.tmp    .de $c522
1015  a/d        .de $c534
1020  eocl       .de $c53d
1025  rel.hum    .de $c5b4
1030  nib.rt     .de $c55a
1035  nib.lf     .de $c55f
1040  sel.tes    .de $c564
1045  sir.on     .de $c5c6
1050  sir.off    .de $c5ce
1055  thank      .de $c5d7
1060  intrude    .de $c5e7
1065  bat.vol    .de $c628
1070  greet      .de $c65e
1075  qstart     .de $c664
1080  sht.dwn    .de $c683
1085  drv.chk    .de $c6ab
1090  stp.chk    .de $c6b8
```

```
1095  pow.chk    .de $c6f1
1100  stp.tst    .de $c72d
1105  delchk<    .de $c76c
1110  delchk>    .de $c784
1115  rs232      .de $c79c
1120  initial    .de $c7bc
1125  ;
1130  ;
1135  ;          Library Module 12 Subroutines
1140  ;
1145  dmp.pak    .de $c800
1150  buf.byt    .de $c816
1155  son.scl    .de $c82c
1160  son.pak    .de $c894
1165  inpak      .de $c8df
1170  zer.buf    .de $c8fe
1175  hex.bcd    .de $c962
1180  jog.lf     .de $c9e0
1185  jog.rt     .de $c9f8
1190  rd.buf     .de $ca31
1195  paraml     .de $ca8f
1200  outpak     .de $ce39
1205  survey     .de $ce51
1210  son.cmd    .de $ced5
1215  ;
1220  ;
1225  ;
1230  sonar      jsr hndshk3   ;read in new data
1235             jsr son.scl   ;scale to 1 byte for IBM
1240             jsr son.pak   ;pack into buffer for transmission
1245             jsr outpak    ;send the packet
1250             rts
1255  ;
1260  H.parse    ldx #2        ;check second parameter
1265             lda in.buf,X
1270             inx
1275  H0         cmp #'0       ;discrete head position command?
1280             bne H1        ;branch if not 0
1285             jsr rd.buf    ;get next parameter
1290             tax
1295             jsr posit     ;and position head accordingly
1300             jmp H.ret     ;return and loop
1305  H1         cmp #'1       ;center head?
1310             bne H2        ;branch if not 1
1315             jsr center
1320             jmp H.ret     ;return and loop
1325  H2         cmp #'2       ;turn head left?
1330             bne H3        ;branch if not 2
1335             jsr jog.lf    ;jog head to left
1340             jmp H.ret     ;return and loop
1345  H3         cmp #'3       ;turn head right?
1350             bne H.err
1355             jsr jog.rt    ;jog head to right
1360             jmp H.ret
1365  H.err      ldx #$51      ;'error'
1370             jsr vox1
1375  H.ret      rts
1380  ;
1385  T.parse    ldx #2        ;check second character
1390             jsr rd.buf    ;get hours from input buffer
1395             cmp #13       ;convert to 12 hour format
1400             bcc T1        ;branch if < 13
1405             sec
1410             sbc #12       ;subtract 12 hours
1415  T1         jsr hex.bcd   ;convert to BCD
1420             sty hours     ;tens and units
1425             ldx #4
1430             jsr rd.buf    ;get minutes from input buffer
1435             jsr hex.bcd   ;convert to BCD
1440             sty minutes
1445             ldx #6
1450             jsr rd.buf    ;get seconds from input buffer
1455             jsr hex.bcd   ;convert to BCD
```

```
                sty seconds
                ldx #$06        ;select ld.time on vox4
                jsr vox4
                lda #$04        ;mode 4
                ldx hours
                jsr vox         ;send to CPU #5 to set 6526
                lda #$04        ;mode 4
                ldx minutes
                jsr vox
                lda #$04        ;mode 4
                ldx seconds
                jsr vox
                rts
;
sys.pow         jsr param1      ;get first parameter
                beq sys.off     ;branch if zero
sys.on          jsr qstart      ;power up system
                jmp sp.ret
sys.off         jsr initial     ;power down system
sp.ret          rts
;
son.pow         jsr param1      ;get first parameter
                beq son.off
son.off         lda #$ff        ;off command
                jsr son.com     ;send to CPU #3
                jsr hndshk3     ;clear any old command
                rts
;
vox.pow         jsr param1
                beq vox.off
vox.on          ldx #$11        ;power up
                jmp vp.ret
vox.off         ldx #$12        ;power down synthesizer
vp.ret          jsr vox4
                rts
;
col.arr         jsr param1      ;get first parameter
                beq ca.dis
ca.en           lda sys.flg
                ora #$01        ;set enable bit
                sta sys.flg
                jmp cla.ret
ca.dis          lda sys.flg
                and #$fe        ;clear enable bit
                sta sys.flg
cla.ret         rts
;
report1         jsr zer.buf     ;zero out the output buffer
                lda #'1         ;packet ID
                sta out.buf
                lda start       ;sonar already on line?
                cmp #$0f
                bne rp1.1       ;branch if already on line
                ldx #3
                jsr rd.buf
                jsr son.cmd     ;send to CPU #3
rp1.1           jsr sonar
                rts
;
report3         jsr zer.buf     ;zero out the output buffer
                lda #'3         ;packet ID
                sta out.buf
                lda start       ;sonar already on line?
                cmp #$0f
                bne rp3.1       ;branch if already on line
                ldx #3
                jsr rd.buf      ;get sonar command
                and #$0f        ;ensure start = 0
                jsr son.cmd     ;send to CPU #3
                jsr delay1      ;wait for first firing
rp3.1           jsr sonar
                rts
;
```

```
recharge
                jsr aux.pwr     ;connected to auxilliary power?
                bvc not.con     ;continue if not connected
                jsr bld.pow     ;'connected to building power'
                jmp recharge
not.con         jsr bat.vol     ;announce battery voltage
                jsr stp.chk     ;check drive power and emergency stop
lk.agn          jsr bkn.off
                jsr delay5
                ldx #$02        ;position head full right
                jsr posit
                jsr bkn.son     ;initialize sonars for beacon search
bkn.lk          jsr home        ;locate the beacon
                ldy #22         ;twenty two second time out
s.loop          jsr delay1      ;delay for beacon search
                jsr bkn.fnd     ;beacon located?
                lda trk.flg
                bne go.hed      ;continue if beacon located
                dey :           ;loop counter
                bne s.loop      ;loop if default time not up
                jsr bkn.off     ;turn off beacon
                jsr delay2
                jsr do180       ;do 180 deg turn
                jsr delay5
                jmp bkn.lk
go.hed          jsr dock        ;dock with charger
                jsr exit        ;exit routine?
                bvs rec.ret     ;exit if button depressed
                jsr delay.5
                jsr aux.pwr     ;connected to charger?
                bvc lk.agn      ;if not, reinitiate search
                lda #$ff        ;indicates connected to charger
                sta rch.flg
                jsr bkn.rep     ;send the report to Planner
                jsr ckt.com     ;'circuit complete'
rec.ret         jsr delay2
                jsr center      ;center head
                jsr bkn.off     ;turn off beacon
                jsr delay2
                jsr initial     ;power down
                rts
;
exit            txa :           ;save X
                pha
                ldx #$85        ;input 5 on selector 8
                jsr sel.chk     ;read "exit" button
                pla :           ;recover X
                tax
                rts
;
bld.pow         ldx #$51        ;'error'
                jsr vox1
                jsr delay1
                ldx #$0e        ;'building"
                jsr vox3
                ldx #$36        ;'power'
                jsr vox3
                ldx #$13        ;'connect-'
                jsr vox2
                ldx #$1f        ;'ed'
                jsr vox2
                jsr delay5
                rts
;
head            bit orb2        ;check head a/d flag
                bpl head        ;wait till high for sync
                lda #$ff
                sta trk.flg     ;set tracking flag
                sta t2clo
                lda #$ff
                sta t2chi
chk             lda #$20        ;set T2 interrupt mask
                bit ifr2
```

```
                bne lost        ;branch if timed out
                bit orb2        ;check head a/d flag
                bmi chk         ;loop until goes low
                jsr eocl        ;read a/d value from CPU #2
                sta hd.pos      ;save temporarily
                jmp hd.ret
lost            lda #$00        ;clear tracking flag
                sta trk.flg     ;indicating beacon lost
hd.ret          rts
;
bkn.fnd         lda #$ff
                sta trk.flg     ;set tracking flag
                sta t2clo
                lda #$ff
                sta t2chi
fnd?            lda #$20        ;set T2 interrupt mask
                bit ifr2
                bne none        ;branch if timed out
                bit orb2        ;check head a/d flag
                bmi fnd?        ;loop until goes low
                jmp bkn.ret
none            lda #$00        ;clear tracking flag
                sta trk.flg     ;indicating beacon lost
bkn.ret         rts
;
bkn.rep
                jsr head        ;read head position into hd.pos
                lda trk.flg     ;beacon lost?
                beq br.ret      ;branch if beacon lost
                jsr zer.buf     ;clear output buffer
                lda #'8         ;packet ID
                sta out.buf
                lda rch.flg     ;check recharge status flag
                cmp #$ff        ;connected to charger?
                beq bkn.pak     ; if so, skip
                ldx #$22        ;'optical sensors tracking target'
                jsr vox4
                jsr bkn.rng     ;voice output range to beacon
                jsr son.scl     ;scale sonar data to one byte
bkn.pak         ldx #$01        ;buffer index
                lda rch.flg     ;recharging status flag
                jsr buf.byt     ;load into buffer
                lda hd.pos      ;recall head position
                jsr buf.byt     ;load into buffer
                lda rng.lol+1
                jsr buf.byt     ;load sonar range
                lda #$0d        ;end with carriage return
                sta out.buf,X
                jsr outpak      ;send out the packet
br.ret          rts
;
lp.rng          dec pass        ;decrement loop counter
                bne lp.ret
                lda #$0a        ;number of passes
                sta pass
                jsr hndshk3     ;read range to beacon
                jsr son.scl     ;scale to one byte
                lda rng.lol+1
                lsr A           ;divide by 2
                lsr A
                lsr A
                sta rng.lol     ;store at head of range table
lp.ret          rts
;
dock            lda #$ff        ;clear previous drive command
                sta drv.cmd
                lda #$04
                sta max.spd     ;limit maximum speed during docking
                lda #$00
                sta rch.flg     ;set recharging status flag
                jsr bkn.rep     ;check and report beacon position
                lda #$01        ;set to fire sonar 1 on first
                sta pass        ; pass through loop (lp.rng)
```

```
dock0           jsr exit        ;exit routine?
                bvs bkn.lst     ;branch if exit button pressed
                jsr lp.rng      ;read sonar range to beacon
                jsr head        ;read head position into hd.pos
                lda trk.flg     ;beacon lost?
                beq bkn.lst     ;branch if beacon lost
                lda #$02
                jsr set.cf      ;set correction factor
                lda hd.pos      ;recall head position
                cmp #$60        ;head < $60 (hard right)?
                bcs dock1       ;branch if not
                lda #$10        ;set for right turn
                jmp dr.com
dock1           cmp #$a0        ;head > $a0 (hard left)?
                bcc dock2       ;branch if not
                lda #$01        ;set for left turn
                jmp dr.com
dock2           cmp #$70        ;head < $70 (right)?
                bcs dock3       ;branch if not
                lda rng.lol     ;get scaled sonar range
                jsr calc.sp     ;calculate mean speed command
                jsr off.rt      ;alter course to right
                jmp dr.com
dock3           cmp #$90        ;head > $90 (left)?
                bcc dock4       ;branch if not
                lda rng.lol     ;get scaled sonar range
                jsr calc.sp     ;calculate mean speed command
                jsr off.lf      ;alter course to left
                jmp dr.com
dock4           pha
                lda #$01
                jsr set.cf      ;set correction factor
                pla
                cmp #$7e        ;head < $7e (right)?
                bcs dock5       ;branch if not
                lda rng.lol     ;get scaled sonar range
                jsr calc.sp     ;calculate mean speed command
                jsr off.rt      ;alter course to right
                jmp dr.com
dock5           cmp #$82        ;head > $81 (left)?
                bcc dock6       ;branch if not
                lda rng.lol     ;get scaled sonar range
                jsr calc.sp     ;calculate mean speed command
                jsr off.lf      ;alter course to left
                jmp dr.com
dock6           lda rng.lol     ;get scaled sonar range
                jsr calc.sp     ;head is centered within tolerance
dr.com          jsr drv.fwd     ;issue drive command
                jsr aux.pwr     ;connected to recharger yet?
                bvc dock0       ;loop if not yet connected
bkn.lst         jsr halt        ;beacon lost, stop robot motion
                rts
;
drv.fwd         cmp drv.cmd     ;drive command same as previous?
                beq skip        ;do not repeat if same
                pha :           ;save drive command on stack
                lda #$00        ;set mode 0 for forward
                sta cur.mod     ;save for later reference
                jsr mode
                pla :           ;recall speed command
                jsr cpu4        ;latch command into cpu4
                pha
                jsr delay       ;delay for drive command to be read
                pla
skip            sta drv.cmd     ;save for later reference
                rts
;
bkn.rng
                jsr wait1
                jsr hndshk3
                jsr delay.5
                jsr hndshk3     ;get sonar range to beacon
                jsr delay.5
```

```
                ldy #$01     ;sonar #1
                lda rng.lol,Y
                sta rng.lol  ;save temporarily
                lda rng.hil,Y
                sta rng.hil  ;else clobbered by VOX routine
                jsr son.rngl          ;convert to feet and inches
                ldx #$5e     ;'range'
                jsr vox2
                jsr wait.5
                jsr tlk.ft   ;say feet
                jsr wait.5
                jsr say.inc  ;say inches
                lda rng.lol  ;now restore sonar 1 data
                sta rng.lol,Y
                lda rng.hil
                sta rng.hil,Y
                rts
;
bkn.son         jsr cpu3.on  ;energize CPU #3
                jsr delay.5
                lda #$11     ;sonar # 1 only
                jsr son.cmd
                jsr hndshk3
                jsr delay.5
                jsr hndshk3
                rts
;
do180           lda #$06     ;temporary fix to set displacement
                jsr mode
                lda #$b4     ;180 degrees
                jsr cpu4     ;send to CPU # 4
                jsr delay
                lda #$02     ;mode 2
                jsr mode     ;to pivot left
                lda #$33     ;speed $33
                jsr cpu4     ;send to CPU # 4
                jsr delay.5
do180.1         ldx #$2d     ;check drive motion verify
                jsr sel.chk  ;on selector 2
                bvs do180.1  ;branch if high (moving)
                rts
;
xmt             lda orb2
                and #$fd     ;set PB1 low
                sta orb2     ;to turn on transmitter
                jsr delay.5  ;delay for transmission pulse width
                lda orb2
                ora #$02     ;turn off transmitter
                sta orb2
                rts
;
bkn.on          sei
                jsr xmt      ;transmit pulse
                jsr delay1   ;delay between pulses
bkn.off         sei
                jsr xmt      ;transmit pulse
bkn.end         cli
                rts
;
aux.pwr         ldx #$4c     ;input 12 on selector 4
                jsr sel.chk  ;see if auxiliary power present
pwr.det         rts
;
set.cf          clc
                ror A        ;divide CF in A by 2
                sta cf.sub   ;save as negative correction factor
                adc #$00     ;add the carry bit
                sta cf.add   ;save as positive correction factor
                rts
;
up              ldx #$8d
                jsr vox1
                ldx #$65
```

```
                jsr vox3
                ldx #$81
                jsr vox1
                rts
;
ckt.com         ldx #$0f     ;'circuit'
                jsr vox2
                ldx #$12     ;'complete'
                jsr vox2
                rts
;
track           lda #$01     ;mode 1
                jsr mode
                jsr cpu2     ;send to CPU #2
                rts
;
calc.sp         clc
                adc #$01     ;add an offset to increase speed
                cmp max.spd  ;ensure not greater than maximum
                bcc cs1      ;branch < max
                lda max.spd  ;else reset to maximum
cs1             sta temp     ;save temporarily
                jsr nib.lf   ;shift to high
                ora temp     ;copy back to low
                rts
;
off.rt
                sta temp     ;save temporarily
                and #$0f     ;lower nibble for stbd motor
                sec :        ;subtract correction factor
                sbc cf.sub   ;to reduce speed command stbd motor
                beq or0      ;branch if zero
                bpl or1      ;branch unless negative
or0             lda #$01     ;reset to minimum value
or1             pha :        ;save on stack
                lda temp     ;recall original speed value
                and #$f0     ;for port motor
                jsr nib.rt   ;shift port command to lower nibble
                clc
                adc cf.add   ;increase speed command for port motor
                jsr nib.lf   ;shift back to upper nibble
                sta temp
                pla :        ;recall new stbd command
                ora temp     ;recombine them
                jsr drv.fwd  ;pass to CPU #4
                rts
;
off.lf
                sta temp     ;save temporarily
                jsr nib.rt   ;shift port command to lower nibble
                sec :        ;subtract correction factor
                sbc cf.sub   ;to reduce speed command port motor
                beq ol0      ;branch if zero
                bpl ol1      ;branch unless negative
ol0             lda #$01     ;reset to minimum value
ol1             jsr nib.lf   ;shift back to upper nibble
                pha :        ;save on stack
                lda temp     ;recall original speed value
                and #$0f     ;for stbd motor
                clc
                adc cf.add   ;increase speed command stbd motor
                sta temp     ;save temporarily
                pla :        ;recall new port command
                ora temp     ;recombine them
                jsr drv.fwd  ;pass to CPU #4
                rts
;
follow          lda #$79     ;send command to ping sonars 7 - 9
                jsr son.cmd
                jsr delay.5
                jsr hndshk3
                jsr flush    ;flush sonar buffer
                lda #$00     ;initialize drive command register
```

Apr 18 1991 11:56:36 mod13e.asm Page 11

```
                sta drv.cmd
fol             jsr hndshk3   ;get ranges from CPU #3
fol.0           ldy #$07      ;set index to start on sonar #7
                sty nearest
                jsr crlf
                lda #$00      ;initialize status registers
                sta col.sta   ;for pivoting
                sta fol.sta   ;and following
                jsr fol.1     ;set collision status register
                jsr fol.2     ;set follow status register
                jsr dis.sta   ;display status registers
                jsr hndshk3   ;get new ranges from CPU #3
                jsr react     ;follow target based on status register
                jsr exit      ;check for "exit" request
                bvs fol.ret   ;branch if set
                jmp fol.0     ;loop back
fol.ret         jsr halt      ;stop robot motion
                rts
;
cal.spd         lda near+1    ;recall closest range
                pha
                rol near      ;scale it
                rol near+1
                pla
                clc
                adc near+1
                cmp #$0b      ;ensure not greater than $0b
                bcc c.sl      ;branch < maximum allowed
                lda #$0b      ;else reset
c.sl            sta temp      ;save temporarily
                jsr nib.lf    ;shift to high
                ora temp      ;combine with low
                jsr outbyt
                jsr space     ;pass back in A
                rts
;
abs.dif         lda diff+1    ;get absolute value
                eor #$ff      ;by two's complement
                sta diff+1
                lda diff
                eor #$ff
                clc
                adc #$01      ;plus one
                sta diff
                lda diff+1
                adc #$00
                sta diff+1
                rts
;
fol.1           ldy #$07      ;initialize index
                lda rng.lol,Y
                sta near      ;and initialize registers
                lda rng.hil,Y
                sta near+1    ;assume for now #7 closest
                lda #$02
                sta mask      ;initialize mask for status registers
fol.11
                jsr min.rng   ;calculate closest range
                jsr pivot?    ;check for minimum range
                iny
                cpy #$0a
                bcc fol.11
                rts
;
fol.2           ldy #$07      ;reinitialize index
                lda #$02
                sta mask      ;and mask
fol.21          jsr follow?   ;check for targets
                iny
                cpy #$0a      ;finished?
                bcc fol.21
                rts
;
```

Apr 18 1991 11:56:36 mod13e.asm Page 12

```
dis.sta         lda nearest   ;recall index nearest range
                jsr outbyt
                jsr space
                lda near+1    ;print closest range
                jsr outbyt
                lda near
                jsr outbyt
                jsr space
                lda col.sta   ;recall collision status register
                jsr hex.bin   ;print out in binary format
                lda fol.sta   ;recall follow status register
                jsr hex.bin   ;print out in binary format
                rts
;
min.rng         sec :         ;subtract nearest range from range Y
                lda rng.lol,Y
                sbc near      ;subtract low byte
                lda rng.hil,Y
                sbc near+1    ;subtract high byte
                bpl mr.ret    ;return if plus
                sty nearest   ;else save index of nearest range
                lda rng.hil,Y
                sta near+1    ;and reset registers to closer range
                lda rng.lol,Y
                sta near
mr.ret          rts
;
pivot?          asl mask      ;shift mask bit to left
                lda rng.hil,Y
                bne piv.2     ;check for minimum range
                lda col.sta   ;recall collision status register
                ora mask      ;set bit high if < minimum range
                sta col.sta   ;save in collision status register
piv.2           rts
;
hex.bin         sta temp      ;save temporarily
                lda #$80
                sta mask
                jsr space
                jsr space
hb0             lda mask
                cmp #$08
                bne hb1
                jsr space     ;space between nibbles
hb1             lda temp      ;recall hex value
                bit mask
                bne hb2
                lda #'0
                jsr outchr
                jmp hb3
hb2             lda #'1
                jsr outchr
hb3             lsr mask
                bne hb0
                jsr space
                jsr space
                rts
;
follow?         asl mask      ;shift mask bit to left
                sec :         ;subtract closest range from all ranges
                lda rng.lol,Y
                sbc near      ;low byte of closest range
                sta diff      ;save in difference registers
                lda rng.hil,Y
                sbc near+1    ;high byte of closest range
                sta diff+1
fol?2           lda diff+1    ;get high byte of difference
                bne fol?4     ;branch if not zero
                lda diff      ;get low byte
                cmp #$40      ;within specified tolerance?
                bcs fol?4     ;branch if not
                lda fol.sta   ;else recall follow status register
                ora mask      ;set appropriate bit high
```

```
4380              sta fol.sta   ;save in follow status register
4385  fol?4       rts
4390  ;
4395  react       lda col.sta   ;recall collision status register
4400              beq forward   ;branch if not set
4405  piv.chk     cmp #$04      ;sensor #7
4410              bne center?
4415              jsr piv.rt    ;pivot right
4420              jmp for.ret
4425  center?     cmp #$10      ;sensor #9?
4430              bne piv.ret   ;halt if centered
4435              jsr piv.lf    ;pivot left
4440              jmp for.ret
4445  forward     lda #$05      ;set raw CF
4450              sta cf
4455              jsr set.cf    ;set CF plus and CF minus
4460              lda fol.sta   ;recall follow status register
4465              cmp #$04      ;sensor #7?
4470              bne not4
4475              jsr cal.spd   ;calculate mean speed
4480              jsr off.rt    ;offset to turn right
4485              jmp for.ret
4490  not4        cmp #$10      ;sensor #9?
4495              bne not10
4500              jsr cal.spd   ;calculate mean speed
4505              jsr off.lf    ;offset to turn left
4510              jmp for.ret
4515  not10       lda #$02      ;set raw CF
4520              sta CF
4525              jsr set.cf
4530              lda fol.sta   ;recall follow status
4535              cmp #$0c      ;sensors #7 and #8?
4540              bne notc
4545              jsr cal.spd
4550              jsr off.rt    ;offset to turn right
4555              jmp for.ret
4560  notc        cmp #$18      ;sensors #8 and #9?
4565              bne not18
4570              jsr cal.spd
4575              jsr off.lf    ;offset to turn left
4580              jmp for.ret
4585  not18       jsr cal.spd   ;calculate mean speed
4590              jsr drv.fwd   ;set drive forward and pass speed command
4595              jmp for.ret
4600  piv.ret     jsr halt      ;else halt
4605              jsr delay
4610  for.ret     rts
4615  ;
4620  piv.lf      lda #$02      ;mode 2 to pivot left
4625              jmp p.m
4630  piv.rt      lda #$03      ;mode 3 to pivot right
4635  p.m         jsr mode
4640              lda #$11      ;minimum speed
4645              jsr cpu4
4650              jsr delay
4655              rts
4660  ;
4665  flush       ldx #$00
4670  flush1      lda #$ff
4675              sta rng.lo1,X
4680              inx
4685              cpx #13       ;finished?
4690              bne flush1
4695              rts
4700  ;
4705  hex.vox     jsr hex.bcd   ;voice output hex number
4710              tax :         ;recall hundreds
4715              beq hv1       ;say nothing if zero
4720              jsr vox0
4725  hv1         tya :         ;recall tens and units
4730              tax
4735              jsr vox0
4740              rts
```

```
 4745  ;
 4750            .en
//

>la^M



LABEL FILE:  [ / = EXTERNAL ]


start=0000          stop=0001           rng.lo1=0002
rng.hi1=000F        rng.lo2=001C        rng.hi2=0029
feet=0036           inches=0037         in/10=0038
max.rng=0039        D=003A              Z=003B
temp=003C           char=003D           mask=003E
portsv=003F         fault=0040          pass=0041
prv.err=0042        ty.flg=0043         zone=0044
mux.flg=0045        col.sta=0046        fol.sta=0047
diff=0048           cf=0049             tol=004A
tol.hi=004B         nearest=004C        near=004D
near.hi=004E        drv.cmd=004F        hd.pos=0050
trk.flg=0051        Vx=0052             Vy=0053
theta.l=0054        theta.h=0055        UT=0056
LT=0057             carry=0058          crc.hi=0059
crc.lo=005A         buffer=005B         int.flg=005D
mw.flg=005E         us.flg=005F         ir.flg=0060
op.flg=0061         dh.flg=0062         vb.flg=0063
cmp.thr=0064        buf.ind=0065        dh.thr=0066
veloc=0067          displ=0068          hours=0069
minutes=006A        seconds=006B        cur.mod=006C
sys.flg=006D        max.spd=006E        rch.flg=006F
cf.add=0070         cf.sub=0071         dh.brg=0072
prv.brg=0073        count=0074          dih.flg=0075
index=0076          CF=0077             wan.flg=0078
/acr3=A633          in.buf=7E00         out.buf=7F00
/t2clo=A008         /t2chi=A009         /ifr2=A00D
/ddra1=A003         /ora1=A001          /ddrb1=A002
/orb1=A000          /ddra2=A803         /ora2=A801
/ddrb2=A802         /orb2=A800          /ddra3=AC03
/ora3=AC01          /ddrb3=AC02         /orb3=AC00
/ddra4=A401         /ora4=A400          /orb4=A402
/PCR2=A80C          /irq.vec=A678       /IER2=A80E
/IFR2=A80D          /techo=A653         /toutfl=A654
/inchr=8A1B         /inbyt=81D9         /ascnib=8275
/outbyt=82FA        /nibasc=8309        /crlf=834D
/comma=833A         /space=8342         /outchr=8A47
/nbasoc=8A44        /son.rngl=C000      /replay=C0E1
/son.com=C11B       /cpu2=C133          /cpu3=C139
/cpu4=C13F          /vox0=C169          /vox1=C16E
/vox2=C173          /vox3=C178          /vox4=C17D
/vox=C17F           /mode=C19D          /ld.time=C1AC
/wait.5=C1F2        /delay.5=C1F5       /delay1=C1FA
/delay2=C1FF        /delay3=C204        /delay4=C209
/delay5=C20E        /wait1=C213         /wait2=C218
/wait3=C21D         /wait4=C222         /wait5=C227
/delay=C230         /cp5.pwr=C25E       /if.on=C283
/if.off=C28C        /cpu2.on=C295       /cpu3.on=C2A0
/cpu4.on=C2AB       /cpu5.on=C2B6       /cpu2.off=C2BF
/cpu3.off=C2CA      /cpu4.off=C2D5      /cpu5.off=C2E0
/tlk.ft=C303        /say.ft=C31D        /say.inc=C329
/cpu.up=C340        /posit=C34B         /scan=C355
/seek=C35E          /center=C367        /drive=C36D
/home=C3E8          /halt=C3F1          /hndshk3=C3FA
/rd.dmp=C412        /set.son=C451       /disply=C45D
/son.one=C464       /sel.chk=C476       /sel.dis=C482
/select0=C4BE       /select1=C4C5       /select2=C4CC
/select3=C4D3       /tmp.chk=C505       /rm.tmp=C515
/sys.tmp=C522       /a/d=C534           /eoc1=C53D
/rel.hum=C5B4       /nib.rt=C55A        /nib.lf=C55F
/sel.tes=C564       /sir.on=C5C6        /sir.off=C5CE
/thank=C5D7         /intrude=C5E7       /bat.vol=C628
/greet=C65E         /qstart=C664        /sht.dwn=C683
```

```
/drv.chk=C6AB        /stp.chk=C6B8        /pow.chk=C6F1
/stp.tst=C72D        /delchk<=C76C        /delchk>=C784
/rs232=C79C          /initial=C7BC        /dmp.pak=C800
/buf.byt=C816        /son.scl=C82C        /son.pak=C894
/inpak=C8DF          /zer.buf=C8FE        /hex.bcd=C962
/jog.lf=C9E0         /jog.rt=C9F8         /rd.buf=CA31
/paraml=CA8F         /outpak=CE39         /survey=CE51
/son.cmd=CED5        sonar=D000           H.parse=D00D
H0=D013              H1=D021              H2=D02B
H3=D035              H.err=D03F           H.ret=D044
T.parse=D045         T1=D051              sys.pow=D08B
sys.on=D090          sys.off=D096         sp.ret=D099
son.pow=D09A         son.off=D09F         vox.pow=D0A8
vox.on=D0AD          vox.off=D0B2         vp.ret=D0B4
col.arr=D0B8         ca.en=D0BD           ca.dis=D0C8
cla.ret=D0D0         report1=D0D1         rp1.1=D0E8
report3=D0EC         rp3.1=D108           recharge=D10C
not.con=D117         lk.agn=D11D          bkn.lk=D12B
s.loop=D130          go.hed=D14D          rec.ret=D168
exit=D178            bld.pow=D182         head=D1A2
chk=D1B4             lost=D1C9            hd.ret=D1CE
bkn.fnd=D1CF         fnd?=D1DC            none=D1EB
bkn.ret=D1F0         bkn.rep=D1F1         bkn.pak=D213
br.ret=D22F          lp.rng=D230          lp.ret=D249
dock=D24A            dock0=D261           dock1=D282
dock2=D28B           dock3=D29B           dock4=D2AB
dock5=D2C2           dock6=D2D2           dr.com=D2D8
bkn.lst=D2E0         drv.fwd=D2E4         skip=D2FB
bkn.rng=D2FF         bkn.son=D33D         do180=D352
do180.1=D36C         xmt=D374             bkn.on=D388
bkn.off=D38F         bkn.end=D393         aux.pwr=D395
pwr.det=D39A         set.cf=D39B          up=D3A6
ckt.com=D3B6         track=D3C1           calc.sp=D3CA
csl=D3D5             off.rt=D3DF          or0=D3EC
orl=D3EE             off.lf=D409          ol0=D417
oll=D419             follow=D431          fol=D444
fol.0=D447           fol.ret=D46E         cal.spd=D472
c.sl=D487            abs.dif=D497         fol.1=D4B3
fol.11=D4C6          fol.2=D4D2           fol.21=D4D9
dis.sta=D4E2         min.rng=D507         mr.ret=D525
pivot?=D526          piv.2=D537           hex.bin=D538
hb0=D546             hb1=D550             hb2=D560
hb3=D565             follow?=D571         fol?2=D587
fol?4=D59C           react=D59D           piv.chk=D5A2
center?=D5AC         forward=D5B6         not4=D5CE
not10=D5DB           notc=D5F3            not18=D600
piv.ret=D609         for.ret=D60F         piv.lf=D610
piv.rt=D615          p.m=D617             flush=D623
flushl=D625          hex.vox=D630         hvl=D639

//0000,D63F,0E3F
>
```

Apr 18 1991 11:56:36 mod14e.asm Page 1

```
^M
0005  ;
0010  ;
0015  ;
0020  ;        FILENAME:  mod14e               10 April 1990
0025  ;
0030  ;        Split from rf19                 30 January 90
0035  ;
0040  ;        This code runs on CPU #1  (SCHEDULER)
0045  ;
0050  ;
0055              .ba $0
0060              .os
0065              .ce
0070  ;
0075  start      .ds 1
0080  stop       .ds 1
0085  rng.lo1    .ds 13
0090  rng.hi1    .ds 13
0095  rng.lo2    .ds 13
0100  rng.hi2    .ds 13
0105  feet       .ds 1
0110  inches     .ds 1
0115  in/10      .ds 1
0120  max.rng    .ds 1
0125  D          .ds 1
0130  Z          .ds 1
0135  temp       .ds 1
0140  char       .ds 1
0145  mask       .ds 1
0150  portsv     .ds 1
0155  fault      .ds 1
0160  pass       .ds 1
0165  prv.err    .ds 1
0170  ty.flg     .ds 1
0175  zone       .ds 1
0180  mux.flg    .ds 1
0185  col.sta    .ds 1
0190  fol.sta    .ds 1
0195  diff       .ds 1
0200  cf         .ds 1
0205  tol        .ds 1
0210  tol.hi     .ds 1
0215  nearest    .ds 1
0220  near       .ds 1
0225  near.hi    .ds 1
0230  drv.cmd    .ds 1
0235  hd.pos     .ds 1
0240  trk.flg    .ds 1
0245  stp.cod    .ds 1
0250  volts      .ds 1
0255  theta.l    .ds 1
0260  theta.h    .ds 1
0265  UT         .ds 1
0270  LT         .ds 1
0275  carry      .ds 1
0280  crc.hi     .ds 1
0285  crc.lo     .ds 1
0290  buffer     .ds 2
0295  int.flg    .ds 1
0300  mw.flg     .ds 1
0305  us.flg     .ds 1
0310  ir.flg     .ds 1
0315  op.flg     .ds 1
0320  dh.flg     .ds 1
0325  vb.flg     .ds 1
0330  cmp.thr    .ds 1
0335  buf.ind    .ds 1
0340  dh.thr     .ds 1
0345  veloc      .ds 1
0350  displ      .ds 1
0355  hours      .ds 1
0360  minutes    .ds 1
```

Apr 18 1991 11:56:36 mod14e.asm Page 2

```
0365  seconds    .ds 1
0370  cur.mod    .ds 1
0375  sys.flg    .ds 1
0380  max.spd    .ds 1
0385  rch.flg    .ds 1
0390  cf.add     .ds 1
0395  cf.sub     .ds 1
0400  dh.brg     .ds 1
0405  prv.brg    .ds 1
0410  count      .ds 1
0415  dih.flg    .ds 1
0420  index      .ds 1
0425  CF         .ds 1
0430  wan.flg    .ds 1
0435  res.reg    .ds 1
0440  max.saf    .ds 1
0445  avg.vel    .ds 1
0450  ;
0455  scr3       .de $a633
0460  ;
0465             .ba $7e00
0470  in.buf     .ds 256
0475  out.buf    .ds 256
0480  ;
0485             .ba $d800
0490             .mc $800      ;move code for EPROM burner
0495  ;
0500  t2clo      .de $a008
0505  t2chl      .de $a009
0510  ifr2       .de $a00d
0515  ddra1      .de $a003
0520  ora1       .de $a001
0525  ddrb1      .de $a002
0530  orb1       .de $a000
0535  ddra2      .de $a803
0540  ora2       .de $a801
0545  ddrb2      .de $a802
0550  orb2       .de $a800
0555  ddra3      .de $ac03
0560  ora3       .de $ac01
0565  ddrb3      .de $ac02
0570  orb3       .de $ac00
0575  ddra4      .de $a401
0580  ora4       .de $a400
0585  orb4       .de $a402
0590  PCR2       .de $a80c
0595  irq.vec    .de $a678
0600  IER2       .de $a80e
0605  IFR2       .de $a80d
0610  techo      .de $a653
0615  toutfl     .de $a654
0620  ;
0625  inchr      .de $8a1b
0630  inbyt      .de $81d9
0635  ascnib     .de $8275
0640  outbyt     .de $82fa
0645  nibasc     .de $8309
0650  crlf       .de $834d
0655  comma      .de $833a
0660  space      .de $8342
0665  outchr     .de $8a47
0670  nbasoc     .de $8a44
0675  ;
0680  ;
0685  ;        Library Module 11 Subroutines
0690  ;
0695  replay     .de $c0e1
0700  cpu3       .de $c139
0705  cpu4       .de $c13f
0710  vox0       .de $c169
0715  vox1       .de $c16e
0720  vox2       .de $c173
0725  vox3       .de $c178
```

```
vox4      .de $c17d
vox       .de $c17f
mode      .de $c19d
ld.time   .de $c1ac
wait.5    .de $c1f2
delay.5   .de $c1f5
delay1    .de $c1fa
delay2    .de $c1ff
delay3    .de $c204
wait1     .de $c213
wait2     .de $c218
wait3     .de $c21d
delay     .de $c230
lf.on     .de $c283
lf.off    .de $c28c
posit     .de $c34b
scan      .de $c355
center    .de $c367
drive     .de $c36d
home      .de $c3e8
halt      .de $c3f1
hndshk3   .de $c3fa
set.son   .de $c451
disply    .de $c45d
son.one   .de $c464
sel.chk   .de $c476
sel.dis   .de $c482
tmp.chk   .de $c505
rm.tmp    .de $c515
sys.tmp   .de $c522
a/d       .de $c534
rel.hum   .de $c5b4
nib.rt    .de $c55a
nib.lf    .de $c55f
sel.tes   .de $c564
sir.on    .de $c5c6
sir.off   .de $c5ce
thank     .de $c5d7
intrude   .de $c5e7
bat.vol   .de $c628
greet     .de $c65e
qstart    .de $c664
sht.dwn   .de $c683
drv.chk   .de $c6ab
stp.chk   .de $c6b8
pow.chk   .de $c6f1
stp.tst   .de $c72d
delchk<   .de $c76c
delchk>   .de $c784
rs232     .de $c79c
initial   .de $c7bc
;
;
;         Library Module 12 Subroutines
;
dmp.pak   .de $c800
buf.byt   .de $c816
son.scl   .de $c82c
son.pak   .de $c894
inpak     .de $c8df
zer.buf   .de $c8fe
hex.bcd   .de $c9b2
jog.lf    .de $c9e0
jog.rt    .de $c9f8
rd.buf    .de $ca31
cam.on    .de $ca10
cam.off   .de $ca20
report2   .de $ca97
new.son   .de $cbe9
sec.pow   .de $cdec
outpak    .de $ce39
survey    .de $ce51
new.cmd   .de $ce9f
```

```
son.cmd   .de $ced5
;
;
;
;         Library Module 13 Subroutines
;
sonar     .de $d000
H.parse   .de $d00d
T.parse   .de $d045
sys.pow   .de $d08b
son.pow   .de $d09a
vox.pow   .de $d0a8
col.arr   .de $d0b8
report1   .de $d0d1
report3   .de $d0ec
recharge  .de $d10c
drv.fwd   .de $d2e4
set.cf    .de $d39b
off.rt    .de $d3df
off.lf    .de $d409
flush     .de $d623
;
;
;         Main Code
;
siren     ldx #4         ;get next parameter
          lda in.buf,X
          cmp #'0
          beq sr.off     ;turn off siren
          jsr sir.on     ;turn on siren
          jmp sir.ret
sr.off    jsr sir.off
sir.ret   rts
;
camera    ldx #4         ;get next parameter
          lda in.buf,X
          cmp #'0
          beq c.off      ;turn off
          jsr cam.on     ;turn on
          jmp cam.ret
c.off     jsr cam.off
cam.ret   rts
;
report9   ;move complete report
          jsr zer.buf    ;zero out the output buffer
          ldx #5         ;battery voltage
          jsr a/d
          sta volts
          lda #'9        ;move complete report
          sta out.buf    ;packet ID
          lda #'M
          sta out.buf+1
          ldx #$02
          lda cur.mod    ;recall current mode
          jsr buf.byt    ;place in output buffer
          lda veloc      ;recall velocity
          jsr buf.byt
          lda displ      ;recall displacement
          jsr buf.byt
          lda stp.cod
          jsr buf.byt
          lda volts
          jsr buf.byt
          lda #$0d       ;end with carriage return
          sta out.buf,X
          jsr outpak     ;send the packet
          rts
;
report7   jsr zer.buf    ;zero out the output buffer
          lda #'7        ;packet ID
          sta out.buf
          jsr sonar      ;get sonar data and report
          rts
```

```
          ;
hex.vox   jsr hex.bcd  ;voice output hex number
          tax :        ;recall hundreds
          beq hvl      ;say nothing if zero
          jsr vox0
hvl       tya :        ;recall tens and units
          tax
          jsr vox0
          rts
          ;
V.parse   ldx #2       ;check second parameter
V.0       cpx buf.ind  ;EOF?
          beq V.ret    ;branch and quit
          bcs V.ret    ;if X >= EOF
          jsr rd.buf   ;read vox routine number
          cmp #$00     ;VOX 0?
          bne V1
          jsr rd.word  ;read word number for vox routine
          jsr vox0
          jmp V.loop
V1        cmp #$01     ;VOX 1?
          bne V2
          jsr rd.word  ;read word number
          jsr vox1
          jmp V.loop
V2        cmp #$02     ;VOX 2?
          bne V3
          jsr rd.word  ;read word number
          jsr vox2
          jmp V.loop
V3        cmp #$03     ;VOX 3?
          bne V4
          jsr rd.word  ;read word number
          jsr vox3
          jmp V.loop
V4        cmp #$04     ;VOX 4?
          bne V.ret
          jsr rd.word  ;read word number
          jsr vox4
V.loop    ldx index    ;recall X
          jmp V.0      ;and loop back
rd.word   jsr rd.buf   ;read word number from buffer
          sta temp     ;save temporarily
          stx index    ;save X temporarily
          ldx temp     ;recall word number
V.ret     rts
          ;
R.parse   ldx #2       ;check second parameter
          lda in.buf,X
          cmp #'1      ;Report 1?
          bne R2
          jsr report1  ;send collision sonar data
          jmp R.ret    ;loop
R2        cmp #'2      ;Report 2?
          bne R3       ;branch if not 2
          jsr report2  ;send robot status report
          jmp R.ret    ;loop
R3        cmp #'3      ;Report3?
          bne R4       ;branch if not 3
          jsr report3  ;send navigation sonar data
          jmp R.ret    ;loop
R4        cmp #'4      ;Report 4?
          bne R5       ;branch if not 4
R5        cmp #'5      ;Report 5?
          bne R8
R8        cmp #'8      ;Report 8?
          bne R.err
          jsr report8  ;activate recharging and send report
          jmp R.ret    ;loop
R.err     ldx #$51     ;'error'
          jsr vox1
R.ret     rts
          ;
```

```
M.parse   ldx #2       ;check second parameter
          jsr rd.buf
          sta cur.mod
          jsr rd.buf   ;get velocity from buffer
          sta veloc    ;save in velocity register
          jsr rd.buf   ;get displacement from buffer
          sta displ    ;store in displacement register
M.0       lda displ    ;recall displacement
          cmp #$ff     ;unlimited displacement?
          beq M.1      ;if so, skip
          lda #$06     ;mode 6 (temporary)
          jsr mode
          lda displ    ;recall displacement duration
          jsr cpu4
          jsr delay
M.1       lda cur.mod  ;recall mode
          jsr mode
          lda veloc    ;recall velocity
          jsr cpu4
          jsr delay
          lda displ    ;recall displacement parameter
          cmp #$ff     ;unlimited displacement?
          beq M.ret    ;if so, skip 'move complete' report
          ldy #$04     ;loop counter
M.2       jsr delay.5
          lda cur.mod  ;check for stop command
          cmp #$07     ;mode 7?
          beq M.4      ;don't wait for motion if stopped
          dey
          bne M.3      ;branch if time not up
          jsr dr.diag  ;else do drive diagnostics
          jmp M.0      ;and reissue command to CPU #4
M.3       ldx #$2d     ;check drive motion verify
          jsr sel.chk  ;on selector 2
          bvc M.2      ;branch if low (not moving)
          jsr delay
M.4       jsr ca.map   ;collision avoidance mapping
          bcs M.6      ;kick out if collision detected
          jsr new.cmd  ;check for stop command from Planner
          bmi M.5      ;branch if no command
          jsr halt     ;else halt
          lda #$03
          sta stp.cod  ;stop code for new command
          jmp M.7      ;send move complete report
M.5       ldx #$2d     ;check drive motion verify
          jsr sel.chk  ;on selector 2
          bvs M.4      ;branch if high (still moving)
          lda #$01
          sta stp.cod  ;stop code for normal move complete
          jmp M.7
M.6       lda #$02
          sta stp.cod
M.7       jsr delay
          jsr report9  ;send move complete report
M.ret     rts
          ;
dr.diag   jsr halt     ;clear commanded motion CPU #4
          jsr delay
          jsr pow.chk  ;check drive power switch
          jsr stp.chk  ;check emergency stop control
          jsr delay2
          rts
          ;
ca.map    lda cur.mod  ;ensure mode zero (forward)
          bne ca.clr   ;else skip sonar reports
          lda #$01     ;set mask for collision array output
          bit sys.flg  ;output enabled?
          beq ca.clr   ;branch if not set (enabled)
          lda #$00
          sta wan.flg  ;disable reflexive mode
          lda start    ;sonar already configured?
          cmp #$06     ;to start with transducer 6?
          beq ca.0     ;branch if ready
```

```
                lda #$6a    ;else enable sensors 6 - 10
                jsr son.cmd ;send to CPU #3
ca.0            jsr hndshk3 ;throw away any old sonar data
                jsr delay
ca.1            jsr new.cmd ;check for stop command from Planner
                bpl ca.clr  ;break out if ordered to stop
                jsr new.son ;new sonar data?
                bmi ca.clr  ;branch if RTS high
                jsr report7 ;report collision array readings
                jsr stop?   ;check for possible collision
                bcs ca.ret  ;branch if motion halted
ca.clr          clc :       ;clear carry
ca.ret          rts
;
stop?           ldx #$06    ;check for possible collision
                lda rng.lol,X
                cmp #7      ;1.6 inch units
                bcc stp.set
                ldx #10
                lda rng.lol,X
                cmp #7      ;1.6 inch units
                bcc stp.set
                ldx #7      ;now check center three
stp?.1          lda rng.lol,X
                cmp #10     ;1.6 inch units
                bcc stp.set ;halt if less than minimum
                cpx #9      ;finished center three?
                beq stp.clr
                inx
                jmp stp?.1
stp.clr         clc
                jmp stp.ret
stp.set         jsr halt    ;halt robot motion
                lda #$08
                sta cur.mod ;reset current mode for report9
                sec :       ;set carry to flag stopping
stp.ret         rts
;
report8         ;recharging station location
                jsr recharge
                rts
;
get.pak
                jsr new.cmd ;check for a new command from CPU #9
                bmi get.pak ;branch if RTS (PB7) high
                lda #$60    ;set toutfl for COM2
                sta toutfl
                lda orbl
                and #$df    ;send CTS (PB5) low
                sta orbl
                jsr inpak   ;read in the packet from CPU #9
                lda #$b0    ;reset toutfl for COM1
                sta toutfl
                lda orbl    ;reset CTS high
                ora #$20    ;PB5
                sta orbl
                jsr echo    ;echo the packet out COM1
gp.ret          rts
;
echo            ldx #$ff
echol           inx
                lda in.buf,X
                jsr outchr
                cmp #$0d
                bne echol
                jsr crlf
                rts
;
ir.on           lda ora3    ;enable I/R circuitry
                and #$ef    ;by setting PA4 low
                jmp ir
ir.off          lda ora3    ;disable I/R circuitry
                ora #$10
```

```
ir              sta ora3
                rts
;
rd.cen          ldx #$4e    ;input 14 on selector 4
                jsr sel.chk ;check center Banner scanner
                rts
;
rd.lf           ldx #$4d    ;input 13 on selector 4
                jsr sel.chk ;check left Banner scanner
                rts
;
rd.rt           ldx #$4f    ;input 15 on selector 4
                jsr sel.chk ;check right Banner scanner
                rts
;
prx.hit         jsr rd.rt   ;check right sensor
                bvc ph.clr  ;branch if low (obstruction)
                jsr rd.cen  ;check center sensor
                bvc ph.clr  ;branch if low (obstruction)
                jsr rd.lf   ;read left sensor
                bvc ph.clr  ;branch if low (obstruction)
                sec :       ;else set carry (no hits)
                jmp ph.ret  ;and return
ph.clr          clc :       ;clear carry to indicate obstruction
ph.ret          rts
;
prx.all         jsr rd.rt   ;check right sensor
                bvs pa.set  ;branch if high (no obstruction)
                jsr rd.cen  ;check center sensor
                bvs pa.set  ;branch if high (no obstruction)
                jsr rd.lf   ;read left sensor
                bvs pa.set  ;branch if high (no obstruction)
                clc :       ;else clear carry (all 3 obstructed)
                jmp pa.ret  ;and return
pa.set          sec :       ;set carry (at least 1 not obstructed)
pa.ret          rts
;
prx.cen         jsr rd.rt   ;check right sensor
                bvc pc.set  ;branch if low (obstruction)
                jsr rd.cen  ;check center sensor
                bvs pc.set  ;branch if high (no obstruction)
                jsr rd.lf   ;read left sensor
                bvc pc.set  ;branch if low (obstruction)
                clc :       ;center sensor only is obstructed
                jmp pc.ret  ;and return
pc.set          sec :       ;set carry (not center only)
pc.ret          rts
;
turn            lda drv.cmd ;determine direction of turn
                and #$0f    ;mask off port command
                sta temp    ;store stbd command in temp
                lda drv.cmd ;recall port command
                jsr nib.rt  ;shift to lower nibble
                cmp temp    ;compare with stbd command
                rts
;
cmd.del         jsr new.cmd ;check for new command
                bpl cd.ret  ;exit delay loop if command waiting
                jsr delay
                dey
                bne cmd.del
cd.ret          rts
;
select6         ldx #$60
                lda #$6f
                jsr sel.dis
                rts
;
limits          .by 00 00 17 17 00 00 00 15 19 15 ;value
;                   NA 01 02 03 04 05 06 07 08 09 ;sensor
;
son.flg         lda #$01    ;set mask
                sta mask
```

```
                lda #$00        ;clear collision status register
                sta col.sta
                ldx #02         ;start with transducer 2
sf.1            lda rng.lol,X
                cmp limits,X
                bcs sf.2        ;branch if not less than limit
                lda col.sta     ;else recall collision status register
                ora mask        ;set the appropriate bit
                sta col.sta
sf.2            inx
                cpx #10         ;finished?
                beq sf.ret
                asl mask        ;shift the mask bit
                jmp sf.1
sf.ret          rts
;
prx.flg         jsr rd.rt       ;check right scanner
                bvs pf.1        ;branch if high (no hit)
                lda col.sta
                ora #$20        ;set sensor 7 bit
                sta col.sta
pf.1            jsr rd.cen      ;check center scanner
                bvs pf.2        ;branch no hit
                lda col.sta
                ora #$40        ;set sensor 8 bit
                sta col.sta
pf.2            jsr rd.lf       ;check left scanner
                bvs pf.ret      ;branch no hit
                lda col.sta
                ora #$80        ;set sensor 9 bit
                sta col.sta
pf.ret          rts
;
bot.hit         lda col.sta
                and #$e0        ;look at 7-9
                rts
;
top.hit         lda col.sta
                and #$03        ;look at 2-3
                rts
;
flg.dcd         lda #$00
                sta res.reg
                jsr bot.hit     ;hits on 7-9?
                bne fd.4        ;examine lower array flags
fd.0            jsr top.hit     ;hits on 2-3?
                beq fd.ret      ;exit if no sonar hits
                cmp #$03        ;both 2 & 3?
                beq fd.10       ;set C bit if both
fd.1            cmp #$01        ;sensor 2 only?
                beq fd.3
fd.2            jsr set.R       ;else set R
                jmp fd.ret
fd.3            jsr set.L       ;set L
                jmp fd.ret
fd.4            cmp #$e0        ;all three (7-9)?
                beq fd.9        ;rotate
                cmp #$40        ;center (#8) only?
                bne fd.5
                jsr top.hit     ;hits on 2-3?
                beq fd.10       ;set C flag if no top hits
                jsr set.H       ;else set H bit
                jmp fd.0        ;and examine top flags
fd.5            cmp #$a0        ;left and right only?
                beq fd.10       ;set C bit
                pha :           ;save bottom flags on stack
                and #$20        ;check #7 flag
                bne fd.6        ;branch if set
                jsr set.R       ;set R bit
                jmp fd.7
fd.6            jsr set.L       ;set L bit
fd.7            pla :           ;recover bottom flags
                and #$40        ;check center flag
```

```
                bne fd.8        ;branch if set
                jsr top.hit     ;hits on 2-3?
                beq fd.ret      ;branch if not
fd.8            jsr set.H       ;else set H bit
                jmp fd.ret
fd.9            jsr set.rot     ;set rotate bit
                jmp fd.ret
fd.10           jsr set.C       ;set C bit
fd.ret          rts
;
set.R           lda res.reg
                ora #$01
                jmp set.ret
set.C           lda res.reg
                ora #$02
                jmp set.ret
set.L           lda res.reg
                ora #$04
                jmp set.ret
set.rot         lda res.reg
                ora #$10
                jmp set.ret
set.H           lda res.reg
                ora #$08
set.ret         sta res.reg
                rts
;
R.set           lda #$01        ;set mask for R bit
                jmp set?
C.set           lda #$02
                jmp set?
L.set           lda #$04
                jmp set?
H.set           lda #$08
                jmp set?
rot.set         lda #$10
set?            bit res.reg     ;check response flag
                rts
;
avoid           lda #$04
                sta max.saf     ;limit max safe speed during avoidance
                jsr set.max     ;and set max speed
avoid1          jsr new.cmd     ;check for new command
                bpl av.ret      ;kick out if command waiting
                jsr flg.dcd     ;decode collision flags
                jsr rot.set     ;rotate?
                beq avoid2      ;branch if rotate bit not set
                jsr rotate      ;else rotate in place
                jmp av.ret      ;and return
avoid2          lda #$03
                sta CF          ;set correction factor
                jsr H.set       ;H bit set?
                beq avoid3      ;branch if not
                inc CF          ;else increase CF
                inc CF
avoid3          jsr C.set       ;C bit set?
                beq avoid4      ;branch if not center only
                lda wan.flg     ;check desired turn direction
                cmp #$01        ;left turn requested?
                beq left        ;branch for a left turn
                jmp right       ;else make a right turn
avoid4          jsr L.set       ;L bit set
                beq right       ;branch if not
left            lda CF          ;recall correction factor
                jsr set.cf      ;set cf.add and cf.sub
                lda max.spd     ;recall desired speed
                jsr off.lf      ;alter course to the left
                jmp avoid5
right           lda CF          ;recall correction factor
                jsr set.cf      ;set cf.add and cf.sub
                lda max.spd     ;recall desired speed
                jsr off.rt      ;alter course to the right
avoid5          jsr delay
```

```
                jsr new.son  ;new sonar data?
                bmi avoid6   ;branch if none
                jsr hndshk3  ;read in data
                jsr son.scl  ;scale to 1 byte
avoid6          jsr son.flg  ;set sonar collision flags
                jsr prx.flg  ;set proximity collision flags
                lda col.sta  ;any obstacles detected?
                bne avoid1   ;branch if not clear
av.ret          rts
;
restore
                jsr new.cmd  ;check for a new command (RTS)
                bpl res.ret  ;exit if new command waiting
                jsr prx.hit  ;any obstructions detected?
                bcc res.ret  ;branch and exit if obstructions
res.0           lda CF
                jsr outbyt
                jsr space
                beq res.1    ;branch if already zero
                dec CF       ;else decrement correction factor
res.1           lda CF
                jsr set.cf   ;set cf.add and cf.sub
                jsr turn     ;determine direction of current turn
                bcc res.lf   ;branch if a left turn
res.rt          lda max.spd  ;recall desired speed
                jsr off.rt   ;offset to right with new CF
                jmp res.2
res.lf          lda max.spd  ;recall desired speed
                jsr off.lf   ;offset to left with new CF
res.2           ldy #$04     ;number of delay loops
                jsr cmd.del  ;delay while checking for command
                lda drv.cmd
                jsr outbyt
                jsr crlf
                lda CF       ;correction factor equal to zero yet?
                bne restore  ;loop if not finished
res.ret         lda max.spd  ;recall desired speed
                jsr drv.fwd  ;and restore it
                rts
;
govern          lda #$02
                bit sys.flg
                bne gov.en   ;branch if set (enabled)
                lda veloc    ;else pass ordered command
                sta max.spd
                jmp gov.ret
gov.en          jsr crlf
                jsr calc.ms  ;calculate maximum safe speed
                jsr set.max  ;and set maximum allowed speed
order           lda max.spd
                jsr average
                jsr space
                jsr outbyt
                sta Z        ;save average max.spd
                lda drv.cmd
                jsr average  ;get average drv.cmd
                jsr space
                jsr outbyt
                jsr space
                clc
                cmp Z
                bcc inc.df   ;branch avg drv.cmd < avg max.spd
                lda max.spd  ;limit to max
                jmp gov.ret
inc.df          lda drv.cmd  ;recall last drive command
                jsr spd.up
gov.ret         jsr drv.fwd  ;pass to drive controller
                lda drv.cmd
                jsr outbyt
                jsr space
                rts
;
set.max         lda veloc    ;recall commanded velocity
```

```
                jsr average  ;get average value
                sta avg.vel
                cmp max.saf
                bcc vel.ok   ;branch if veloc < max safe speed
                beq vel.ok   ;or equal
                jsr slo.dwn  ;else slow down
                jmp sm.ret
vel.ok          lda veloc
                sta max.spd
sm.ret          rts
;
min.rng         sec :        ;subtract nearest from range Y
                lda rng.lo1,Y
                sbc near
                bpl mr.ret   ;return if plus
                sty nearest  ;save index of nearest range
                lda rng.lo1,Y
                sta near     ;reset to closer range
mr.ret          rts
;
calc.ms         ldy #7       ;initialize index
                sty nearest  ;save index
                lda rng.lo1,Y
                sta near     ;assume for now #7 closest
c.ms1           jsr min.rng  ;check for minimum range
                iny
                cpy #10      ;finished?
                bne c.ms1
                lda near     ;recall shortest range
                sta max.saf
                lsr max.saf
                lsr max.saf
                lda max.saf
                cmp #$0b     ;limit top end
                bcc c.ms2    ;branch if less than
                lda #$0a     ;else reset
c.ms2           rts
;
average         pha
                jsr nib.rt
                sta temp
                pla
                and #$0f
                clc
                adc temp
                lsr A
                rts
;
slo.dwn         lda avg.vel  ;recall average commanded velocity
                sec
                sbc max.saf  ;subtract maximum safe velocity
                sta CF       ;use as correction factor
                lda veloc    ;recall commanded velocity
                jsr nib.rt   ;shift port command to lower nibble
                jsr sub.CF   ;subtract CF
                jsr nib.lf   ;shift back
                pha :        ;save on stack
                lda veloc    ;recall again
                and #$0f     ;for stbd motor
                jsr sub.CF   ;subtract CF
                sta temp
                pla :        ;recall new port command
                ora temp     ;recombine them in A
                sta max.spd  ;reset max safe speed
                rts
;
spd.up          lda drv.cmd  ;recall previous command
                jsr nib.rt
                jsr add.one
                jsr nib.lf   ;shift port command back
                pha
                lda drv.cmd  ;recall original
                and #$0f     ;for stbd motor
```

```
                jsr add.one
                sta temp
                pla
                ora temp      ;recombine
                rts
;
add.one         clc
                adc #$01      ;increment
                cmp #$0b      ;check upper limit
                bcc ao.ret    ;branch if less
                lda #$0a      ;else reset
ao.ret          rts
;
sub.CF          sec
                sbc CF        ;subtract CF from A
                beq sub.1     ;branch if zero
                bpl sub.ret   ;branch if plus
sub.1           lda #$01      ;reset to 1
sub.ret         rts
;
rotate          ldy #$04      ;number of delay loops
                lda wan.flg   ;recall wander flag
                beq rot.ret   ;exit if disabled
                cmp #$01      ;preferred left turn?
                beq turn.lf
turn.rt         lda #$10
                jsr drv.fwd   ;commence right turn
                jsr cmd.del
                jsr new.cmd   ;new command waiting?
                bpl rot.ret
rot.rt          lda #$03      ;mode 3 (rotate right)
                jmp rot.mod
turn.lf         lda #$01
                jsr drv.fwd   ;commence left turn
                jsr cmd.del
                jsr new.cmd   ;command waiting?
                bpl rot.ret
rot.lf          lda #$02      ;mode 2 (rotate left)
rot.mod         jsr mode
                lda #$11      ;speed command
                jsr cpu4      ;latch into cpu4
rot.lp          jsr new.son   ;new sonar data?
                bmi rot.flg   ;branch if none
                jsr hndshk3   ;read in data
                jsr son.scl   ;scale it
rot.flg         jsr son.flg   ;set sonar collision flags
                jsr prx.flg   ;set proximity collision flags
                lda col.sta
                and #$e0      ;check sensors 7 - 9 only
                beq rot.ret   ;kick out if no hits
                cmp #$80      ;9 only set
                beq rot.ret
                cmp #$20      ;7 only set
                beq rot.ret
                jsr new.cmd
                bmi rot.lp    ;loop if no command waiting
rot.ret         lda #$00
                sta CF
                sta drv.cmd
                rts
;
Q.parse         jsr zer.buf   ;zero output buffer
                jsr delay
                lda #'0       ;packet ID
                sta out.buf
                lda #'Q
                sta out.buf+1
                lda #$0d      ;CR
                sta out.buf+2
                jsr outpak    ;send packet back
                rts
;
                .en
```

```
//

>ln^M



LABEL FILE:  [ / = EXTERNAL ]


start=0000          stop=0001           rng.lo1=0002
rng.hi1=000F        rng.lo2=001C        rng.hi2=0029
feet=0036           inches=0037         in/10=0038
max.rng=0039        D=003A              Z=003B
temp=003C           char=003D           mask=003E
portsv=003F         fault=0040          pass=0041
prv.err=0042        ty.flg=0043         zone=0044
mux.flg=0045        col.sta=0046        fol.sta=0047
diff=0048           cf=0049             tol=004A
tol.hi=004B         nearest=004C        near=004D
near.hi=004E        drv.cmd=004F        hd.pos=0050
trk.flg=0051        stp.cod=0052        volts=0053
theta.l=0054        theta.h=0055        UT=0056
LT=0057             carry=0058          crc.hi=0059
crc.lo=005A         buffer=005B         int.flg=005D
mw.flg=005E         us.flg=005F         ir.flg=0060
op.flg=0061         dh.flg=0062         vb.flg=0063
cmp.thr=0064        buf.ind=0065        dh.thr=0066
veloc=0067          displ=0068          hours=0069
minutes=006A        seconds=006B        cur.mod=006C
sys.flg=006D        max.spd=006E        rch.flg=006F
cf.add=0070         cf.sub=0071         dh.brg=0072
prv.brg=0073        count=0074          dih.flg=0075
index=0076          CF=0077             wan.flg=0078
res.reg=0079        max.saf=007A        avg.vel=007B
/scr3=A633          in.buf=7E00         out.buf=7F00
/t2clo=A008         /t2chi=A009         /ifr2=A00D
/ddra1=A003         /ora1=A001          /ddrb1=A002
/orb1=A000          /ddra2=A803         /ora2=A801
/ddrb2=A802         /orb2=A800          /ddra3=AC03
/ora3=AC01          /ddrb3=AC02         /orb3=AC00
/ddra4=A401         /ora4=A400          /orb4=A402
/PCR2=A80C          /irq.vec=A678       /IER2=A80E
/IFR2=A80D          /techo=A653         /toutfl=A654
/inchr=8A1B         /inbyt=81D9         /ascnib=8275
/outbyt=82FA        /nibasc=8309        /crlf=834D
/comma=833A         /space=8342         /outchr=8A47
/nhasoc=8A44        /replay=C0E1        /cpu3=C139
/cpu4=C13F          /vox0=C169          /vox1=C16E
/vox2=C173          /vox3=C178          /vox4=C17D
/vox=C17F           /mode=C19D          /ld.time=C1AC
/wait.5=C1F2        /delay.5=C1F5       /delay1=C1FA
/delay2=C1FF        /delay3=C204        /wait1=C213
/wait2=C218         /wait3=C21D         /delay=C230
/if.on=C283         /if.off=C28C        /posit=C34B
/scan=C355          /center=C367        /drive=C36D
/home=C3E8          /halt=C3F1          /hndshk3=C3FA
/set.son=C451       /disply=C45D        /son.one=C464
/sel.chk=C476       /sel.dis=C482       /tmp.chk=C505
/rm.tmp=C515        /sys.tmp=C522       /a/d=C534
/rel.hum=C5B4       /nib.rt=C55A        /nib.lf=C55F
/sel.tes=C564       /sir.on=C5C6        /sir.off=C5CE
/thank=C5D7         /intrude=C5E7       /bat.vol=C628
/greet=C65E         /qstart=C664        /sht.dwn=C683
/drv.chk=C6AB       /stp.chk=C6B8       /pow.chk=C6F1
/stp.tst=C72D       /delchk<=C76C       /delchk>=C7B4
/rs232=C79C         /initial=C7BC       /dmp.pak=C800
/buf.byt=C816       /son.scl=C82C       /son.pak=C894
/inpak=C8DF         /zer.buf=C8FE       /hex.bcd=C9B2
/jog.lf=C9E0        /jog.rt=C9F8        /rd.buf=CA31
/cam.on=CA10        /cam.off=CA20       /report2=CA97
/new.son=CBE9       /sec.pow=CDEC       /outpak=CE39
/survey=CE51        /new.cmd=CE9F       /son.cmd=CED5
/sonar=D000         /H.parse=D00D       /T.parse=D045
```

Apr 18 1991 11:56:36 mod14e.asm Page 15

```
/sys.pow=D08B          /son.pow=D09A          /vox.pow=D0A8
/col.arr=D0B8          /report1=D0D1          /report3=D0EC
/recharge=D10C         /drv.fwd=D2E4          /set.cf=D39B
/off.rt=D3DF           /off.lf=D409           /flush=D623
siren=D800             sr.off=D80F            sir.ret=D812
camera=D813            c.off=D822             cam.ret=D825
report9=D826           report7=D864           hex.vox=D870
hvl=D879               V.parse=D87F           V.0=D881
V1=D898                V2=D8A5                V3=D8B2
V4=D8BF                V.loop=D8C9            rd.word=D8CF
V.ret=D8DB             R.parse=D8DC           R2=D8EB
R3=D8F5                R4=D8FF                R5=D903
R8=D907                R.err=D911             R.ret=D916
M.parse=D917           M.0=D92B               M.1=D940
M.2=D958               M.3=D96B               M.4=D975
M.5=D98A               M.6=D999               M.7=D99E
M.ret=D9A4             dr.diag=D9A5           ca.map=D9B5
ca.0=D9D2              ca.1=D9D8              ca.clr=D9EA
ca.ret=D9EB            stop?=D9EC             stp?.1=DA00
stp.clr=DA0F           stp.set=DA13           stp.ret=DA1C
report8=DA1D           get.pak=DA21           gp.ret=DA46
echo=DA47              echo1=DA49             ir.on=DA58
ir.off=DA60            ir=DA65                rd.cen=DA69
rd.lf=DA6F             rd.rt=DA75             prx.hit=DA7B
ph.clr=DA8E            ph.ret=DA8F            prx.all=DA90
pa.set=DAA3            pa.ret=DAA4            prx.cen=DAA5
pc.set=DAB8            pc.ret=DAB9            turn=DABA
cmd.del=DACC           cd.ret=DAD7            select6=DAD8
limits=DAE0            son.flg=DAEA           sf.1=DAF6
sf.2=DB07              sf.ret=DB12            prx.flg=DB13
pf.1=DB20              pf.2=DB2D              pf.ret=DB3A
bot.hit=DB3B           top.hit=DB41           flg.dcd=DB47
fd.0=DB51              fd.1=DB5A              fd.2=DB5E
fd.3=DB64              fd.4=DB6A              fd.5=DB7D
fd.6=DB8C              fd.7=DB8F              fd.8=DB99
fd.9=DB9F              fd.10=DBA5             fd.ret=DBA8
set.R=DBA9             set.C=DBB1             set.L=DBB9
set.rot=DBC1           set.H=DBC9             set.ret=DBCE
R.set=DBD2             C.set=DBD7             L.set=DBDC
H.set=DBE1             rot.set=DBE6           set?=DBE8
avoid=DBEC             avoid1=DBF4            avoid2=DC07
avoid3=DC17            avoid4=DC26            left=DC2B
right=DC3A             avoid5=DC46            avoid6=DC54
av.ret=DC5F            restore=DC60           res.0=DC6A
res.1=DC78             res.rt=DC83            res.lf=DC8C
res.2=DC92             res.ret=DCA5           govern=DCAC
gov.en=DCBC            order=DCC5             inc.df=DCEF
gov.ret=DCF5           set.max=DD02           vel.ok=DD18
sm.ret=DD1E            min.rng=DD1F           mr.ret=DD31
calc.ms=DD32           c.ms1=DD3D             c.ms2=DD5A
average=DD5B           slo.dwn=DD6B           spd.up=DD95
add.one=DDB2           ao.ret=DDBB            sub.CF=DDBC
sub.1=DDC4             sub.ret=DDC6           rotate=DDC7
turn.rt=DDD2           rot.rt=DDDF            turn.lf=DDE4
rot.lf=DDF1            rot.mod=DDF3           rot.lp=DDFB
rot.flg=DE06           rot.ret=DE20           Q.parse=DE29

//0000,DE42,0E42
>c
```

METHOD AND SYSTEM FOR FUSING DATA FROM FIXED AND MOBILE SECURITY SENSORS

NAVY CASE NO. 72775

INVENTORS: HOBART R. EVERETT
GARY A. GILBREATH

A P P E N D I X 3

```
2500 A.D. 6502 Macro Assembler  -  Version 4.03b
------------------------------------------------

        Input  Filename : modet4.asm
        Output Filename : modet4.obj

                    ;******************************
                    ;*       Modet4.asm          *
                    ;*       March, 1991         *
                    ;******************************
                    ;

                            PW      80
0000                        CHIP    65C02
                    ;DEFINE PAGE ZERO
0000                        .PAGE0
0000                left    ds 1
0001                right   ds 1
0002                center  ds 1
0003                md.flag ds 1
0004                total   ds 2
0006                DEL10X  ds 1
0007                active  ds 1
0008                indept  ds 2
000A                hch     ds 1
000B                eoflag  ds 1
000C                evflag  ds 1
000D                ecount  ds 1
000E                scount  ds 1
000F                scan    ds 1
0010                hi      ds 1
0011                lo      ds 1
0012                vpt     ds 2
0014                spt     ds 2
0016                dpt     ds 2
0018                rpt     ds 2
001A                savey   ds 1
001B                savex   ds 1
001C                dubflag ds 1
001D                BufL    ds 1
001E                BufH    ds 1
001F                templ   ds 1
0020                temph   ds 1
0021                offset  ds 1
0022                last    ds 1
                    ;pseudo-constants
0023                THRESH  ds 1
0024                LEGAL   ds 1
```

```
0025                REPORT  ds 1
0026                SHORTC  ds 1
0027                LONGC   ds 1
0028                BRIEF   ds 1
0029                ALINES  ds 1
002A                CLINES  ds 1
002B                REFRESH ds 1
002C                FSCAN   ds 1
                    ;
                    ;IO DEFINITIONS
0000                        .DATA

C400                        ORG $C400
C400                DBUF0   DS $0100
C500                DBUF1   DS $0100
C600                DBUF2   DS $0100
C700                RBUF    DS $0100

CA00                        ORG $CA00
CA00                PBD     DS 1
CA01                PAD     DS 1
CA02                PBDD    DS 1
CA03                PADD    DS 1
CA04                T1      DS 4
CA08                T2      DS 2
CA0A                SR1     DS 1
CA0B                ACR1    DS 1
CA0C                PCR1    DS 1
CA0D                IFR1    DS 1
CA0E                IER1    DS 1
CA0F                PADH    DS 1
CC00                        ORG $CC00
CC00                TRR     DS 1
CC01                STR     DS 1
CC02                CMR     DS 1
CC03                CNR     DS 1

D000                        ORG $D000
D000                VBUFF   DS $0200
D200                        DS $0600        not used

D800                SBUF0   DS $0100
D900                SBUF1   DS $0100
DA00                SBUF2   DS $0100
DB00                SBUF3   DS $0100
                    ;--------------------------------
                    ;commands from the PC
         00F8       GETALINE        equ     $F8
         00F9       MODIFY          equ     $F9
         00FA       OBSERVE         equ     $FA

0000                        .CODE
                    ;for PC265-ICE entry only
         0100       IRQV4   equ     $0100
         0102       NMIV2   equ     $0102
         0104       IRQV2   equ     $0104
7000                        ORG $7000
7000     A9 76      PC265   lda     #<IRQIN
7002     A0 70              ldy     #>IRQIN
7004     8D 04 01           sta     IRQV2
7007     8C 05 01           sty     IRQV2+1
```

```
                        ;REAL POWER-ON RESET GOES HERE!
                        ;set up pseudo-constants
700A   78               RESET   SEI
700B   A2 FF                    LDX     #$FF
700D   9A                       TXS
700E   D8                       CLD
                        ;reset pseudo-constants
700F   A9 14                    lda     #$14
7011   85 23                    sta     THRESH
7013   A9 06                    lda     #$06
7015   85 24                    sta     LEGAL
7017   A9 01                    lda     #$01
7019   85 25                    sta     REPORT
701B   A9 1E                    lda     #30
701D   85 26                    sta     SHORTC
701F   A9 22                    lda     #34
7021   85 27                    sta     LONGC
7023   A9 01                    lda     #1
7025   85 28                    sta     BRIEF
7027   A9 04                    lda     #4
7029   85 29                    sta     ALINES
702B   A9 02                    lda     #2
702D   85 2A                    sta     CLINES
702F   A9 1E                    lda     #30
7031   85 2B                    sta     REFRESH
7033   A9 78                    lda     #120
7035   85 2C                    sta     FSCAN
                        ;Reset stack for next command
7037   78               Main    sei
7038   A2 FF                    ldx     #$FF
703A   9A                       txs
703B   D8                       cld
703C   20 42 70                 jsr     InitIO
                        ;        cli
703F   4C 12 72         While1  jmp     MODETECT
                        ;***************************
7042   A9 09            InitIO  lda     #$09    Allow interrupts
7044   8D 02 CC                 sta     CMR
7047   A9 1C                    lda     #$1c    le : 9600baud, 1c = 480
                   0 BAUD
7049   8D 03 CC                 sta     CNR
704C   AD 00 CC                 lda     TRR
704F   AD 01 CC                 lda     STR
                        ;
7052   A9 01                    lda     #$01
7054   8D 03 CA                 sta     PADD
7057   A9 FF                    lda     #$ff
7059   8D 01 CA                 sta     PAD
705C   A9 0F                    lda     #$0F
705E   8D 00 CA                 sta     PBD
7061   A9 2F                    lda     #$2F
7063   8D 02 CA                 sta     PBDD
7066   A9 7F                    lda     #$7f
7068   8D 0E CA                 sta     IER1
706B   A9 20                    lda     #$20
706D   8D 0B CA                 sta     ACR1
7070   A9 67                    lda     #$67    CA1/CA2/CB2  pos. edg
```

```
7072   8D 0C CA            sta      PCR1
7075   60          Dummy   rts
                   ;***************************
7076   48          IRQIN   pha
7077   AD 01 CC            lda      STR
707A   29 08               and      #$08
707C   D0 02               bne      CaseI
707E   68          IRQOUT  pla
707F   40          NMIIN   RTI
                   ;
7080   AD 00 CC    CaseI   lda      TRR
7083   C9 F8       CaseGet cmp      #GETALINE
7085   D0 03               bne      CaseMod
7087   4C 98 70            jmp      Fetch
708A   C9 F9       CaseMod cmp      #MODIFY
708C   D0 03               bne      CaseObs
708E   4C BC 71            jmp      Modify
7091   C9 FA       CaseObs cmp      #OBSERVE
7093   D0 E9               bne      IRQOUT
7095   4C C1 72            jmp      Observe
                   ;***************************
                   ;it is digitize command, get type
7098   A9 08       Fetch   lda      #$08
709A   2C 01 CC    WT1     bit      STR
709D   F0 FB               beq      WT1
709F   AD 00 CC            lda      TRR
70A2   29 03               and      #$3
70A4   4A                  lsr a
70A5   66 0B               ror      eoflag   $00=even $80=odd
70A7   4A                  lsr a
70A8   66 0C               ror      evflag   $00=ega  $80=vga
                   ;now get scan line
70AA   A9 08       WS0     lda      #$08
70AC   2C 01 CC    WS1     bit      STR
70AF   F0 FB               beq      WS1
70B1   AD 00 CC            lda      TRR      scan desired (0 - 255)
70B4   49 FF               eor      #$FF
70B6   85 07               sta      active
                   ;***************************
                   ;
70B8   2C 00 CA    WCV     bit      PBD
70BB   30 FB               bmi      WCV
70BD   20 75 70            jsr      Dummy
                   ;now wait for VSYNC
70C0   2C 00 CA    WC2     bit      PBD
70C3   10 FB               bpl      WC2
                   ;see if frame is even
70C5   2C 00 CA            bit      PBD      check 1
70C8   70 3D               bvs      Mbodd
70CA   2C 00 CA            bit      PBD      check 2
70CD   70 38               bvs      Mbodd
70CF   2C 00 CA            bit      PBD      check 3
70D2   70 33               bvs      Mbodd
70D4   2C 00 CA            bit      PBD      check 4
70D7   70 2E               bvs      Mbodd
70D9   2C 00 CA            bit      PBD      check 5
70DC   70 29               bvs      Mbodd
```

```
70DE   2C 00 CA           bit    PBD     check 6
70E1   70 24              bvs    Mbodd
70E3   2C 00 CA           bit    PBD     check 7
70E6   70 1F              bvs    Mbodd
70E8   2C 00 CA           bit    PBD     check 8
70EB   70 1A              bvs    Mbodd
70ED   2C 00 CA           bit    PBD     check 9
70F0   70 15              bvs    Mbodd
70F2   2C 00 CA           bit    PBD     check 10
70F5   70 10              bvs    Mbodd
70F7   2C 00 CA           bit    PBD     check 11
70FA   70 0B              bvs    Mbodd
70FC   2C 00 CA           bit    PBD     check 12
70FF   70 06              bvs    Mbodd
                   ;must be even
7101   24 0B       Mbeven bit    eoflag
7103   10 06              bpl    Process
7105   30 B1              bmi    WCV
7107   24 0B       Mbodd  bit    eoflag
7109   10 AD              bpl    WCV
                   ;
710B   A9 0C       Process lda   #12     delay to real stuff
710D   8D 08 CA           sta    T2
7110   A9 00              lda    #0
7112   8D 09 CA           sta    T2+1
                   ;now set up to allow video in
7115   A9 2F              lda    #$2F
7117   8D 02 CA           sta    PBDD
711A   A9 24              lda    #$24
711C   8D 00 CA           sta    PBD     counter, VBUFF - 0
                   ;and wait for counter to reach criterion
711F   2C 00 CA    WC4    bit    PBD
7122   50 FB              bvc    WC4
7124   20 75 70           jsr    Dummy
7127   AD 09 CA           lda    T2+1
712A   C9 FF              cmp    #$FF
712C   D0 F1              bne    WC4
712E   AD 08 CA           lda    T2
7131   C5 07              cmp    active
7133   D0 EA              bne    WC4
                   ;it is the active line so just wait for the end

7135   AD 0D CA           lda    IFR1
7138   8D 0D CA           sta    IFR1
713B   A9 08              lda    #$08
713D   2C 0D CA    WC5    bit    IFR1
7140   F0 FB              beq    WC5
                   ;we have a time out
7142   A9 2F              lda    #$2F
7144   8D 02 CA           sta    PBDD
7147   A9 08              lda    #$08
7149   8D 00 CA           sta    PBD     enable MMC side
714C   24 0C              bit    evflag
714E   30 2D              bmi    XmitVGA
                   ;begin transmission of EGA
7150   A9 D0       XmitEGA lda   #>VBUFF
7152   85 09              sta    indept+1
```

```
7154   A9 00              lda    #0
7156   85 08              sta    indept
7158   A0 00              ldy    #0
715A   B1 08     XE1      lda    (indept),y
715C   29 F0              and    #$f0
715E   85 0A              sta    hch
7160   C8                 iny
7161   B1 08              lda    (indept),y
7163   20 9C 71           jsr    XMITE
7166   C8                 iny
7167   D0 F1              bne    XE1
7169   E6 09              inc    indept+1
716B   B1 08     XE2      lda    (indept),y
716D   29 F0              and    #$f0
716F   85 0A              sta    hch
7171   C8                 iny
7172   B1 08              lda    (indept),y
7174   20 9C 71           jsr    XMITE
7177   C8                 iny
7178   D0 F1              bne    XE2
                 ;that's it
717A   4C 37 70           jmp    Main
                 ;begin transmission of VGA
717D   A9 D0     XmitVGA  lda    #>VBUFF
717F   85 09              sta    indept+1
7181   A9 00              lda    #0
7183   85 08              sta    indept
7185   A0 00              ldy    #0
7187   B1 08     XV1      lda    (indept),y
7189   20 AF 71           jsr    XMITV
718C   C8                 iny
718D   D0 F8              bne    XV1
718F   E6 09              inc    indept+1
7191   B1 08     XV2      lda    (indept),y
7193   20 AF 71           jsr    XMITV
7196   C8                 iny
7197   D0 F8              bne    XV2
                 ;that's it
7199   4C 37 70           jmp    Main
                 ;
719C   48        XMITE    pha
719D   A9 10              lda    #$10
719F   2C 01 CC  WE1      bit    STR
71A2   F0 FB              beq    WE1
71A4   68                 pla
71A5   4A                 lsr a
71A6   4A                 lsr a
71A7   4A                 lsr a
71A8   4A                 lsr a
71A9   05 0A              ora    hch
71AB   8D 00 CC           sta    TRR
71AE   60                 rts
                 ;
71AF   48        XMITV    pha
71B0   A9 10              lda    #$10
71B2   2C 01 CC  WV1      bit    STR
71B5   F0 FB              beq    WV1
```

```
71B7   68                    pla
71B8   8D 00 CC              sta      TRR
71BB   60                    rts
                        ;************************
                        ;Alter pseudo-constants
71BC   A9 08            Modify  lda      #$08
71BE   2C 01 CC         MT1     bit      STR
71C1   F0 FB                    beq      MT1
71C3   AD 00 CC                 lda      TRR      get which one
71C6   29 0F                    and      #$0F     have caller do translat
ion
71C8   AA                       tax
71C9   A9 08                    lda      #$08
71CB   2C 01 CC         MT2     bit      STR
71CE   F0 FB                    beq      MT2
71D0   AD 00 CC                 lda      TRR
71D3   95 23                    sta      THRESH,x
71D5   4C 37 70                 jmp      Main


                        ;=============================================
                        ;       MAIN TASK - OBSERVE FOR MOTION
                        ;Purpose: Detect Motion
                        ;Description: Compare current digitized data st
ore in SBUF0-2 with
                        ;the average previous digitized data store in D
BUF0-2.  Digitized data
                        ;are picked from 3 lines that close to the midl
e of screen.
                        ;=============================================

                        ;
                        getdata                        ;digitize 3 line from 1
 frame and store in SBUF0-2
71D8   20 F2 71                 jsr      dig.dat          ;digitize data
71DB   20 02 72                 jsr      copy.dat         ;copy digitized
 data to SBUF0-2
71DE   60                       rts

                        mod.ini                               ;initialize pre
vious data buffer
71DF   20 F2 71                 jsr      dig.dat          ;digitize
71E2   A9 04                    lda      #04              ;store digitize
s data to DBUF0-2
71E4   20 99 74                 jsr      Memcopy
71E7   A9 05                    lda      #05
71E9   20 99 74                 jsr      Memcopy
71EC   A9 06                    lda      #06
71EE   20 99 74                 jsr      Memcopy
71F1   60                       rts
71F2   A9 6E            dig.dat lda      #110
71F4   20 06 74                 jsr      Digitize
71F7   A9 78                    lda      #120
71F9   20 F4 73                 jsr      Digitize.1
71FC   A9 82                    lda      #130
71FE   20 FD 73                 jsr      Digitize.2
7201   60                       rts
7202                    copy.dat
```

```
7202    A9 00                   lda     #00
7204    20 99 74                jsr     Memcopy
7207    A9 01                   lda     #01
7209    20 99 74                jsr     Memcopy
720C    A9 02                   lda     #2
720E    20 99 74                jsr     Memcopy
7211    60                      rts


                        ;Main part
7212                    MODETECT
7212                    waitloop
7212    2C 01 CA                bit     PAD             ;check motion e
                nable bit (PA7)
7215    30 FB                   bmi     waitloop        ;loop until mot
                ion enable bit go low
7217    D8                      cld
7218    20 DF 71                jsr     mod.ini         ;get initial da
                ta DBUFF0-2
721B                        Motion
721B    20 D8 71                jsr     getdata         ;get current da
                ta
721E    A9 00                   lda     #00
7220    85 03                   sta     md.flag         ;clear motion d
                etect flag
7222    20 D8 74                jsr     Memcomp         ;compare curren
                t data with previous data for
                                                        ;1st line
7225    90 03                   bcc     next.1          ;branch if no m
                otion
7227    20 86 72                jsr     fnd.center      ;find center if
                 there is motion
722A    A9 01               next.1 lda  #01             ;compare for 2n
                d line
722C    20 D8 74                jsr     Memcomp
722F    90 03                   bcc     next.2          ;branch if no m
                otion
7231    20 86 72                jsr     fnd.center      ;find center if
                 motion
7234                        next.2
7234    A9 02                   lda     #02             ;compare for 3r
                d line
7236    20 D8 74                jsr     Memcomp
7239    90 03                   bcc     md.done         ;branch if no m
                otion
723B    20 86 72                jsr     fnd.center      ;find center if
                 motion
723E                        md.done
723E    A5 03                   lda     md.flag         ;is motion dete
                ct flag is set?
7240    F0 03                   beq     md.cont         ;no, continue c
                hecking for motion
7242    20 A4 72                jsr     mot.rpt
7245    20 5E 72            md.cont jsr getave          ;average all pr
                evious data
7248    AD 01 CA                lda     PAD
724B    09 01                   ora     #01
724D    8D 01 CA                sta     PAD             ;reset RTS line
                 to hi
```

```
                             ;for robart2
                             ;       lda     PAD           ;double check the CTS
                             ;       bit     #$02
                             ;       beq     md.cont1      ;dump output if CTS low
7250   2C 01 CA                      bit     PAD           ;check for motion enable (bit7)
7253   30 BD                         bmi     MODETECT      ;not enable, stop checking for motion
7255   4C 1B 72                      jmp     Motion        ;yes, continue checking for motion
7258                         md.cont1
7258   20 A4 72                      jsr     mot.rpt
725B   4C 1B 72                      jmp     Motion
725E                         getave
725E   A9 00                         lda     #00
7260   85 16                         sta     dpt
7262   85 14                         sta     spt
7264   A9 D8                         lda     #>SBUF0
7266   85 15                         sta     spt+1
7268   A9 C4                         lda     #>DBUF0
726A   85 17                         sta     dpt+1
726C   A0 00                         ldy     #00
726E   A2 03                         ldx     #3
7270                         getave.1
7270   18                            clc
7271   B1 14                         lda     (spt),y
7273   71 16                         adc     (dpt),y
7275   6A                            ror     A
7276   91 16                         sta     (dpt),y
7278   C8                            iny
7279   D0 F5                         bne     getave.1
727B   CA                            dex
727C   F0 07                         beq     getave.rts
727E   E6 15                         inc     spt+1
7280   E6 17                         inc     dpt+1
7282   4C 70 72                      jmp     getave.1
7285                         getave.rts
7285   60                            rts
7286                         fnd.center

7286   E6 03                         inc     md.flag
7288   A4 25                         ldy     REPORT
728A   B9 00 C7                      lda     RBUF,y        left pixel
728D   85 00                         sta     left
728F   38                            sec
7290   A5 0D                         lda     ecount
7292   E5 25                         sbc     REPORT
7294   A8                            tay
7295   B9 00 C7                      lda     RBUF,y        right pixel
7298   85 01                         sta     right
729A   18                            clc
729B   65 00                         adc     left
729D   6A                            ror     A
729E   65 02                         adc     center
72A0   6A                            ror     A
```

```
72A1   85 02               sta     center
72A3   60                  rts
72A4

72A4             mot.rpt
72A4   AD 01 CA            lda     PAD
72A7   29 FE               and     #$fe
72A9   8D 01 CA            sta     PAD              ;set RTS low
72AC   AD 01 CA            lda     PAD              ;CTS (PA1) low
       ?
72AF   89 02               bit     #$02
72B1   D0 0D               bne     rpt.rt           ;no, return
72B3   A5 02               lda     center           ;yes, dump outp
       ut
72B5   20 AF 71            jsr     XMITV
72B8   AD 01 CA            lda     PAD
72BB   09 01               ora     #01
72BD   8D 01 CA            sta     PAD              ;reset RTS line
        to hi

72C0   60        rpt.rt    rts

                 ;



72C1   D8        Observe   cld
                 ;          cli           to allow interruptions

72C2   A5 2C               lda     FSCAN
72C4   85 0F               sta     scan
                 ;
72C6   A2 FF     Idle      ldx     #$FF
72C8   9A                  txs
                 ;
72C9   A5 29               lda     ALINES
72CB   C9 02               cmp     #2
72CD   90 06               bcc     ALIN1
72CF   C9 04               cmp     #4
72D1   90 1E               bcc     ALIN2
72D3   B0 47               bcs     ALIN4
                 ;case 1
72D5   A5 0F     ALIN1     lda     scan
72D7   20 06 74            jsr     Digitize
72DA   A9 00               lda     #0
72DC   20 99 74            jsr     Memcopy
                 ;now create the average buffer in DBUF0
72DF   A0 00               ldy     #0
72E1   B9 00 D8  Cart0     lda     SBUF0,y
72E4   99 00 C4            sta     DBUF0,y
72E7   C8                  iny
72E8   D0 F7               bne     Cart0
72EA   A9 02               lda     #2
72EC   85 21               sta     offset
72EE   4C 7D 73            jmp     Forno2
                 ;
                 ;case 2, case 3
```

```
72F1   A5 0F       ALIN2  lda    scan
72F3   20 06 74           jsr    Digitize
72F6   A9 00              lda    #0
72F8   20 99 74           jsr    Memcopy
72FB   A5 0F              lda    scan
72FD   20 06 74           jsr    Digitize
7300   A9 01              lda    #1
7302   20 99 74           jsr    Memcopy
                   ;now create the average buffer in DBUF0
7305   A0 00              ldy    #0
7307   18          Bike0  clc
7308   B9 00 D8           lda    SBUF0,y
730B   79 00 D9           adc    SBUF1,y
730E   6A                 ror a
730F   99 00 C4           sta    DBUF0,y
7312   C8                 iny
7313   D0 F2              bne    Bike0
7315   A9 03              lda    #3
7317   85 21              sta    offset
7319   4C 7D 73           jmp    Forno2
                   ;
                   ;case 4
731C   A5 0F       ALIN4  lda    scan
731E   20 06 74           jsr    Digitize
7321   A9 00              lda    #0
7323   20 99 74           jsr    Memcopy
7326   A5 0F              lda    scan
7328   20 06 74           jsr    Digitize
732B   A9 01              lda    #1
732D   20 99 74           jsr    Memcopy
7330   A5 0F              lda    scan
7332   20 06 74           jsr    Digitize
7335   A9 02              lda    #2
7337   20 99 74           jsr    Memcopy
733A   A5 0F              lda    scan
733C   20 06 74           jsr    Digitize
733F   A9 03              lda    #3
7341   20 99 74           jsr    Memcopy
                   ;now create the average buffer in DBUF0
7344   A0 00              ldy    #0
7346   A9 00       Adam0  lda    #0
7348   85 20              sta    temph
734A   85 1F              sta    templ
734C   18                 clc
734D   B9 00 D8           lda    SBUF0,y
7350   79 00 D9    Adam1  adc    SBUF1,y
7353   90 03              bcc    Adam2
7355   E6 20              inc    temph
7357   18                 clc
7358   79 00 DA    Adam2  adc    SBUF2,y
735B   90 03              bcc    Adam3
735D   E6 20              inc    temph
735F   18                 clc
7360   79 00 DB    Adam3  adc    SBUF3,y
7363   90 02              bcc    Adam12
7365   E6 20              inc    temph
7367   85 1F       Adam12 sta    templ
```

```
                        ;divide by 4
7369   46 20                    lsr     temph
736B   66 1F                    ror     templ
736D   46 20                    lsr     temph
736F   66 1F                    ror     templ
                        ;
7371   A5 1F                    lda     templ
7373   99 00 C4                 sta     DBUF0,y
7376   C8                       iny
7377   D0 CD                    bne     Adam0
7379   A9 05                    lda     #5
737B   85 21                    sta     offset
                        ;
                        ;DBUF0 now contains average of n times through
737D   38               Forno2  sec
737E   A5 2B                    lda     REFRESH
7380   E5 21                    sbc     offset  since we did some alrea
dy
7382   85 0E                    sta     scount
                        ;adjust for double scan
7384   A5 2A                    lda     CLINES
7386   29 01                    and     #1
7388   D0 02                    bne     WHILE
                        ;it is double scan
738A   46 0E                    lsr     scount
                        ;for loop repeat
738C   A5 2A            WHILE   lda     CLINES
738E   29 01                    and     #1
7390   F0 18                    beq     WIS2
                        ;== 1
7392   A5 0F            WIS1    lda     scan
7394   20 06 74                 jsr     Digitize
7397   A9 00                    lda     #0
7399   20 99 74                 jsr     Memcopy
739C   A0 00                    ldy     #0
739E   B9 00 D8         WIS1a   lda     SBUF0,y
73A1   99 00 C5                 sta     DBUF1,y
73A4   C8                       iny
73A5   D0 F7                    bne     WIS1a
73A7   4C CE 73                 jmp     Fn28
                        ;== 2
                        ;it is double
73AA   A5 0F            WIS2    lda     scan
73AC   20 06 74                 jsr     Digitize
73AF   A9 00                    lda     #0
73B1   20 99 74                 jsr     Memcopy
73B4   A5 0F                    lda     scan
73B6   20 06 74                 jsr     Digitize
73B9   A9 01                    lda     #1
73BB   20 99 74                 jsr     Memcopy
                        ;transfer over the average
73BE   A0 00                    ldy     #0
73C0   18               WIS2a   clc
73C1   B9 00 D8                 lda     SBUF0,y
73C4   79 00 D9                 adc     SBUF1,y
73C7   6A                       ror a
73C8   99 00 C5                 sta     DBUF1,y
```

```
73CB   C8                   iny
73CC   D0 F2                bne     WIS2a

                    ;
73CE   20 D8 74     Fn28    jsr     Memcomp
73D1   90 0B                bcc     Fn29
73D3   A5 0F                lda     scan
73D5   20 75 75             jsr     SendSH
73D8   20 18 75             jsr     tmp.rp
73DB   4C EA 73             jmp     Nothing

                    ;
73DE   C6 0E        Fn29    dec     scount
73E0   D0 AA                bne     WHILE

                    ;
73E2   AD 01 CA             lda     PAD
73E5   09 01                ora     #$01
73E7   8D 01 CA             sta     PAD
73EA                Nothing
73EA   4C C6 72             jmp     Idle

                    ;===============
73ED                C_gitize:
73ED   49 FF                eor     #$FF
73EF   85 07                sta     active
73F1   4C 64 74             jmp     DC4     continues with next buf
                  f

                    ;
73F4                Digitize.1
73F4   49 FF                eor     #$ff
73F6   85 07                sta     active
73F8   A9 25                lda     #$25
73FA   4C 61 74             jmp     DC3
73FD                Digitize.2
73FD   49 FF                eor     #$ff
73FF   85 07                sta     active
7401   A9 26                lda     #$26
7403   4C 61 74             jmp     DC3


7406                Digitize:
7406   49 FF                eor     #$FF
7408   85 07                sta     active
740A   A9 20                lda     #$20
740C   8D 0B CA             sta     ACR1
                    ;now wait for VSYNC
740F   2C 00 CA     DC2     bit     PBD
7412   10 FB                bpl     DC2
                    ;see if frame is even
7414   2C 00 CA             bit     PBD     check 1
7417   70 F6                bvs     DC2
7419   2C 00 CA             bit     PBD     check 2
741C   70 F1                bvs     DC2
741E   2C 00 CA             bit     PBD     check 3
7421   70 EC                bvs     DC2
7423   2C 00 CA             bit     PBD     check 4
7426   70 E7                bvs     DC2
7428   2C 00 CA             bit     PBD     check 5
742B   70 E2                bvs     DC2
742D   2C 00 CA             bit     PBD     check 6
```

```
7430   70 DD              bvs   DC2
7432   2C 00 CA           bit   PBD     check 7
7435   70 D8              bvs   DC2
7437   2C 00 CA           bit   PBD     check 8
743A   70 D3              bvs   DC2
743C   2C 00 CA           bit   PBD     check 9
743F   70 CE              bvs   DC2
7441   2C 00 CA           bit   PBD     check 10
7444   70 C9              bvs   DC2
7446   2C 00 CA           bit   PBD     check 11
7449   70 C4              bvs   DC2
744B   2C 00 CA           bit   PBD     check 12
744E   70 BF              bvs   DC2
                    ;must be even
7450   A9 0C              lda   #12     delay to real stuff
7452   8D 08 CA           sta   T2
7455   A9 00              lda   #0
7457   8D 09 CA           sta   T2+1
                    ;now set up to allow video in
745A   A9 2F              lda   #$2F
745C   8D 02 CA           sta   PBDD
745F   A9 24              lda   #$24
7461   8D 00 CA     DC3   sta   PBD     counter, VBUFF - 0
                    ;and wait for counter to reach criterion
7464   2C 00 CA     DC4   bit   PBD
7467   50 FB              bvc   DC4
7469   20 75 70           jsr   Dummy
746C   AD 09 CA           lda   T2+1
746F   F0 F3              beq   DC4
7471   C9 FF              cmp   #$FF
7473   D0 9A              bne   DC2     must have missed
7475   AD 08 CA           lda   T2
7478   C5 07              cmp   active
747A   D0 E8              bne   DC4
                    ;it is the active line so just wait for the end

747C   AD 0D CA           lda   IFR1
747F   8D 0D CA           sta   IFR1
7482   A9 08              lda   #$08
7484   2C 0D CA     DC5   bit   IFR1
7487   F0 FB              beq   DC5
                    ;we have a time out
7489   A9 2F              lda   #$2F
748B   8D 02 CA           sta   PBDD
748E   AD 00 CA           lda   PBD
7491   29 2F              and   #$2F
7493   AA                 tax
7494   E8                 inx
7495   8E 00 CA           stx   PBD     point to next buffer
7498   60                 rts
                    ;============================================
7499   AA           Memcopy tax
749A   29 01              and   #$01
749C   09 08              ora   #$08    get VBUF0-2
749E   8D 00 CA           sta   PBD     enable the MMC side
74A1   A9 2F              lda   #$2F
74A3   8D 02 CA           sta   PBDD
```

```
74A6  A9 00             lda   #0
74A8  85 14             sta   spt
74AA  85 12             sta   vpt
74AC  A9 D0             lda   #>VBUFF
74AE  85 13             sta   vpt+1
74B0  BD 63 76          lda   SHTab,x
74B3  85 15             sta   spt+1
                ;
74B5  A0 00             ldy   #0
74B7  B2 12     Memcol  lda   (vpt)     CMOS ONLY!
74B9  E6 12             inc   vpt
74BB  18                clc
74BC  72 12             adc   (vpt)     CMOS ONLY!
74BE  6A                ror a
74BF  91 14             sta   (spt),y
74C1  C8                iny
74C2  E6 12             inc   vpt
74C4  D0 F1             bne   Memcol
74C6  E6 13             inc   vpt+1
74C8  B2 12     Memco2  lda   (vpt)     CMOS ONLY!
74CA  E6 12             inc   vpt
74CC  18                clc
74CD  72 12             adc   (vpt)     CMOS ONLY!
74CF  6A                ror a
74D0  91 14             sta   (spt),y
74D2  C8                iny
74D3  E6 12             inc   vpt
74D5  D0 F1             bne   Memco2
74D7  60                rts
                ;==========================================
74D8  AA        Memcomp tax
74D9  A9 08             lda   #$08      always use buffer 0?
74DB  8D 00 CA          sta   PBD       enable the MMC side
74DE  A9 2F             lda   #$2F
74E0  8D 02 CA          sta   PBDD
                ;
74E3  A9 00             lda   #0
74E5  85 16             sta   dpt
74E7  85 14             sta   spt
74E9  85 18             sta   rpt
74EB  BD 67 76          lda   DHTab,x
74EE  85 17             sta   dpt+1
74F0  BD 63 76          lda   SHTab,x
74F3  85 15             sta   spt+1
74F5  A9 C7             lda   #>RBUF
74F7  85 19             sta   rpt+1
                ;
74F9  A0 00             ldy   #0
74FB  38        Memcm01 sec
74FC  B1 16             lda   (dpt),y
74FE  F1 14             sbc   (spt),y
7500  B0 03             bcs   Memcm02
                ;borrow occurred
7502  49 FF             eor   #$ff
7504  1A                INC A           CMOS ONLY
7505  C5 23     Memcm02 cmp   THRESH
7507  90 05             bcc   Memcm09
```

We claim:

1. A system for detecting intrusion in a secured environment, comprising:

a first sensor fixedly positioned and operably disposed to provide a first output signal corresponding to detection of a first perturbation in said environment;

a mobile platform operably disposed to be directed to travel along a path through said environment in response to receiving path control output signals;

a second sensor mounted to said mobile platform and operably disposed to provide a second output signal corresponding to detection of a second perturbation in said environment;

a digital data processor, communicatively coupled to receive said first output signal from said first sensor and to receive said second output signal from said second sensor, for assigning weighting coefficients to representations of each of said first and second output signals to generate weighted first and second values, for determining a sum of said weighted first and second values, for providing an intrusion alert output signal when said sum exceeds a reference value, and for providing said path control output signals to said mobile platform, to direct said mobile platform to a particular location in said environment;

an alarm system for generating an intrusion alert in response to receiving said intrusion alert output signal from said digital data processor.

2. The system of claim 1 in which said first sensor is inhibited by said digital data processor when said mobile platform is in a zone of coverage of said first sensor and said first sensor is enabled by said digital data processor when said mobile platform is outside said coverage zone.

3. The system of claim 2 further including a data link communicatively coupled between said digital data processor and said mobile platform for conveying said path control output signals from said digital data processor to said mobile platform and for conveying said second output signal from said second sensor to said digital data processor.

4. The system of claim 3 wherein:

said mobile platform further includes a collision avoidance system which generates a third output signal which is provided to said digital data processor for indicating the presence of any obstacles that may obstruct said path of said mobile platform; and said digital data processor directs said mobile platform to travel a modified path to said particular location in said environment which avoids said obstacles.

5. The system of claim 4 wherein said second sensor is an acoustical sensor.

6. The system of claim 4 wherein said second sensor is a vibration sensor.

7. The system of claim 4 wherein said second sensor is an infrared motion sensor.

8. The system of claim 4 wherein said second sensor is a microwave motion sensor.

9. The system of claim 4 wherein said second sensor is an ultrasonic motion detector.

10. The system of claim 4 wherein said second sensor is an optical motion detector.

11. The system of claim 4 further including:

a head positioning servo mounted to said mobile platform and operably disposed to receive pan control output signals generated by said digital data processor through said data link; and a video surveillance camera mounted to said head positioning servo so that said video surveillance camera may be oriented to detect a video scene of a location at which said first or second perturbations were detected.

* * * * *